US012266018B1

(12) United States Patent
Miller et al.

(10) Patent No.: US 12,266,018 B1
(45) Date of Patent: Apr. 1, 2025

(54) USE DETERMINATION RISK COVERAGE DATASTRUCTURE FOR ON-DEMAND AND INCREASED EFFICIENCY COVERAGE DETECTION AND REBALANCING APPARATUSES, PROCESSES AND SYSTEMS

(71) Applicant: Bind Benefits, Inc., Minneapolis, MN (US)

(72) Inventors: Anthony Miller, Minneapolis, MN (US); David Dickey, Minneapolis, MN (US); Henning Chiv, Castro Valley, CA (US); Matthew Chock, Eagan, MN (US); Glen Eiden, Forest Lake, MN (US); Trevor Fast, San Francisco, CA (US); Shawn Wagoner, Minneapolis, MN (US); Matthew Wiandt, Bloomington, MN (US); Jessica Zeaske, Minneapolis, MN (US); Nels Marcus Thygeson, San Rafael, CA (US); Charley Hastings, Cape Coral, FL (US); Jason Haupt, Maple Grove, MN (US); Mark Peterson, Eagan, MN (US); Maxwell L. Peterson, Minneapolis, MN (US); Benjamin Kowitt, Philadelphia, PA (US); Thomas Anton Klun, Minneapolis, MN (US)

(73) Assignee: Bind Benefits, Inc., Minneapolis, MN (US)

( * ) Notice: Subject to any disclaimer, the term of this patent is extended or adjusted under 35 U.S.C. 154(b) by 0 days.

(21) Appl. No.: 17/862,333

(22) Filed: Jul. 11, 2022

Related U.S. Application Data

(63) Continuation-in-part of application No. 16/659,444, filed on Oct. 21, 2019, and a continuation-in-part of (Continued)

(51) Int. Cl.
*G06Q 40/08* (2012.01)
*G06Q 10/067* (2023.01)

(52) U.S. Cl.
CPC .......... *G06Q 40/08* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 5,301,105 | A | 4/1994 | Cummings |
| 5,523,942 | A | 6/1996 | Tyler |

(Continued)

FOREIGN PATENT DOCUMENTS

| | | | |
|---|---|---|---|
| CA | 2419105 | C | 1/2007 |
| CA | 2369425 | C | 6/2012 |

(Continued)

OTHER PUBLICATIONS

Karen Davis, Marilyn Moon, Barbara Cooper and Cathy Schoen. "Medicare Extra: A Comprehensive Benefit Option For Medicare Beneficiaries". Health Affairs, (2005). doi: 10.1377/hlthaff.w5.442. http://content.healthaffairs.Org/content/early/2005/10/04/hlthaff.w5.442.citation (Year: 2005).

(Continued)

*Primary Examiner* — Ayal I. Sharon
(74) *Attorney, Agent, or Firm* — Alston & Bird LLP

(57) ABSTRACT

The Use Determination Risk Coverage Datastructure for On-Demand and Increased Efficiency Coverage Detection and Rebalancing Apparatuses, Processes and Systems ("UDRCD") transforms coverage enrollment request, event signal, ACGG request, search request, props ratios calculation request, encounters build request, episodes build request, price calculation request, price range generation (Continued)

request, price range lookup request inputs via UDRCD components into coverage enrollment response, add-in recommendation, ACGG response, search response, props ratios calculation response, encounters build response, episodes build response, price calculation response, price range generation resp., price range lookup resp. outputs. An episodes build request datastructure identifying an encounter type is obtained. An anchor encounter datastructure is selected. A set of other encounter datastructures for the anchor encounter datastructure is determined. A props ratio relevance function associated with the encounter type is determined, and used to determine a set of accessory encounter datastructures for the anchor encounter datastructure. An episode datastructure is generated.

18 Claims, 139 Drawing Sheets

Related U.S. Application Data application No. 16/659,438, filed on Oct. 21, 2019, and a continuation-in-part of application No. 16/659,429, filed on Oct. 21, 2019, now Pat. No. 11,790,454, and a continuation-in-part of application No. 15/632,052, filed on Jun. 23, 2017, and a continuation of application No. 15/631,961, filed on Jun. 23, 2017, now Pat. No. 11,663,670.

(60) Provisional application No. 63/220,991, filed on Jul. 12, 2021, provisional application No. 63/220,993, filed on Jul. 12, 2021, provisional application No. 63/220,988, filed on Jul. 12, 2021, provisional application No. 63/220,992, filed on Jul. 12, 2021, provisional application No. 63/220,986, filed on Jul. 12, 2021, provisional application No. 62/807,711, filed on Feb. 19, 2019, provisional application No. 62/748,518, filed on Oct. 21, 2018, provisional application No. 62/524,188, filed on Jun. 23, 2017, provisional application No. 62/510,215, filed on May 23, 2017, provisional application No. 62/446,810, filed on Jan. 16, 2017.

(56) References Cited

U.S. PATENT DOCUMENTS 5,855,005 A 12/1998 Schuler et al.
6,061,657 A 5/2000 Whiting-O'Keefe
6,078,890 A 6/2000 Mangin et al.
6,266,645 B1 7/2001 Simpson
6,370,511 B1 4/2002 Dang
6,381,576 B1 4/2002 Gilbert
6,735,569 B1 5/2004 Wizig
7,392,201 B1 6/2008 Binns
7,493,264 B1 2/2009 Kelly
7,617,115 B2 11/2009 McNair
7,702,522 B1 4/2010 Sholem
7,702,527 B1 4/2010 Kron
7,711,577 B2 5/2010 Dust
7,805,318 B1 9/2010 Kuhn
7,979,290 B2 7/2011 Dang
8,005,687 B1 8/2011 Pederson
8,041,636 B1 10/2011 Hunter
8,050,937 B1 * 11/2011 Henderson ............ G16H 10/60 705/2
8,121,869 B2 2/2012 Dang
8,126,727 B2 2/2012 Peterson
8,321,372 B1 11/2012 Rakshit et al.
8,352,286 B1 1/2013 Bawa
8,388,348 B2 * 3/2013 Biltz ........................ G09B 7/00 434/262
8,412,537 B1 4/2013 Fenton
8,670,996 B1 3/2014 Weiss
8,868,436 B2 10/2014 Gotthardt
9,679,028 B1 6/2017 Sanghvi et al.
9,881,129 B1 1/2018 Cave
10,049,772 B1 * 8/2018 Price, Jr. ................ G16H 50/70
10,460,411 B2 10/2019 Liu
10,521,864 B1 12/2019 Davis
11,107,582 B2 8/2021 Nicolaas
11,244,416 B2 2/2022 Cave et al.
11,270,800 B1 3/2022 Mitidis et al.
11,373,739 B2 6/2022 Ozeran
11,640,857 B2 5/2023 Valuck et al.
11,663,670 B1 5/2023 Miller et al.
11,705,226 B2 7/2023 Colley et al.
11,790,454 B1 10/2023 Miller et al.
11,967,431 B1 * 4/2024 Toensing ............... G16H 15/00
12,020,816 B2 6/2024 Srinivasan et al.
12,094,582 B1 9/2024 Goyal et al.
12,131,397 B2 10/2024 Cave et al.
2001/0034619 A1 10/2001 Sherman
2002/0065758 A1 5/2002 Henley
2002/0087358 A1 7/2002 Gilbert
2002/0111826 A1 8/2002 Potter et al.
2002/0165738 A1 11/2002 Dang
2002/0173987 A1 11/2002 Dang
2002/0173989 A1 11/2002 Dang
2002/0173992 A1 11/2002 Dang
2002/0178030 A1 11/2002 Loeb
2003/0195838 A1 10/2003 Henley
2003/0204421 A1 10/2003 Houle
2004/0010426 A1 1/2004 Berdou
2004/0111363 A1 6/2004 Trench
2004/0122704 A1 6/2004 Sabol et al.
2004/0122787 A1 6/2004 Avinash et al.
2004/0143464 A1 7/2004 Houle
2004/0193456 A1 9/2004 Kellington
2005/0010446 A1 1/2005 Lash et al.
2005/0020903 A1 1/2005 Krishnan et al.
2005/0049497 A1 3/2005 Krishnan et al.
2005/0055251 A1 3/2005 Ashley
2005/0137932 A1 6/2005 D'Angelo et al.
2005/0182659 A1 8/2005 Huttin
2005/0256745 A1 11/2005 Dalton
2006/0089862 A1 4/2006 Anandarao
2006/0200407 A1 9/2006 Hartley
2007/0021986 A1 1/2007 Cheung
2007/0021988 A1 1/2007 Dang
2007/0118399 A1 5/2007 Avinash et al.
2007/0156455 A1 7/2007 Tarino
2007/0162308 A1 7/2007 Peters
2007/0238065 A1 10/2007 Sherwood et al.
2007/0271119 A1 11/2007 Boeger
2007/0276704 A1 11/2007 Naumann
2008/0010097 A1 1/2008 Williams et al.
2008/0033756 A1 2/2008 Peterson
2008/0103991 A1 5/2008 Moore et al.
2008/0109263 A1 5/2008 Clark
2008/0120143 A1 5/2008 Beauregard
2008/0154648 A1 6/2008 Babyak et al.
2008/0154759 A1 6/2008 Babyak et al.
2008/0183504 A1 7/2008 Highley
2008/0201172 A1 8/2008 McNamar
2008/0208640 A1 8/2008 Thomas
2008/0243547 A1 10/2008 Brett
2008/0275737 A1 11/2008 Gentry
2008/0288286 A1 11/2008 Noreen
2008/0306952 A1 12/2008 Lynn et al.
2009/0076841 A1 3/2009 Baker
2009/0112632 A1 4/2009 Belliveau
2009/0125348 A1 5/2009 Rastogi
2009/0248481 A1 * 10/2009 Dick ..................... G06Q 10/10 705/7.26
2010/0030579 A1 2/2010 Dhauvan
2010/0088112 A1 4/2010 Krasny
2010/0131284 A1 5/2010 Duffy
2010/0235295 A1 9/2010 Zides et al.

(56) References Cited

U.S. PATENT DOCUMENTS

2010/0241449 A1 9/2010 Firminger
2010/0268057 A1 10/2010 Firminger et al.
2010/0268108 A1 10/2010 Firminger
2010/0274577 A1 10/2010 Firminger
2010/0274578 A1 10/2010 Firminger
2010/0293002 A1 11/2010 Firminger
2010/0305962 A1 12/2010 Firminger
2011/0010190 A1 1/2011 Falchuk et al.
2011/0035231 A1 2/2011 Firminger
2011/0046985 A1 2/2011 Raheman
2011/0082712 A1* 4/2011 Eberhardt, III ......... G16Z 99/00 705/4
2011/0125520 A1 5/2011 Dhoble
2011/0153369 A1 6/2011 Feldman
2011/0161117 A1 6/2011 Busque
2011/0161118 A1 6/2011 Borden
2011/0166895 A1 7/2011 Kron
2011/0225114 A1 9/2011 Gotthardt
2011/0282690 A1 11/2011 Patel
2011/0288879 A1* 11/2011 Gice ...................... G06Q 10/10 705/2
2011/0301977 A1 12/2011 Belcher et al.
2012/0010898 A1 1/2012 Dust et al.
2012/0035975 A1 2/2012 Sugimoto
2012/0047105 A1 2/2012 Saigal
2012/0066662 A1 2/2012 Chao
2012/0129139 A1 5/2012 Partovi
2012/0239560 A1 9/2012 Pourfallah
2012/0259654 A1 10/2012 Vanderzee
2012/0284058 A1 11/2012 Varanasi
2012/0310679 A1 12/2012 Olson
2012/0330690 A1 12/2012 Goslinga
2013/0006672 A1 1/2013 Dang
2013/0007761 A1 1/2013 O'Sullivan et al.
2013/0030828 A1 1/2013 Pourfallah et al.
2013/0035956 A1 2/2013 Carmeli
2013/0090948 A1 4/2013 Upadhyayula et al.
2013/0124217 A1 5/2013 Thesman
2013/0166317 A1 6/2013 Beardall
2013/0185231 A1 7/2013 Baras
2013/0191157 A1 7/2013 Eiden
2013/0246086 A1 9/2013 Mun et al.
2014/0006066 A1 1/2014 Watts
2014/0052470 A1 2/2014 Ashford
2014/0058738 A1 2/2014 Yeskel
2014/0074518 A1 3/2014 Ilgenfritz
2014/0114674 A1 4/2014 Krughoff et al.
2014/0136241 A1 5/2014 Rakshit et al.
2014/0142964 A1 5/2014 Lang
2014/0172470 A1 6/2014 Watts
2014/0180714 A1 6/2014 Mun
2014/0180949 A1 6/2014 Ramasamy
2014/0249851 A1 9/2014 Christodouleas
2014/0297297 A1 10/2014 Head
2014/0304009 A1 10/2014 Saxon
2014/0372150 A1 12/2014 Karle
2015/0006192 A1 1/2015 Sudharsan et al.
2015/0006206 A1 1/2015 Mdeway
2015/0073943 A1 3/2015 Norris
2015/0088541 A1 3/2015 Yao
2015/0161622 A1 6/2015 Hoffmann
2015/0199493 A1 7/2015 Glenn
2015/0254754 A1 9/2015 Lang et al.
2015/0339602 A1 11/2015 Schlosser
2015/0356685 A1 12/2015 Lindbberg
2016/0042135 A1 2/2016 Hogan
2016/0071432 A1 3/2016 Kurowski et al.
2016/0092641 A1 3/2016 Delaney
2016/0125362 A1 5/2016 Dziuba
2016/0140295 A1 5/2016 Powell
2016/0196398 A1 7/2016 Vivero et al.
2016/0246941 A1 8/2016 Miller
2016/0292367 A1 10/2016 Thorpe
2016/0292371 A1 10/2016 Alhimiri
2016/0321316 A1 11/2016 Pennefather et al.
2016/0321412 A1 11/2016 Basri
2016/0350495 A1 12/2016 Pecora
2016/0358295 A1 12/2016 Heffley
2016/0371447 A1* 12/2016 Koman .................. G16H 70/20
2016/0378932 A1 12/2016 Sperling
2017/0070523 A1 3/2017 Bailey et al.
2017/0140393 A1 5/2017 Katz-Rogozhnikov
2017/0169173 A1 6/2017 Snow et al.
2017/0193173 A1 7/2017 Miller
2017/0235900 A1 8/2017 Messina et al.
2017/0262604 A1 9/2017 Francois
2017/0339184 A1 11/2017 Bailey et al.
2018/0047120 A1 2/2018 Mathis
2018/0121614 A1 5/2018 Connely et al.
2018/0121843 A1 5/2018 Connely et al.
2018/0157799 A1 6/2018 Ketterer et al.
2018/0166157 A1 6/2018 Firminger
2018/0182475 A1 6/2018 Cossler et al.
2018/0197636 A1 7/2018 Firminger
2018/0218456 A1 8/2018 Kolb et al.
2018/0260905 A1 9/2018 Andreae
2018/0301222 A1 10/2018 Dew
2019/0102670 A1 4/2019 Ceulemans et al.
2020/0077892 A1 3/2020 Tran
2020/0118691 A1 4/2020 Kiljanek
2020/0185074 A1 6/2020 Czerska
2020/0185100 A1 6/2020 Francois
2020/0251204 A1* 8/2020 Teodoro ................. G16H 10/60
2020/0303069 A1 9/2020 Mulligan et al.
2020/0335188 A1 10/2020 Ozeran
2021/0043310 A1 2/2021 Valuck
2021/0056639 A1 2/2021 Eberting
2021/0090694 A1 3/2021 Colley
2021/0118577 A1 4/2021 Bettencourt-Silva et al.
2021/0174963 A1 6/2021 Hill
2021/0201417 A1 7/2021 Neumann
2021/0304881 A1* 9/2021 White .................. G06K 7/1413
2021/0407672 A1 12/2021 Zumbrun
2021/0407682 A1 12/2021 Crossen
2022/0254466 A1 8/2022 Hwang et al.
2022/0277840 A1 9/2022 Lester et al.
2022/0319652 A1 10/2022 Ozeran
2023/0103143 A1 3/2023 Srinivasan et al.
2023/0133829 A1 5/2023 Kumar et al.
2023/0196471 A1 6/2023 Mendell et al.
2023/0268070 A1 8/2023 Nienstedt et al.
2024/0242802 A1 7/2024 Yazdavar et al.

FOREIGN PATENT DOCUMENTS

CA 3034235 A1 2/2018
CA 3076349 A1 * 3/2018 ......... G06F 3/04817
CA 2997585 C 2/2021
CN 1748217 A 3/2006
CN 1748218 A 3/2006
CN 1914617 A 2/2007
CN 104857422 B 10/2018
CN 110675956 A 1/2020
CN 115482921 A 12/2022
WO 97/01141 A1 1/1997
WO 00/60431 A1 10/2000
WO 01/33484 A2 5/2001
WO 2011123823 10/2011
WO 2013/052733 A1 4/2013
WO 2014130392 8/2014
WO 2015/054794 A1 4/2015
WO 2015191562 12/2015
WO 2018/034913 A1 2/2018

OTHER PUBLICATIONS

Adam Atherly. "The Effect of Medicare Supplemental Insurance on Medicare Expenditures". International Journal of Health Care Finance and Economics, 2, 137-162, 2002. (Year: 2002).

Mark V. Pauly, Patricia Danzon, Paul Feldstein, and John Hoff. "A Plan for 'Responsible National Health Insurance'" Health Affairs, pp. 5-25, Spring (1991). (Year: 1991).

(56) References Cited

OTHER PUBLICATIONS

Susan L. Ettner. "Adverse selection and the purchase of Medigap insurance by the elderly". Journal of Health Economics. vol. 16, Issue 5, Oct. 1997, pp. 543-562. https://doi.org/10.1016/S0167-6296(97)00011-8 (Year: 1997).
John H. Goddeeris and Andrew J. Hogan. "Improving Access to Health Care: What Can the States Do?" W.E. Upjohn Institute for Employment Research. (1992). ISBN 0-88099-117-8. (Year: 1992).
Dictionary.com. Definition of "Condition". Collins English Dictionary—Complete & Unabridged 2012 Digital Edition. Downloaded on Aug. 3, 2019. https://www.dictionary.com/browse/condition (Year: 2012).
D. C. Stahl, L. Rouse, D. Ko and J. C. Niland, "GDSI: a Web-based decision support system to facilitate the efficient and effective use of clinical practice guidelines," Proc. of 37th Annual Hawaii Int'l Conf, on System Sciences, 2004. pp. 10, doi: 10.1109/HICSS .2004.1265377. (Year: 2004).
V. Tresp, J. Marc Overhage, M. Bundschus, S. Rabizadeh, P. A. Fasching and S. Yu, "Going Digital: A Survey on Digitalization and Large-Scale Data Analytics in Healthcare," in Proc. of the IEEE, vol. 104, No. 11, pp. 2180-2206, Nov. 2016, doi: 10.1109/JPROC .2016.2615052. (Year: 2016).
Ongenae, Femke et al. "Towards computerizing intensive care sedation guidelines: design of a rule-based architecture for automated execution of clinical guidelines." BMC medical informatics and decision making vol. 10 3. Jan. 18, 2010, doi: 10.1186/1472-6947-10-3 (Year: 2010).
Ling et al. "Decision trees with minimal costs". ICML '04: Proceedings of the twenty-first international conference on Machine learning. Jul. 2004 https://doi.org/10.1145/1015330.1015369 (Year: 2004).
U.S. Appl. No. 15/631,961.
U.S. Appl. No. 15/632,052.
U.S. Appl. No. 16/659,429.
U.S. Appl. No. 16/659,438.
U.S. Appl. No. 16/659,444.
U.S. Appl. No. 17/862,333.
U.S. Appl. No. 17/862,351.
U.S. Appl. No. 17/862,368.
U.S. Appl. No. 17/862,385.
U.S. Appl. No. 17/862,392.
U.S. Appl. No. 62/446,810.
U.S. Appl. No. 62/510,215.
U.S. Appl. No. 62/524,188.
U.S. Appl. No. 62/748,518.
U.S. Appl. No. 62/807,711.
U.S. Appl. No. 63/220,986.
U.S. Appl. No. 63/220,988.
U.S. Appl. No. 63/220,991.
U.S. Appl. No. 63/220,992.
U.S. Appl. No. 63/220,993.
Desarkar et al. "Med-Tree: A User Knowledge Graph Framework for Medical Applications". 13th IEEE International Conference on BioInformatics and BioEngineering. Nov. 10-13, 2013. DOI: 10.1109/BIBE.2013.6701564 (Year:2013).
Dewilde et al. "Modified Rankin scale as a determinant of direct medical costs after stroke". International Journal of Stroke, 2017, vol. 12(4) 392-400. DOI: 10.1177/1747493017691984 journals.sagepub.com/home/wso (Year: 2017).
Dictionary.com. Definition of "Atomize". Collins English Dictionary—Complete & Unabridged 2012 Digital Edition. Downloaded on Aug. 3, 2019. https://www.dictionary.com/browse/atomize (Year: 2012).
Final Rejection Mailed on Apr. 4, 2022 for U.S. Appl. No. 16/659,438, 25 page(s).
Final Rejection Mailed on Apr. 5, 2023 for U.S. Appl. No. 15/632,052, 22 page(s).
Final Rejection Mailed on Apr. 10, 2020 for U.S. Appl. No. 15/632,052, 19 page(s).
Final Rejection Mailed on Aug. 20, 2024 for U.S. Appl. No. 15/632,052, 24 page(s).
Final Rejection Mailed on Aug. 22, 2024 for U.S. Appl. No. 17/862,392, 10 page(s).
Final Rejection Mailed on Feb. 1, 2021 for U.S. Appl. No. 16/659,444, 27 page(s).
Final Rejection Mailed on Jan. 4, 2022 for U.S. Appl. No. 15/631,961, 12 page(s).
Final Rejection Mailed on May 20, 2020 for U.S. Appl. No. 15/631,961, 21 page(s).
Final Rejection Mailed on Nov. 17, 2021 for U.S. Appl. No. 15/632,052, 22 page(s).
Final Rejection Mailed on Oct. 19, 2022 for U.S. Appl. No. 16/659,444, 26 page(s).
Final Rejection Mailed on Sep. 7, 2023 for U.S. Appl. No. 16/659,438, 21 page(s).
Geamsakul et al. "Analysis of Hepatitis Dataset by Decision Tree Based on Graph-Based Induction". Annual Conference of the Japanese Society for Artificial Intelligence. JSAI 2004: New Frontiers in Artificial Intelligence, pp. 5-28. https://link.springer.com/chapter/10.1007/978-3-540-71009-7_2 (Year: 2004).
Geamsakul et al. "Constructing a Decision Tree for Graph-Structured Data and its Applications". Fundamenta Informaticae 66 (2005) 131-160 131. IOS Press. https://www.researchgate.net/publication/234785949_Constructing_a_Decision_Tree_for_Graph-Structured_Data_and_its_Applications (Year: 2005).
Google Patents English Language Translation of CN 104857422 B. https://patents.google.com/patent/CN104857422B/en?oq=CN+104857422+B (Year: 2024).
Google Patents English Language Translation of CN 110675956 A. https://patents.google.com/patent/CN110675956A/en?oq=CN+110675956+A (Year: 2024).
Google Patents English language translation of CN-1748217-A. https://patents.google.com/patent/CN1748217A/en?oq=CN-1748217-A (Year: 2024).
Google Patents English language translation of CN-1748218-A. https://patents.google.com/patent/CN1748218A/en?oq=CN-1748218-A (Year: 2024).
Google Patents English language translation of CN-1914617-A. https://patents.google.com/patent/CN1914617A/en?oq=CN-1914617-A (Year: 2024).
Hazen et al. "Stochastic-Tree Models in Medical Decision Making". Interfaces 28: Jul. 4-Aug. 1998 (pp. 64-80). https://www.researchgate.net/publication/228391060_Stochastic-Tree_Models_in_Medical_Decision_Making (Year: 1998).
Mar et al. "Outcomes measured by mortality rates, quality of life and degree of autonomy in the first year in stroke units in Spain". Health and Quality of Life Outcomes (2015) 13:36 DOI 10.1186/s12955-015-0230-8 (Year: 2015).
Non-Final Rejection Mailed on Aug. 2, 2021 for U.S. Appl. No. 16/659,429, 21 page(s).
Non-Final Rejection Mailed on Aug. 7, 2019 for U.S. Appl. No. 15/632,052, 24 page(s).
Non-Final Rejection Mailed on Aug. 22, 2022 for U.S. Appl. No. 15/632,052, 20 page(s).
Non-Final Rejection Mailed on Aug. 27, 2024 for U.S. Appl. No. 17/862,351, 18 page(s).
Non-Final Rejection Mailed on Feb. 10, 2021 for U.S. Appl. No. 15/632,052, 20 page(s).
Non-Final Rejection Mailed on Feb. 29, 2024 for U.S. Appl. No. 17/862,368, 11 page(s).
Non-Final Rejection Mailed on Feb. 29, 2024 for U.S. Appl. No. 17/862,385, 10 page(s).
Non-Final Rejection Mailed on Jan. 16, 2024 for U.S. Appl. No. 16/659,444, 29 page(s).
Non-Final Rejection Mailed on Jan. 24, 2023 for U.S. Appl. No. 16/659,438, 22 page(s).
Non-Final Rejection Mailed on Jul. 30, 2024 for U.S. Appl. No. 16/659,438, 25 page(s).
Non-Final Rejection Mailed on Jun. 2, 2020 for U.S. Appl. No. 16/659,444, 24 page(s).
Non-Final Rejection Mailed on Jun. 8, 2023 for U.S. Appl. No. 16/659,444, 29 page(s).
Non-Final Rejection Mailed on Jun. 21, 2021 for U.S. Appl. No. 16/659,438, 22 page(s).

(56) References Cited

OTHER PUBLICATIONS

Non-Final Rejection Mailed on Mar. 3, 2022 for U.S. Appl. No. 16/659,444, 27 page(s).
Non-Final Rejection Mailed on Mar. 18, 2021 for U.S. Appl. No. 15/631,961, 27 page(s).
Non-Final Rejection Mailed on Nov. 2, 2023 for U.S. Appl. No. 15/632,052, 23 page(s).
Non-Final Rejection Mailed on Nov. 8, 2023 for U.S. Appl. No. 17/862,351, 17 page(s).
Non-Final Rejection Mailed on Oct. 6, 2023 for U.S. Appl. No. 17/862,392, 15 page(s).
Non-Final Rejection Mailed on Sep. 3, 2019 for U.S. Appl. No. 15/631,961, 19 page(s).
Notice of Allowance and Fees Due (PTOL-85) Mailed on Dec. 2, 2022 for U.S. Appl. No. 15/631,961, 9 page (s).
Notice of Allowance and Fees Due (PTOL-85) Mailed on Feb. 1, 2023 for U.S. Appl. No. 16/659,429, 14 page (s).
Notice of Allowance and Fees Due (PTOL-85) Mailed on Jun. 7, 2022 for U.S. Appl. No. 16/659,429, 14 page (s).
Notice of Allowance and Fees Due (PTOL-85) Mailed on Jun. 23, 2022 for U.S. Appl. No. 16/659,429, 10 page(s).
Peter Diamond. "Organizing the Health Insurance Market". Econometrica, vol. 60, No. 6. (Nov. 1992), pp. 1233-1254. http://links.jstor.org/sici?sici=0012-9682%28199211%2960%3A6%3C1233%3AOTHIM%3E2.0.CO%3B2-5 (Year: 1992).
Szolovits. "Uncertainty and Decisions in Medical Informatics". Article in Methods of Information in Medicine. Jan. 2001. DOI: 10.1055/S-0038-1634594 https://www.researchgate.net/publication/2453682 (Year: 2001).
Final Rejection Mailed on Sep. 9, 2024 for U.S. Appl. No. 17/862,385, 11 page(s).
Final Rejection Mailed on Sep. 10, 2024 for U.S. Appl. No. 17/862,368, 10 page(s).
Google Patents English language translation of CN-115482921-A. https://patents.google.com/patent/CN115482921A/en?oq=CN+115482921+A (Year: 2024).
Final Rejection Mailed on Oct. 21, 2024 for U.S. Appl. No. 16/659,444, 24 page(s).
Advisory Action (PTOL-303) Mailed on Jan. 8, 2025 for U.S. Appl. No. 16/659,444, 2 page(s).
Final Rejection Mailed on Jan. 13, 2025 for U.S. Appl. No. 16/659,438, 8 page(s).
Final Rejection Mailed on Jan. 15, 2025 for U.S. Appl. No. 17/862,351, 11 page(s).

* cited by examiner

| | Core | Core + Add-Ins |
|---|---|---|
| Preventive | Free | Free |
| Virtual Office Visit | Free | Free |
| Primary Care Visit | $45 | $20 |
| Specialty Visit | $95 | $45 |
| Urgent Care | $200 | $100 |
| Emergency Room | $500 | $500 |
| Hospital | $3000 | $3000 |
| Prescription Drugs (Gen./Brand Pref./Brand NP/Specialty) | $8/30/50/350 | $5/15/25/175 |

FIG. 10

UDRCD UF COMPONENT

Knee Replacement Surgery Upgrade
Hospital A
$750 now
$250 Payroll deduction for 12 months Provider Control Panel 2501

Provider Group A's Current Performance

| 2502 | 2511 Total Episodic Cost 2520 Low | 2512 Market | 2513 High | Provider 2531 Average Allowed | Util. Factor | 2532 Price Factor | Member Add-in Cost 2540 Copay + Paycheck |
|---|---|---|---|---|---|---|---|
| Ankle Surgery | $11,781 | | $35,342 | $27,143 | 1.20 | 0.96 | $3,500 + $200 for 24 pay periods |
| Back Surgery | $34,513 | | $103,540 | $56,823 | 0.84 | 0.98 | $3,500 + $300 for 26 pay periods |
| Back, Radio Frequency Ablation | $1,250 | | $3,750 | $2,235 | 1.09 | 0.82 | $700 + N/A |
| Back, Spinal Injections For Pain | $174 | | $522 | $450 | 1.22 | 1.06 | $200 + N/A |
| Bariatric Surgery/Weight Loss Surgery | $14,240 | | $42,721 | $21,435 | 1.06 | 0.71 | $3,500 + $100 for 26 pay periods |
| Benign Prostatic Hyperplasia Surgery | $1,037 | | $3,110 | $2,576 | 1.14 | 1.09 | $600 + $50 for 4 pay periods |
| Breast Reduction | $293 | | $880 | $491 | 0.94 | 0.89 | $200 + N/A |
| Bunionectomy | $7,465 | | $22,396 | $9,317 | 0.80 | 0.78 | $2,600 + $50 for 4 pay periods |
| Carotid Endarterectomy | $4,724 | | $14,173 | $10,522 | 0.87 | 1.28 | $3,000 + $50 for 4 pay periods |
| Carpal Tunnel Procedure | $3,829 | | $8,423 | $6,540 | 1.05 | 0.96 | $2,200 + $50 for 3 pay periods |
| Colonoscopy (Except Colorecteral Cancer Screening) | $1,376 | | $4,127 | $2,496 | 1.12 | 0.81 | $600 + $50 for 3 pay periods |
| Coronary Angioplasty with our without Stents | $16,135 | | $48,406 | $20,088 | 0.75 | 0.83 | $3,500 + $100 for 26 pay periods |
| Coronary Artery Bypass Surgery | $43,010 | | $129,031 | $51,303 | 0.71 | 0.84 | $3,500 + $300 for 26 pay periods |
| Endometrial Ablation | $3,476 | | $10,427 | $7,319 | 0.94 | 1.12 | $2,000 + $50 for 4 pay periods |
| Functional Nasal Procedure/Sinus Surgery/Septoplasty | $13,927 | | $41,782 | $14,640 | 0.73 | 0.72 | $3,500 + $50 for 18 pay periods |
| Gallbladder Removal (Cholecystectomy) | $8,765 | | $26,294 | $15,997 | 1.17 | 0.78 | $3,500 + $50 for 26 pay periods |
| Ganglion Cyst Surgery | $375 | | $1,125 | $725 | 0.84 | 1.15 | $300 + N/A |
| Hammertoe Surgery | $6,645 | | $19,934 | $9,688 | 0.81 | 0.90 | $2,800 + $50 for 3 pay periods |
| Hernia Repairs | $6,627 | | $19,880 | $12,977 | 0.96 | 1.02 | $3,500 + $50 for 8 pay periods |
| Hip Arthroscopy | $14,545 | | $43,635 | $30,021 | 0.86 | 1.20 | $3,500 + $200 for 26 pay periods |
| Hip Replacement | $18,610 | | $55,830 | $27,870 | 0.72 | 1.04 | $3,500 + $200 for 25 pay periods |
| Hip Resurfacing | $1,144 | | $3,432 | $2,907 | 1.05 | 1.21 | $3,500 + $50 for 9 pay periods |
| Hysterectomy (Except in Cases of Cancer) | $10,963 | | $32,888 | $27,856 | 1.21 | 0.94 | $3,500 + $300 for 26 pay periods |
| Knee Surgery (Arthroscopic) | $7,145 | | $21,434 | $13,029 | 0.94 | 0.97 | $300 + N/A |
| Knee Surgery (Open)/ Knee Replacement | $19,319 | | $57,957 | $40,786 | 0.91 | 1.16 | $300 + N/A |
| Morton's Neuroma | $292 | | $876 | $898 | 1.25 | 1.23 | $3,500 + $150 for 26 pay periods |
| Myringotomy/Tympanostomy (Ear Tubes) | $716 | | $2,149 | $774 | 0.72 | 0.75 | $1,000 + $50 for 3 pay periods |
| Nissan Fundoplication (Reflux Surgery) | $11,997 | | $35,995 | $26,332 | 0.93 | 1.18 | $3,500 + $50 for 26 pay periods |
| Plantar Fasciitis Surgery | $3,425 | | $10,275 | $3,696 | 0.76 | 0.71 | $2,000 + $50 for 4 pay periods |
| Tonsillectomy/Adenoidectomy | $8,015 | | $24,044 | $17,262 | 1.21 | 0.89 | $2,600 + $50 for 4 pay periods |
| Tubal Ligation | $3,560 | | $10,679 | $7,176 | 0.90 | 1.12 | $3,500 + $50 for 6 pay periods |
| Upper Q Endoscopy | $4,730 | | $14,191 | $9,177 | 0.97 | 1.00 | $300 + N/A |
| Urinary Incontinence Treatment | $7,549 | | $22,647 | $12,649 | 1.18 | 0.71 | $300 + N/A |
| Varicose Vein Stripping | $525 | | $1,576 | $969 | 0.94 | 0.98 | |
| Vasectomy | $395 | | $1,185 | $877 | 1.00 | 1.11 | |

FIG. 25

Anchor Procedures

| Anchor Codes | |
|---|---|
| Proc Code | Description |
| 64721 | Neuroplasty &/transpos Median Nrvcarpal Tunne |
| 29848 | Ndsc Wrst Surgwrls Transvrs Carpl Ligm |
| Total Anchor Cost | |

| Anesthesiology | |
|---|---|
| Proc Code | Description |
| 01810 | Anes Nerve Muscle Tdnfascia&bursaforearm Wrist |
| 370 | Anesthesia General |
| 01830 | Anes Arths/endscpystl Radiusulna/wrist/hand |
| All Other | |
| Total Anesthesiology Cost | |

| Facility | |
|---|---|
| Rev Code | Description |
| 360 | Or Services, General |
| 490 | Ambulat Orysurgery, General |
| 250 | Pharmacy, General |
| 710 | Recoveryroom, General |
| 370 | Anesthesia General |
| 272 | Med/surg Supply/device Sterile |
| 636 | Pharmacy, Detail Coding Drugs |
| 270 | Med/surg Supply/device General |
| 258 | Pharmacy, Iv Solutions |
| 271 | Med/surg Supply/device, Nonsterile |
| 300 | Lab, General |
| 301 | Lab, Chemistry |
| 278 | Med/surg Supply/device, Otherimplants |
| 259 | Pharmacy, Other |
| All Other | |
| Total Facility Cost | |

| Other Procedure Codes | |
|---|---|
| Proc Code | Description |
| 64718 | Neuroplasty&/transposition Ulnar Nerve Elbow |
| 26055 | Tendon Sheath Incision |
| 29848 | Nsdc Wrst Surgwrls Transvrs Carp Ligm |
| 64415 | Single Nerve Block Injection Arm Nerve |
| 88304 | Level Iii Surg Pathology Gross&microsccopic Exam |
| 64721 | Neuroplasty &/transpos Medi An Nrvcarpal Tunne |
| 25447 | Arthrpinterpositercarpal/met Acarpal Joints |
| 25115 | Rad Exc Bursa Synva Wrst/f/arm Tdn Sht Hs Flxrs |
| 25609 | Optx Dstl Radl I-artic Fx/epi Physl Sep 3 Frag |
| 25000 | Incision Extension Tendon Sheath Wrist |
| 64417 | Injection Anesthetic Agent Axillary Nerve |
| 88305 | Level Iv Surg Pathology Gross &microscopic Exam |
| 25111 | Excision Ganglion Wrist Dorsal/volar Primary |
| 20526 | I Njection Therapeutic Carpal Tunnel |
| 64450 | Injection Anes Other Peripheral Nerve/branch |
| 20605 | Arthrocentesis Aspir &/inj Interm Jt/bus W/ous |
| All Other | |
| Total Other Procedure Cost | |

| Total Anchor Cost |
|---|

| Standard | Provider Group A Current | | | Change To Current | | |
|---|---|---|---|---|---|---|
| Frequency | Frequency | Allowed Amount | Expected Cost | Change | Allowed Amount | Expected Cost |
| 0.77 | 0.65 | 790.02 | 513.51 | 0% | 790.02 | 513.51 |
| 0.23 | 0.35 | 948.28 | 331.90 | 0% | 948.28 | 331.90 |
| | | | 845.41 | | | 845.41 |

| Standard | Provider Group A Current | | | Change To Current | | |
|---|---|---|---|---|---|---|
| Frequency | Frequency | Allowed Amount | Expected Cost | Change | Allowed Amount | Expected Cost |
| 1.21 | 1.27 | 990.00 | 1,256.82 | 0% | 990.00 | 1,256.82 |
| 0.23 | 0.24 | 932.81 | 222.48 | 0% | 932.81 | 222.48 |
| 0.05 | 0.06 | 990.00 | 55.91 | 0% | 990.00 | 55.91 |
| | | | 43.89 | | | 43.89 |
| | | | 1,579.11 | | | 1,579.11 |

| Standard | Provider Group A Current | | | Change To Current | | |
|---|---|---|---|---|---|---|
| Frequency | Frequency | Allowed Amount | Expected Cost | Change | Allowed Amount | Expected Cost |
| 0.42 | 0.44 | 3,406.93 | 1,502.46 | 0% | 3,406.93 | 1,502.46 |
| 0.36 | 0.38 | 1,382.94 | 522.75 | 0% | 1,382.94 | 522.75 |
| 0.22 | 0.24 | 34.16 | 8.04 | 0% | 34.16 | 8.04 |
| 0.20 | 0.21 | 933.86 | 198.06 | 0% | 933.86 | 198.06 |
| 0.20 | 0.21 | 932.81 | 192.53 | 0% | 932.81 | 192.53 |
| 0.17 | 0.18 | 129.74 | 23.25 | 0% | 129.74 | 23.25 |
| 0.16 | 0.17 | 36.85 | 6.18 | 0% | 36.85 | 6.18 |
| 0.10 | 0.10 | 67.70 | 6.80 | 0% | 67.70 | 6.80 |
| 0.08 | 0.09 | 68.31 | 5.87 | 0% | 68.31 | 5.87 |
| 0.03 | 0.03 | 58.41 | 1.79 | 0% | 58.41 | 1.79 |
| 0.02 | 0.03 | 43.33 | 1.14 | 0% | 43.33 | 1.14 |
| 0.02 | 0.03 | 70.81 | 1.79 | 0% | 70.81 | 1.79 |
| 0.02 | 0.02 | 911.07 | 19.87 | 0% | 911.07 | 19.87 |
| 0.02 | 0.02 | 14.04 | 0.26 | 0% | 14.04 | 0.26 |
| | | | 342.32 | | | 342.32 |
| | | | 2,833.12 | | | 2,833.12 |

| Standard | Provider Group A Current | | | Change To Current | | |
|---|---|---|---|---|---|---|
| Frequency | Frequency | Allowed Amount | Expected Cost | Change | Allowed Amount | Expected Cost |
| 0.19 | 0.20 | 1,096.85 | 218.82 | 0% | 1,096.85 | 218.82 |
| 0.12 | 0.13 | 572.33 | 72.11 | 0% | 572.33 | 72.11 |
| 0.05 | 0.05 | 948.28 | 48.26 | 0% | 948.28 | 48.26 |
| 0.03 | 0.03 | 120.15 | 3.61 | 0% | 120.15 | 3.61 |
| 0.02 | 0.03 | 74.93 | 1.97 | 0% | 74.93 | 1.97 |
| 0.17 | 0.18 | 90.02 | 139.58 | 0% | 790.02 | 139.58 |
| 0.06 | 0.06 | 1,535.46 | 96.73 | 0% | 1,535.46 | 96.73 |
| 0.02 | 0.02 | 1,406.27 | 23.56 | 0% | 1,406.27 | 23.56 |
| 0.13 | 0.14 | 1,943.07 | 265.23 | 0% | 1,943.07 | 265.23 |
| 0.01 | 0.01 | 620.77 | 9.22 | 0% | 620.77 | 9.22 |
| 0.01 | 0.01 | 129.84 | 1.81 | 0% | 129.84 | 1.81 |
| 0.01 | 0.01 | 125.32 | 1.66 | 0% | 125.32 | 1.66 |
| 0.01 | 0.01 | 591.70 | 7.67 | 0% | 591.70 | 7.67 |
| 0.01 | 0.01 | 107.23 | 1.29 | 0% | 107.23 | 1.29 |
| 0.01 | 0.01 | 83.98 | 0.98 | 0% | 83.98 | 0.98 |
| 0.01 | 0.01 | 69.12 | 0.72 | 0% | 69.12 | 0.72 |
| | | | 167.87 | | | 167.87 |
| | | | 1,061.09 | | | 1,061.09 |

| | | | | | | |
|---|---|---|---|---|---|---|
| | | | 6,318.73 | | | 6,318.73 |

FIG. 27A

Pre-Anchor: All Procedures and Revenue Codes With Frequency > 1%

| | | Standard | Provider Group A Current | | | Change to Current | | |
|---|---|---|---|---|---|---|---|---|
| Proc Code | Description | Frequency | Frequency | Allowed Amount | Expected Cost | Change | Allowed Amount | Expected Cost |
| 99213 | Office outpatient visit 15 minutes | 0.15 | 0.16 | 93.02 | 14.61 | 0% | 93.02 | 14.61 |
| 97110 | Therapeutic px 1/> areaseach 15 min exercises | 0.14 | 0.14 | 59.43 | 8.57 | 0% | 59.43 | 8.57 |
| 99214 | Office outpatient visit 25 minutes | 0.13 | 0.14 | 143.40 | 19.49 | 0% | 143.40 | 19.49 |
| 97140 | Manual therapytqs 1/> regions each 15 minutes | 0.09 | 0.10 | 54.91 | 5.29 | 0% | 54.91 | 5.29 |
| 99203 | Office outpatient new30 minutes | 0.06 | 0.06 | 140.17 | 8.99 | 0% | 140.17 | 8.99 |
| 97014 | Appl modality 1/> areas elec stimj unattended | 0.06 | 0.06 | 29.07 | 1.73 | 0% | 29.07 | 1.73 |
| 97012 | Appl modality 1/> aeras traction mechanical | 0.04 | 0.04 | 29.71 | 1.30 | 0% | 29.71 | 1.30 |
| 99243 | Office consultation new/estab patient 40 min | 0.03 | 0.04 | 174.41 | 6.39 | 0% | 174.41 | 6.39 |
| 97035 | Appl modality 1/> areas ultrasound ea 15 min | 0.03 | 0.04 | 23.25 | 0.85 | 0% | 23.25 | 0.85 |
| 97032 | Appl modality 1/> areas elec stimj ea 15 min | 0.02 | 0.03 | 34.88 | 0.89 | 0% | 34.88 | 0.89 |
| 99212 | Office outpatient visit 10 minutes | 0.02 | 0.02 | 46.51 | 1.12 | 0% | 46.51 | 1.12 |
| 99204 | Office outpatient new45 minutes | 0.02 | 0.02 | 237.07 | 5.10 | 0% | 237.07 | 5.10 |
| 97010 | Application modality1/>areashot/cold packs | 0.02 | 0.02 | 10.98 | 0.24 | 0% | 10.98 | 0.24 |
| 99215 | Office outpatient visit 40 minutes | 0.02 | 0.02 | 202.83 | 4.17 | 0% | 202.83 | 4.17 |
| 99244 | Office consultation new/estab patient 60 min | 0.02 | 0.02 | 280.35 | 5.49 | 0% | 280.35 | 5.49 |
| 97530 | Therapeut activity direct pt contact act each 15 min | 0.02 | 0.02 | 63.95 | 1.23 | 0% | 63.95 | 1.23 |
| All Other | | | | | 27.33 | | | 27.33 |
| Total Pre-Anchor Cost | | | | | 112.79 | | | 112.79 |

Post-anchor: procedures and revenue codes with frequency > 1%

| | | Standard | Provider Group A Current | | | Change to Current | | |
|---|---|---|---|---|---|---|---|---|
| Proc Code | Description | Frequency | Frequency | Allowed Amount | Expected Cost | Change | Allowed Amount | Expected Cost |
| 97110 | Therapeutic px 1/> areas each 15 min exercises | 0.43 | 0.45 | 59.43 | 26.52 | 0% | 59.43 | 26.52 |
| 97140 | Manual therapy tqs 1/> regions each 15 minutes | 0.28 | 0.29 | 54.91 | 16.00 | 0% | 54.91 | 16.00 |
| 97035 | Appl modality 1/> areas ultrasound ea 15 min | 0.12 | 0.13 | 23.25 | 2.95 | 0% | 23.25 | 2.95 |
| 99213 | Office outpatient visit 15 minutes | 0.08 | 0.08 | 93.02 | 7.85 | 0% | 93.02 | 7.85 |
| 97014 | Appl modality 1/> areas elec stimj unattended | 0.08 | 0.08 | 29.07 | 2.41 | 0% | 29.07 | 2.41 |
| 97530 | Therapeut activity direct pt cont act each 15 min | 0.07 | 0.07 | 63.95 | 4.57 | 0% | 63.95 | 4.57 |
| 97022 | Application modality 1/> areas whirlpool | 0.06 | 0.07 | 43.28 | 2.85 | 0% | 43.28 | 2.85 |
| 97012 | Appl modality 1/> areas traction mechanical | 0.06 | 0.06 | 29.71 | 1.93 | 0% | 29.71 | 1.93 |
| 97112 | Ther px 1/> areas each 15 min neuromusc reeduca | 0.05 | 0.06 | 62.01 | 3.45 | 0% | 62.01 | 3.45 |
| 99214 | Office outpatient visit 25 minutes | 0.04 | 0.04 | 143.40 | 5.35 | 0% | 143.40 | 5.35 |
| 97032 | Appl modality 1/> areas elec stimj ea 15 min | 0.03 | 0.04 | 34.88 | 1.22 | 0% | 34.88 | 1.22 |
| 97003 | Occupational therapyevaluation | 0.03 | 0.03 | - | - | 0% | - | - |
| 97001 | Physical therapyevaluation | 0.02 | 0.02 | - | - | 0% | - | - |
| 97010 | Application modality 1/> areashot/cold packs | 0.02 | 0.02 | 10.98 | 0.27 | 0% | 10.98 | 0.27 |
| 97124 | Ther px 1/> areas each 15 minutes massage | 0.02 | 0.02 | 47.80 | 0.80 | 0% | 47.80 | 0.80 |
| All Other | | | | | 32.14 | | | 32.14 |
| Total Post-Anchor Cost | | | | | 108.30 | | 2740 | 108.30 |
| Total | | | | | 6,539.82 | | | 6,539.82 |
| Utilization Factor | | | | | 1.05 | | | 1.05 |
| Price Factor | | | | | 0.96 | | | 0.96 |

FIG. 27B

UDRCD ATOMIZED COVERAGE GRAPH

UDRCD ACGG COMPONENT

FIG. 40
4001
Carrier
9:41AM
42%
Back
Step 2 of 2
Review and Complete Purchase
Add-In coverage for Knee Arthroscopy
Minnesota Orthopaedic Surgery Center
Coverage Includes:
•Pre-surgery anesthesia
•Knee Arthroscopy outpatient surgery
Package copay $0
Payroll deduction $50 for 16 pay periods $800
Total Cost $800
NOTE: Payments begin immediately after purchase.
I understand that purchase of this Add-In coverage is final and that payroll deductions will begin with my next payroll period.
Search
ID Card
Notifications
Menu
4010
Carrier
9:41AM
42%
Back
Add-In Purchased
Confirmation
Your confirmation number is 123456
Your Add-In coverage purchase for Knee Arthroscopy is complete
A separate confirmation is sent to you via email.
Purchase Summary
Knee Arthroscopy Add-In coverage
Minnesota Orthopaedic Surgery Center
Coverage Includes:
•Pre-surgery anesthesia
•Knee Arthroscopy outpatient surgery
ADD-IN COVERAGE DETAILS
What can you do next
Schedule your treatment with your
Search
ID Card
Notifications
Menu

FIGURE 71A: UDRCD IMPLEMENTATION CASE
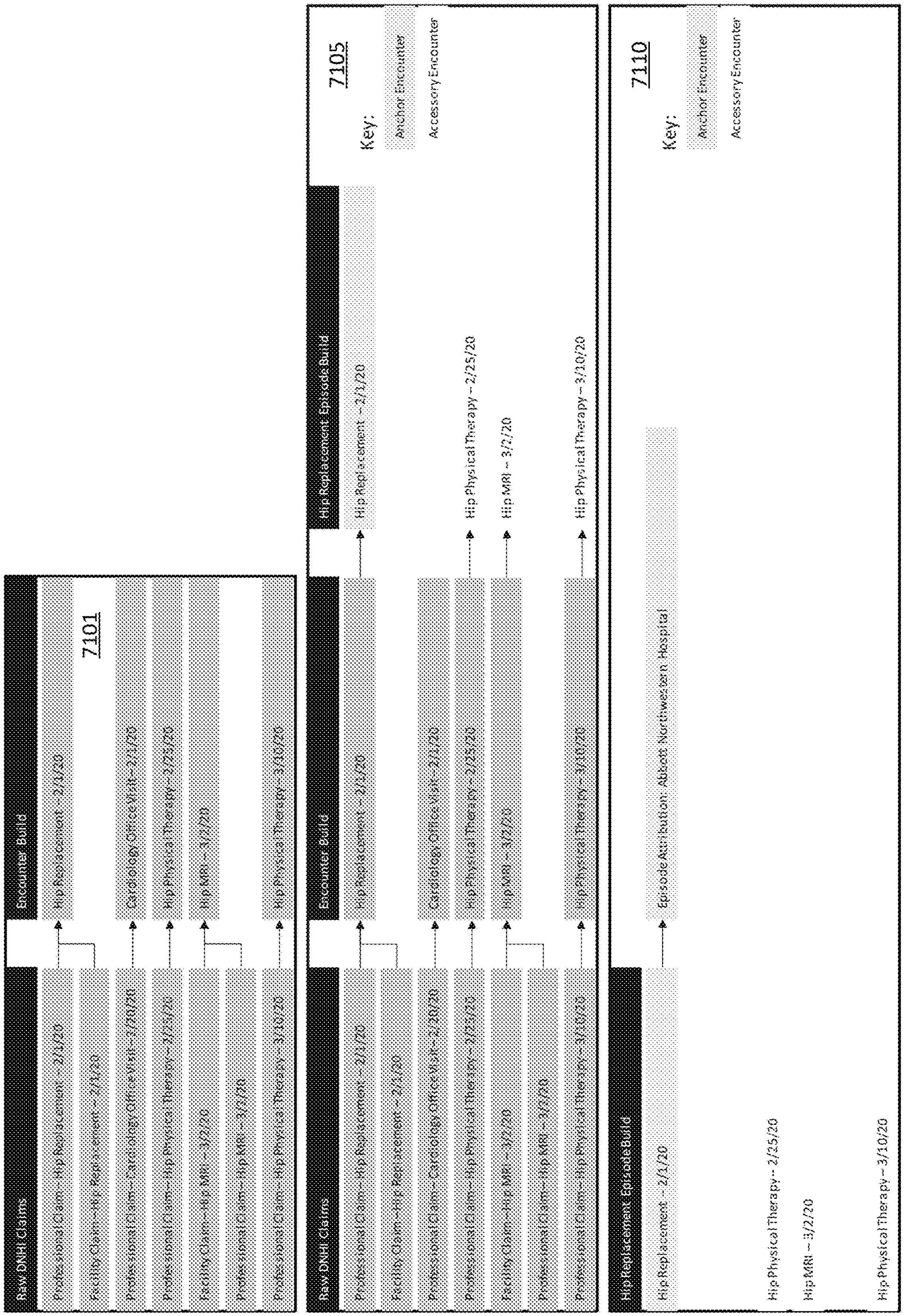

FIGURE 71B: UDRCD IMPLEMENTATION CASE
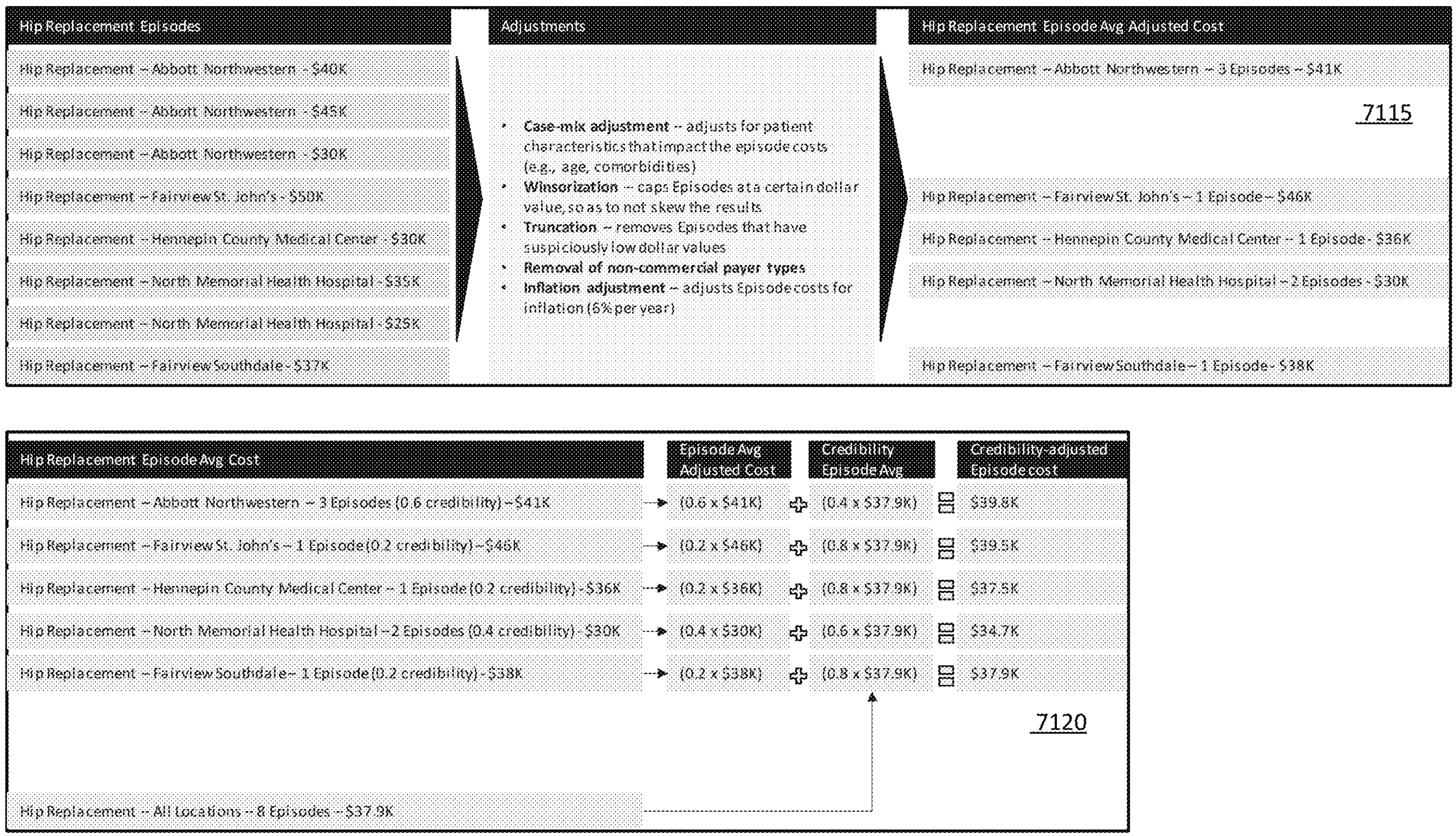

FIGURE 71 C: UDRCD IMPLEMENTATION CASE

| Hip Replacement Episode Avg Cost | Actual Episode Avg | Credibility Episode Avg | Credibility-adjusted Episode cost |
|---|---|---|---|
| Hip Replacement – Abbott Northwestern – 3 Episodes (0.6 credibility) – $41K | (0.6 x $41K) | (0.4 x $37.9K) | $39.8K |
| Hip Replacement – Fairview St. John's – 1 Episode (0.2 credibility) – $46K | (0.2 x $46K) | (0.8 x $37.9K) | $39.5K |
| Hip Replacement – Hennepin County Medical Center – 1 Episode (0.2 credibility) - $36K | (0.2 x $36K) | (0.8 x $37.9K) | $37.5K |
| Hip Replacement – North Memorial Health Hospital – 2 Episodes (0.4 credibility) - $30K | (0.4 x $36K) | (0.6 x $37.9K) | $34.7K |
| Hip Replacement – Fairview Southdale – 1 Episode (0.2 credibility) - $38K | (0.2 x $38K) | (0.8 x $37.9K) | $37.9K |
| Hip Replacement – Fairview Ridges – 0 Episodes | (0.4 x $42K) | (0.6 x $37.9K) | $39.5K |
| Hip Replacement – Joe's ASC – 0 Episodes | N/A | (1.0 x $37.9K) | $37.9K |
| Hip Replacement – All Locations – 8 Episodes – $37.9K | | | |

71 25

| Hip Replacement Episode Avg Cost | Credibility-adjusted Episode cost | Price Factor |
|---|---|---|
| Hip Replacement – Abbott Northwestern | $39.8K | 1.05 |
| Hip Replacement – Fairview St. John's | $39.5K | 1.04 |
| Hip Replacement – Hennepin County Medical Center | $37.5K | 0.99 |
| Hip Replacement – North Memorial Health Hospital | $34.7K | 0.92 |
| Hip Replacement – Fairview Southdale | $37.9K | 1.00 |
| Hip Replacement – Fairview Ridges | $39.5K | 1.04 |
| Hip Replacement – Joe's ASC | $37.9K | 1.00 |
| Hip Replacement – All Locations – 8 Episodes – $37.9K | | |

71 30

FIGURE 71 D: UDRCD IMPLEMENTATION CASE

7135

| Hip Replacement Episode Avg Cost | Price Factor | Rank |
|---|---|---|
| Hip Replacement – Abbott Northwestern | 1.05 | 100 |
| Hip Replacement – Fairview St. John's | 1.04 | 75 |
| Hip Replacement – Hennepin County Medical Center | 0.99 | 25 |
| Hip Replacement – North Memorial Health Hospital | 0.92 | 0 |
| Hip Replacement – Fairview Southdale | 1.00 | 50 |
| Hip Replacement – Fairview Ridges | 1.04 | 75 |
| Hip Replacement – Joe's ASC | 1.00 | 50 |

7140

| Hip Replacement Episode Avg Cost | Rank | Client Member Price Specifications | Member Price |
|---|---|---|---|
| Hip Replacement – Abbott Northwestern | 100 | • Hip Replacement member price range (e.g., $3.5K to $7.5K)<br>• Hip Replacement slope and beta | $7.5K |
| Hip Replacement – Fairview St. John's | 75 | | $6.5K |
| Hip Replacement – Hennepin County Medical Center | 25 | | $4.5K |
| Hip Replacement – North Memorial Health Hospital | 0 | | $3.5K |
| Hip Replacement – Fairview Southdale | 50 | | $5.5K |
| Hip Replacement – Fairview Ridges | 75 | | $6.5K |
| Hip Replacement – Joe's ASC | 50 | | $5.5K |

FIGURE 72A: UDRCD ARCHITECTURE
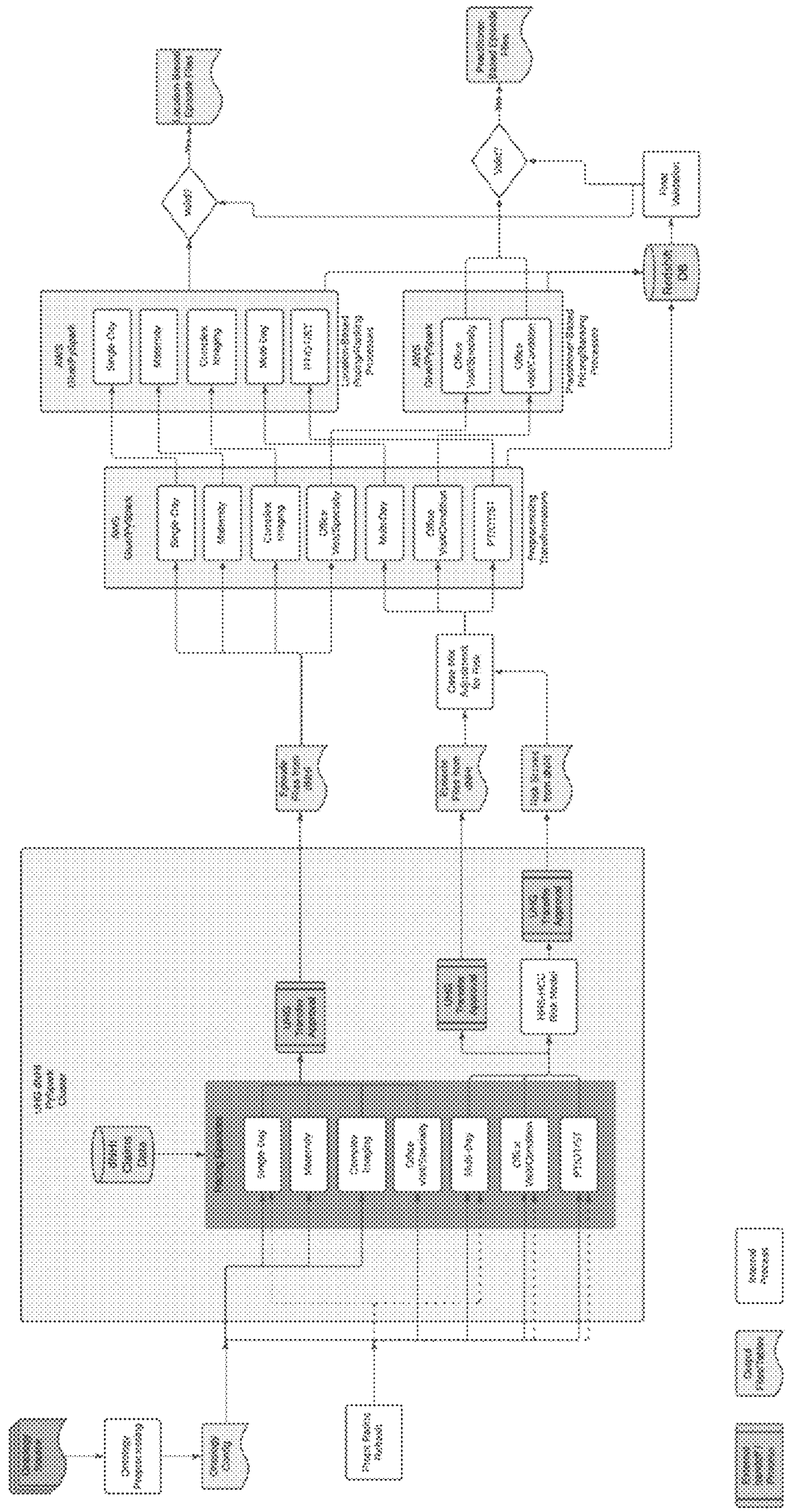

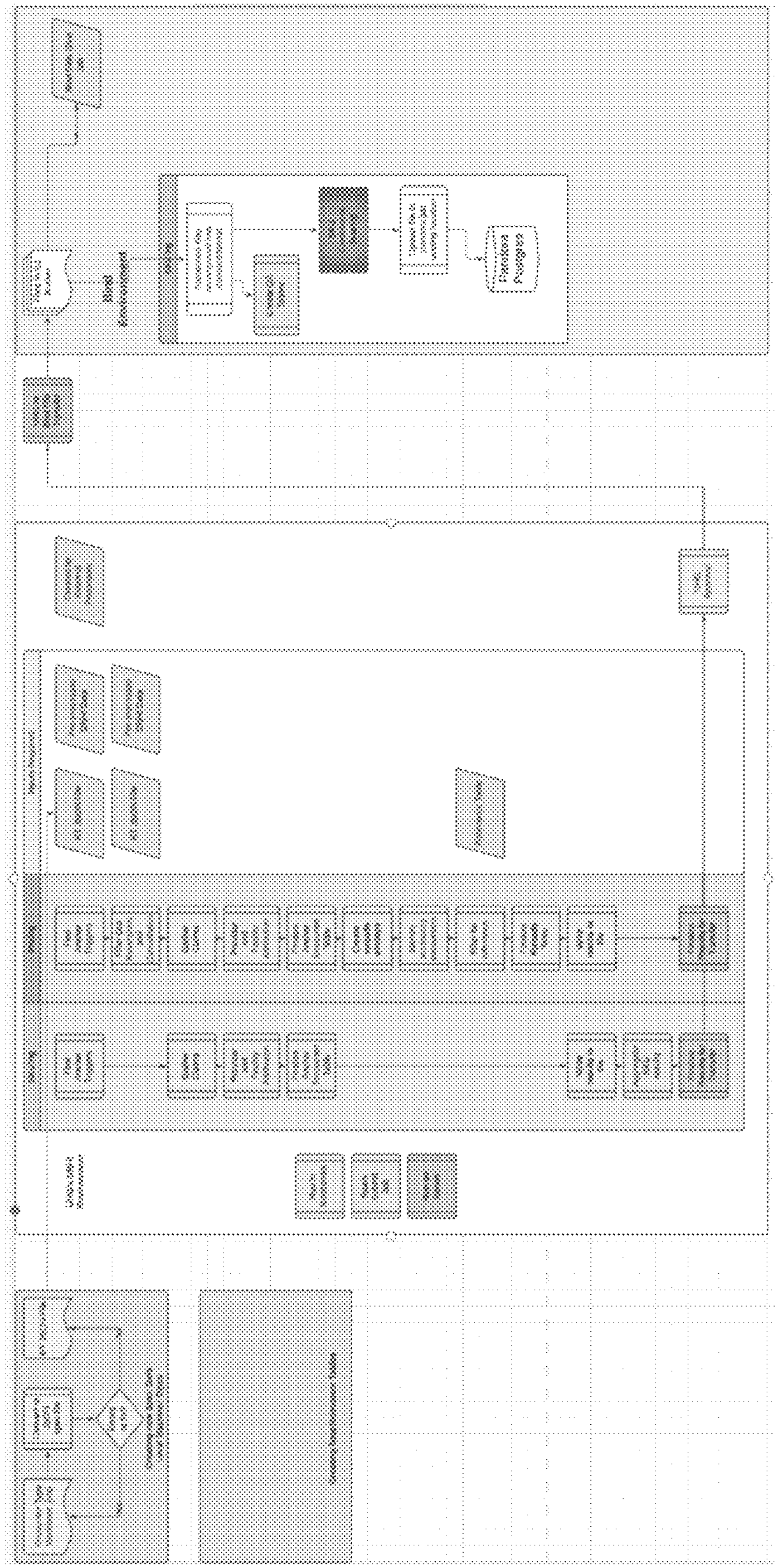
FIGURE 72B: UDRCD ARCHITECTURE

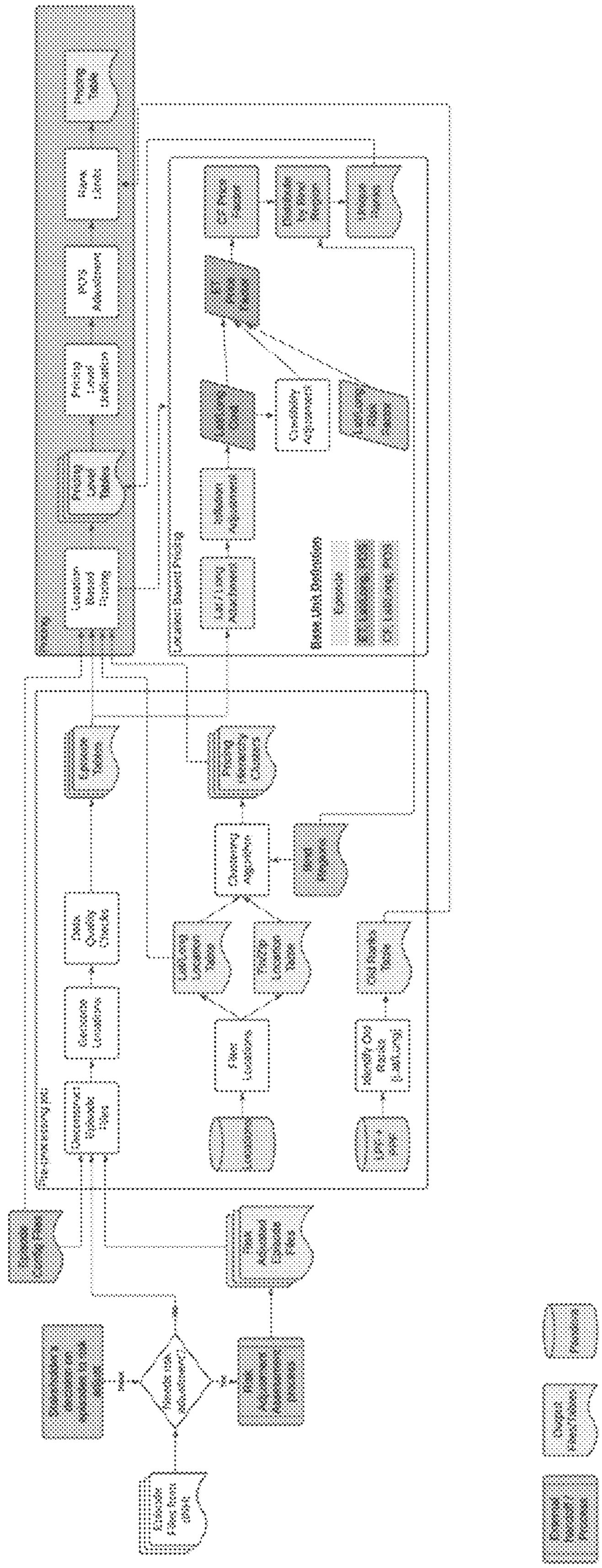
FIGURE 72C: UDRCD ARCHITECTURE

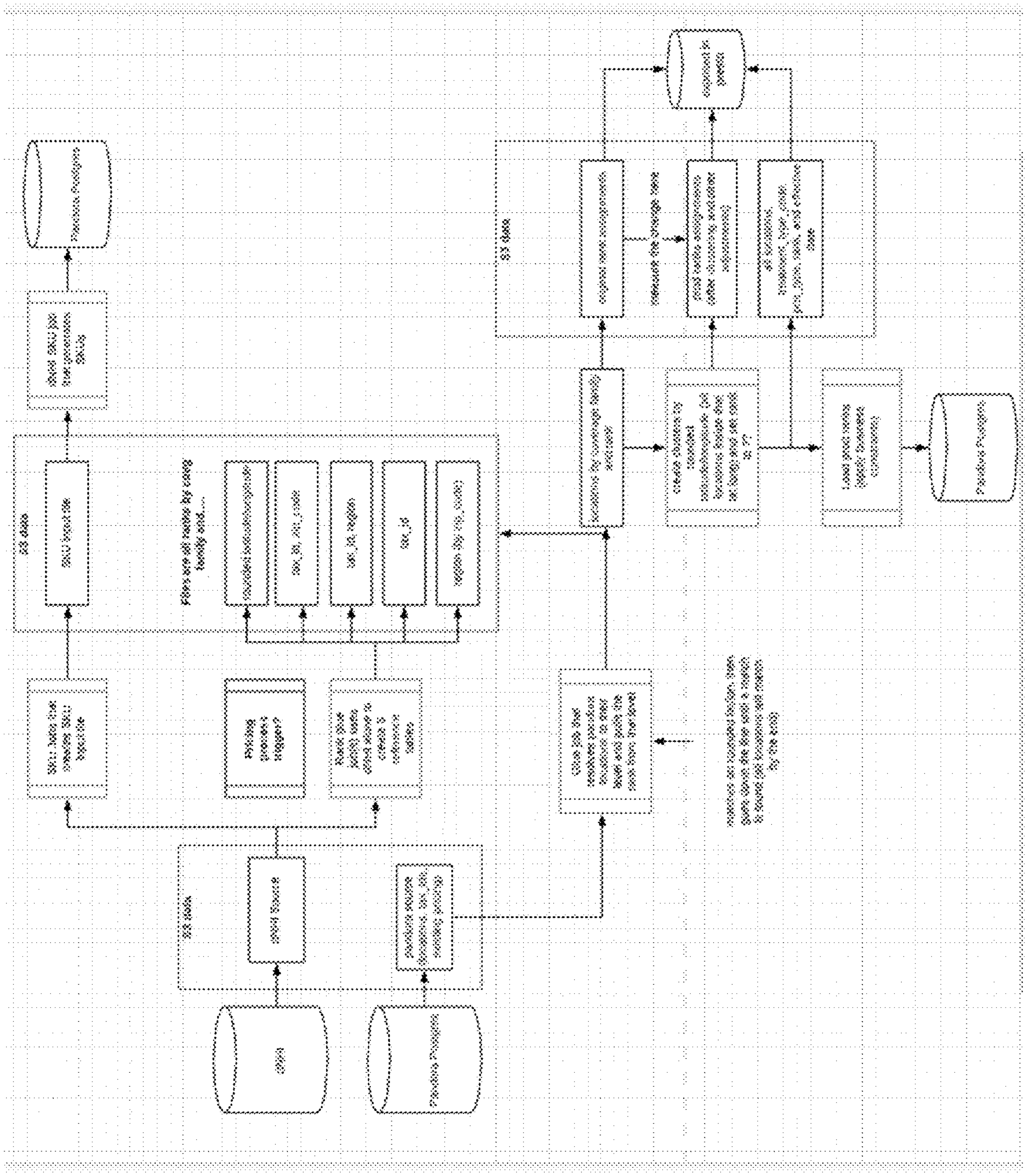
FIGURE 72 D: UDRCD ARCHITECTURE

FIGURE 73A: UDRCD ARCHITECTURE

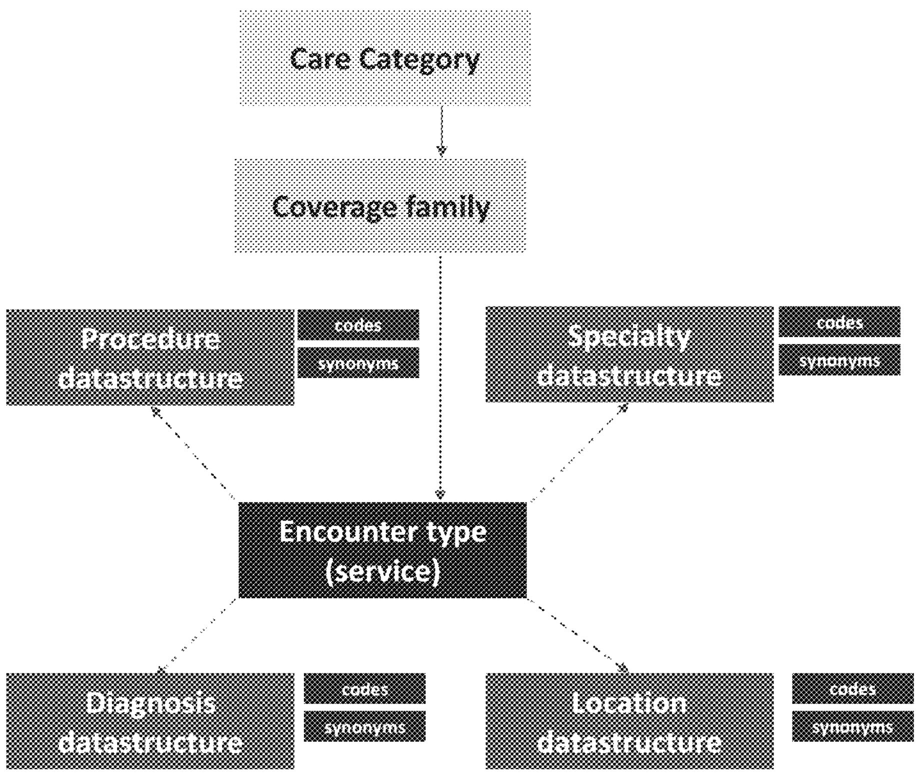

| | |
|---|---|
| **Care Category** | Consumer recognizable service categories that share copay ranges and determine what is included during a members encounter *(e.g., provider visit, major procedure, emergent stay, advanced test)* |
| **Coverage family** | One or more encounter types on which providers can be ranked that share same subsidization *(e.g., preventive care @ $0 copay)* |
| **Encounter type (service)** | Temporally discrete, unique health care event types (i.e., services), composed of a configuration of datastructures *(e.g., screening colonoscopy, thyroid surgery).* |
| **Ontology datastructure** | A clinically understandable group of medical codes and search terms *(e.g., knee replacement, chest x-ray, anesthesia, thyroid cancer, ambulatory surgical center)* |

FIGURE 73B: UDRCD ARCHITECTURE

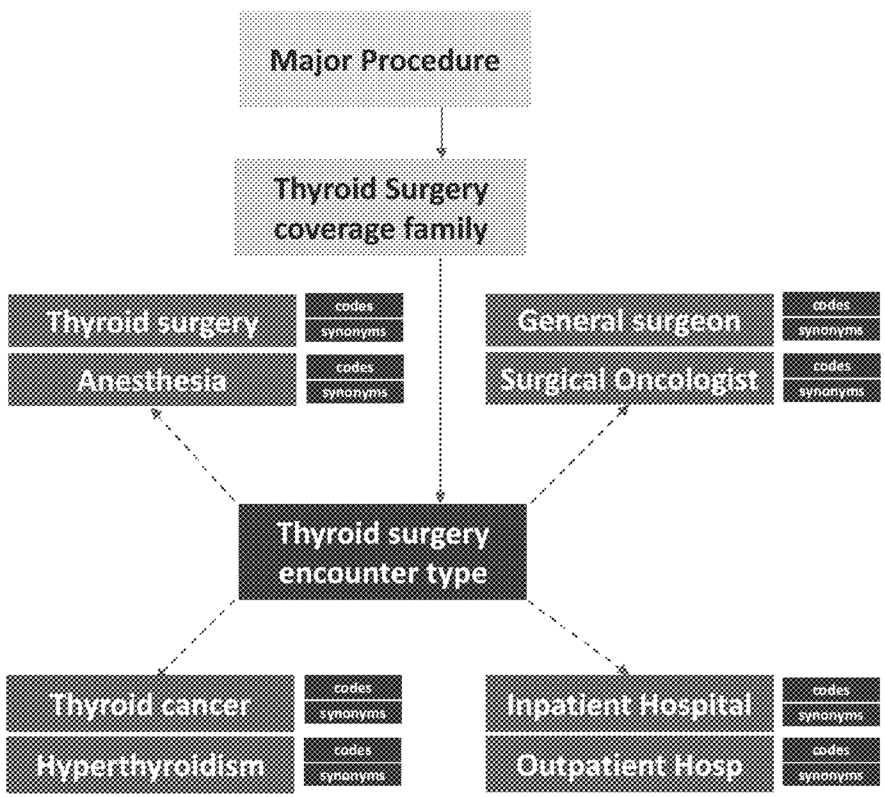

| | |
|---|---|
| **Care Category** | Consumer recognizable service categories that share copay ranges and determine what is included during a members encounter *(e.g., provider visit, major procedure, emergent stay, advanced test)* |
| **Coverage family** | One or more encounter types on which providers can be ranked that share same subsidization *(e.g., preventive care @ $0 copay)* |
| **Encounter type (service)** | Temporally discrete, unique health care event types (i.e., services), composed of a configuration of datastructures *(e.g., screening colonoscopy, thyroid surgery).* |
| **Ontology datastructure** | A clinically understandable group of medical codes and search terms *(e.g., knee replacement, chest x-ray, anesthesia, thyroid cancer, ambulatory surgical center)* |

FIGURE 73 C: UDRCD ARCHITECTURE

| Datastructure type | Description | Code types |
|---|---|---|
| Procedure | Diagnostic and therapeutic procedure types ("what") | CPT, HCPCS[1] Rev codes |
| Diagnosis | Chronic and acute condition types ("why") | ICD-10 CM |
| Specialty | Individual specialty types ("who") | Bind specialty code, NUCC |
| Location | Types of physical locations where care is received ("where") | Bind specialty code, TOB, POS, Revenue codes |
| Drug | Retail pharmacy | NPI, Medispan GPI |

Figure 73:
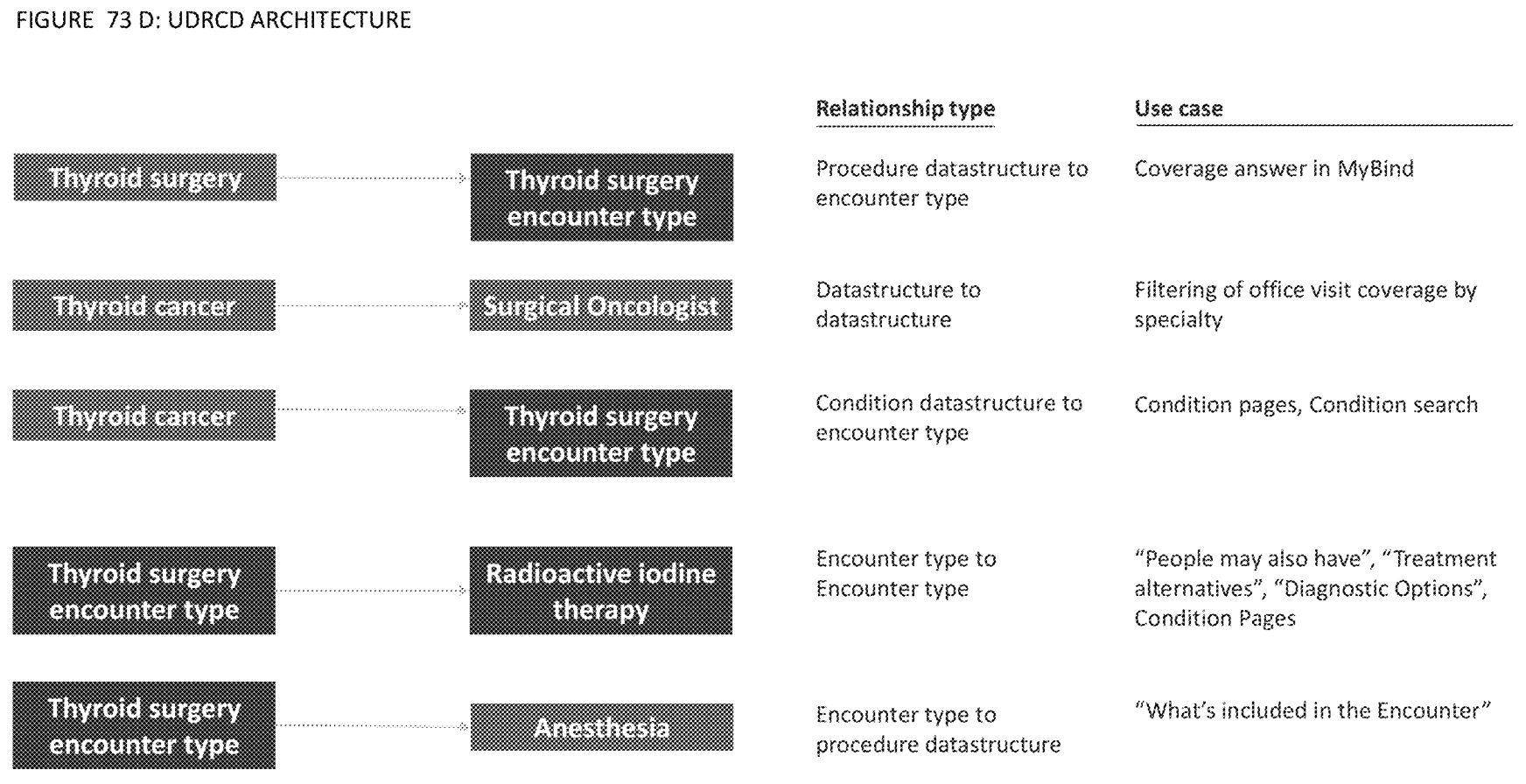

FIGURE 73 D: UDRCD ARCHITECTURE

| | | Relationship type | Use case |
|---|---|---|---|
| Thyroid surgery | Thyroid surgery encounter type | Procedure datastructure to encounter type | Coverage answer in MyBind |
| Thyroid cancer | Surgical Oncologist | Datastructure to datastructure | Filtering of office visit coverage by specialty |
| Thyroid cancer | Thyroid surgery encounter type | Condition datastructure to encounter type | Condition pages, Condition search |
| Thyroid surgery encounter type | Radioactive iodine therapy | Encounter type to Encounter type | "People may also have", "Treatment alternatives", "Diagnostic Options", Condition Pages |
| Thyroid surgery encounter type | Anesthesia | Encounter type to procedure datastructure | "What's included in the Encounter" |

FIGURE 74A: UDRCD ARCHITECTURE
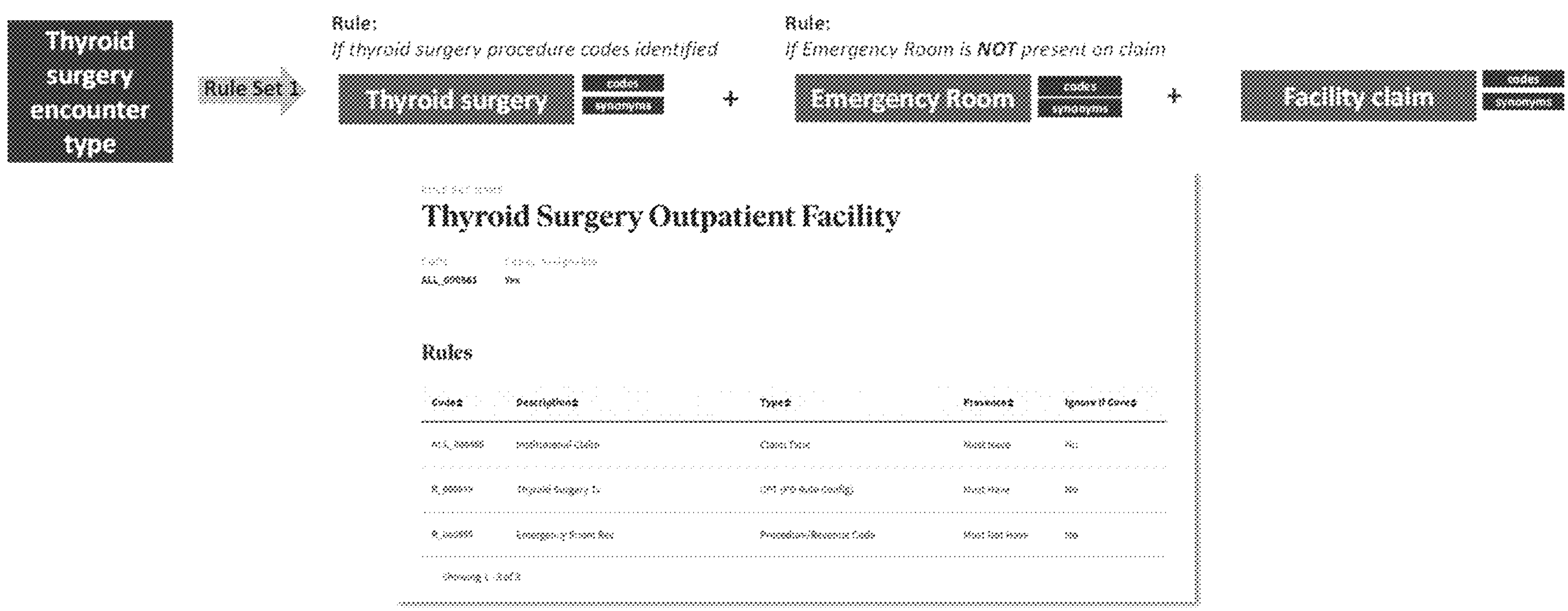

FIGURE 74B: UDRCD ARCHITECTURE
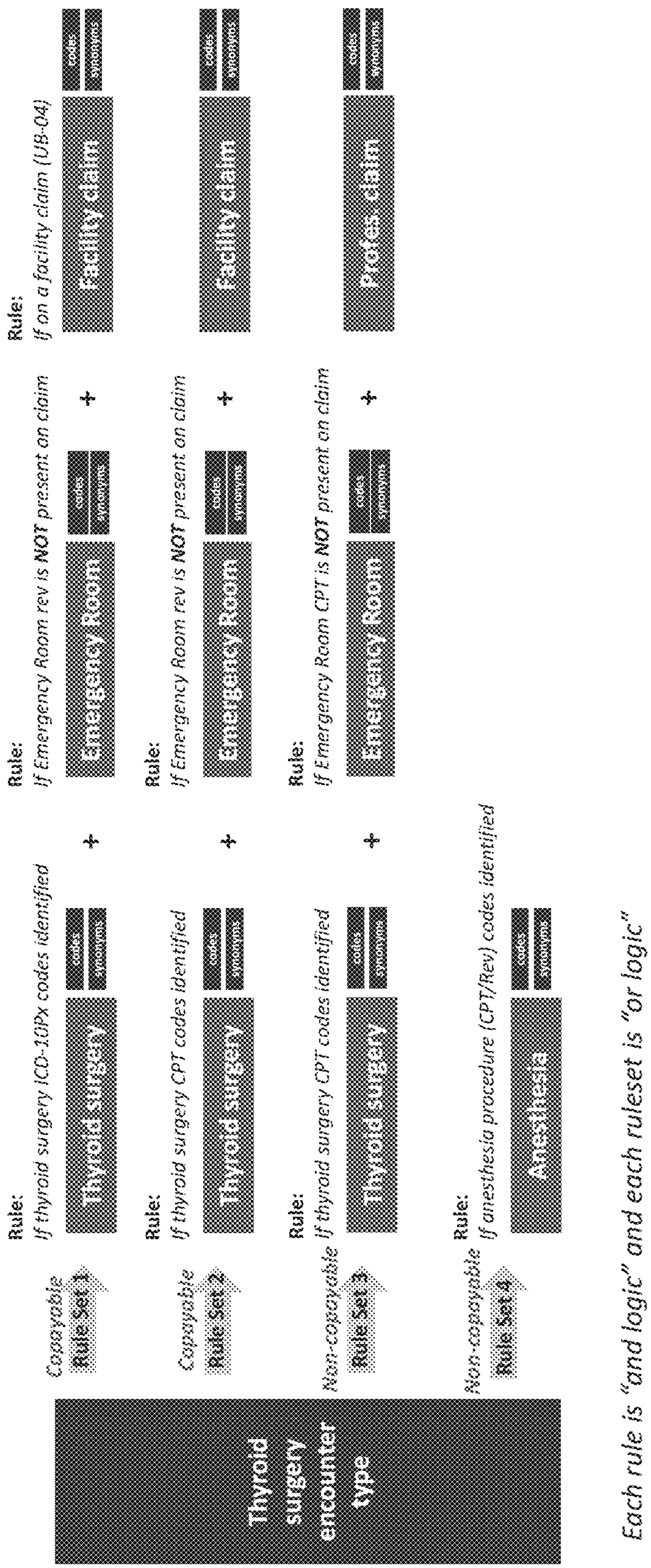

FIGURE 75: UDRCD DATA FLOW
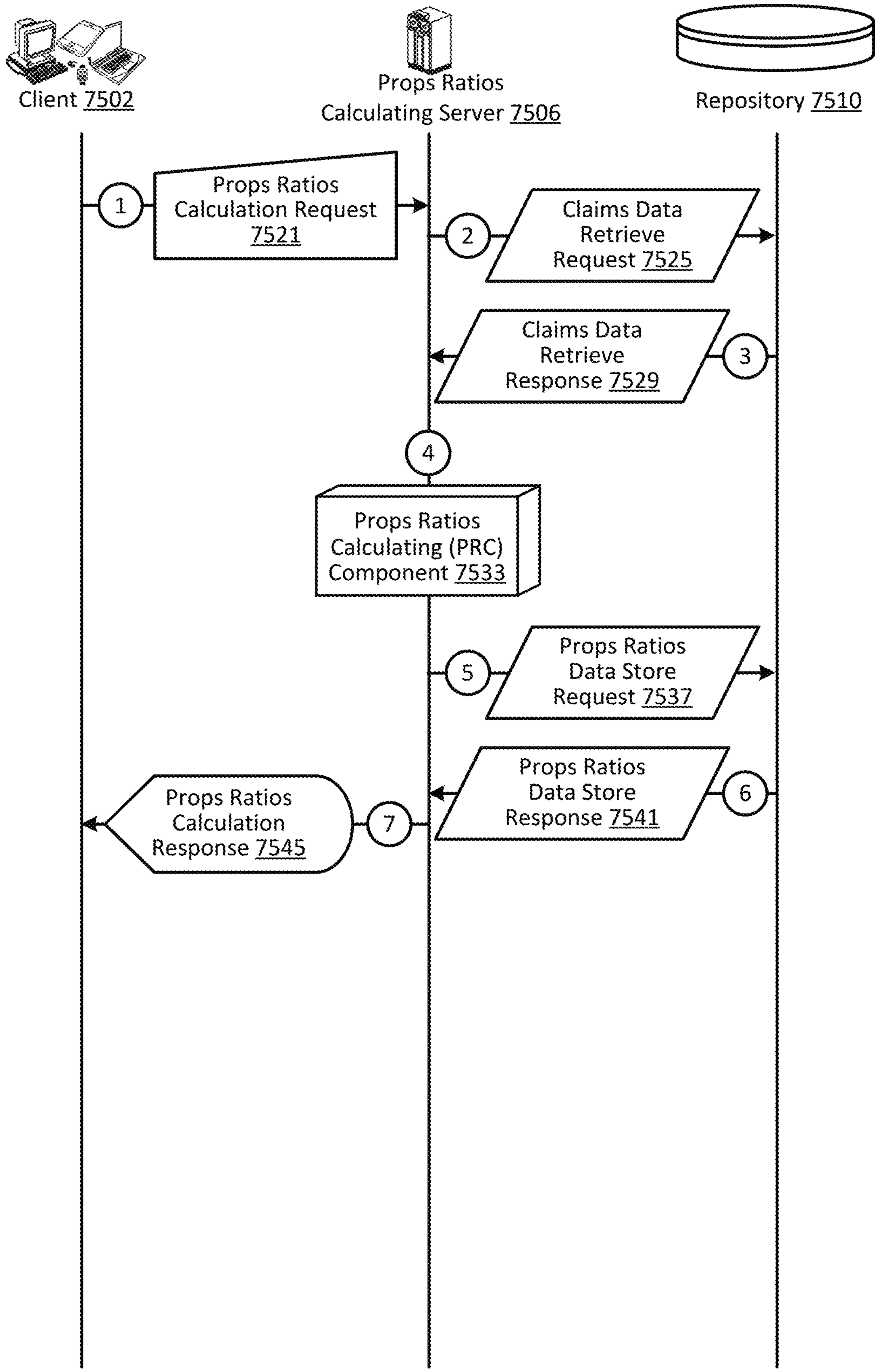

FIGURE 76: UDRCD PRC COMPONENT
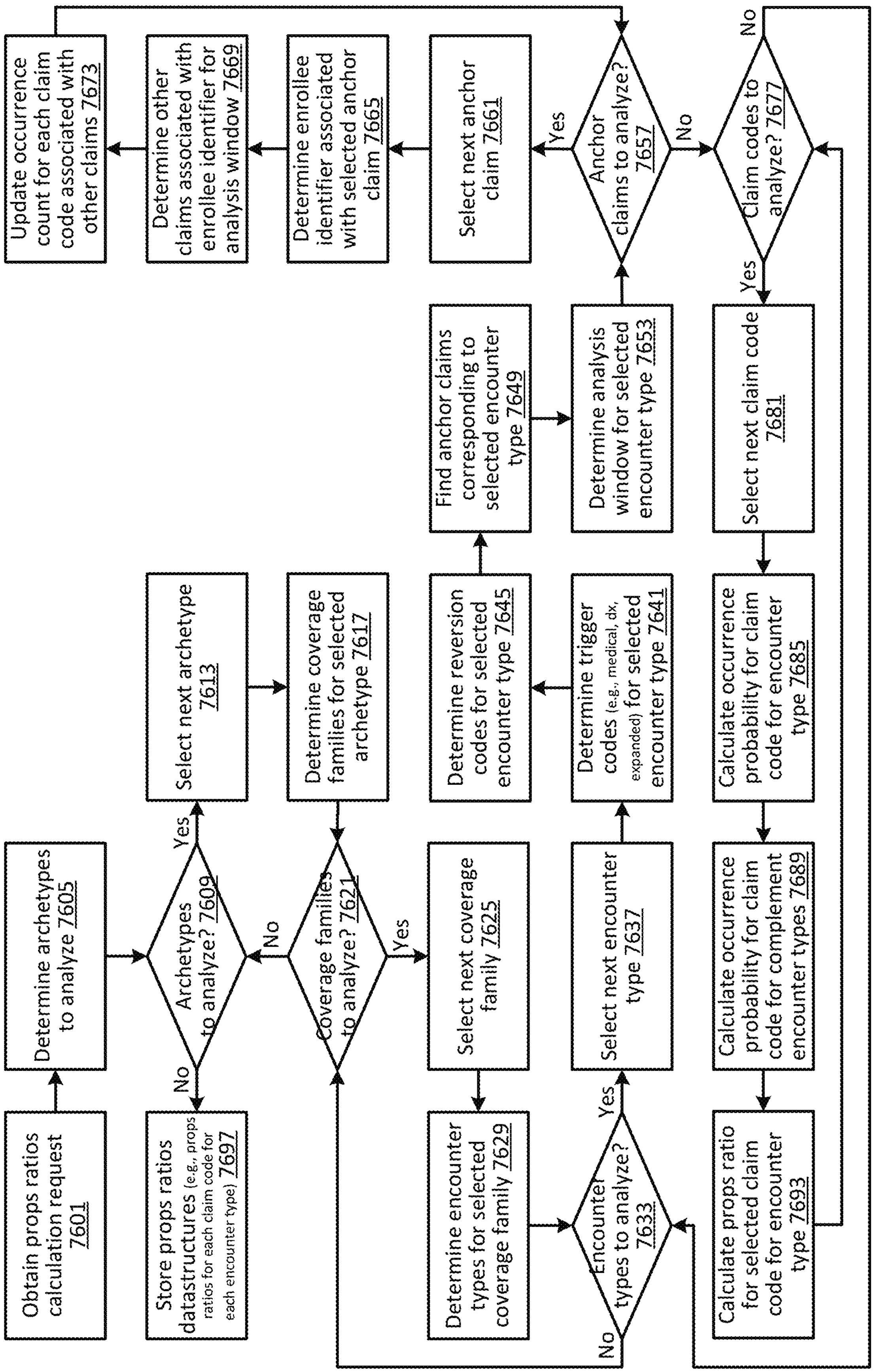

FIGURE 77A: UDRCD DATASTRUCTURE

7701

| Concept | Medical Code | Code Type |
|---|---|---|
| Electromyography | 51784 | CPT |
| Electromyography | 51785 | CPT |
| Electromyography | 95860 | CPT |
| Electromyography | 95861 | CPT |
| Electromyography | 95863 | CPT |
| Electromyography | 95864 | CPT |
| Electromyography | 95865 | CPT |
| Electromyography | 95866 | CPT |
| Electromyography | 95867 | CPT |
| Electromyography | 95868 | CPT |
| Electromyography | 95869 | CPT |
| Electromyography | 95870 | CPT |
| Electromyography | 95872 | CPT |
| Electromyography | 95885 | CPT |
| Electromyography | 95886 | CPT |
| Electromyography | 95887 | CPT |
| Electromyography | 96003 | CPT |
| Knee Arthroscopy and Repair | 27380 | CPT |
| Knee Arthroscopy and Repair | 27381 | CPT |
| Knee Arthroscopy and Repair | 27403 | CPT |
| Knee Arthroscopy and Repair | 27405 | CPT |
| Knee Arthroscopy and Repair | 27407 | CPT |
| Knee Arthroscopy and Repair | 27409 | CPT |
| Knee Arthroscopy and Repair | 27412 | CPT |
| Knee Arthroscopy and Repair | 27415 | CPT |
| Knee Arthroscopy and Repair | 27416 | CPT |
| Knee Arthroscopy and Repair | 27420 | CPT |
| Knee Arthroscopy and Repair | 27422 | CPT |
| Knee Arthroscopy and Repair | 27425 | CPT |
| Knee Arthroscopy and Repair | 27426 | CPT |
| Knee Arthroscopy and Repair | 27427 | CPT |
| Knee Arthroscopy and Repair | 27428 | CPT |
| Knee Arthroscopy and Repair | 27429 | CPT |

7705

| Encounter type code | Encounter type | Reversion Event |
|---|---|---|
| S_000121 | Knee Arthroscopy and Repair | Osteomyelitis |
| S_000121 | Knee Arthroscopy and Repair | Upper leg fracture |
| S_000121 | Knee Arthroscopy and Repair | Lower leg fracture |
| S_000121 | Knee Arthroscopy and Repair | Infected joints |
| S_000121 | Knee Arthroscopy and Repair | Knee infection |
| S_000121 | Knee Arthroscopy and Repair | ER visit |
| S_000121 | Knee Arthroscopy and Repair | Cancer |
| S_000121 | Knee Arthroscopy and Repair | Knee fracture |

FIGURE 77B: UDRCD DATASTRUCTURE

7710

| A | B | C | D | E |
|---|---|---|---|---|
| bind_specialty | primary_dx_shortened | num_encounters | num_distinct_encounters | num_distinct_providers |
| acupuncture | M546 | 15357 | 3553 | 646 |
| acupuncture | M2555 | 10749 | 2613 | 744 |
| acupuncture | M549 | 8499 | 1893 | 294 |
| acupuncture | M7960 | 7505 | 1785 | 413 |
| acupuncture | M9901 | 5989 | 1743 | 303 |
| acupuncture | G8929 | 4145 | 1139 | 163 |
| acupuncture | G4420 | 4563 | 1091 | 186 |
| acupuncture | M7964 | 3484 | 897 | 270 |
| acupuncture | M2553 | 3764 | 890 | 271 |
| acupuncture | G4422 | 3346 | 828 | 101 |
| acupuncture | G4300 | 3036 | 700 | 137 |
| acupuncture | M5441 | 2942 | 659 | 167 |
| acupuncture | M5412 | 2991 | 645 | 138 |
| acupuncture | M5440 | 2918 | 615 | 96 |
| acupuncture | M5442 | 2316 | 546 | 150 |
| acupuncture | M5416 | 2087 | 474 | 138 |
| acupuncture | M9902 | 1227 | 460 | 89 |
| acupuncture | M5431 | 2105 | 444 | 123 |
| acupuncture | M6283 | 1501 | 427 | 86 |
| acupuncture | M5432 | 1674 | 399 | 114 |
| addiction-medicine | F332 | 4215 | 3096 | 508 |
| addiction-medicine | F419 | 3503 | 2972 | 551 |
| addiction-medicine | F4322 | 2903 | 2624 | 463 |
| addiction-medicine | F4320 | 2767 | 2413 | 390 |
| addiction-medicine | F330 | 1405 | 1119 | 289 |
| addiction-medicine | F3181 | 1429 | 1101 | 309 |
| addiction-medicine | F902 | 1810 | 1048 | 227 |

7715

| A | B | C | D | E |
|---|---|---|---|---|
| event | primary_dx_shortened | num_rows | num_distinct_encounters | num_distinct_providers |
| physical_therapy_visit | M545 | 1,251,216 | 345,301 | 33,884 |
| physical_therapy_visit | M542 | 1,033,450 | 266,865 | 27,296 |
| physical_therapy_visit | M2551 | 719,597 | 211,624 | 20,172 |
| physical_therapy_visit | M2556 | 693,173 | 203,374 | 18,860 |
| physical_therapy_visit | M9901 | 655,694 | 193,749 | 16,643 |
| physical_therapy_visit | M9903 | 428,595 | 128,591 | 12,875 |
| physical_therapy_visit | M2555 | 289,832 | 86,664 | 11,426 |
| physical_therapy_visit | M2557 | 239,553 | 68,203 | 8,252 |
| physical_therapy_visit | M6281 | 166,574 | 58,358 | 5,234 |
| physical_therapy_visit | M546 | 208,983 | 56,377 | 9,016 |
| physical_therapy_visit | M5412 | 217,500 | 55,066 | 8,308 |
| physical_therapy_visit | M5416 | 206,473 | 54,208 | 8,438 |
| physical_therapy_visit | M9902 | 152,486 | 46,855 | 7,578 |
| physical_therapy_visit | F840 | 133,093 | 44,325 | 4,349 |
| physical_therapy_visit | S8351 | 128,146 | 33,411 | 3,779 |
| physical_therapy_visit | M7967 | 88,799 | 26,116 | 4,789 |
| physical_therapy_visit | M2552 | 81,485 | 23,934 | 3,969 |
| physical_therapy_visit | S134X | 92,228 | 23,765 | 3,402 |
| physical_therapy_visit | F82 | 50,555 | 22,027 | 1,762 |
| physical_therapy_visit | R278 | 48,801 | 21,795 | 1,407 |

7720

| code | description | long_desc | code_lv |
|---|---|---|---|
| M2551 | Pain in shoulder | Pain in shoulder | 5 |
| M25519 | Pain in unspecified shoulder | Pain in unspecified shoulder | 6 |
| M25512 | Pain in left shoulder | Pain in left shoulder | 6 |
| M25511 | Pain in right shoulder | Pain in right shoulder | 6 |

FIGURE 78A: UDRCD IMPLEMENTATION CASE

```
episode_archetype_runs = {}
for e in episode_archetype_events:
    create_kwargs = {'reversion_event': et_to_reversions_and_cancelers[e.event_name]}
    epdef.execute_other_episode_run(
        ## anchor_event has the main event specification:
        ## e.g., "these are the codes and places of service that represent a Knee Arthroscopy."
        anchor_event=e,

        ## broader_differentiator specifies the run this is -
        ## e.g., "this was the version run on December 4."
        broader_differentiator=broader_differentiator,

        ## runs stores the results of the runs for each different anchor_event.
        runs=episode_archetype_runs,

        ## a dataset points to different tables in database, stores a database connection,
        ## and manages some more out-of-sight stuff.
        dataset=dataset,

        ## Parameters around dropping tables when we want to re-run certain steps.
        clear_after_concept=None,
        save_concepts=control_concepts,

        ## backend_kwargs stores the window sizes (e.g. "look back 0 days, look ahead 90 days")
        ## and whether we should get props ratios for only the three-length prefix of
        ## ICD10-CM codes, or use full-length (up to 7 characters) codes.
        kwargs=backend_kwargs,

        ## Holds the reversion event, described elsewhere.
        create_kwargs=create_kwargs,

        ## The Python class to use. There is a different class for each
        ## archetype. This example uses the "multi-day" archetype,
        ## also sometimes called "episode" archetype, though episodes
        ## are involved in multiple archetypes.
        backend_class=epdef.EpisodeDefinitionBackend)
```

FIGURE 78B: UDRCD IMPLEMENTATION CASE

```
def execute_other_episode_run(
        anchor_event: event.Event,
        broader_differentiator: str,
        runs: Dict,
        dataset: event.ClaimDataSet,
        backend_class,
        mid_level_differentiator: str = None,
        kwargs={},
        create_kwargs={},
        clear_after_concept=None,
        save_concepts=[],
        clear_concepts=[]) -> None:
    """
    :param broader_differentiator: a high-level differentiator to use for the whole run.
    For example, 'nov_20'.

    :param runs: a dictionary to put result into. Can be passed in empty; this is a place
    for this function to put things, not read from.

    :param mid_level_differentiator: Only used for PTOTST right now.
    Differentiates between PT, OT, and ST, but not between different diagnoses.

    :param create_kwargs: the kwargs to splat into the create method of backend_class().

    :param kwargs: needs to include at least lookback and lookahead. Doesn't correspond
    nicely to the arguments for a specific single method, though.
    """
    backend, differentiator = make_general_backend(
        anchor_event,
        broader_differentiator=broader_differentiator,
        dataset=dataset,
        kwargs=kwargs,
        backend_class=backend_class,
        mid_level_differentiator=mid_level_differentiator)
    ## return backend # debug
    do_clears(backend, clear_after_concept=clear_after_concept,
              save_concepts=save_concepts, clear_concepts=clear_concepts)

    backend.create(anchor_event.event_name,
                   anchor_event,
                   **create_kwargs)

    services_df = backend.pull_stats_for_all()
    runs[anchor_event.event_name] = {
        'backend': backend,
        'differentiator': differentiator,
        'relevant_services_df': services_df}
```

FIGURE 78 C: UDRCD IMPLEMENTATION CASE

```
def _create_when_control_tables_exist(
        self, episode_name: str,
        anchor_event: event.Event,
        control_triggers_concept: str,
        reversion_event: event.Event = None,
        drop_control_triggers_after_using = True):
    """
    :param anchor_event: the Event to build episodes around.
    """
    code_cols = ['proc1', 'dx1', 'revcode', 'stdplac']
    info_cols = ['pay', 'stdprov']
    self.episode_name = episode_name
    self.event_name = anchor_event.event_name
    ## find anchor windows
    self._find_triggers(self['anchor_triggers'], [anchor_event])
    anchor_triggers_concept = self._handle_reversions(
        reversion_event, 'anchor_triggers', 'anchor_triggers_sans_reversions')
    self._attach_balance_vars(self[anchor_triggers_concept],
                              self['anchor_triggers_with_vars'])
    self._count_categories(self['anchor_triggers_with_vars'],
                           self['anchor_triggers_category_counts'])

    ## window_finding_function is set in __init__
    self.window_finding_function(self['anchor_triggers_with_vars'],
                                 self['windows_multiple'])
    self._take_earliest_window(self['windows_multiple'], self['windows'])
    self._get_all_claims_in_windows(
        self['windows'], self['codes_in_windows'],
        claim_columns=(code_cols + info_cols))


    self.window_finding_function(self[control_triggers_concept],
                                 self['control_windows_multiple'])
    if drop_control_triggers_after_using:
        self.drop_concept(control_triggers_concept)

    self._take_earliest_window(self['control_windows_multiple'],
                               self['control_windows_single'])

    self._remove_windows_for_members_with_existing_windows(
        control_windows_tablename=self['control_windows_single'],
        specific_windows_tablename=self['windows'],
        dest_tablename=self['control_windows'])

    self._get_all_claims_in_windows(
        self['control_windows'], self['control_codes_in_windows'],
        claim_columns=code_cols)

    self._create_code_part(self['codes_in_windows'],
                           self['control_codes_in_windows'],
                           key = 'encounter_id')

    self._make_examples_for_labeling(
        self['codes_in_windows'], self['things_to_label'], n_people=1000)
```

FIGURE 79B: UDRCD SCREENSHOT
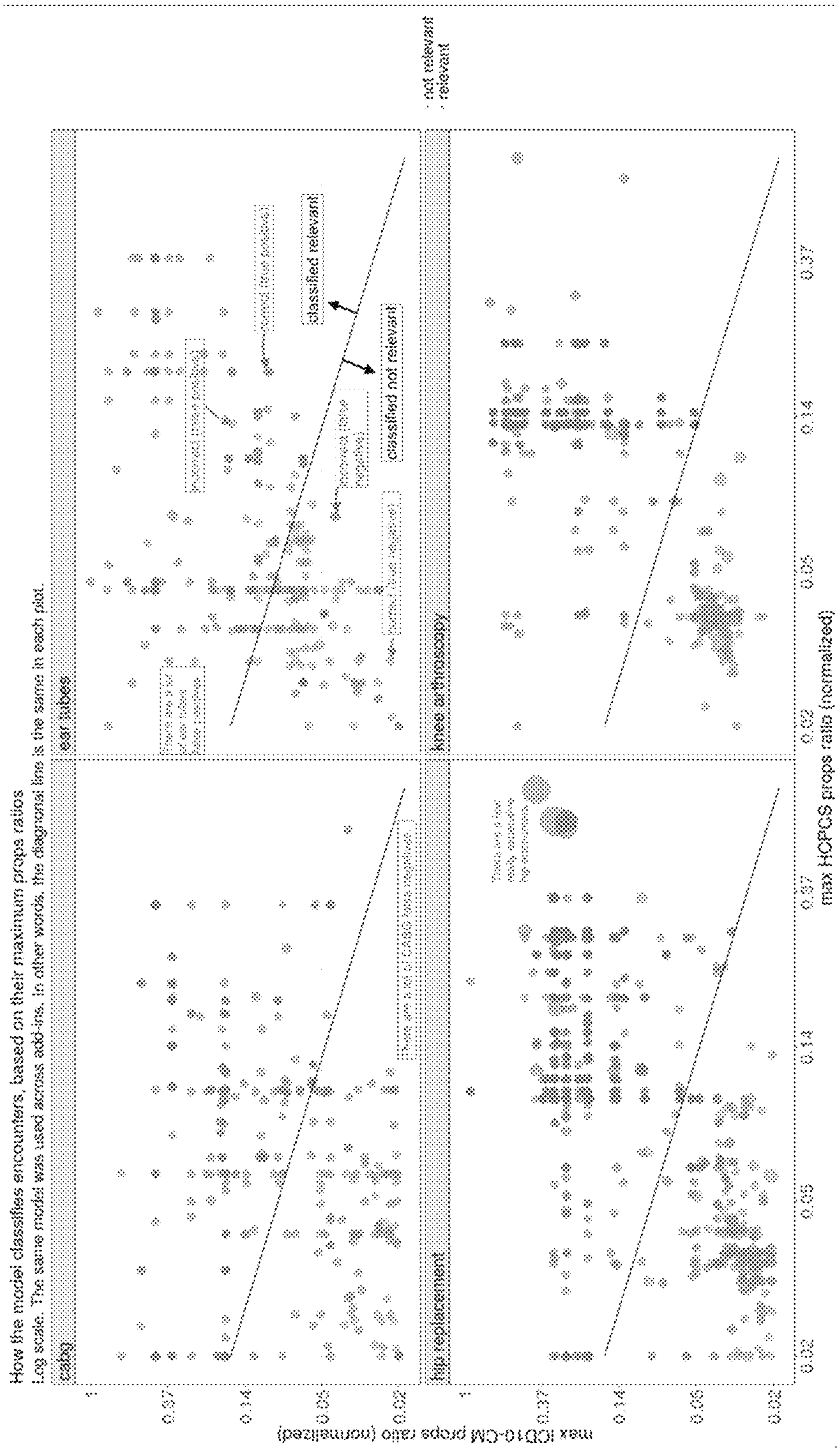

FIGURE 79 C: UDRCD SCREENSHOT
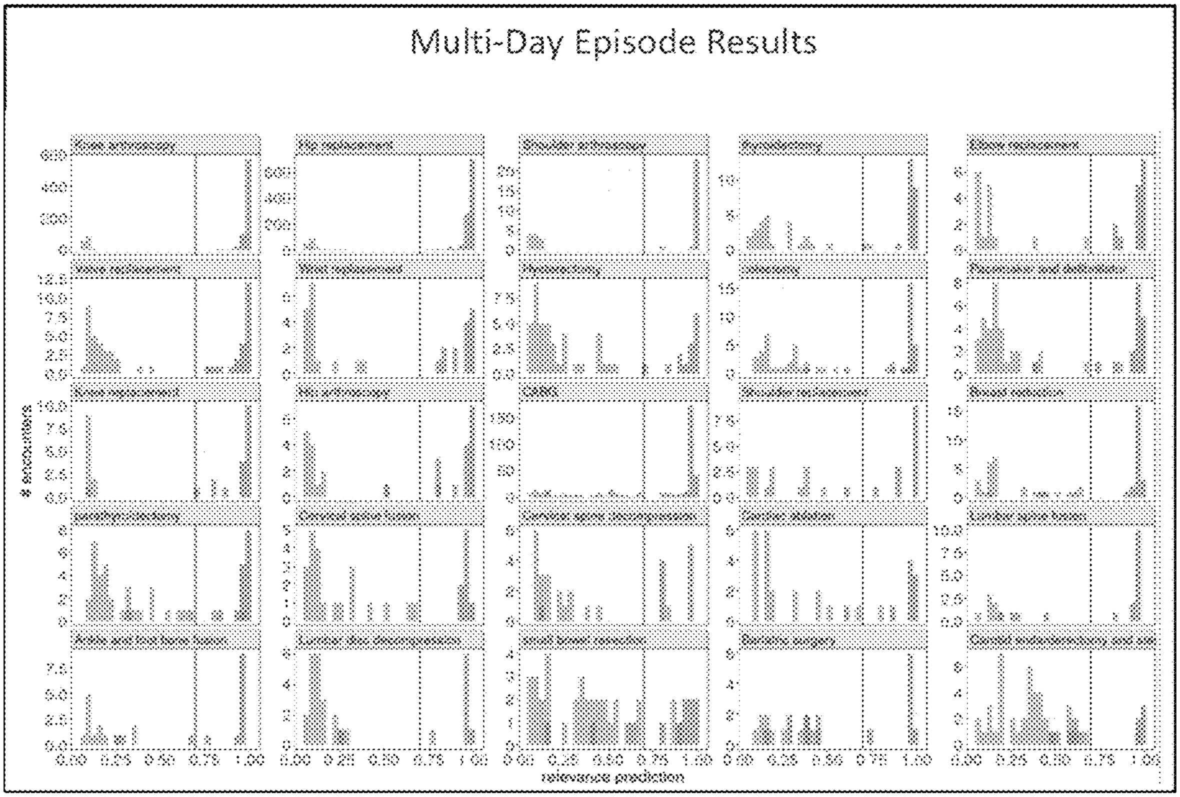
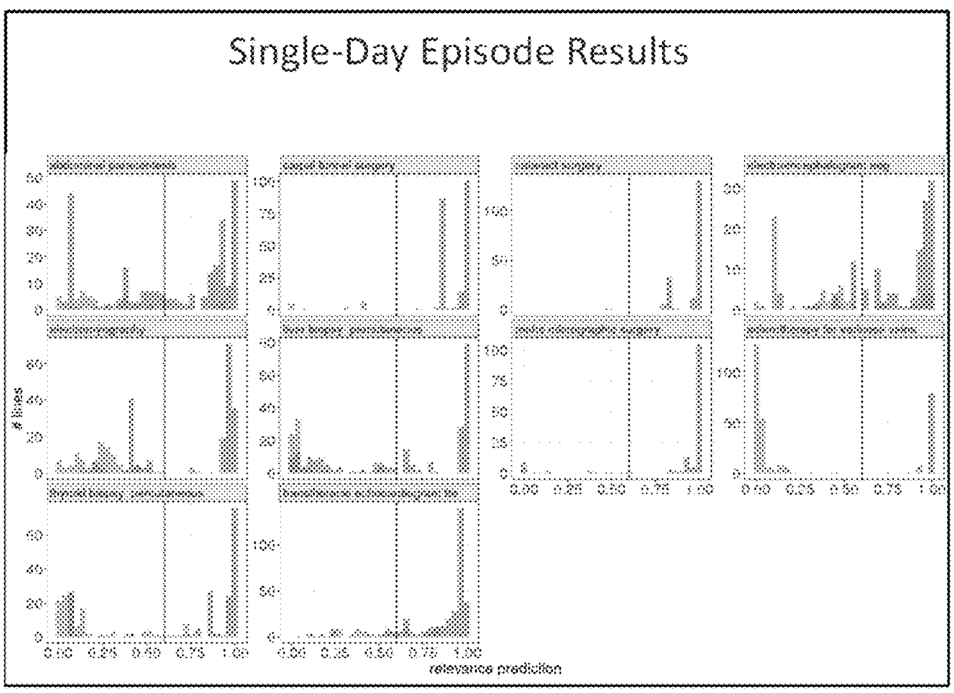

+ Add a view

Bind episode archetypes

| Aa Name | Multi-day | Single-day | Condition | Imaging | Maternity |
|---|---|---|---|---|---|
| Intended anchor type | High-spend services (e.g., major surgeries) that generally have follow-on care. | Moderate-spend services (e.g., biopsy) that generally have no follow-on care. | Office visits for the management of a specific condition. | Imaging services. This archetype has unique logic to group the professional and technical claims from imaging encounters. In addition, this archetype has a unique logic to adjust for the wide range of cost for different imaging procedures. | Delivery services. |
| Intended accessory type | This archetype captures accessory spend that is related to the anchor encounter and has occurred within 90-days of the anchor encounter. | N/A | This archetype captures accessory spend that is related to the condition that the practitioner is managing and has occurred within 12 months of the anchor encounter. | N/A | This archetype captures accessory spend that is related to the maternity and delivery and has occurred with the prior 10 months of the delivery. |
| Example Coverage Families | CABG, Hip replacement, Knee replacement, Lumber spine fusion, Valve replacement, Hip arthroscopy, Knee arthroscopy, Sinus,and nasal septum surgery | Cataract surgery, Ear tubes, Upper GI endoscopy, Biopsy Pain injection Sigmoidoscopy, non screening | PCP/SCP office visits | Complex imaging | Maternity |
| Typical Provider Attribution | Location performing procedure | Location performing procedure | Practitioner/Location managing the condition (per spec) | Location performing service | Location performing the acute procedure / service |
| Window | 90 days post-trigger | Same Day | 12 months post-trigger | No window | 10 months pre-trigger |
| Primary Anchor Trigger (additional trigger methods will be used) | CPT / HCPCS | CPT / HCPCS | CPT / HCPCS | CPT / HCPCS | CPT / HCPCS |
| Anchor Spend (spend triggered by procedures, services, or diagnoses that are found in the coverage family definition). | Entire anchor encounter (via coverage family definition) | Claim lines within anchor encounter (via coverage family definition) | Entire anchor encounter | Select relevant CPT / HCPCS | Entire anchor encounter |
| Accessory Spend (spend triggered by procedures, services, or diagnosis that are related to the coverage family) | Entire trigger encounter (via Px and Dx props threshold) | Claim lines within anchor encounter (via Px and Dx props threshold) | Entire trigger encounter (via condition relevance to the specialty) | Select relevant CPT / HCPCS | Entire trigger encounter (via Px and Dx props threshold) |
| Case Mix Adjustment | HCCs tuned to procedure (for some coverage families with meaningful R2) | N/A | HCCs tuned to the condition | Cohorts of CPT / HCPCS (based on allowed amount data) | Diagnosis w complication vs diagnosis w/o complications |
| Benefit Archetype | Procedure IV Procedure III | Procedure I Procedure II | | | |

UDRCD ARCHITECTURE

FIGURE 80

FIGURE 81: UDRCD DATA FLOW
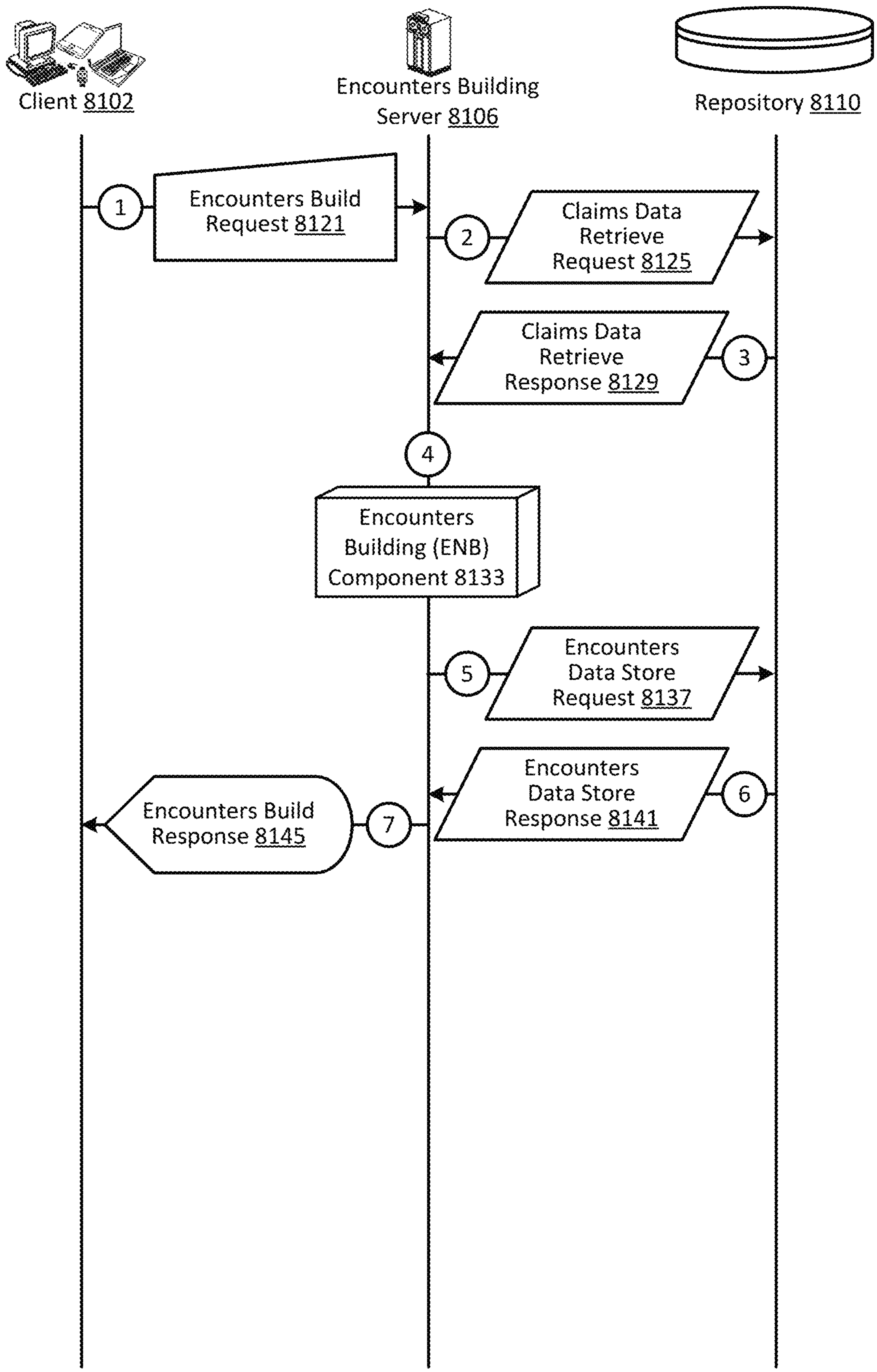

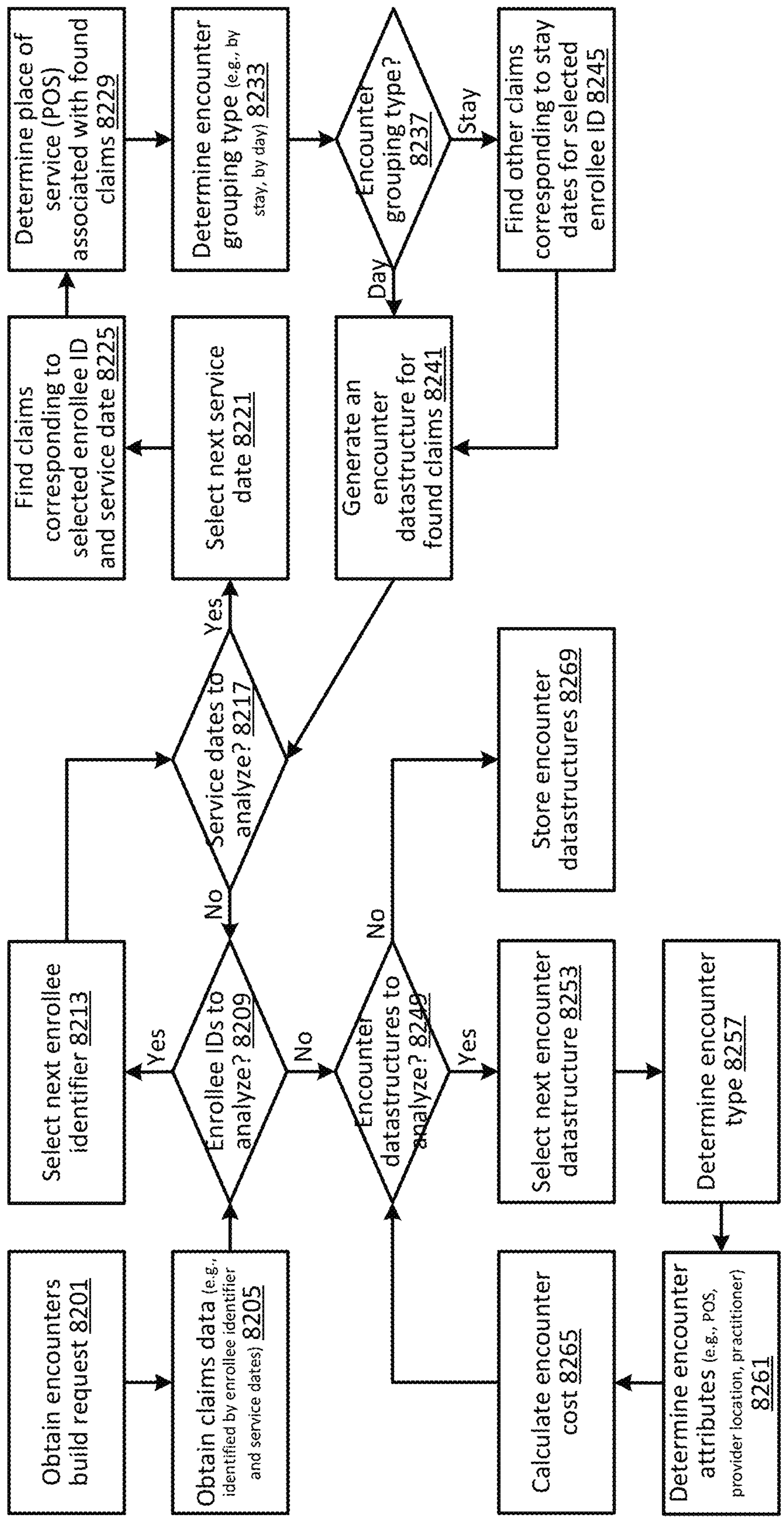
FIGURE 82: UDRCD ENB COMPONENT

FIGURE 83A: UDRCD DATASTRUCTURE

| | |
|---|---|
| adjusted_claim_ind | N |
| adjusted_hccc_code | 2 |
| amt_allowed | ##.## |
| amt_benefit_limit | ##.## |
| amt_benefit_payable | ##.## |
| amt_calculated_paid | ##.## |
| amt_cob_reduction | ##.## |
| amt_cob_savings | ##.## |
| amt_coinsurance | ##.## |
| amt_copay | ##.## |
| amt_covered | ##.## |
| amt_deductible | ##.## |
| amt_discount | ##.## |
| amt_duplicate_charge | ##.## |
| amt_eligible | ##.## |
| amt_encounter | ##.## |
| amt_not_paid | ##.## |
| amt_non_duplicate_charge | ##.## |
| amt_pfa | ##.## |
| amt_provider_sanction | ##.## |
| amt_reduction | ##.## |
| amt_reserve | ##.## |
| amt_specialty_negotiated | ##.## |
| amt_submitted_charge | ##.## |
| benefit_level_code | 5 |
| bill_procedure_code | |
| bill_procedure_key | 0 |
| bill_type_frequency_code | |
| billing_provider_key | ########### |
| billing_provider_npi_nbr | ########### |
| business_line_code | MCR |
| charge_status_code | P |
| cob_code | |
| copay_type_code | 0 |
| cosmos_legal_entity | 1385 |
| cosmos_site_code | OES |
| count_visits | 0 |
| coverage_type_code | M |
| customer_segment_key | ########### |
| customer_segment_nbr | ########### |
| d_bill_place_of_service_code | |
| d_bill_place_of_service_key | 0 |
| d_place_of_service_code | 11 |
| d_place_of_service_key | 7.87349E+11 |
| data_source_code | CO |
| delegated_ind | N |
| discount_type_code | D |
| earliest_service_from_date | ######## |
| encounter_code | 0 |
| episode_of_pymt_bundle_code | |
| episode_of_pymt_cine_crit_code | |
| episode_of_pymt_mnl_intvn_code | |
| episode_of_pymt_pricing_amt | None |
| episode_of_pymt_service_code | |
| exception_process_rsn_code | |
| hct_lvl_nbr | 0 |
| hct_orig_lvl_nbr | 0 |
| header_diagnosis_10_code | |
| header_diagnosis_11_code | |
| header_diagnosis_12_code | |
| header_diagnosis_1_code | J3089 |
| header_diagnosis_1_key | 7.45148E+16 |
| header_diagnosis_2_code | |
| header_diagnosis_2_key | 3 |
| header_diagnosis_3_code | |
| header_diagnosis_3_key | 3 |
| header_diagnosis_4_code | |
| header_diagnosis_4_key | 3 |
| header_diagnosis_5_code | |
| header_diagnosis_5_key | 3 |
| header_diagnosis_6_code | |
| header_diagnosis_7_code | |
| header_diagnosis_8_code | |
| header_diagnosis_9_code | |
| header_earliest_date | ######## |
| header_latest_date | ######## |
| header_reason_code | 0 |
| header_reason_key | 6.77979E+17 |
| icd_version_code | 10 |
| industry_product_code | OTH |
| latest_service_thru_date | ######## |
| medical_claims_processor_code | C |
| member_coverage_key | ########### |
| ndc_code | |
| ndc_key | 1 |
| ndc_quantity | None |
| ndc_unit_of_measure_code | |
| nhi_authorization_nbr | |

| | |
|---|---|
| nhi_claim_nbr | ########### |
| nhi_individual_id | ########### |
| nhi_member_system_id | ########### |
| nhi_orig_close_claim_nbr | |
| original_close_claim_nbr | |
| override_code | |
| override_key | 1 |
| pcp_provider_key | ########### |
| procedure_modifier_1_code | |
| procedure_modifier_1_key | 1 |
| procedure_modifier_2_code | |
| procedure_modifier_2_key | 1 |
| procedure_modifier_3_code | |
| procedure_modifier_3_key | 1 |
| procedure_modifier_4_code | |
| procedure_modifier_4_key | 1 |
| procedure_modifier_5_code | |
| procedure_modifier_5_key | 1 |
| product_code | 1003 |
| product_key | ########### |
| provider_geographic_key | ########### |
| provider_key | ########### |
| provider_location_key | ########### |
| provider_npi_nbr | ########### |
| provider_par_code | P |
| quantity_units | 1 |
| referring_provider_key | ########### |
| referring_provider_npi_nbr | ########### |
| rendering_provider_key | ########### |
| rendering_provider_npi_nbr | ########### |
| service_diagnosis_1_code | J3089 |
| service_diagnosis_1_key | 7.45148E+16 |
| service_diagnosis_2_code | |
| service_diagnosis_2_key | 3 |
| service_diagnosis_3_code | |
| service_diagnosis_3_key | 3 |
| service_diagnosis_4_code | |
| service_from_date | ######## |
| service_line_nbr | 1 |
| service_post_date | ######## |
| service_procedure_code | 85117 |
| service_procedure_key | 5.75349E+14 |
| service_reason_code | 32 |
| service_reason_key | 6.77979E+13 |
| service_thru_date | ######## |
| source_rtl_svc_line_nbr | 1 |
| srvc_unit_cnt | 1 |
| update_date | ######## |
| update_process_id | RDM_PL_REKEY |

FIGURE 83B: UDRCD DATASTRUCTURE

| | |
|---|---|
| adjusted_claim_ind | N |
| adjusted_hccc_code | 2 |
| amt_allowed | ##.## |
| amt_benefit_limit | ##.## |
| amt_benefit_payable | ##.## |
| amt_calculated_paid | ##.## |
| amt_cob_reduction | ##.## |
| amt_cob_savings | ##.## |
| amt_coinsurance | ##.## |
| amt_copay | ##.## |
| amt_covered | ##.## |
| amt_deductible | ##.## |
| amt_discount | ##.## |
| amt_duplicate_charge | ##.## |
| amt_eligible | ##.## |
| amt_encounter | ##.## |
| amt_not_paid | ##.## |
| amt_non_duplicate_charge | ##.## |
| amt_pfs | ##.## |
| amt_provider_sanction | ##.## |
| amt_reduction | ##.## |
| amt_reserve | ##.## |
| amt_specialty_negotiated | ##.## |
| amt_submitted_charge | ##.## |
| benefit_level_code | 5 |
| bill_procedure_code | |
| bill_procedure_key | 0 |
| bill_type_frequency_code | |
| billing_provider_key | ########### |
| billing_provider_npi_nbr | ########### |
| business_line_code | MCR |
| charge_status_code | P |
| cob_code | |
| copay_type_code | 0 |
| cosmos_legal_entity | 1385 |
| cosmos_site_code | OE8 |
| count_visits | 0 |
| coverage_type_code | M |
| customer_segment_key | ########### |
| customer_segment_nbr | ########### |
| d_bill_place_of_service_code | |
| d_bill_place_of_service_key | 0 |
| d_place_of_service_code | 11 |
| d_place_of_service_key | 7.87349E+11 |
| data_source_code | CO |
| delegated_ind | N |
| discount_type_code | D |
| earliest_service_from_date | ######## |
| encounter_code | 0 |
| episode_of_pymt_bundle_code | |
| episode_of_pymt_clnc_crit_code | |
| episode_of_pymt_mnl_intvn_code | |
| episode_of_pymt_pricing_amt | None |
| episode_of_pymt_service_code | |
| exception_process_rsn_code | |
| hct_lvl_nbr | 0 |
| hct_orig_lvl_nbr | 0 |
| header_diagnosis_10_code | |
| header_diagnosis_11_code | |
| header_diagnosis_12_code | |
| header_diagnosis_1_code | J3089 |
| header_diagnosis_1_key | 7.45149E+18 |
| header_diagnosis_2_code | |
| header_diagnosis_2_key | 3 |
| header_diagnosis_3_code | |
| header_diagnosis_3_key | 3 |
| header_diagnosis_4_code | |
| header_diagnosis_4_key | 3 |
| header_diagnosis_5_code | |
| header_diagnosis_5_key | 3 |
| header_diagnosis_6_code | |
| header_diagnosis_7_code | |
| header_diagnosis_8_code | |
| header_diagnosis_9_code | |
| header_earliest_date | ######## |
| header_latest_date | ######## |
| header_reason_code | 0 |
| header_reason_key | 6.77979E+17 |
| icd_version_code | 10 |
| industry_product_code | OTH |
| latest_service_thru_date | ######## |
| medical_claims_processor_code | C |
| member_coverage_key | ########### |
| ndc_code | |
| ndc_key | 1 |
| ndc_quantity | None |
| ndc_unit_of_measure_code | |
| nhi_authorization_nbr | |
| nhi_claim_nbr | ########### |
| nhi_individual_id | ########### |
| nhi_member_system_id | ########### |
| nhi_orig_close_claim_nbr | |
| original_close_claim_nbr | |
| override_code | |
| override_key | 1 |
| pcp_provider_key | ########### |
| procedure_modifier_1_code | |
| procedure_modifier_1_key | 1 |
| procedure_modifier_2_code | |
| procedure_modifier_2_key | 1 |
| procedure_modifier_2_code | |
| procedure_modifier_3_key | 1 |
| procedure_modifier_4_code | |
| procedure_modifier_4_key | 1 |
| procedure_modifier_5_code | |
| procedure_modifier_5_key | 1 |
| product_code | 1003 |
| product_key | ########### |
| provider_geographic_key | ########### |
| provider_key | ########### |
| provider_location_key | ########### |
| provider_npi_nbr | ########### |
| provider_par_code | P |
| quantity_units | 1 |
| referring_provider_key | ########### |
| referring_provider_npi_nbr | ########### |
| rendering_provider_key | ########### |
| rendering_provider_npi_nbr | ########### |
| service_diagnosis_1_code | J3089 |
| service_diagnosis_1_key | 7.45149E+18 |
| service_diagnosis_3_code | |
| service_diagnosis_2_key | 3 |
| service_diagnosis_3_code | |
| service_diagnosis_3_key | 3 |
| service_diagnosis_4_code | |
| service_from_date | ######## |
| service_line_nbr | 1 |
| service_post_date | ######## |
| service_procedure_code | 95117 |
| service_procedure_key | 5.78349E+14 |
| service_reason_code | 32 |
| service_reason_key | 6.77979E+13 |
| service_thru_date | 1/11/2017 |
| source_dtl_srvc_line_nbr | 1 |
| srvc_unit_cnt | 1 |
| update_date | ######## |
| update_process_id | RDM_PL_REKEY |

FIGURE 83 C: UDRCD DATASTRUCTURE

| | |
|---|---|
| adjusted_claim_ind | N |
| adjusted_hcnc_code | 2 |
| admit_diag_cd | None |
| admit_channel_code | None |
| admit_type_code | None |
| amt_allowed | ##.## |
| amt_benefit_limit | ##.## |
| amt_benefit_payable | ##.## |
| amt_calculated_paid | ##.## |
| amt_cob_reduction | ##.## |
| amt_cob_savings | ##.## |
| amt_coinsurance | ##.## |
| amt_copay | ##.## |
| amt_covered | ##.## |
| amt_deductible | ##.## |
| amt_discount | ##.## |
| amt_duplicate_charge | ##.## |
| amt_eligible | ##.## |
| amt_encounter | ##.## |
| amt_net_paid | ##.## |
| amt_non_duplicate_charge | ##.## |
| amt_pfa | ##.## |
| amt_provider_sanction | ##.## |
| amt_reduction | ##.## |
| amt_reserve | ##.## |
| amt_specialty_negotiated | ##.## |
| amt_submitted_charge | ##.## |
| attending_provider_key | None |
| attending_provider_npi_nbr | None |
| benefit_level_code | 5 |
| bill_procedure_code | |
| bill_procedure_key | 0 |
| bill_type_code | None |
| bill_type_frequency_code | |
| billing_provider_key | ########### |
| billing_provider_npi_nbr | ########### |
| business_line_code | MCR |
| charge_status_code | P |
| claim_capitation_status_code | None |
| claim_class_code | None |
| claim_type | P |
| cob_code | |
| copay_type_code | 0 |
| cosmos_legal_entity | 2000 |
| cosmos_site_code | PVS |
| count_visits | 0 |
| coverage_type_code | M |
| customer_segment_key | ########### |
| customer_segment_nbr | ########### |
| d_bill_place_of_service_code | |
| d_bill_place_of_service_key | 0 |
| d_discharge_status_code | None |
| d_place_of_service_code | 11 |
| d_place_of_service_key | 7.97349E+11 |
| data_source_code | CO |
| delegated_ind | N |
| discount_type_code | D |
| drg_code | None |
| drg_key | None |
| earliest_service_from_date | ######## |
| encounter_code | 0 |
| episode_of_pymt_bundle_code | |
| episode_of_pymt_clro_crit_code | |
| episode_of_pymt_cont_intvn_code | |
| episode_of_pymt_pricing_amt | None |
| episode_of_pymt_service_code | |
| exception_process_rsn_code | |
| fcl_lvl_nbr | 0 |
| fcl_orig_lvl_nbr | 0 |
| header_diagnosis_10_code | |
| header_diagnosis_11_code | |
| header_diagnosis_12_code | |
| header_diagnosis_13_code | None |
| header_diagnosis_14_code | None |
| header_diagnosis_15_code | None |
| header_diagnosis_16_code | None |
| header_diagnosis_17_code | None |
| header_diagnosis_18_code | None |
| header_diagnosis_19_code | None |
| header_diagnosis_1_code | C61 |
| header_diagnosis_1_key | 6.75449E+12 |
| header_diagnosis_20_code | None |
| header_diagnosis_21_code | None |
| header_diagnosis_22_code | None |
| header_diagnosis_23_code | None |
| header_diagnosis_24_code | None |
| header_diagnosis_25_code | None |
| header_diagnosis_2_code | I82491 |
| header_diagnosis_2_key | 7.35651E+18 |
| header_diagnosis_3_code | |
| header_diagnosis_3_key | 3 |
| header_diagnosis_4_code | |
| header_diagnosis_4_key | 3 |
| header_diagnosis_5_code | |
| header_diagnosis_5_key | 3 |
| header_diagnosis_6_code | |
| header_diagnosis_6_key | None |
| header_diagnosis_7_code | |
| header_diagnosis_7_key | None |
| header_diagnosis_8_code | |
| header_diagnosis_8_key | None |
| header_diagnosis_9_code | |
| header_diagnosis_9_key | None |
| header_earliest_date | ######## |
| header_latest_date | ######## |
| header_procedure_10_code | None |
| header_procedure_11_code | None |
| header_procedure_12_code | None |
| header_procedure_13_code | None |
| header_procedure_14_code | None |
| header_procedure_15_code | None |
| header_procedure_16_code | None |
| header_procedure_17_code | None |
| header_procedure_18_code | None |
| header_procedure_19_code | None |
| header_procedure_1_code | None |
| header_procedure_1_key | None |
| header_procedure_20_code | None |
| header_procedure_21_code | None |
| header_procedure_22_code | None |
| header_procedure_23_code | None |
| header_procedure_24_code | None |
| header_procedure_25_code | None |
| header_procedure_2_code | None |
| header_procedure_2_key | None |
| header_procedure_3_code | None |
| header_procedure_3_key | None |
| header_procedure_4_code | None |
| header_procedure_4_key | None |
| header_procedure_5_code | None |
| header_procedure_5_key | None |
| header_procedure_6_code | None |
| header_procedure_6_key | None |
| header_procedure_7_code | None |
| header_procedure_8_code | None |
| header_procedure_9_code | None |
| header_reason_code | 0 |
| header_reason_key | 6.77979E+17 |
| icd_version_code | 10 |
| industry_product_code | OTH |
| latest_service_thru_date | ######## |
| medical_claims_processor_code | C |
| member_coverage_key | ########### |
| month | 5 |
| ndc_code | |
| ndc_key | 1 |
| ndc_quantity | None |
| ndc_unit_of_measure_code | |
| nhi_alloc_amt_allowed_ind | None |
| nhi_alloc_amt_calculated_ind | None |
| nhi_alloc_amt_paid_ind | None |
| nhi_authorization_nbr | |
| nhi_claim_nbr | ########### |
| nhi_individual_id | ########### |
| nhi_member_system_id | ########### |
| nhi_orig_close_claim_nbr | |
| nhi_place_of_service_code | None |
| original_close_claim_nbr | |
| override_code | |
| override_key | 1 |
| pcp_provider_key | ########### |
| present_on_admission_10_code | None |
| present_on_admission_11_code | None |
| present_on_admission_12_code | None |
| present_on_admission_13_code | None |
| present_on_admission_14_code | None |
| present_on_admission_15_code | None |
| present_on_admission_16_code | None |
| present_on_admission_17_code | None |
| present_on_admission_18_code | None |
| present_on_admission_19_code | None |
| present_on_admission_1_code | None |
| present_on_admission_20_code | None |
| present_on_admission_21_code | None |
| present_on_admission_22_code | None |
| present_on_admission_23_code | None |
| present_on_admission_24_code | None |
| present_on_admission_25_code | None |
| present_on_admission_2_code | None |
| present_on_admission_3_code | None |
| present_on_admission_4_code | None |
| present_on_admission_5_code | None |
| present_on_admission_6_code | None |
| present_on_admission_7_code | None |
| present_on_admission_8_code | None |
| present_on_admission_9_code | None |
| procedure_modifier_1_code | |
| procedure_modifier_1_key | 1 |
| procedure_modifier_2_code | |
| procedure_modifier_2_key | 1 |
| procedure_modifier_3_code | |
| procedure_modifier_3_key | 1 |
| procedure_modifier_4_code | |
| procedure_modifier_4_key | 1 |
| procedure_modifier_5_code | |
| procedure_modifier_5_key | 1 |
| product_code | ########### |
| product_key | ########### |
| provider_geographic_key | ########### |
| provider_key | ########### |
| provider_location_key | ########### |
| provider_npi_nbr | ########### |
| provider_par_code | P |
| quantity_units | 1 |
| referring_provider_key | ########### |
| referring_provider_npi_nbr | ########### |
| rendering_provider_key | ########### |
| rendering_provider_npi_nbr | ########### |
| revenue_code | None |
| revenue_key | None |
| service_diagnosis_1_code | I82491 |
| service_diagnosis_1_key | 7.35651E+18 |
| service_diagnosis_2_code | C61 |
| service_diagnosis_2_key | 6.75449E+12 |
| service_diagnosis_3_code | |
| service_diagnosis_3_key | 3 |
| service_diagnosis_4_code | |
| service_from_date | ######## |
| service_line_nbr | 2 |
| service_post_date | ######## |
| service_procedure_code | 85610 |
| service_procedure_key | 5653544948 1 |
| service_reason_code | 38 |
| service_reason_key | 6.77979E+21 |
| service_thru_date | ######## |
| source_dtl_srvc_line_nbr | 2 |
| srvc_unit_cnt | 1 |
| ub92_revenue_rlt_ind | None |
| update_date | ######## |
| update_process_id | RDM_PL_REKEY |
| year | #### |

FIGURE 84: UDRCD DATA FLOW
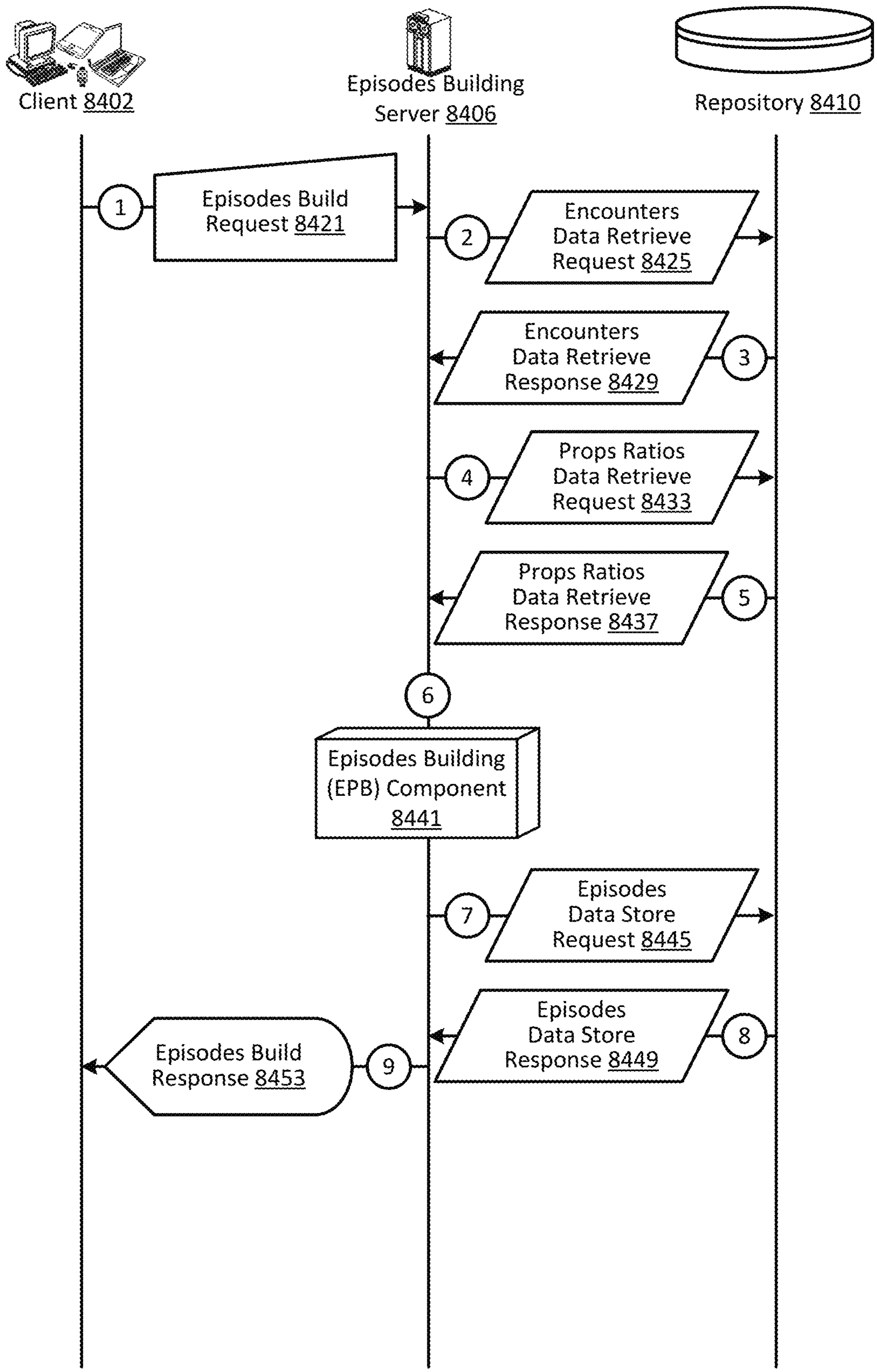

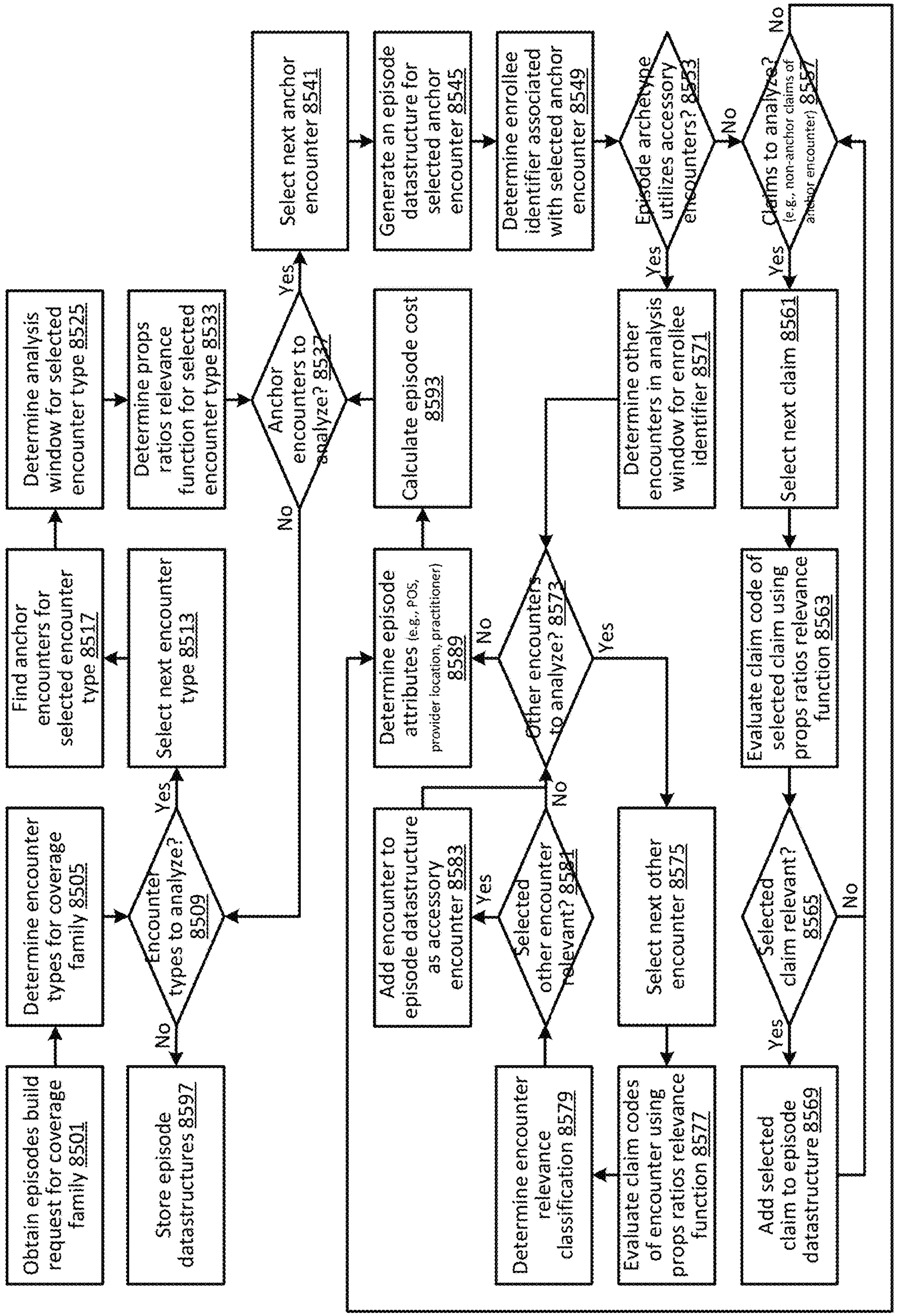
FIGURE 85: UDRCD EPB COMPONENT

FIGURE 86: UDRCD DATASTRUCTURE

| Column | Description |
|---|---|
| event | Encounter Type Name |
| enrolid | Enrollee ID |
| ep_id | Episode ID |
| wdstart | Episode Window Start Date |
| wdend | Episode Window End Date |
| ep_cost | Episode Allowed Cost Amount |
| encounter_id | Encounter ID |
| dtstart | Encounter Start Date |
| dtend | Encounter End Date |
| year | Year of Episode |
| visit_type | Detailed Location Descriptor |
| Bind_standard_location | Standard Location Descriptor |
| F_provider_key | Attributed Facility Provider Key |
| F_unique_id | Attributed Facility Unique Identifier |
| F_mpin | Attributed Facility MPIN |
| F_primary_tax_id | Attributed Facility Primary Tax ID |
| F_npi_lvl_cd | Attributed Facility NPI Level Code |
| F_npi_nbr | Attributed Facility NPI Number |
| F_provider_name | Attributed Facility Name |
| F_taxonomy_code | Attributed Facility Taxonomy Code |
| F_eff_date | Attributed Facility Effective Date |
| F_end_date | Attributed Facility End Date |
| F_address_1 | Attributed Facility Address Line 1 |
| F_address_2 | Attributed Facility Address Line 2 |
| F_city_name | Attributed Facility City Name |
| F_state_code | Attributed Facility State Code |
| F_zipcode | Attributed Facility Zip Code |
| F_claim_type | Attributed Facility Claim Type |
| F_entity_code | Attributed Facility Entity Code |
| P_provider_key | Attributed Provider Provider Key |
| P_unique_id | Attributed Provider Unique Identifier |
| P_mpin | Attributed Provider MPIN |
| P_primary_tax_id | Attributed Provider Primary Tax ID |
| P_npi_lvl_cd | Attributed Provider NPI Level Code |
| P_npi_nbr | Attributed Provider NPI Number |
| P_provider_name | Attributed Provider Name |
| P_taxonomy_code | Attributed Provider Taxonomy Code |
| P_efP_date | Attributed Provider Effective Date |
| P_end_date | Attributed Provider End Date |
| P_address_1 | Attributed Provider Address Line 1 |
| P_address_2 | Attributed Provider Address Line 2 |
| P_city_name | Attributed Provider City Name |
| P_state_code | Attributed Provider State Code |
| P_zipcode | Attributed Provider Zip Code |
| P_claim_type | Attributed Provider Claim Type |
| P_entity_code | Attributed Provider Entity Code |
| min_dobyr | Enrollee's Minimum Date of Birth Year |
| max_dobyr | Enrollee's Maximum Date of Birth Year |
| ambiguous_age | Ambiguous age Boolean flag |
| age | Enrollee Age |
| adj_episode_cost | Adjusted Episode Cost |
| adj_reason | Adjustment Reason |

FIGURE 87: UDRCD DATA FLOW
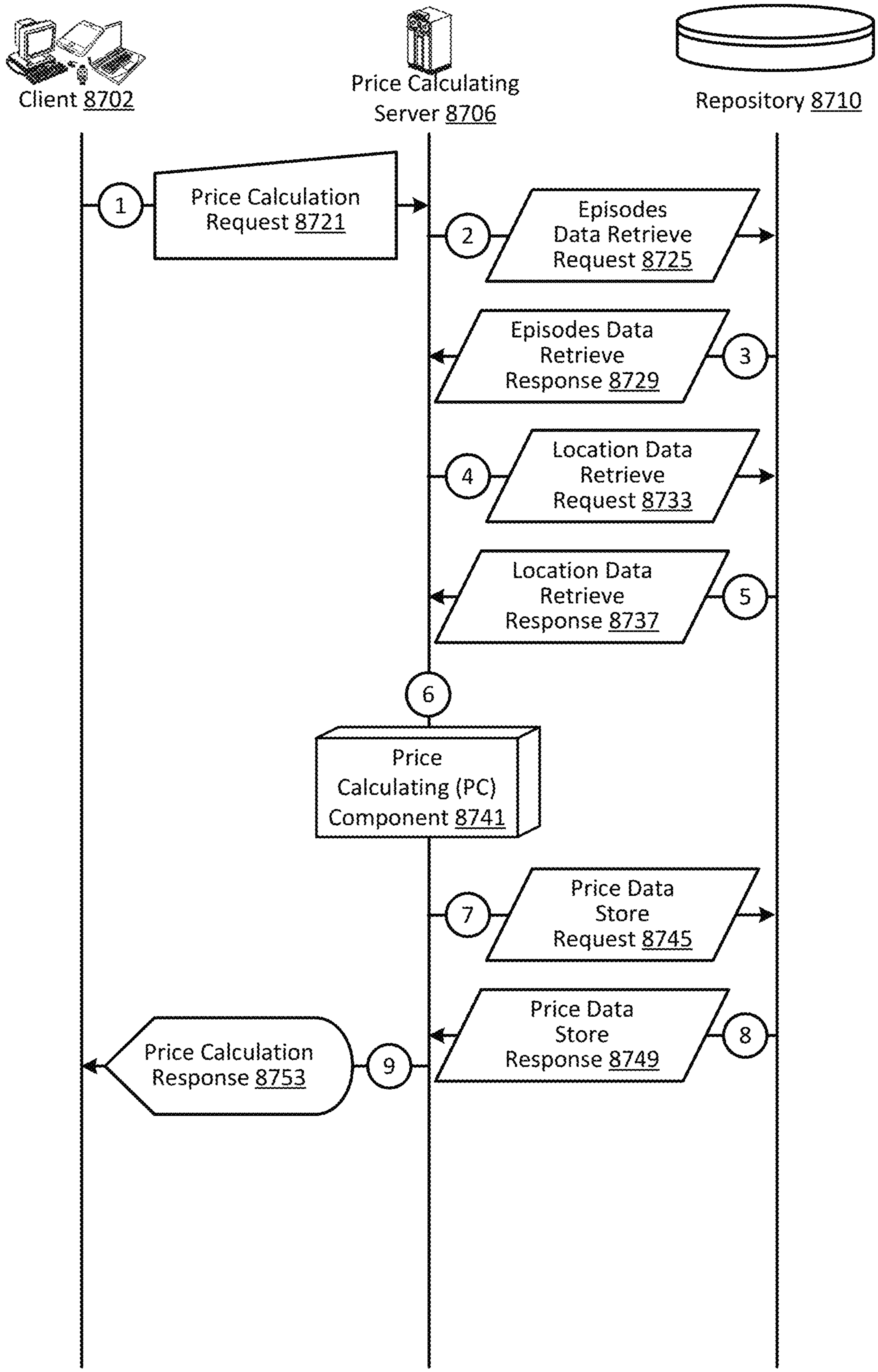

FIGURE 88: UDRCD PC COMPONENT
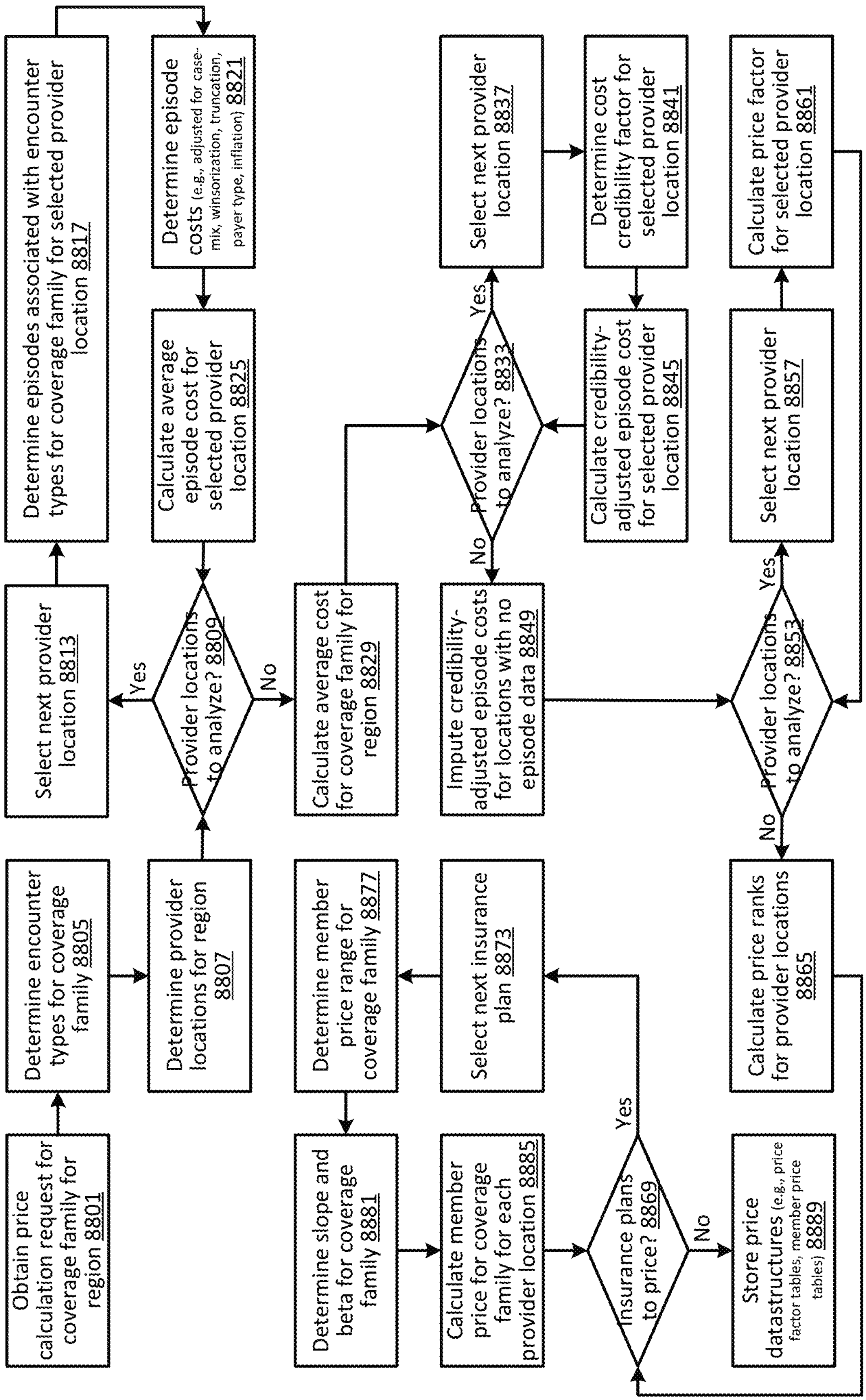

FIGURE 89A: UDRCD IMPLEMENTATION CASE
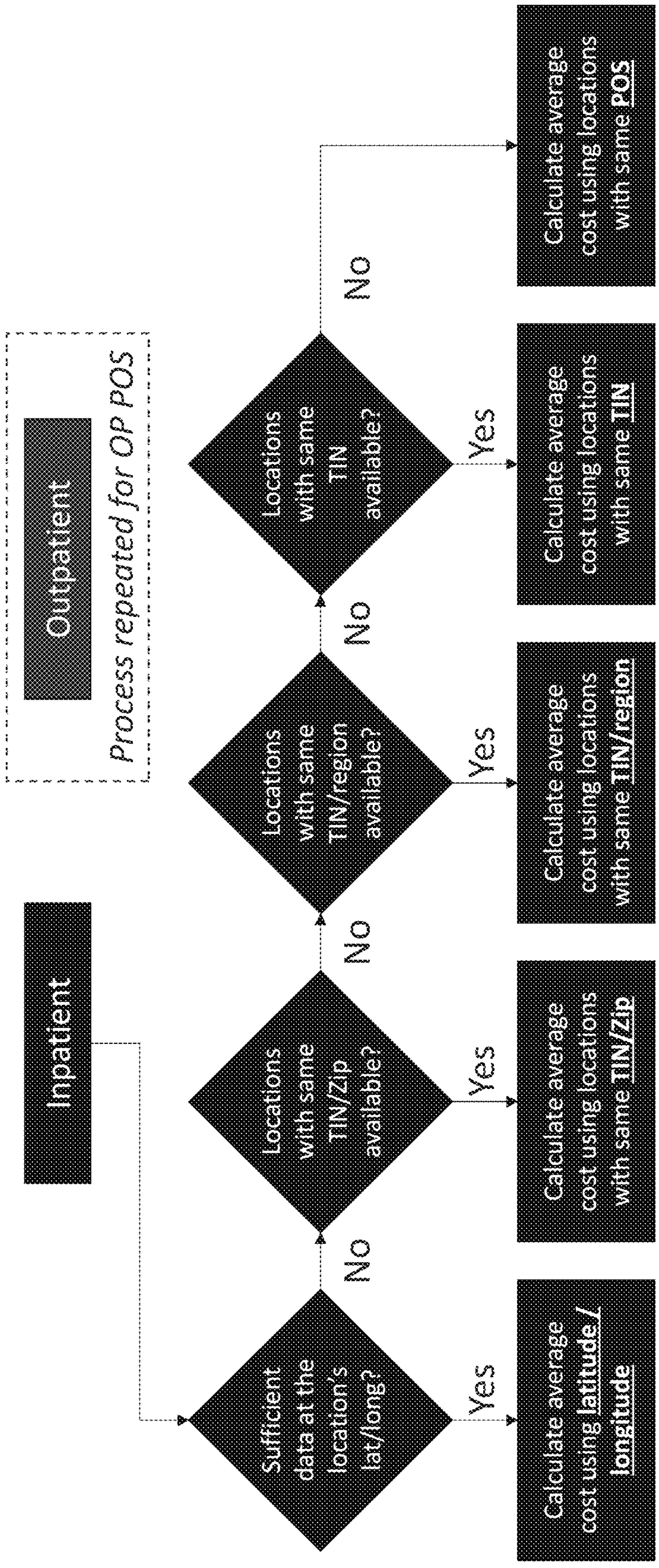

FIGURE 89B: UDRCD IMPLEMENTATION CASE

Level 1

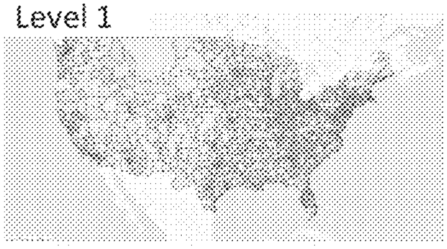

2,052 smaller regions for services that are regular and for which people will not travel long distances.

Service Types:

- Physical Therapy
- Occupational Therapy
- Office Visits

Level 2

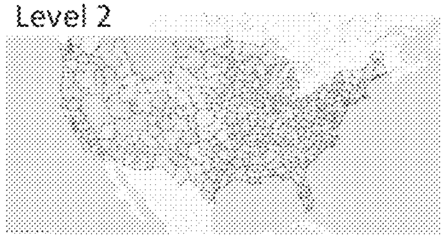

408 moderate sized regions for services that are not frequently used or have less available options, and for which significant travel time is unwarranted or feasible.

Service Types:

- Maternity/Delivery
- High Tech Diagnostic Imaging
- Colonoscopies
- Speech Therapy Level 3

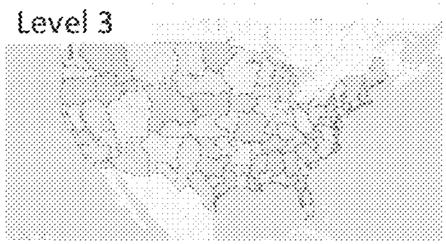

83 larger regions for services that are not frequently used, are plannable in nature, and have high cost variation.

Service Types:

- Coverages requiring activation
- Example Coverage Families (Thyroidectomy, Parathyroidectomy, Colon Surgery, Small Bowel Surgery)

FIGURE 90: UDRCD DATASTRUCTURE

Location Price Factor Table Specification

| Column | Type | Values |
|---|---|---|
| location_id | string | *example: 21c45ce068af02a0ac06b11e75d82b55450a659a* |
| pos_type | string | INPATIENT HOSPITAL, OUTPATIENT HOSPITAL |
| treatment_type_code | string | *example: Z001020* |
| price_factor | float64 | *example: 1.151* |
| rank | int32 | 0-100 |
| effective_date | date | *example: 2021-04-01* |
| term_date | date | *example: 9999-12-31* |
| pricing_version | string | *example: 2021q1.v1* |

Practitioner Price Factor Table Specification

| Column | Type | Values |
|---|---|---|
| npi | string | *examples: 1003044363* |
| treatment_type_code | string | Z005100 |
| rank | int32 | 0-100 |
| price_factor | float | *example: 1.511* |
| effective_date | date | *example: 2021-04-01* |
| term_date | date | *example: 9999-12-31* |
| pricing_version | string | *example: 2021q1.v1* |

FIGURE 91A: UDRCD SCREENSHOT
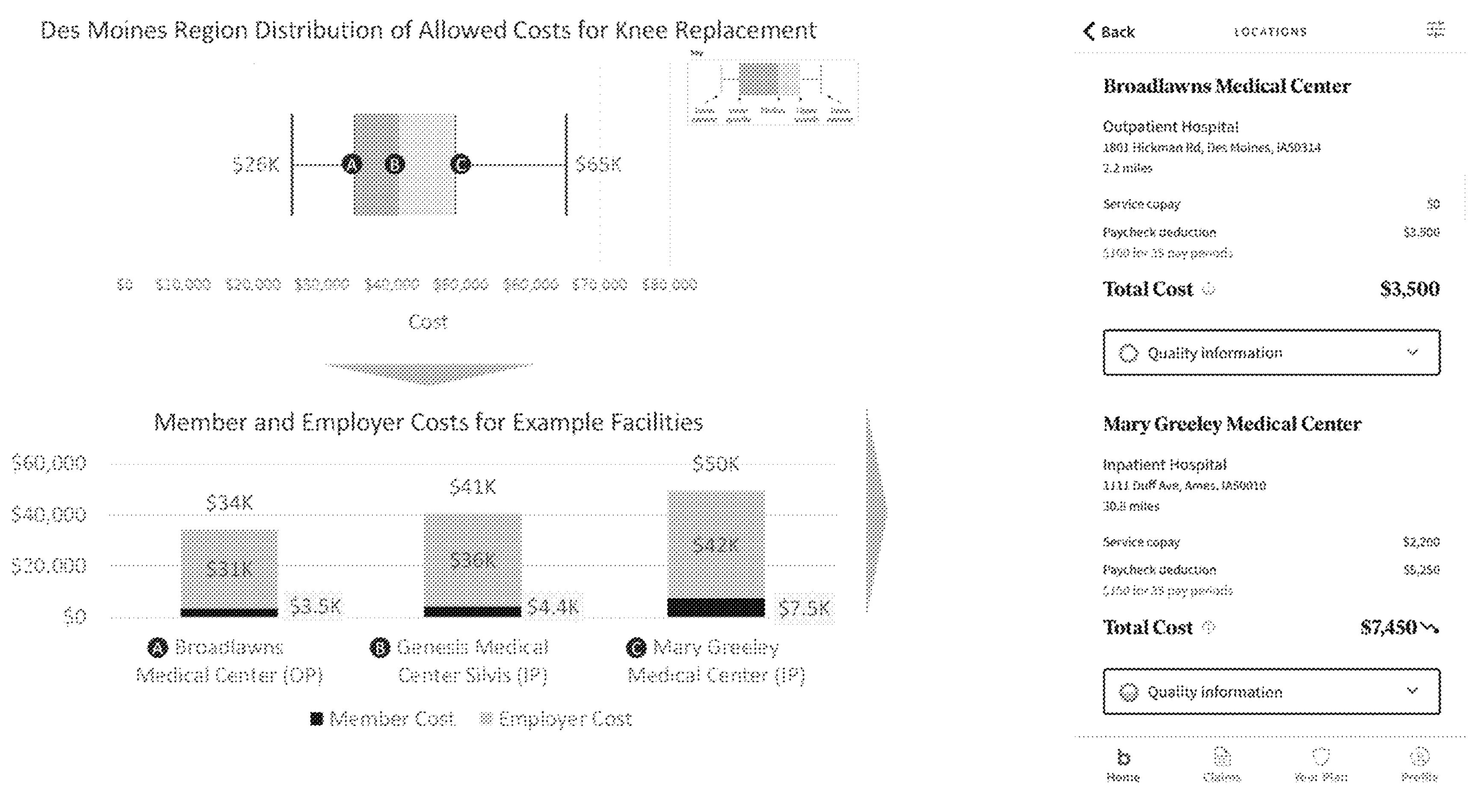

FIGURE 91B: UDRCD SCREENSHOT
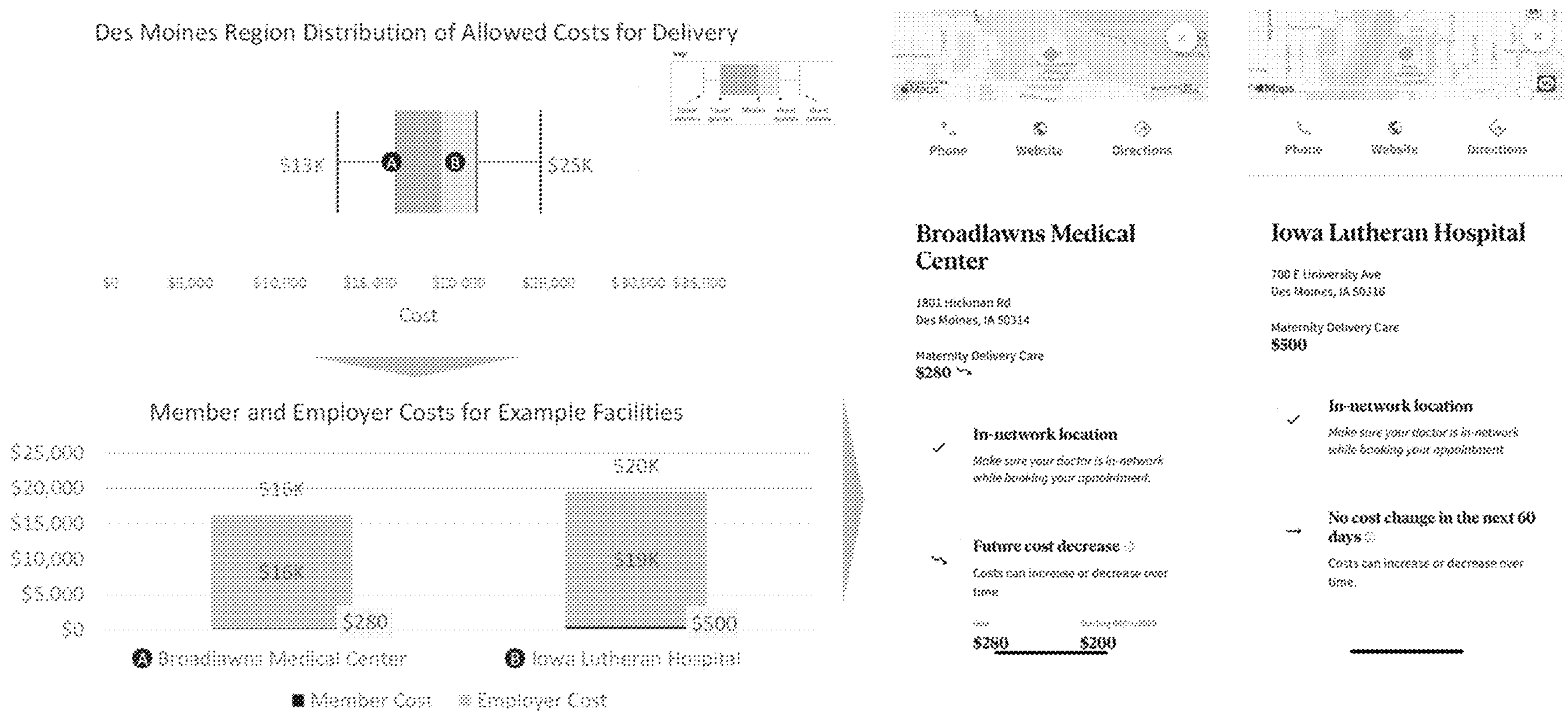

FIGURE 91 C: UDRCD SCREENSHOT
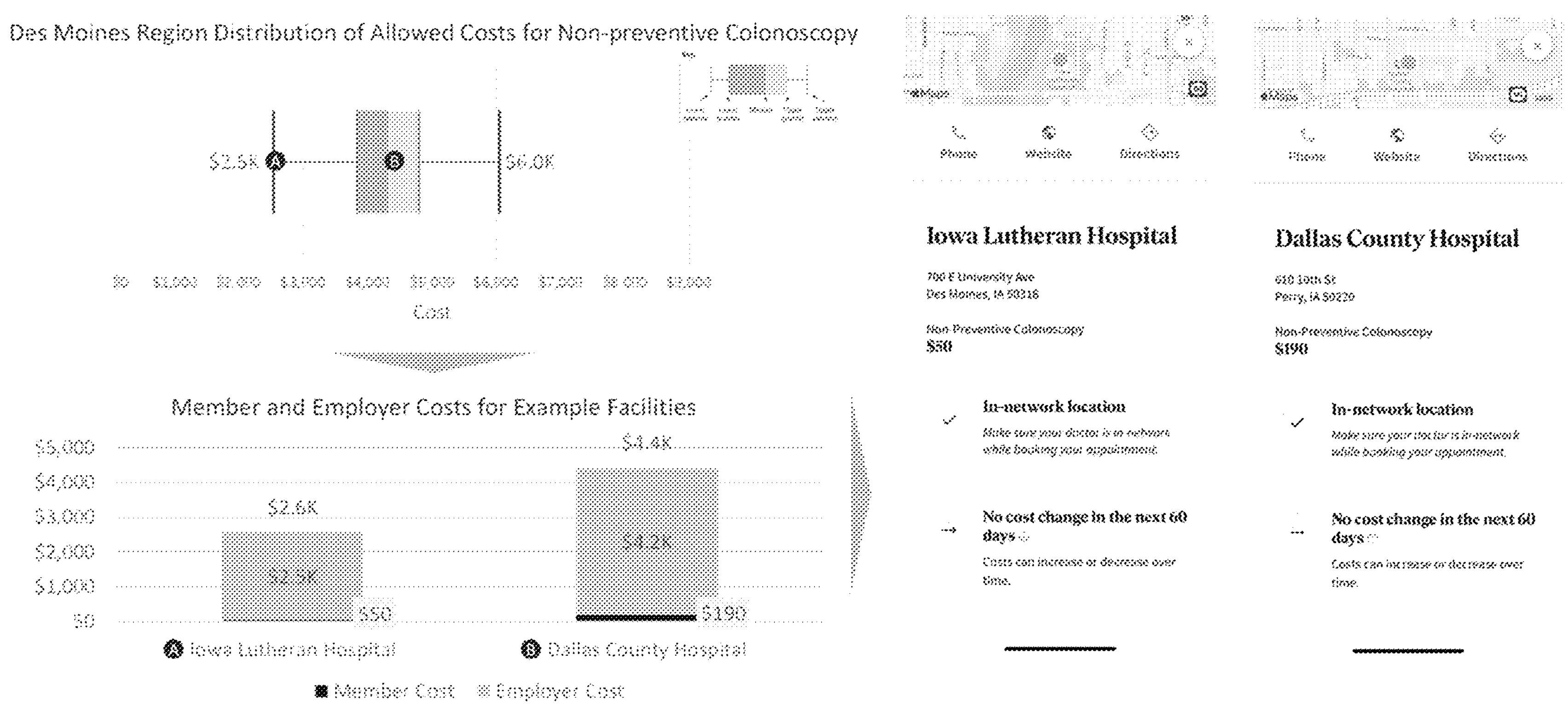

FIGURE 92A: UDRCD SCREENSHOT
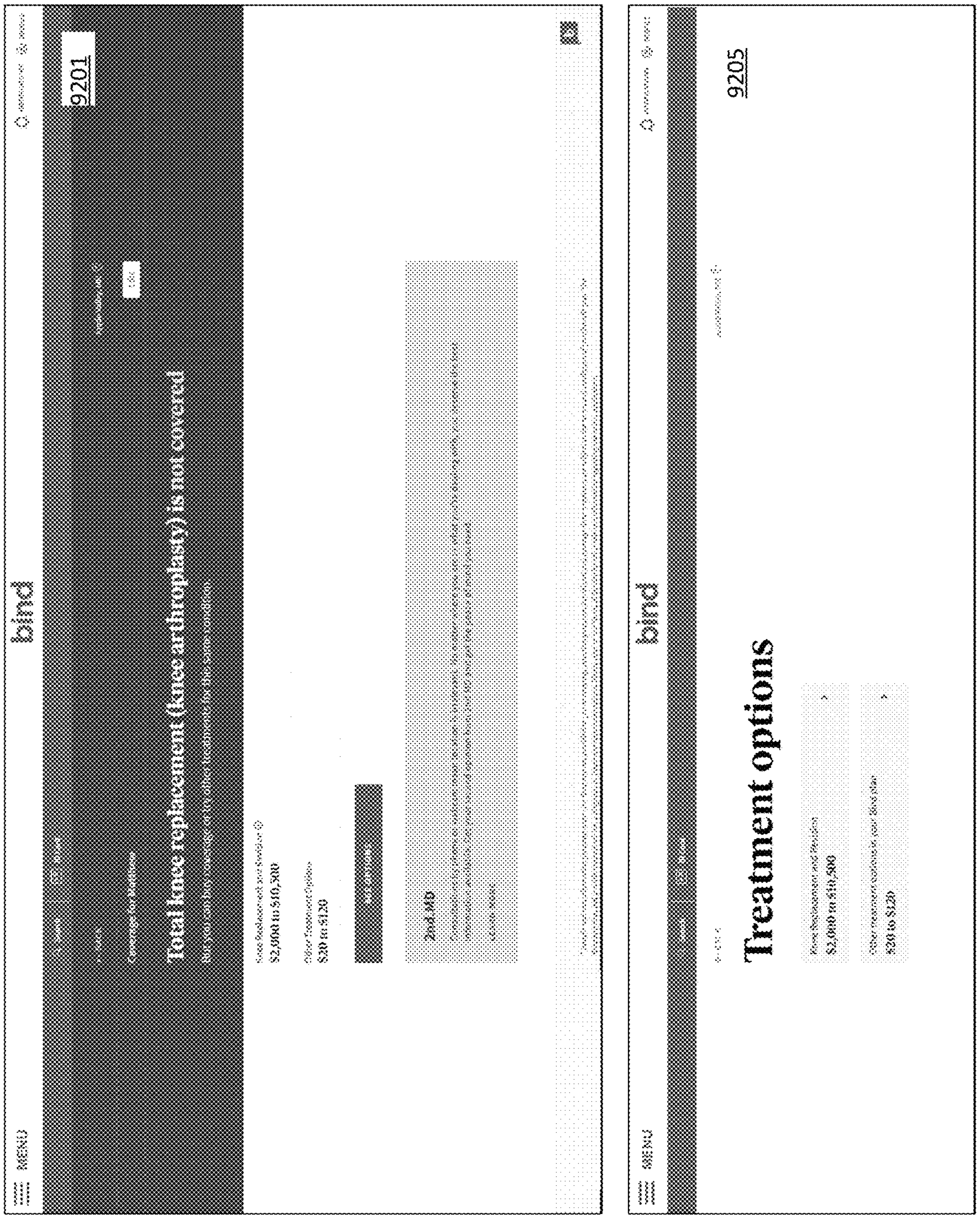

FIGURE 92B: UDRCD SCREENSHOT
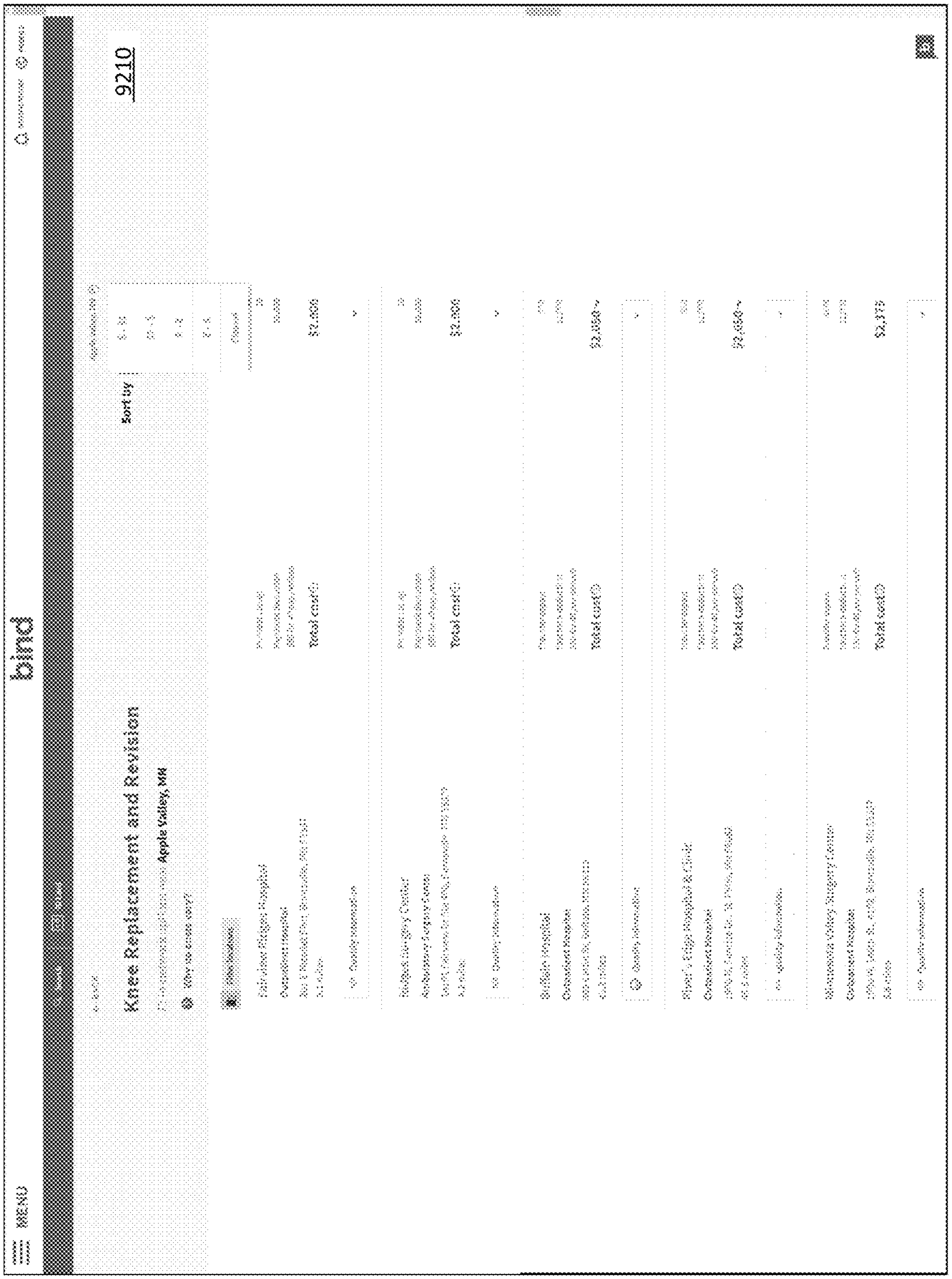

FIGURE 92 C: UDRCD SCREENSHOT
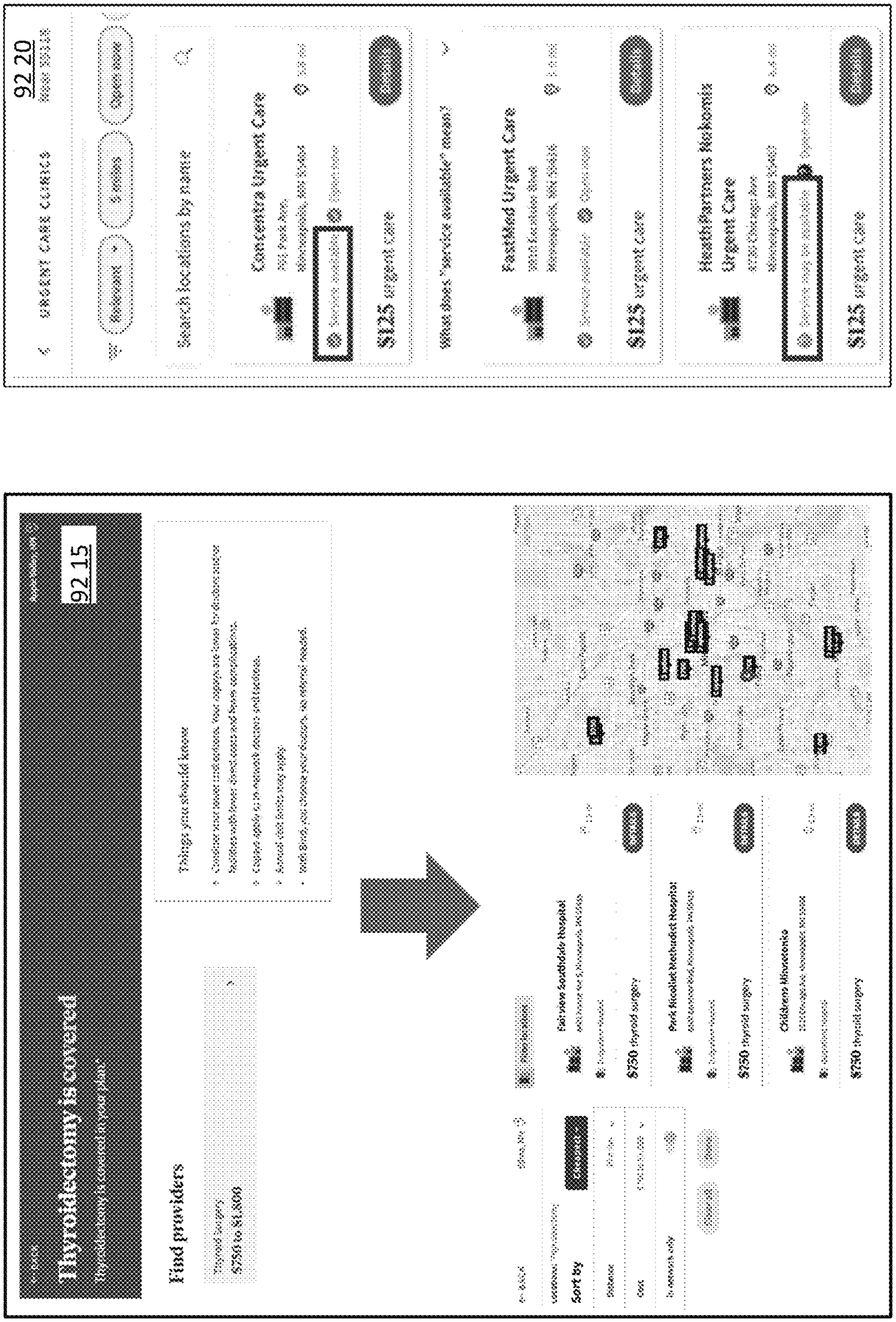

FIGURE 93: UDRCD DATA FLOW
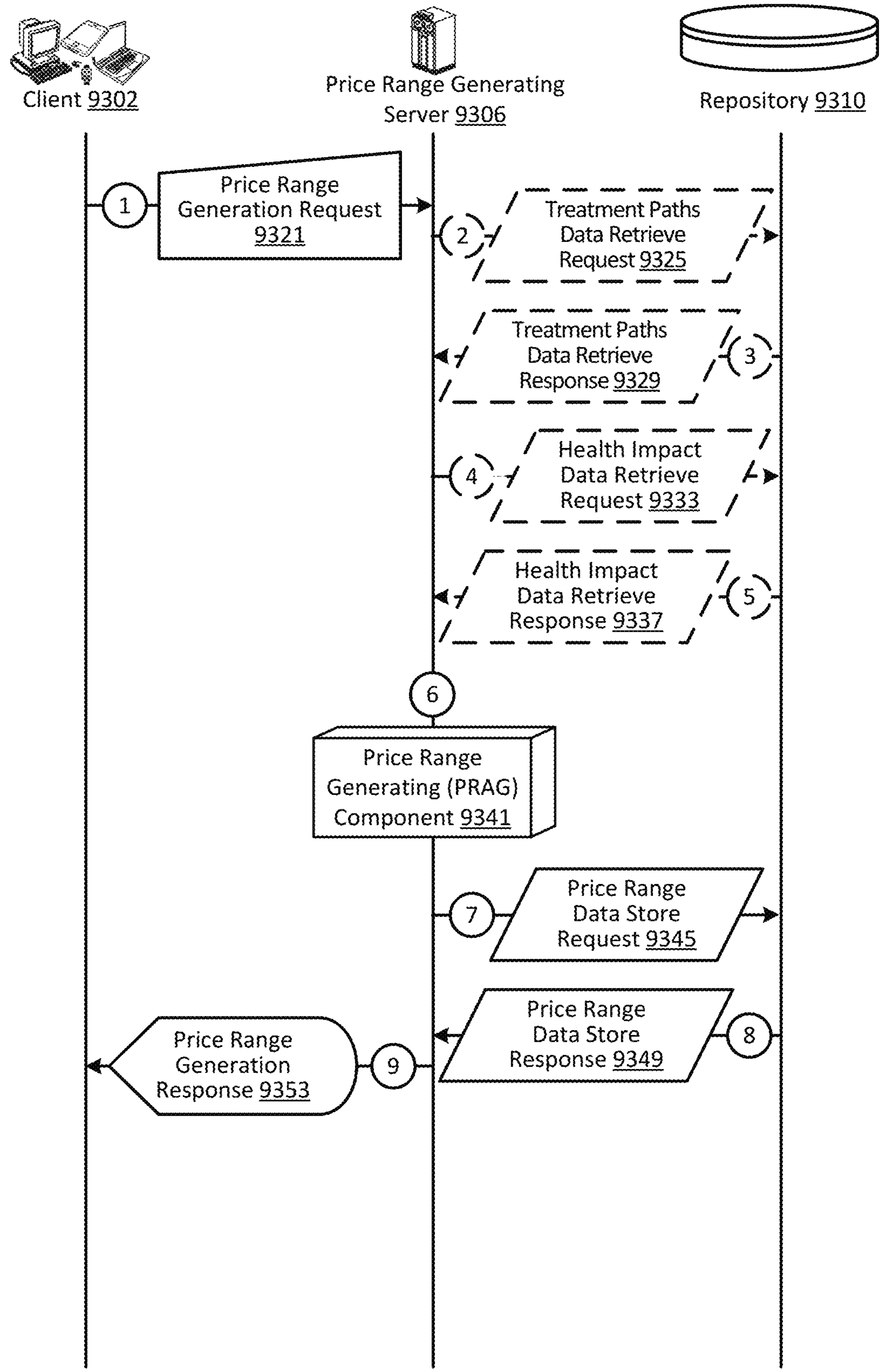

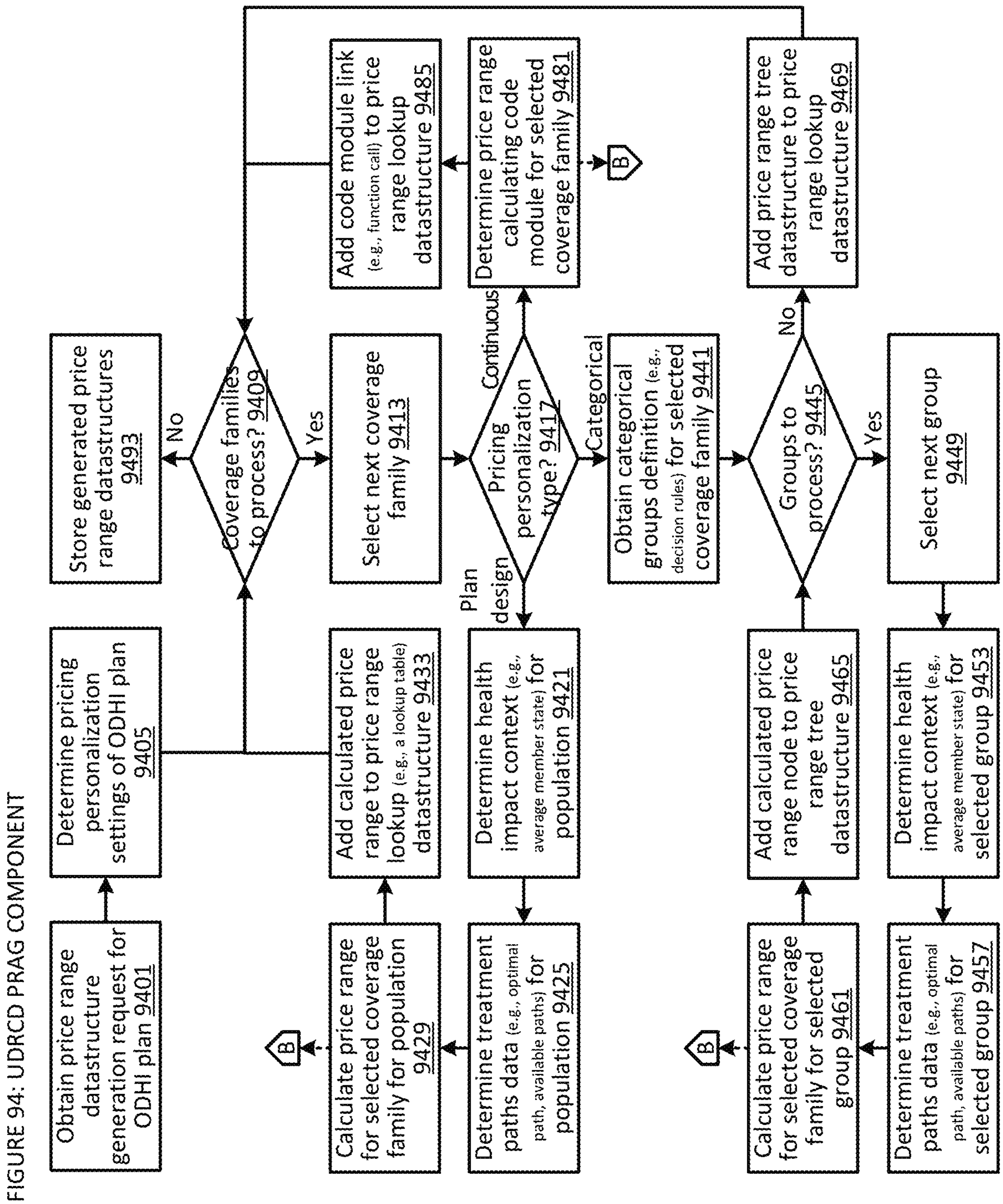
FIGURE 94: UDRCD PRAG COMPONENT
Obtain price range datastructure generation request for ODHI plan 9401
Determine pricing personalization settings of ODHI plan 9405
Coverage families to process? 9409
No
Store generated price range datastructures 9493
Yes
Select next coverage family 9413
Pricing personalization type? 9417
Plan design
Continuous
Categorical
Determine health impact context (e.g., average member state) for population 9421
Determine treatment paths data (e.g., optimal path, available paths) for population 9425
Calculate price range for selected coverage family for population 9429
B
Add calculated price range to price range lookup (e.g., a lookup table) datastructure 9433
Determine price range calculating code module for selected coverage family 9481
B
Add code module link (e.g., function call) to price range lookup datastructure 9485
Obtain categorical groups definition (e.g., decision rules) for selected coverage family 9441
Groups to process? 9445
No
Add price range tree datastructure to price range lookup datastructure 9469
Yes
Select next group 9449
Determine health impact context (e.g., average member state) for selected group 9453
Determine treatment paths data (e.g., optimal path, available paths) for selected group 9457
Calculate price range for selected coverage family for selected group 9461
B
Add calculated price range node to price range tree datastructure 9465

FIGURE 95: UDRCD DATA FLOW
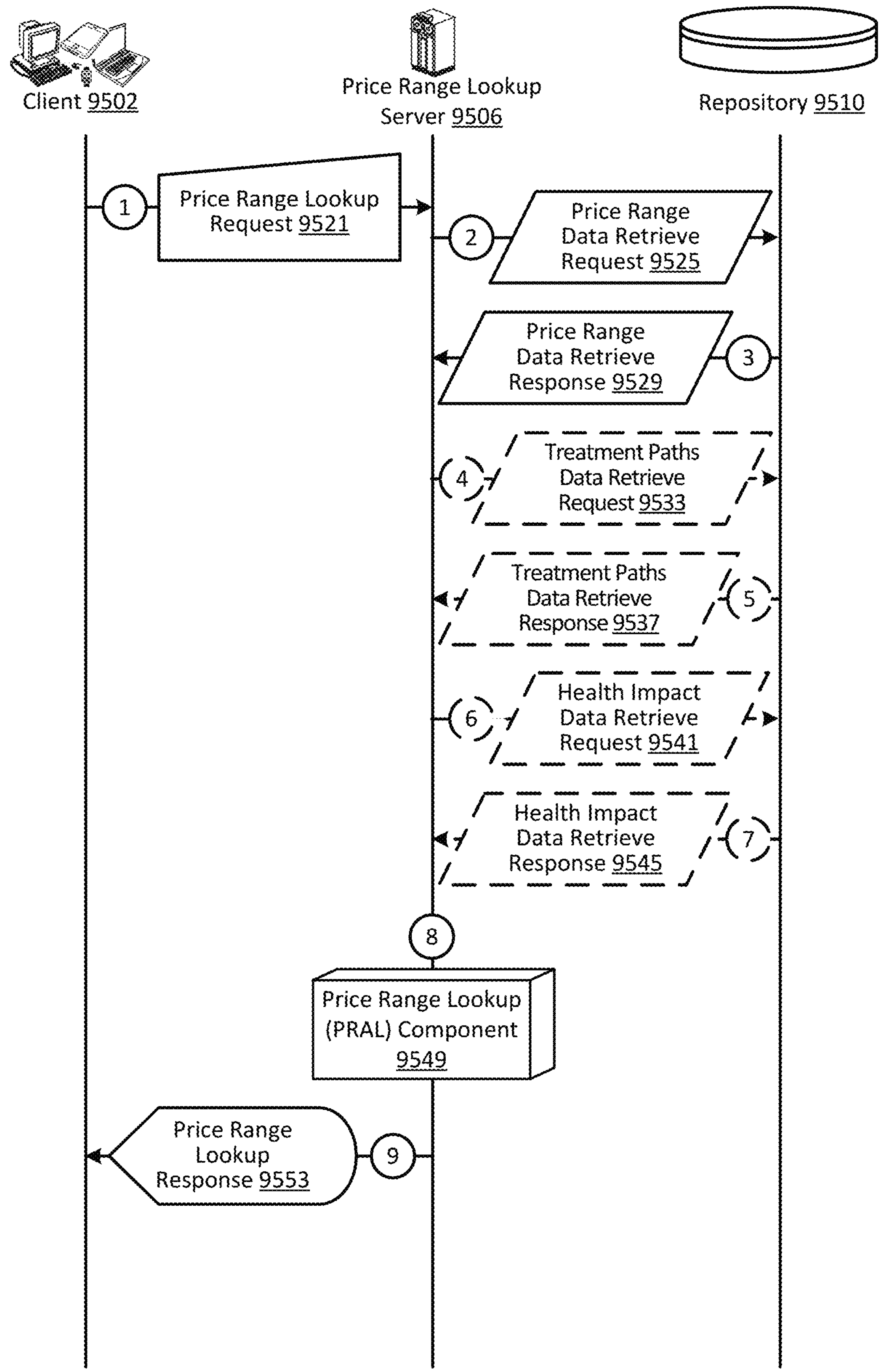

FIGURE 96: UDRCD PRAL COMPONENT
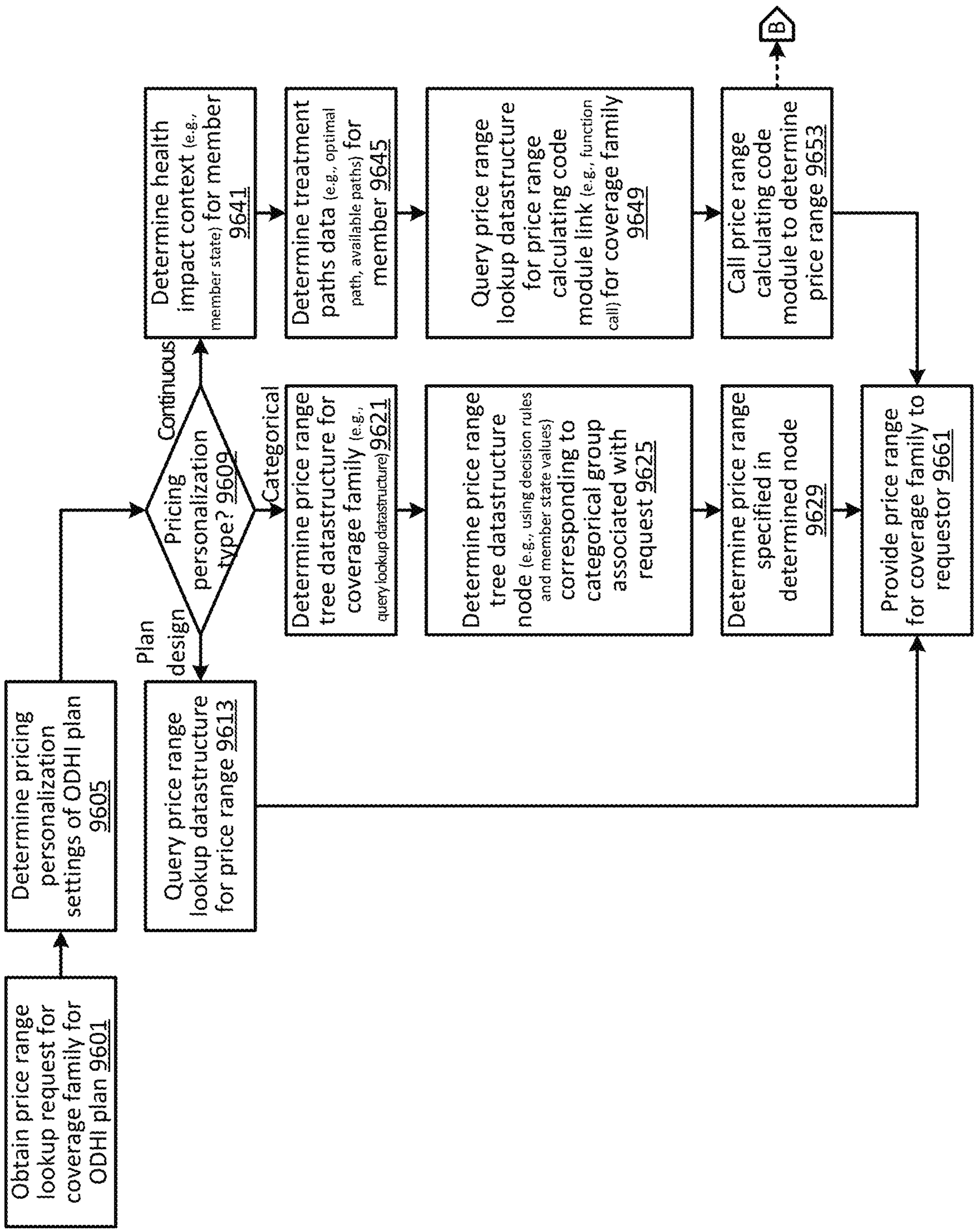

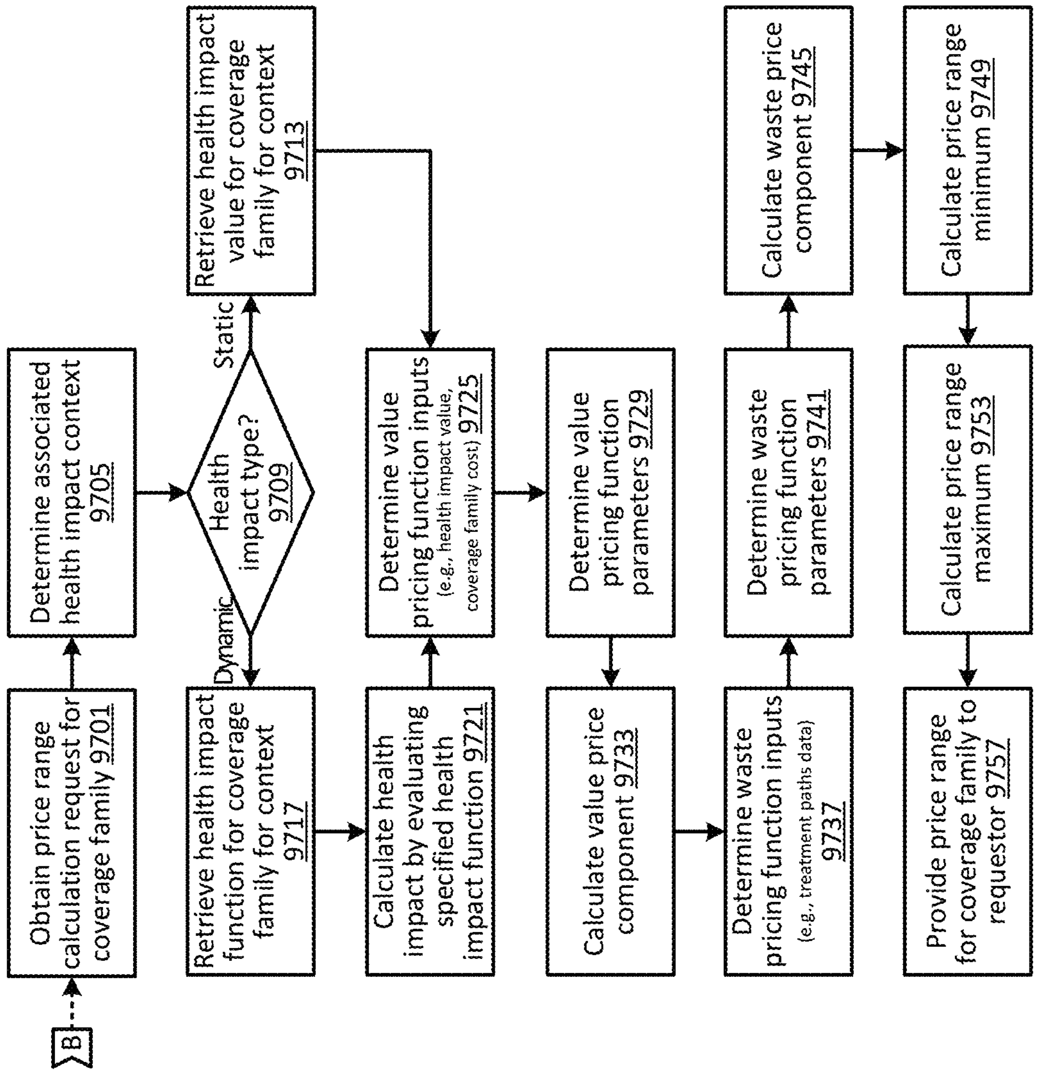
FIGURE 97: UDRCD PRAC COMPONENT

FIGURE 98: UDRCD IMPLEMENTATION CASE

Price has two components

Value Component

*Fundamental value of treatment based on efficacy and efficiency*

- Independent of condition
- Flexible design
- Maximum price limits can be adjusted by value as well

\+

Waste Component

*Relationship to other treatments for the same condition*

- Charge for using sub-optimal treatment for condition
- Based on amount that could be saved by using alternatives
- Goes away if alternatives not possible (context coverage)

Value component of price

- At lower costs the value component is approximated by
  - Price = (1-subsidy) * treatment cost,
  - where subsidy is a function of efficiency
- At high cost the it converges asymptotically to the max price

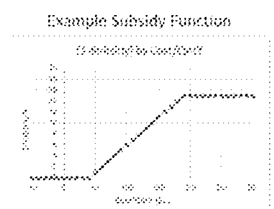

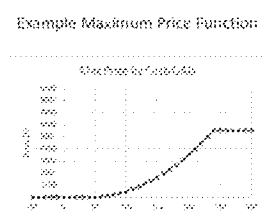

Waste

*Waste is the part of treatment cost that could have been saved by using higher value treatments available to the member with similar impact*

This may be different from inefficiency

- a high value treatment for heart disease could be wasteful if the member is not taking statins.

*Waste is the fastest rising component of healthcare cost*

FIGURE 99: UDRCD IMPLEMENTATION CASE
Effect of modifying the maximum price by value
*costs if Pathway cost = treatment cost*
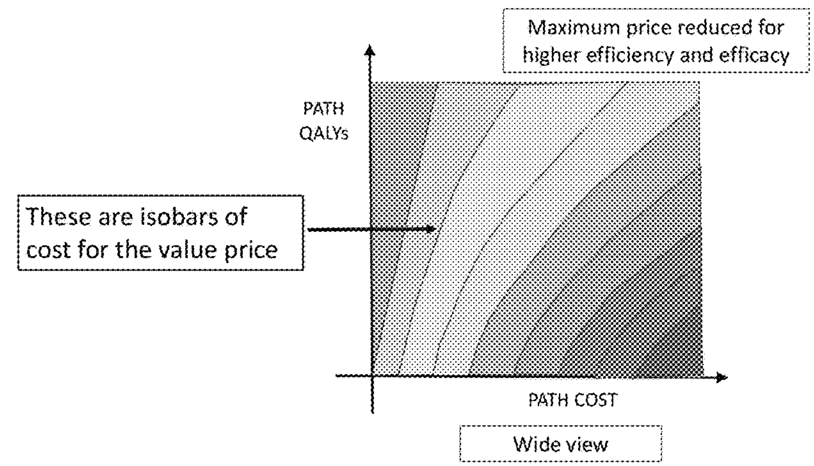
Greater penalty for harms
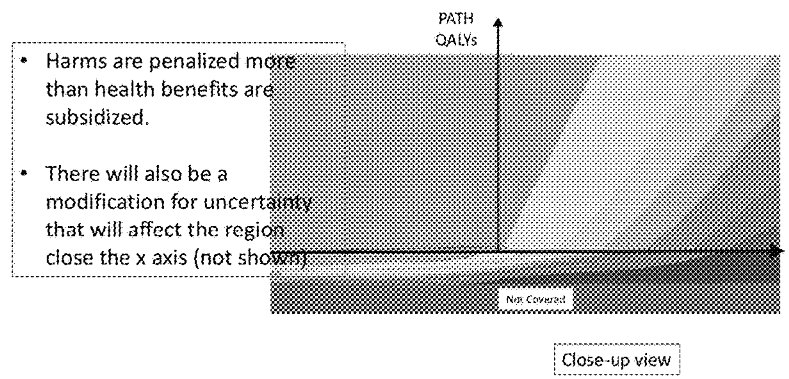

FIGURE 100: UDRCD IMPLEMENTATION CASE

Waste penalty calculation

*Uses a condition-specific efficiency threshold*

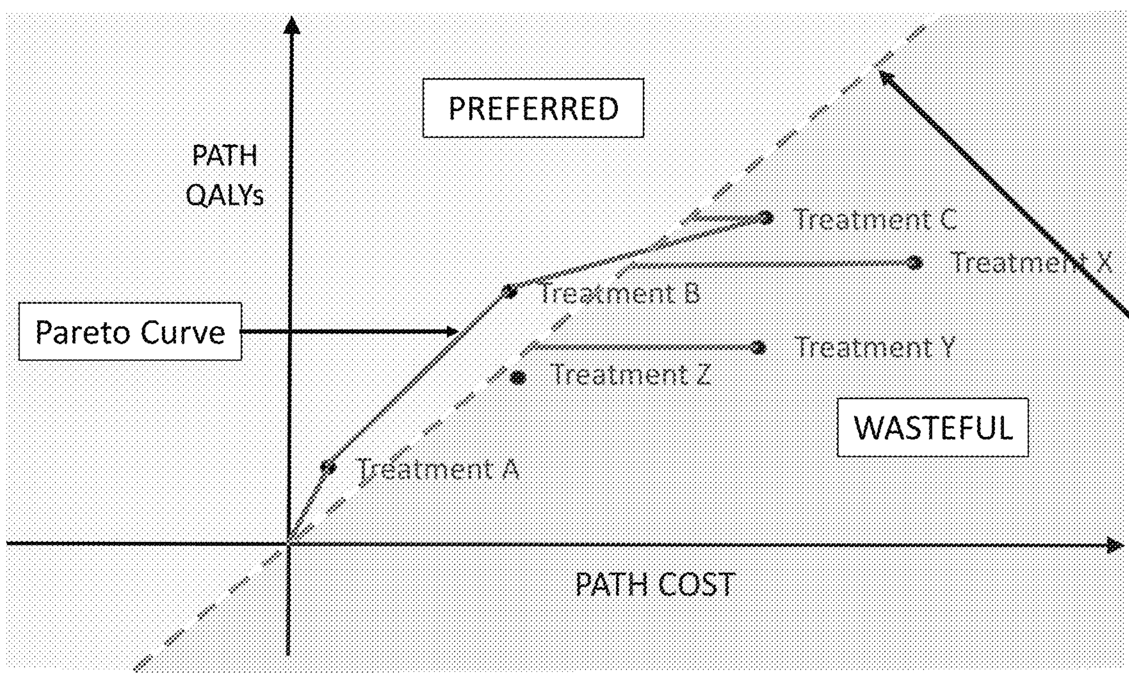

The Goal:
To find a threshold that captures all or almost all of the potential efficacy in order to defines waste

The Efficiency Threshhold
An average of the slopes of the Pareto curve segments, each weighted by a power of its delta QALY.

The penalty:
A fixed fraction of the waste.

FIGURE 101: UDRCD IMPLEMENTATION CASE
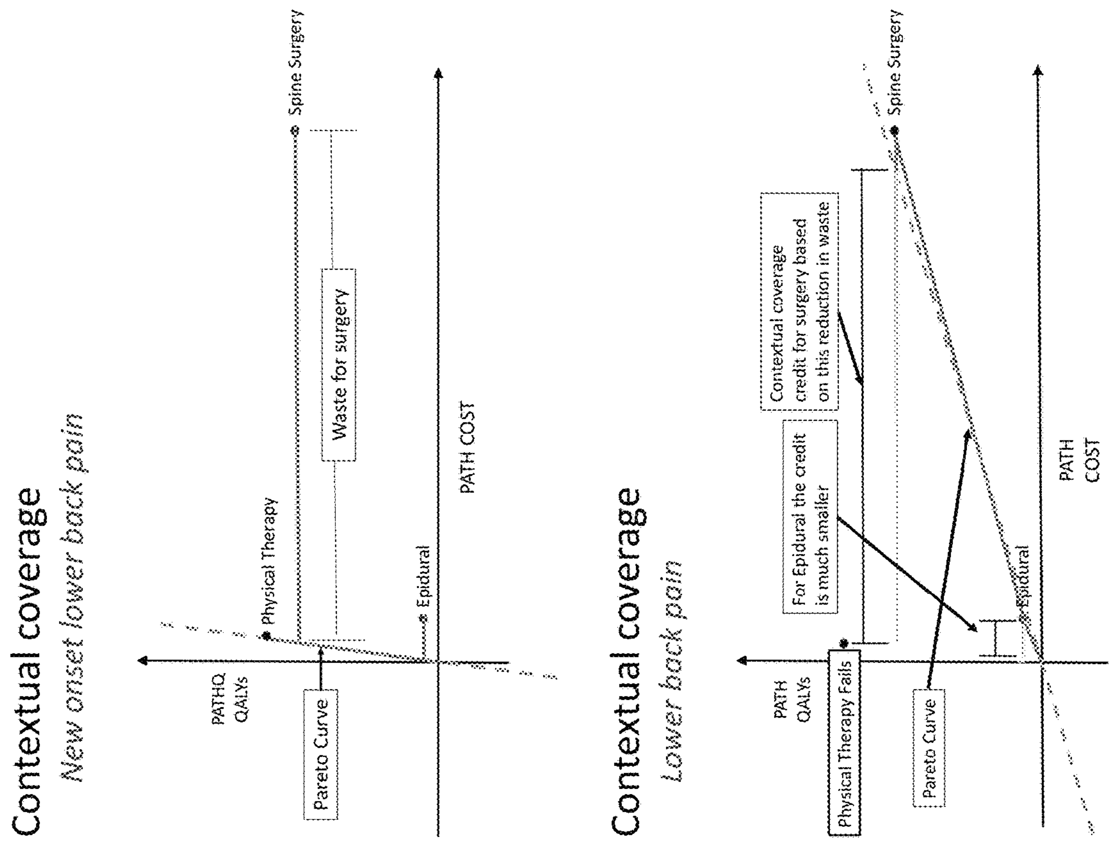

FIGURE 102: UDRCD IMPLEMENTATION CASE

Back pain: contextual coverage credit for surgery

Average patient.

| TREATMENT | COST | QALYs | Before PT | After PT |
|---|---|---|---|---|
| PT (8 visits) | $1000 | 0.065 | 0 | NA |
| Epidural Injections | $2000 | 0.01 | $350 | $125 |
| Spine Fusion Surgery | $98,000 | 0.085 | $5800 | $4150 |

Contextual coverage credit: $5800-$4150 = $1650

Lower back pain contextual coverage *personalized*

Ted, age 60: Higher risk of mortality from surgery. Contextual credit $2029

| TREATMENT | COST | QALYs | Before PT | After PT |
|---|---|---|---|---|
| PT (8 visits) | $1000 | 0.065 | 0 | NA |
| Epidural Injections | $2000 | 0.01 | $356 | $125 |
| Spine Fusion Surgery | $98,000 | 0.033 | $6472 | $4443 |

Jane, age 30: Lower risk of mortality. Lower Pricing. Contextual credit $1346

| TREATMENT | COST | QALYs | Before PT | After PT |
|---|---|---|---|---|
| PT (8 visits) | $1000 | 0.065 | 0 | NA |
| Epidural Injections | $2000 | 0.01 | $356 | $125 |
| Spine Fusion Surgery | $98,000 | 0.132 | $5170 | $3816 |

FIGURE 103: UDRCD IMPLEMENTATION CASE

Femoral hernia contextual coverage credit

We compare elective hernia repair to watchful waiting for two different types of hernias over a two-year horizon using the following information:

- Elective surgery: $11k and has no surgical mortality
- Emergency surgery (incarcerated bowel): $23k and 1.2% surgical mortality (avg. loss 40 life-years)

Saves money AND lives

| FEMORAL | % Emergency | % Elective | Average Cost | Average QALYs | Delta Cost | Delta QALYs |
|---|---|---|---|---|---|---|
| Surgery Now | 0% | 100% | $11,000 | 0 | -$500 | 0.24 |
| Waiting | 50% | 0% | $11,500 | -0.24 | | |

$410K per QALY

| INGUINAL | % Emergency | % Elective | Average Cost | Average QALYs | Delta Cost | Delta QALYs |
|---|---|---|---|---|---|---|
| Surgery Now | 0% | 100% | $11,000 | 0 | $10,450 | 0.024 |
| Waiting | 5% | 0% | $550 | -0.024 | | |

Contextual Coverage Credit for femoral hernia: Entire Add-in Premium

FIGURE 104: UDRCD IMPLEMENTATION CASE

| Parameter | Current value |
|---|---|
| **Cost effectiveness Threholds** | $/QALY |
| Upper limit of free | $40K |
| Threshold for full base rate | $160K |
| Threshold for full base maximum | $160K |
| **Rates** | |
| Top Base Rate | 15% |
| Top Waste Rate | 15% |
| **Maximum Prices** | |
| Maximum Base Price | $5500 |
| Maximum Total Price (Base + Waste) | $8200 |
| **Other** | |
| Harms multiplier for QALYs* | 4 |
| Horizon | 3 years |
| **Waste Calculation** | |
| alpha 1 (power in value threshold calc) for iremedial choices | 2.5 |
| Alpha 2 for easily remediated decisions (e.g. statins) | 1 |
| Actuarial adjustment factor | tbd |

*This applies to contemporaneous mortality and to net harms but not to QOL or longevity harms that are offsetting benefits

Other parameters that may be used

- Parameters for impact of confidence in estimates on pricing
  - This may reduce the waste price for treatments within confidence interval of the waste threshold and it may also affect QALY calculation when average QOL QALYs is near zero
- Parameters for setting default pricing
  - e.g. set the price at a point where x% can get contextual coverage based on personalization
- Cost and QALY discount time-profiles (e.g., to replace time horizon)
- Parameters for adapting the method to deal with treatment-provider pairs as though they were individual treatments FIGURE 105: UDRCD Controller
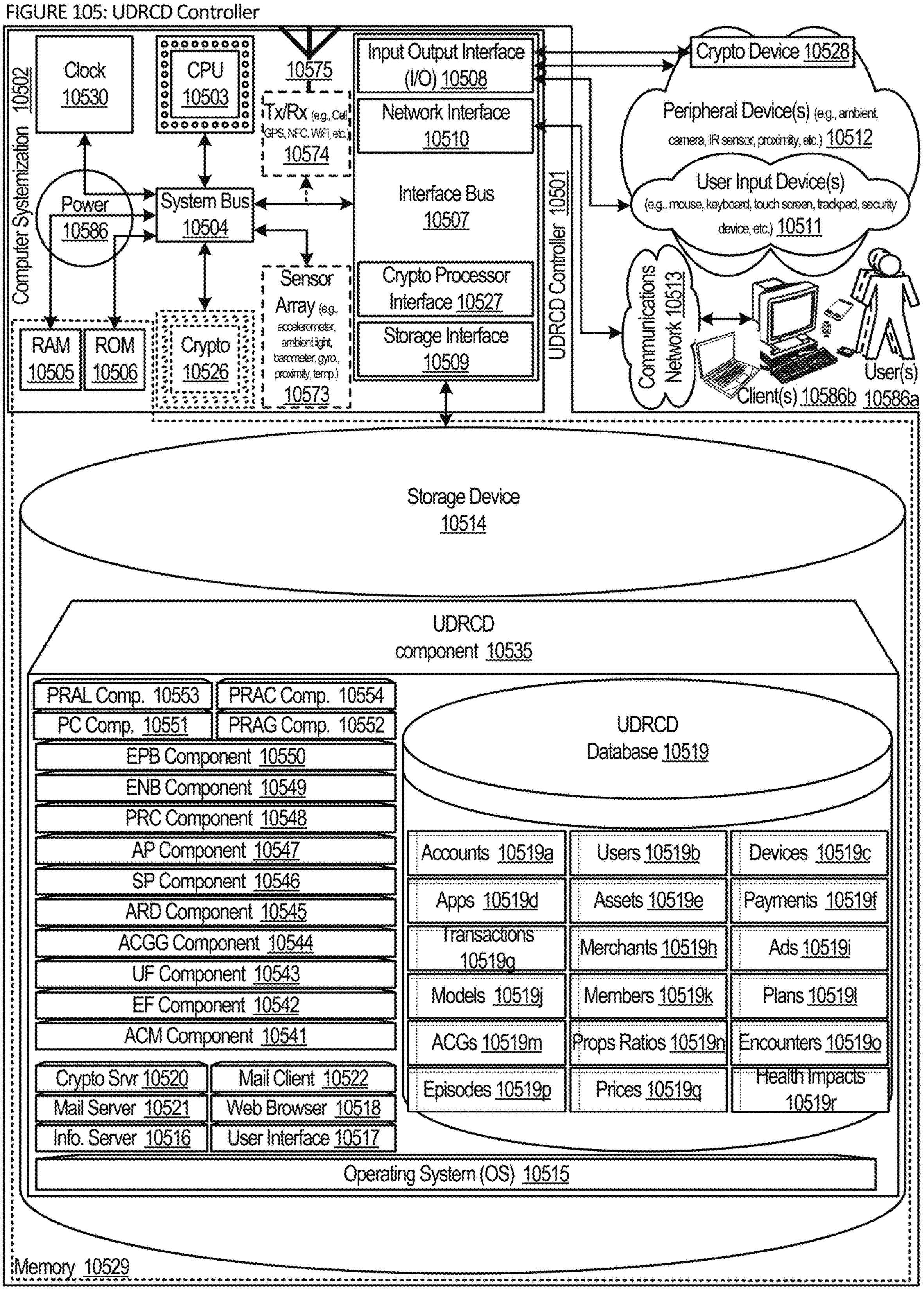

USE DETERMINATION RISK COVERAGE DATASTRUCTURE FOR ON-DEMAND AND INCREASED EFFICIENCY COVERAGE DETECTION AND REBALANCING APPARATUSES, PROCESSES AND SYSTEMS

PRIORITY CLAIM

Applicant hereby claims benefit to priority under 35 USC § 120 as a continuation-in-part of: U.S. patent application Ser. No. 16/659,429, filed Oct. 21, 2019, entitled "Use Determination Risk Coverage Datastructure for On-Demand and Increased Efficiency Coverage Detection and Rebalancing Apparatuses, Methods and Systems"; and which in turn:

- claims benefit to priority under 35 USC § 119 as a non-provisional conversion of: U.S. provisional patent application Ser. No. 62/748,518, filed Oct. 21, 2018, entitled "Use Determination Risk Coverage Datastructure for On-Demand and Increased Efficiency Coverage Detection and Rebalancing Apparatuses, Methods and Systems."
- claims benefit to priority under 35 USC § 119 as a non-provisional conversion of: U.S. provisional patent application Ser. No. 62/807,711, filed Feb. 19, 2019, entitled "Use Determination Risk Coverage Datastructure for On-Demand and Increased Efficiency Coverage Detection and Rebalancing Apparatuses, Methods and Systems."
- claims benefit to priority under 35 USC § 120 as a continuation-in-part of: U'S patent application Ser. No. 15/632,052, filed Jun. 23, 2017, entitled "Use Determination Risk Coverage Datastructure for On-Demand and Increased Efficiency Coverage Detection and Rebalancing Apparatuses, Methods and Systems"; and which in turn:
  - claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems"; U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems," and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems."
  - claims benefit to priority under 35 USC § 120 as a continuation of: U.S. patent application Ser. No. 15/631,961, filed Jun. 23, 2017, entitled "Use Determination Risk Coverage Datastructure for On-Demand and Increased Efficiency Coverage Detection and Rebalancing Apparatuses, Methods and Systems," and which in turn: claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems," U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems," and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems."

Applicant hereby claims benefit to priority under 35 USC § 120 as a continuation-in-part of: U.S. patent application Ser. No. 16/659,438, filed Oct. 21, 2019, entitled "Use Determination Risk Coverage Datastructure for On-Demand and Increased Efficiency Coverage Detection and Rebalancing Apparatuses, Methods and Systems", and which in turn:

- claims benefit to priority under 35 USC § 119 as a non-provisional conversion of: U.S. provisional patent application Ser. No. 62/748,518, filed Oct. 21, 2018, entitled "Use Determination Risk Coverage Datastructure for On-Demand and Increased Efficiency Coverage Detection and Rebalancing Apparatuses, Methods and Systems."
- claims benefit to priority under 35 USC § 119 as a non-provisional conversion of: U.S. provisional patent application Ser. No. 62/807,711, filed Feb. 19, 2019, entitled "Use Determination Risk Coverage Datastructure for On-Demand and Increased Efficiency Coverage Detection and Rebalancing Apparatuses, Methods and Systems."
- claims benefit to priority under 35 USC § 120 as a continuation-in-part of: U.S. patent application Ser. No. 15/632,052, filed Jun. 23, 2017, entitled "Use Determination Risk Coverage Datastructure for On-Demand and Increased Efficiency Coverage Detection and Rebalancing Apparatuses, Methods and Systems"; and which in turn:
  - claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems"; U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems," and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems."
  - claims benefit to priority under 35 USC § 120 as a continuation of: U.S. patent application Ser. No. 15/631,961, filed Jun. 23, 2017, entitled "Use Determination Risk Coverage Datastructure for On-Demand and Increased Efficiency Coverage Detection and Rebalancing Apparatuses, Methods and Systems," and which in turn: claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems," U.S. provisional patent application Ser. No.

62/510,215, filed May 23, 2017, entitled "Use Determination Risk Coverage Datastructure for On-Demand and Increased Efficiency Coverage Detection and Rebalancing Apparatuses, Methods and Systems," and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems."

Applicant hereby claims benefit to priority under 35 USC § 120 as a continuation-in-part of: U.S. patent application Ser. No. 16/659,444, filed Oct. 21, 2019, entitled "Use Determination Risk Coverage Datastructure for On-Demand and Increased Efficiency Coverage Detection and Rebalancing Apparatuses, Methods and Systems"; and which in turn:

claims benefit to priority under 35 USC § 119 as a non-provisional conversion of: U.S. provisional patent application Ser. No. 62/748,518, filed Oct. 21, 2018, entitled "Use Determination Risk Coverage Datastructure for On-Demand and Increased Efficiency Coverage Detection and Rebalancing Apparatuses, Methods and Systems."

claims benefit to priority under 35 USC § 119 as a non-provisional conversion of: U.S. provisional patent application Ser. No. 62/807,711, filed Feb. 19, 2019, entitled "Use Determination Risk Coverage Datastructure for On-Demand and Increased Efficiency Coverage Detection and Rebalancing Apparatuses, Methods and Systems."

claims benefit to priority under 35 USC § 120 as a continuation-in-part of: U.S. patent application Ser. No. 15/632,052, filed Jun. 23, 2017, entitled "Use Determination Risk Coverage Datastructure for On-Demand and Increased Efficiency Coverage Detection and Rebalancing Apparatuses, Methods and Systems"; and which in turn:

claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems"; U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems"; and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems."

claims benefit to priority under 35 USC § 120 as a continuation of: U.S. patent application Ser. No. 15/631,961, filed Jun. 23, 2017, entitled "Use Determination Risk Coverage Datastructure for On-Demand and Increased Efficiency Coverage Detection and Rebalancing Apparatuses, Methods and Systems," and which in turn: claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems"; U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems"; and U.S. provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems."

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology analytics and processing for risk coverage, and more particularly, include Use Determination Risk Coverage Datastructure for On-Demand and Increased Efficiency Coverage Detection and Rebalancing Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Insurance companies offer products such as home and life insurance to cover risks against property and injury. Actuaries at the insurance companies analyze various risks in setting the costs of such products. Computer software such as Milliman's Arius and Triangles on Demand products are used by insurance actuaries to assess various risks.

BRIEF DESCRIPTION OF THE DRAWINGS

Appendices and/or drawings illustrating various, non-limiting, example, innovative aspects of the Use Determination Risk Coverage Datastructure for On-Demand and Increased Efficiency Coverage Detection and Rebalancing Apparatuses, Processes and Systems (hereinafter "UDRCD") disclosure, include:

FIG. 10 shows a screenshot diagram illustrating embodiments of the UDRCD;

FIG. 25 shows a screenshot diagram illustrating embodiments of the UDRCD;

FIGS. 27A-27B show a screenshot diagram illustrating embodiments of the UDRCD;

FIGS. 71A-D show implementation case(s) for the UDRCD;

FIGS. 72A-E show an architecture for the UDRCD;

FIGS. 73A-D show an architecture for the UDRCD;

FIGS. 74A-B show an architecture for the UDRCD;

FIG. 75 shows a datagraph illustrating data flow(s) for the UDRCD;

FIG. 76 shows a logic flow illustrating embodiments of a props ratios calculating (PRC) component for the UDRCD;

FIGS. 77A-B show data structure(s) for the UDRCD;

FIGS. 78A-C show implementation case(s) for the UDRCD;

FIGS. 79A-C show screenshot diagram(s) illustrating embodiments of the UDRCD;

FIG. 80 shows an architecture for the UDRCD;

FIG. 81 shows a datagraph illustrating data flow(s) for the UDRCD;

FIG. 82 shows a logic flow illustrating embodiments of an encounters building (ENB) component for the UDRCD;

FIGS. 83A-C show data structure(s) for the UDRCD;

FIG. 84 shows a datagraph illustrating data flow(s) for the UDRCD;

FIG. 85 shows a logic flow illustrating embodiments of an episodes building (EPB) component for the UDRCD;

FIG. 86 shows a data structure for the UDRCD;

FIG. 87 shows a datagraph illustrating data flow(s) for the UDRCD;

FIG. 88 shows a logic flow illustrating embodiments of a price calculating (PC) component for the UDRCD;

FIGS. 89A-B show implementation case(s) for the UDRCD;

FIG. 90 shows data structure(s) for the UDRCD;

FIGS. 91A-C show screenshot(s) illustrating user interface(s) of the UDRCD;

FIGS. 92A-C show screenshot(s) illustrating user interface(s) of the UDRCD;

FIG. 93 shows a datagraph illustrating data flow(s) for the UDRCD;

FIG. 94 shows a logic flow illustrating embodiments of a price range generating (PRAG) component for the UDRCD;

FIG. 95 shows a datagraph illustrating data flow(s) for the UDRCD;

FIG. 96 shows a logic flow illustrating embodiments of a price range lookup (PRAL) component for the UDRCD;

FIG. 97 shows a logic flow illustrating embodiments of a price range calculating (PRAC) component for the UDRCD;

FIG. 98 shows implementation case(s) for the UDRCD;

FIG. 99 shows implementation case(s) for the UDRCD;

FIG. 100 shows implementation case(s) for the UDRCD;

FIG. 101 shows implementation case(s) for the UDRCD;

FIG. 102 shows implementation case(s) for the UDRCD;

FIG. 103 shows implementation case(s) for the UDRCD;

FIG. 104 shows implementation case(s) for the UDRCD;

FIG. 105 shows a block diagram illustrating embodiments of a UDRCD controller;

Figure 1:
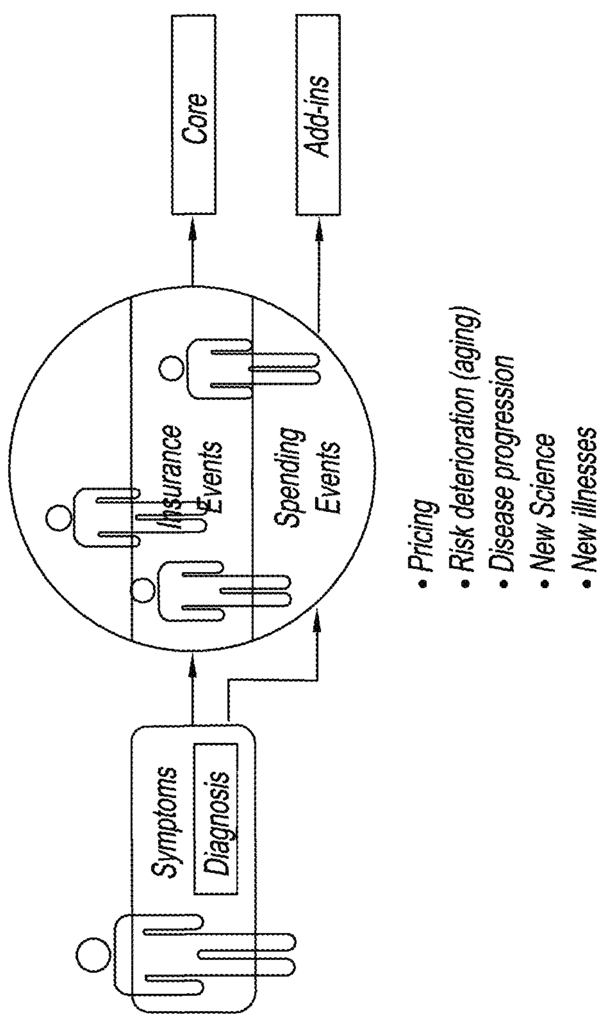
FIG. 1 shows an exemplary model for the UDRCD.

APPENDICES 1-4 illustrate embodiments of the UDRCD.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Use Determination Risk Coverage Datastructure for On-Demand and Increased Efficiency Coverage Detection and Rebalancing Apparatuses, Processes and Systems (hereinafter "UDRCD)") transforms coverage enrollment request, event signal, ACGG request, search request, props ratios calculation request, encounters build request, episodes build request, price calculation request, price range generation request, price range lookup request inputs, via UDRCD components (e.g., ACM, EF, UF, ACGG, ARD, SP, AP, PRC, ENB, EPB, PC, PRAG, PRAL, PRAC, etc. components), into coverage enrollment response, add-in recommendation, ACGG response, search response, props ratios calculation response, encounters build response, episodes build response, price calculation response, price range generation resp., price range lookup resp. outputs. The UDRCD components, in various embodiments, implement advantageous features as set forth below. It is to be understood that the word "recommendation" as used throughout this document is used to refer to recommendation of add-ins from a set of atomized add-in options, and is not used to refer to medical recommendations or to assisting members to diagnose their health issues.

INTRODUCTION

The UDRCD provides unconventional features (e.g., generating price range datastructures that may be utilized to provide price ranges for coverage families, generating props ratios datastructures, encounter datastructures, and episode datastructures that may be utilized to rank providers, a self-evolving atomized coverage graph data structure that includes a set of clinical condition objects that include treatment paths data, a set of treatment objects, and a set of provider objects that specify how likely a provider is to utilize each of the available treatment paths) that were never before available in information technology analytics and processing for risk coverage.

In one embodiment, the UDRCD) includes Condition-based coverage: Atomization of coverage that is on-demand and based on procedure or condition rather than annual coverage based on broad service categories. In one implementation, the UDRCD includes on-demand coverage atomization to reduce entry costs for members to gain coverage to truly insurable events (unpredictable, highest dollars claims); allows members to personalize coverage to their needs; presents treatment and/or provider pathway at the time of need providing relevant choices at relevant times. Underwriting is done today by volume in service categories. This is misaligned with individual disease progression and epidemiology. Underwriting on-demand coverage with atomization utilizes different data science tools and methodology. In one implementation, the UDRCD includes a novel combination of atomized design (also includes choice of provider), on demand coverage at time of need, and structure of the plan. In one implementation, on-demand insurance may include: atomization of plan coverage; attaching insurance coverage to the atomic components; ability to make continuous insurance decisions to make relevant choices at a relevant time, instead of once per year.

In typical annual health insurance none of this atomization exists because coverage choices are made long before health care needs are known.

In another embodiment, the UDRCD includes condition-based coverage: identification of care and coverage need; offer for coverage to patient/member; payment for the coverage. In one implementation, the UDRCD includes processes to identify who should get coverage, what coverage they should get, how they should get it, how it should be priced, and how they should pay for it. In one implementation, the UDRCD includes an Early Listening System (ELS) that determines the event that has occurred and where to direct that event to determine coverage. The ELS is able to understand events from electronic health information (e.g., HL7) data such as encounter data and orders, health care Electronic Data Interchange (EDI) X12 transactions, consumer app and website actions such as search, and other acquired or licensed third party consumer data. In one implementation, the ELS informs a recommendation engine which presents condition-specific coverage information. In another implementation, the ELS and the recommendation engine may be implemented in a component and collectively referred to as ELS.

In another embodiment, the UDRCD's On Demand Customized Coverage is different than any other system in the U.S. marketplace at this time. UDRCD increases the processing around efficiency and resource use (e.g., providing best value) for members so that good health outcomes are achieved and inappropriate data processing around treatments is reduced and ultimately eliminated (e.g., the UDRCD) may identify those providers that manage patients most efficiently and effectively in terms of the amount of services they use, in combination with the intensity of those services used and whether those services tend to lead to better outcomes when evaluating how they treat a condition; the UDRCD may create market dynamics that reduce the need for some of the utilization management techniques that have become common in the industry and create additional cost waste on both the provider and insurer that the ultimately must be passed on to the employer/consumer). Through efficiencies around the data processing components of the UDRCD, the system provides alternative approaches to reimbursement, and engages patients and providers, providing options never before available in healthcare.

In one implementation, benefit provisions are constructed to:

- Reduce costs of insurance premiums
- Offer a term of more than one year to allow for actuarial modeling precision as well as other benefits
- Encourage effective health and lifestyle behaviors
- Reduce economic barriers for effective prevention and treatment of chronic illness
- Provide economic protection for unplannable accident and illness
- Encourage patient-provider dialogue and shared decision-making
- Increase personal responsibility and financial risk for treatments:
  - of unproven or diminished benefit, and/or
  - where less invasive treatment options exist, and/or
  - where lower cost options of equal or greater quality are available
- Encourage appropriate member/patient self-care
- Encourage appropriate member/patient conversion to higher value clinical services In some embodiments, healthcare subsidization benefits may be varied based on health impact, Cost, and Alternatives.

In various implementations, the UDRCD may enable health insurance benefits to be designed in a manner that:

- Subsidizes treatments to varying degrees based on their expected efficacy or health impact, their cost, and alternatives available to the member, thereby creating financial incentives for members to choose healthcare pathways and/or providers that are more effective, less expensive and not wasteful
- Such subsidization can be succinctly and clearly specified (e.g., consistent with regulatory and other requirements), while allowing for automatic adjustments as medical evidence evolves
- Lowers or removes financial barriers to efficient and effective care
- Enables health benefits to be personalized to each covered individual reducing the price of those services and treatments which are predicted to be most beneficial for that particular individual given his or her risk factors, health history, and personal preferences Healthcare insurance coverage design uses a method for deciding what services/treatments are covered, for whom, and how much of the cost of services should be borne by the member. Although the stated goals of healthcare coverage design generally include improving member health, containing cost, and doing so in a manner that is fair to people in a variety of different situations, existing methods have had limited success in achieving all of these goals. For example, national health systems typically provide free coverage for care that meets certain average efficiency thresholds (e.g., cost per unit of health improvement or quality adjusted life-year) and no coverage for other care. The sharp threshold for inclusion is often viewed as unfair (e.g., no dialysis for people over a certain age) and the fact that efficiency of services is based on average (e.g., rather than personally calculated) efficacy blunts the effectives (and the fairness) of the efficiency threshold. Coinsurance plan designs (e.g., such as most US PPO plans) require the member to pay a fraction of the cost of each service (co-insurance or copay) and often a certain amount up front before coverage starts (deductible) but the fraction of the price paid by the member does not generally depend on their effectiveness. Coinsurance designs have the dual problems of enabling much higher levels of inefficient (in some cases even harmful) services, and thus less efficient care, and of providing financial barriers that limit people of lesser financial means to effective, necessary and even cost-reducing care.

The UDRCD may provide a flexible framework (e.g., using hardware, software, a database, etc.) for determining the portion of the price of services to be paid by an insured for individual healthcare treatments/services based on information about the cost and effectiveness of such services, alternative treatments available to the individual and in some implementations health-related information about the covered individual.

The UDRCD may be associated with an atomization of coverage that enables benefits for a treatment to vary depending on the context (e.g., purpose, patient state, facility, patient history, etc.). For example, rather than having a single benefit/coverage for a CT scan, and a separate benefit for a contrast agent, independent of the patient, anatomy or purpose, the coverage is specified for a particular combination CT+body part+contrast agent X+diagnosis Y+purpose Z (e.g., head CT with gadolinium to rule out brain bleed after an emergency admission for trauma) and this enables coverage to be varied more accurately depending on the efficacy of the service for that patient's situation.

In various implementations, the UDRCD may be conceptualized as a benefit design and pricing system that is built upon an underlying division of care into units based on treatment, location, condition and divides care into units that have similar health value and cost. The pricing involves components that estimate this cost and health value, and the cost and health value of other treatments may include some or all of the following components:

- Method for assessing average health value (and/or probability distribution thereof) associated with treatment.
- Behavioral models relevant to the treatment pathways taken by patients with a condition
- Actuarial models for changes in usage as a function of price
- Database of health values
- Provider treatment cost and outcome database
- A variety of parameters.
- Methods for calculating the "value" and "waste" components of the member price In some implementations, the method includes a method for personalizing pricing of treatments and services based on the benefit to individuals. This aspect of pricing may include:

- Personalized models of health impact and cost
- Methods for collecting and checking patient data relevant to those models
- Upper and lower limits.
- Methods to ensure that reduced pricing is associated with adverse health factors
- Method for determining treatments available to covered individual

Exemplary Methods and Components

In various implementations, the UDRCD may include the following methods and/or components:

- A set of methods for determining health impact of treatment: A documented process that specifies the way literature is selected and used to associate health impact of interventions, or alternatively data is analyzed for this purpose.
- A database of estimated health impacts of different medical treatments (e.g., including visits, procedures, diagnostics, pharmaceuticals, durable and non-durable equipment, etc., and other medical coverages) in different contexts. The information about any particular health impact may comprise of an average value or a set of values for individuals in different categories or "health states". Health impact information that is relevant includes the average impacts on (a) quality of life (possibly by different types of impact) and (b) mortality or (c) combined average QALY's (quality-adjusted life years). These impacts may be stored as average lifetime values, or stored with information about their time-dependence so that benefits can be calculated according to different time horizons. This information may be stored as pre-computed data, or as mathematical models such as regression models for calculating the values pertaining to particular individuals based on their personal information. This information may also contain estimates of the distributional spread of outcomes (e.g., obtained from studies in the literature) which may be a factor utilized in pricing methods. To the extent that different contexts cannot be separated, these values may reflect the average or distribution of outcomes of the treatment as it is used in the population for whom the benefit is being designed (e.g., if different contexts for GI endoscopy are not separated and the coverage is being designed for France, these values may reflect the values corresponding to real-world usage in France).
- A set of methods or policies for deriving the above values and models from literature, trial data, or real-world health datasets, including methods for updating those values and models based on new evidence. For example, it may be a policy for quality of life treatment outcomes to be derived from randomized controlled trials, but for surgical mortality rates to be based on registry studies, or if registry studies are not available to be estimated from a model that takes into account average duration of anesthesia.
- Stochastic behavioral models that can be used to estimate the likelihood that patients with a condition will follow different treatment pathways over time as the treatments they try succeed and/or fail.
- Methods or software for generating and updating the above behavioral models to match specific datasets that may have different behaviors (e.g., healthcare behavior changes specific to a health plan due to different prices) or to different populations (e.g., a different country).
- A database of provider information for estimating cost and outcome information for different treatments when using a provider (e.g., a provider may be defined at different levels of granularity from hospital systems to individual medical professionals depending on the nature of the data.) This database enables calculation of predicted averages or distributional information about the outcomes of treatments performed by particular providers (e.g., billed cost, total related patient medical cost from all providers, change in condition, mortality, etc.). This information could be stored in various formats (e.g., encounter level data from previous encounters, distributional data, model parameters) as long as there is a method for using this information with patient data to estimate benefits and costs. To the extent that these predicted averages and distributions associated with providers are derived from health datasets, there is an associated set of methods that pertain to the relationship between the raw health data and the predicted distributions or models. This system may also include software for self-validation and parameter optimization.
- A method for obtaining, storing, and validating relevant predictive health information from a member: In the case that the covered individual's atomized treatment or estimated health benefit and cost depend on factors that are not immediately accessible to the insurer (e.g., in claims history) a system to gather this information, check it, and store it may be utilized. For example, a prospective member about whom we have no health history information using a system to estimate prices may have to answer questions. A member may have history that is important that predates this coverage and should to be taken into account.
- An actuarial model that predicts how the usage of healthcare services/treatments will change as prices change and that enables adjustment of parameters to achieve desired cost and AV.

Exemplary Features

In various implementations, the UDRCD may include the following features:

- The price (the amount of the member contribution to the cost) for any given service has at least one of the following components: a value component that is a function of the cost of the service and the estimated health impact to the member, and a waste component which is a function of the amount by which the cost exceeds that of less expensive alternatives available to the member that have equivalent or nearly equivalent efficacy. These two prices can be thought of as independent components of adding to the total price, although their calculation can be dependent as will be detailed later.
- The value component may be designed to provide an incentive for more efficient treatment without the capriciousness of a sharp efficiency cutoff. The waste component may be designed to reinforce the cost incentive to use the more efficient alternative in cases where the effectiveness is the same (e.g., generic vs. brand drugs or providers with equivalent records).
- The calculations can be personalized: The cost and effectiveness of treatments can be determined on an average basis or a categorical basis for different subgroups based on factors such as diagnosis and treatment history, or on a continuous basis as function of severity, lab values, time since events and other continuous factors. Personalization, by enabling more accurate estimates of impact and cost enable more effective incentivization of efficient treatment and the avoidance of services that are predicted as being likely to result in harm for individual members.
- The incorporation of uncertainty: The calculations can be modified using classical or Bayesian statistical methods to allow for uncertainty of different types, such as uncertainty in the evidence, uncertainty or incompleteness of patient data, and unpredictable variation in treatment outcomes. This enables adjustment of value on the basis of risk aversion and for appropriate reductions in predicted impact associated with scarce or poor quality medical evidence.
- The pricing system subsidizes efficient care, by having people pay an increasing fraction of the cost for less efficient care, and decreases subsidies significantly for wasteful expenditures. These features lead to consumer choices that improve health, reduce healthcare cost, reduce inequity in access to care and conform with intuitive notions of fairness. The pricing system has the advantage that it does not force ethically difficult binary choices between covered and non-covered services. The methods enable clear specification of the entire pricing system with a handful of parameters, can adapt pricing quickly with new medical evidence, and are scalable.

Value Price Calculation

Value Price: The value price function of health impact and cost could have many forms, including a constant fraction of cost (as in a coinsurance plan design). In various implementations, the cost function may have one or more of the following properties:

General Properties

- It is continuous.
- Price is an increasing (non-decreasing locally) function of cost if impact is held constant
- Price is a decreasing (non-increasing locally) function of positive health impact
- The price for any treatment/service as defined in context has an overall maximum limit Method of Cost Calculation The cost in the function is the "pathway cost" which is an average of longer term costs (e.g., including downstream costs in addition to the treatment itself) and could be more or less than the treatment cost.

Maximum Price Limited for Efficient Treatments

For positive health benefit, the price is bounded above by an increasing (locally non-decreasing) function of cost effectiveness (e.g., expressed as cost per QALY).

Harms are Penalized at Least as Much as Benefits are Rewarded

When health impact is negative the rate of the partial derivative of price with respect to health impact is steeper (to penalize harms) than if the treatment has a positive impact.

There may in some cases be an additional minimum price or prices for some services/treatments in addition to the calculation above, that is included to minimize overuse, waste, fraud, etc. These could be defined for example as fixed minimums, or as a percentage of treatment cost.

For the above purposes, services/treatments with positive health impact and negative pathway cost should be considered as more efficient although technically their efficiency is negative. (i.e., with the cost as the x axis and impact as the y, the angle subtended from the x-axis, ranging from −90 to +180 degrees might be a good metric of efficiency). These calculations are not intended to apply to treatments/services in the "third quadrant" with negative cost and negative health impact.

Waste Calculation and Pricing

Types of Waste

The waste calculation may be used to discourage wasteful healthcare spending by giving it a higher price. There are a number of different types of waste in healthcare spending, including:

Provider-driven waste: Both provider costs (e.g., the prices they charge) vary and the efficiency of their delivery of care (e.g., based on total patient episode cost) vary. To the extent that these costs are higher for some providers without any offsetting improvements in quality, this may constitute waste.

Waste based on overuse or misuse: Some treatments are frequently given to patients for whom they are not indicated (e.g., by guidelines or evidence) and for whom they are likely to be non-beneficial or harmful.

Treatment selection waste: Choosing an expensive treatment when there are less expensive but equally effective treatments for the same condition available to the patient is another form of waste.

This is not intended to be an exhaustive or disjoint covering of types of waste. For example, waste related to incomplete treatment pathways (e.g., diagnostic tests that are never read by the physician, or uncompleted sets of treatments that are ineffective if not completed) could be considered its own category, although it may be technically included in the provider efficacy or the overuse categories of waste.

Method for Pricing Waste

The method takes costs and efficacies of the various treatments (or treatment-provider combinations) for a condition and unambiguously assigns a waste value to each by which pricing can be modified. The method may have the following properties:

Calculates a condition-specific threshold cost effectiveness and defines waste as a function of the cost of treatment in excess of its cost-effective threshold price.

Increases with the treatment cost and decreases with efficacy (health impact)

Classifies at least one treatment as not being wasteful.

Continuous or near-continuous with respect to changes in any of the costs and efficacies.

If the maximum treatment efficacy is M, there should be a treatment that has no associated waste and has efficacy that is most of M (e.g., at least more than half)

In one implementation, waste calculation is dependent on the Pareto curve, or efficient frontier of the costs and impacts of available treatments for the condition (e.g., treatments that are less effective at higher cost should not influence the calculation significantly).

In an alternate implementation, alternative treatments affect the waste calculation, but their "weight" in the calculation depends on the frequency of their use in the population.

Example Implementation

The method determines for each condition a condition-specific threshold efficiency and labelling the amount of the treatment (or associated pathway) cost in excess of this threshold as waste.

For example, if the threshold efficiency for condition X is \$150,000 per QALY, and a treatment with a cost of \$100,000 has a positive health impact of 0.5 QALY's then the waste is the cost−impact*threshold: (\$100,000)−(0.5)*\$150,000=\$25,000. The price of the service to the member would be incremented by a function of the calculated waste.

The cost efficiency threshold is determined as a weighted sum of the incremental efficiencies of the treatments that are most efficient for their effectiveness: Suppose there are n treatments on this curve ordered from most efficient to least efficient with cost c (i) and h (i) where i=1 to n, and c(0)=h(0)=0. Then c can be calculated as:

$$C=(\text{Sum for } i=1 \text{ to } n \text{ of } w(i)*s(i))/(\text{Sum for } i=1 \text{ to } n \text{ of } w(i))$$

Where w(i)=power (h(i)−h(i−1), a) and the power a is a positive real number

Where s(i)=(h(i)−h(i−1))/(c(i)−c(1−1)) for I=1 to n

In some implementations, a>1

In some implementations, 2<a<3

Personalized Pricing

To the extent that individual, or groups of individuals will have different alternative treatments available to them, and the calculation of health impact for those calculations may differ, the method described above is a personalized pricing method. For example, a patient might be considering spine surgery, but have physical therapy available as an equally effective and less expensive option. The efficiency calculation in this case might suggest that spine surgery is very wasteful. However, if the patient has tried physical therapy and it didn't work, then the calculation will be different and the surgery less wasteful.

Population Pricing

For a variety of reasons (e.g., difficulty obtaining data, simplicity, plan design limitations) it may not be possible to price individually and prices may have to be chosen in aggregate for larger subpopulations (e.g., diabetics) or for everyone as a whole. In this case, we can use what we know about the population or a representative sample to calculate a distribution of waste values for individuals in the population. In one implementation, price may be calculated based on the average waste in the population. In alternate implementations, prices may be calculated for the individuals in this distribution and average or mode of the distribution may be used (e.g., this may lead to lower prices because of the shape of the price function). Other alternatives include waste factors according to a degree that is a function of their prevalence in the population in an attempt to characterize a "typical" individual (e.g., one option is to include waste factors associated with alternate treatments if they are available to >x % of the group).

Exemplary Uses

Exemplary uses may include:

quoting a price for a treatment to a person who is not a member of the plan quoting a price for someone who is a member (and for whom we already have data) when he/she is gathering information to make a decision calculating actual claims payments and/or member payments estimating plan costs for a population based on previous claims by pricing a large group of claims (e.g., actuarial prediction)

Consider a case where a member is checking on the price. The context includes a system and website for making such inquiries. In this case there is a system for identifying the information about the member that is used to calculate the price. This would likely include information that is used to calculate the health benefit and costs for the various treatments for the condition that are available to the covered individual. If that information is not available, the system may query the user for specific information (e.g., treatment history predating membership). Another system may identify providers of this service available to the member. The database of information or models about the providers' costs and outcomes for this service are accessed, the predicted costs and health outcomes are calculated for each provider, location of service, etc. There may be specific limitations on the values of variables allowed to be entered. If the costs or health outcomes of other treatments for the same condition that have been determined to be available to the covered individual vary by person, location or provider, then these may be calculated as well. There may be a process or method (e.g., multiple imputation) for choosing values for missing information that the member is unable to provide. This data is then input to the pricing model to calculate and combine value and waste prices to get total prices for each available treatment and each available provider. Another system would return information to the member about prices for different providers, and also in some cases the prices or price ranges for alternative treatments. The information about the results of this search may be stored for some time for documentation and recording purposes.

Other use cases vary in the source of the input data (e.g., a non-member might be asked about diagnoses whereas a member's diagnoses might be available from previous claims) and in the output, which might be price ranges rather than individual prices (e.g., in the non-member case) or averages (e.g., in the actuarial prediction case).

Additional Details

Combining Prices

In one implementation, the price (the amount of the member contribution to the cost) for any given service has two components: a value component that is a function of the cost of the service and the estimated health impact to the member, and a waste component which is a function of the amount by which the cost exceeds that of less expensive alternatives available to the member that have equivalent or nearly equivalent efficacy. These two prices can be thought of as independent components adding to the total price, although their calculation can be dependent. For example, raw value and waste components can be calculated separately, and then the sum can be adjusted by a function that prevents the total from exceeding a maximum. Alternatively, the value price can be calculated and then the waste calculation scaled to the remaining room under the maximum (max-value price), or vice versa.

The calculations can be personalized as noted above. Personalization, by enabling more accurate estimates of impact and cost enable more effective incentivization of efficient treatment and the avoidance of services that are predicted as being likely to result in harm for individual members.

Maximum Value Price can be a function of Efficiency: In some implementations, the member contribution can be a function of both efficiency and cost that asymptotically approaches a maximum that is a function of efficiency. This prevents efficient but expensive care from overwhelming the financial resources of lower income members (a fairness goal) and also leaves room for the price to be increased for inefficient providers.

Generalizations to the Value component

Additional generalizations of the Value component may include:

Credits of various natures for utilization of treatments that reduce total anticipated healthcare costs. For example, credit toward the member's price of future health services in general or credit toward specific types of services such as lifestyle programs.

While, in some implementations, a lower limit of treatment cost may be utilized, the limit could actually pertain to the expected net cost of treatment. For example, an inexpensive treatment with potentially very expensive repercussions might not be subsidized at all.

The member price can be defined as an integral over price p from 0 to the actual treatment price of a subsidization function that pertains to treatments with total cost (e.g., pathway cost) of predicted pathway cost-p and health benefit as calculated.

Health impact and cost of the pathways defined by interventions can be calculated on a more or less personalized basis, ranging from an average over individuals receiving such treatment to multiple averages for different categorical groups based on prior treatment, diagnosis, health history or other categorical factors, to personalized models such as regression models or self-evolving AI models with many continuous and categorical values. Such costs and impacts can also be calculated based on different time horizons which may be set from very short (e.g., a year) to member lifetime in order to match the preferences of the insuring entity.

Furthermore, the personalization process can be subjected to various constraints to conform to regulatory requirements or fairness principles. Sensitive variables (e.g., age or comorbidity) can be omitted from personalized calculations completely or selectively (e.g., used for predicted health benefit but not predicted cost) or can be winsorized (e.g., truncated at certain values) to prevent increasing pricing for people beyond these points based on an intent to avoid unfairness (e.g., very young, very old, very obese) or an intent to avoid arbitrariness (e.g., truncate the model in various manners when the data become too sparse to have a specified level of confidence). The personalization could be applied to the median or a percentile as opposed to the mean of the predicted distribution (e.g., of impact or price) in order to prevent the unusual costs associated with a few members of a group (e.g., an age group) from "unfairly" influencing the price of the treatment for the majority of members of this group. Prices can be constrained to be monotonic in a certain direction so they could advantage but never penalize a disadvantaged group (e.g., by age, comorbidity score, frailty score, etc.). Available information can be censored in certain circumstances: in particular information that can be highly predictive but highly variable (e.g., microalbuminuria) can be modified by averaging over time or calculating Bayesian posterior distributions of risk. Important data that is voluntarily self-reported by member (e.g., smoking, substance abuse, etc.) but that could adversely affect their pricing for other treatments could be guaranteed limited use within the constraints of a certain condition to encourage sharing.

The price calculation could be modified to take into account uncertainty in the calculation of cost and impact by methods such as calculating an average price over the range given by the confidence in those values. These confidence values could be singular over the range or could vary over the range depending on the sparsity of the underlying data depending on what the modeling methods permit.

The method may include default protocols for treatments for which there is very limited or no quality evidence regarding cost or impact. One method is to assume no impact. In another method, an expert opinion might be solicited. In some cases, historical data on the likelihood of unanticipated long-term effects of treatments of a similar nature (e.g., pharmaceuticals that eventually were determined to have serious adverse effects) may be used to estimate the likelihood that newer or less tested treatments will have unanticipated effects.

The relationship of price to health impact for treatments that are on average predicted to be harmful may have a different relationship—in particular a larger price increase for harm than there is a decrease for health benefit.

Uncertainty

Uncertainty types may include:

- The uncertainty in the accuracy of prediction of the average outcome that depends on the size, quality and applicability of the underlying data/evidence and the construction of the model (e.g., this can vary across the input space)
- There is additional uncertainty that arises as each member is evaluated that results from having incomplete information to populate the model (e.g., and relying on averages or imputed values)
- There is the degree of variation of personal outcomes around a given average outcome which can also be thought of as the degree of risk involved The rates of rare but important events such as surgical mortality may have to be estimated using different methods (e.g., registry data or models of mortality in other similar surgeries) than are used for estimating health impacts of the treatment, and then added in.

The Value price component could be modified by condition relative to the efficiency threshold calculated by condition for the waste price (see below) so that subsidization for treatments of a particular condition would vary not by absolute efficiency but by efficiency with respect to the waste threshold.

The Waste component of price is a function of the relationship between the treatment and other treatments for the same condition. In one example, the eventual outcomes (e.g., cost and health at a time horizon allowing for the typical changes in treatment over time) of a set of interventions are well characterized as in the "intent-to-treat" analysis of a well-conducted randomized trial. In other examples, there may only be very little high quality evidence or evidence pertaining to the immediate impact of the intervention/treatment and in these cases one or more of the following may be performed:

Modify the waste calculation to take into account the uncertainty in the benefit and cost calculations so that instead of being a linear function of the calculated waste it is reduced in the range in which wastefulness is uncertain. For example, if a calculation that includes uncertainty determines that a treatment has a predicted waste of w with a standard deviation of sigma, the waste price might be evaluated using a function like c*((x**2)/(x+b+sigma) where c and b are constants.

In some implementations, doing nothing may be considered as one of the treatment alternatives in each case, and, in the special case of one treatment vs. no treatment, uncertainty may be taken into account to avoid a discontinuity at the point where the entire cost is added into waste suddenly when the average benefit of the one treatment is zero.

In order to allow for the ability of providers and members to select the best treatment among multiple alternatives for individual members based on data or personal preference not available to our calculations, the benefit calculations may be modified for some conditions so that the calculation of waste for a particular treatment after determining the waste threshold, would use a different percentile of benefit (e.g., 80th percentile) rather than the average. This could be particularly important for conditions where preferences vary substantially (e.g., such as treatment of uterine fibroids).

In some implementations, provider data is available that enables a separate estimation of cost and health impact for each treatment/provider pair. In one approach to this situation treatment prices are considered in one step, and pricing different providers in another. Instead of treatment averages, higher percentiles of impact and lower percentiles of cost may be taken based on the likelihood that members will more likely use the better ranking and lower price providers. In some implementations, gradients for provider price based on efficiency may be used that are greater than the gradients for treatments. In some implementations, pricing for treatments and providers is unified and becomes pricing of many different options. In this case, the formula for the calculation of the waste threshold might be slightly different, but the intent to enable options most of the potential of treatment without a waste charge would be the same.

In some implementations, health impact may be calculated as QALY's as defined in the literature or it might be further differentiated in different ways. For example, different contributions to quality of life could be given personalized weights depending on member stated preference. In another example, the weight of QALY contributions from near-term death (e.g., a cure for cancer or surgical mortality) might be different than the weight associated with longevity (e.g., shortening or lengthening of life in the longer term) or quality of life contributions in a way that is dissimilar to discount rating of life-years and conforms better with the choices that people intuitively make and feel comfortable with.

Personalization and contextual coverage: the above calculations can be carried out with different levels of personalization leading to different prices for different members. This could be characterized as "contextual coverage" and could lead to specific instances where people with different diagnoses for example would pay different prices for the same treatment. It could also manifest as a reduction in the waste charge for members who are willing to try less expensive alternatives: if the less expensive alternative is not successful/satisfactory, the member would have a reduced price for the more expensive (and formerly wasteful) alternative because with the less expensive alternative no longer an option the waste calculation would change correspondingly.

UDRCD

FIG. 1 shows an exemplary model for the UDRCD. In FIG. 1, a model of on-demand health insurance (ODHI) is illustrated. ODHI deconstructs insurance into relevant conditional events; creating a better fit between insurable events versus spending events, and providing increased consumer choices around clinical value. As such, plan members may purchase just the insurance they need, just when they need it. This reduces waste in the healthcare system and lowers insurance premiums for consumers in the risk pool.

In one embodiment, the ODHI includes a core plan (e.g., for insurance events) that insures against the unpredictability of emergencies, trauma events, cancers, and/or the like, while also providing care for routine and preventive care services (e.g., at a significantly reduced cost).

In one embodiment, the ODHI includes additional insurance (or "add-ins") (e.g., for spending events) that may be purchased on demand (e.g., for hip replacement, if such coverage is needed and when it is needed), specific to a provider (e.g., in a local area), paid for with a combination of post-tax copays and/or pre-tax payroll deductions, and/or the like. In some implementations, add-ins may have a specified duration (e.g., an add-in may provide coverage for 3 months).

In one embodiment, the UDRCD utilizes specialized data structures, and/or data science to understand and/or model each individual's state within a Markov process, to facilitate underwriting ODHI. In various implementations, ODHI pricing may be determined by taking into account risk deterioration (e.g., based on a multiyear insurance term), disease progression (e.g., based on underwriting the epidemiology of individual disease progression according to Markov properties), new science (e.g., recommended treatment methods), and/or the like.

Figure 2:
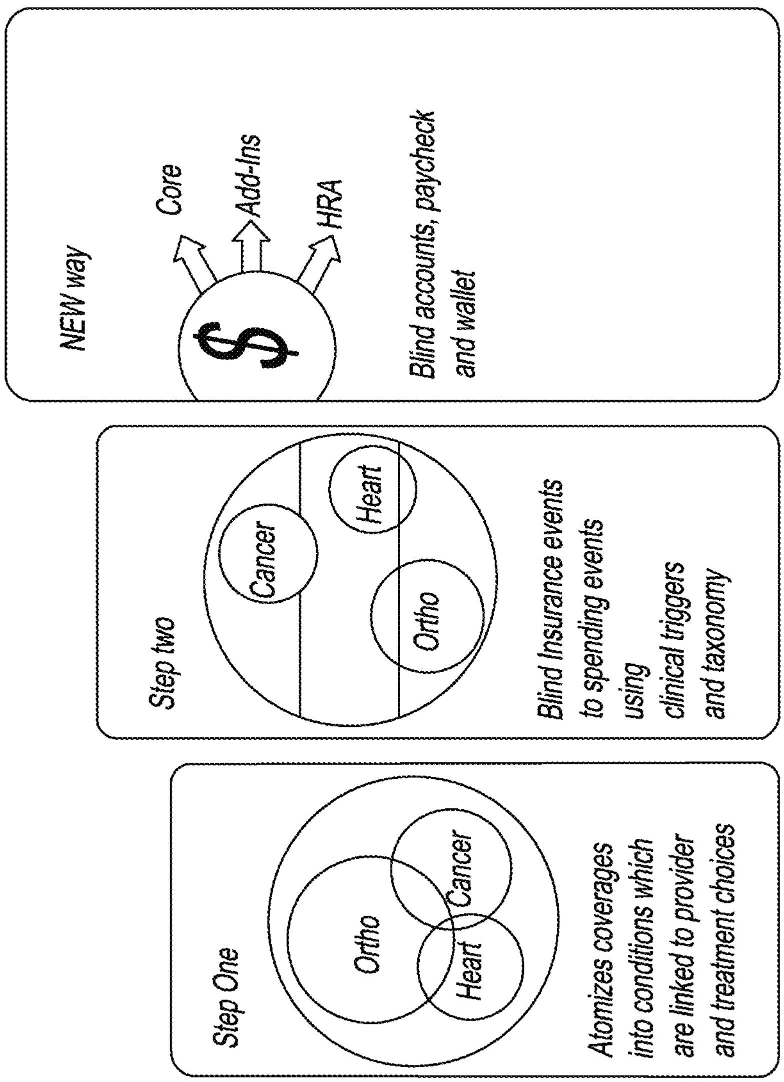
FIG. 2 shows an exemplary model for the UDRCD.

FIG. 2 shows an exemplary model for the UDRCD. In FIG. 2, a model for delivering ODHI is illustrated. In one embodiment, coverage is atomized into conditions which are linked to provider and/or treatment choices. In one implementation, coverage may be atomized for conditions (e.g., knee pain) rather than bucketed (e.g., for all inpatient services) for underwriting. Each condition may include provider choices (e.g., rehab center A, orthopedic group A, surgery center A, hospital A) and/or treatment (e.g., procedure) choices (e.g., up to 4 rehab visits, pain injection series, ACL repair) for which coverage may be purchased (e.g., priced individually for each choice) by plan members.

In one embodiment, insurance events (e.g., core coverage, which plan members share in equally) may be linked (e.g., based on clinical triggers and/or taxonomy) to spending events (e.g., add-ins coverage, which plan members may purchase as conditional needs arise by making provider and/or treatment choices). In one implementation, an insurance event (e.g., visiting a primary care provider several times for knee pain) may indicate a link to a spending event (e.g., knee replacement) that is likely to occur. Accordingly, a knee replacement coverage add-in may be offered to the plan member.

In one embodiment, ODHI may be delivered using a combination of a Health Reimbursement Account (HRA), a core plan, and add-ins. In one implementation, the HRA may be funded via payroll deductions and may be used by a plan member to pay for the core plan and/or for selected add-ins during the term (e.g., 3 years) of the ODHI plan. In one implementation, copays (e.g., for the atomized coverage) associated with the ODHI plan may be paid for using the plan member's other personal funds. In some implementations, copays may vary based on the purchased add-ins (e.g., purchasing an add-in may reduce copays for associated providers and/or treatments).

In one embodiment, the UDRCD utilizes specialized data structures and/or architectures to facilitate delivering ODHI.

Figure 3:
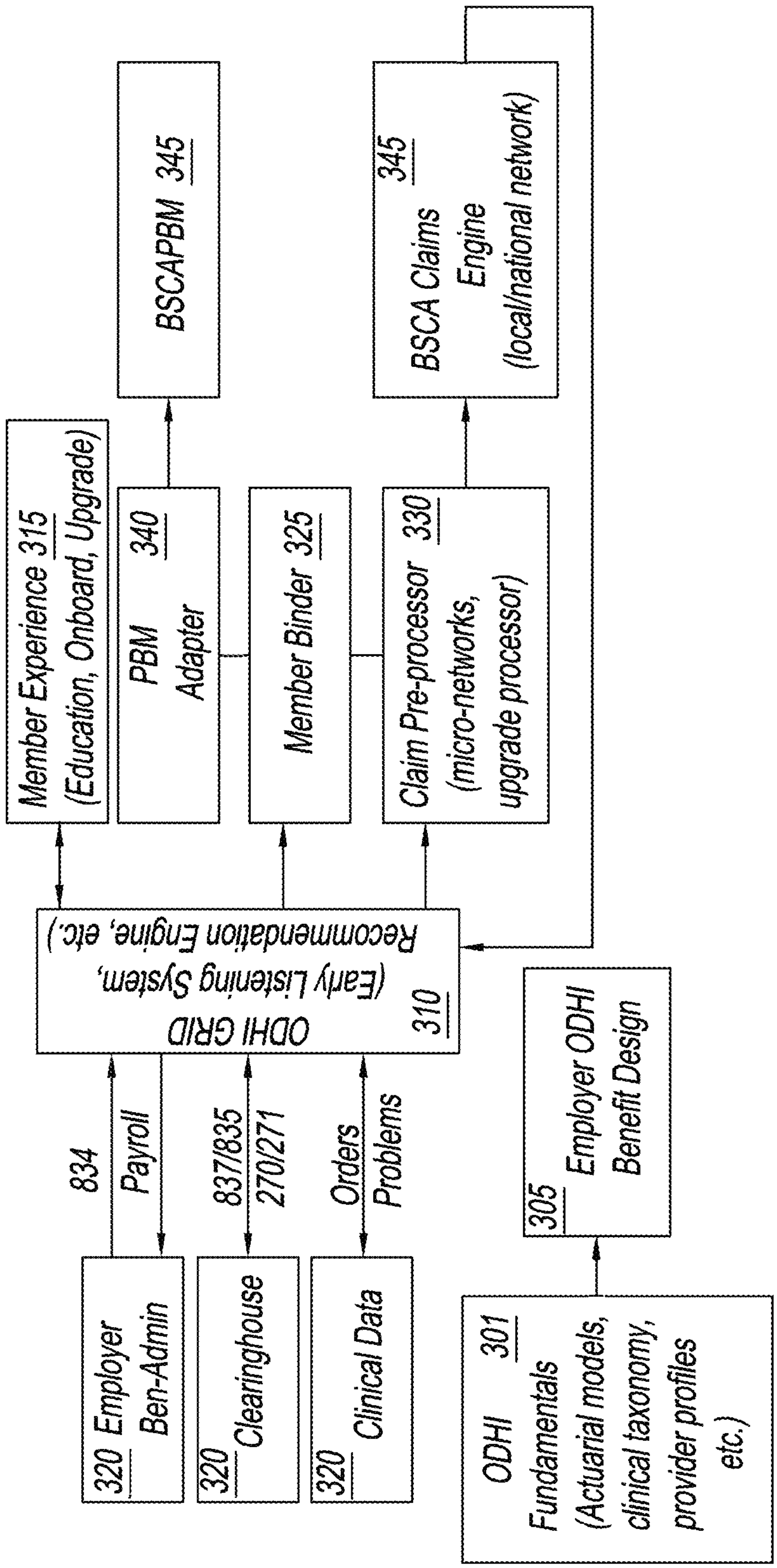
FIG. 3 shows an exemplary architecture for the UDRCD.

FIG. 3 shows an exemplary architecture for the UDRCD. In FIG. 3, ODHI fundamentals 301 may be utilized by an employer ODHI benefit design component 305 to facilitate designing an ODHI plan. In various implementation, an insurance plan sponsor (e.g., employer) may specify parameters, such as the degree of subsidization for core coverage and/or for add-ins coverage by the plan sponsor, the specification of which services are considered to be add-ins, whether payroll deductions are pre-tax or post tax, insurance plan term (e.g., 1 year, 3 years, 10 years), and/or the like, associated with the ODHI plan offered to employees.

An ODHI grid 310, which may include an Early Listening System (ELS), a recommendation engine, pricing engine, and/or the like, interconnects various UDRCD architecture components and/or third party systems to facilitate implementing delivery of the ODHI plan.

A member experience component 315 facilitates educating employees regarding ODHI, onboarding employees who sign up for the ODHI plan, upgrading a plan member's plan to include add-ins, and/or the like. An employer benefit administrator system 320 facilitates enrolling (e.g., via X12 834 formatted data files) employees into an ODHI plan and/or configuring associated employee payroll deductions. A member binder 325 facilitates keeping track of ODHI plan members.

A claim pre-processor 330 facilitates connecting to systems of health plan networks, such as to a Blue Shield of California (BSCA) claims engine 335. A pharmacy benefit manager (PBM) adapter 340 facilitates connecting to systems of third-party administrators of prescription drug programs, such as to a BSCA PBM 345.

A clearinghouse system 350 facilitates determining eligibility (e.g., via X12 270 formatted eligibility request files and/or X12 271 formatted eligibility response files), obtaining healthcare claims (e.g., via X12 837 formatted data files), providing claim payments (e.g., via X12 835 formatted data files), and/or the like.

Clinical data 355 (e.g., orders, problems) may be utilized by the ELS to facilitate determining add-ins or alternative services that should be offered to plan members (e.g., based on spending events that are likely to occur).

Figure 4:
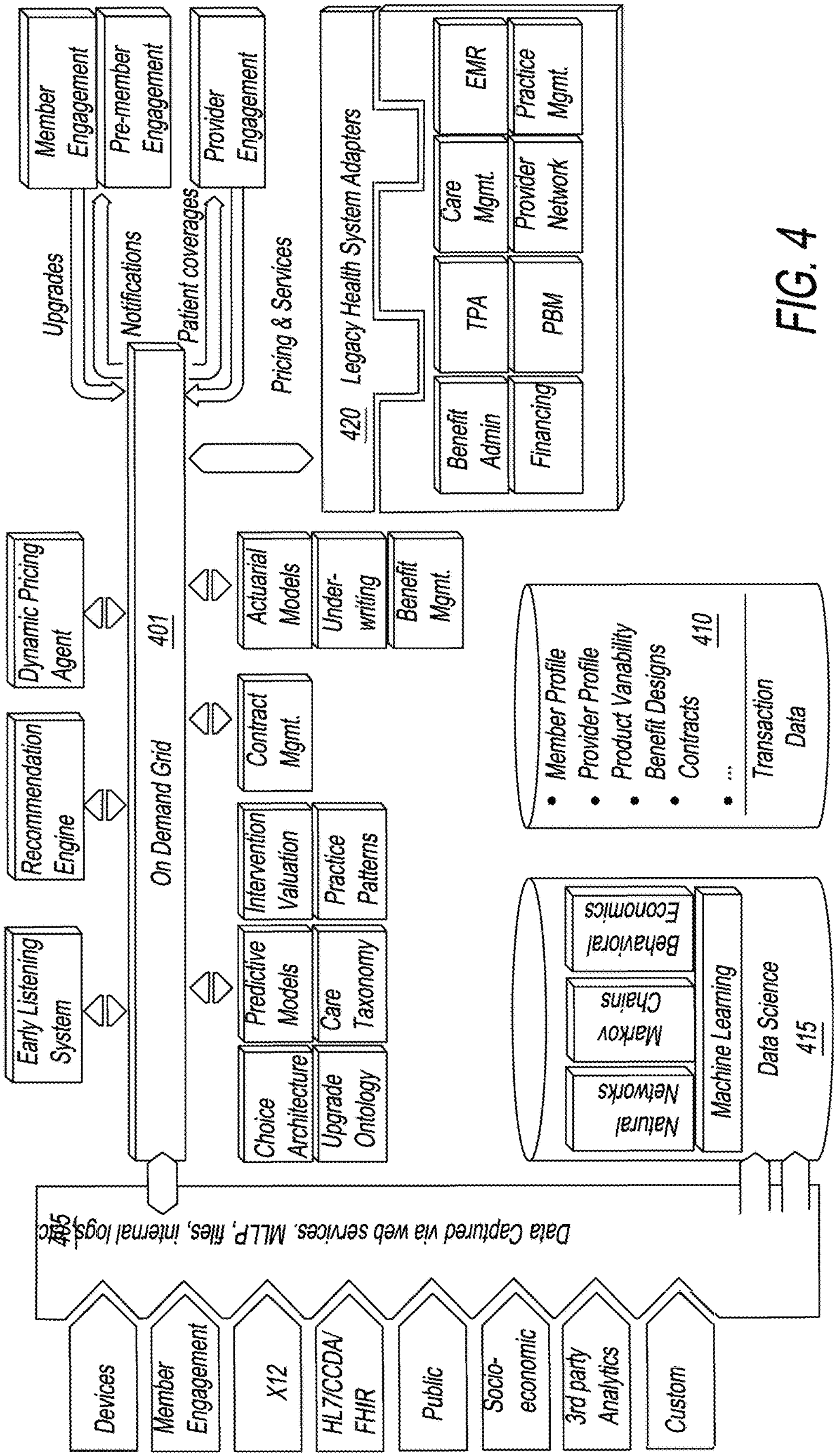
FIG. 4 shows an exemplary architecture for the UDRCD.

FIG. 4 shows an exemplary architecture for the UDRCD. In FIG. 4, the UDRCD may facilitate implementing delivery of an ODHI plan via an ODHI grid 401. In one embodiment, the ODHI grid may include a variety of architecture components. In one implementation, the ODHI grid may include a pre-member engagement component that facilitates member enrollment. In another implementation, the ODHI grid may include a member engagement component that facilitates notifying a plan member regarding add-ins or alternative services that may be useful to the plan member, and/or that facilitates upgrading the plan member's plan to include add-ins selected by the plan member. In another implementation, the ODHI grid may include an early listening system (ELS) and/or a recommendation engine that facilitate determining which add-ins may be useful to the plan member. In another implementation, the ODHI grid may include a dynamic pricing agent that facilitates determining pricing for core coverage and/or for add-ins coverage. See FIGS. 25-27 for additional details regarding the dynamic pricing agent. In another implementation, the ODHI grid may include an actuarial models component (e.g., to facilitate determining pricing), an underwriting component, a benefit management component (e.g., to facilitate keeping track of members' plan benefits), and/or the like that facilitate implementing the ODHI plan. In another implementation, the ODHI grid may include a contract management component that facilitates keeping track of contracts with providers, plan sponsors, plan members, and/or the like. In another implementation, the ODHI grid may include a provider engagement component that facilitates informing providers regarding plan members' coverage, and/or facilitates claims processing (e.g., based on services provided by providers and providers' pricing). The ODHI grid may utilize a variety of captured data 405. For example, such data may be captured via web services, Minimal Lower Layer protocol (MILP), files, messages, internal logs, and/or the like. In various implementations, such data may include devices data, member engagement data, X12 data, HL7/CCDA/FHIR data, public data, socio-economic data, third party analytics data, custom data, and/or the like. The ODHI grid may utilize a variety of transaction data 410 (e.g., stored in a transaction data database). In various implementations, transaction data may include member profiles data, provider profiles data, product variability data, benefit designs data, contracts data, and/or the like. The captured data and/or the transaction data may be utilized by a data science component 415 to implement machine learning processes (e.g., using neural networks, Markov chains, behavioral economics), by the ELS and/or recommendation engine to facilitate determining which add-ins may be useful to the plan member, and/or the like. In another implementation, the ODHI grid may include a choice architecture component, a predictive models component, an intervention valuation component, an upgrade ontology component, a care taxonomy component, a practice patterns component, and/or the like that facilitate implementing the ODHI plan and that are based on the captured data and/or the transaction data and/or the machine learning processes. In another implementation, the ODHI grid may include a legacy health system adapters component 420 to facilitate interfacing the ODHI grid with legacy health systems.

Figure 62:
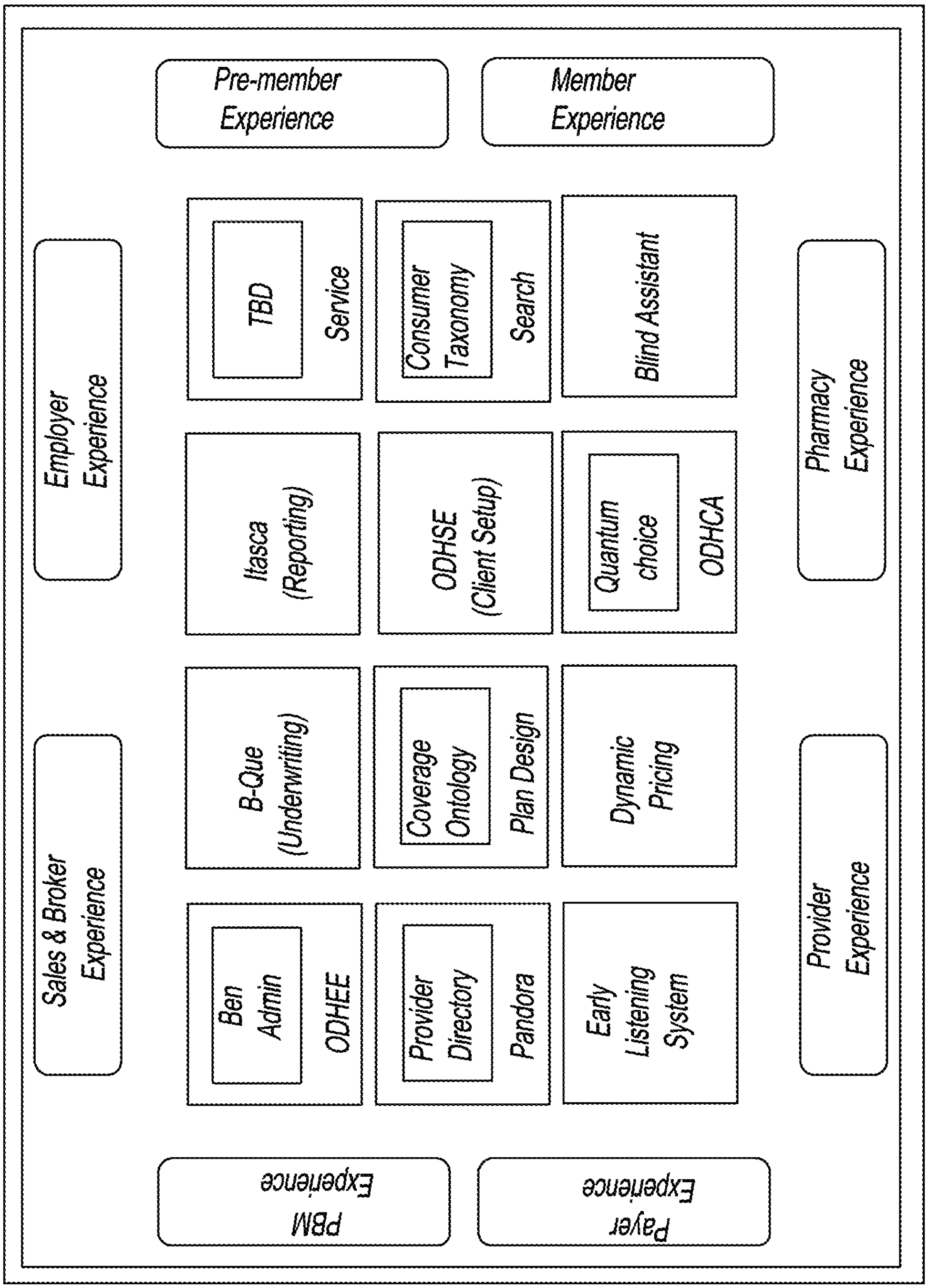
FIG. 62 shows an exemplary architecture for the UDRCD.

FIG. 62 shows an exemplary architecture for the UDRCD. In FIG. 62, the UDRCD may facilitate implementing delivery of ODHI plan features for various stakeholders via a set of architecture components. In one embodiment, the set of architecture components may include a benefit administering component (e.g., ODHEE), a provider directory component (e.g., Pandora), an ELS component, a dynamic pricing component, a plan design component (e.g., coverage ontology), an underwriting component (e.g., B-Que), a reporting component (e.g., Itasca), a client setup component (e.g., ODHSE), an ODHCA component (e.g., Quantum Choice), an assistant component, a search component (e.g., consumer taxonomy), a service component, and/or the like. In one implementation, the stakeholders may include pre-members, members, pharmacies, providers, payers, PBMs, sales and broker personnel, employers, and/or the like.

Figure 5:
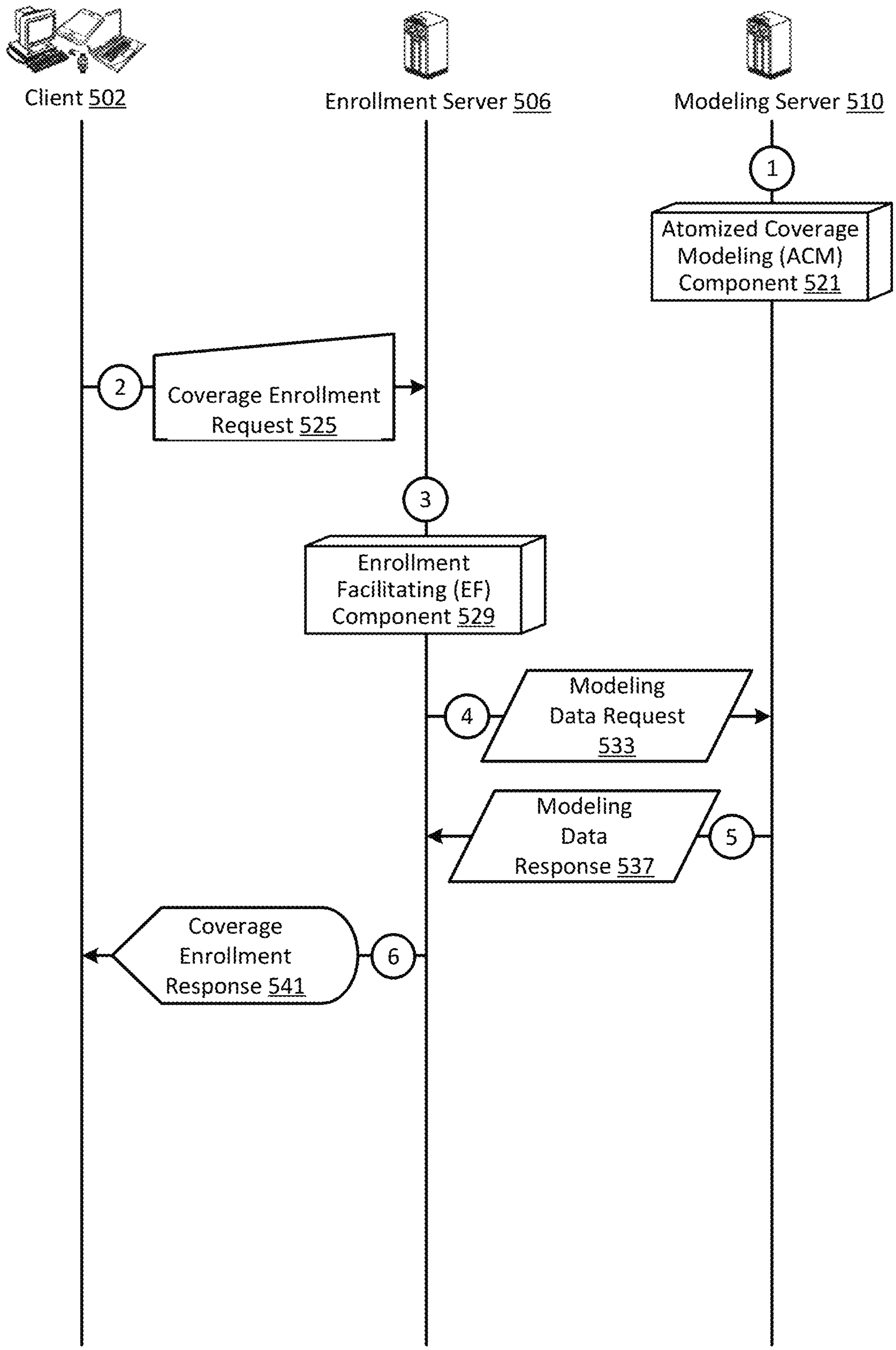
FIG. 5 shows a datagraph diagram illustrating embodiments of a data flow for the UDRCD.

FIG. 5 shows a datagraph diagram illustrating embodiments of a data flow for the UDRCD. In FIG. 5, a modeling server 510 may utilize an atomized coverage modeling (ACM) component 521 to facilitate generate modeling data (e.g., atomized conditions data, atomized procedures data, core coverage data, add-ins coverage data). See FIG. 6 for additional details regarding the ACM component.

A client 502 may send a coverage enrollment request 525 to an enrollment server 506 to facilitate coverage enrollment (e.g., into an ODHI plan) for a user. For example, the client may be a desktop, a laptop, a tablet, a smartphone, and/or the like that is executing a client application. In one implementation, the coverage enrollment request may include data such as a request identifier, user account details, coverage details, and/or the like. In one embodiment, the client may provide the following example coverage enrollment request, substantially in the form of a (Secure) Hypertext Transfer Protocol ("HTTP(S)") POST message including extensible Markup Language ("XML") formatted data, as provided below:

```
POST /authrequest. php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
      <user_name>ID_user_1</user_name>
      <password>abc123</password>
      //OPTIONAL <cookie>cookieID</cookie>
      //OPTIONAL     <digital_cert_link>www.mydigitalcertificate.com/
JohnDoeDaDoeDoe@gmail.com/mycertifcate.dc</digital_cert_link>
      //OPTIONAL <digital_certificate>_DATA_</digital_certificate>
    </user_account_credentials>
  </user_accounts_details>
  <client_details> //iOS Client with App and Webkit
      //it should be noted that although several client details
      //sections are provided to show example variants of client
      //sources, further messages will include only on to save
      //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>UDRCD.app</app_name>
    <app_version>1.0 </app_version>
    <app_webkit_name>Mobile Safari</client_webkit_name>
    <client_version>537.51.2</client_version>
  </client_details>
  <client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6, 1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.l</client_OS_version>
    <client_app_type>web browser</client_app_type>
    <client_name>Mobile Safari</client_name>
    <client_version>9537.53</client_version>
  </client details>
  <client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXXX</ client_UDID>
    <client_OS>Android</client_OS>
    <client_OS_version>4.0.4</client_OS_version>
    <client_app_type>web browser</client_app_type>
```

-continued

```
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14(KHTML, like Gecko)Version/7.0.3
Safari/537.75.14</user_agent_string>
        <client_product_type>MacPro5, 1</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <coverage_enrollment_request>
        <request_identifier>ID_request_1</request_identifier>
        <coverage_details>
            <plan_sponsor>ID_employer_1</plan_sponsor>
            <plan_selected>ID_ODHI_plan_1</plan_selected>
            <plan_term>3 years</plan_term>
            <coverage_type>individual</coverage_type>
            <provider_networks_selected>
                HealthEast, Fairview, HealthPartners
            </provider_networks_selected>
            <copays_selected>
                <emergency_room>$300</emergency_room>
                <hospitalization_unplanned>$2,500</hospitalization_unplanned>
                <medication_brand>$30</medication_brand>
                <medication_generic>$20</medication_generic>
                ...
            </copays_selected>
            <conditions_selected>
                <add_in>ID_condition_asthma</add_in>
            </conditions_selected>
            <procedures_selected>
                <add_in>
                    <type>ID_procedure_acupuncture</type>
                    <provider>ID_provider_1</provider>
                </add_in>
            </procedures_selected>
        </coverage_details>
    </coverage_enrollment_request>
</auth_request>
```

An enrollment facilitating (EF) component 529 may utilize data provided in the coverage enrollment request to facilitate coverage enrollment for the user. See FIG. 7 for additional details regarding the EF component.

The enrollment server may send a modeling data request 533 to the modeling server to obtain relevant modeling data. In one implementation, the modeling data request may include data such as a request identifier, coverage details, and/or the like. In one embodiment, the enrollment server may provide the following example modeling data request, substantially in the form of a HTTP(S) POST message including XML-formatted data, as provided below:

```
POST /modeling_data_response.php HTTP/1.1
Host: www.server.com
Content-Type: Application/XML
Content-Length: 667
<?XML version = "1.0" encoding = "UTF-8"?>
<modeling_data_response>
    <response_identifier>ID_response_2</response_identifier>
    <modeling_data>
        <core_cost>$45,292 for 3 years</core_cost>
        <add_ins_costs>
            <add_in>
                <type>ID_condition_asthma</type>
                <cost>$100 per month</cost>
```

-continued

```
            </add_in>
            <add_in>
                <type>ID_procedure_acupuncture</type>
                <cost>$500 for up to 4 sessions</cost>
            </add_in>
        </add_ins_costs>
    </modeling_data>
</modeling_data_response>
```

The modeling server may send a modeling data response 537 to the enrollment server to provide the requested modeling data. In one implementation, the modeling data response may include data such as a response identifier, core insurance costs, add-ins insurance costs, and/or the like. In one embodiment, the modeling server may provide the following example modeling data response, substantially in the form of a HTTP(S) POST message including XML-formatted data, as provided below:

```
POST /modeling_data_response.php HTTP/1.1
Host: www.server. com
Content-Type: Application/XML
Content-Length: 667
<?XML version = "1.0" encoding = "UTF-8"?>
```

-continued

```
<modeling_data_response>
  <response_identifier>ID_response_2</response_identifier>
  <modeling_data>
    <core_cost>$45,292 for 3 years</core_cost>
    <add_ins_costs>
      <add_in>
        <type> ID_condition_asthma</type>
        <cost>$100 per month</cost>
      </add_in>
      <add_in>
        <type> ID_procedure_acupuncture</type>
        <cost>$500 for up to 4 sessions</cost>
      </add_in>
    </add_ins_costs>
  </modeling_data>
</modeling_data_response>
```

The enrollment server may send a coverage enrollment response 541 to the client to inform the user (e.g., via a website, application (e.g., a mobile app), and/or the like) that the coverage enrollment request has been processed. In one implementation, the coverage enrollment response may include data such as a response identifier, a status, and/or the like.

In one embodiment, the enrollment server may provide the following example coverage enrollment response, substantially in the form of a HTTP(S) POST message including XML-formatted data, as provided below:

```
POST/coverage_enrollment_response.php HTTP/1.1
Host: www.server.com
Content-Type: Application/XML
Content-Length: 667
<? XML version="1.0" encoding="UTF-8"?>
<coverage_enrollment_response>
  <response_identifier>ID_response_1</response_identifier>
  <status>User Enrolled Successfully</status>
</coverage_enrollment_response>
```

Figure 6:
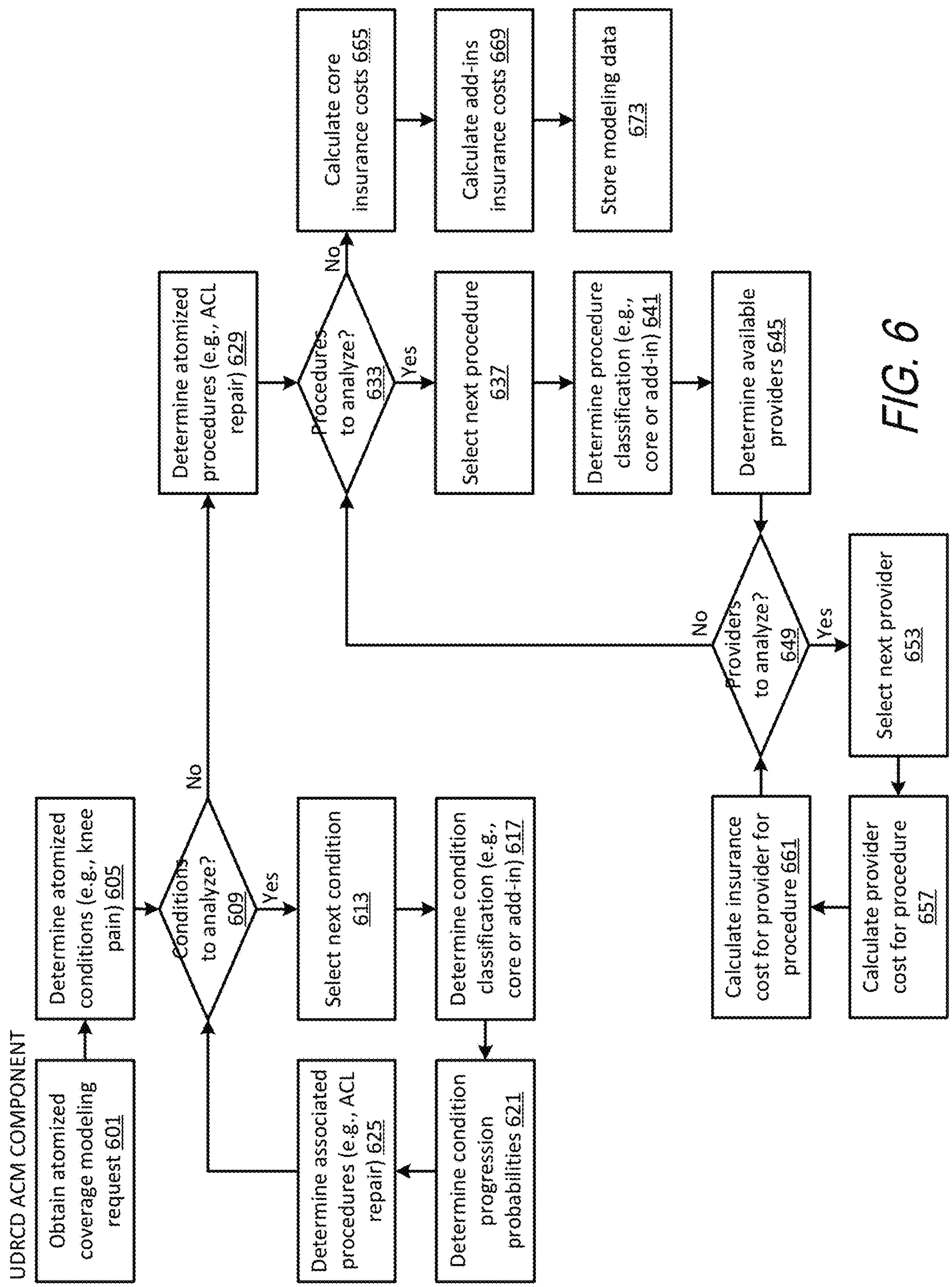
FIG. 6 shows a logic flow diagram illustrating embodiments of an atomized coverage modeling (ACM) component for the UDRCD.

FIG. 6 shows a logic flow diagram illustrating embodiments of an atomized coverage modeling (ACM) component for the UDRCD. In FIG. 6, an atomized coverage modeling request may be received at 601 to generate modeling data. For example, a modeling server may be configured to generate modeling data periodically (e.g., monthly, annually). In another example, a modeling server may be configured to generate modeling data on demand. In one implementation, modeling data may be generated for general UDRCD use. In another implementation, modeling data may be generated for a specified plan sponsor, ODHI plan, locality, provider network, plan term, plan member type (e.g., individual, family, member demographic), and/or the like.

Atomized conditions (e.g., knee pain) may be determined at 605. In one implementation, captured data (e.g., International Classification of Diseases (ICD)) may be utilized to determine a care taxonomy that specifies atomized conditions. In another implementation, machine learning processes may be utilized to analyze captured data (e.g., X12 data, HL7 data) to determine a care taxonomy that specifies atomized conditions.

A determination may be made at 609 whether there remain conditions to analyze. In one implementation, any atomized condition may be analyzed. If there remain conditions to analyze, the next atomized condition may be selected for analysis at 613.

Condition classification of the selected atomized condition may be determined at 617. For example, the selected atomized condition may be classified as being part of a core plan or as being an add-in. In one implementation, this determination may be made based on a general UDRCD setting. In another implementation, this determination may be made based on a setting associated with the plan sponsor, with the ODHI plan, with the locality, with the provider network, with the plan term, with the plan member type, and/or the like. For example, the condition classification may be determined via a MySQL database command similar to the following:

```
SELECT ConditionClassification
FROM Models
WHERE ConditionID=ID_condition_knee_pain;
```

Disease progression probabilities associated with the selected atomized condition may be determined at 621. In one implementation, machine learning processes may be utilized to determine probabilities associated with various ways (branches) in which a disease may progress. For example, Markov chains may be utilized.

Atomized procedures associated with the atomized condition may be determined at 625. In one embodiment, practice patterns data (e.g., as provided by the practice patterns component) may be utilized to determine procedures available to treat the condition. In one implementation, associated procedures may be determined for the various determined disease progression branches. For example, a set of procedures may be determined for each branch. In another implementation, associated procedures may be determined for the atomized condition. For example, a set of procedures utilized to treat the condition may be determined.

Atomized procedures (e.g., ACL repair) may be determined at 629. In one implementation, captured data (e.g., Current Procedural Terminology (CPT)) may be utilized to determine a care taxonomy that specifies atomized procedures. In another implementation, machine learning processes may be utilized to analyze captured data (e.g., X12 data, HL7 data) to determine a care taxonomy that specifies atomized procedures.

A determination may be made at 633 whether there remain procedures to analyze. In one implementation, any atomized procedure may be analyzed. If there remain procedures to analyze, the next atomized procedure may be selected for analysis at 637.

Procedure classification of the selected atomized procedure may be determined at 641. For example, the selected atomized procedure may be classified as being part of a core plan or as being an add-in. In one implementation, this determination may be made based on a general UDRCD setting. In another implementation, this determination may be made based on a setting associated with the plan sponsor, with the ODHI plan, with the locality, with the provider network, with the plan term, with the plan member type, and/or the like. For example, the procedure classification may be determined via a MySQL database command similar to the following:

```
SELECT ProcedureClassification
FROM Models
WHERE PlanID=ID_ODHI_plan_1 AND
  ProcedureID=ID_procedure_ACL_repair;
```

Available providers for the selected atomized procedure (e.g., providers that may perform the procedure) may be determined at 645. In one implementation, this determination may be made based on available UDRCD providers (e.g., providers that have a contract with the UDRCD and that perform the procedure). In another implementation, this determination may be made based on available UDRCD providers that are associated with the plan sponsor, with the ODHI plan, with the locality, with the provider network, with the plan term, with the plan member type, and/or the like. In some embodiments, available provider networks may be determined instead of individual providers.

A determination may be made at 649 whether there remain providers to analyze. In one implementation, any available provider or provider network may be analyzed. If there remain providers to analyze, the next available provider or provider network may be selected for analysis at 653.

The selected provider's or provider network's cost for the selected atomized procedure may be calculated at 657. In one implementation, practice patterns data (e.g., historical claims data (e.g., member claims experience, claims from partner providers and insurers, CMS, and other available claims data sets) as provided by the practice patterns component) may be utilized to calculate the expected (e.g., average) cost that the provider or provider network charges (e.g., based on their utilization patterns and reimbursement rates on expected services) for performing the selected atomized procedure. For example, claims submitted by the provider or provider network for the procedure over the last 3 years may be analyzed to calculate the average cost.

Insurance cost (e.g., to insure an individual plan member, to insure a family) associated with the selected atomized procedure for the selected provider or provider network may be calculated at 661. In one implementation, the selected provider's or provider network's cost for the selected atomized procedure, actuarial models (e.g., as provided by the actuarial models component), the plan term (e.g., 3 years), machine learning processes, and/or the like may be utilized to calculate the insurance cost.

Core insurance costs (e.g., for general UDRCD use; associated with the specified plan sponsor, ODHI plan, locality, provider network, plan term, plan member type) may be calculated at 665. In one implementation, insurance costs for each atomized procedure classified as core may be calculated. For example, insurance cost for an atomized procedure may be calculated based on a weighted average (e.g., weighted by provider utilization) of insurance costs associated with the available providers. Insurance costs for each atomized condition classified as core may be calculated. For example, insurance cost for an atomized condition may be calculated based on the sum of the insurance costs for the set of procedures utilized to treat the condition. In another example, insurance cost for an atomized condition may be calculated based on a weighted average (e.g., weighted by probabilities associated with each disease progression branch) of insurance costs for each branch. Insurance costs for a core plan may be calculated (e.g., to insure an individual plan member, to insure a family). For example, the insurance cost for the core plan may be calculated based on the sum of the calculated insurance costs for core procedures and core conditions.

Add-ins insurance costs (e.g., for general UDRCD use; associated with the specified plan sponsor, ODHI plan, locality, provider network, plan term, plan member type) may be calculated (e.g., to insure an individual plan member, to insure a family) at 669. In one implementation, insurance costs for each atomized procedure classified as add-in may be calculated and insurance costs for each atomized condition classified as add-in may be calculated.

Modeling data may be stored at 673. For example, the modeling data (e.g., for general UDRCD use; associated with the specified plan sponsor, ODHI plan, locality, provider network, plan term, plan member type) may be stored (e.g., via one or more SQL statements) in a models database **10519*j***. In various implementations, modeling data may include atomized conditions data (e.g., atomized conditions, condition classification, condition progression probabilities, associated procedures), atomized procedures data (e.g., atomized procedures, procedure classification, available providers, providers costs, insurance costs for providers), core insurance coverage data (e.g., the set of atomized conditions and atomized procedures included in core insurance), core insurance costs, add-ins insurance coverage data (e.g., the set of atomized conditions and atomized procedures included in add-ins insurance), add-ins insurance costs, and/or the like.

Figure 7:
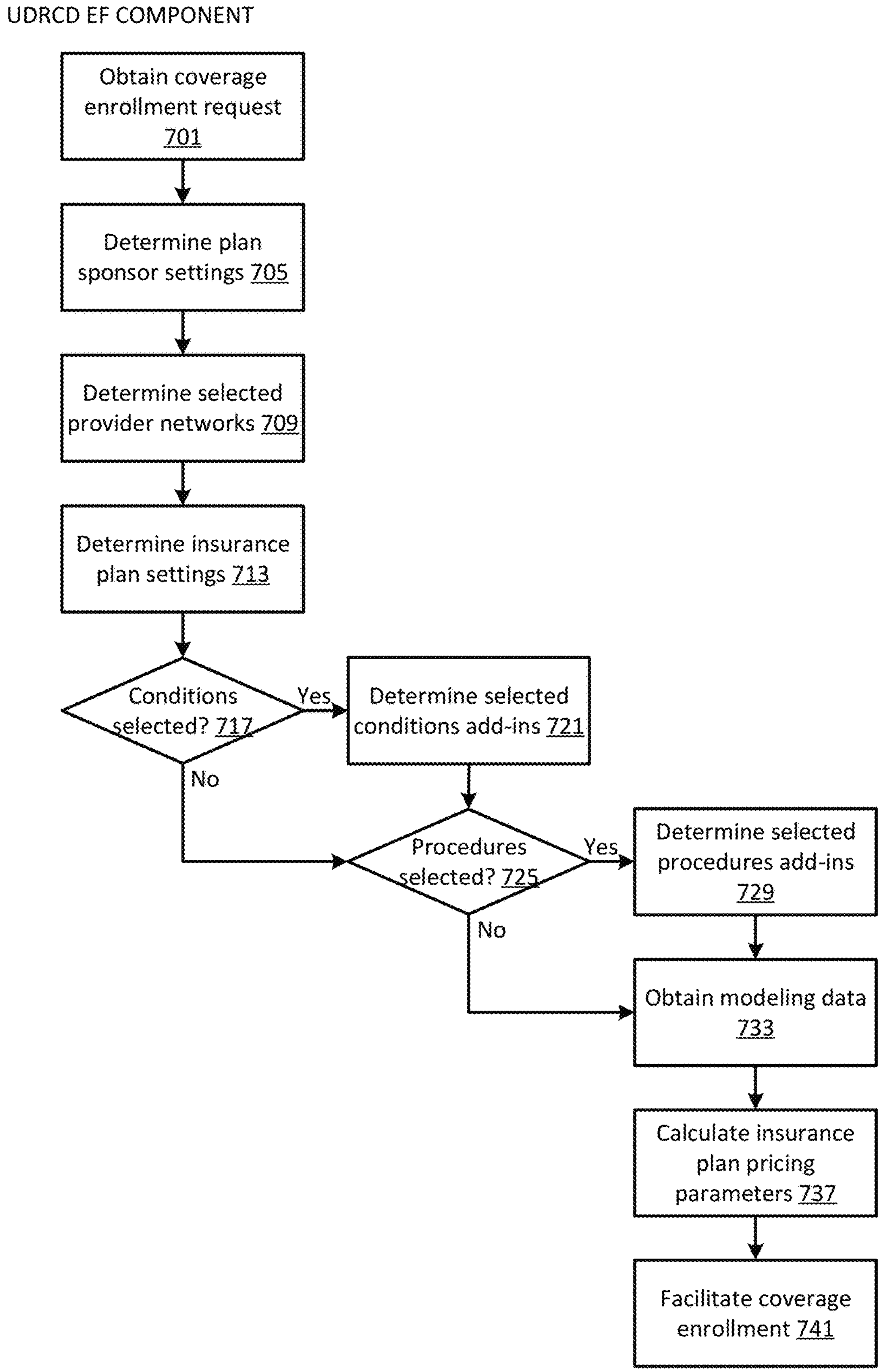
FIG. 7 shows a logic flow diagram illustrating embodiments of an enrollment facilitating (EF) component for the UDRCD.

FIG. 7 shows a logic flow diagram illustrating embodiments of an enrollment facilitating (EF) component for the UDRCD. In FIG. 7, a coverage enrollment request may be obtained at 701. For example, the coverage enrollment request may be obtained as a result of a user requesting to enroll into an ODHI plan.

Plan sponsor settings associated with the enrollment request may be determined at 705. For example, a plan sponsor may be an employer of the user. In one embodiment, the plan sponsor may subsidize (e.g., in whole or in part) core insurance costs and/or add-ins insurance costs for the user. In various implementations, the plan sponsor settings may include available insurance plans, available plan terms, available coverage types, available provider networks, condition classification settings specified by the plan sponsor, procedure classification settings specified by the plan sponsor, data regarding subsidies offered by the plan sponsor (e.g., for the core insurance costs, for the add-ins insurance costs), HRA settings (e.g., data regarding the plan sponsor's contribution to the HRA), and/or the like. For example, the plan sponsor settings may be retrieved (e.g., as provided by the employer ODHI benefit design component) via one or more SQL statements. In one implementation, the plan sponsor settings may be utilized to configure available options for an enrollment user interface that may be utilized by the user (e.g., via a mobile app, via a website) to configure the user's ODHI plan by selecting from the available options. In another implementation, the plan sponsor settings may be utilized to facilitate calculating insurance plan pricing parameters for the user's ODHI plan.

Provider networks selected by the user may be determined at 709. In one implementation, the coverage enrollment request may be parsed (e.g., using PHP commands) to determine the user selected (e.g., via the enrollment user interface) provider networks. For example, the user may select provider networks that include providers that the user is likely to use (e.g., based on geographic proximity of such providers to the user's location). In another example, the user may select provider networks that fit the user's budget (e.g., insurance costs associated with different provider networks may differ).

Insurance plan settings selected by the user may be determined at 713. In one implementation, the coverage enrollment request may be parsed (e.g., using PHP commands) to determine the user selected (e.g., via the enrollment user interface) insurance plan settings. For example, the user may select from available plans (e.g., having different configurations), plan terms (e.g., 1 year, 3 years, 10 years), coverage types (e.g., individual, family), and/or the like. In another example, the user may set copay amounts for various individual services (e.g., emergency room, unplanned hospitalization, brand medication, generic medication).

A determination may be made at 717 whether the user selected any atomized conditions. If so, the selected conditions add-ins (e.g., asthma) may be determined at 721. In one implementation, the coverage enrollment request may be parsed (e.g., using PHP commands) to determine the user selected (e.g., via the enrollment user interface) conditions add-ins.

A determination may be made at 725 whether the user selected any atomized procedures. If so, the selected procedures add-ins (e.g., acupuncture) may be determined at 729. In one implementation, the coverage enrollment request may be parsed (e.g., using PHP commands) to determine the user selected (e.g., via the enrollment user interface) procedures add-ins.

Modeling data associated with the coverage enrollment request may be obtained at 733. In one implementation, the modeling data may be obtained by sending a modeling data request to a modeling server (e.g., based on the plan sponsor settings and/or the user selected options). In another implementation, the modeling data may be cached (e.g., by an enrollment server, by a client) to facilitate generating the enrollment user interface (e.g., to show the user how insurance plan pricing parameters change based on the user's selections).

Insurance plan pricing parameters may be calculated at 737. For example, insurance plan pricing parameters may include pay period deduction for the user to pay for the user's ODHI plan, available HRA balance remaining (e.g., to pay for additional conditions and/or procedures in the future), how a change (e.g., the last insurance plan configuration change made by the user via the enrollment user interface) affects pay period deduction and/or available HRA balance remaining, and/or the like. In one implementation, core insurance cost and/or add-ins insurance costs associated with the user's ODHI plan may be utilized to determine an overall insurance cost for the user's ODHI plan. For example, the overall insurance cost (e.g., $49,392 for 3 years) for the user's ODHI plan may be calculated based on the sum of the core insurance cost (e.g., $45,292 core cost) and add-ins insurance costs (e.g., $3,600 for 3 years (at $100 per month) for Asthma condition add-in and $500 for up to four sessions of acupuncture procedure add-in) associated with the user's ODHI plan. Plan sponsor settings (e.g., data regarding subsidies offered by the plan sponsor (e.g., for the core insurance costs, for the add-ins insurance costs), HRA settings) may be utilized to calculate pay period deduction for the user, available HRA balance remaining, effects of a change, and/or the like. For example, if the plan sponsor subsidizes 50% of the cost of the user's ODHI plan and the user gets paid two times per month, then the user's pay period deduction (e.g., $343) may be calculated as follows:

$49,392 overall cost for three years*50% user responsibility=$24,696 user cost for three years $24,696 user cost for three years/36 months=$686 user cost per month $686 user cost per month/2 pay periods per month=$343 pay period deduction Coverage enrollment of the user into the user's ODHI plan may be facilitated at 741. In one implementation, enrollment data associated with the user's ODHI plan may be provided to an employer benefit administrator system of the plan sponsor to facilitate enrolling the user into the plan, setting up payroll deductions to pay for the plan, and/or the like.

Figure 8:
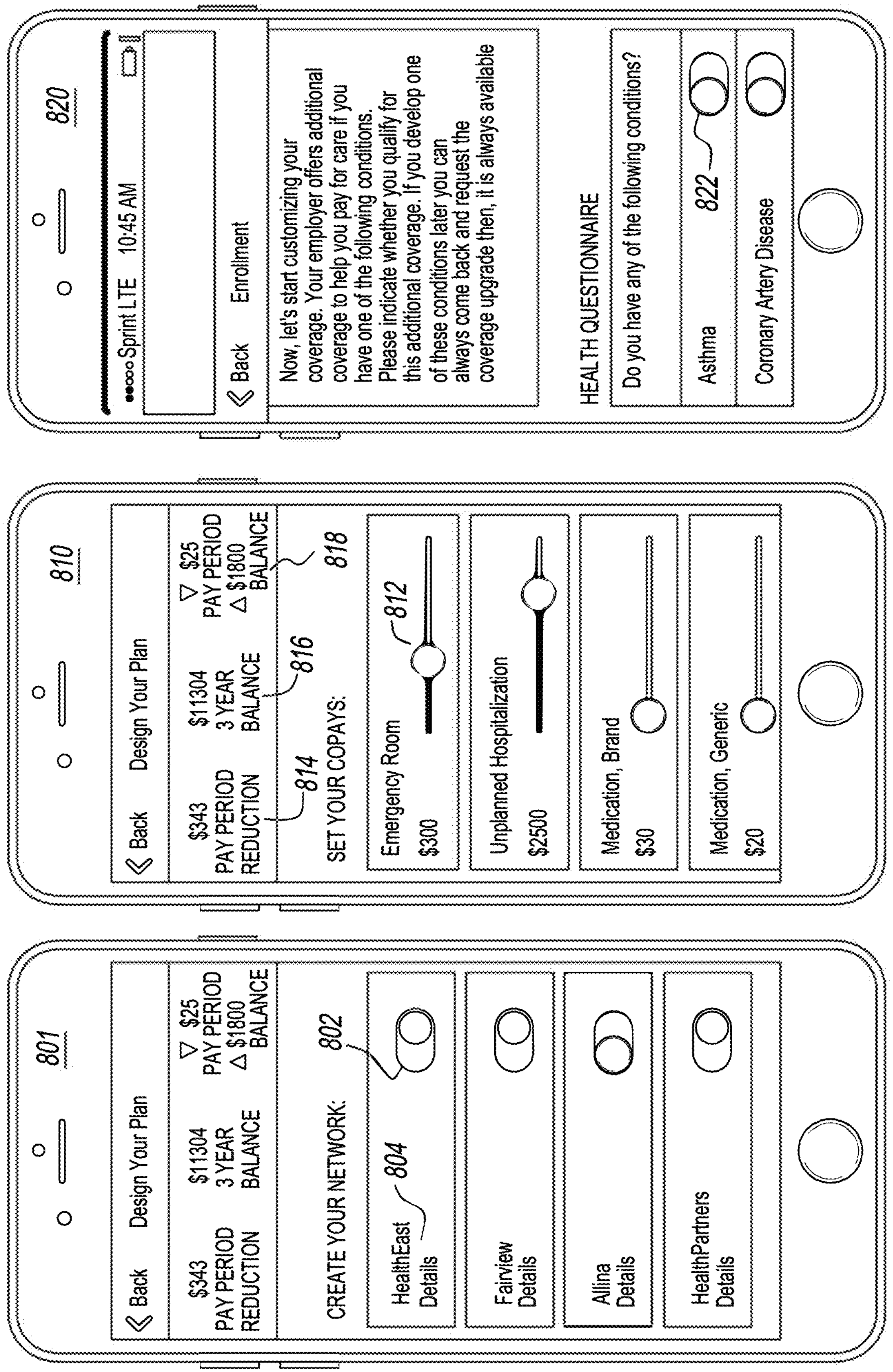
FIG. 8 shows a screenshot diagram illustrating embodiments of the UDRCD.

FIG. 8 shows a screenshot diagram illustrating embodiments of the UDRCD. In FIG. 8, an exemplary enrollment user interface is shown. Screen 801 shows how a user may select different provider networks for the user's ODHI plan. For example, the user may use a toggle switch 802 to select the HealthEast provider network. In another example, the user may click on a details GUI widget 804 to view additional information regarding each provider network (e.g., participating providers, insurance cost data). Screen 810 shows how a user may set copays for various services. For example, the user may use a slider 812 to set the emergency room copay. In another example, the resulting pay period deduction 814, available HRA balance remaining 816, and how the last change (e.g., to increase emergency room copay from $200 to $300) affected the pay period deduction and the available HRA balance remaining 818. Screen 820 shows how the user may select condition add-ins for the user's ODHI plan. For example, the user may use a toggle switch 822 to select the Asthma add-in.

Figure 9:
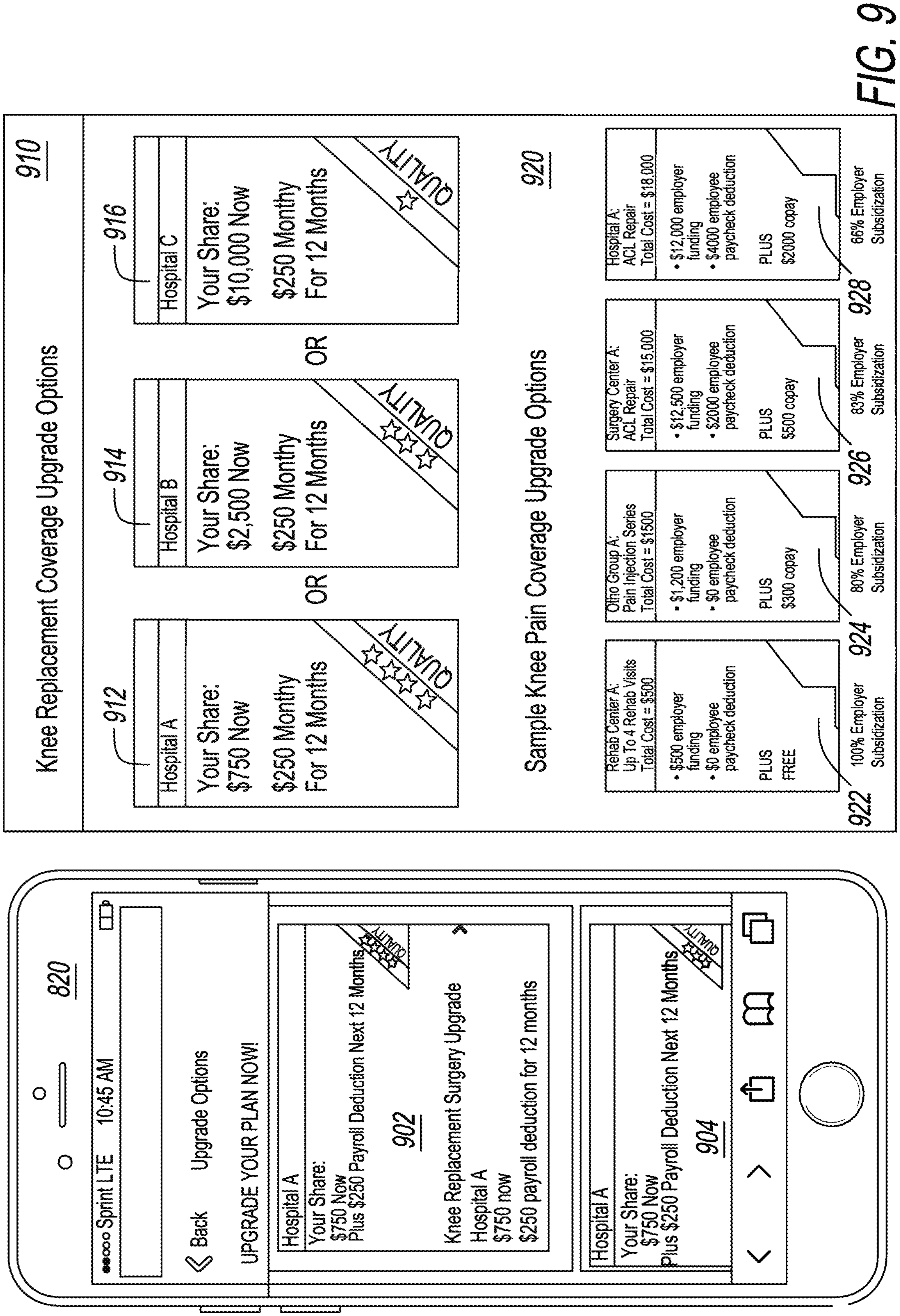
FIG. 9 shows a screenshot diagram illustrating embodiments of the UDRCD.

FIG. 9 shows a screenshot diagram illustrating embodiments of the UDRCD. In FIG. 9, an exemplary enrollment user interface is shown. An upgrade options screen 901 shows how a user may upgrade the user's ODHI plan by selecting an add-in (e.g., for knee pain coverage). For example, the user may click on one of the available knee replacement surgery coverage add-in options 902 or 904 to upgrade. Screen 910 shows an example of the upgrade options that may be available to the user in screen 901. For example, the user may select from three different hospitals 912, 914, and 916, with each hospital having a different quality rating and a different insurance cost (e.g., higher quality providers may have lower insurance costs). Screen 920 shows another example of the upgrade options that may be available to the user in screen 901. For example, the user may select from four different providers 922, 924, 926, and 928, with providers offering different treatment options (e.g., procedures) and having different employer subsidization percentages.

FIG. 10 shows a screenshot diagram illustrating embodiments of the UDRCD. In FIG. 10, an exemplary copay schedule comparison of copay amounts that a user has to pay for various services with core coverage vs. core coverage and add-ins coverage is shown. As shown in FIG. 10, having add-ins coverage may lower copays for certain services (e.g., primary care visit, specialty visit, urgent care, prescription drugs). It is to be understood that different add-ins may affect copays for different services.

Figure 11:
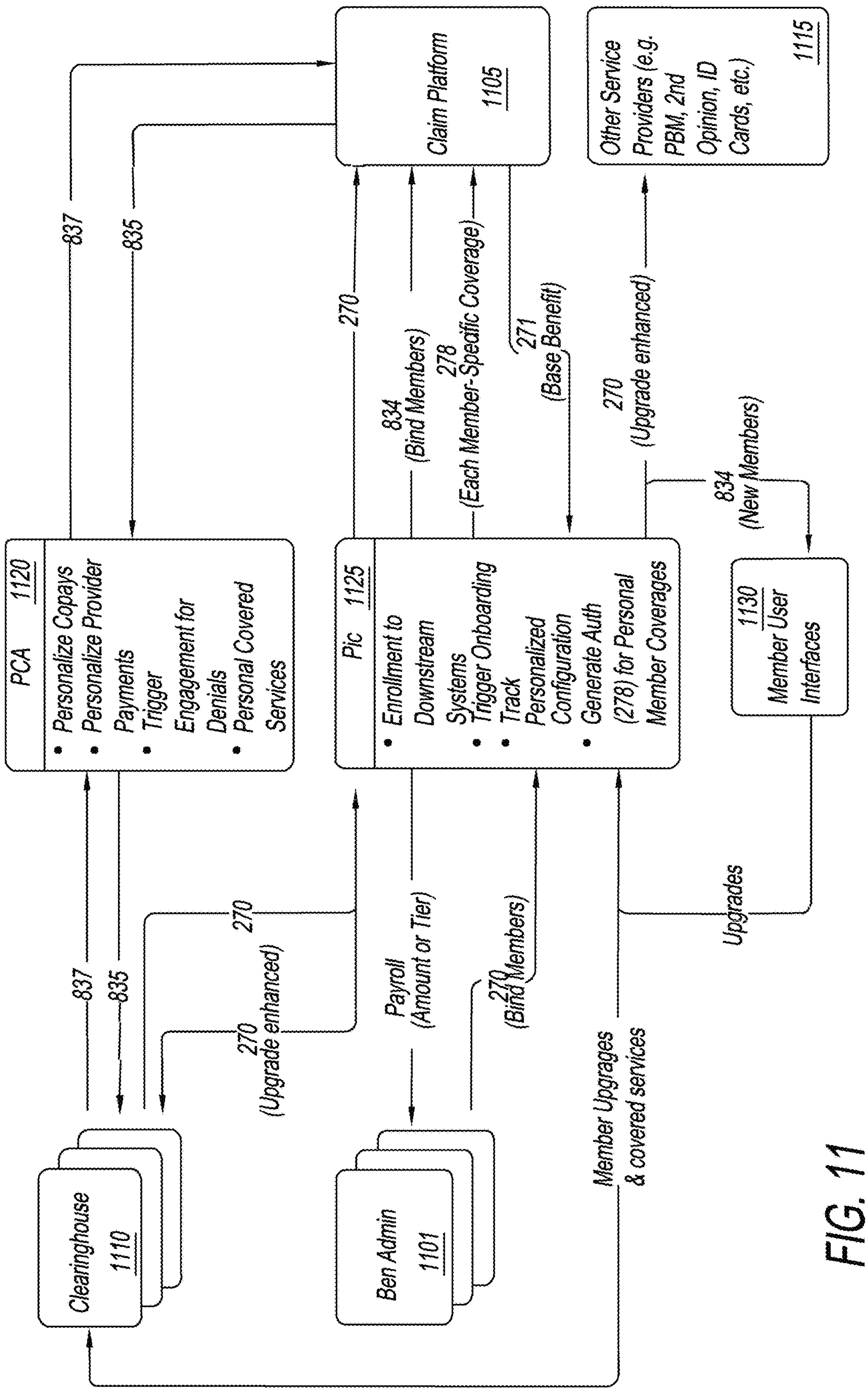
FIG. 11 shows an exemplary architecture for the UDRCD.

FIG. 11 shows an exemplary architecture for the UDRCD. In FIG. 11, a claim administration platform is illustrated. In one embodiment, the claim administration platform facilitates claim processing of each member's individually configured ODHI plan. In one implementation, the claim administration platform interoperates with benefit administration systems 1101 (e.g., benefit administration systems cannot support member personalization of a medical benefit and the resulting calculations and communications), a claim platform 1105 (e.g., claim platforms predefine the insurance coverage and providers, and then associated members to one of the predefined options), clearinghouse systems 1110, other service provider (e.g., pharmacy benefit manager (PB), $2^{nd}$ opinion, ID cards) systems 1115, and/or the like to facilitate ODHI plan administration in a pluggable manner with health industry systems. For example, numbered arrows indicate various X12 data files that may be sent among different claim administration platform components and health industry systems.

In one embodiment, the claim administration platform includes a personal claim administrator (PCA) component 1120, a personal insurance coordinator (PIC) component

1125, and an onboarding engine (OF) 1130. In one implementation, the PCA component may facilitate personalization of copays, personalization of provider payments, triggering engagement for denials, personal covered services, and/or the like. In one implementation, the PIC component may facilitate enrollment to downstream systems, triggering onboarding, tracking personalized configuration, generating authorization (e.g., X12 278 formatted data files) for personal member coverages, and/or the like. In one implementation, the OF may facilitate onboarding new members and upgrades via member user interfaces, and/or the like. For example:

Personalize Copays

Copays for the services delivered to plan members by providers are applied during claims processing based on the chosen insurance coverage at the time the member added that coverage to the member's benefit. The copay can vary based on a variety of factors, including treatment choice, providers delivering the treatments, location of the treatments, the underlying provider and location fees and practice patterns at the time the coverage was added, provider warranties or guarantees of their work, provider collection and use of functional outcomes information, provider integration of clinical data sharing or scheduling, and/or the like. These copays are determined and passed to the Claim Platform for adjudication accordingly.

Personalize Provider Payments

The amount paid to providers for services delivered to members is determined at the time the member coverage was added. The amount can vary by provider price commitment at any given point in time, either by providers configuring specific prices or by provider specification of an algorithm, within agreed on parameters. Personalized claim processing delivers payment instructions to be used to pay specific claims based on the fees captured at the time coverage was added. In one embodiment, the price variation in the amount paid to providers is driven by the provider's use of dynamic pricing tools that allow them to vary the allowed costs for services within parameters outlines in their contractual arrangements. This is different than the copayment that the provider collects from the member, which typically makes up a portion of that overall allowed amount they collect for the service. The member copayment may take into account changes made by the provider through their dynamic pricing of a service in determining the member share of that cost that the provider may collect as a copay.

Trigger Engagement for Denials

In addition to proactive outreach based on algorithms in the Early Listening System, outreach to members based on Denials is used to both inform and educate members, as well as to allow for member coverage additions per plan sponsor configured parameters by post processing claims.

Personal Covered Services

The coverage available for member selection can vary by services included. Personalized claim adjudication takes into consideration the services included for that member based on the member's coverage choices at the time the coverage was added.

Enrollment to Downstream Systems

Enrollment information may be provided to other systems involved in delivering the on-demand health insurance. The mechanism as well as the amount of information provided is determined and delivered based on the specifications of each downstream system.

Trigger Onboarding

Enrollment is a multi-part process, including the initial selection of the on-demand health insurance, the subsequent personalization of that insurance for each member, and the configuration of the product specifically for each member.

Track Personalized Configuration

Each member's personal health coverage is tracked, including all of the parameters involved in the coverage at the point at which it was chosen.

Generate Auth for Personal Member Coverages

Successful adjudication of claims is facilitated in part by creation and management of electronic prior authorization instructions for the claims system that specify coverage and payment parameters for additional personal coverage for each member.

In one implementation, the claim administration platform allows insurance to be individually configurable by each member to meet specific personal insurance needs. The claim administration platform manages the member's individually configured insurance, along with individualized changes over time, and performs the computations utilized to ensure insurance claims are processed according to each member's individual insurance configuration. For example, the claim administration platform may include the capability to provide instructions to the claims system on the member's individual configuration through the use of prior authorizations to specify coverages for services at one or more providers with specific payment arrangements, and the capability to set inline claims instructions that specify how a specific claim should be processed per the member's chosen configuration. In another example, the claim administration platform may allow for varying each capability to adapt to the unique constraints of the target claims adjudication engine.

Figure 63:
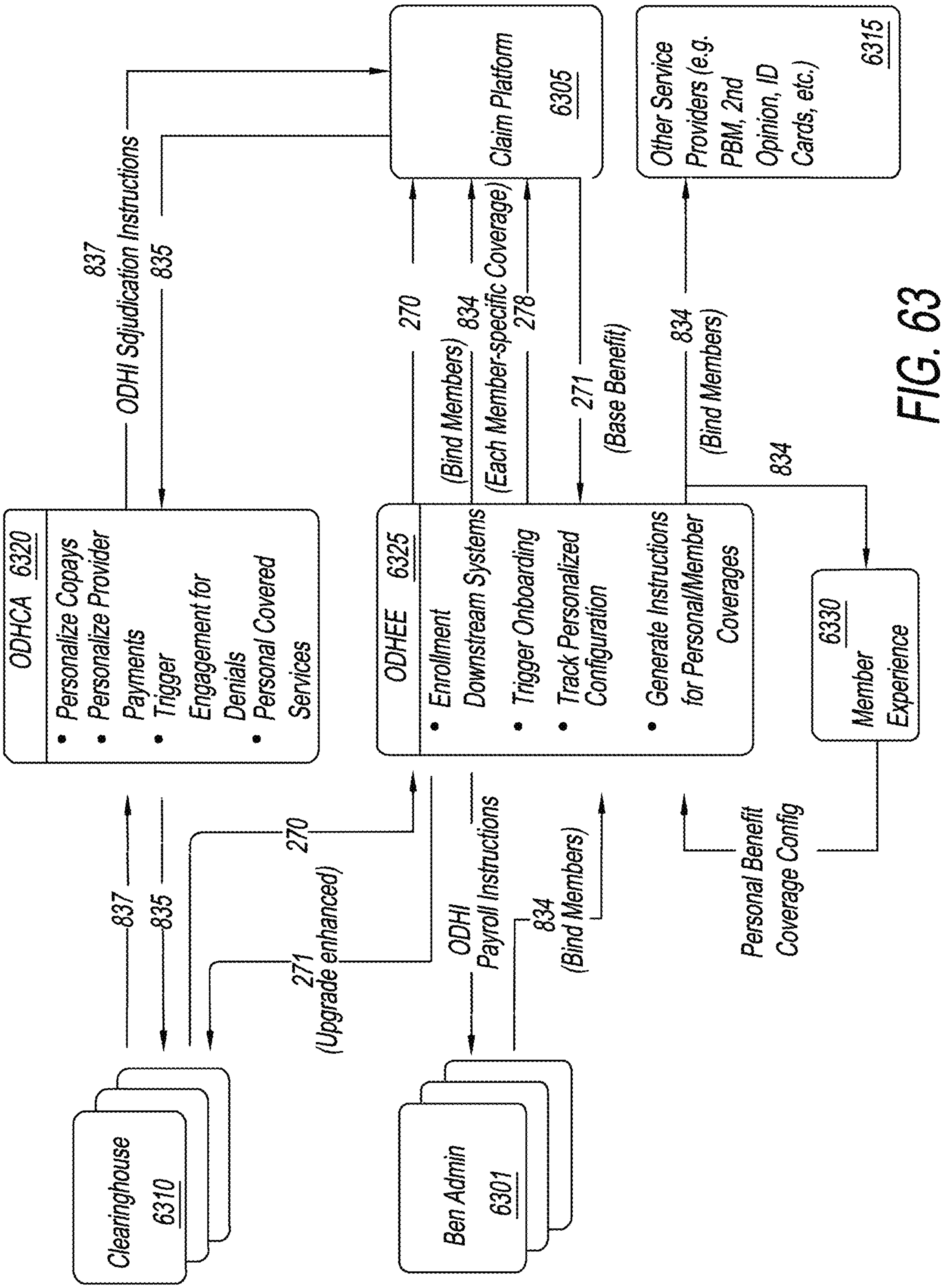
FIG. 63 shows an exemplary architecture for the UDRCD.

FIG. 63 shows an exemplary architecture for the UDRCD. In FIG. 63, alternative embodiments of a claim administration platform are illustrated. In one embodiment, the claim administration platform facilitates claim processing of each member's individually configured ODHI plan. In one implementation, the claim administration platform interoperates with benefit administration systems 6301 (e.g., benefit administration systems cannot support member personalization of a medical benefit and the resulting calculations and communications), a claim platform 6305 (e.g., claim platforms predefine the insurance coverage and providers, and then associated members to one of the predefined options), clearinghouse systems 6310, other service provider (e.g., pharmacy benefit manager (PBM), 2$^{nd}$ opinion, ID cards) systems 6315, and/or the like to facilitate ODHI plan administration in a pluggable manner with health industry systems. For example, numbered arrows indicate various X12 data files that may be sent among different claim administration platform components and health industry systems.

In one embodiment, the claim administration platform includes an On-Demand Health Claims Administrator (ODHCA) component 6320, an On-Demand Health Enrollment Engine (ODHEE) component 6325, and a member experience component 6330. In one implementation, the ODHCA component may facilitate personalization of copays, personalization of provider payments, triggering engagement for denials, personal covered services, and/or the like. In one implementation, the ODHEE component may facilitate enrollment to downstream systems, triggering onboarding, tracking personalized configuration, generating instructions (e.g., X12 278 formatted data files) for personal member coverages, and/or the like. In one implementation, the member experience component may facilitate onboarding new members and personal benefit coverage configuration via member user interfaces, and/or the like.

Figure 12:
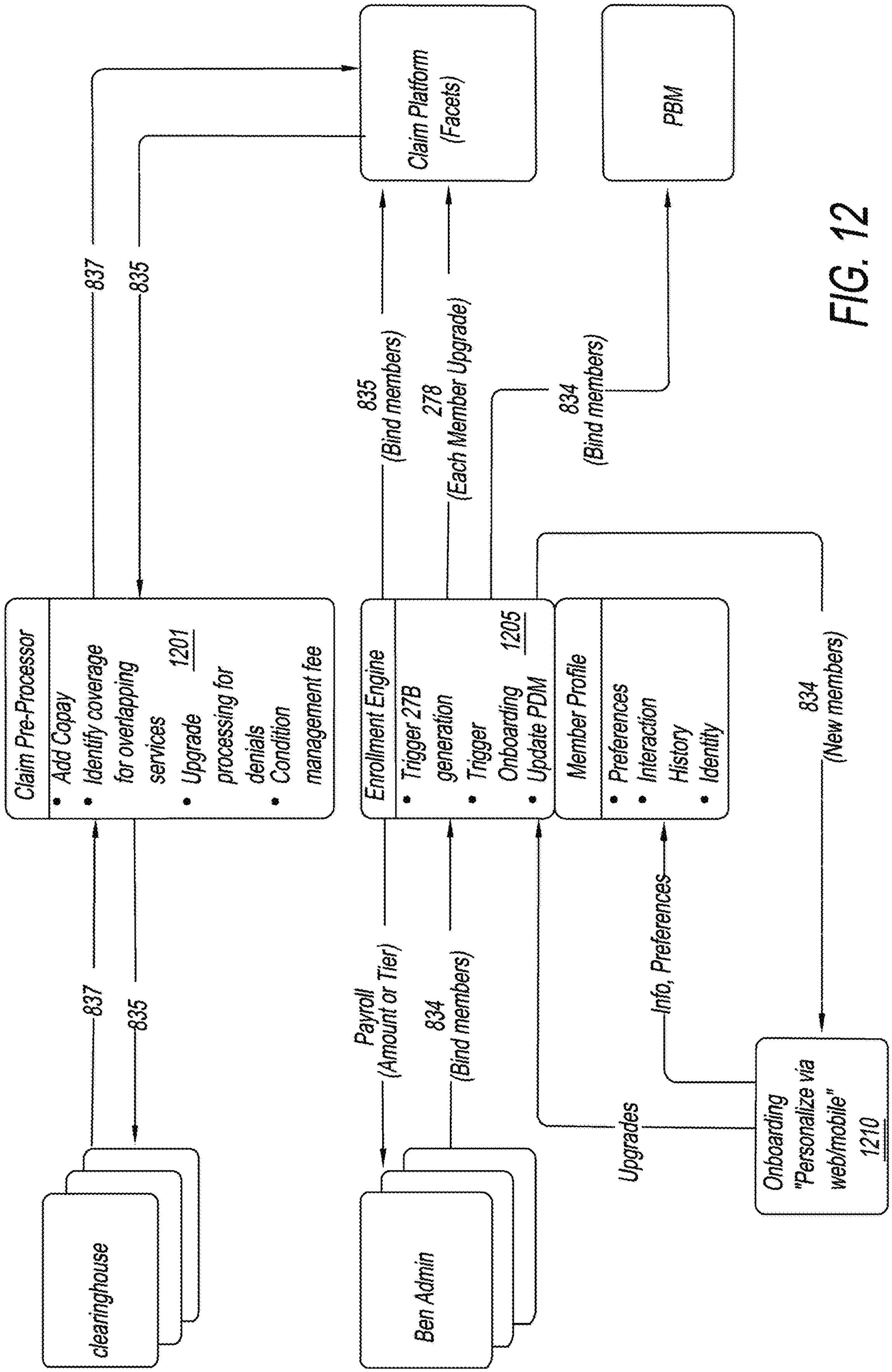
FIG. 12 shows an exemplary architecture for the UDRCD.

FIG. 12 shows an exemplary architecture for the UDRCD. In FIG. 12, alternative embodiments of a claim administration platform are illustrated. In one embodiment, the claim administration platform includes a claim pre-processor component 1201, an enrollment engine 1205, and an onboarding engine (OF) 1210. In one implementation, the claim pre-processor component may facilitate adding copay, identifying coverage for overlapping services, upgrading processing for denials, condition management fee administration, and/or the like. In one implementation, the enrollment engine may facilitate triggering X12 278 formatted data file generation, triggering onboarding, updating PBM, storing a member profile (e.g., a member profile may include preferences, interaction history, identity, and/or the like), and/or the like. In one implementation, the OF may facilitate onboarding new members and upgrades via personalized web and/or mobile user interfaces.

Figure 64:
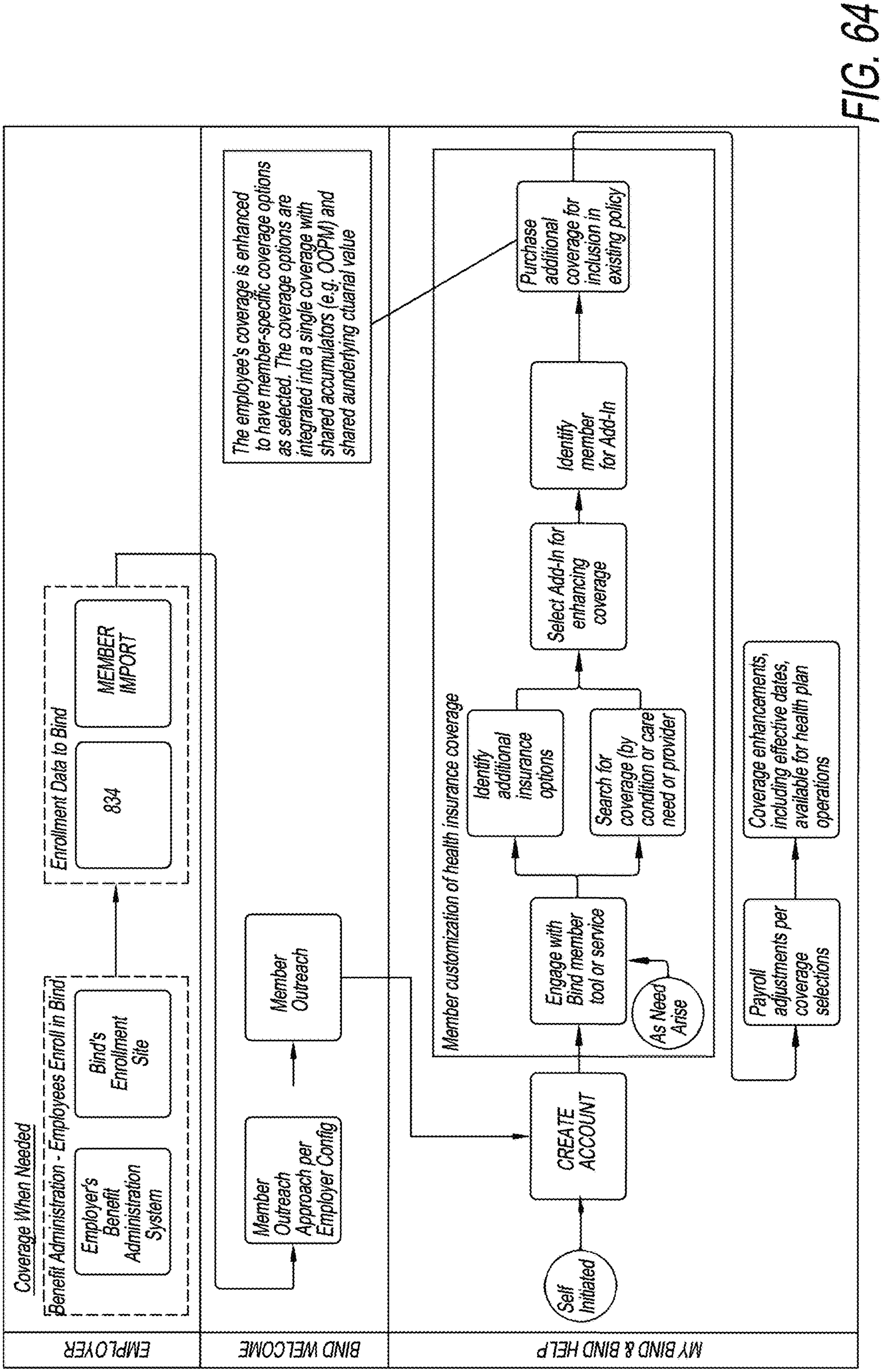
FIG. 64 shows an exemplary architecture for the UDRCD.

FIG. 64 shows an exemplary architecture for the UDRCD. In FIG. 64, an embodiment of how a claim administration platform may be utilized to facilitate member enrollment is illustrated. In one implementation, an employer's benefit administration system and/or a UDRCD enrollment site may be utilized to enable employees to enroll into an ODHI plan. Enrollment data may be provided to the UDRCD. Upon enrollment, member outreach may be provided per the employer's configuration.

In one implementation, once an account is created for a member, the member may utilize UDRCD tools and/or services to identify additional insurance options and/or to search for coverage. Additional add-ins may be selected and added to the member's ODHI plan. The member's payroll may be adjusted based on the selections and coverage enhancements may be enabled.

Figure 13:
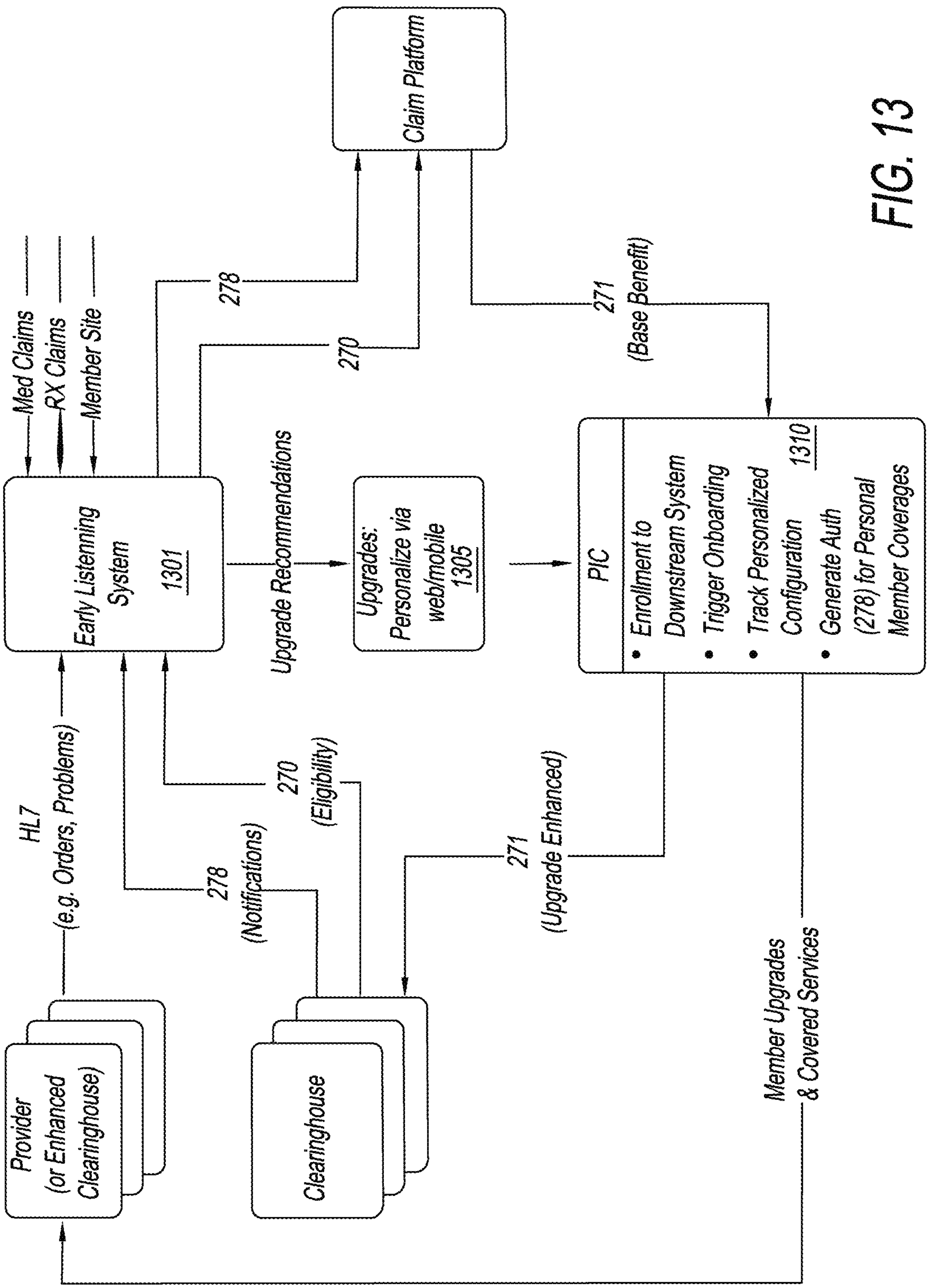
FIG. 13 shows an exemplary architecture for the UDRCD.

FIG. 13 shows an exemplary architecture for the UDRCD. In FIG. 13, an embodiment of how a claim administration platform interoperates with an ELS to provide upgrade recommendations and facilitate upgrade enrollment is illustrated. In one implementation, the ELS 1301 obtains data such as medical claims, medical prescription claims, member site visit data (e.g., "Is it covered?" searches), HL7 data (e.g., orders, problems), X12 data (e.g., notifications, eligibility), and/or the like. The ELS may utilize such data to determine upgrade recommendations (e.g., add-ins that should be offered to plan members).

In one implementation, the ELS may provide the determined upgrade recommendations to an onboarding engine (OE) 1305. For example, the OE may facilitate offering upgrade recommendations to plan members via personalized web and/or mobile user interfaces.

In one implementation, add-in upgrades selected by plan members for enrollment may be provided to a personal insurance coordinator (PIC) component (e.g., an enrollment engine) 1310. For example, the PIC component may facilitate enrollment to downstream systems, triggering onboarding, tracking personalized configuration, generating authorization (e.g., X12 278 formatted data files) for personal member coverages, and/or the like.

Figure 14:
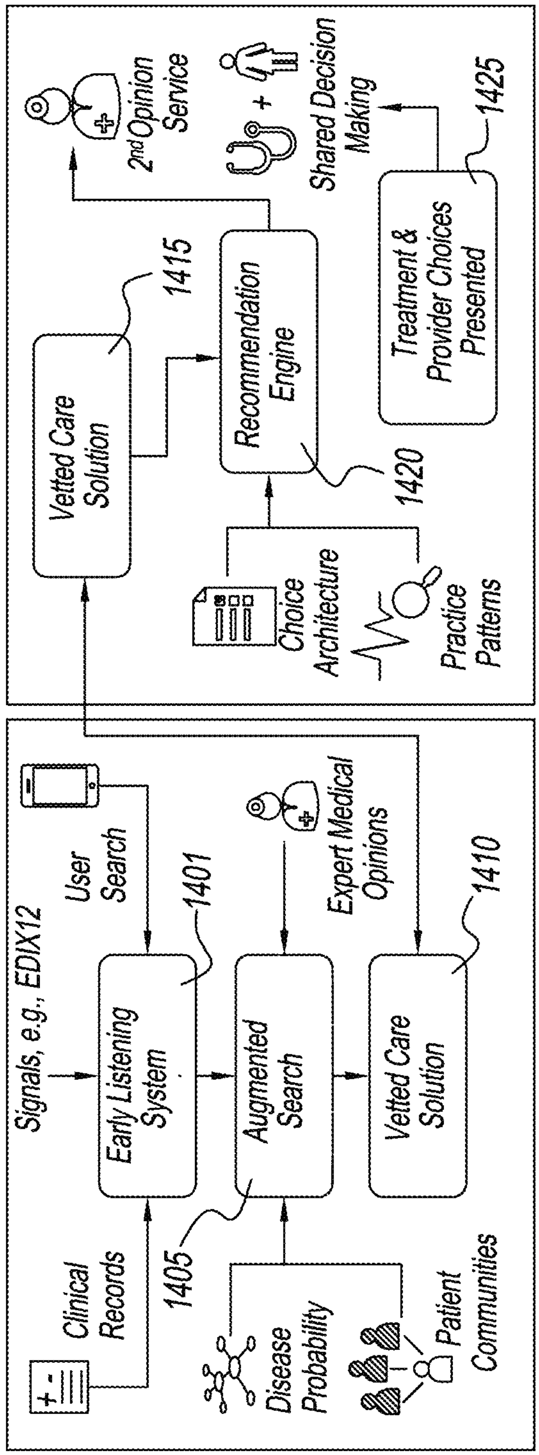
FIG. 14 shows an exemplary architecture for the UDRCD.

FIG. 14 shows an exemplary architecture for the UDRCD. In FIG. 14, an embodiment of how an ELS facilitates presenting treatment and/or provider choices (e.g., associated with a medical condition) to plan members is illustrated. For example, the ELS may facilitate presenting condition-specific coverage information (e.g., existing coverage, available upgrades).

In one implementation, the ELS 1401 obtains event signals from a variety of sources (e.g., clinical records, X12 data files, user searches, provider actions (e.g., prior authorizations, benefit checks, eligibility checks)), and/or the like. The ELS may utilize machine learning processes (e.g., as provided by the data science component) to conduct an augmented search 1405 based on the obtained event signals (e.g., that indicate a medical condition) to determine a vetted care solution 1410 that is appropriate for the condition. In one implementation, the obtained event signal data associated with a plan member, disease progression probability data, patient communities data (e.g., data regarding care efficacy), expert medical opinions data (e.g., data regarding care efficacy), and/or the like may be analyzed (e.g., using a neural network) to determine a set of vetted care solutions (e.g., a set of procedures determined to offer high value care based on medical evidence) that are likely to be utilized by the plan member. For example, the plan member may be likely to choose to use one of the vetted care solutions from the set.

In one implementation, the determined vetted care solutions data 1415 may be provided to a recommendation engine 1420. The recommendation engine may utilize machine learning processes (e.g., as provided by the data science component) to determine treatment and/or provider choices 1425 to present to the plan member. In one implementation, the determined vetted care solutions data, choice architecture data (e.g., data regarding covered benefits available to the plan member), practice patterns (e.g., data regarding quality of care provided by various providers (e.g., located in locality associated with the plan member) with regard to the vetted care solutions), and/or the like may be analyzed (e.g., using a neural network) to determine a set of treatment and/or provider choices (e.g., that best fit the plan member's ODHI plan) to present to the plan member. For example, the plan member may be informed (e.g., via personalized web and/or mobile user interfaces) regarding likely upcoming care, and, if a treatment choice is not covered by the plan member's ODHI plan, the plan member may be prompted to upgrade by purchasing a corresponding add-in (e.g., for a procedure to be performed at one of the provider choices). In another example, a second opinion service regarding likely upcoming care may be offered to the plan member.

Figure 65:
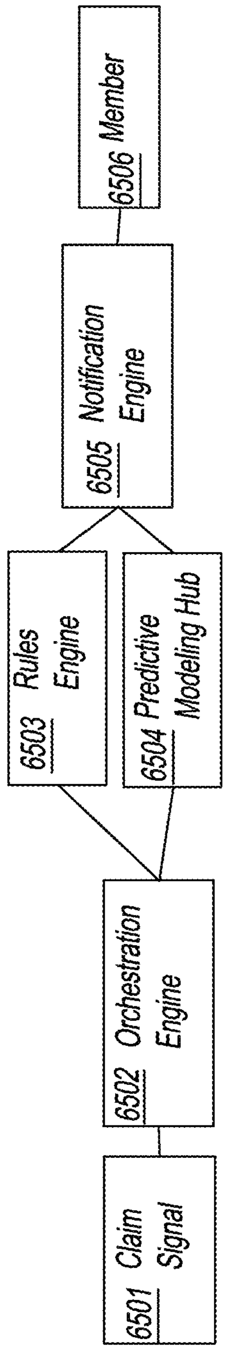
FIG. 65 shows an exemplary architecture for the UDRCD.

FIG. 65 shows an exemplary architecture for the UDRCD. In FIG. 65, an embodiment of how an ELS facilitates sending members notifications of services is illustrated. These notifications may include coverage, cost, and quality information for the relevant services, service providers, and/or locations. In one embodiment, an active system may be utilized which receives signals and runs rules and probabilistic models in real-time to send members notifications of services.

A signal 6501 (e.g., a claim, browsing behavior, search behavior, member phone calls to service, provider phone calls to service (e.g., prior authorizations, eligibility checks, benefit checks)) comes in and is processed through an Orchestration Engine 6502. The engine converts the claim into an analytics ready format. Various clients (e.g., a rules engine, a predictive modeling hub) may subscribe to the real-time claims stream allowing for fast paralleled independent processing. In one implementation, Orchestration Engines may be utilized for scaling.

A Rules Engine 6503 runs deterministic rules on the transaction and a Predictive Modeling Hub 6504 runs probabilistic rules on the claims. In one implementation, the Rules Engine and the Predictive Modeling Hub can be combined in the same process. The Predictive Modeling Hub records a history of signals and computes probabilities based on the current signal and the set of historical signals for that member. The Predictive Modeling Hub is designed to minimize the calculation of model features and calculate features once for many models.

The Rules Engine and/or the Predictive Modeling Hub publish output to a Notification Engine 6505. The Notification Engine runs final notification rules and performs appropriate mode of member outreach. The Notification Engine may store member preferences and historical outreach to tune quantity of individual notifications.

The Rules Engine and the Predictive Modeling Hub may be scaled independently of each other and may publish to an Orchestration Engine prior to the running of the Notification Engine which communicates to a member 6506.

Information may be provided to increase options presented for members. In one implementation, services contextual to members' historical signals may be recommended. Member outreach may also result in members seeing their options earlier than traditional approaches and thus may provide them service options prior to receiving potentially unneeded services. The Rules Engine and probabilistic models can be tuned to focus efforts on specific members who are more likely to require healthcare services in the future.

In some implementations, the ELS allows for scaling to additional signal types beyond medical and pharmacy claims (e.g., member website interactions, other member electronic healthcare transactions). Using members' historical signals increases the accuracy of the prediction of need of healthcare services.

Figure 15:
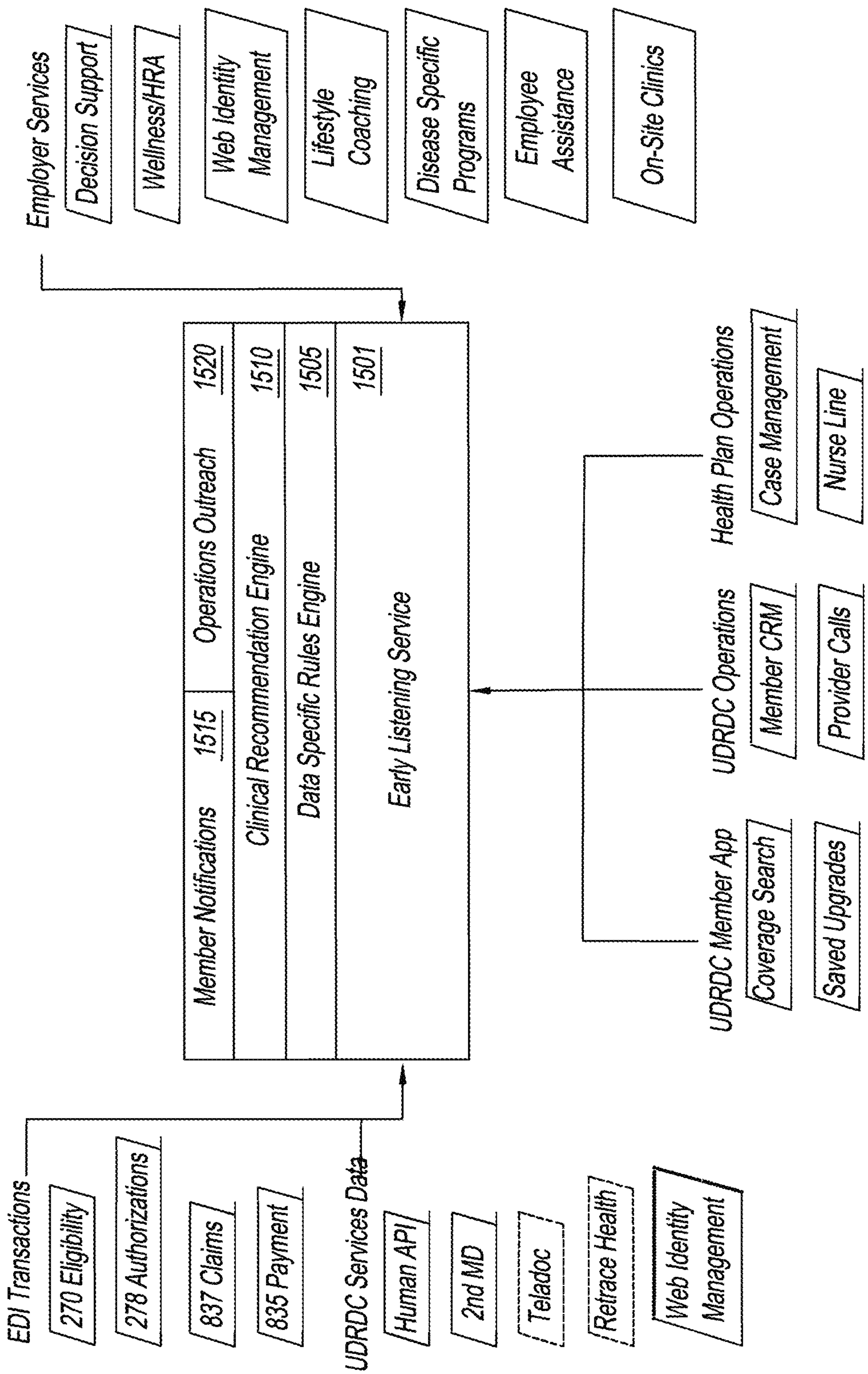
FIG. 15 shows an exemplary architecture for the UDRCD.

FIG. 15 shows an exemplary architecture for the UDRCD. In FIG. 15, alternative embodiments of how an ELS facilitates presenting treatment and/or provider choices to plan members are illustrated. The ELS 1501 obtains event signals from a variety of sources, such as EDI (e.g., X12) transactions (e.g., eligibility, authorizations, claims, payments), UDRCD services data (e.g., human API, $2^{nd}$ MD, teladoc, retrace health, web identity management), UDRCD member app (e.g., coverage search, saved upgrades), UDRCD operations (e.g., member CRM, provider calls), health plan operations (e.g., case management, nurse line), employer services (e.g., decision support, wellness/HRA, engagement platforms, lifestyle coaching, disease specific programs, employee assistance, on-site clinics), and/or the like. A data specific rules engine 1505 may be utilized to determine how data from the various sources should be treated (e.g., parsed, analyzed using a rules-based system, utilized in machine learning processes) to determine relevant vetted care solutions. A recommendation engine 1510 may determine relevant treatment and/or provider choices to present to plan members. A member notifications component 1515 may facilitate notifying (e.g., via personalized web and/or mobile user interfaces) plan members regarding add-in upgrade recommendations. An operations outreach component 1520 may facilitate notifying plan members who do not upgrade regarding the add-in upgrade recommendations via alternative notification channels (e.g., via email, text message, mail, phone).

Figure 66:
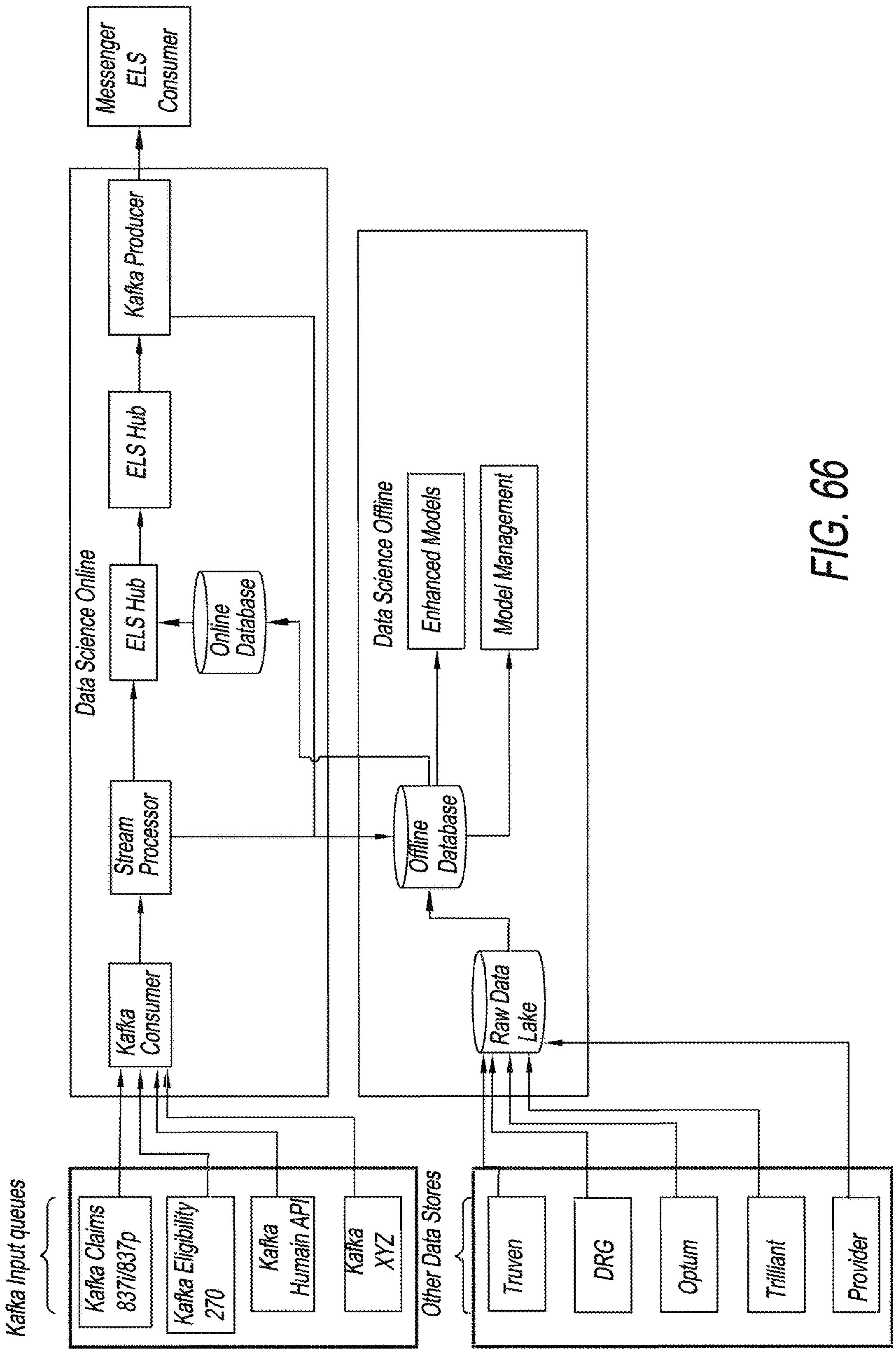
FIG. 66 shows an exemplary architecture for the UDRCD.

FIG. 66 shows an exemplary architecture for the UDRCD. In FIG. 66, alternative embodiments of how an ELS facilitates presenting treatment and/or provider choices to plan members are illustrated. In one implementation, data from Kafka input queues and/or other data stores may be provided to data science offline to facilitate probabilistic model management and/or to generate enhanced models for the ELS. Signal data (e.g., from Kafka input queues) may be utilized along with the probabilistic models to generate notifications for members.

Figure 67:
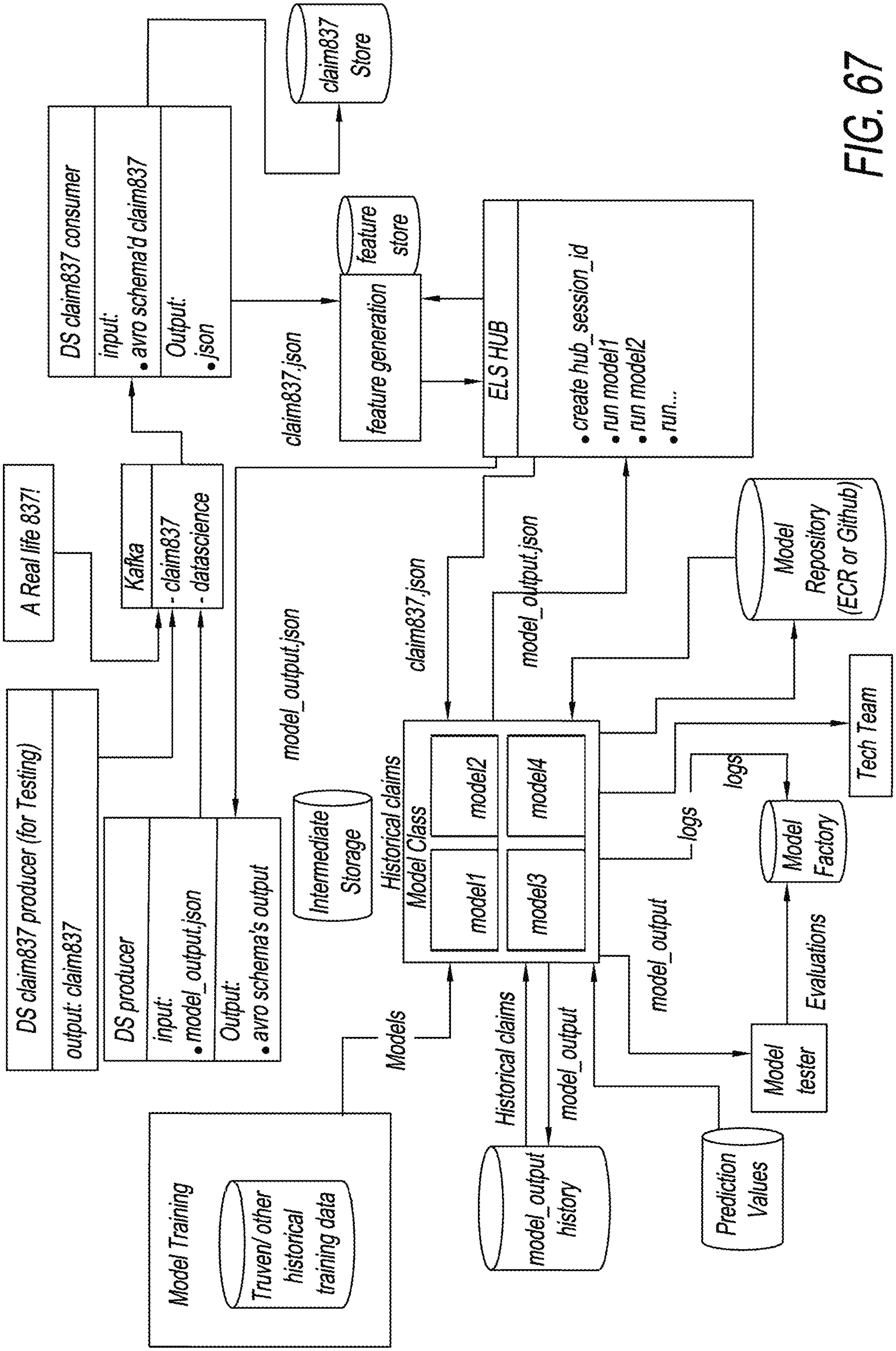
FIG. 67 shows an exemplary architecture for the UDRCD.

FIG. 67 shows an exemplary architecture for the UDRCD. In FIG. 67, alternative embodiments of how predictive models for an ELS may be generated are illustrated. In one implementation, model training data (e.g., Truven and/or other historical training data), historical and/or real time claims data, and/or the like may be utilized to generate a plurality of probabilistic models.

Figure 16:
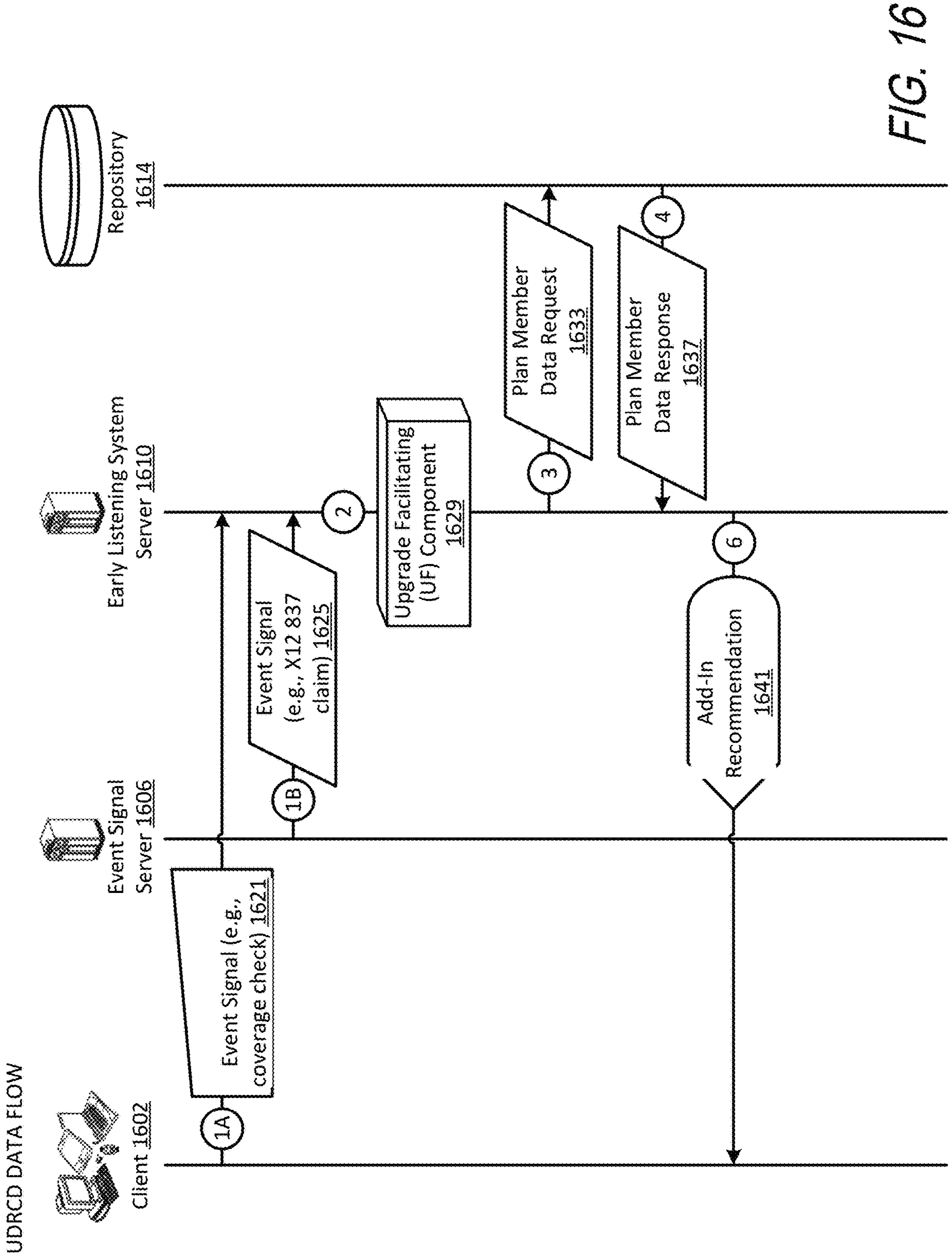
FIG. 16 shows a datagraph diagram illustrating embodiments of a data flow for the UDRCD.

FIG. 16 shows a datagraph diagram illustrating embodiments of a data flow for the UDRCD. In FIG. 16, a client 1602 may send an event signal 1621 to an early listening system (ELS) server 1610. For example, the event signal may be a plan member's "Is it covered?" search for a service, condition, specialty, treatment (e.g., procedure), drug, and/or the like. In one embodiment, the client may provide the following example event signal, substantially in the form of a HTTP(S) POST message including XML-formatted data, as provided below:

POST/search_request.php HTTP/1.1
Host: www.server.com
Content-Type: Application/XML
Content-Length: 667
<? XML version="1.0" encoding="UTF-8"?>
<search_request>
<user_accounts_details>
<user_name>ID_user_1</user_name>
. . .
</user_accounts_details>
<search_query>ear infection</search_query>
</search_request>

An event signal server 1606 (e.g., any server or component that sends captured data) may send an event signal 1625 to the ELS server. For example, the event signal may be an X12 837 health care claim. Accordingly, the event signal server may provide an X12 837 formatted data file associated with the plan member.

It is to be understood that the ELS server may obtain one or more event signals associated with the plan member. For example, the ELS server may either obtain the event signal from the client or obtain the event signal from the event signal server. In another example, the ELS server may both obtain the event signal from the client and obtain the event signal from the event signal server.

An upgrade facilitating (UF) component 1629 may utilize event signal data to facilitate determining add-in upgrade recommendations for the plan member. See FIG. 17 for additional details regarding the UF component.

The ELS server may send a plan member data request 1633 to a repository 1614 to obtain plan member data (e.g., the plan member's profile, the plan member's clinical data, the plan member's ODHI plan configuration). For example, the repository may include a members database **10519*k***. In one implementation, the plan member data request may include data such as a request identifier, a plan member identifier, requested data specification, and/or the like. In one embodiment, the ELS server may provide the following example plan member data request, substantially in the form of a HTTP(S) POST message including XML-formatted data, as provided below:

```
POST/plan_member_data_request.php HTTP/1.1
Host: www.server.com
Content-Type: Application/XML
Content-Length: 667
<? XML version="1.0" encoding="UTF-8"?>
<plan_member_data_request>
  <request_identifier>ID_request_3</request_identifier>
  <user_name>ID_user_1</user_name>
  <requested_data>
    member profile, member clinical data, member plan
      configuration
  </requested_data>
</plan_member_data_request>
```

The repository may send a plan member data response 1637 to the ELS server to provide the ELS server with the requested plan member data. In one implementation, the plan member data response may include data such as a response identifier, the requested plan member data, and/or the like. In one embodiment, the repository may provide the following example plan member data response, substantially in the form of a HTTP(S) POST message including XML-formatted data, as provided below:

```
POST /plan_member_data_response.php HTTP/1.1
Host: www.server.com
Content-Type: Application/XML
Content-Length: 667
<?XML version = "1.0" encoding = "UTF-8"?>
<plan_member_data_response>
  <response_identifier>ID_response_3</response_identifier>
  <requested_data>
    <profile>profile data (e.g., address, preferences)</profile>
    <clinical_data>
      clinical data (e.g., electronic health records, claims data)
    </clinical_data>
    <plan_configuration>
      plan configuration data (e.g., covered atomized conditions and/or
      procedures, purchased add-ins, add-ins available as upgrades)
    </plan_configuration>
  </requested_data>
</plan_member_data_response>
```

The ELS server may send an add-in recommendation 1641 to the client to inform the plan member (e.g., via a website, application (e.g., a mobile app), email, text message, and/or the like) regarding add-ins that are likely to be useful to the plan member (e.g., add-ins that may lower the cost of likely upcoming care to the plan member) and/or to facilitate purchasing upgrades for such add-ins.

Figure 17:
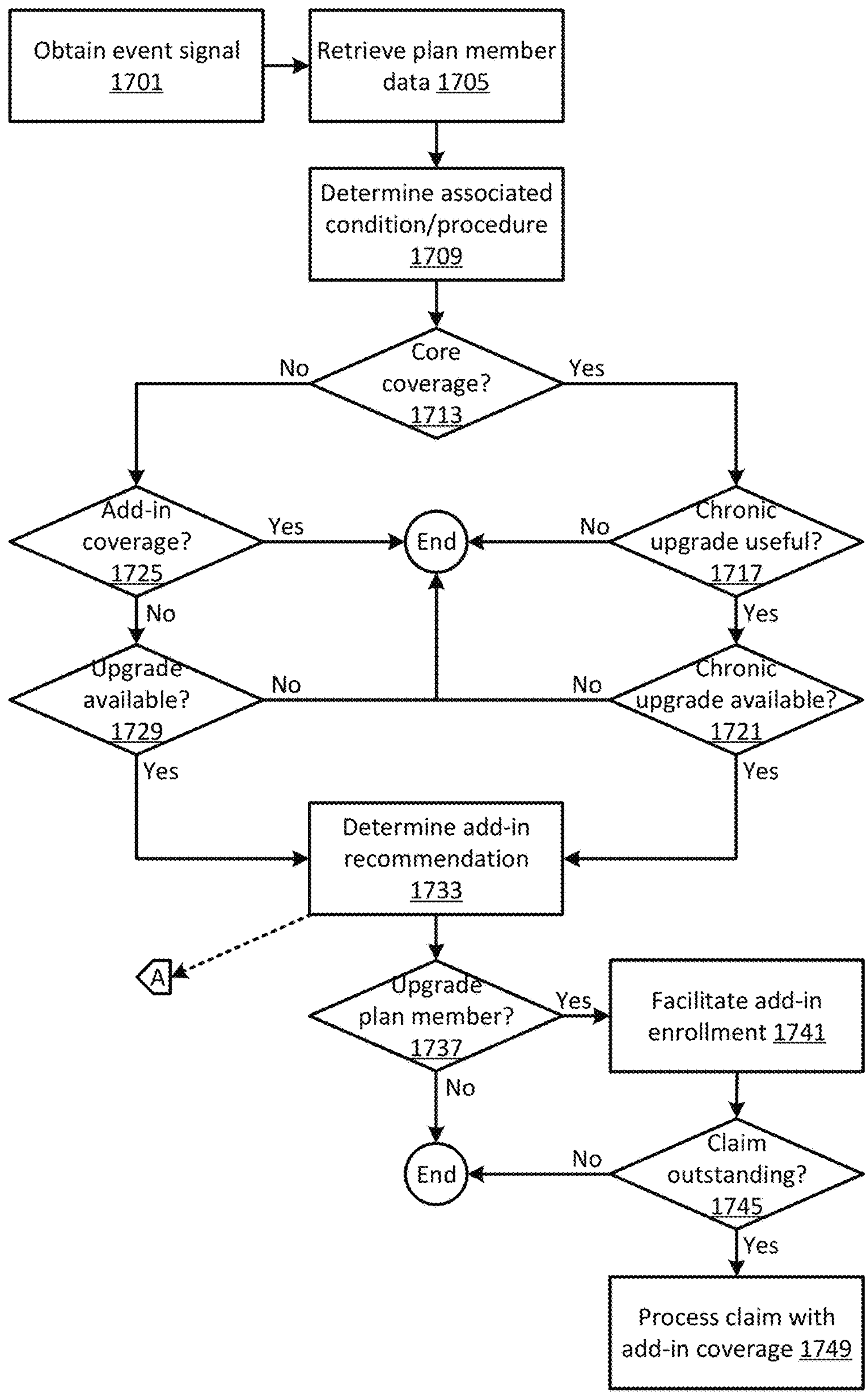
FIG. 17 shows a logic flow diagram illustrating embodiments of an upgrade facilitating (UF) component for the UDRCD.

FIG. 17 shows a logic flow diagram illustrating embodiments of an upgrade facilitating (UF) component for the UDRCD. In FIG. 17, an event signal may be obtained at 1701. For example, the event signal may be obtained from any of the variety of sources from which an ELS may obtain event signals. In another example, a plurality of event signals may be obtained (e.g., from different sources).

Plan member data of a plan member (e.g., of an ODHI plan) may be retrieved at 1705. In one implementation, the plan member data may be retrieved by sending a plan member data request to a repository. For example, member profile data, member clinical data, plan configuration of the plan member's ODHI plan, member state, and/or the like may be retrieved.

A condition and/or a procedure associated with the event signal may be determined at 1709. In one embodiment, event signal data from the one or more obtained event signals, the retrieved plan member data (e.g., the retrieved member clinical data, such as the plan member's health and/or treatment history), modeling data (e.g., disease progression probabilities), and/or the like may be analyzed using machine learning processes (e.g., as provided by the data science component) to determine the associated condition and/or procedure. In one implementation, a condition may be determined. For example, such data may be analyzed (e.g., via a neural network) to determine a condition (e.g., asthma) that the user is likely to have. In another example, such data may be analyzed (e.g., via a neural network) to determine a vetted care solution (e.g., a set of procedures to treat knee pain) for the condition. In another implementation, a procedure may be determined. For example, such data may be analyzed (e.g., via a rules engine) to determine a procedure (e.g., knee replacement) that the user is likely to utilize.

A determination may be made at 1713 whether the determined condition and/or procedure is covered by the ODHI plan's core coverage (e.g., based on the plan configuration). For example, it may be determined that treatment for asthma is covered by the core coverage. In another example, it may be determined that knee replacement is not covered by the core coverage.

If the determined condition and/or procedure is covered by the core coverage, a determination may be made at 1717 whether a chronic upgrade (e.g., a chronic condition add-in) may be useful for the plan member. For example, the chronic condition add-in may lower copay costs associated with treatment for the chronic condition. In one implementation, if the chronic condition add-in exists and the user is not already enrolled into the chronic condition add-in, the chronic condition add-in may be useful. In another implementation, the plan member's profile data (e.g., preferences) may be analyzed to determine whether the chronic condition add-in may be useful (e.g., not useful if the user previously declined to purchase the chronic condition add-in). If it is determined that the chronic upgrade may be useful, a determination may be made at 1721 whether the chronic upgrade is available to the plan member. In one implementation, the plan configuration may be analyzed to make this determination (e.g., based on how the ODHI plan was configured by a plan sponsor).

If the determined condition and/or procedure is not covered by the core coverage, a determination may be made at 1725 whether the determined condition and/or procedure is covered by the ODHI plan's add-in coverage purchased by the plan member (e.g., based on the plan configuration). If the determined condition and/or procedure is not covered by the add-in coverage, a determination may be made at 1729 whether an upgrade (e.g., a procedure add-in) is available to the plan member. In one implementation, the plan configuration may be analyzed to make this determination (e.g., based on whether the procedure add-in exists, based on how the ODHI plan was configured by the plan sponsor). In another implementation, this determination may be made based on whether the procedure is considered useful (e.g., whether scientific evidence supports claims of the procedure's value). For example, if the procedure is not considered useful, the associated procedure add-in may not be recommended (e.g., the plan member could still purchase the upgrade, but the ELS would not provide a recommendation).

If the chronic upgrade or the upgrade is available to the plan member, an add-in recommendation may be determined at 1733. In one embodiment, available add-ins, the plan member data, ACG data, and/or the like may be analyzed using machine learning processes (e.g., as provided by the data science component) to determine the add-in recommendation. In one implementation, a condition add-in upgrade may be available, and the condition add-in may be determined as the add-in recommendation for the plan member (e.g., see screen 820). In another implementation, multiple procedures and/or providers may be available to treat the condition, and the relevant (e.g., based on care efficacy, based on geographic proximity of providers to the plan member's location) add-ins (e.g., for relevant procedures at relevant providers) may be determined as the add-in recommendation for the plan member (e.g., see screen 920). In another implementation, a procedure add-in upgrade may be available, and the procedure add-in may be determined as the add-in recommendation for the plan member. In another implementation, multiple providers may be available to perform the procedure, and the relevant (e.g., based on providers' quality, based on geographic proximity of providers to the plan member's location) add-ins (e.g., for relevant providers) may be determined as the add-in recommendation for the plan member (e.g., see screen 910). In one embodiment, an add-in recommendation may be determined using an add-in recommendation determining (ARD)) component. See FIG. 36 for additional details regarding the ARD component.

A determination may be made at 1737 whether the plan member should be upgraded. In one implementation, this determination may be made based on whether the plan member chose to purchase one of the recommended add-ins. In another implementation, this determination may be made based on whether the plan sponsor specifies that the plan member should be auto-enrolled into add-ins (e.g., that lower costs for the plan member).

If the plan member should be upgraded, add-in enrollment into the selected (e.g., by the plan member, by the plan sponsor) add-in may be facilitated at 1741. In one implementation, enrollment data associated with the selected add-in may be provided to an employer benefit administrator system of the plan sponsor to facilitate enrolling the plan member into the selected add-in, setting up payroll deductions to pay for the selected add-in, and/or the like.

A determination may be made at 1745 whether there is an outstanding claim associated with the plan member that benefits (e.g., results in lower cost for the plan member) from enrollment into the selected add-in. For example, the outstanding claim may be the obtained event signal (e.g., a claim for a procedure not covered by the plan member's ODHI plan). If there is an outstanding claim, the outstanding claim may be processed with add-in coverage at 1749. In one implementation, a previously not covered procedure (e.g., not covered at the time the procedure was performed) may be processed as covered by the add-in coverage (e.g., the plan member is responsible for paying a copay instead of for paying for the procedure). In another implementation, a copay amount associated with the outstanding claim may be reduced (e.g., based on a copay schedule associated with the selected add-in).

Figure 18:
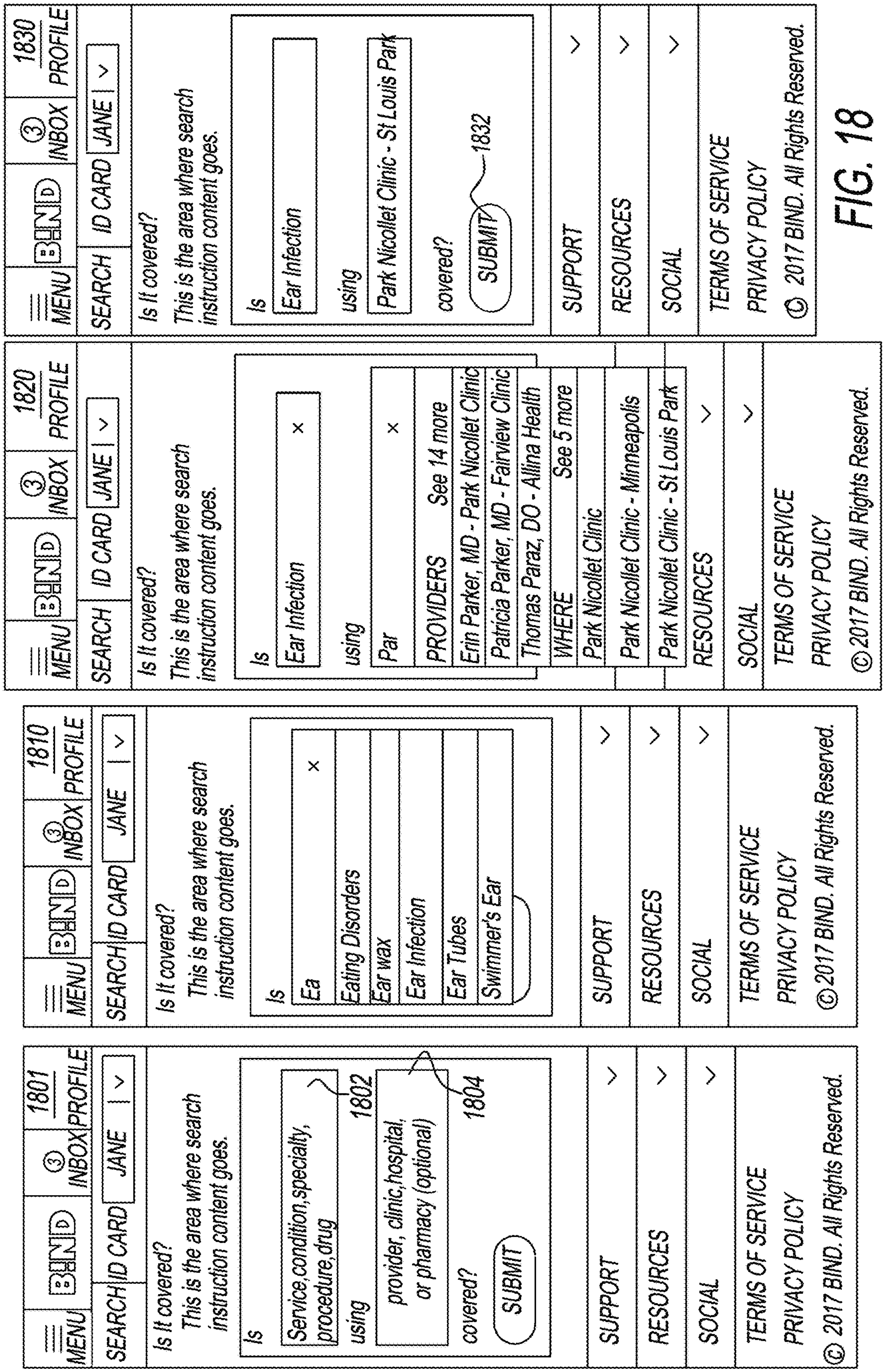
FIG. 18 shows a screenshot diagram illustrating embodiments of the UDRCD.

FIG. 18 shows a screenshot diagram illustrating embodiments of the UDRCD. In FIG. 18, an exemplary user interface (e.g., for a mobile device) for conducting an "Is it covered?" search is illustrated. In one embodiment, conducting an "Is it covered?" search may send an event signal (e.g., with details regarding the search query) to an ELS. Screen 1801 shows that a user may conduct a search to determine whether a service, condition, specialty, procedure, drug, and/or the like specified via a GUI widget 1802 is covered using (e.g., optional) a person provider (e.g., a particular doctor), clinic, hospital, pharmacy, and/or the like specified via a GUI widget 1804 for a plan member (e.g., of an ODHI plan) specified via a GUI widget 1806. Screens 1810 and 1820 show that autocomplete suggestions may be available for GUI widget 1802 and/or GUI widget 1804, respectively. Screen 1830 shows that the user may utilize a submit button 1832 to submit the search query (e.g., Is Ear Infection using Park Nicollet Clinic-St Louis Park covered for plan member Jane).

Figure 19:
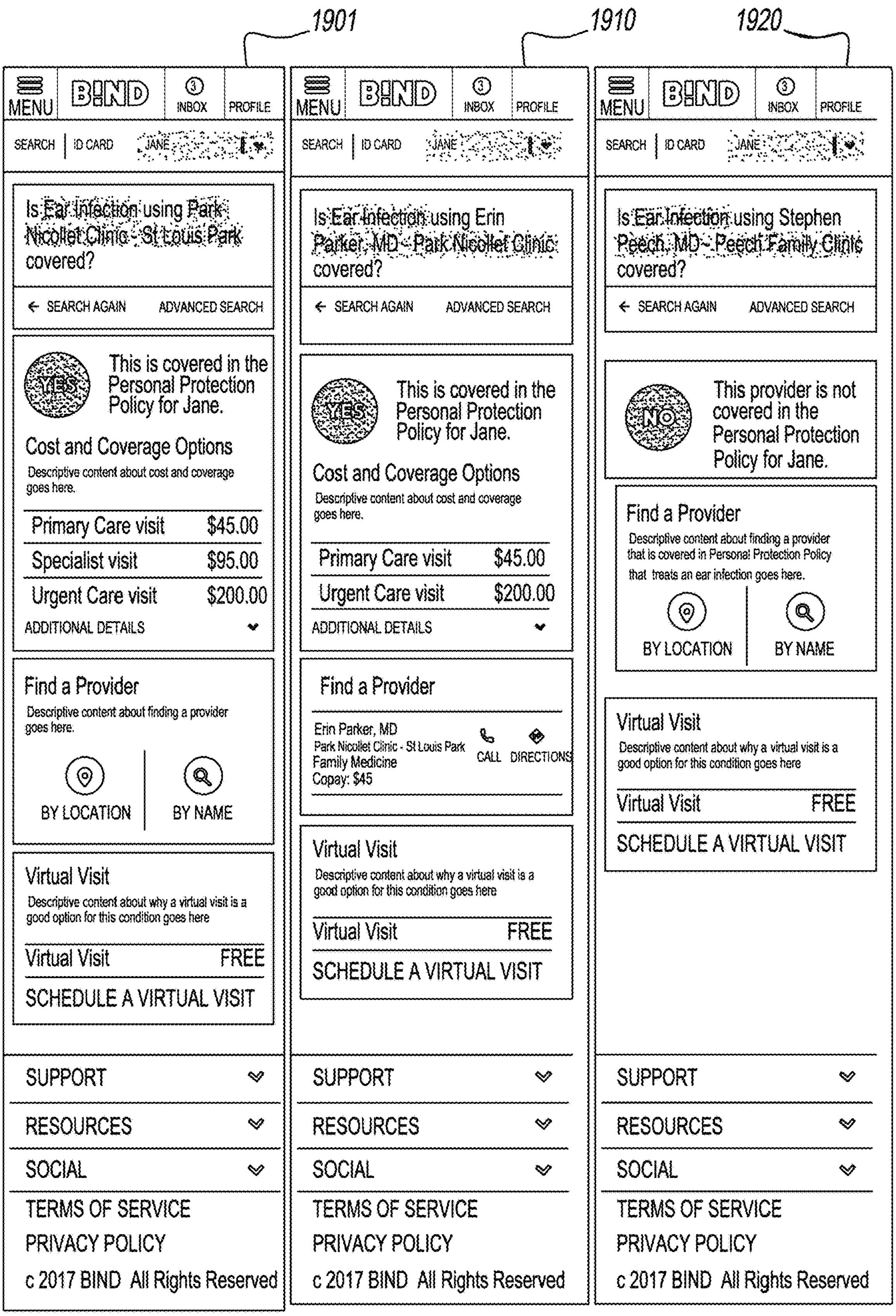
FIG. 19 shows a screenshot diagram illustrating embodiments of the UDRCD.

FIG. 19 shows a screenshot diagram illustrating embodiments of the UDRCD. In FIG. 19, an exemplary user interface (e.g., for a mobile device) for providing results for an "Is it covered?" search is illustrated. Screen 1901 shows results when a condition is covered at a clinic. For example, an indication that the condition is covered and information regarding cost and coverage options may be provided. Screen 1910 shows results when a condition is covered for a specific doctor at a clinic. For example, an indication that the condition is covered and information regarding cost and coverage options may be provided. Screen 1920 shows results when a condition is not covered for a specific doctor at a clinic. For example, an indication that the provider is not covered and a GUI widget 1922 that may be utilized to find a covered provider may be provided.

Figure 20:
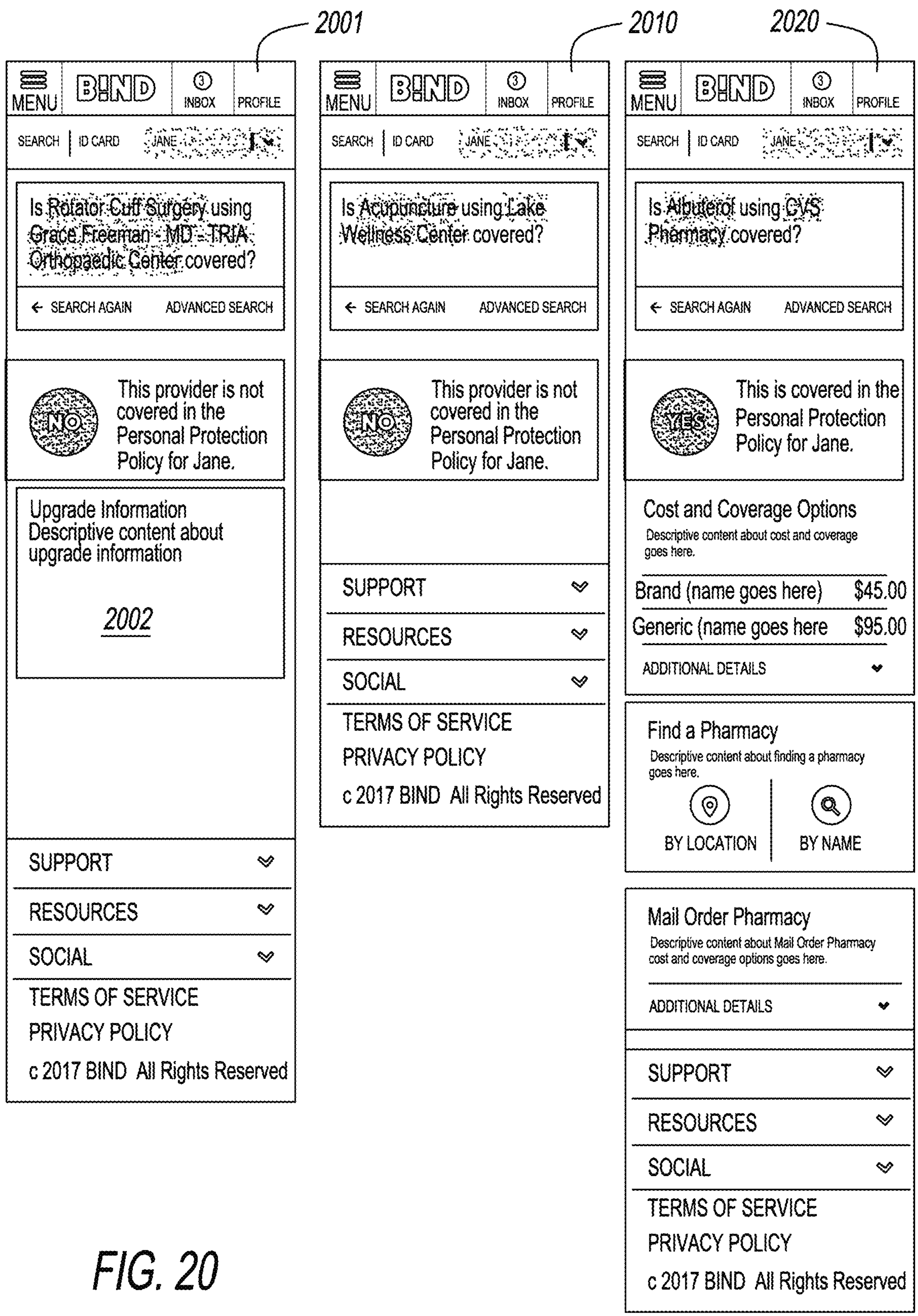
FIG. 20 shows a screenshot diagram illustrating embodiments of the UDRCD.

FIG. 20 shows a screenshot diagram illustrating embodiments of the UDRCD. In FIG. 20, an exemplary user interface (e.g., for a mobile device) for providing results for an "Is it covered?" search is illustrated. Screen 2001 shows results when a procedure is not covered. For example, an indication that the procedure is not covered and a GUI widget 2002 with an add-in recommendation (e.g., that facilitates purchasing an upgrade) may be provided. Screen 2010 shows results when a procedure is not covered. For example, an indication that the procedure is not covered may be provided, but, if the procedure is not considered useful, no add-in recommendation may be provided. Screen 2020 shows results when a drug is covered at a pharmacy chain. For example, an indication that the drug is covered and information regarding cost and coverage options may be provided.

Figure 21:
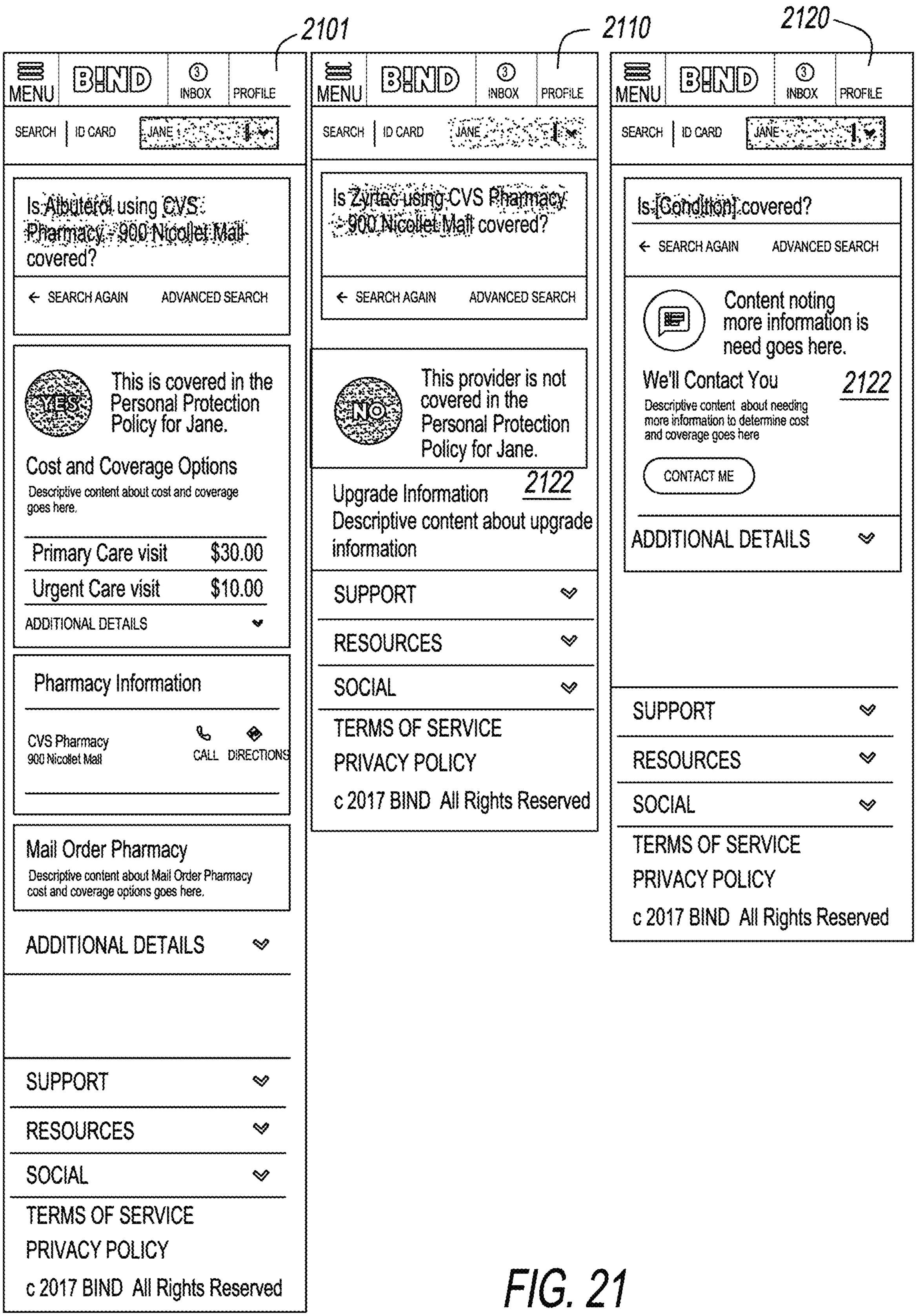
FIG. 21 shows a screenshot diagram illustrating embodiments of the UDRCD.

FIG. 21 shows a screenshot diagram illustrating embodiments of the UDRCD. In FIG. 21, an exemplary user interface (e.g., for a mobile device) for providing results for an "Is it covered?" search is illustrated. Screen 2101 shows results when a drug is covered at a pharmacy at a particular location. For example, an indication that the drug is covered and information regarding cost and coverage options may be provided. Screen 2110 shows results when a drug is not covered at a pharmacy at a particular location. For example, an indication that the drug is not covered and a GUI widget 2112 with an add-in recommendation (e.g., that facilitates purchasing an upgrade) may be provided. Screen 2120 shows results when more information is needed to make a coverage determination. For example, an indication that more information is needed and a GUI widget 2122 that facilitates obtaining such information may be provided.

Figure 22:
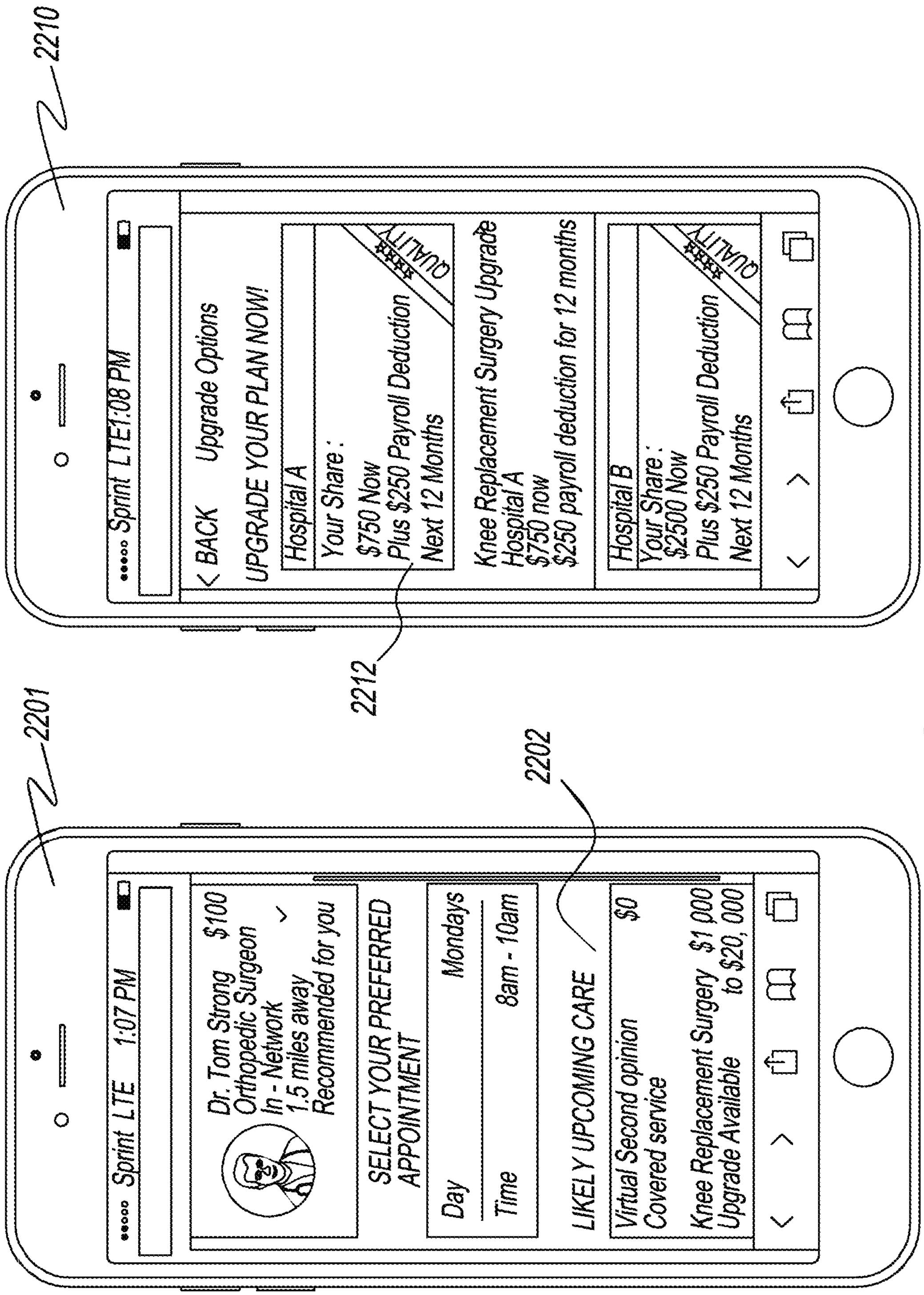
FIG. 22 shows a screenshot diagram illustrating embodiments of the UDRCD.

FIG. 22 shows a screenshot diagram illustrating embodiments of the UDRCD. In FIG. 22, an exemplary user interface (e.g., for a mobile device) is shown. Screen 2201 shows that a plan member scheduled an appointment with an orthopedic surgeon. In one embodiment, scheduling an appointment may send an event signal (e.g., with details regarding the appointment) to an ELS. The ELS may determine that knee replacement surgery is likely and may facilitate purchasing a knee replacement surgery add-in upgrade. For example, the plan member may click on a knee replacement surgery section of a likely upcoming care GUI widget 2202 to view available upgrade options. An upgrade options screen 2210 shows how a user may upgrade the user's ODHI plan by selecting an add-in. For example, the user may click on one of the available knee replacement surgery coverage add-in options 2212 or 2214 to upgrade.

Figure 23:
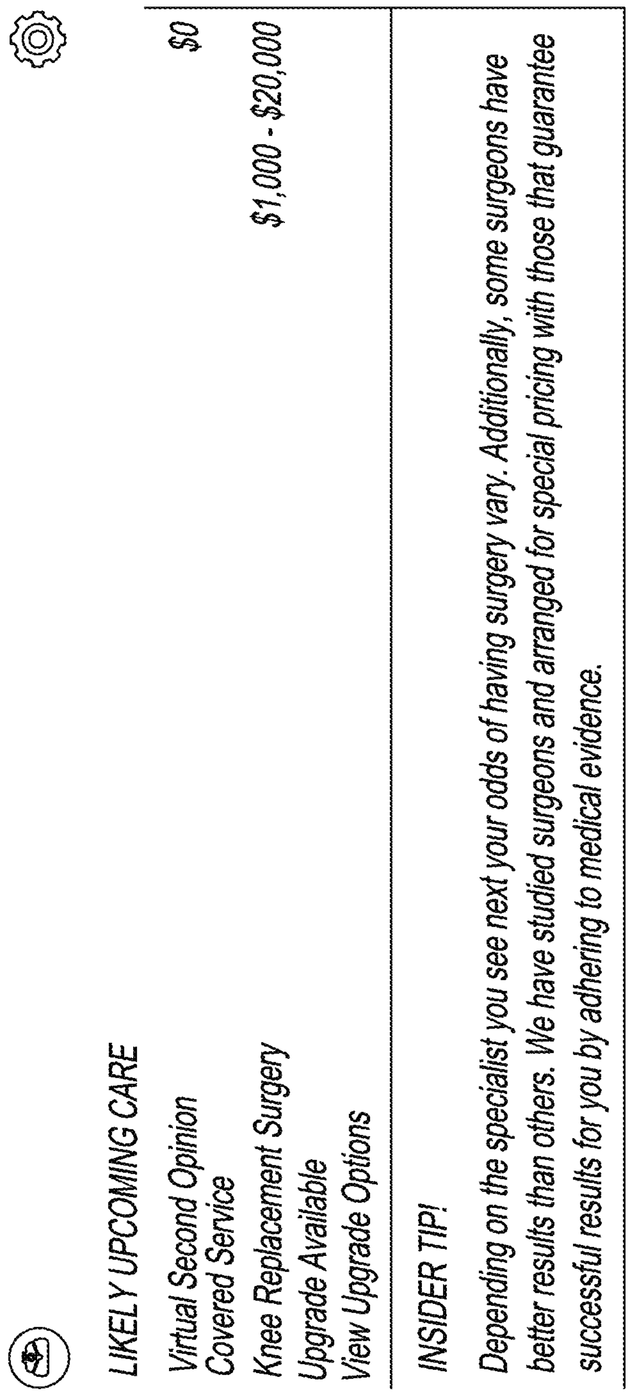
FIG. 23 shows a screenshot diagram illustrating embodiments of the UDRCD.

FIG. 23 shows a screenshot diagram illustrating embodiments of the UDRCD. In FIG. 23, an alternative embodiment of a likely upcoming care GUI widget is illustrated. For example, this user interface may be utilized for a website.

Figure 24:
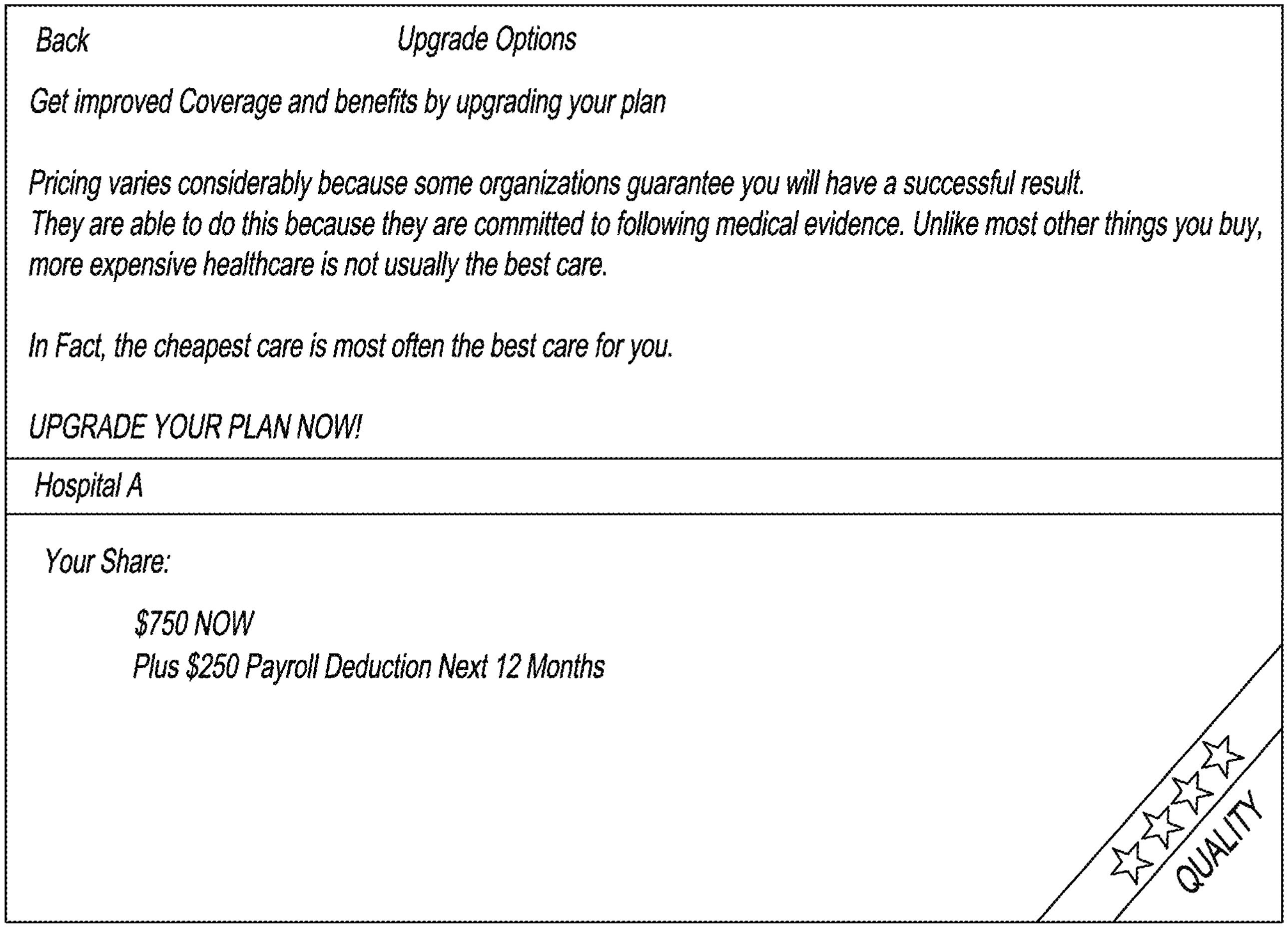
FIG. 24 shows a screenshot diagram illustrating embodiments of the UDRCD.

FIG. 24 shows a screenshot diagram illustrating embodiments of the UDRCD. In FIG. 24, an alternative embodiment of an upgrade options screen is illustrated. For example, this user interface may be utilized for a website.

Figure 68:
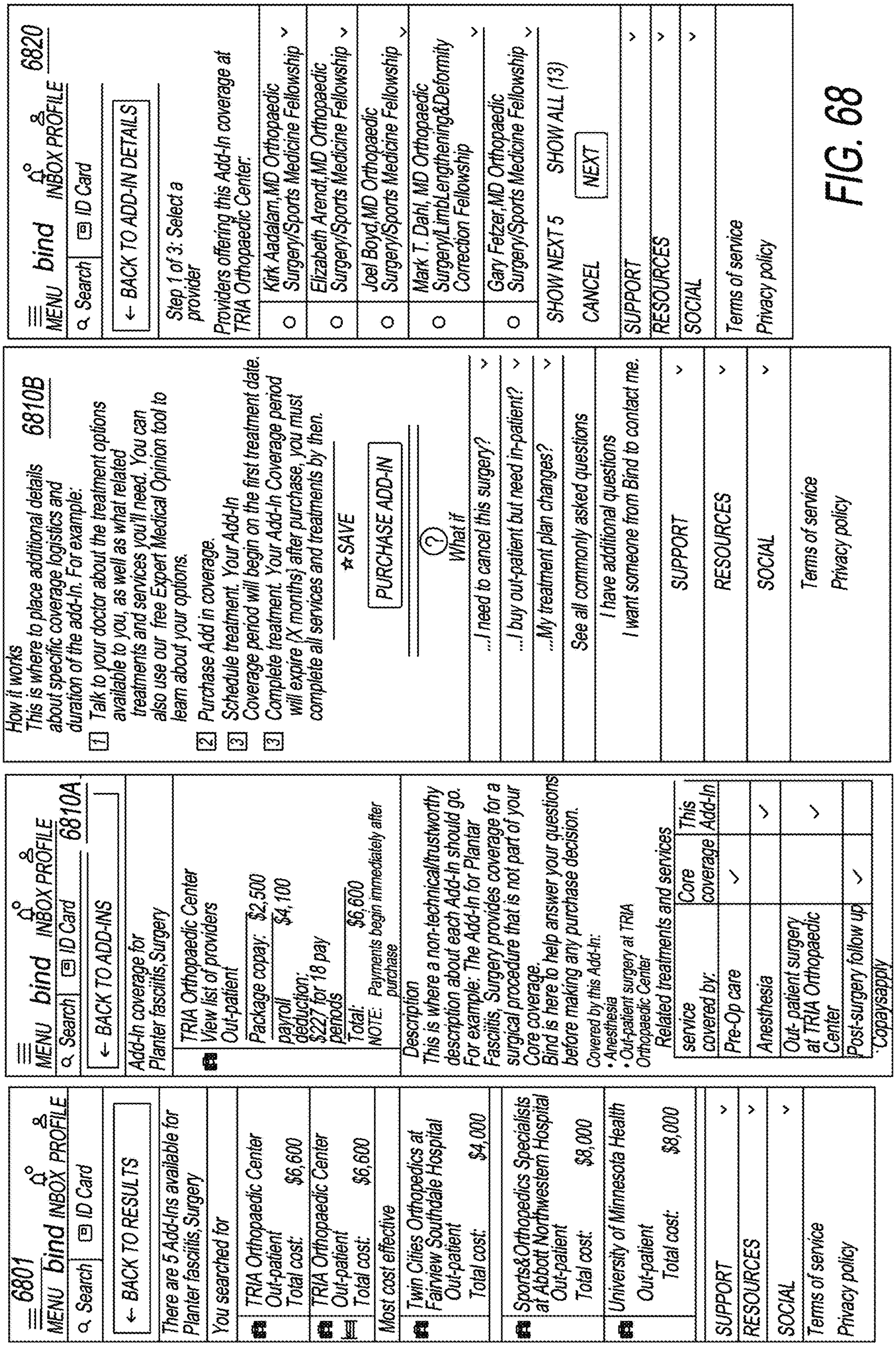
FIG. 68 shows a screenshot diagram illustrating embodiments of the UDRCD.
Figure 69:
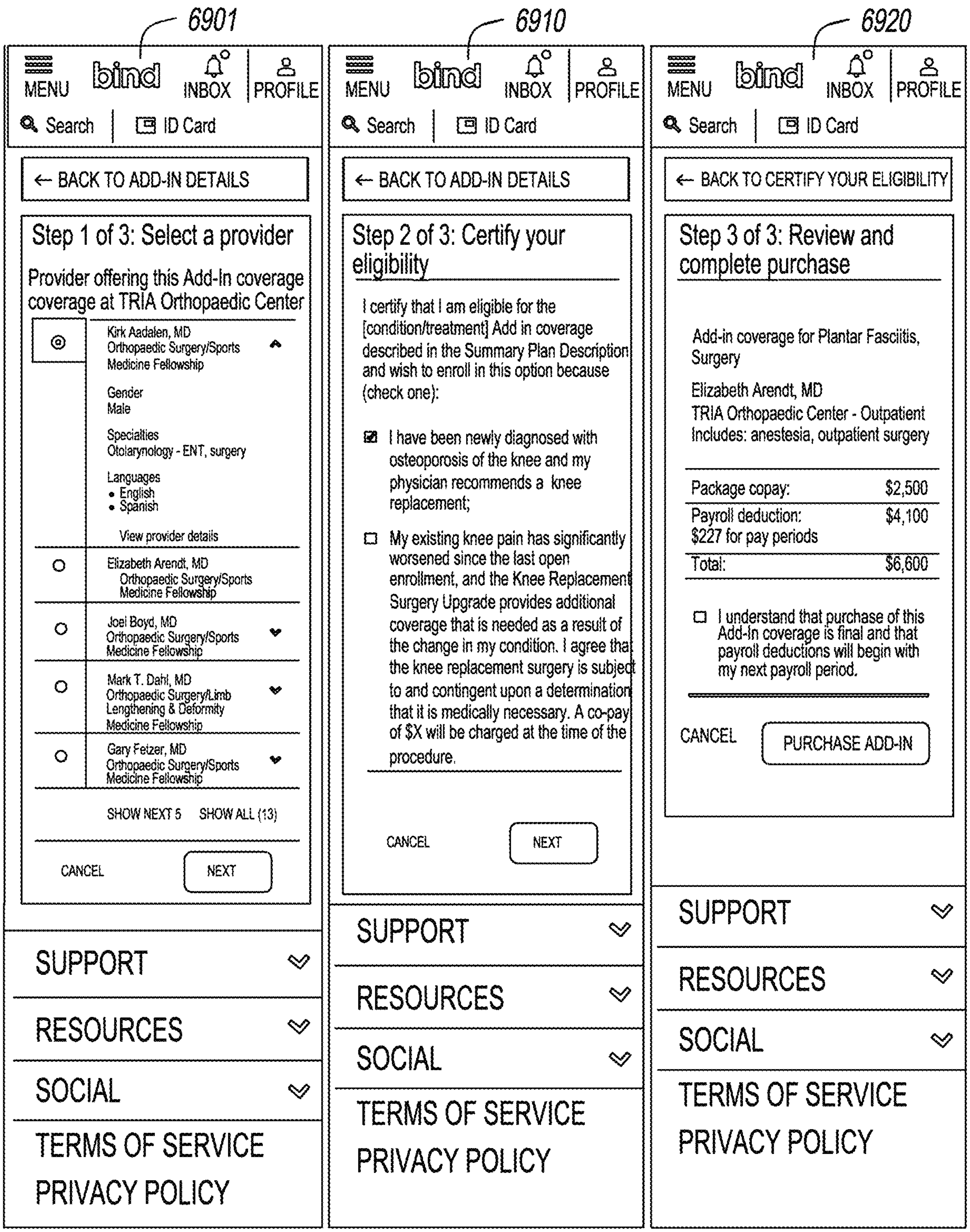
FIG. 69 shows a screenshot diagram illustrating embodiments of the UDRCD.
Figure 70:
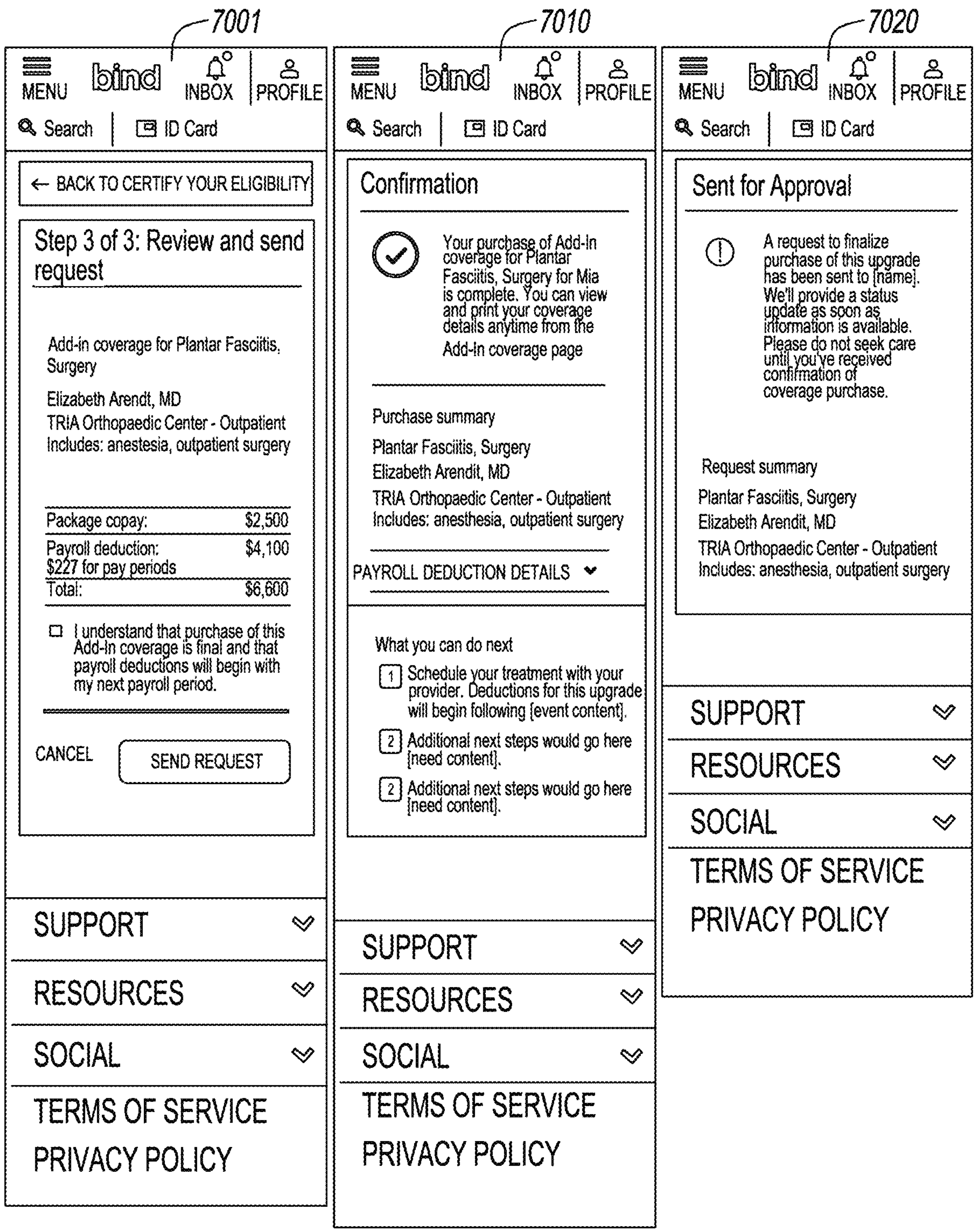
FIG. 70 shows a screenshot diagram illustrating embodiments of the UDRCD.

FIGS. 68, 69, 70 show screenshot diagrams illustrating embodiments of the UDRCD. In FIGS. 68, 69, 70, an exemplary user interface (e.g., for a mobile device) for providing results for an add-ins search and facilitating an add-in purchase is illustrated. Screen 6801 shows available add-ins in response to a search for Plantar Fasciitis Surgery at TRIA Orthopaedic Center. In one implementation, results for the search term (e.g., TRIA Orthopaedic Center out-patient and in-patient add-ins), results the most cost-effective option (e.g., Twin Cities Orthopedics out-patient), and other additional options may be shown. Screen 6810A-B shows a description for a user selected add-in (e.g., add-in for Plantar Fasciitis Surgery at TRIA Orthopaedic Center out-patient) and facilitates user purchase of the add-in (e.g., via the purchase add-in button). Screen 6820 shows that the user may be shown a list of providers at the selected facility. Screen 6901 shows that the user may select a desired provider from the list of providers. Screen 6910 shows that that user may be prompted to certify the user's eligibility. Screen 6920 shows that the user may be prompted to review and complete the add-in purchase. Screen 7001 shows that the user may send the add-in purchase request (e.g., via the send request button). Screen 7010 shows an add-in purchase confirmation may be shown to the user. Screen 7020 shows that the user may be informed that a request to finalize the add-in purchase was sent.

FIG. 25 shows a screenshot diagram illustrating embodiments of the UDRCD. In FIG. 25, a screenshot diagram of a provider's current performance for add-in coverages is shown. A current performance screen 2501 shows the provider's performance relative to other providers in the market (e.g., one of 86 rating regions defined for creating price ranges on add-ins amongst providers and locations) on an episodic basis for each of the add-in coverages they offer services for 2502. In one implementation, different rating region levels may be defined for different types of services to align the comparison groups for price variation based on the frequency with which the services are used, the differences in cost for an episode or encounter associated with that service and the willingness of a consumer to travel for a given type of service. The variance in episodic cost in the market is shown to the provider as a low (e.g. $10^{th}$ percentile) 2511 and high (e.g. $90^{th}$ percentile) 2512. The provider's own average episodic cost is then also showed to them 2613 and plotted graphically relative to the market 2520. The factors contributing to the provider's episodic cost relative to the rest of the country are a cost factor and a utilization factor 2531 that combine to comprise a price factor 2532 that is representative of the episodic cost.

In one implementation, the utilization may be constructed by pricing each occurrence of a code within an episode for a given add-in coverage based on the Centers for Medicare & Medicaid Services (CMS) fee schedule. The provider's average price per episode for each add-in coverage using the CMS fee schedule is then divided by the market average of other episodes of that add-in coverage also repriced based on the CMS fee schedule. With this implementation, the cost factor would then be calculated as the difference in average allowed amount for that provider against the market average that is not accounted for by the utilization factor.

In one implementation, the utilization factor could account for not just the propensity of utilization within an episode, but also the frequency with which surgical and less invasive treatment paths are used by a provider in treating a condition associated with an add-in coverage.

Price factors may be applied to the member add-in cost 2540 to determine the amount of copay and paycheck deduction a member would have to pay to purchase each add-in coverage for that particular provider. In one implementation, the member copay and paycheck deduction amount may be determined at the provider organization level. In another implementation, it may be determined based on the specific location/facility where the procedure would be delivered under the add-in coverage. In another implementation, the copay and paycheck deduction amount may be determined based on the individual practitioner that would be delivering the service. In another implementation, price factors developed compared to national benchmarks may be compared within a pricing region for each add-in or smart copay and may then be ranked by percentile. These percentile ranks may then be used in a pricing formula in order to create a consistent spectrum of member cost share amounts across each of the pricing regions.

Figure 26A:
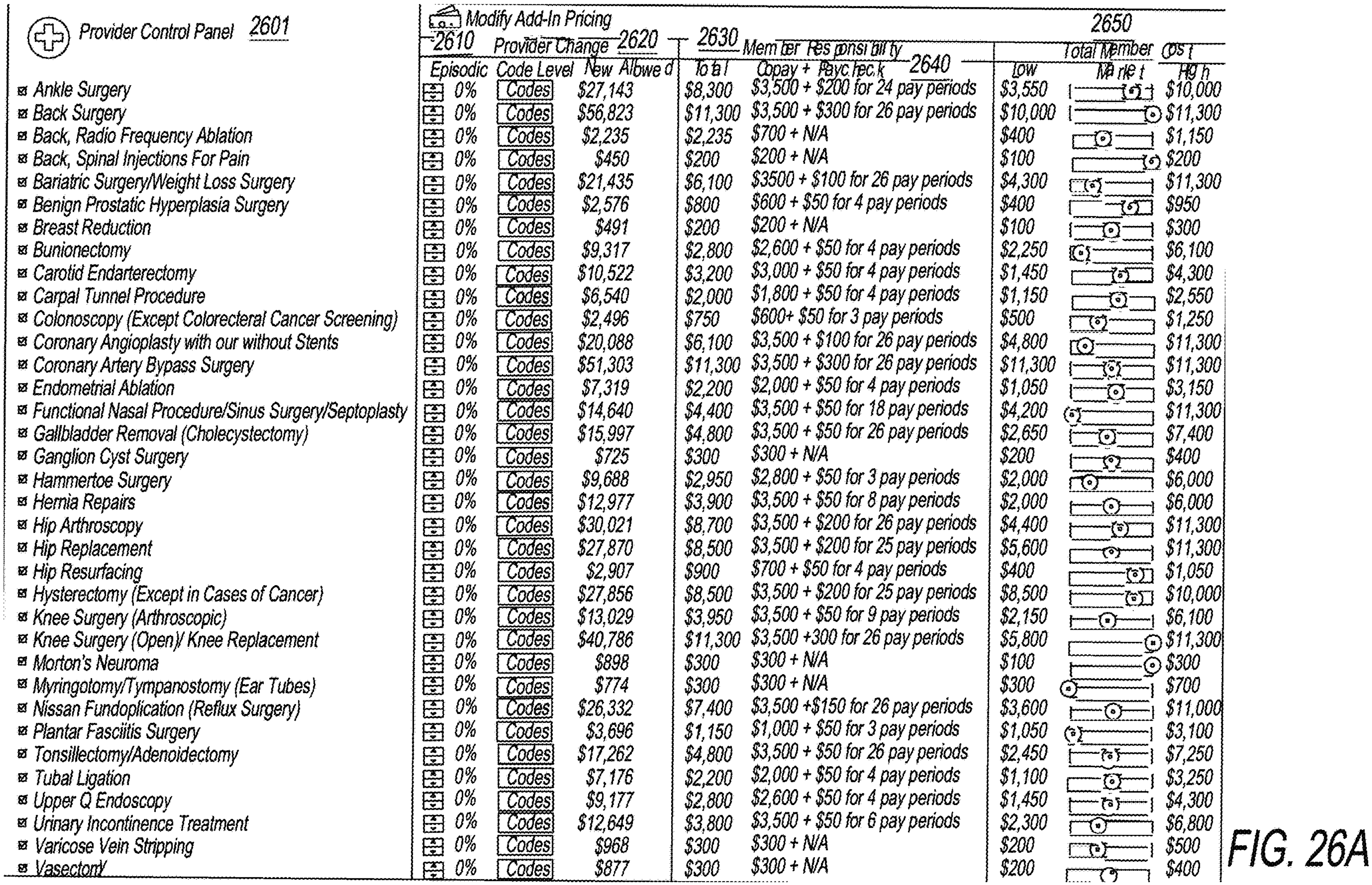
FIG. 26A-B each show a screenshot diagram illustrating embodiments of the UDRCD.

FIG. 26A shows a screenshot diagram illustrating embodiments of the UDRCD. In FIG. 26A, a screenshot diagram of the Provider Pricing Controller (PPC) is shown. Screen 2601 shows how a provider can dynamically modify their allowed amount at any point in time during the year. Based on a configuration setting that establishes a price maximum that the provider may not exceed, providers are able to use the PPC to establish rates for their services at any point below the maximum established for each code or episode. The flexibility allows the providers to adapt to market demand as well as any changes to their supply of physician time or space in their facilities.

Providers can change their allowed amount on an episodic basis 2610. In one implementation, the provider may change the allowed amount for a given episode by having a percent change apply universally across the codes associated with that episode, including those codes that happen during the anchor event, a pre-window (period prior to an admission or anchor service for the episode), and a post-window (period following a discharge or anchor service for the episode).

In one implementation, the provider may limit the changes to allowed amounts for services within the anchor event. This would include services that happen from the time the patient is admitted and discharged for inpatient stays or during the visit for a service performed as outpatient.

In one implementation, the provider can change the allowed amount differentially for each code associated with an episode, including those codes in the pre-window, anchor service, and post-window. The provider can change or not change their allowed amount for each of these codes and then see how the expected allowed amount and price factor change based on the expected utilization of each of the codes in the episode based on their historical performance. In some implementations, a provider may contract for a single price on a set of services, also known as a bundled payment, and would have the ability to modify that price on the bundle of services.

The provider is able to see how changes in the allowed amount 2620, whether changed at an episodic level or for specific codes within the episode, impact the total member responsibility 2630 associated with buying coverage for a specific add-in at that provider. This new member responsibility is shown to the provider in terms of the copay and paycheck deduction 2640 comprising the total member responsibility as well as how these changes impact how the total member responsibility arrays relative to the low and high amounts of member responsibility for add-in coverages for other providers in the market.

Figure 26B:
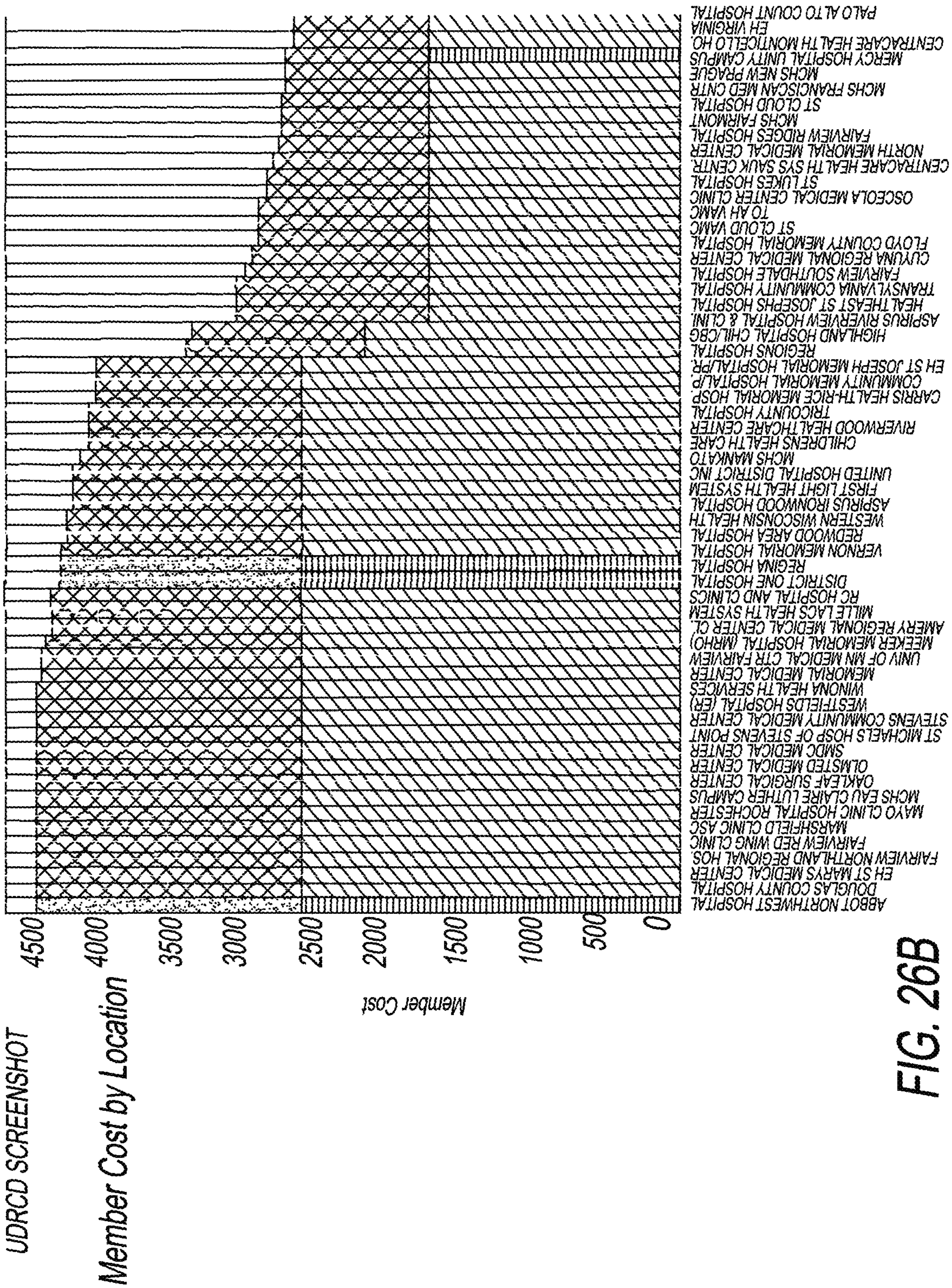
Figure 26C:
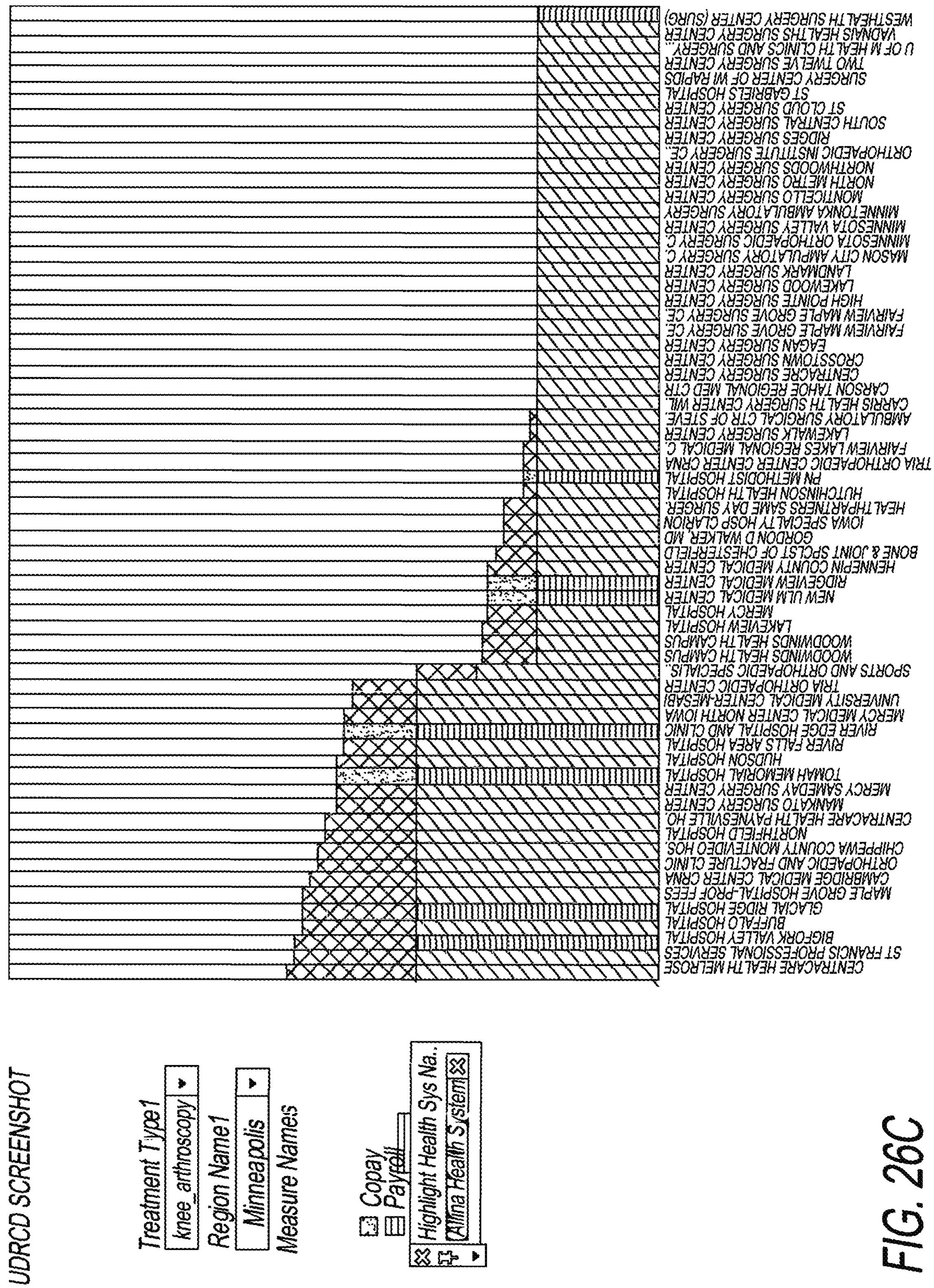

FIG. 26B shows a screenshot diagram illustrating embodiments of the UDRCD. In FIG. 26B, a screenshot diagram of how a provider's cost to members may vary amongst the provider's locations and how those costs to the members compare to other locations in their region is shown.

FIGS. 27A-27B show a screenshot diagram illustrating embodiments of the UDRCD. In FIG. 27, a screen shot diagram for how a provider is able to change the allowed amounts for any of the codes associated with episode for an add-in coverage is shown. Screen 2701 (as shown in FIGS. 27A-27B) shows an example episode for which a provider can modify the pricing for each code associated with that episode of care. This screen shows the provider what the frequency of each code associated with an episode is for the market 2710 and for that provider 2721. The current allowed amount 2722 for each code is then multiplied by the existing frequency for those codes to determine their expected cost contribution to the episode 2723.

Providers may alter the allowed amounts for each code in the episode 2731 on a percent basis and determine the new allowed amount for each code 2732 and its modified contribution to the cost of the episode 2733. The total cost of the episode and the new price factor 2740 that is calculated from it are then applied back to the coverage calculations occurring in FIG. 26.

Figure 28A:
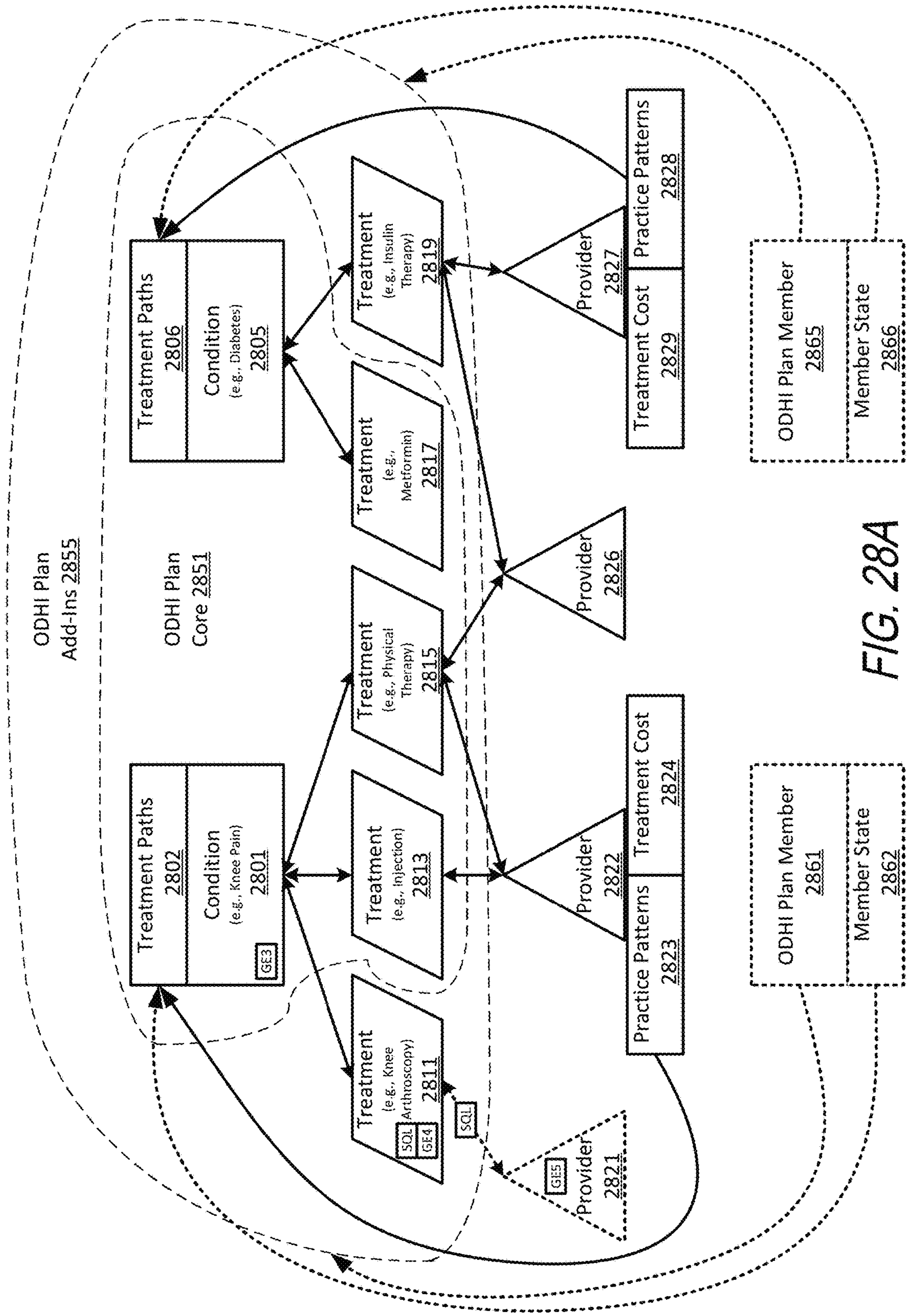
FIGS. 28A-B show exemplary atomized coverage graphs of the UDRCD.
Figure 28B:
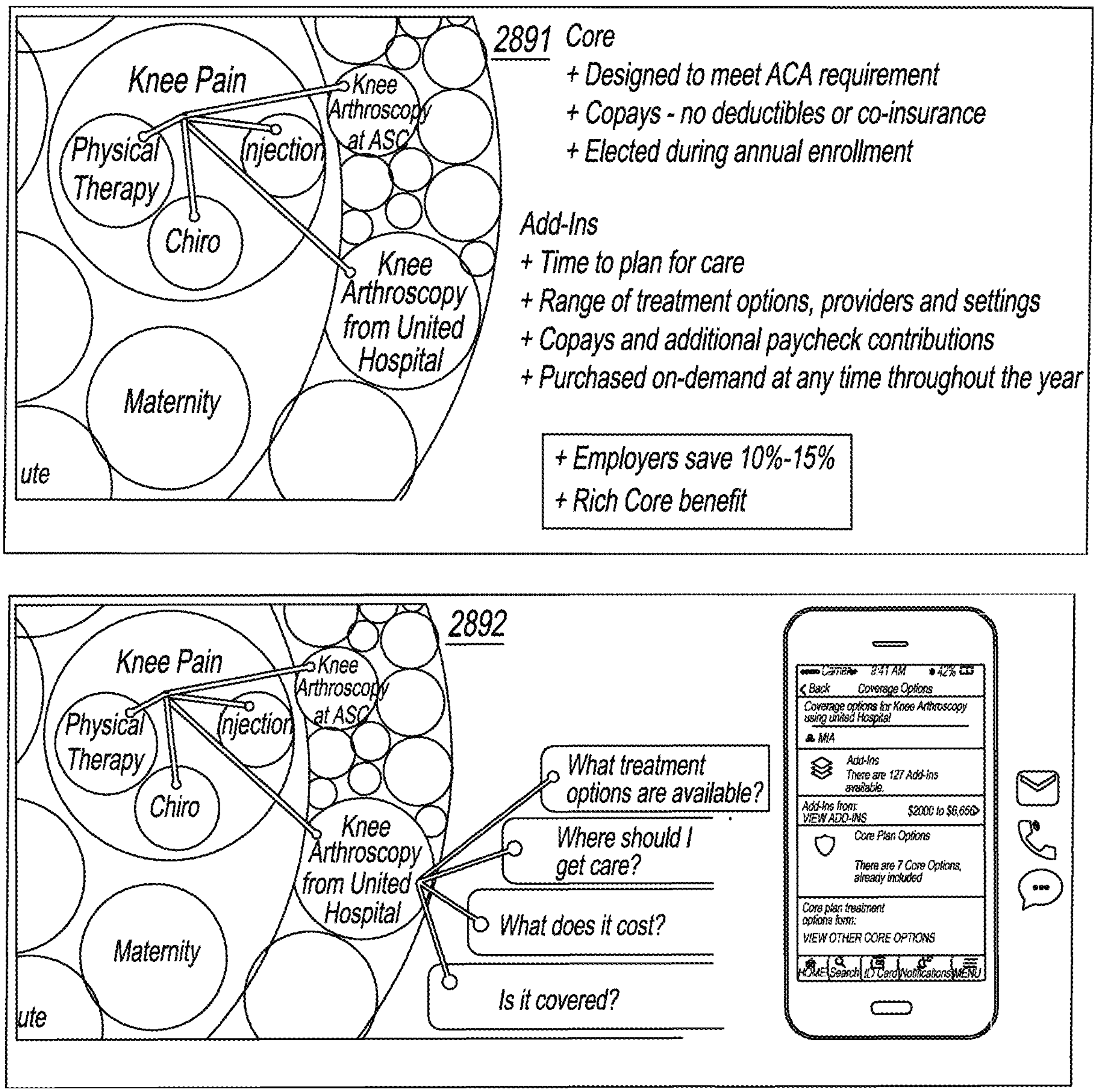

FIGS. 28A-B show exemplary atomized coverage graphs of the UDRCD. In FIG. 28A, the atomized coverage graph example shows relationships between conditions 2801, 2805, treatments (or procedures) 2811, 2813, 2815, 2817, 2819, and providers 2821, 2822, 2826, 2827. Solid lines indicate elements (e.g., objects, links) that are part of the atomized coverage graph, and dashed lines indicate elements that illustrate the context in which the atomized coverage graph may be used. It is to be understood that while portions of the atomized coverage graph structure may be hierarchical, it may be a multi-directional and/or a self-referential datastructure.

In some implementations, each object in the atomized coverage graph may be associated with a graph encapsulation (GE) level that indicates the relationship of an object to other objects. For example, Knee Pain condition object 2801 may have graphical encapsulation level 3 (GE3), may be a subset of a Knee Ailment condition object (not shown) with graphical encapsulation level 2 (GE2), and may be treated using Knee Arthroscopy 2811 treatment with graphical encapsulation level 4 (GE4). In some implementations, frequently utilized subsets of nodes in the atomized coverage graph (e.g., as determined by statistical analysis, as determined by a machine learning structure (e.g., a neural network)) may be split off into new nodes (e.g., a Severe Knee Pain object and/or associated treatment objects may be generated, and linked with relevant provider objects) providing the atomized coverage graph the ability to evolve and change its own structure.

As shown in the atomized coverage graph example, condition objects may include data regarding available treatment paths for the respective condition (e.g., as part of a condition object, as a separate linked object). For example, Knee Pain condition 2801 may include treatment paths data 2802. In another example, type II Diabetes condition 2805 may include treatment paths data 2806. Treatment paths may identify various (e.g., high frequency) pathways that are utilized to treat a condition, whether a pathway is high value, medium value or low value (e.g., based on the cost and clinical outcome associated with the pathway), and key pathway nodes where members select between different treatments and/or providers. Condition objects such as Knee Pain 2801 and Diabetes 2805 may be linked with treatment objects of treatments that are available for the respective condition. For example, Knee Arthroscopy 2811, Injection 2813 and Physical Therapy 2815 may be available treatments for Knee Pain condition 2801, and may be linked to the condition (e.g., a condition object may be queried to determine linked treatments, a treatment object may be queried to determine a linked condition). In another example, Metformin 2817 and Insulin Therapy 2819 may be available treatments for type II Diabetes condition 2805, and may be linked to the condition (e.g., using object identifiers, using pointers).

As shown in the atomized coverage graph example, treatment objects may be linked with provider objects of providers that offer the respective treatment. For example, Physical Therapy treatment 2815 may be linked with provider 2822 and provider 2826 (e.g., a treatment object may be queried to determine linked providers, a provider object may be queried to determine linked treatments). In some implementations, a node in the atomized coverage graph may be dynamically generated when utilized. For example, Knee Arthroscopy treatment object 2821 may include an embedded SQL query that may be utilized to dynamically generate a linked provider object 2821. In some implementation, a frequently utilized dynamically generated node may be converted to a static node and instantiated as a node in the atomized coverage graph.

As shown in the atomized coverage graph example, provider objects may include data regarding practice patterns of the respective provider (e.g., as part of a provider object, as a separate linked object). Practice patterns data indicates the propensity of a provider to utilize various treatment paths for a condition. For example, practice patterns data 2823 of provider 2822 may indicate how likely the provider is to utilize each of the high frequency treatment paths defined by treatment paths 2802 to treat Knee Pain condition 2801. Provider objects may include data regarding treatment cost of linked treatments for the respective provider (e.g., as part of a provider object, as a separate linked object). Treatment cost data indicates how much a provider charges for the various treatments that the provider offers. For example, treatment cost data 2824 of provider 2822 may indicate how much the provider charges for Injection treatment 2813 and for Physical Therapy treatment 2815.

The atomized coverage graph may be utilized when generating ODHI plans. In one implementation, some of the nodes of the atomized coverage graph may be selected for inclusion into an ODHI plan core and some other nodes may be selected for inclusion into an ODHI plan add-ins. For example, an ODHI plan may be generated by selecting nodes 2801, 2805, 2813, 2815 and 2817 into ODHI plan core 2851, and by selecting nodes 2811 and 2819 into ODHI plan add-ins 2855. It is to be understood that some of the nodes of the atomized coverage graph may not be selected for inclusion into the generated ODHI plan (e.g., a particular condition may not be covered by the generated ODHI plan), but may be selected when generating other ODHI plans.

ODHI plan members 2861 and 2865 may be associated with the generated ODHI plan. Plan members may include member state data (e.g., as part of an ODHI plan member object, as a separate linked object). Member state data indicates a plan member's location with regard to treatment paths for a condition. For example, member state data 2862 of plan member 2861 indicates the plan member's treatment paths location (e.g., tried using Physical Therapy treatment 2815 but did not yet try Injection treatment 2813) with regard to the high frequency treatment paths defined by treatment paths 2802 for Knee Pain condition 2801.

In FIG. 28B, alternative embodiments of how an atomized coverage graph may be configured are illustrated. Atomized coverage graph examples 2891 and 2892 show relationships between various ACG objects (e.g., condition, treatment) and how these ACG objects fit with core and add-in components of an ODHI plan. In one embodiment, the user interface illustrated in these examples may be utilized to configure the data structure topology of a linked ACG and/or of a linked ODHI plan thereby instantiating a connection between the data structure topology and the user interface. In one implementation, the linked ODHI plan may be represented in the user interface as nested shapes (e.g., concentric circles with an inner circle representing an ODHI plan core and an outer circle representing an ODHI plan add-ins). The linked ODHI plan may be configured by placing ACG objects, which may be represented in the user interface as shapes (e.g., circles), into an appropriate ODHI plan shape (e.g., directly inside the appropriate ODHI plan shape, nested in another ACG object that is inside the appropriate ODHI plan shape). For example, an ACG object may be placed (e.g., dragged, added) from a library of ACG objects. In another example, an ACG object may be newly created. In one implementation, the user interface may be utilized to configure ACG objects. For example, links between ACG objects may be created (e.g., by dragging a connector GUI widget from one ACG object to another ACG object). In one implementation, configuration changes produced via the graphical user interface are propagated to the data structure topology of the linked ACG and/or of the linked ODHI plan. In an alternative embodiment, user interface configurations and options may come from the graph data structure topology. For example, the user interface may retrieve options for a user and consult the graph data structure topology to provide details about treatment options, add-in options, what procedures are covered, available treatment locations, copays, discounts, etc. by reading and traversing nodes within the data structure topology.

Figure 29A:
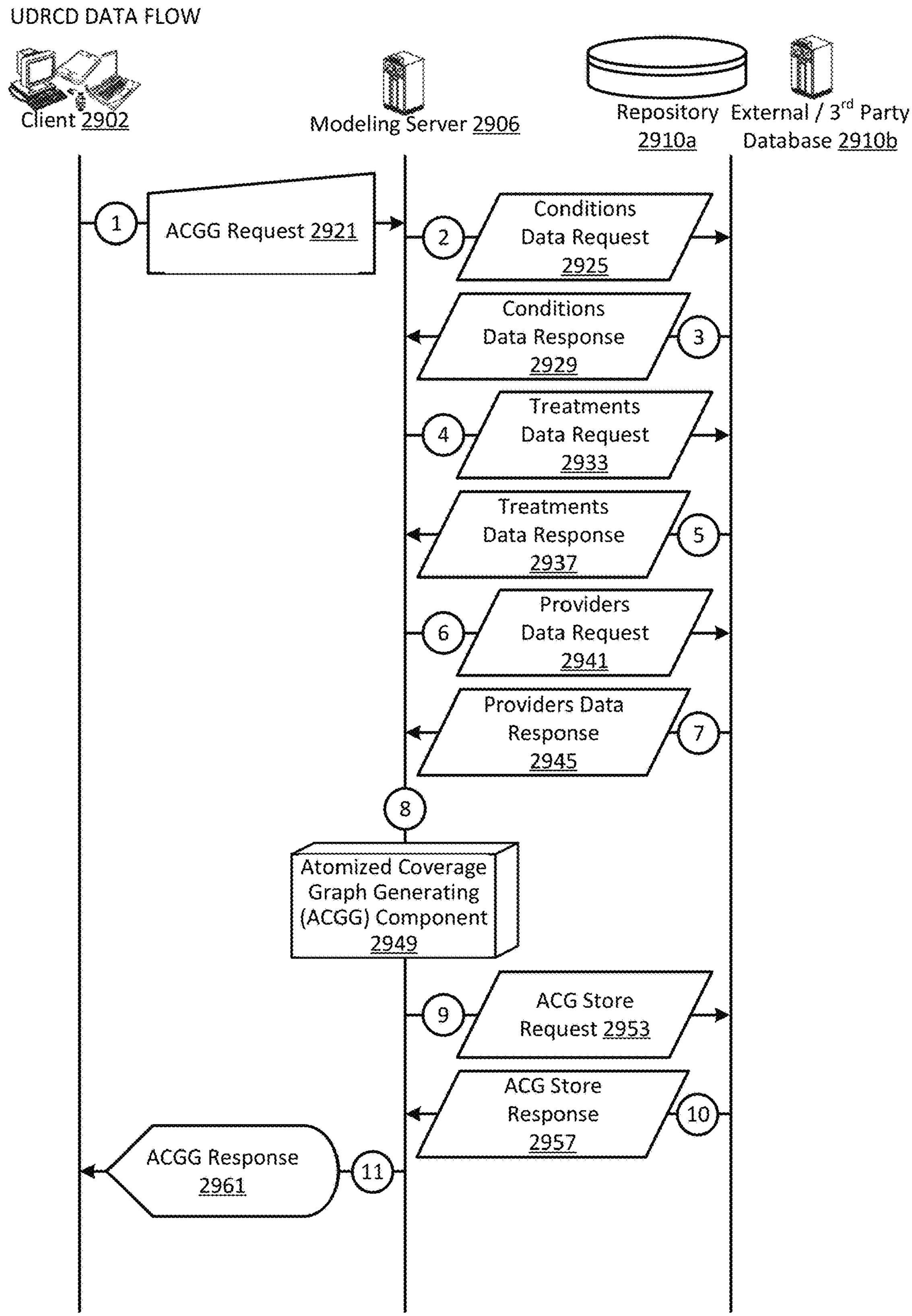
FIGS. 29A-B show a datagraph illustrating data flow(s) for the UDRCD.
Figure 29B:
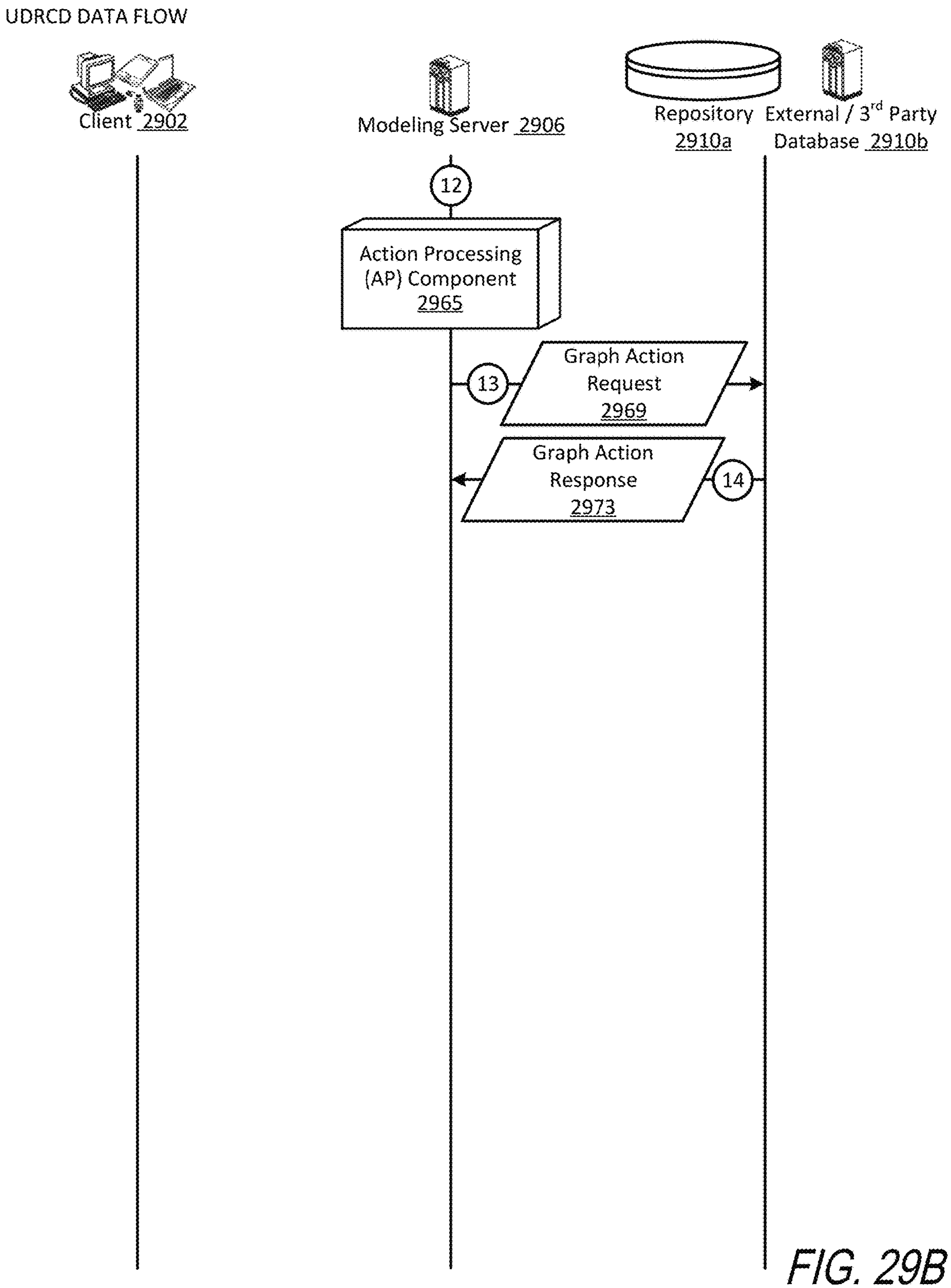

FIGS. 29A-B show a datagraph illustrating data flow(s) for the UDRCD. In FIGS. 29A-B, a client 2902 (e.g., of a user) may send an atomized coverage graph generating (ACGG) request 2921 to a modeling server 2906 to facilitate generating an atomized coverage graph. For example, the client may be a desktop, a laptop, a tablet, a smartphone, and/or the like that is executing a client application. In one implementation, the ACGG request may include data such as a request identifier, a request type, and/or the like. In one embodiment, the client may provide the following example ACGG request, substantially in the form of a HTTP(S) POST message including XML-formatted data, as provided below:

```
POST/ACGG_request.php HTTP/1.1
Host: www.server.com
Content-Type: Application/XML
Content-Length: 667
<? XML version="1.0" encoding="UTF-8"?>
<ACGG_request>
  <request_identifier>ID_request_11</request_identifier>
  <request_type>GENERATE_ACG</request_type>
</ACGG_request>
```

The modeling server may send a conditions data request 2925 to a data source such as a repository 2910*a* or an external/3$^{rd}$ party database 2910*b* to obtain information regarding classified conditions. In one implementation, the conditions data request may include data such as a request identifier, requested data specification, and/or the like. In one embodiment, the modeling server may provide the following example conditions data request, substantially in the form of a HTTP(S) POST message including XML-formatted data, as provided below:

```
POST/conditions_data_request.php HTTP/1.1
Host: www.server.com
Content-Type: Application/XML
Content-Length: 667
<? XML version="1.0" encoding="UTF-8"?>
<conditions_data_request>
  <request_identifier>ID_request_12</request_identifier>
  <requested_data>conditions data</requested_data>
</conditions_data_request>
```

The repository and/or the external/3$^{rd}$ party database may send a conditions data response 2929 to the modeling server to provide the modeling server with the requested conditions data. In one implementation, the conditions data response may include data such as a response identifier, the requested conditions data, and/or the like. In one embodiment, the repository and/or the external/3$^{rd}$ party database may provide the following example conditions data response, substantially in the form of a HTTP(S) POST message including XML-formatted data, as provided below:

```
POST /conditions_data_response.php HTTP/1.1
Host: www.server.com
Content-Type: Application/XML
Content-Length: 667
<?XML version = "1.0" encoding = "UTF-8"?>
<conditions_data_response>
  <request_identifier>ID_response_12</request_identifier>
  <requested_data>
    <condition>
      <condition_identifier>ID_condition_knee_pain</
      condition_identifier>
      <treatments>
        ID_treatment_injection, ID_treatment_physical_therapy
      </treatments>
    </condition>
    <condition>
      <condition_identifier>ID_condition_diabetes</condition_identifier>
      <treatments>
        ID_treatment_metformin, ID_treatment_insulin_therapy
      </treatments>
    </condition>
    ...
  </requested_data>
</conditions_data_response>
```

The modeling server may send a treatments data request 2933 to a data source such as the repository 2910*a* or the external/3$^{rd}$ party database 2910*b* to obtain information regarding classified treatments. In one implementation, the treatments data request may include data such as a request identifier, requested data specification, and/or the like. In one embodiment, the modeling server may provide the following example treatments data request, substantially in the form of a HTTP(S) POST message including XML-formatted data, as provided below:

```
POST/treatments_data_request.php HTTP/1.1
Host: www.server.com
Content-Type: Application/XML
Content-Length: 667
<? XML version="1.0" encoding="UTF-8"?>
<treatments_data_request>
  <request_identifier>ID_request_13</request_identifier>
  <requested_data>treatments data</requested_data>
</treatments_data_request>
```

The repository and/or the external/3$^{rd}$ party database may send a treatments data response 2937 to the modeling server to provide the modeling server with the requested treatments data. In one implementation, the treatments data response may include data such as a response identifier, the requested treatments data, and/or the like. In one embodiment, the repository and/or the external/3$^{rd}$ party database may provide the following example treatments data response, substantially in the form of a HTTP(S) POST message including XML-formatted data, as provided below:

```
POST /treatments_data_response.php HTTP/1.1
Host: www.server.com
Content-Type: Application/XML
Content-Length: 667
<?XML version = "1.0" encoding = "UTF-8"?>
<treatments_data_response>
  <request_identifier>ID_response_13</request_identifier>
  <requested_data>
    <treatment>
      <treatment_identifier>ID_treatment_injection</treatment_identifier>
      <condition>ID_condition_knee_pain</condition>
      <providers>ID_provider_1, ID_provider_2</providers>
    </treatment>
    <treatment>
      <treatment_identifier>ID_treatment_arthroscopy</
      treatment_identifier>
      <condition> ID_condition_knee_pain</condition>
      <providers>SQL query that determines providers</providers>
    </treatment>
    ...
  </requested_data>
</treatments_data_response>
```

The modeling server may send a providers data request 2941 to a data source such as the repository 2910*a* or the external/3$^{rd}$ party database 2910*b* to obtain information regarding available providers. In one implementation, the providers data request may include data such as a request identifier, requested data specification, and/or the like. In one embodiment, the modeling server may provide the following example providers data request, substantially in the form of a HTTP(S) POST message including XML-formatted data, as provided below:

```
POST/providers_data_request.php HTTP/1.1
Host: www.server.com
Content-Type: Application/XML
Content-Length: 667
<? XML version="1.0" encoding="UTF-8"?>
<providers_data_request>
  <request_identifier>ID_request_14</request_identifier>
  <requested_data>providers data</requested_data>
</providers_data_request>
```

The repository and/or the external/3$^{rd}$ party database may send a providers data response 2945 to the modeling server to provide the modeling server with the requested providers data. In one implementation, the providers data response may include data such as a response identifier, the requested providers data, and/or the like. In one embodiment, the repository and/or the external/3$^{rd}$ party database may provide the following example providers data response, substantially in the form of a HTTP(S) POST message including XML-formatted data, as provided below:

```
POST /providers_data_response.php HTTP/1.1
Host: www.server.com
Content-Type: Application/XML
Content-Length: 667
<?XML version = "1.0" encoding = "UTF-8"?>
<providers_data_response>
  <request_identifier>ID_response_14</request_identifier>
  <requested_data>
    <provider>
      <provider_identifier>ID_provider_1</provider_identifier>
      <treatments>
        ID_treatment_injection, ID_treatment_physical_therapy
      </treatments>
      <provider_historical_data>
        historical treatment and/or cost data for provider
      </provider_historical_data>
    </provider>
    <provider_identifier>ID_provider_2</provider_identifier>
      <treatments>
        ID_treatment_physical_therapy, ID_treatment_insulin_therapy
      </treatments>
      <provider_historical_data>
        historical treatment and/or cost data for provider
      </provider historical data>
    </provider>
    ...
  </requested_data>
</providers_data_response>
```

An atomized coverage graph generating (ACGG) component 2949 may utilize conditions data, treatments data, and/or providers data to facilitate generating an atomized coverage graph. See FIG. 30A for additional details regarding the ACGG component.

The modeling server may send an atomized coverage graph (ACG) store request 2953 to the repository to store the ACG. In one implementation, the ACG store request may include data such as a request identifier, an ACG identifier, ACG data, and/or the like. In one embodiment, the modeling server may provide the following example ACG store request, substantially in the form of a HTTP(S) POST message including XML-formatted data, as provided below:

```
POST/ACG_store_request.php HTTP/1.1
Host: www.server.com
Content-Type: Application/XML
Content-Length: 667
<? XML version="1.0" encoding="UTF-8"?>
<ACG_store_request>
  <request_identifier>ID_request_15</request_identifier>
  <ACG_identifier>ID_ACG_1</ACG_identifier>
  <ACG_data>ACG conditions data, ACG treatments data, ACG providers data</ACG_data>
</ACG_store_request>
```

The repository may confirm that the ACG was stored via an ACG store response 2957.

The modeling server may send an ACGG response to the client to confirm to the user that the ACG was generated successfully. In one implementation, the ACGG response may include data such as a response identifier, a status, and/or the like. In one embodiment, the modeling server may provide the following example ACGG response, substantially in the form of a HTTP(S) POST message including XML-formatted data, as provided below:

```
POST/ACGG_response.php HTTP/1.1
Host: www.server.com
Content-Type: Application/XML
Content-Length: 667
<? XML version="1.0" encoding="UTF-8"?>
<ACGG_response>
  <response_identifier>ID_response_11
    </response_identifier>
  <status>OK</status>
</ACGG_response>
```

An action processing (AP) component 2965 may analyze previous ACG activity and determine whether action is necessary (e.g., to make the atomized coverage graph more efficient). See FIG. 30B for additional details regarding the AP component.

The modeling server may send a graph action request 2969 to a data source such as the repository 2910*a* or the external/3$^{rd}$ party database 2910*b* to obtain graph action data. In one implementation, the graph action request may include data such as a request identifier, an action type, requested data specification, and/or the like. In one embodiment, the modeling server may provide the following example graph action request, substantially in the form of a HTTP(S) POST message including XML-formatted data, as provided below:

```
POST/graph_action_request.php HTTP/1.1
Host: www.server.com
Content-Type: Application/XML
Content-Length: 667
<? XML version="1.0" encoding="UTF-8"?>
<graph_action_request>
  <request_identifier>ID_request_16</request_identi-
    fier>
  <action_type>NEW</action_type>
  <requested_data>graph action data for asthma</re-
    quested_data>
</graph_action_request>
```

The repository and/or the external/3$^{rd}$ party database may send a graph action response 2973 to the modeling server to provide the modeling server with the requested graph action data. In one implementation, the graph action response may include data such as a response identifier, the requested graph action data, and/or the like. In one embodiment, the repository and/or the external/3$^{rd}$ party database may provide the following example graph action response, substantially in the form of a HTTP(S) POST message including XML-formatted data, as provided below:

```
POST /graph_action_response.php HTTP/1.1
Host: www.server.com
Content-Type: Application/XML
Content-Length: 667
<?XML version = "1.0" encoding = "UTF-8"?>
<graph_action_response>
  <request_identifier>ID_response_16</request_identifier>
  <requested_data>
    <condition>
      <condition_identifier>ID_condition_asthma</condition_identifier>
      <treatments>
        ID_treatment_inhaler, ID_treatment_bronchial_thermoplasty
      </treatments>
    </condition>
    <treatment>
      <treatment_identifier>ID_treatment_inhaler</treatment_identifier>
      <condition> ID_condition_asthma</condition>
```

-continued

```
      <providers>ID_provider_1, ID_provider_2</providers>
    </treatment>
    <treatment>
      <treatment_identifier>
        ID_treatment_bronchial_thermoplasty
      </treatment_identifier>
      <condition>ID_condition_asthma</condition>
      <providers>ID_provider_1, ID_provider_2</providers>
    </treatment>
  </requested_data>
</graph_action_response>
```

Figure 30A:
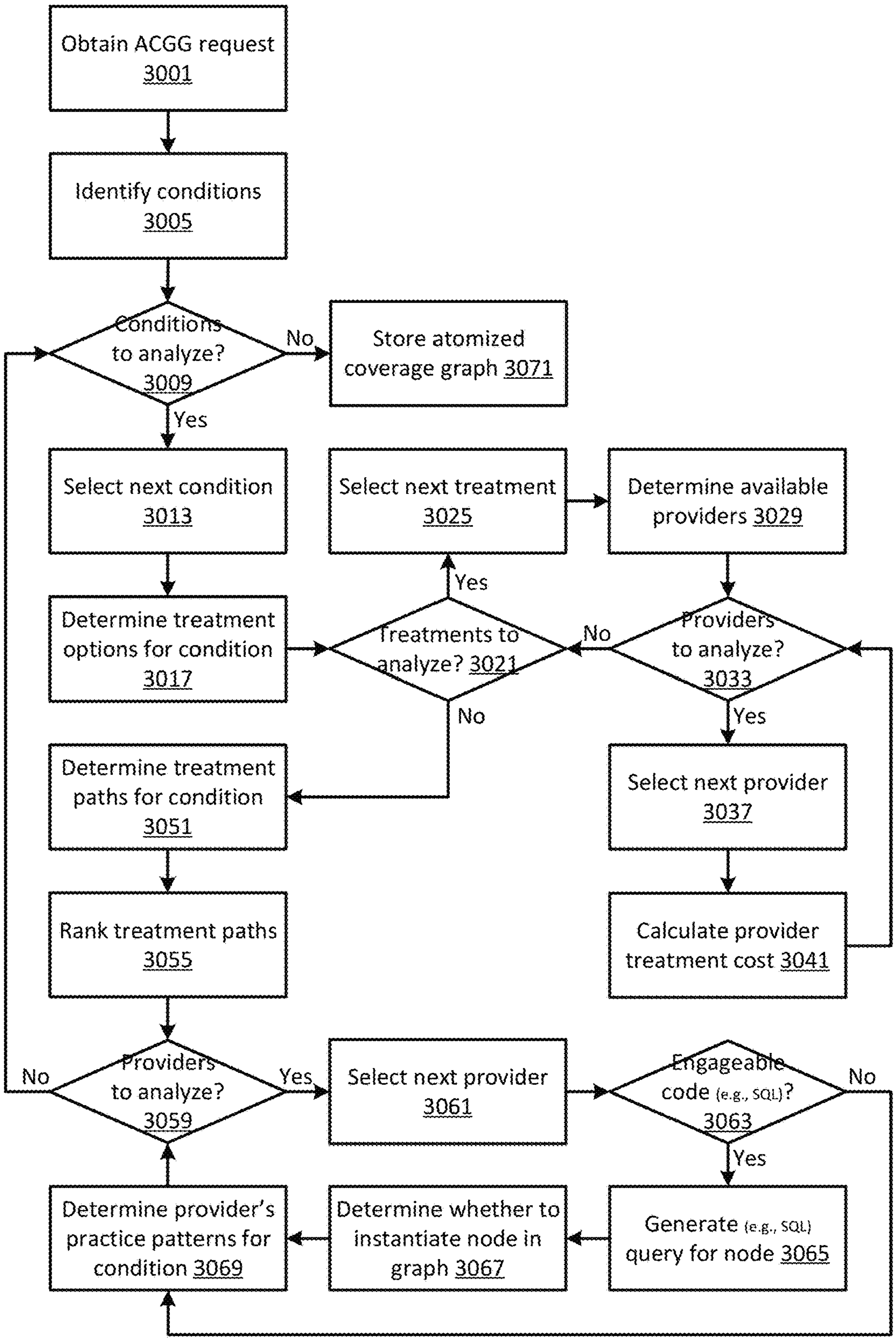
FIG. 30A shows a logic flow illustrating embodiments of an atomized coverage graph generating (ACGG) component for the UDRCD.

FIG. 30A shows a logic flow illustrating embodiments of an atomized coverage graph generating (ACGG) component for the UDRCD. In FIG. 30A, an ACGG request may be obtained at 3001. For example, the ACGG request may be obtained as a result of a user requesting generation of an atomized coverage graph (ACG).

Conditions may be identified at 3005. In one embodiment, atomized conditions classified using a determined care taxonomy may be identified. In one implementation, conditions may be determined by grouping ICD-10 Diagnosis codes for related ailments into conditions or related condition groups. For example, conditions may include Knee Pain, Diabetes, and/or the like. A determination may be made at 3009 whether there remain more conditions to analyze. In one implementation, any identified condition may be analyzed. If there remain conditions to analyze, the next identified condition may be selected for analysis at 3013 and added to the ACG.

Treatment options for the selected condition may be determined at 3017. In one embodiment, practice patterns data may be utilized to determine available treatment options for the condition. In one implementation, service options that are currently used to address the condition may be determined using historical claims data and/or identification of CPT codes provided to individuals that have a diagnosis code associated with the condition. These service options for the condition may then be grouped into a set of treatment options for the condition.

A determination may be made at 3021 whether there remain more treatments (procedures) to analyze. In one implementation, any determined treatment may be analyzed. If there remain treatments to analyze, the next determined treatment may be selected for analysis at 3025 and added to the ACG.

Available providers for the selected treatment may be determined at 3029. In one implementation, this determination may be made based on available UDRCD providers (e.g., providers that have a contract with the UDRCD and that offer the treatment). In some embodiments, available provider networks may be determined instead of individual providers.

A determination may be made at 3033 whether there remain providers to analyze. In one implementation, any available provider or provider network may be analyzed. If there remain providers to analyze, the next available provider or provider network may be selected for analysis at 3037.

Provider treatment cost for the treatment may be calculated at 3041. In one implementation, practice patterns data may be utilized to calculate the expected (e.g., average) cost that the provider or provider network charges for performing the treatment. For example, claims submitted by the provider or provider network for the treatment over the last 3 years may be analyzed to calculate the average cost.

Treatment paths for the selected condition may be determined at 3051. In one implementation, the set of treatment options for the condition may be mapped into clinical treatment paths that create a longitudinal view of the treatments that an individual may utilize over time to address the condition.

The determined treatment paths may be ranked at 3055. In one implementation, the determined treatment paths may be ranked as high value, medium value or low value based on the cost and/or clinical outcome associated with the respective pathway. For example, those treatment paths that are identified as translating to lower cost of care for an individual, based on an annual view for those with chronic conditions or an episodic view for those with acute conditions, and that are found to effectively address the needs of the individual for the condition may be identified as high value. In some implementations, key pathway nodes where members select between different treatments and/or providers may be identified. For example, nodes of influence where key decisions or referrals occur that have a greater determination on the treatment path that an individual will proceed on and whether that path will end with them receiving high or low value treatment may be identified (e.g., based on practice patterns data).

A determination may be made at 3059 whether there remain providers to analyze. In one implementation, any available provider or provider network may be analyzed. If there remain providers to analyze, the next available provider or provider network may be selected for analysis at 3061.

A determination may be made at 3063 whether the provider node associated with the provider utilizes engageable code. For example, the engageable code may be a SQL query that generates the provider node dynamically. If so, the SQL query may be generated for the node at 3065. A determination may be made at 3067 whether to instantiate the dynamic provider node in the ACG so that the provider node becomes a static node. In one implementation, this determination may be made based on the frequency of utilization (e.g., based on a counter of utilization, based on percentage of utilization) and/or based on a determination of importance by a machine learning structure (e.g., a neural network).

The provider's practice patterns for the condition may be determined at 3069. In one implementation, the provider's propensity, or the frequency with which the provider leverages high, medium and low value treatment options, may be determined based on the provider's practice patterns data. In another implementation, the provider's intensity to leverage treatment options may be determined based on the provider's practice patterns data.

The generated ACG may be stored at 3071. In one implementation, the ACG may be stored via a MySQL database command similar to the following:

```
INSERT INTO AtomizedCoverageGraphs (ACG_ID, ACG_ConditionsData,
                                    ACG_TreatmentsData, ACG_ProvidersData)
VALUES (ID_ACG_1, data regarding conditions,
        data regarding treatments, data regarding providers);
```

Figure 30B:
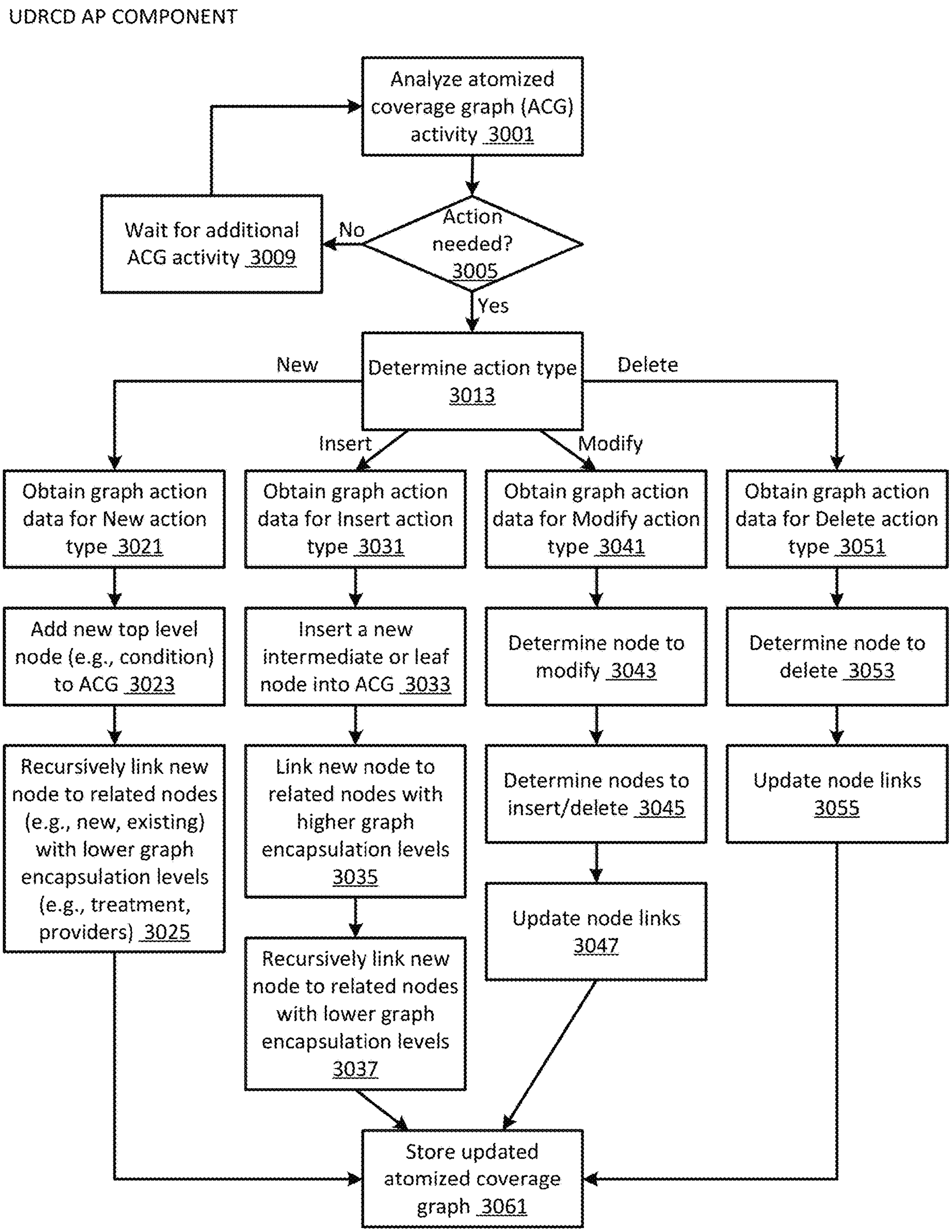
FIG. 30B shows a logic flow illustrating embodiments of an action processing (AP) component for the UDRCD.

FIG. 30B shows a logic flow illustrating embodiments of an action processing (AP) component for the UDRCD. In FIG. 30B, atomized coverage graph (ACG) activity may be analyzed at 3002 to determine whether action should be taken (e.g., to make the atomized coverage graph more efficient). In various embodiments, taking action may involve adding new nodes to an ACG, modifying existing nodes in the ACG, deleting nodes from the ACG, and/or the like. If it is determined at 3006 that no action is needed, the UDRCD may wait for additional ACG activity at 3010.

If it is determined that action is needed, action type of the action that should be taken may be determined at 3014. In one implementation, a machine learning structure (e.g., a neural network) may be utilized to determine (e.g., based on analysis of historical ACG usage activity) what action type to take. In one embodiment, it may be determined that a new top level node (e.g., for a condition) should be added to the ACG. For example, such a determination may be made based on determining (e.g., based on analysis of clinical records, treatments, providers, etc.) that ODHI coverage may be provided more efficiently by adding a new condition to the ACG. In another embodiment, it may be determined that a new intermediate or leaf node (e.g., for a treatment, for a provider) should be added to the ACG. For example, such a determination may be made based on determining (e.g., based on analysis of clinical records, treatments, providers, etc.) that ODHI coverage may be provided more efficiently by adding a new treatment or provider to the ACG. In another embodiment, it may be determined that a node of the ACG should be modified (e.g., split into multiple nodes). For example, such a determination may be made based on determining (e.g., based on analysis of clinical records, treatments, providers, etc.) that ODHI coverage may be provided more efficiently by splitting a treatment (e.g., insulin therapy) into multiple treatments (e.g., insulin pen, insulin pump, and insulin jet injector) in the ACG. In another embodiment, it may be determined that a node of the ACG should be deleted. For example, such a determination may be made based on determining (e.g., based on analysis of clinical records, treatments, providers, etc.) that ODHI coverage may be provided more efficiently by removing a treatment (e.g., an ineffective treatment, an unused treatment) from the ACG. In another example, such a determination may be made based on determining that a provider is no longer in business.

If a new top level node should be added to the ACG, graph action data for New action type may be obtained at 3022. In one implementation, such graph action data may facilitate updating the ACG in accordance with the desired action. A new top level node (e.g., for a condition) may be added to the ACG at 3024. For example, an Asthma condition object may be added to the ACG. The new node may be recursively linked to related nodes (e.g., new, existing) with lower graph encapsulation levels (e.g., treatments, providers) at 3026. For example, the Asthma condition object may be linked with treatment objects (e.g., existing treatment objects for treatments that may be used for asthma, new treatment objects created for treatments that may be used for asthma) related to asthma, which have a lower graph encapsulation level. Each of these treatment objects may in turn be linked with provider objects (e.g., existing provider objects for providers that offer asthma treatments, new provider objects created for providers that offer asthma treatments) related to the respective treatment, which have a lower graph encapsulation level.

If a new intermediate or leaf node should be added to the ACG, graph action data for Insert action type may be obtained at 3032. In one implementation, such graph action data may facilitate updating the ACG in accordance with the desired action. A new intermediate or leaf node (e.g., for a treatment, for a provider) may be added to the ACG at 3034. For example, an Asthma Inhaler treatment object may be added to the ACG. The new node may be linked to related nodes with higher graph encapsulation levels (e.g., conditions) at 3036. For example, the Asthma Inhaler treatment object may be linked with an Asthma condition object. In another example, the Asthma Inhaler treatment object may be linked with an allergy-induced asthma condition object and with an exercise-induced asthma condition object. The new node may be recursively linked to related nodes (e.g., new, existing) with lower graph encapsulation levels (e.g., providers) at 3038. For example, the Asthma Inhaler treatment object may be linked with provider objects (e.g., existing provider objects, new provider objects) that offer the asthma inhaler treatment.

If a node of the ACG should be modified (e.g., split into multiple nodes), graph action data for Modify action type may be obtained at 3042. In one implementation, such graph action data may facilitate updating the ACG in accordance with the desired action. The node of the ACG should be modified may be determined at 3044. For example, it may be determined that analysis by the machine learning structure indicates that the Insulin Therapy treatment object should be modified (e.g., split into multiple treatment objects specified by the machine learning structure). ACG nodes to insert and/or delete may be determined at 3046. For example, it may be determined that the Insulin Therapy treatment object should be deleted and that an Insulin Pen treatment object, an Insulin Pump treatment object, and an Insulin Jet Injector treatment object should be inserted, and these deletions and/or insertions may be executed. Node links may be updated at 3048. For example, links of condition objects and provider objects that previously linked to the Insulin Therapy treatment object may be updated to link to the Insulin Pen treatment object, the Insulin Pump treatment object, and/or the Insulin Jet Injector treatment object as appropriate.

If a node of the ACG should be deleted, graph action data for Delete action type may be obtained at 3052. In one implementation, such graph action data may facilitate updating the ACG in accordance with the desired action. The node of the ACG that should be deleted may be determined at 3054. For example, it may be determined that a provider object should be deleted because the associated provider is no longer in business, and this deletion may be executed. Node links may be updated at 3056. For example, each treatment object that previously linked to the provider object may be updated to remove the link to the provider object from the respective treatment object.

The updated ACG may be stored at 3062. In one implementation, the ACG may be updated via a MySQL database command similar to the following:

```
UPDATE AtomizedCoverageGraphs
SET ACG_ConditionsData=updated conditions data,
    ACG_TreatmentsData=updated treatments data,
    ACG_ProvidersData=updated providers data
WHERE ACG_ID=ID_ACG_1;
```

Figure 31:
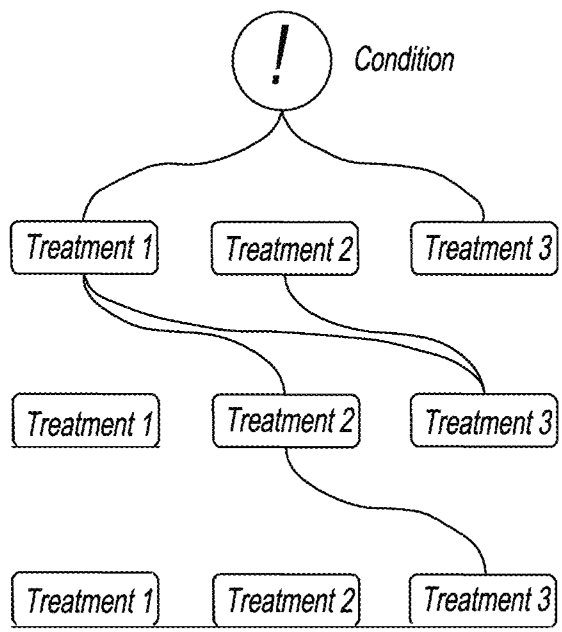
FIG. 31 shows a screenshot diagram illustrating embodiments of the UDRCD.

FIG. 31 shows a screenshot diagram illustrating embodiments of the UDRCD. In FIG. 31, treatment pathways for a condition are illustrated. In one embodiment, treatment paths identify the different clinical paths (e.g., ordered treatment sequences) that a member may follow to address a condition. Each node may be associated with a treatment. In some implementations, key pathway nodes where members select between different treatments and/or providers may be identified and marked.

Figure 32:
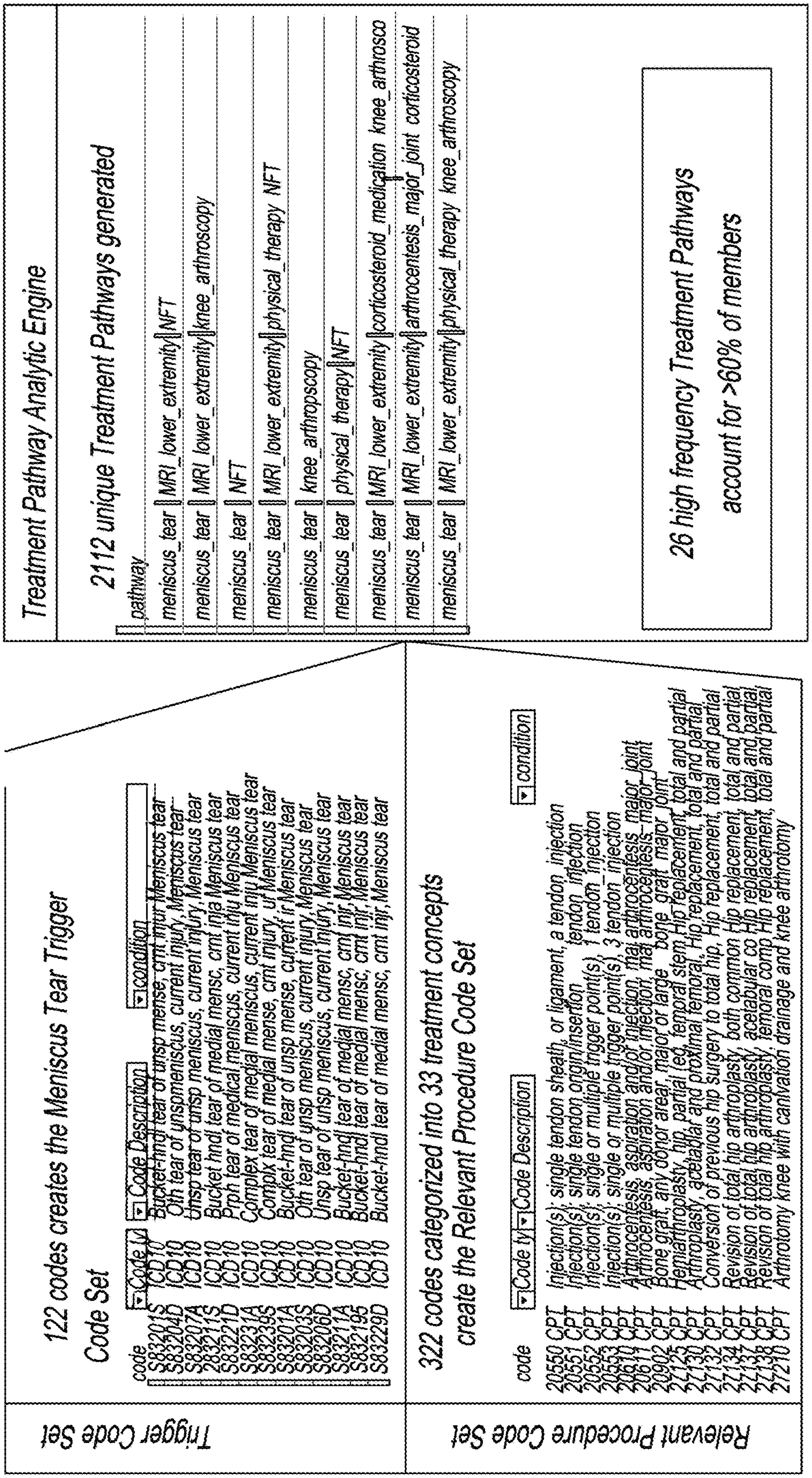
FIG. 32 shows a screenshot diagram illustrating embodiments of the UDRCD.

FIG. 32 shows a screenshot diagram illustrating embodiments of the UDRCD. In FIG. 32, an exemplary treatment pathway generation for meniscus tear is illustrated. A trigger code set (e.g., a set of codes that identify a condition and its subsegments and trigger logic) for meniscus tear is shown. The Meniscus Tear trigger code set includes 122 codes. A relevant procedure code set (e.g., a set of relevant and/or important treatments (e.g., procedures) for each condition) for meniscus tear is shown. The Meniscus Tear relevant procedure code set includes 322 codes categorized into 33 treatments. The Meniscus Tear trigger code set and the Meniscus Tear relevant procedure code set are utilized by a treatment pathway analytic engine to generate treatment paths for meniscus tear condition. The treatment pathway analytic engine generated 2112 unique treatment paths for meniscus tear. High frequency treatment paths (e.g., that account for at least a specified threshold percentage of members) may be determined by the treatment pathway analytic engine. The treatment pathway analytic engine determined 26 high frequency pathways for meniscus tear that account for more than 60% of members.

Figure 33A:
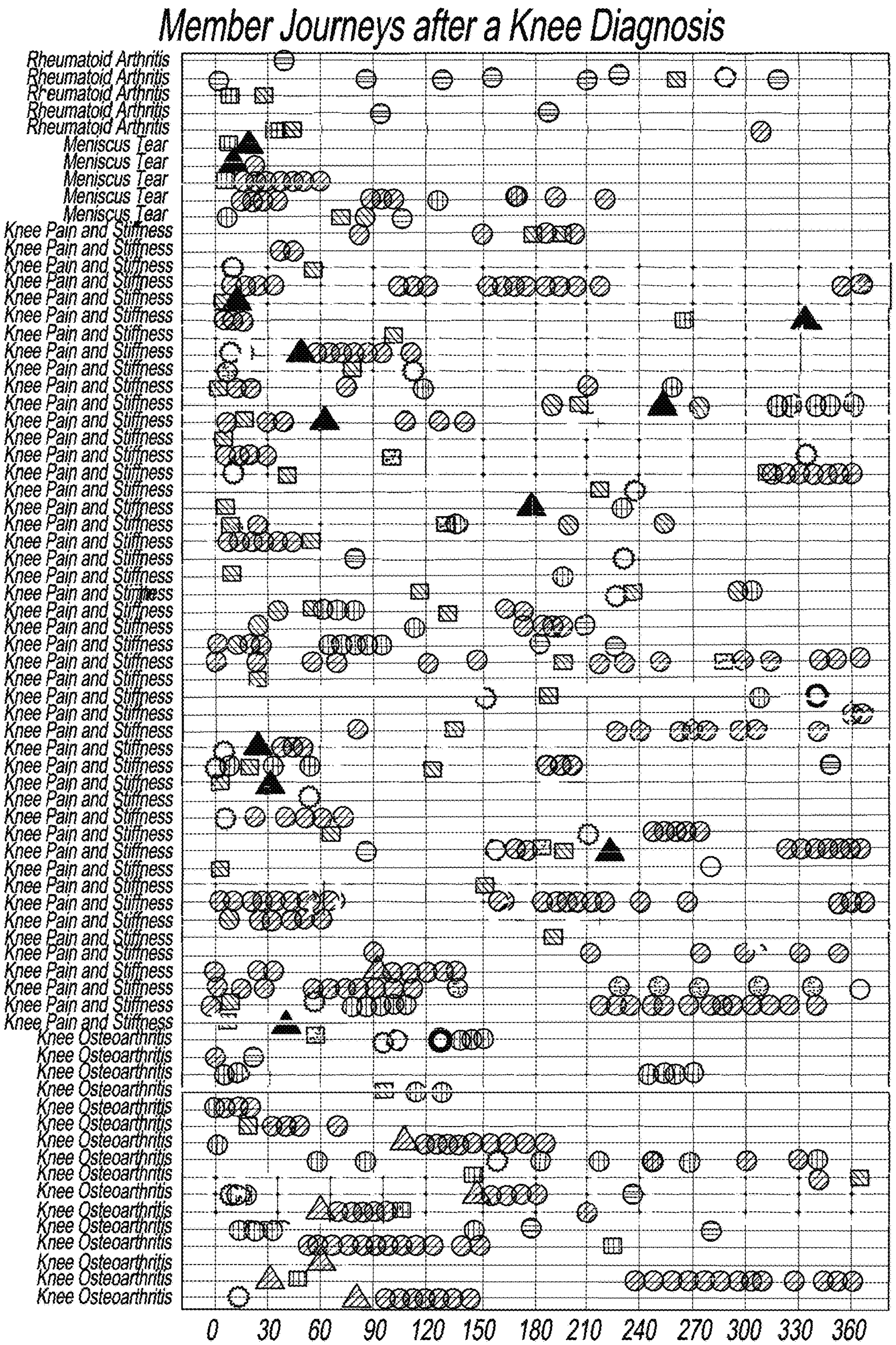
FIG. 33 shows a screenshot diagram illustrating embodiments of the UDRCD.
Figure 33B:
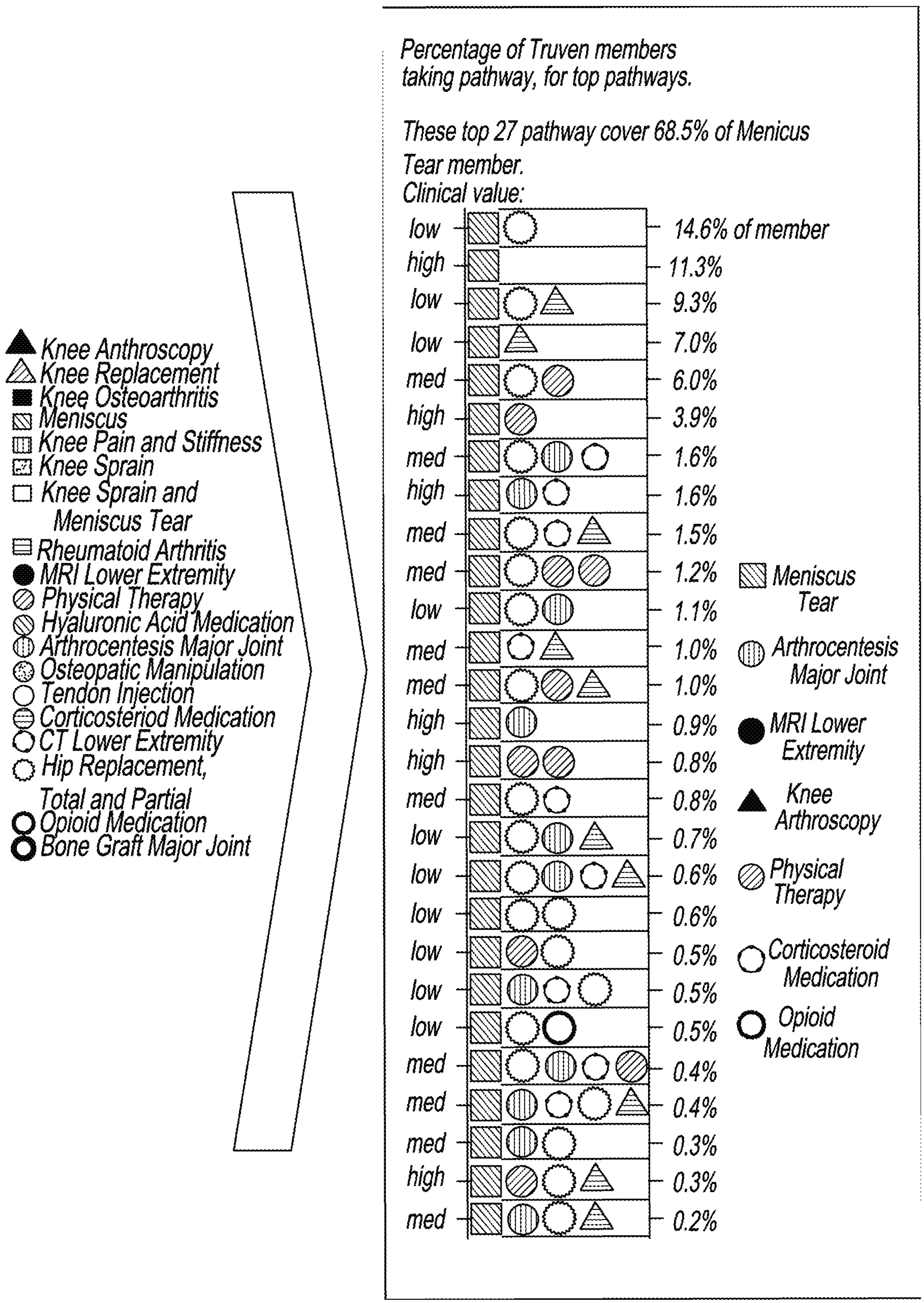

FIG. 33 shows a screenshot diagram illustrating embodiments of the UDRCD. In FIG. 33, exemplary high frequency pathways for meniscus tear are illustrated. 27 high frequency pathways for meniscus tear that account for 68.5% of meniscus tear members are shown. A clinical value (e.g., high value, medium value or low value) for each pathway is determined (e.g., based on the cost and clinical outcome associated with the pathway) and shown.

Figure 34A:
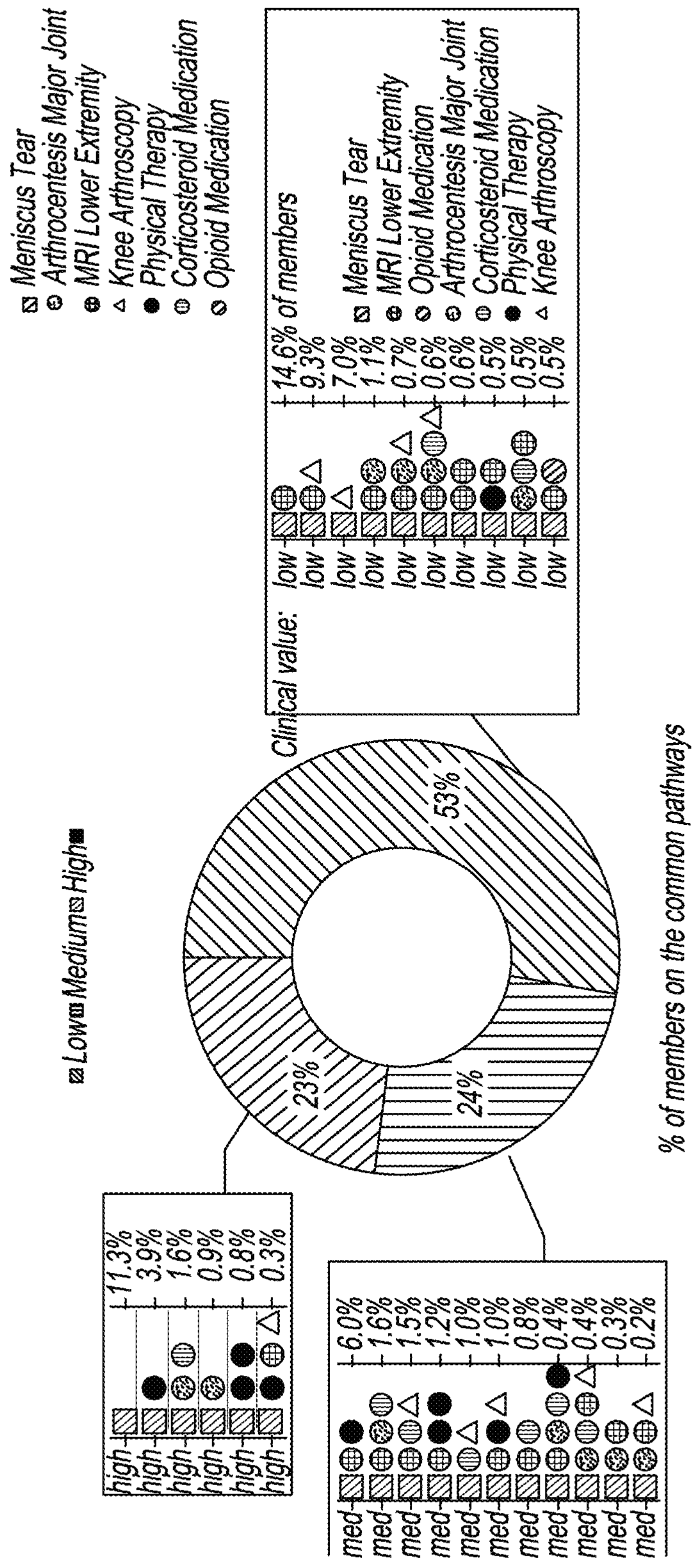
FIGS. 34A-B each show a screenshot diagram illustrating embodiments of the UDRCD.

FIG. 34A shows a screenshot diagram illustrating embodiments of the UDRCD. In FIG. 34A, exemplary high frequency pathways for meniscus tear are illustrated. As shown in FIG. 34A, only 23% of high frequency pathways for meniscus tear have high clinical value. This illustrates the advantage of being able to utilize treatment paths analysis to steer members (e.g., the other 77%) toward treatment paths with high clinical value.

Figure 34B:
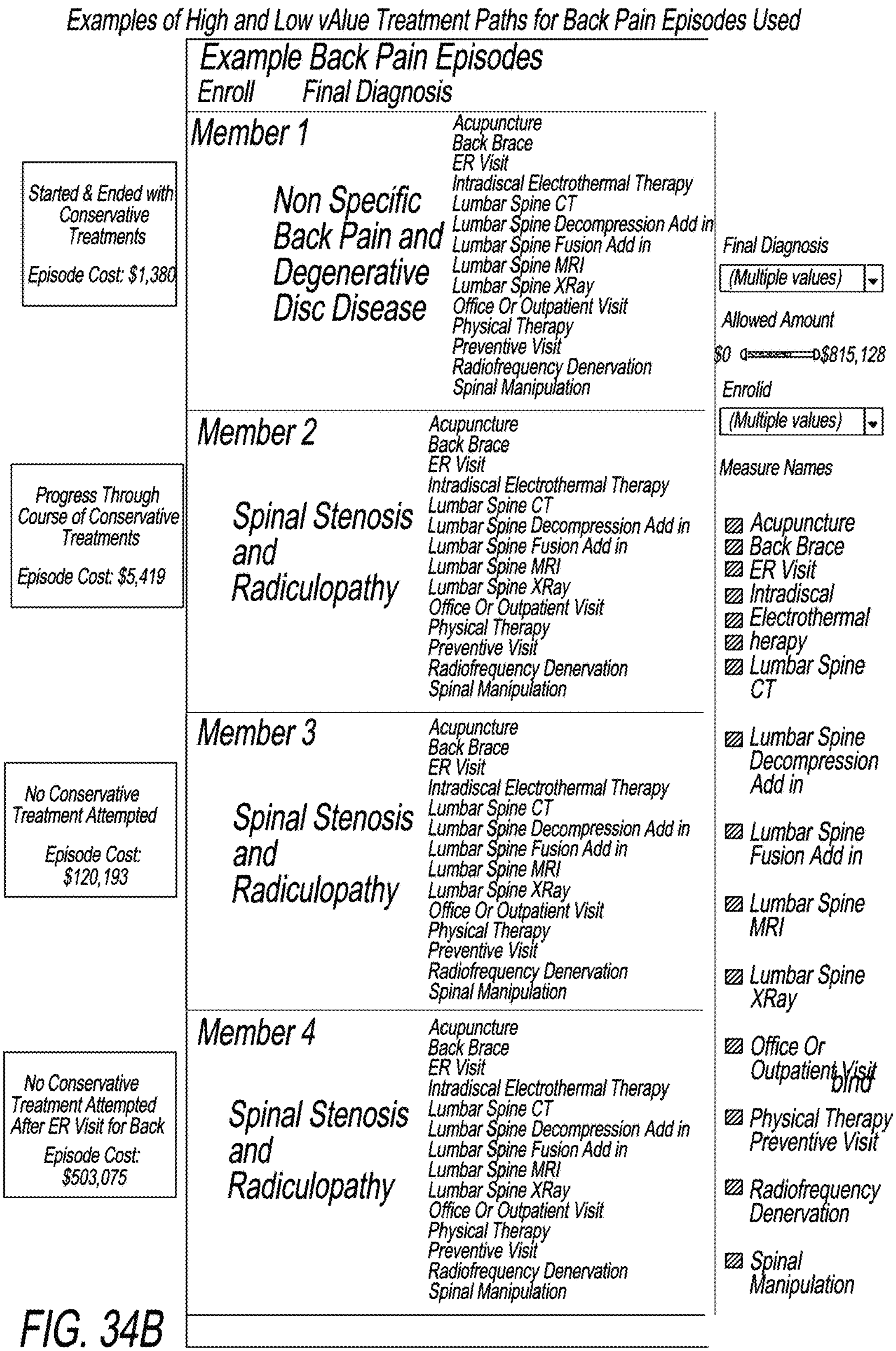
Figure 34C:
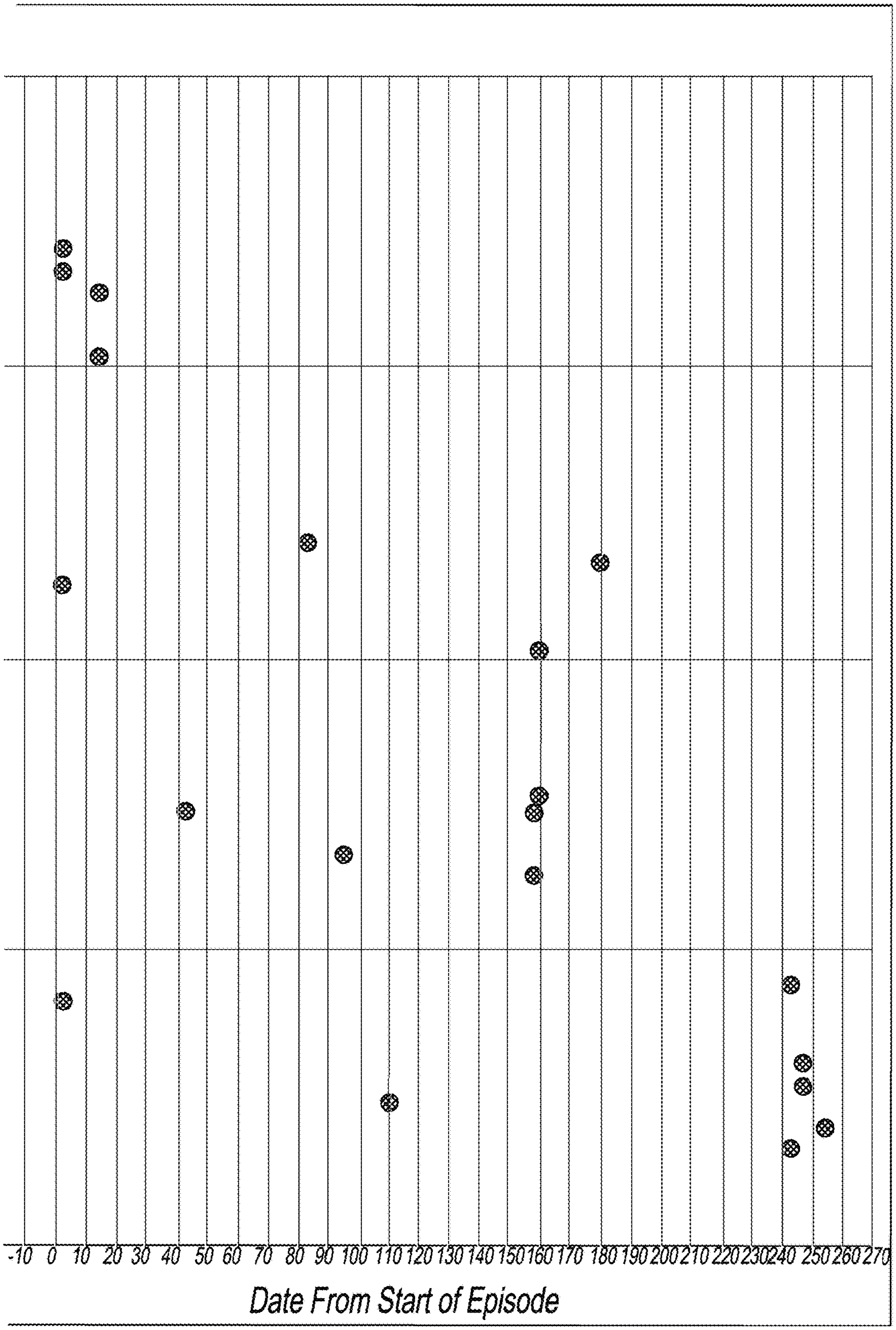

FIG. 34B shows a screenshot diagram illustrating embodiments of the UDRCD. In FIG. 34B, a screenshot of example treatment pathway episodes for back pain is shown. FIG. 34B demonstrates how high and low value treatment pathways may be identified and/or validated by looking at the sequencing and timing of different treatments within an episode and how those then result in differences in the rate of surgeries or the cost of care for treating that condition.

Figure 35:
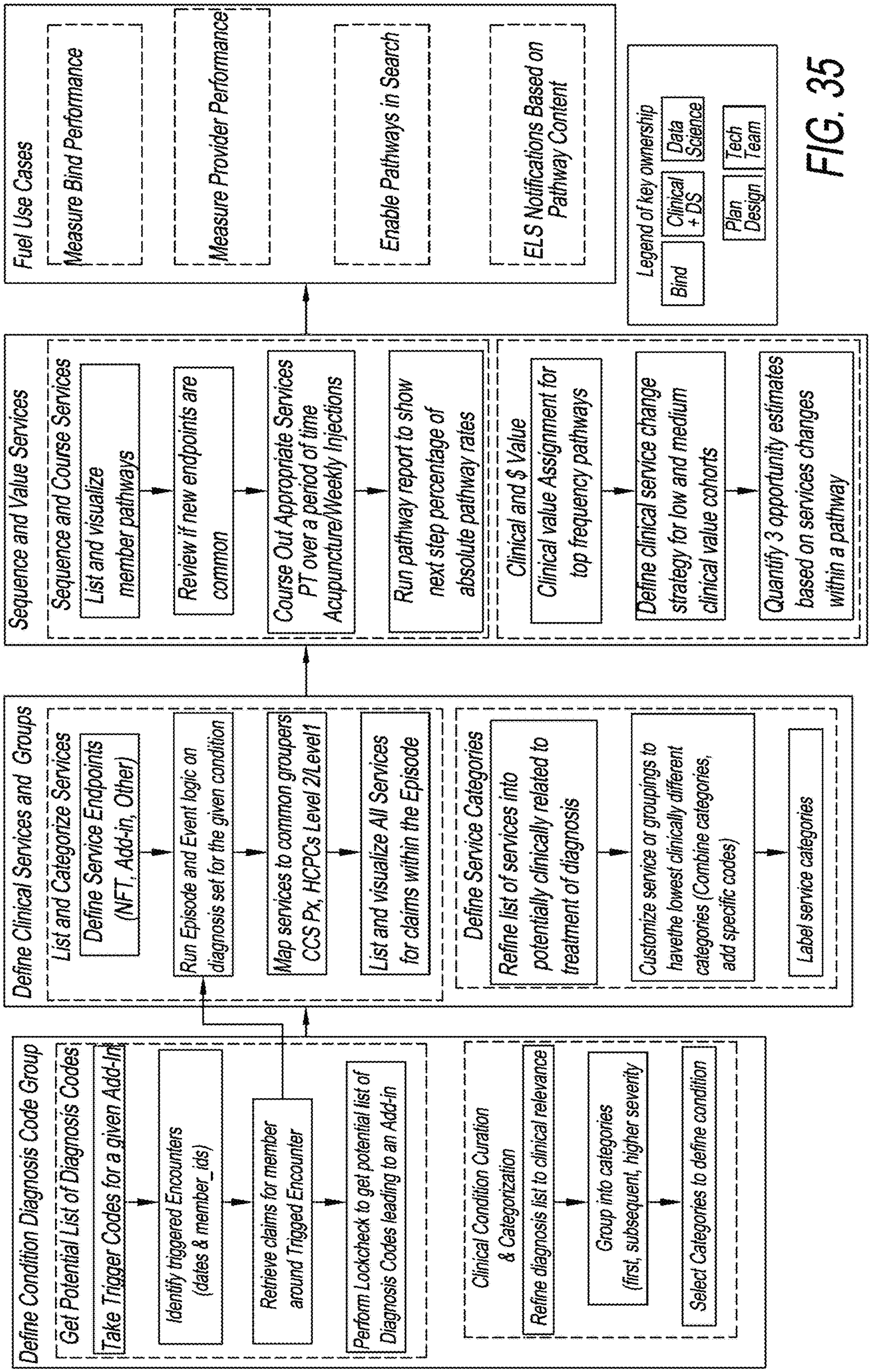
FIG. 35 shows an exemplary architecture for the UDRCD.

FIG. 35 shows an exemplary architecture for the UDRCD. In FIG. 35, embodiments of a treatment pathway analytic engine are illustrated. In one embodiment, condition diagnosis code group may be defined. This may involve getting potential list of diagnosis codes, and clinical condition curation and categorization. Getting potential list of diagnosis codes may involve taking trigger codes for a given add-in, identifying triggered encounters (e.g., dates and member identifiers), retrieving claims for member around triggered encounter, performing lookback to get potential list of diagnosis codes leading to an add-in, and summarizing diagnosis to add-in data. Clinical condition curation and categorization may involve refining diagnosis list to clinical relevance, refining the list of first clinical trigger diagnosis, grouping into categories (e.g., first, subsequent, higher severity), and selecting categories to define condition.

In one embodiment, clinical services and groups may be defined. This may involve listing and categorizing services, and defining service categories. Listing and categorizing services may involve defining service endpoints (e.g., NFT, add-in, other), running episode and event logic on diagnosis set for the given condition, mapping services to common groupers (e.g., CCS Px, HCPCs Level 2/Level 1), and listing and/or visualizing services for claims within the episode. Defining service categories may involve refining list of services into potentially clinically related to treatment of diagnosis, customizing service groupings to have the fewest clinically different categories (e.g., combine categories, add specific codes), and labeling service categories.

In one embodiment, services may be sequenced and valued. This may involve sequencing and coursing services, and evaluating clinical and fiscal values. Sequencing and coursing services may involve listing and/or visualizing member pathways, reviewing if new endpoints are common, coursing out appropriate services (e.g., physical therapy) over a period of time (e.g., acupuncture/weekly injections), and running a pathway report to show next step percentage of absolute pathway rates. Evaluating clinical and fiscal values may involve clinical value assignment for top frequency pathways, clinical value percentage reporting, defining clinical service change strategy for low and medium clinical value cohorts, and quantifying fiscal opportunity estimates based on services changes within a pathway.

In various embodiments, utilizing the treatment pathway analytic engine may facilitate use cases such as measuring UDRCD performance, measuring provider performance, enabling pathways in search, ELS notifications based on pathway content, and/or the like.

Figure 36:
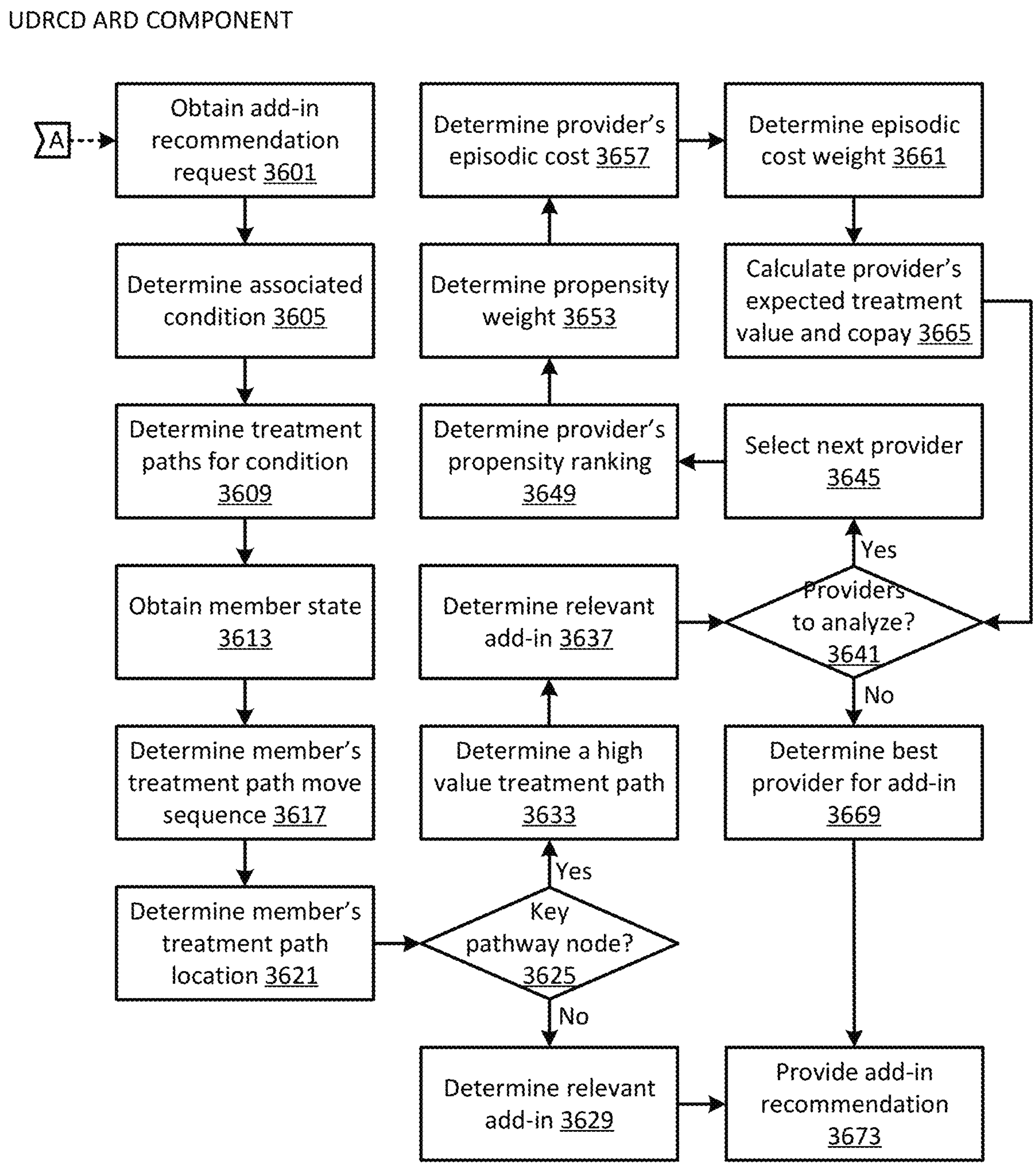
FIG. 36 shows a logic flow diagram illustrating embodiments of an add-in recommendation determining (ARD) component for the UDRCD.

FIG. 36 shows a logic flow diagram illustrating embodiments of an add-in recommendation determining (ARD) component for the UDRCD. In FIG. 36, an add-in recommendation request may be obtained at 3601. For example, the add-in recommendation request may be obtained from the UF component.

A condition associated with the add-in recommendation request may be determined at 3605. In one implementation, the add-in recommendation request may be parsed (e.g., using PHP commands) to determine the associated condition. For example, a condition identifier (e.g., ID_condition_knee_pain) may be determined.

Treatment paths for the condition may be determined at 3609. In one embodiment, the treatment paths may identify various (e.g., high frequency) pathways that are utilized to treat the condition, whether a pathway is high value, medium value or low value (e.g., based on the cost and clinical outcome associated with the pathway), key pathway nodes where members select between different treatments and/or providers, and/or the like. In one implementation, the treatment paths may be determined via a MySQL database command similar to the following:

```
SELECT conditionTreatmentPaths
FROM ACGS
WHERE ACG_ID=ID_ACG_1 AND
  ConditionID=ID_condition_knee_pain;
```

Member state of a member associated with the add-in recommendation request may be determined at 3613. In one implementation, the add-in recommendation request may be parsed (e.g., using PHP commands) to determine the associated member (e.g., ID_member_1), and the member state of the member may be determined via a MySQL database command similar to the following:

```
SELECT memberState
FROM members
WHERE memberID=ID_member_1;
```

The member's treatment path move sequence may be determined at 3617 and the member's treatment path location may be determined at 3621. In one implementation, the member state (e.g., the member's claim history based on X12 837 health care claims) may be analyzed with regard to the treatment paths (e.g., compared to the treatment paths for the condition) to determine the member's treatment path move sequence and the member's treatment path location.

A determination may be made at 3625 whether the member's treatment path move sequence and/or the member's treatment path location indicate that the member is at a key pathway node. For example, this determination may be made based on whether the treatment path node associated with the member's treatment path location is marked as a key pathway node.

If the member is not at a key pathway node, a relevant add-in for the member may be determined at 3629. In one implementation, add-ins available to the member may be analyzed to determine a relevant add-in for the next treatment that the member is likely to utilize based on the member's treatment path move sequence and/or the member's treatment path location. In another implementation, add-ins available to the member may be analyzed to determine a relevant condition add-in that covers the condition. An add-in recommendation with the relevant add-in may be provided at 3673. For example, the add-in recommendation may be provided to the UF component.

If the member is at a key pathway node, a high value treatment path for the member may be determined at 3633. In one implementation, available treatment paths that the member may take from the member's treatment path location may be determined (e.g., based on available treatment paths and the configuration of the member's ODHI plan) and a high value treatment path for the member may be selected.

A relevant add-in for the member may be determined at 3637. In one implementation, add-ins available to the member may be analyzed to determine a relevant add-in for the next treatment that the member should utilize to follow the selected high value treatment path from the member's treatment path location. In another implementation, add-ins available to the member may be analyzed to determine a relevant condition add-in that covers the condition.

A determination may be made at 3641, whether there remain providers to analyze. In one implementation, each of the providers or provider networks available for the relevant add-in (e.g., each provider that treats the condition and offers the next treatment) may be analyzed. If there remain providers to analyze, the next available provider or provider network may be selected for analysis at 3645.

The selected provider's propensity ranking with regard to the key pathway node may be determined at 3649. In one embodiment, a propensity ranking may be calculated based on a set of probabilities that indicate the frequency with which a provider utilizes each of the available (e.g., high frequency) treatment paths, and expected treatment cost associated with each treatment path (e.g., calculated based on expected episodic cost of each treatment in a treatment path). In one implementation, the selected provider's practice patterns data may be analyzed to determine how likely the selected provider is to utilize each of the (e.g., high frequency) treatment paths that the member may take from the member's treatment path location. The expected treatment cost associated with each treatment path may be calculated as the sum of expected episodic costs of treatments in a treatment path. The selected provider's propensity ranking may be calculated as a weighted average of the expected treatment costs for the available treatment paths weighted by the likelihood that the selected provider is going to utilize each respective available treatment path.

Propensity weight may be determined at 3653. In one implementation, the propensity weight may be determined based on the level of influence the key pathway node has on the treatment path options for the condition and/or the level of variance in expected cost and/or outcomes that have been identified for each of the treatment paths downstream from the key pathway node.

The selected provider's expected episodic cost for the next treatment may be determined at 3657. In one embodiment, the episode of care may include the primary encounter for the next treatment. In another embodiment, the episode of care may include a pre and/or post window (e.g., 30 days prior to the primary encounter for the next treatment through 90 days after the primary encounter for the next treatment). In one implementation, the selected provider's treatment cost data may be analyzed to determine the selected provider's expected episodic cost for the next treatment.

Episodic cost weight with regard to the key pathway node may be determined at 3661. In one implementation, the episodic cost weight may be determined depending on which node the key pathway node makes up on a treatment path and/or how far down a path it is. For example, a node that is closer to the end of a treatment path may have a higher episodic cost weight, whereas an earlier node may have a higher propensity weight.

The selected provider's expected longitudinal treatment value and copay may be calculated at 3665. In one embodiment, the expected longitudinal treatment value accounts for how the cost and/or outcomes for the condition can vary based on the provider that is providing the treatment for the condition. For example, the calculation of the expected longitudinal treatment value may include: frequency with which the provider utilizes high value treatment paths and treatment options, the cost of an episode of care, initiatives targeted at reducing administrative waste between the ODHI plan and the provider (e.g., reducing the need for prior authorizations), clinical data and workflow integrations (e.g., mutually agreed upon prompts in physicians' clinical decision support tools that support the use of high-value treatment paths, scheduling integrations that create an enhanced member experience and the collection and use of patient reported outcomes measures to better understand the efficacy of treatments for the condition), guarantees or warranties offered by the provider on its treatments (e.g., based on the expected reduction in low-value treatment options and the expected frequency with which those low-value treatments are expected to persist combined with the amount the provider will reimburse the plan sponsor if one of those low-value treatment options occurs), and/or the like. In one implementation, the expected longitudinal treatment value may be calculated as a weighted average of the selected provider's propensity ranking and the expected episodic cost for the next treatment weighted by their respective weights. In one embodiment, the copay for the member to utilize the relevant add-in may be determined. In one implementation, the copay may be a base copay calculated based on the average longitudinal treatment value for providers in the region associated with the member. In another implementation, the copay may be a smart copay (e.g., a smart copay varies in cost to the member based on the provider that provides treatment) that may be calculated by adjusting the base copay based on the expected longitudinal treatment value. For example, the lower the expected longitudinal treatment value for the provider (e.g., as compared with the average longitudinal treatment value for providers in the region), the lower the smart copay for the provider. See FIGS. 45A-B for an example of how a copay may be calculated.

In some alternative embodiments, propensity ranks, propensity weights, episodic costs, episodic cost weights, expected longitudinal treatment values, and/or the like may be recursively calculated for each node for each of the treatment paths downstream from the key pathway node, and utilized to calculate the expected longitudinal treatment value for the key pathway node.

In some alternative embodiments, the copay and/or other add-in costs to the member may be adjusted based on the member state (e.g., to steer members toward treatment paths with high clinical value). In one implementation, the member may receive a treatment path progression discount on the relevant add-in if the member already utilized a more conservative treatment. See FIG. 37 for an example of how a treatment path progression discount may be offered. In another implementation, the member may receive a condition-based discount (e.g., a discount offered if the member has a certain medical condition) on the relevant add-in. See FIG. 41 for an example of how a condition-based discount may be offered.

If there are no more providers to analyze, the best provider for the relevant add-in may be determined at 3669. In one implementation, the best provider for the relevant add-in may be the provider with the lowest expected longitudinal treatment value. For example, the best provider may have the lowest smart copay (e.g., to steer members toward a provider that is likely to use treatment paths with high clinical value).

An add-in recommendation with the relevant add-in with services to be provided by the best provider may be provided at 3673. For example, the add-in recommendation may be provided to the UF component.

Figure 37:
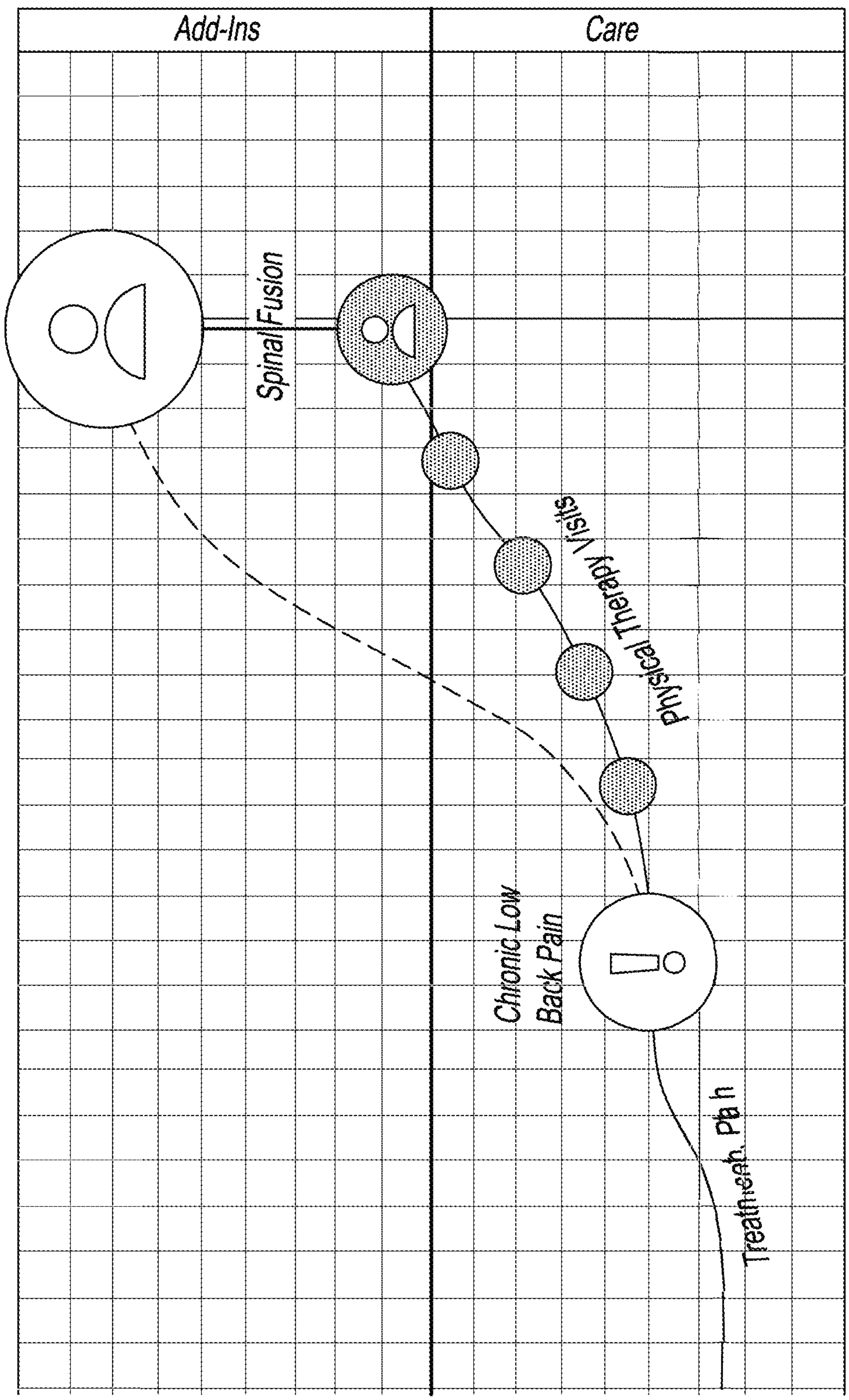
FIG. 37 shows a screenshot diagram illustrating embodiments of the UDRCD.

FIG. 37 shows a screenshot diagram illustrating embodiments of the UDRCD. In FIG. 37, treatment pathways available to a member to treat a chronic low back pain condition (e.g., spinal stenosis) are illustrated. There are several treatment paths available to the member to treat spinal stenosis. If the member chooses a low value treatment path of immediately pursuing spinal fusion, the member may purchase a spinal fusion add-in. However, if the member chooses a high value treatment path of first trying physical therapy and then pursuing spinal fusion if surgery is still required, the member may get a discount when purchasing the spinal fusion add-in. A provider's expected longitudinal treatment value and copay (e.g., for an add-in that covers chronic low back pain) may depend on the provider's propensity to utilize each of the available treatment paths.

Figure 38:
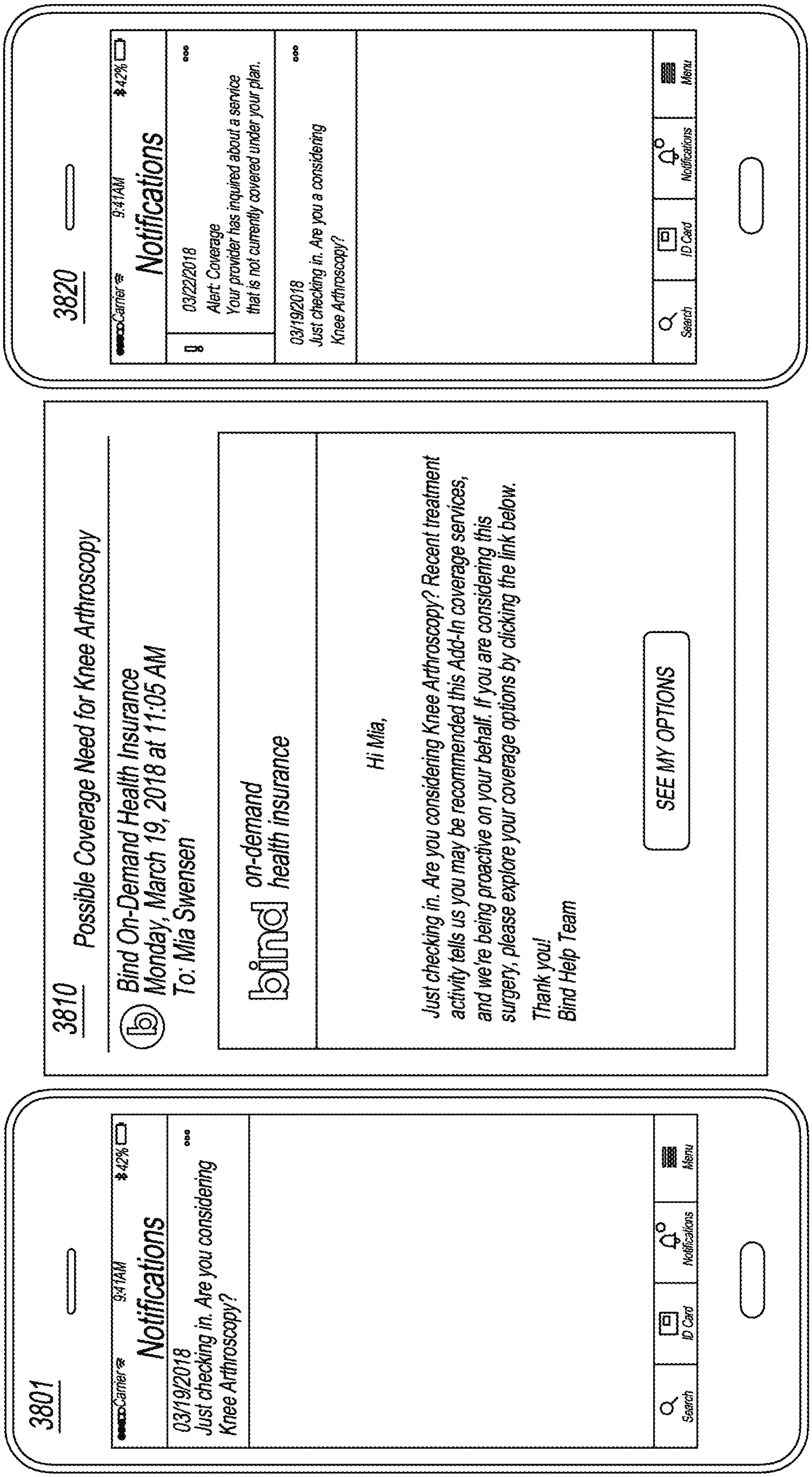
FIG. 38 shows a screenshot diagram illustrating embodiments of the UDRCD.

FIG. 38 shows a screenshot diagram illustrating embodiments of the UDRCD. In FIG. 38, an exemplary ELS implementation case is shown. Screen 3801 shows that when a plan member visits an orthopedic surgeon, the ELS may utilize information regarding the visit (e.g., 837 claim data) and/or other member state data to determine that the Knee Arthroscopy add-in should be recommended to the member. Accordingly, a notification may be sent to the member to inform the member regarding the recommended add-in. In one implementation, the member may click on the notification to view additional details. Screen 3810 shows additional details for a notification. For example, the notification may inform the member why the Knee Arthroscopy add-in is recommended. In one implementation, the member may click on the "see my options" button to view additional details regarding the recommended add-in and/or to purchase the recommended add-in. Screen 3820 shows that if the member does not purchase the add-in, the ELS may generate a notification to inform the member if a provider checks for coverage (e.g., to obtain prior authorization before performing surgery) for a service (e.g., Knee Arthroscopy) that is not currently covered by the member's ODHI plan. In one implementation, the member may click on the notification to view additional details.

Figure 39:
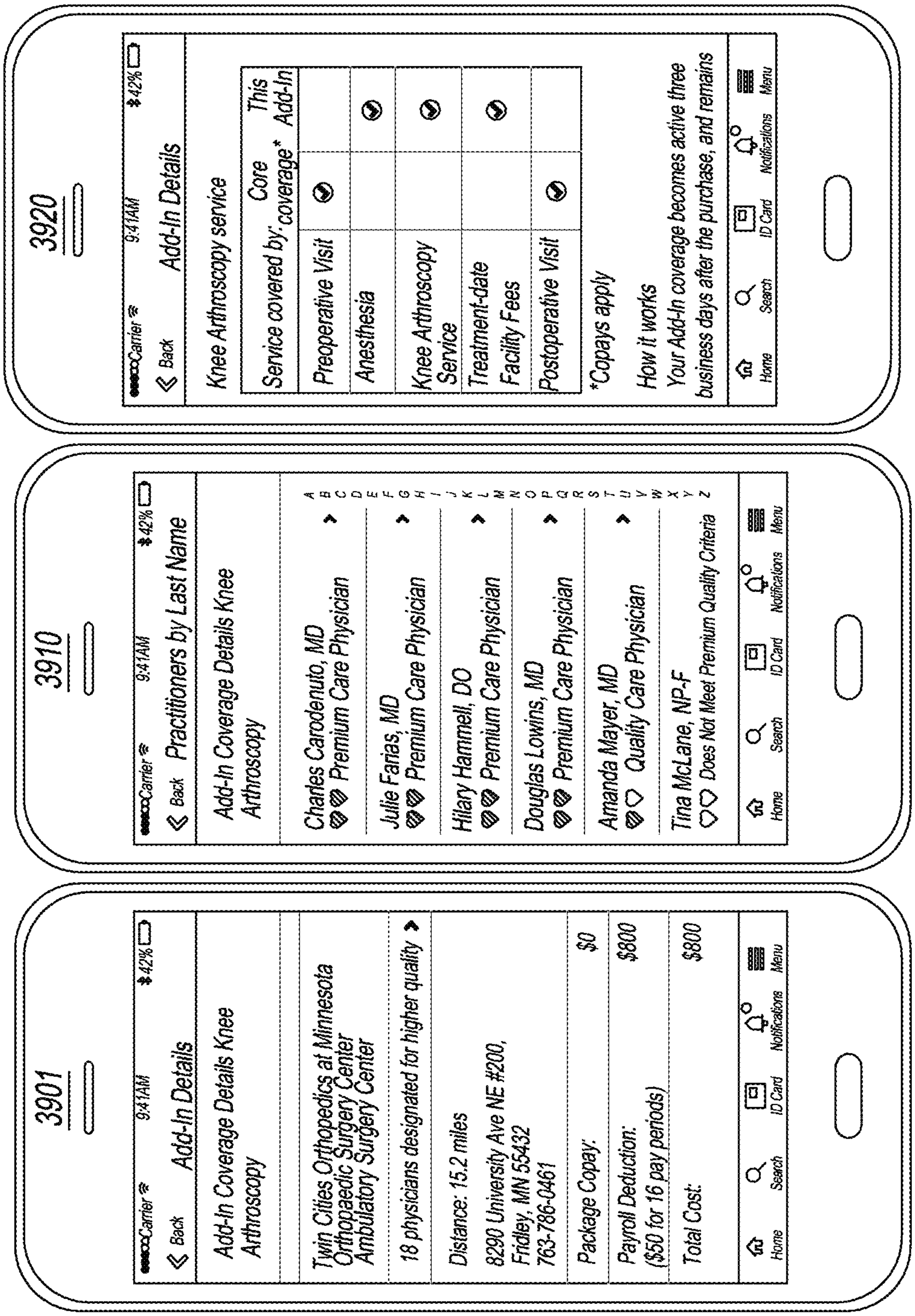
FIG. 39 shows a screenshot diagram illustrating embodiments of the UDRCD.

FIG. 39 shows a screenshot diagram illustrating embodiments of the UDRCD. In FIG. 39, an exemplary user interface (e.g., for a mobile device) for viewing add-in coverage details (e.g., for the Knee Arthroscopy add-in) is shown. Screen 3901 shows that a plan member may view information regarding providers and costs (e.g., payroll deduction, copay) associated with the add-in. Screen 3910 shows that the plan member may view information regarding individual practitioners at a provider (e.g., practitioner specialty, quality rating). Screen 3920 shows that the plan member may view services that the add-in covers (e.g., as compared with core coverage of the member's ODHI plan).

Figure 40:
FIG. 40 shows a screenshot diagram illustrating embodiments of the UDRCD.

FIG. 40 shows a screenshot diagram illustrating embodiments of the UDRCD. In FIG. 40, an exemplary user interface (e.g., for a mobile device) for purchasing an add-in (e.g., for the Knee Arthroscopy add-in) is shown. Screen 4001 shows that a plan member may review add-in coverage details prior to purchasing the add-in. Screen 4010 shows an add-in purchase confirmation that may be provided to the plan member.

Figure 41:
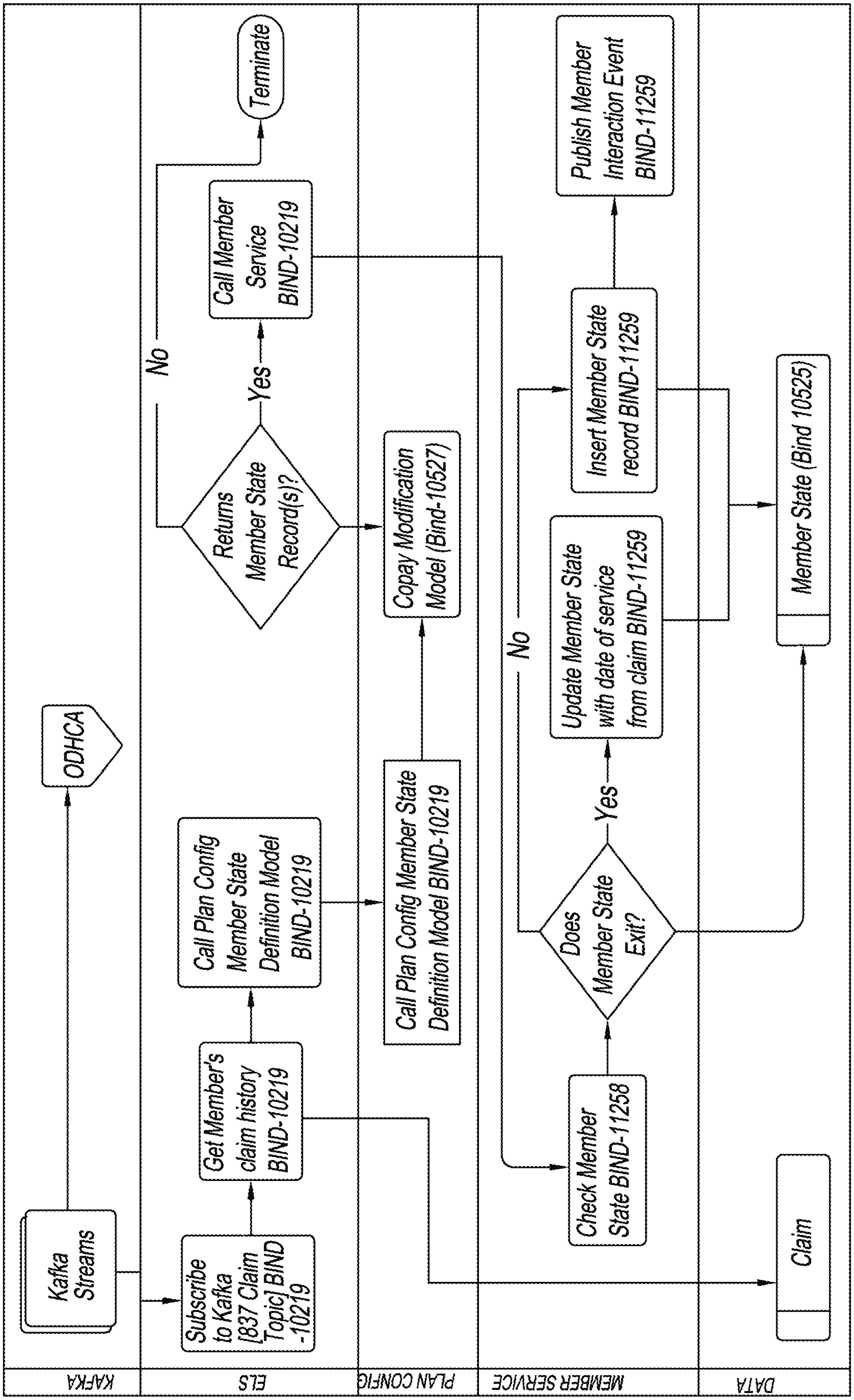
FIG. 41 shows an exemplary architecture for the UDRCD.

FIG. 41 shows an exemplary architecture for the UDRCD. In FIG. 41, Kafka streams (e.g., with X12 837 health care claims) may be provided to the ODHCA component and/or to the ELS. The ELS may analyze (e.g., parse) Kafka data to determine new claims data for a member. The ELS may also determine the member's current member state (e.g., based on the member state definition model for the member's ODHI plan).

In one implementation, a member state may include clinical data, coverage data, preferences data, sociographic data, and/or the like (e.g., over time). For example, clinical data may include clinical state information (e.g., claims, searches, 270/71/78, providers), health trajectory information, the member's location on a treatment pathway, and/or the like. For example, coverage data may include information regarding the member's qualification for contextual coverage (e.g., are there claims to indicate that the member completed steps for qualifying for contextual coverage), and/or the like. For example, preferences data may include offer reaction information (e.g., whether the member accepted or declined previous offers), provider preferences (e.g., the member does not like going to hospitals, the member likes getting care from an out of network provider), systems preferences (e.g., systems that are relevant to the member and/or which the member may be more interested in), and/or the like. For example, sociographic data may include demographic information (e.g., marital status, health literacy, patient activation), lifestyle information (e.g., what the member does, how the member spends time), lifestage information, and/or the like.

The ELS may analyze (e.g., based on the copay modification model for the member's ODHI plan) the new claims data and/or the current member state to determine condition-based discounts for the member. In one embodiment, a condition-based discount may be offered if the member has a certain medical condition (e.g., to help the member manage the medical condition and to avoid poor health outcomes that may arise from not treating the medical condition). For example, if the member has diabetes, a condition-based discount may be offered on visits to qualifying providers and/or on medicines that help manage diabetes. In one implementation, a condition-based discount may be a reduction in copay that the member has to pay. For example, a condition-based discount may be determined as follows:

Condition-Based Discount for Diabetes

IF:
Member State: If Dx in (x, y, z) OR Rx in (A, B)
and Provider Attribute=x
and Provider: PD in (A, B)
and Provider: Specialty in (x, y, z)
THEN:
$10 off for coverage family in (A, B)
e.g., Primary Care and Specialty Care Office Visits: −$10

The ELS may call a member service, which may determine whether a member state already exists for the member. If the member state exists, the current member state may be updated with the new claims data. If the member state does not exist, a new member state record based on the new claims data may be inserted. A member interaction event may be published to inform other components about the updated member state for the member.

Figure 42:
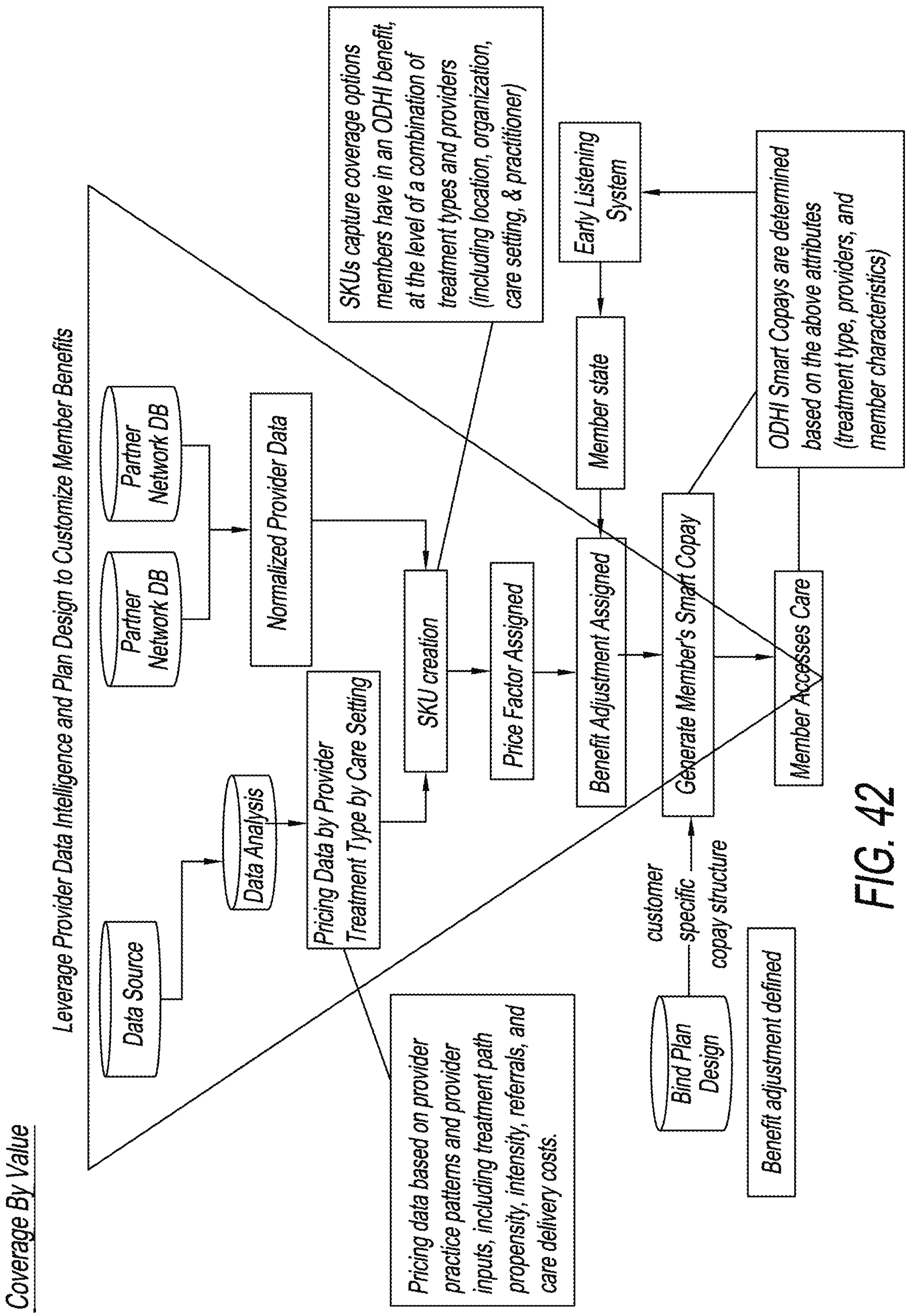
FIG. 42 shows an exemplary architecture for the UDRCD.

FIG. 42 shows an exemplary architecture for the UDRCD. In FIG. 42, embodiments of how smart copays may be generated for a plan member are illustrated. In one implementation, information regarding providers may be obtained from partner network databases and normalized. For example, each partner network may provider information regarding participating providers. In one implementation, information from a variety of data sources may be analyzed to determine pricing data by provider by treatment type by care setting. For example, pricing data may be determined based on provider practice patterns and provider inputs (e.g., treatment path propensity, intensity, referrals, care delivery costs). The normalized provider data and/or the pricing data may be utilized for SKU creation. In one embodiment, SKUs capture coverage options members have in an ODHI plan, at the level of a combination of treatment types and providers (e.g., including location, organization, care setting, practitioner, etc.).

Each SKU may be assigned a price factor. In one implementation, the price factor may indicate how to price a treatment offered by a provider (e.g., based on the provider's pricing data as compared with the pricing data for providers in a region) as compared with the average price for the treatment (e.g., in the region).

A benefit adjustment for the member for each SKU may be determined based on the member's member state. In various implementations, a treatment path progression discount, a condition-based discount, and/or the like may be utilized to determine the benefit adjustment for the member.

Information regarding the member's ODHI plan (e.g., the copay structure specific to the member) may be utilized to generate a smart copay for the member for each SKU. In one implementation, smart copays may be determined based on attributes such as treatment type, providers, member characteristics, and/or the like.

Information regarding how the member accesses care (e.g., based on X12 837 health care claims) may be provided to the ELS. In one implementation, the ELS may facilitate updating the member's member state based on such information.

Figure 43:
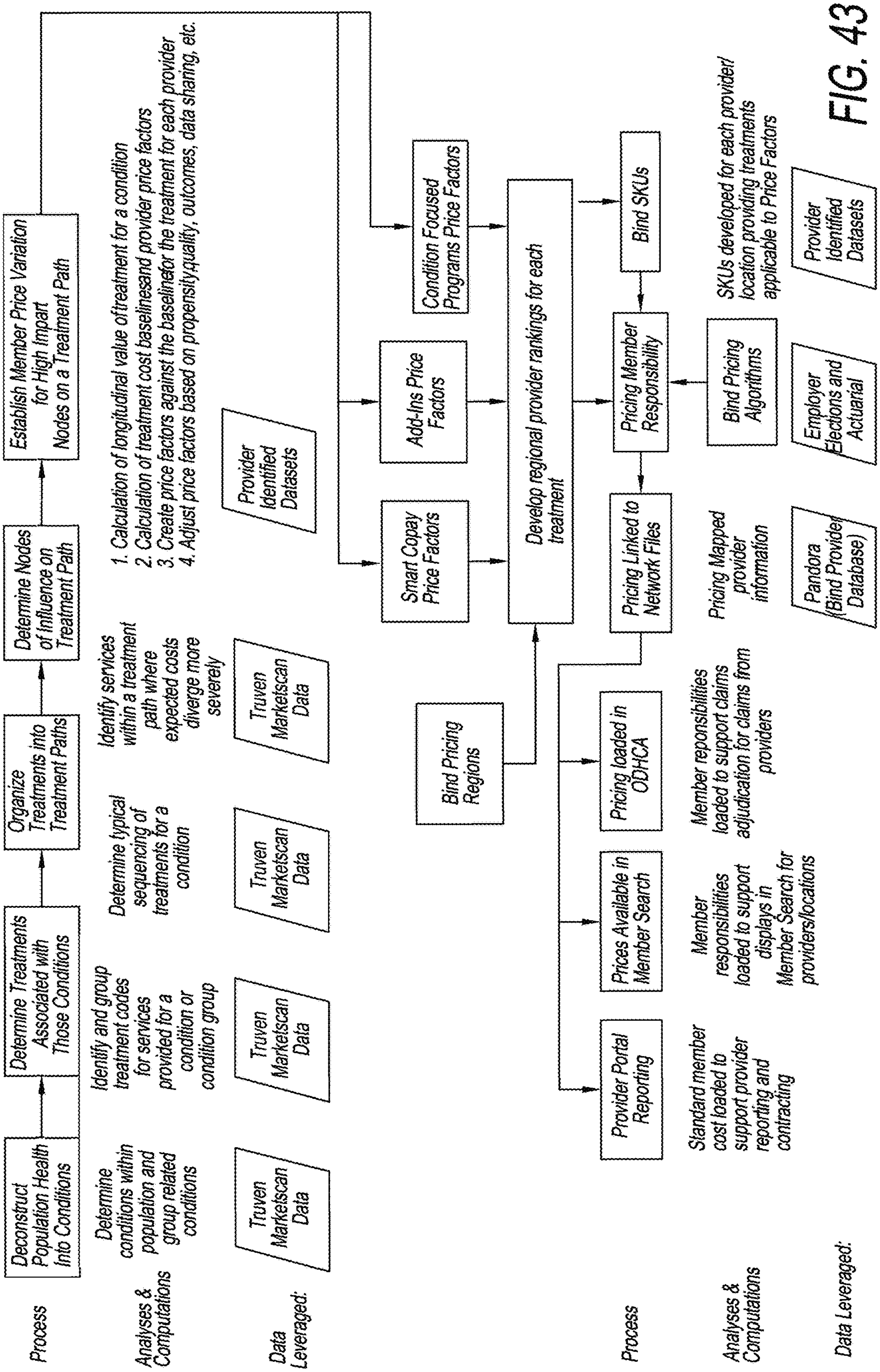
FIG. 43 shows an exemplary architecture for the UDRCD.

FIG. 43 shows an exemplary architecture for the UDRCD. In FIG. 43, embodiments of how pricing data may be generated and/or utilized by various UDRCD components are illustrated. In one implementation, population health may be deconstructed into conditions. For example, this may involve determining conditions within population and/or grouping related conditions. Treatments associated with the conditions may be determined. For example, this may involve identifying and/or grouping treatment codes for services provided for a condition or condition group. Treatments may be organized into treatment paths. For example, this may involve determining typical sequencing of treatments for the conditions. Nodes of influence of treatment paths may be determined. For example, this may involve identifying services with a treatment path where expected costs diverge more severely.

Member price variation for high impact nodes (e.g., nodes of influence) on a treatment path may be established. In one implementation, this may involve calculating longitudinal value of treatments for a condition, calculating treatment cost baselines and/or provider price factors, creating price factors against the baseline for the treatment for each provider, adjusting price factors based on propensity, quality, outcomes, data sharing, etc., and/or the like. For example, price factors may include smart copay price factors, add-ins price factors, condition-based programs price factors, and/or the like.

Regional provider rankings may be developed for various pricing regions and utilized along with conditions data, treatments data, price factors, and/or the like to develop SKU's for each provider and/or location providing treatments applicable to price factors. Member responsibility pricing may be determined for the SKU's (e.g., based on employer elections for an ODHI plan, actuarial data, and/or the like). Member responsibility pricing may be linked to network files (e.g., mapped to provider information). See FIGS. 71-92 for additional details regarding developing regional provider rankings and determining pricing.

Member responsibility pricing may be provided to various UDRCD components. In one implementation, member responsibility pricing may be loaded in ODHCA (e.g., to support claims adjudication for claims from providers). In another implementation, member responsibility pricing may be made available in member search (e.g., to support providing pricing information for providers and/or locations in member coverage search). In another implementation, member cost data may be loaded in provider portal reporting (e.g., to support provider reporting and/or contracting).

Figure 44:
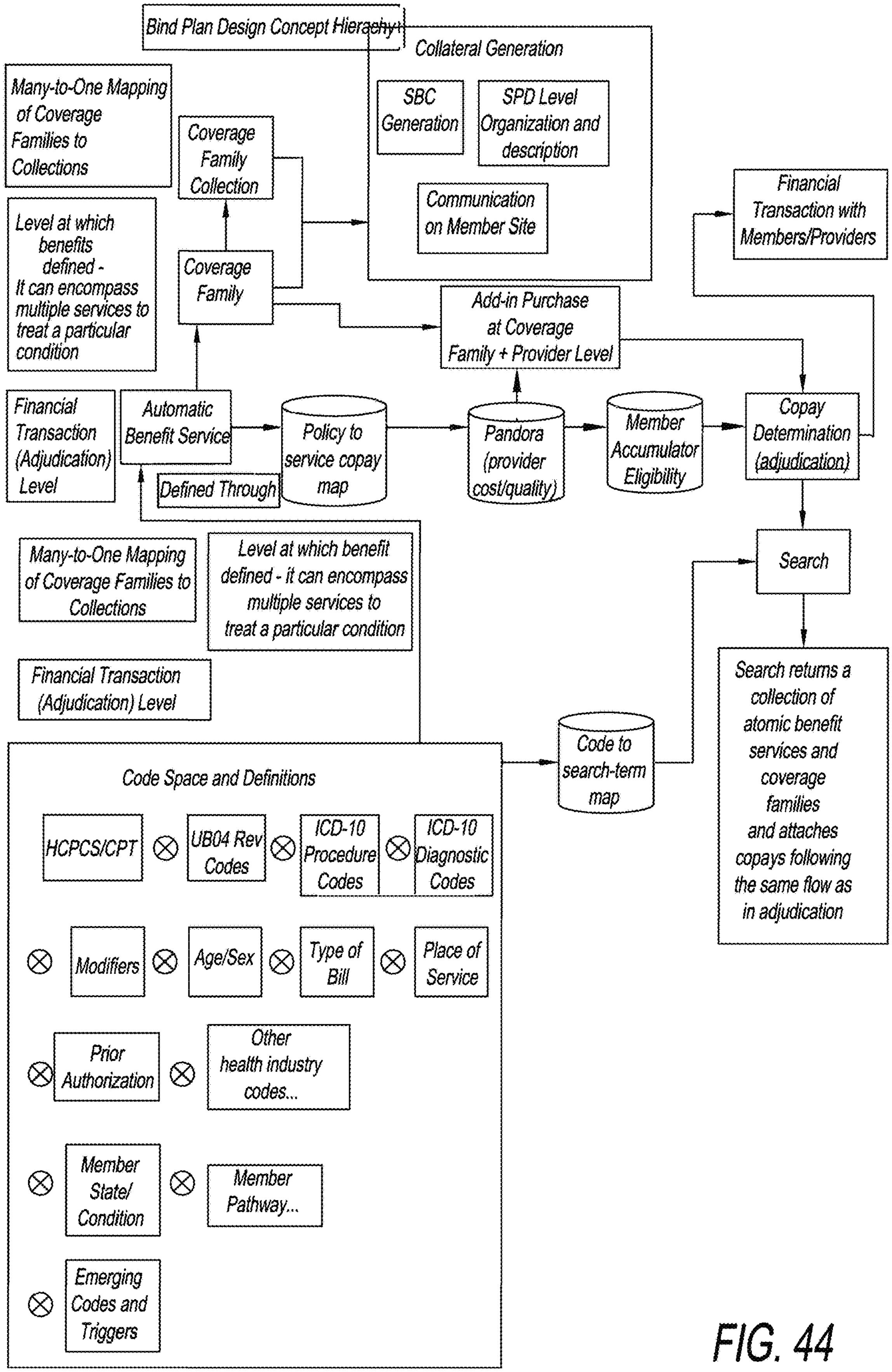
FIG. 44 shows an exemplary architecture for the UDRCD.

FIG. 44 shows an exemplary architecture for the UDRCD. In FIG. 44, embodiments of ODHI plan design hierarchy are illustrated. In one implementation, cost space and definitions (e.g., HCPCS/CPT, UB04 rev codes, ICD-10 procedure codes, ICD-10 diagnosis codes, modifiers, age/sex, type of bill, place of service, prior authorization, other health industry codes, member state/condition, member pathway, emerging codes and triggers, etc.) may be utilized to define atomic benefit services, coverage families, coverage family collections, and/or the like. Add-in purchases may be defined at coverage family and/or provider levels. Copays for atomic benefit services and/or add-ins may be determined (e.g., adjudication) and utilized to process financial transactions with members and/or providers. A code to search term map and copays may be utilized in member search (e.g., a search may return a collection of atomic benefit services and/or coverage families with copays).

Figure 45A:
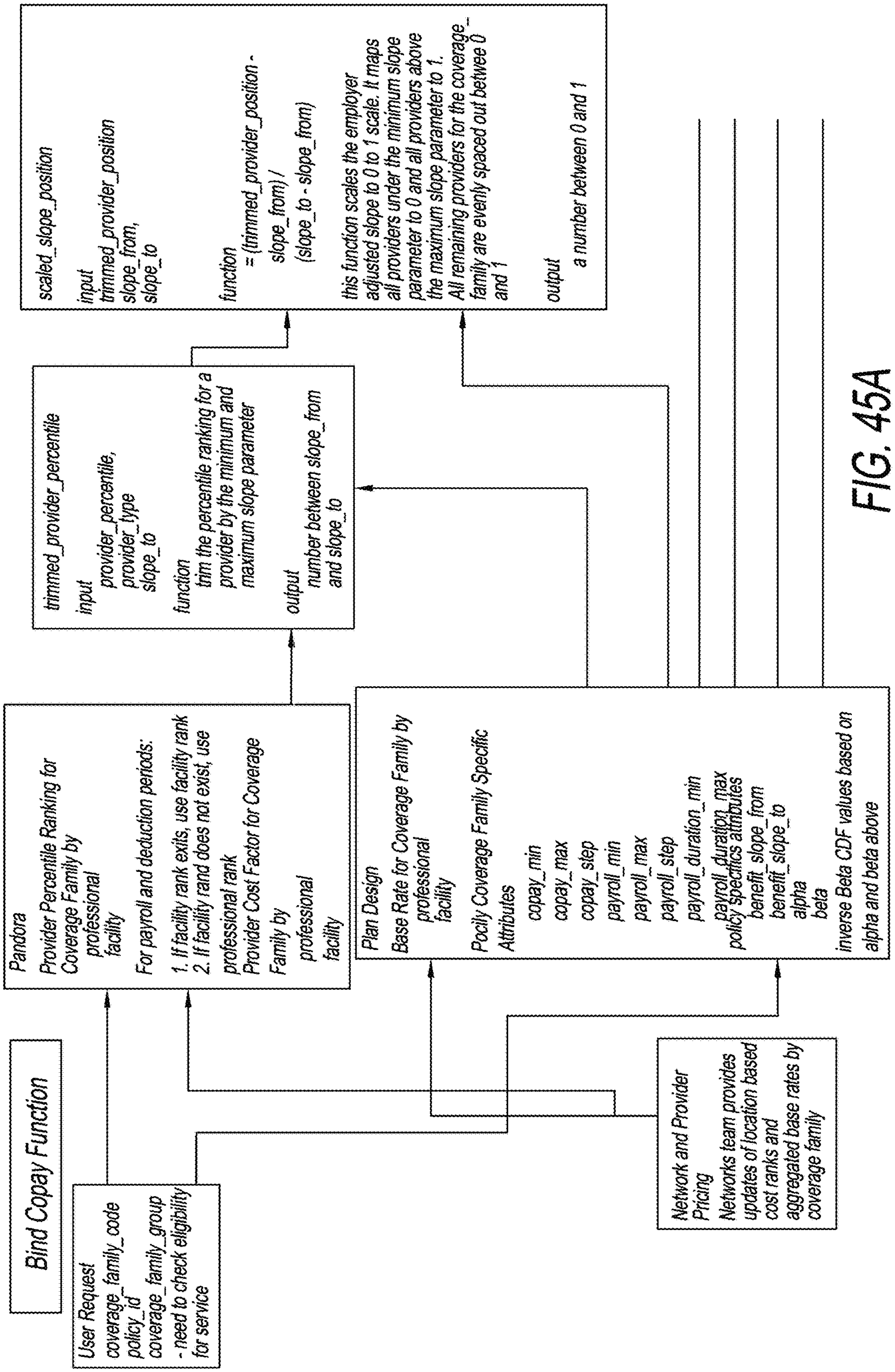
FIGS. 45A-B show an exemplary architecture for the UDRCD.
Figure 45B:
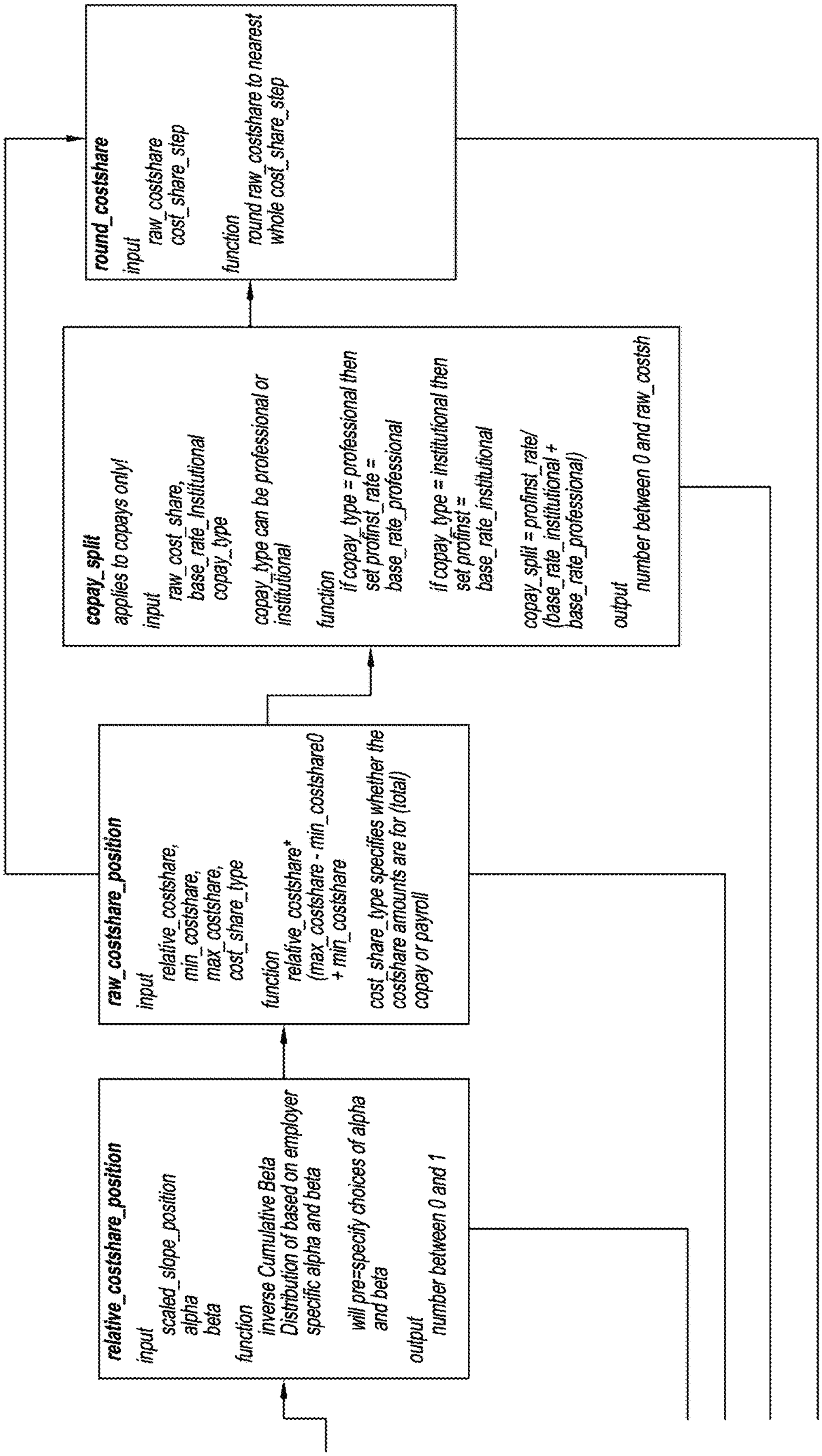

FIGS. 45A-B show an exemplary architecture for the UDRCD. In FIGS. 45A-B, embodiments of an exemplary copay determining function are illustrated. In one embodiment, copay may be determined based on a request from a user (e.g., when a user conducts a coverage search). In another embodiment, copay may be determined based on a request from the ELS (e.g., when the ELS recommends an add-in to a user). In one implementation, user request parameters may be analyzed to determine specified coverage (e.g., based on coverage family code and/or coverage family group) for which copay should be determined. Provider rankings (e.g., percentile rankings) and/or cost factors (e.g., by professional, by facility) for the specified coverage may be determined based on network and provider pricing data. In one implementation, user request parameters may be analyzed to determine a policy identifier of the user's ODHI plan. Plan design data (e.g., policy coverage family specific attributes, policy specific attributes) associated with the user's ODHI plan may be determined. For example, inverse beta cumulative distribution function (CDF) values may be determined based on alpha and beta.

In one implementation, providers' percentile rankings may be trimmed by the minimum and/or maximum slope parameters. The trimmed percentile rankings may be scaled to determine scaled slope positions (e.g., between 0 and 1). For example, providers under the minimum slope parameter may be mapped to 0, providers above the maximum slope parameter may be mapped to 1, and the remaining providers for the coverage family may be evenly spaced out between 0 and 1.

In one implementation, providers' relative cost share positions may be determined based on the scaled slope positions using inverse cumulative beta distribution and employer specific alpha and beta. The relative cost share positions may be used to determine raw cost share positions for providers. For example, cost share amounts may be determined for (e.g., total) copay or payroll based on the cost share type. The raw cost share positions may be analyzed to determine copay split (e.g., a number between 0 and raw cost share) for professionals and/or institutions. The raw cost share positions may be rounded (e.g., to the nearest whole cost share step) and provided to the requestor.

Figure 46:
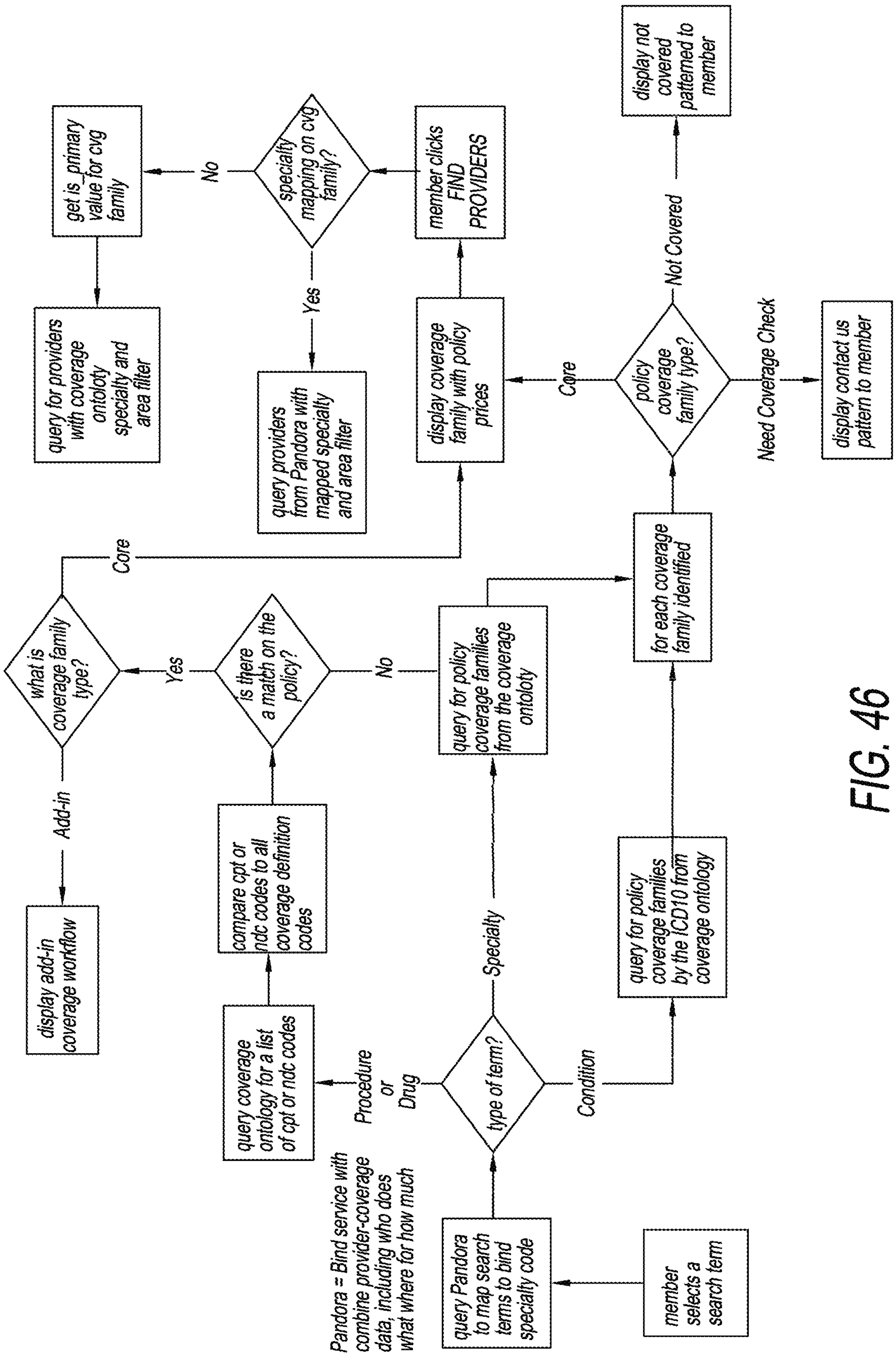
FIG. 46 shows an exemplary architecture for the UDRCD.

FIG. 46 shows an exemplary architecture for the UDRCD. In FIG. 46, embodiments of how a search (e.g., an "Is it covered?" search) may be handled are illustrated. In one embodiment, a member may select a search term (e.g., for a condition, for a procedure, for a drug, for a specialty). In one implementation, the search term may be mapped to a specialty code (e.g., using Pandora service that provides combined provider-coverage data such as who (e.g., provider) does what (e.g., treatment) where (e.g., facility) for how much).

If the member searched for a procedure or drug, coverage ontology may be queried and compared to coverage definition codes of the member's ODHI plan to determine whether the policy covers the procedure or drug. If so, information regarding the add-in or core coverage may be provided to the member. Information regarding available providers may also be provided to the member (e.g., when the member clicks "find providers").

For other search terms, coverage families may be identified from coverage ontology, and, for each identified coverage family, coverage information may be provided. If the member's ODHI plan provides core coverage, information regarding available providers may be provided to the member. If the member's ODHI plan does not provide core coverage but add-in coverage is available, information regarding purchasing a relevant add-in may be provided to the member.

Figure 47:
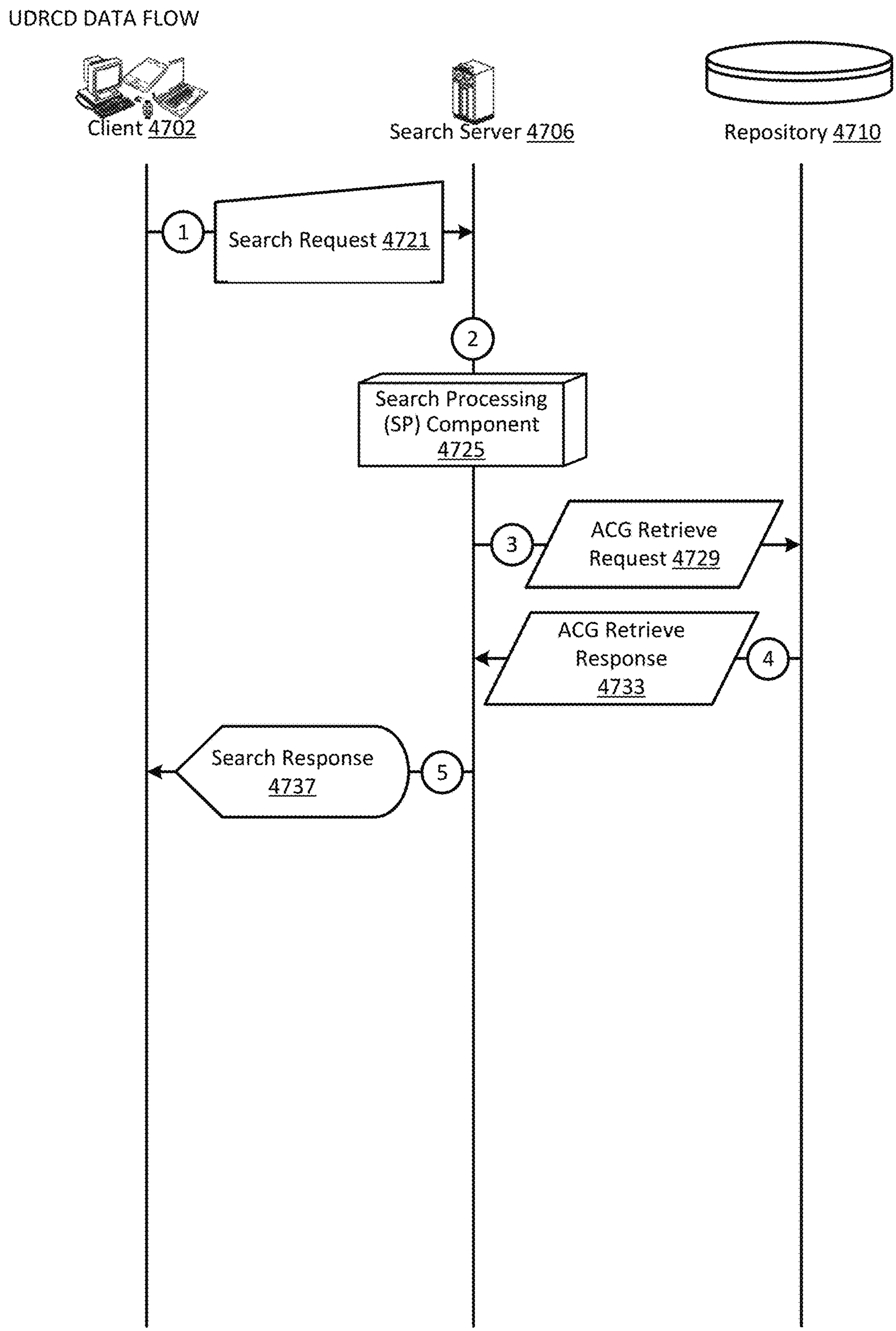
FIG. 47 shows a datagraph diagram illustrating embodiments of a data flow for the UDRCD.

FIG. 47 shows a datagraph diagram illustrating embodiments of a data flow for the UDRCD. In FIG. 47, a client 4702 may send a search request 4721 to a search server 4706. For example, the search request may be a plan member's coverage search (e.g., "Is it covered?" search) for a service, condition, specialty, treatment (e.g., procedure), drug, and/or the like. In one embodiment, the client may provide the following example search request, substantially in the form of a HTTP(S) POST message including XML-formatted data, as provided below:

```
POST/search_request.php HTTP/1.1
Host: www.server.com
Content-Type: Application/XML
Content-Length: 667
<? XML version="1.0" encoding="UTF-8"?>
<search_request>
  <user_accounts_details>
    <user_name>ID_user_1</user_name>
    . . .
  </user_accounts_details>
  <search_query>Knee Arthroscopy using United Hospital</search_query>
</search_request>
```

A search processing (SP) component 4725 may utilize data provided in the search request to provide search results for the plan member. See FIG. 48 for additional details regarding the SP component.

The search server may send an atomized coverage graph (ACG) retrieve request 4729 to a repository 4710 to obtain ACG data and/or related data (e.g., plan member data). In one implementation, the ACG retrieve request may include data such as a request identifier, an ACG identifier, a plan member identifier, requested data specification, and/or the like. In one embodiment, the search server may provide the following example ACG retrieve request, substantially in the form of a HTTP(S) POST message including XML-formatted data, as provided below:

```
POST/ACG_retrieve_request.php HTTP/1.1
Host: www.server.com
Content-Type: Application/XML
Content-Length: 667
<? XML version="1.0" encoding="UTF-8"?>
<ACG_retrieve_request>
  <request_identifier>ID_request_21</request_identifier>
  <ACG_identifier>ID_ACG_1</ACG_identifier>
  <user_name>ID_user_1</user_name>
  <requested_data>
    graph action data for Knee Arthroscopy, plan member data
  </requested_data>
</ACG_retrieve_request>
```

The repository may send an ACG retrieve response 4733 to the search server to provide the search server with the requested ACG data and/or related data (e.g., plan member data). In one implementation, the ACG retrieve response may include data such as a response identifier, the requested data, and/or the like. In one embodiment, the repository may provide the following example ACG retrieve response, substantially in the form of a HTTP(S) POST message including XML-formatted data, as provided below:

```
POST /ACG_retrieve_response.php HTTP/1.1
Host: www.server.com
Content-Type: Application/XML
Content-Length: 667
<?XML version = "1.0" encoding = "UTF-8"?>
<ACG_retrieve_response>
  <response_identifier>ID_response_21</response_identifier>
  <requested_data>
    <condition>
      <condition_identifier>ID_condition_knee_pain</condition_identifier>
      <treatments>
        ID_treatment_arthroscopy, ID_treatment_injection,
        ID_treatment_physical_therapy
      </treatments>
    </condition>
    <treatment>
      <treatment_identifier>ID_treatment_arthroscopy</treatment_identifier>
      <condition>ID_condition_knee_pain</condition>
      <providers>providers determined based on a SQL query</providers>
    </treatment>
    <treatment>
      <treatment_identifier>ID_treatment_injection</treatment_identifier>
      <condition>ID_condition_knee_pain</condition>
      <providers>ID_provider_1, ID_provider_2</providers>
    </treatment>
    <treatment>
      <treatment_identifier>
        ID_treatment_physical_therapy
      </treatment_identifier>
      <condition>ID_condition_knee_pain</condition>
      <providers>ID_provider_2, ID_provider_3</providers>
    </treatment>
    <provider>
      <provider_identifier>ID_provider_1</provider_identifier>
      <treatments>
        ID_treatment_injection, ID_treatment_physical_therapy
      </treatments>
      <provider_historical_data>
        historical treatment and/or cost data for provider
      </provider_historical_data>
    </provider>
    <provider_identifier>ID_provider_2</provider_identifier>
```

-continued

```
        <treatments>
          ID_treatment_physical_therapy, ID_treatment_insulin_therapy
        </treatments>
        <provider_historical_data>
          historical treatment and/or cost data for provider
        </provider_historical_data>
      </provider>
      <provider_identifier>ID_provider_3</provider_identifier>
        <treatments>ID_treatment_arthroscopy</treatments>
        <provider_historical_data>
          historical treatment and/or cost data for provider
        </provider_historical_data>
      </provider>
      <member>
        <profile>profile data</profile>
        <plan_configuration>plan configuration data</plan_configuration>
        <member_state>member state data</member_state>
      </member>
    </requested_data>
  </ACG_retrieve_response>
```

The search server may send a search response 4737 to the client to provide the search results to the plan member. For example, the search response may be displayed using a website, application (e.g., a mobile app), and/or the like. The search response may provide coverage information (e.g., whether a treatment is covered, whether alternative treatments are available for a condition, best provider for each treatment, copay amounts, etc.) to the plan member and/or may facilitate purchasing add-ins to obtain additional coverage.

Figure 48:
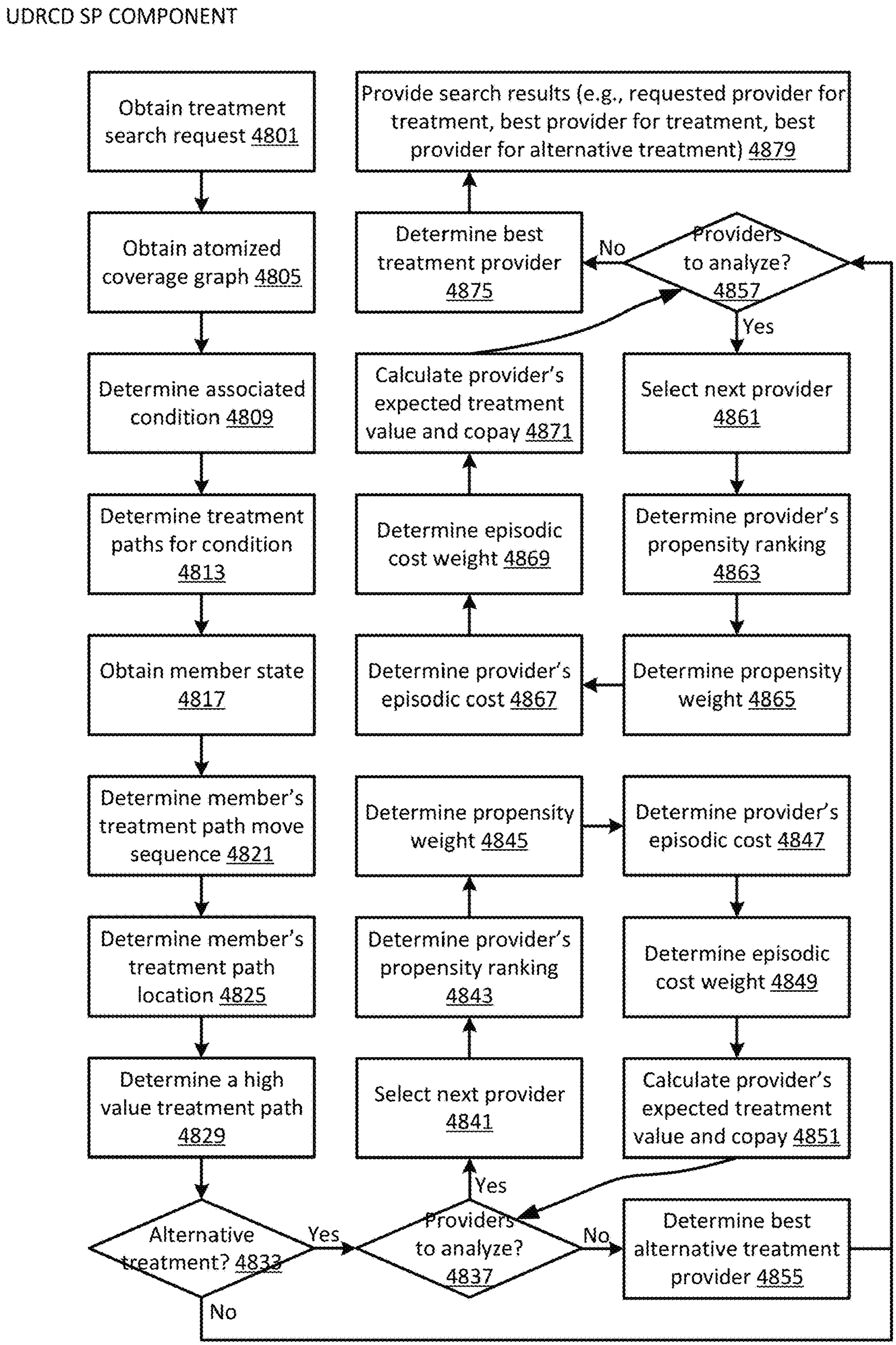
FIG. 48 shows a logic flow diagram illustrating embodiments of a search processing (SP) component for the UDRCD.

FIG. 48 shows a logic flow diagram illustrating embodiments of a search processing (SP) component for the UDRCD. In FIG. 48, a treatment search request may be obtained at 4801. For example, the treatment search request may be obtained as a result of a plan member's coverage search (e.g., an "Is it covered?" search) for a service, condition, specialty, treatment (e.g., procedure), drug, and/or the like.

Atomized coverage graph for the treatment search request may be obtained at 4805. In one implementation, the ACG (e.g., the default ACG) may be obtained via an ACG retrieve request. For example, the ACG may be retrieved via a MySQL database command similar to the following:

```
SELECT ACG_ConditionsData, ACG_TreatmentsData,
    ACG_ProvidersData,
FROM ACGS
WHERE ACG_ID=ID_ACG_1;
```

A condition associated with the treatment search request may be determined at 4809. In one implementation, the treatment search request may be parsed (e.g., using PHP commands) to determine an associated condition specified by the member. For example, a condition identifier (e.g., ID_condition_knee_pain) may be determined based on the member's search query. In another implementation, the treatment search request may be parsed (e.g., using PHP commands) to determine a treatment specified by the member, and the ACG may be analyzed to determine an associated condition that is linked to the treatment. For example, if the member searched for Knee Arthroscopy, Knee Pain (e.g., ID_condition_knee_pain) may be determined as the linked condition. In another implementation, the treatment search request may be parsed (e.g., using PHP commands) to determine a member requested provider (e.g., for the member specified condition, for the member specified treatment).

Treatment paths for the condition may be determined at 4813. In one embodiment, the treatment paths may identify various (e.g., high frequency) pathways that are utilized to treat the condition, whether a pathway is high value, medium value or low value (e.g., based on the cost and clinical outcome associated with the pathway), key pathway nodes where members select between different treatments and/or providers, and/or the like. In one implementation, the treatment paths may be determined via a MySQL database command similar to the following:

```
SELECT conditionTreatmentPaths
FROM ACGS
WHERE ACG_ID=ID_ACG_1 AND
    ConditionID=ID_condition_knee_pain;
```

Member state of the member may be determined at 4817. In one implementation, the treatment search request may be parsed (e.g., using PHP commands) to determine the member's identifier (e.g., ID_member_1), and the member state of the member may be determined via a MySQL database command similar to the following:

```
SELECT memberState
FROM members
WHERE memberID=ID_member_1;
```

The member's treatment path move sequence may be determined at 4821 and the member's treatment path location may be determined at 4825. In one implementation, the member state (e.g., the member's claim history based on X12 837 health care claims) may be analyzed with regard to the treatment paths (e.g., compared to the treatment paths for the condition) to determine the member's treatment path move sequence and the member's treatment path location.

A high value treatment path for the member may be determined at 4829. In one implementation, available treatment paths that the member may take from the member's treatment path location may be determined (e.g., based on available treatment paths and the configuration of the member's ODHI plan) and a high value treatment path for the member may be selected.

A determination may be made at 4833, whether an alternative treatment (e.g., different from the member specified treatment) that the member should utilize to follow the selected high value treatment path from the member's treatment path location is available. In one implementation, this determination may be made based on whether the next treatment on the high value treatment path matches the treatment specified by the member. In various embodiments, this determination may be made when the member is at any pathway node, when the member is at a key pathway node, when the member is at a pathway node having a level of influence or variance above a specified threshold, and/or the like.

If an alternative treatment is available, a determination may be made at 4837, whether there remain alternative treatment providers to analyze. In one implementation, each of the providers or provider networks that treats the condition and/or offers the alternative treatment may be analyzed. If there remain providers to analyze, the next available provider or provider network may be selected for analysis at 4841.

The selected provider's propensity ranking may be determined at 4843. In one embodiment, a propensity ranking may be calculated based on a set of probabilities that indicate the frequency with which a provider utilizes each of the available (e.g., high frequency) treatment paths, and expected treatment cost associated with each treatment path (e.g., calculated based on expected episodic cost of each treatment in a treatment path). In one implementation, the selected provider's practice patterns data may be analyzed to determine how likely the selected provider is to utilize each of the (e.g., high frequency) treatment paths that the member may take from the member's treatment path location. The expected treatment cost associated with each treatment path may be calculated as the sum of expected episodic costs of treatments in a treatment path. The selected provider's propensity ranking may be calculated as a weighted average of the expected treatment costs for the available treatment paths weighted by the likelihood that the selected provider is going to utilize each respective available treatment path.

Propensity weight may be determined at 4845. In one implementation, the propensity weight may be determined based on the level of influence the member's treatment path location node has on the treatment path options for the condition and/or the level of variance in expected cost and/or outcomes that have been identified for each of the treatment paths downstream from the member's treatment path location node.

The selected provider's expected episodic cost for the alternative treatment may be determined at 4847. In one embodiment, the episode of care may include the primary encounter for the alternative treatment. In another embodiment, the episode of care may include a pre and/or post window (e.g., 30 days prior to the primary encounter for the alternative treatment through 90 days after the primary encounter for the alternative treatment). In one implementation, the selected provider's treatment cost data may be analyzed to determine the selected provider's expected episodic cost for the alternative treatment.

Episodic cost weight may be determined at 4849. In one implementation, the episodic cost weight may be determined depending on which node the member's treatment path location node makes up on a treatment path and/or how far down a path it is. For example, a node that is closer to the end of a treatment path may have a higher episodic cost weight, whereas an earlier node may have a higher propensity weight.

The selected provider's expected longitudinal treatment value and copay may be calculated at 4851. In one embodiment, the expected longitudinal treatment value accounts for how the cost and/or outcomes for the condition can vary based on the provider that is providing the treatment for the condition. In one implementation, the expected longitudinal treatment value may be calculated as a weighted average of the selected provider's propensity ranking and the expected episodic cost for the alternative treatment weighted by their respective weights. In one embodiment, the copay for the member to utilize the alternative treatment (e.g., via core coverage, via a relevant add-in) may be determined. In one implementation, the copay may be a base copay calculated based on the average longitudinal treatment value for providers in the region associated with the member. In another implementation, the copay may be a smart copay (e.g., a smart copay varies in cost to the member based on the provider that provides treatment) that may be calculated by adjusting the base copay based on the expected longitudinal treatment value. See FIGS. 45A-B for an example of how a copay may be calculated.

In some alternative embodiments, propensity ranks, propensity weights, episodic costs, episodic cost weights, expected longitudinal treatment values, and/or the like may be recursively calculated for each node for each of the treatment paths downstream from the member's treatment path location node, and utilized to calculate the expected longitudinal treatment value for the member's treatment path location node.

In some alternative embodiments, the copay and/or other add-in costs to the member may be adjusted based on the member state (e.g., to steer members toward treatment paths with high clinical value). In one impementation, the member may receive a treatment path progression discount on the relevant add-in if the member already utilized a more conservative treatment. See FIG. 37 for an example of how a treatment path progression discount may be offered. In another implementation, the member may receive a condition-based discount (e.g., a discount offered if the member has a certain medical condition) on the relevant add-in. See FIG. 41 for an example of how a condition-based discount may be offered.

If there are no more providers to analyze, the best alternative treatment provider may be determined at 4855. In one implementation, the best provider for the alternative treatment may be the provider with the lowest expected longitudinal treatment value. For example, the best provider may have the lowest smart copay (e.g., to steer members toward a provider that is likely to use treatment paths with high clinical value).

A determination may be made at 4857, whether there remain member specified treatment providers to analyze. In one implementation, each of the providers or provider networks that treats the condition and/or offers the member specified treatment may be analyzed. If there remain providers to analyze, the next available provider or provider network may be selected for analysis at 4861.

The selected provider's propensity ranking may be determined at 4863. In one embodiment, a propensity ranking may be calculated based on a set of probabilities that indicate the frequency with which a provider utilizes each of the available (e.g., high frequency) treatment paths, and expected treatment cost associated with each treatment path (e.g., calculated based on expected episodic cost of each treatment in a treatment path). In one implementation, the selected provider's practice patterns data may be analyzed to determine how likely the selected provider is to utilize each of the (e.g., high frequency) treatment paths that the member may take from the member's treatment path location (e.g., assuming that the member utilizes the member specified treatment next). The expected treatment cost associated with each treatment path may be calculated as the sum of expected episodic costs of treatments in a treatment path. The selected provider's propensity ranking may be calculated as a weighted average of the expected treatment costs for the available treatment paths weighted by the likelihood that the selected provider is going to utilize each respective available treatment path.

Propensity weight may be determined at 4865. In one implementation, the propensity weight may be determined based on the level of influence the member's treatment path location node has on the treatment path options for the condition and/or the level of variance in expected cost and/or outcomes that have been identified for each of the treatment paths downstream from the member's treatment path location node (e.g., assuming that the member utilizes the member specified treatment next).

The selected provider's expected episodic cost for the member specified treatment may be determined at 4867. In one embodiment, the episode of care may include the primary encounter for the member specified treatment. In another embodiment, the episode of care may include a pre and/or post window (e.g., 30 days prior to the primary encounter for the member specified treatment through 90 days after the primary encounter for the member specified treatment). In one implementation, the selected provider's treatment cost data may be analyzed to determine the selected provider's expected episodic cost for the member specified treatment.

Episodic cost weight may be determined at 4869. In one implementation, the episodic cost weight may be determined depending on which node the member's treatment path location node makes up on a treatment path and/or how far down a path it is (e.g., assuming that the member utilizes the member specified treatment next). For example, a node that is closer to the end of a treatment path may have a higher episodic cost weight, whereas an earlier node may have a higher propensity weight.

The selected provider's expected longitudinal treatment value and copay may be calculated at 4871. In one embodiment, the expected longitudinal treatment value accounts for how the cost and/or outcomes for the condition can vary based on the provider that is providing the treatment for the condition. In one implementation, the expected longitudinal treatment value may be calculated as a weighted average of the selected provider's propensity ranking and the expected episodic cost for the member specified treatment weighted by their respective weights. In one embodiment, the copay for the member to utilize the member specified treatment (e.g., via core coverage, via a relevant add-in) may be determined. In one implementation, the copay may be a base copay calculated based on the average longitudinal treatment value for providers in the region associated with the member. In another implementation, the copay may be a smart copay (e.g., a smart copay varies in cost to the member based on the provider that provides treatment) that may be calculated by adjusting the base copay based on the expected longitudinal treatment value. See FIGS. 45A-B for an example of how a copay may be calculated.

In some alternative embodiments, propensity ranks, propensity weights, episodic costs, episodic cost weights, expected longitudinal treatment values, and/or the like may be recursively calculated for each node for each of the treatment paths downstream from the member's treatment path location node, and utilized to calculate the expected longitudinal treatment value for the member's treatment path location node (e.g., assuming that the member utilizes the member specified treatment next).

In some alternative embodiments, the copay and/or other add-in costs to the member may be adjusted based on the member state (e.g., to steer members toward treatment paths with high clinical value). In one implementation, the member may receive a treatment path progression discount on the relevant add-in if the member already utilized a more conservative treatment. See FIG. 37 for an example of how a treatment path progression discount may be offered. In another implementation, the member may receive a condition-based discount (e.g., a discount offered if the member has a certain medical condition) on the relevant add-in. See FIG. 41 for an example of how a condition-based discount may be offered.

If there are no more providers to analyze, the best member specified treatment provider may be determined at 4875. In one implementation, the best provider for the member specified treatment may be the provider with the lowest expected longitudinal treatment value. For example, the best provider may have the lowest smart copay (e.g., to steer members toward a provider that is likely to use treatment paths with high clinical value).

Search results may be provided to the member at 4879. In one implementation, the search results may be returned via a search response. For example, the search results may include coverage information for the member specified condition, for the member specified treatment (e.g., for the member requested provider for the member specified treatment, for the best provider for the member specified treatment), for the alternative treatment (e.g., for the best provider for the alternative treatment), and/or the like.

Figure 49:
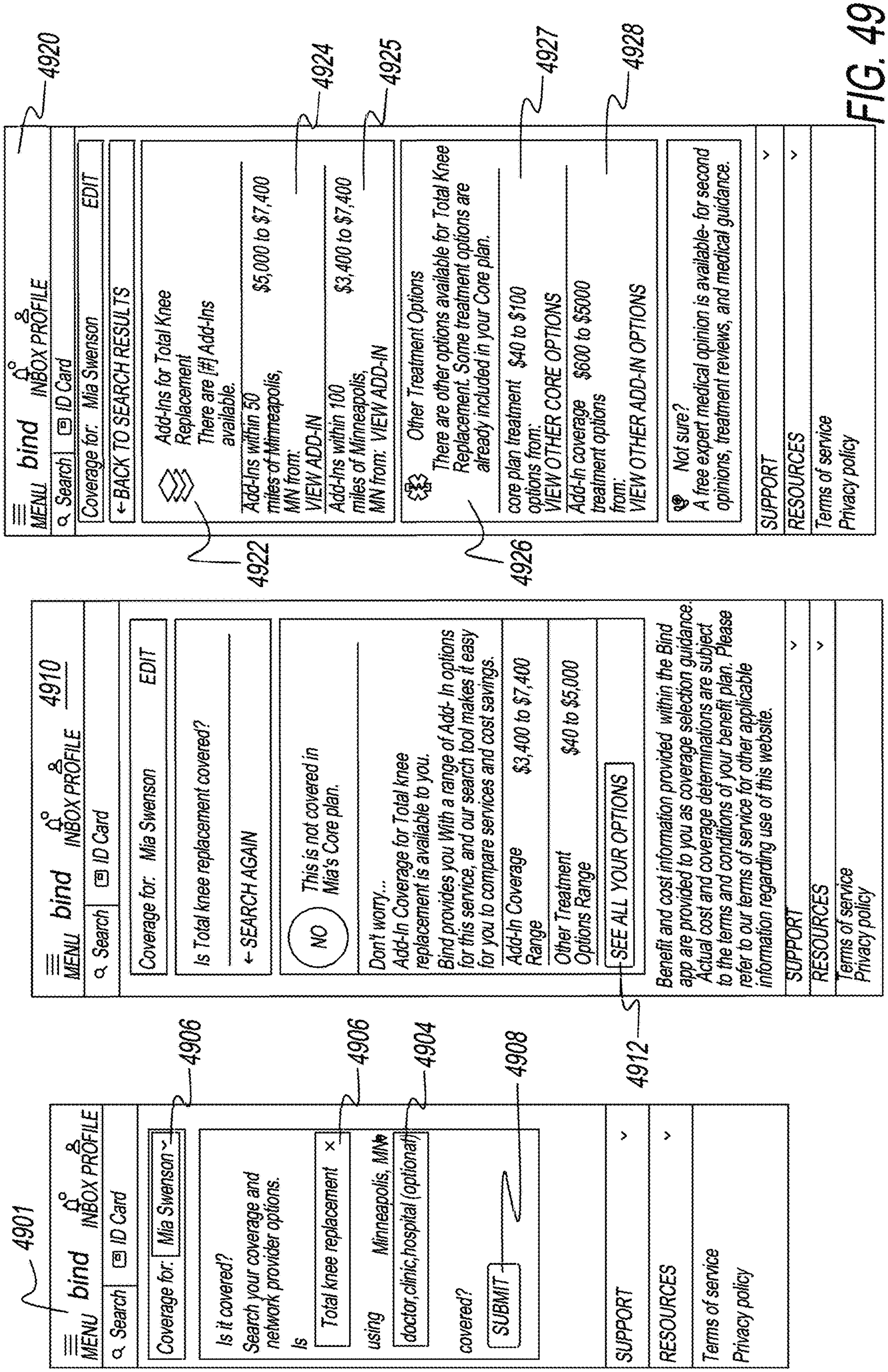
FIG. 49 shows a screenshot diagram illustrating embodiments of the UDRCD.

FIG. 49 shows a screenshot diagram illustrating embodiments of the UDRCD. In FIG. 49, an exemplary user interface (e.g., for a website) for conducting an "Is it covered?" search is illustrated. Screen 4901 shows that a member may conduct a search to determine whether a service, condition, specialty, treatment (e.g., procedure), drug, and/or the like specified via a GUI widget 4902 is covered using (e.g., optional) a person provider (e.g., a particular doctor), clinic, hospital, pharmacy, and/or the like specified via a GUI widget 4904 for a plan member (e.g., of an ODHI plan) specified via a GUI widget 4906. The member may utilize a "Submit" button 4908 to submit the search query (e.g., Is Total Knee Replacement using a provider near Minneapolis, MN covered for plan member Mia). Screen 4910 shows results when a treatment is not covered. For example, an indication that the treatment is not covered may be provided, and information about available add-in coverage options for the treatment and alternative treatment coverage options may be provided. The member may utilize a "See All Your Options" button 4912 to view additional details regarding the available coverage options. Screen 4920 shows additional details regarding the available coverage options. A GUI widget 4922 shows details regarding available add-ins for the Total Knee Replacement treatment. The member may utilize a "View Add-in" link 4924 to view available add-ins for the treatment within 50 miles of Minneapolis, MN. These add-ins range from $5,000 to $7,400 in cost. The member may utilize a "View Add-in" link 4925 to view available add-ins for the treatment within 100 miles of Minneapolis, MN. These add-ins range from $3,400 to $7,400 in cost. A GUI widget 4926 shows details regarding available alternative treatment coverage options. The member may utilize a "View Other Core Options" link 4927 to view additional details regarding core coverage options for alternative treatments. The member may utilize a "View Other Add-in Options" link 4928 to view additional details regarding add-in coverage options for alternative treatments.

Figure 50:
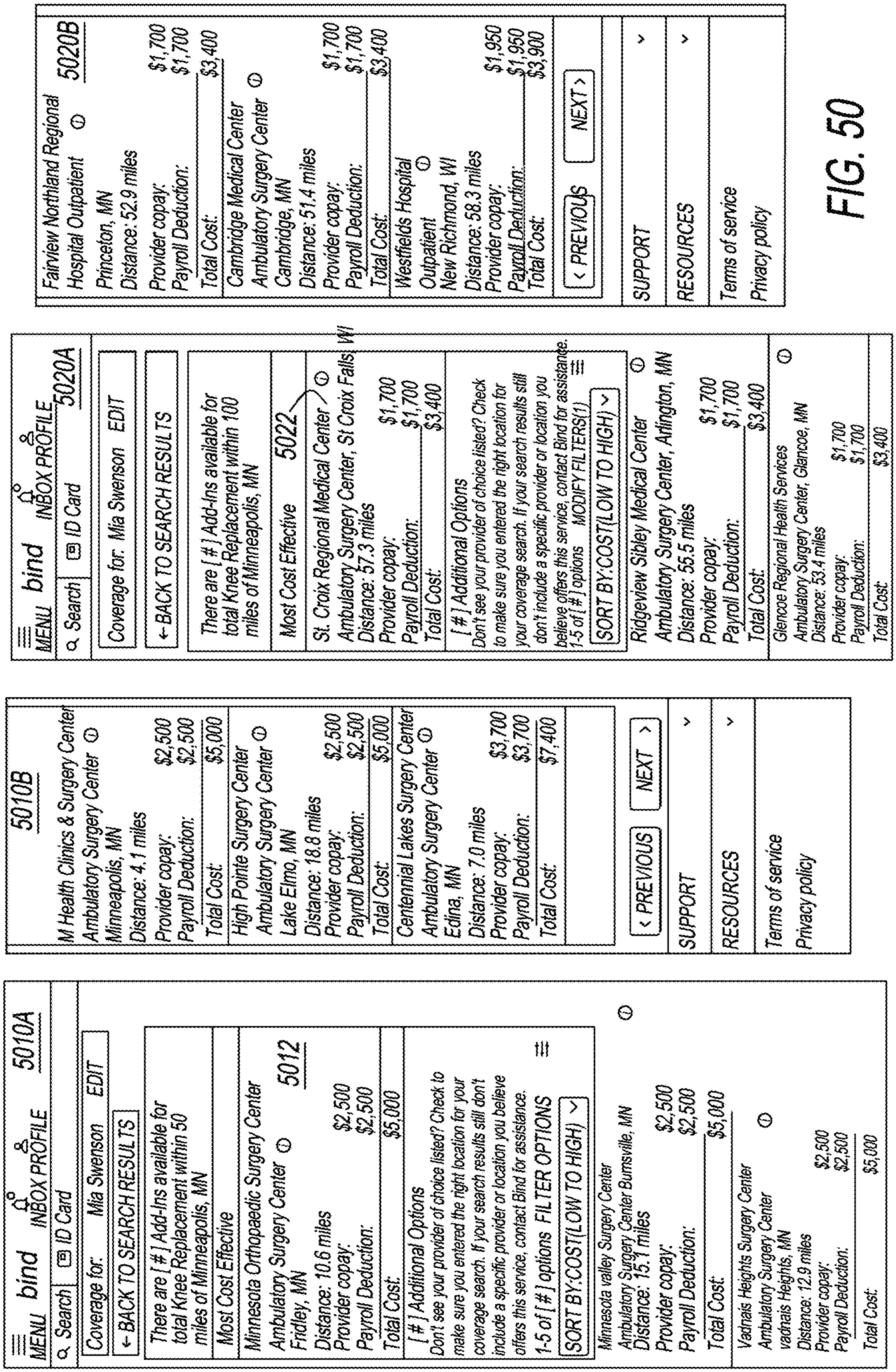
FIG. 50 shows a screenshot diagram illustrating embodiments of the UDRCD.

FIG. 50 shows a screenshot diagram illustrating embodiments of the UDRCD. In FIG. 50, an exemplary user interface (e.g., for a website) for providing results for an "Is it covered?" search is illustrated. Screen 5010A-B shows available add-ins for the treatment within 50 miles of Minneapolis, MN. A GUI widget 5012 shows the most cost effective available add-in for the treatment (e.g., the add-in associated with the best provider within 50 miles of Minneapolis, MN). Screen 5020A-B shows available add-ins for the treatment within 100 miles of Minneapolis, MN. A GUI widget 5022 shows the most cost effective available add-in for the treatment (e.g., the add-in associated with the best provider within 100 miles of Minneapolis, MN). The member may select one of the available add-ins to facilitate purchasing add-in coverage.

Figure 51:
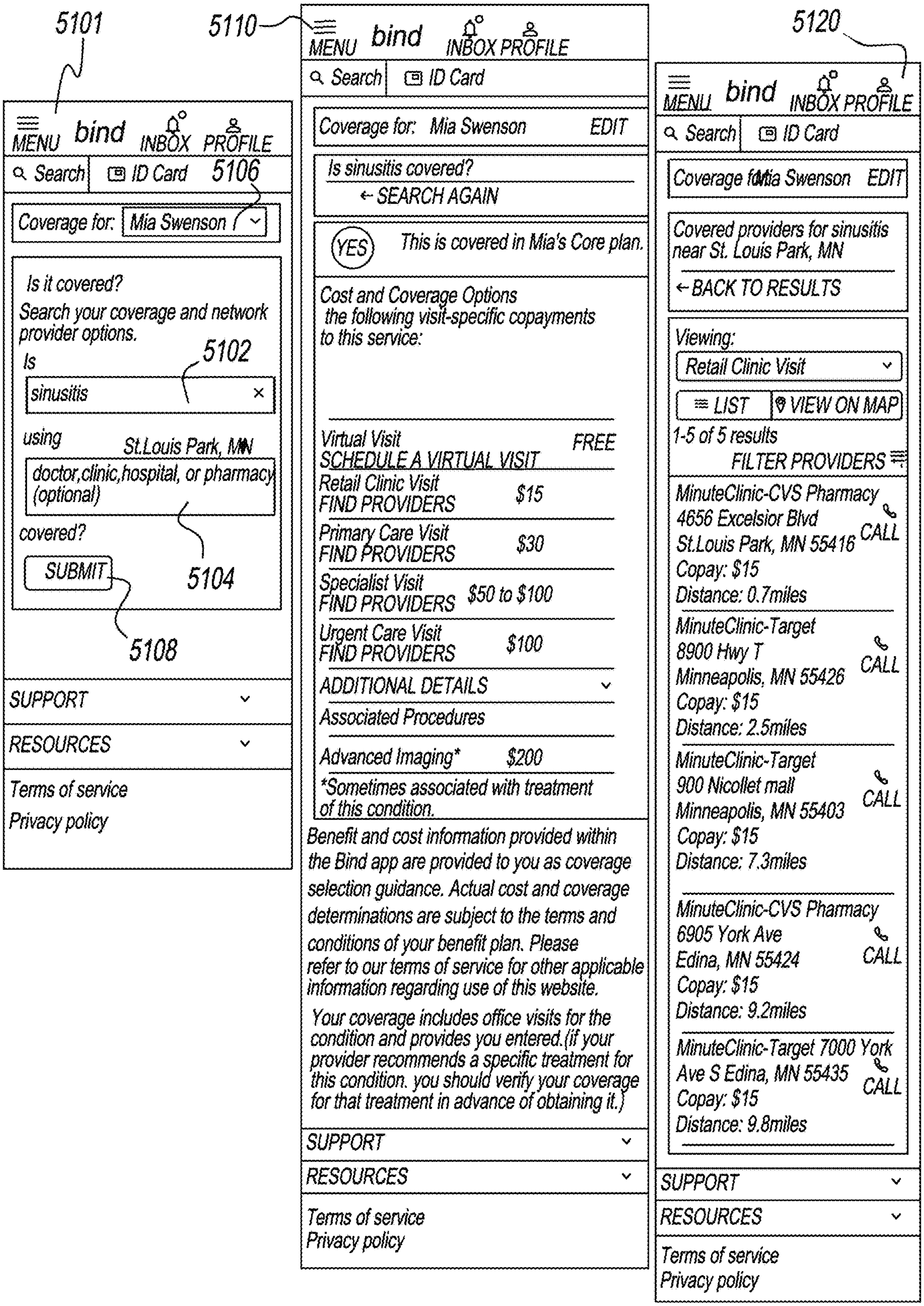
FIG. 51 shows a screenshot diagram illustrating embodiments of the UDRCD.

FIG. 51 shows a screenshot diagram illustrating embodiments of the UDRCD. In FIG. 51, an exemplary user interface (e.g., for a website) for conducting an "Is it covered?" search is illustrated. Screen 5101 shows that a member may conduct a search to determine whether a service, condition, specialty, treatment (e.g., procedure), drug, and/or the like specified via a GUI widget 5102 is covered using (e.g., optional) a person provider (e.g., a particular doctor), clinic, hospital, pharmacy, and/or the like specified via a GUI widget 5104 for a plan member (e.g., of an ODHI plan) specified via a GUI widget 5106. The member may utilize a "Submit" button 5108 to submit the search query (e.g., Is Sinusitis using a provider near St. Louis Park, MN covered for plan member Mia). Screen 5110 shows results when a treatment is covered via core coverage. For example, an indication that the Sinusitis condition is covered via core coverage and information regarding cost and coverage options may be provided. The member may utilize "Find Providers" links to find providers to treat the condition (e.g., retail clinic providers, primary care providers, specialist providers, urgent care providers). Screen 5120 shows available providers for Sinusitis near St. Louis Park, MN.

Figure 52:
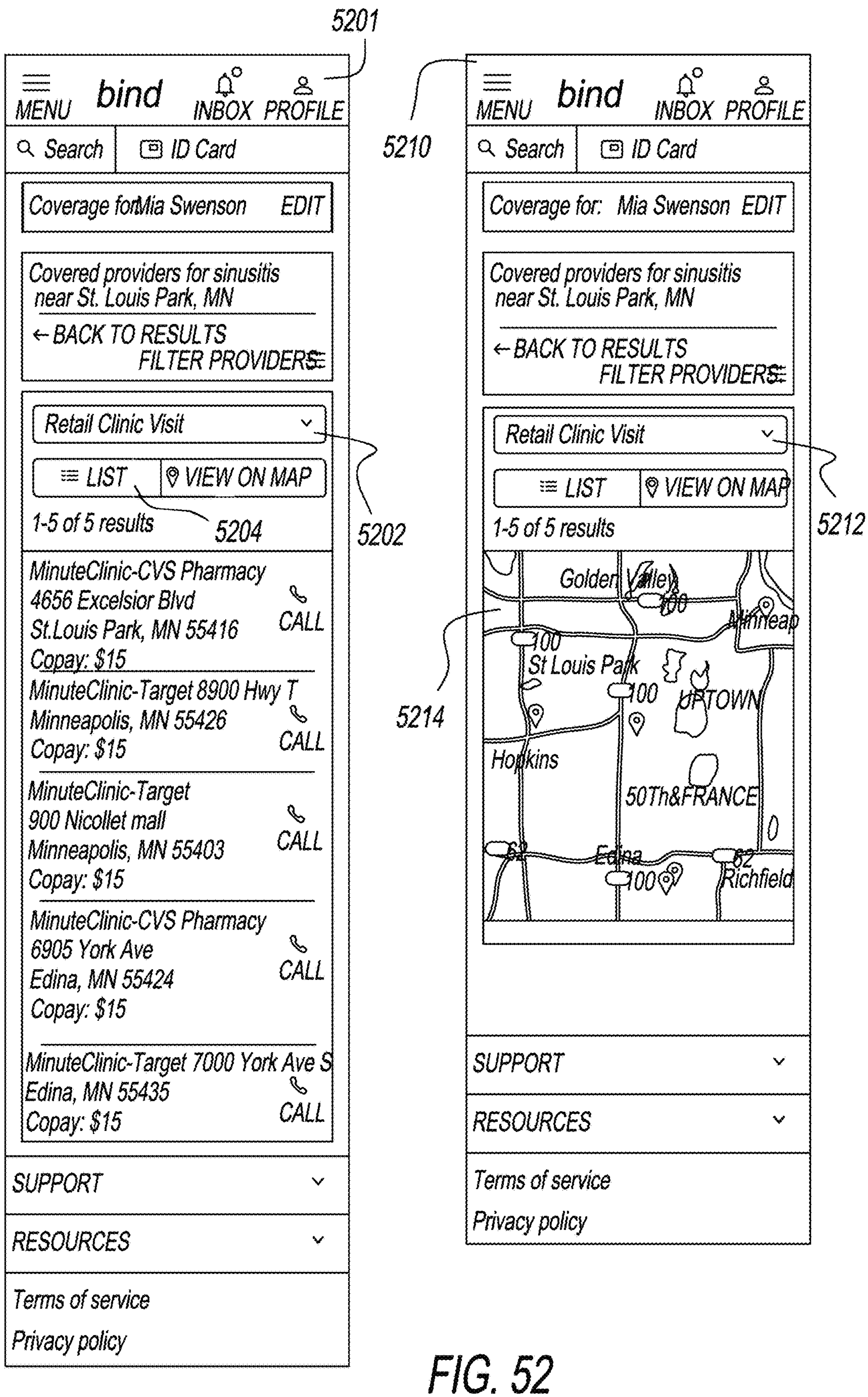
FIG. 52 shows a screenshot diagram illustrating embodiments of the UDRCD.

FIG. 52 shows a screenshot diagram illustrating embodiments of the UDRCD. In FIG. 52, an exemplary user interface (e.g., for a website) for providing results for an "Is it covered?" search is illustrated. Screen 5201 shows available providers for Sinusitis near St. Louis Park, MN. The member may utilize a GUI widget 5202 to select to view retail clinic providers. The member may utilize a GUI widget 5204 to select to view a list of available retail clinic providers. Screen 5210 shows available providers for Sinusitis near St. Louis Park, MN. The member may utilize a GUI widget 5212 to select to view available retail clinic providers on a map via a map component 5214.

Figure 53:
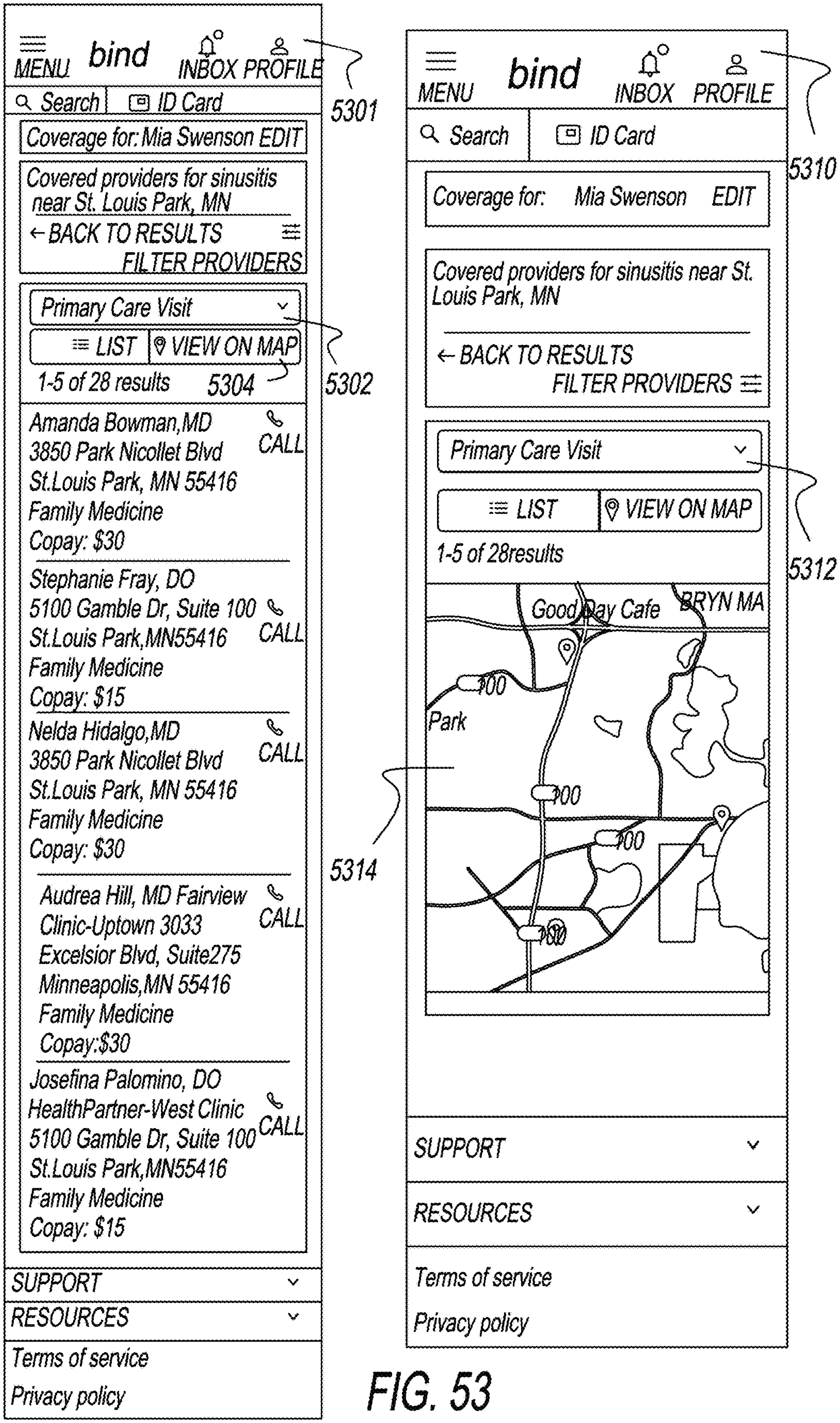
FIG. 53 shows a screenshot diagram illustrating embodiments of the UDRCD.

FIG. 53 shows a screenshot diagram illustrating embodiments of the UDRCD. In FIG. 53, an exemplary user interface (e.g., for a website) for providing results for an "Is it covered?" search is illustrated. Screen 5301 shows available providers for Sinusitis near St. Louis Park, MN. The member may utilize a GUI widget 5302 to select to view primary care providers. The member may utilize a GUI widget 5304 to select to view a list of available primary care providers. Screen 5310 shows available providers for Sinusitis near St. Louis Park, MN. The member may utilize a GUI widget 5312 to select to view available primary care providers on a map via a map component 5314.

Figure 54:
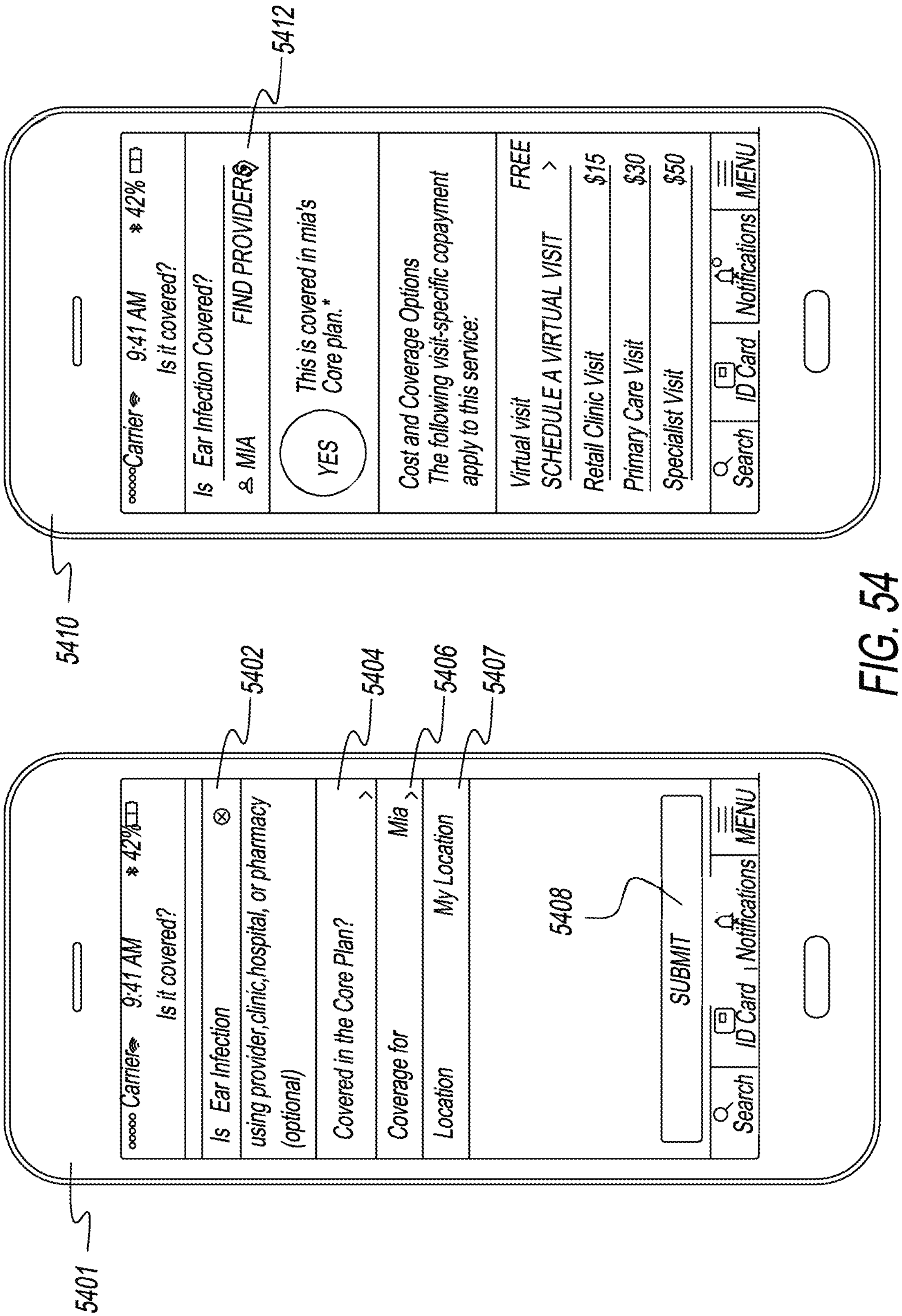
FIG. 54 shows a screenshot diagram illustrating embodiments of the UDRCD.

FIG. 54 shows a screenshot diagram illustrating embodiments of the UDRCD. In FIG. 54, an exemplary user interface (e.g., for a mobile app) for conducting an "Is it covered?" search is illustrated. Screen 5401 shows that a member may conduct a search to determine whether a service, condition, specialty, treatment (e.g., procedure), drug, and/or the like specified via a GUI widget 5402 is covered using (e.g., optional) a person provider (e.g., a particular doctor), clinic, hospital, pharmacy, and/or the like specified via a GUI widget 5404 for a plan member (e.g., of an ODHI plan) specified via a GUI widget 5406 at a location specified via a GUI widget 5407. The member may utilize a "Submit" button 5408 to submit the search query (e.g., Is Ear Infection covered for plan member Mia using a provider near Mia's location). Screen 5410 shows results when a treatment is covered via core coverage. For example, an indication that the Ear Infection condition is covered via core coverage and information regarding cost and coverage options may be provided. The member may utilize a "Find Providers" link 5412 to find providers to treat the condition (e.g., retail clinic providers, primary care providers, specialist providers, urgent care providers).

Figure 55:
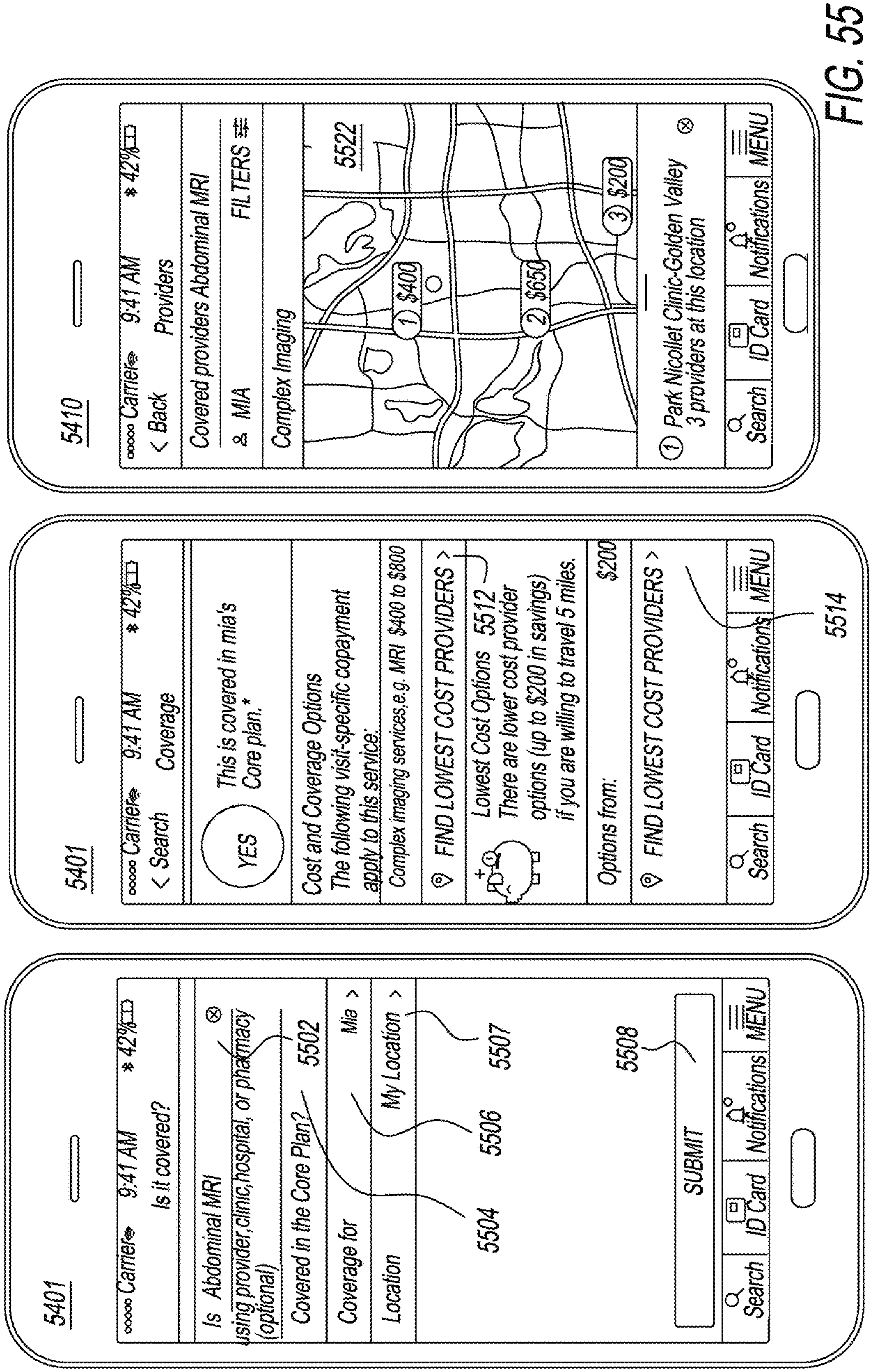
FIG. 55 shows a screenshot diagram illustrating embodiments of the UDRCD.

FIG. 55 shows a screenshot diagram illustrating embodiments of the UDRCD. In FIG. 55, an exemplary user interface (e.g., for a mobile app) for conducting an "Is it covered?" search is illustrated. Screen 5501 shows that a member may conduct a search to determine whether a service, condition, specialty, treatment (e.g., procedure), drug, and/or the like specified via a GUI widget 5502 is covered using (e.g., optional) a person provider (e.g., a particular doctor), clinic, hospital, pharmacy, and/or the like specified via a GUI widget 5504 for a plan member (e.g., of an ODHI plan) specified via a GUI widget 5506 at a location specified via a GUI widget 5507. The member may utilize a "Submit" button 5508 to submit the search query (e.g., Is Abdominal MRI covered for plan member Mia using a provider near Mia's location). Screen 5510 shows results when a treatment is covered via core coverage. For example, an indication that the Abdominal MRI treatment is covered via core coverage and information regarding cost and coverage options may be provided. The member may utilize "Find Lower Cost Providers" link 5512 to find providers that offer the treatment (e.g., with smart copays utilized to steer the member toward the best providers). For example, the member may find lower cost providers if the member is willing to travel 5 miles. Similarly, the member may utilize "Find Lower Cost Providers" link 5514 to find providers that offer an alternative treatment (e.g., based on a high value treatment path). Screen 5520 shows available providers for Abdominal MRI near Mia's location and the smart copay associated with utilizing each provider on a map via a map component 5522.

Figure 56:
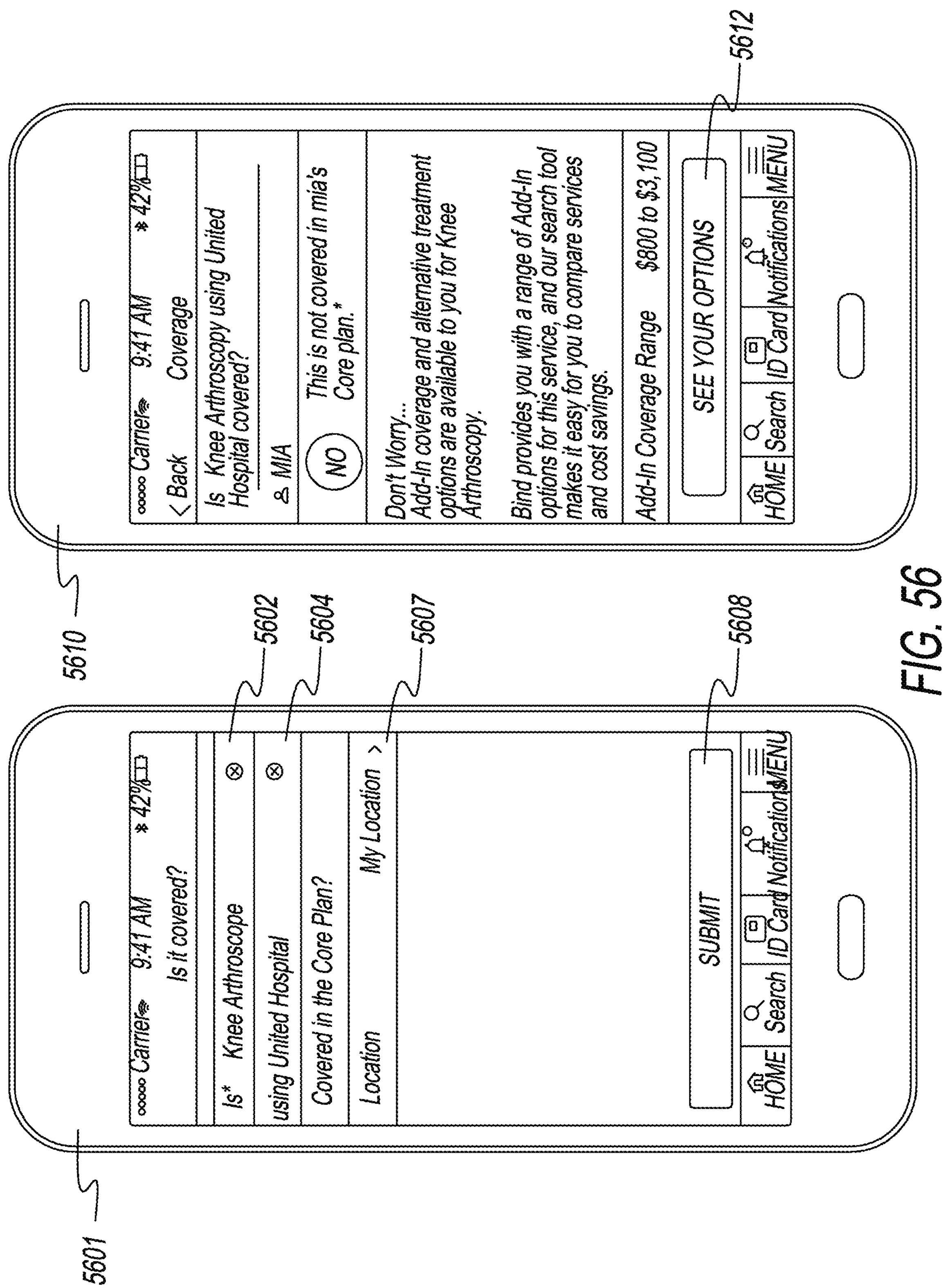
FIG. 56 shows a screenshot diagram illustrating embodiments of the UDRCD.

FIG. 56 shows a screenshot diagram illustrating embodiments of the UDRCD. In FIG. 56, an exemplary user interface (e.g., for a mobile app) for conducting an "Is it covered?" search is illustrated. Screen 5601 shows that a member may conduct a search to determine whether a service, condition, specialty, treatment (e.g., procedure), drug, and/or the like specified via a GUI widget 5602 is covered using (e.g., optional) a person provider (e.g., a particular doctor), clinic, hospital, pharmacy, and/or the like specified via a GUI widget 5604 for a plan member (e.g., of an ODHI plan) at a location specified via a GUI widget 5607. The member may utilize a "Submit" button 5608 to submit the search query (e.g., Is Knee Arthroscopy using United Hospital covered for plan member Mia using a provider near Mia's location). Screen 5610 shows results when a treatment is not covered. For example, an indication that the treatment is not covered via core coverage may be provided, and information about available add-in coverage options for the treatment and alternative treatment coverage options may be provided. The member may utilize a "See Your Options" button 5612 to view additional details regarding the available coverage options.

Figure 57:
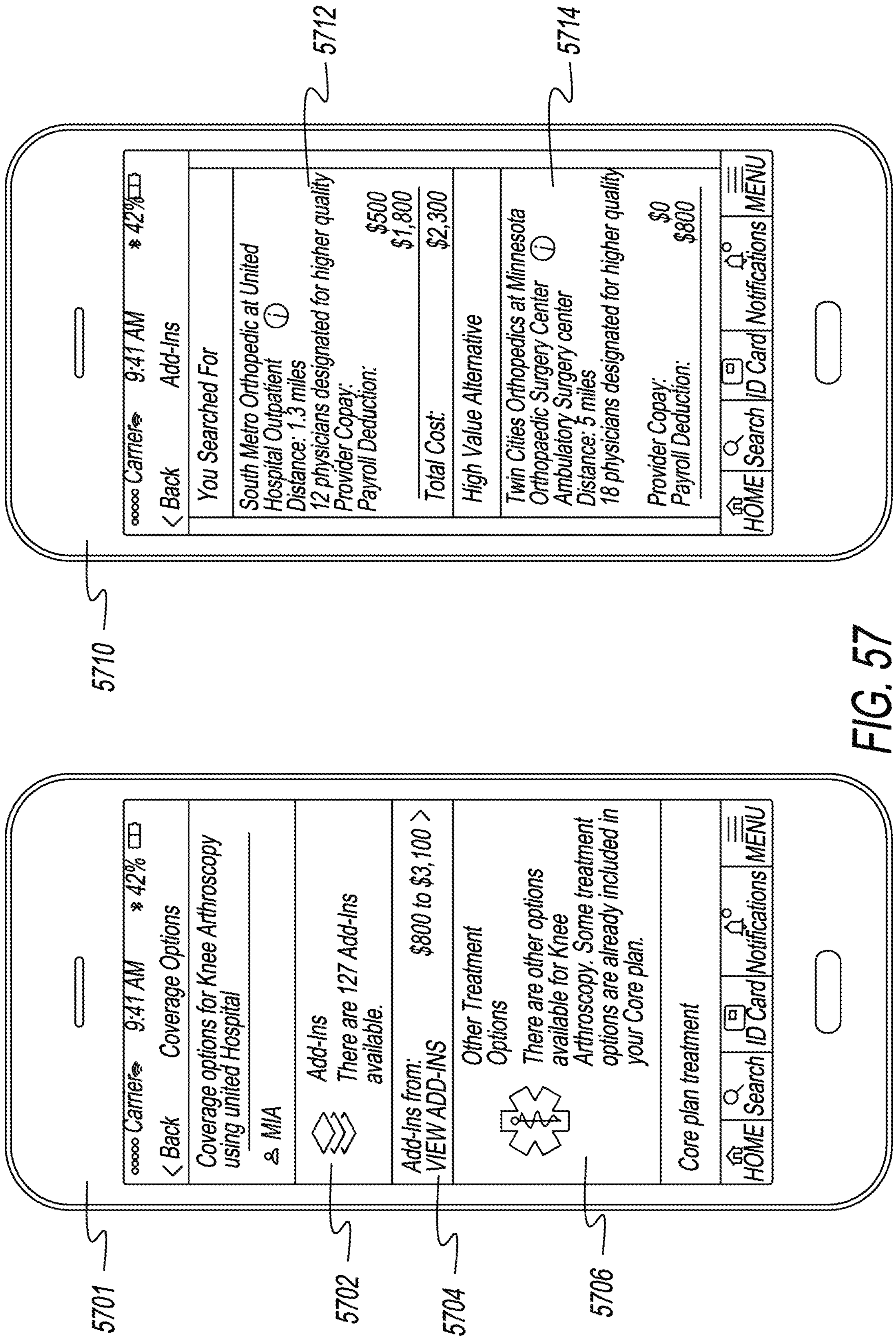
FIG. 57 shows a screenshot diagram illustrating embodiments of the UDRCD.

FIG. 57 shows a screenshot diagram illustrating embodiments of the UDRCD. In FIG. 57, an exemplary user interface (e.g., for a mobile app) for providing results for an "Is it covered?" search is illustrated. Screen 5701 shows additional details regarding the available coverage options. A GUI widget 5702 shows details regarding available add-ins for the Knee Arthroscopy treatment using United Hospital. The member may utilize a "View Add-ins" link 5704 to view available add-ins for the treatment. A GUI widget 5706 shows details regarding available alternative treatment coverage options. For example, links (e.g., to view additional details regarding core coverage options, to view additional details regarding add-in coverage options) may be provided that the member may utilize to view additional details regarding alternative treatment options. Screen 5710 shows available add-ins for the Knee Arthroscopy treatment. A GUI widget 5712 shows the add-in for the member requested provider (e.g., United Hospital), which costs $2,300. A GUI widget 5714 shows the add-in for the best available provider (e.g., Minnesota Orthopaedic Surgery Center), which costs $800.

Figure 58:
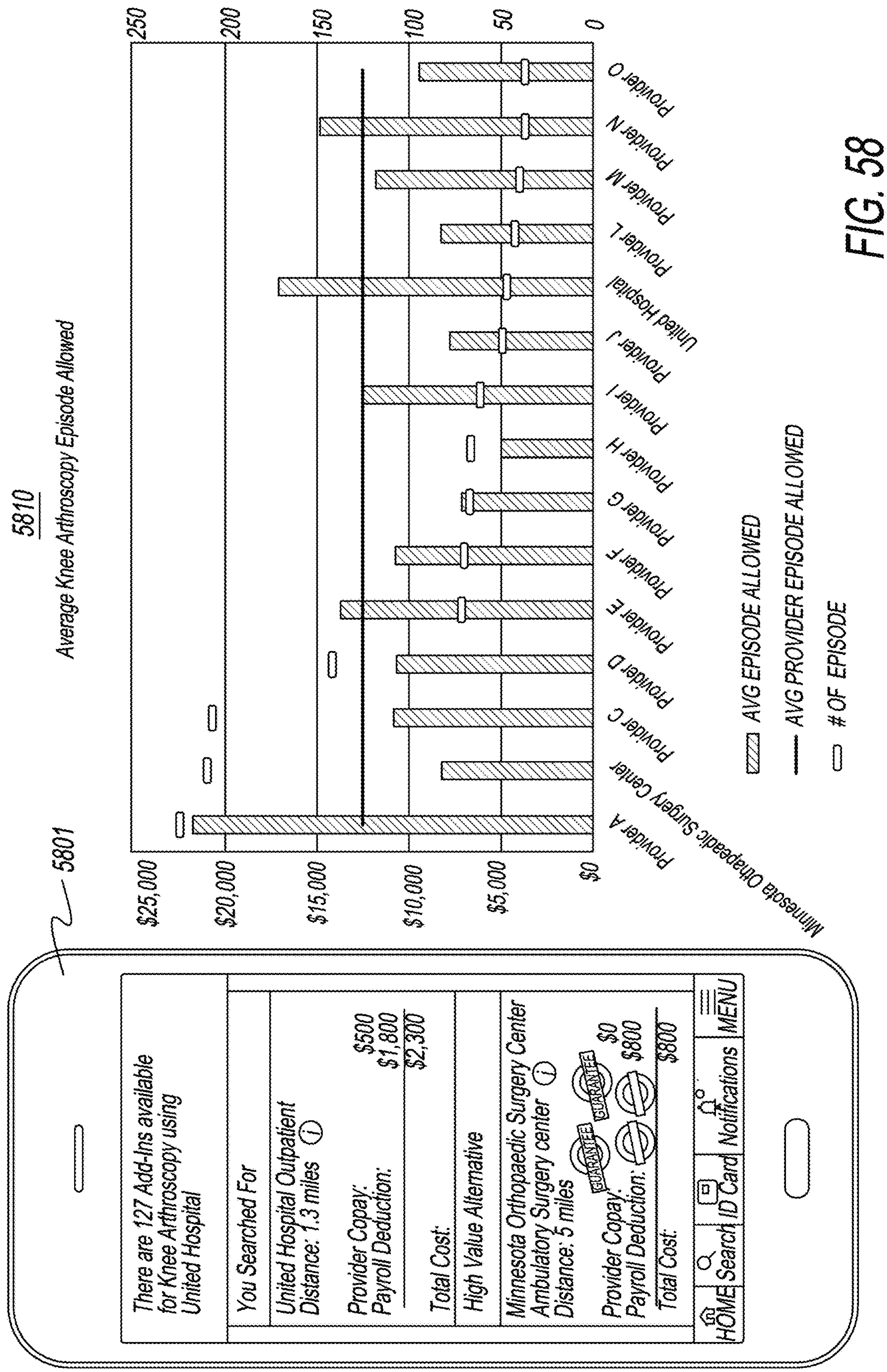
FIG. 58 shows a screenshot diagram illustrating embodiments of the UDRCD.

FIG. 58 shows a screenshot diagram illustrating embodiments of the UDRCD. Screen 5801 shows the add-ins shown in screen 5710. Diagram 5810 shows how add-in prices for the add-ins shown in in screen 5801 may be calculated. For example, smart copays maybe determined based on how the number of episodes and/or the average cost per episode for a provider compares to the average cost per episode for available providers.

Figure 59:
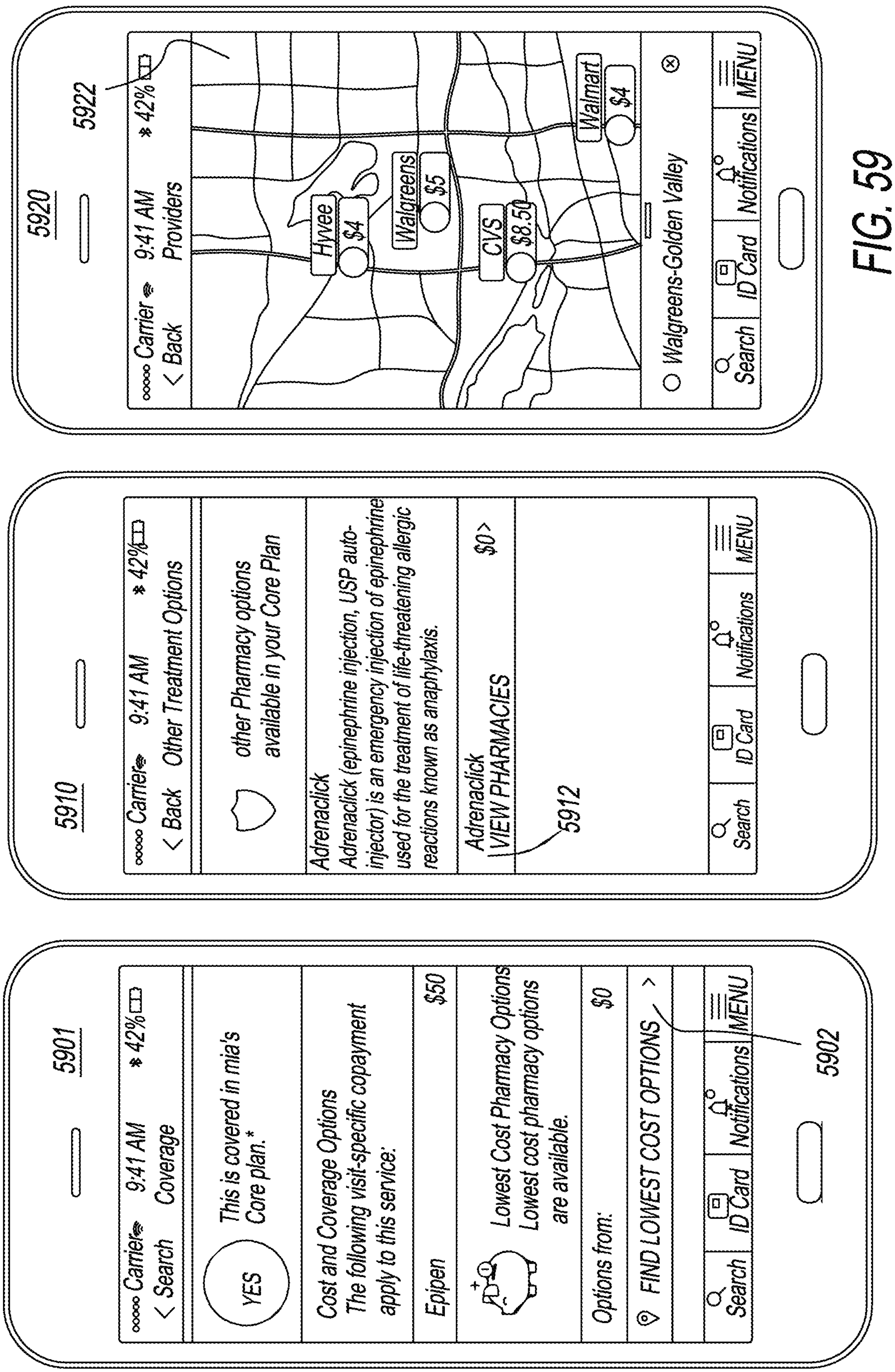
FIG. 59 shows a screenshot diagram illustrating embodiments of the UDRCD.

FIG. 59 shows a screenshot diagram illustrating embodiments of the UDRCD. In FIG. 59, an exemplary user interface (e.g., for a mobile app) for providing results for an "Is it covered?" search is illustrated. Screen 5901 shows results when a drug is covered via core coverage. For example, an indication that Epipen is covered via core coverage and information regarding cost and coverage options may be provided. Alternative drug options may also be shown to the member. The member may utilize "Find Lower Cost Options" link 5902 to view additional details regarding alternative drug options. Screen 5910 shows that Adrenaclick is an alternative drug option. The member may utilize a "View Pharmacies" link 5912 to view available pharmacies for the alternative drug. Screen 5920 shows available pharmacies for Adrenaclick near Mia's location and the smart copay associated with utilizing each pharmacy on a map via a map component 5922.

Figure 60:
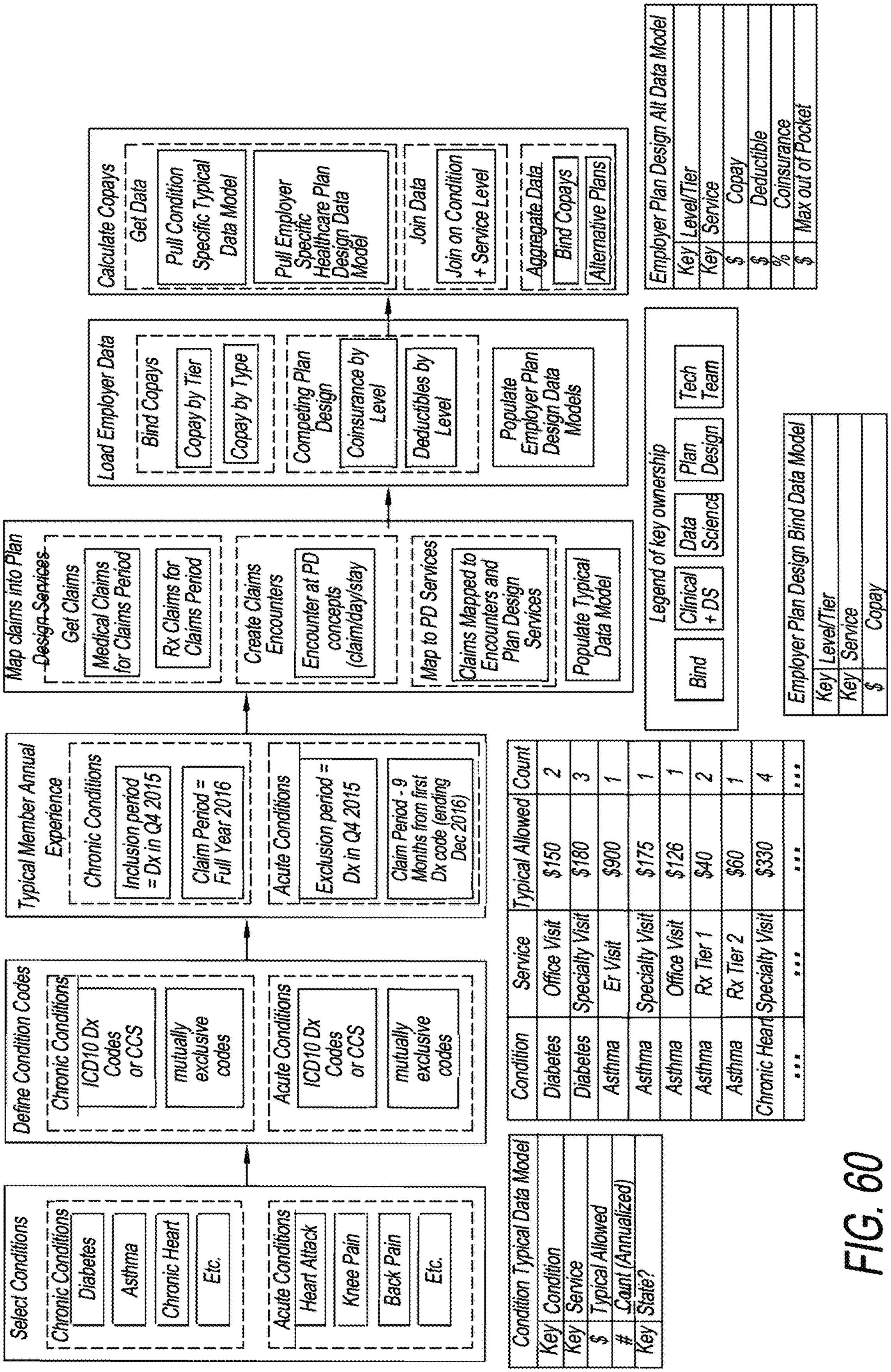
FIG. 60 shows an exemplary architecture for the UDRCD.

FIG. 60 shows an exemplary architecture for the UDRCD. In FIG. 60, embodiments of a cost calculator are illustrated. In one embodiment, conditions for which the cost calculator may be utilized may be selected. This may involve selecting chronic conditions and/or acute conditions. For example, chronic conditions may include diabetes, asthma, chronic heart conditions, and/or the like. For example, acute conditions may include heart attack, knee pain, back pain, and/or the like. In one embodiment, condition codes for the selected conditions may be defined. This may involve defining (e.g., mutually exclusive) codes (e.g., ICD-10 diagnosis codes) associated with each selected condition.

In one embodiment, a typical member annual experience may be determined. For example, for chronic conditions, a typical member annual experience may be determined based on an inclusion period (e.g., diagnosis in Q4 of 2015) and a claim period (e.g., full year 2016). In another example, for acute conditions, a typical member annual experience may be determined based on an exclusion period (e.g., diagnosis in Q4 of 2015) and a claim period (e.g., 9 months from first diagnosis code ending December 2016).

In one embodiment, claims may be mapped into plan design services. This may involve getting claims, creating claim encounters, mapping claims to encounters and plan design services, and populating a typical data model. Getting claims may involve getting medical claims and/or prescription claims for claims period. Creating claim encounters may involve encounter at plan design concepts (e.g., claim, day, stay).

In one embodiment, employer data may be loaded. This may involve determining UDRCD copays for an ODHI plan (e.g., copay by tier, copay by type), determining competing plan designs (e.g., coinsurance by level, deductibles by level), and populating employer plan design data models.

In one embodiment, copays may be calculated. This may involve pulling condition specific typical data model, pulling employer specific healthcare plan design data model, joining data on condition and service level, and storing results regarding calculated UDRCD copays for the ODHI plan and data for alternative competing plans.

Figure 61:
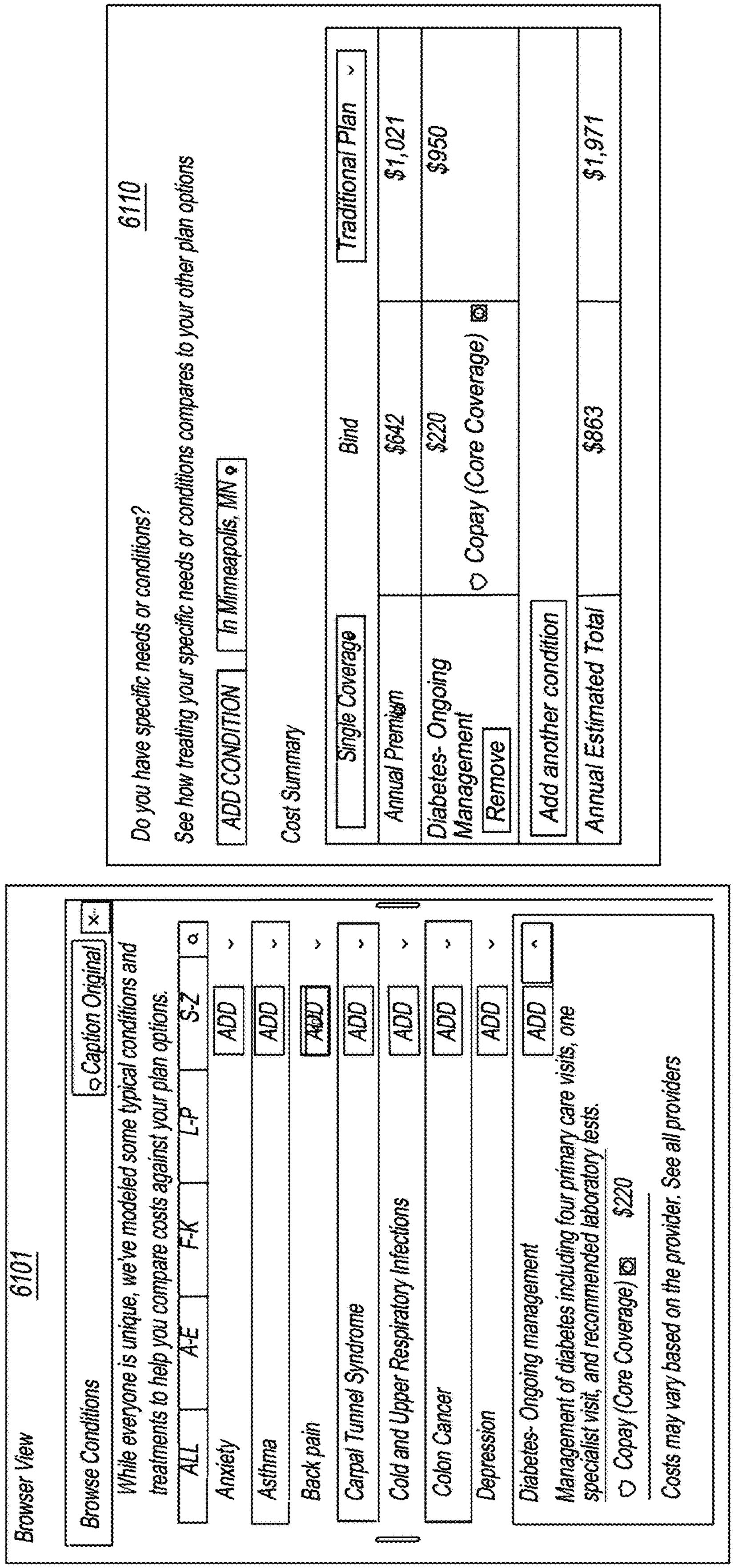
FIG. 61 shows a screenshot diagram illustrating embodiments of the UDRCD.

FIG. 61 shows a screenshot diagram illustrating embodiments of the UDRCD. In FIG. 61, an exemplary user interface (e.g., for a website) for utilizing a cost calculator is illustrated. Screen 6101 shows that a member may select one or more service, condition, specialty, treatment (e.g., procedure), drug, and/or the like for comparison with alternative competing plans. For example, the member may select Diabetes. Screen 6110 shows a cost summary for an ODHI plan vs. a traditional plan.

FIGS. 71A-D show implementation case(s) for the UDRCD. In FIG. 71A-D, an exemplary process for developing regional provider rankings and determining pricing is illustrated. Screen 7101 shows that raw de-Identified Normative Health Information (dNHI) claims data may be utilized to create encounter datastructures for determined encounters (e.g., an encounter may be a grouping of facility and/or professional claims intended to represent a member's interaction with the healthcare system, which may be grouped by "day" (e.g., for outpatient services) or "stay" (e.g., for inpatient services)). For example, a member's professional claim for hip replacement for Feb. 1, 2020 and facility claim for hip replacement for Feb. 1, 2020 may be grouped and utilized to build the hip replacement for Feb. 1, 2020 encounter datastructure.

Screen 7105 shows that the member's encounters may be utilized to create episode datastructures for determined episodes (e.g., an episode may be a grouping of encounters within a specified time window, where encounters are included if they include a relevant service or diagnosis) for a coverage family (e.g., a coverage family may be a group of like services to which a member cost is assigned (e.g., such services may be close in nature, may have similar allowed amounts, and may be performed by similar practitioners and facilities)). In one embodiment, an episode may comprise an anchor encounter (e.g., an anchor encounter may be an encounter that meets the specifications of a coverage family definition (e.g., the anchor encounter may represent the start of the episode)) and/or accessory encounters (e.g., an accessory encounter may be an encounter that is relevant to the anchor encounter, but does not meet the coverage family technical definition (e.g., relevance may be determined by fields such as diagnosis and/or procedure codes using props ratios datastructures)). For example, the member's encounters may be utilized to build a hip replacement episode datastructure (e.g., for a hip replacement coverage family) with the hip replacement for Feb. 1, 2020 encounter datastructure as the anchor encounter, with hip physical therapy for Feb. 25, 2020, hip MRI for Mar. 2, 2020 and hip physical therapy for Mar. 10, 2020 encounter datastructures as accessory encounters, and with cardiology office visit for Feb. 1, 2020 encounter datastructure not included in the hip replacement episode due to not being relevant to the hip replacement coverage family.

Screen 7110 shows that the created episode may be attributed a provider location (e.g., a facility and/or practitioner; a provider location may also be referred to as a provider or as a location). In one embodiment, the episode may be assigned a location based on analysis of claim lines within the anchor encounter. In one implementation, claims within the anchor encounter may be sorted (e.g., based on allowed amount, trigger code presence (e.g., an episode trigger code may be a diagnosis or procedure that an episode is built around (e.g., a code for a knee replacement procedure may trigger a knee replacement episode)), claim type (e.g., facility, professional)) and the location associated with the most relevant claim(s) may be selected as the attributed location. For example, the provider location (e.g., Abbott Northwestern Hospital) associated with the hip replacement for Feb. 1, 2020 encounter datastructure may be attributed to the member's episode.

Screen 7115 shows that episode datastructures for episodes attributed to a provider location may be utilized to calculate an average episode cost for the provider location. In one embodiment, episode costs may be adjusted to account for case-mix, winsorization, truncation, payer type, inflation, and/or the like, and the adjusted episode costs may be utilized to calculate an average episode cost for the provider location. For example, the average episode cost for hip replacement episodes for the Abbott Northwestern Hospital provider location may be calculated as $41K based on adjusted episode costs of three hip replacement episodes attributed to the provider location.

Screen 7120 shows that average episode costs for provider locations may be adjusted based on credibility (e.g., credibility may be a measure to account for confidence in the data for a certain facility/practitioner (e.g., if a location has a low number of episodes, the confidence level that the episodes attributed to the location are actually representative for that location is low). In one embodiment, credibility increases as the number of episodes attributed to a location increases. In one implementation, when credibility is low, a location's average episode cost may be adjusted toward the mean for locations in a region (e.g., a region may be a grouping of zip codes used in developing an array of ranks, developed and broken into three levels based on a combination of commuter patterns and physician/facility/service availability). For example, the average episode cost for hip replacement episodes for the Abbott Northwestern Hospital provider location may be credibility-adjusted from $41K to $39.8K.

Screen 7125 shows that for instances where there are no episodes attributed to a location, credibility-adjusted average episode costs for provider locations may be imputed using episode data from similar locations. In one embodiment, similar locations may be those that have the same Taxpayer Identification Number (TIN) and zip code, TIN and region, TIN, and/or the like. If there are no available similar locations with the above criteria, the place of service (POS) average for the location's region may be used. For example, the credibility-adjusted average episode cost for the Fairview Ridges provider location may be calculated as $39.5K based on episode costs of two similar locations. In another example, the credibility-adjusted average episode cost for the Joe's ASC provider location may be calculated as $37.9K based on the average cost for hip replacement episodes for the region.

Screen 7130 shows that a price factor may be calculated for each provider location in the region. In one embodiment, a location's price factor may be calculated as the location's credibility-adjusted average episode cost divided by the region's average episode cost. For example, the price factor for the Abbott Northwestern Hospital provider location may be calculated as 39.8 divided by 37.9 and equal to 1.05.

Screen 7135 shows that a price rank may be calculated for each provider location in the region based on the price factors. In one embodiment, locations within the region may be ranked against each other and the ranks within the region may be spread from 0 to 100. For example, the price rank for the Abbott Northwestern Hospital provider location may be determined to be 100 (e.g., indicating that the location has the highest credibility-adjusted average episode cost for hip replacement episodes among locations in the region).

Screen 7140 shows that a member price may be calculated for each provider location in the region based on the price ranks. In one embodiment, a member price (e.g., a member price may be the amount a member is responsible for paying to access/purchase a service, which may include both copays and premiums) for a provider location may be calculated using a pricing formula. In one implementation, a pricing formula may include specifications such as the member price range, slope, beta, and/or the like for a coverage family. For example, the member price range for the hip replacement coverage family for an ODHI plan may be between $3.5K and $7.5K. As such, the member price for the hip replacement coverage family for the Abbott Northwestern Hospital provider location may be $7.5K (e.g., based on the price rank of 100), for the North Memorial Health Hospital provider location may be $3.5K (e.g., based on the price rank of 0), and for the Joe's ASC provider location may be $5.5K (e.g., based on the price rank of 50).

Figure 72E:
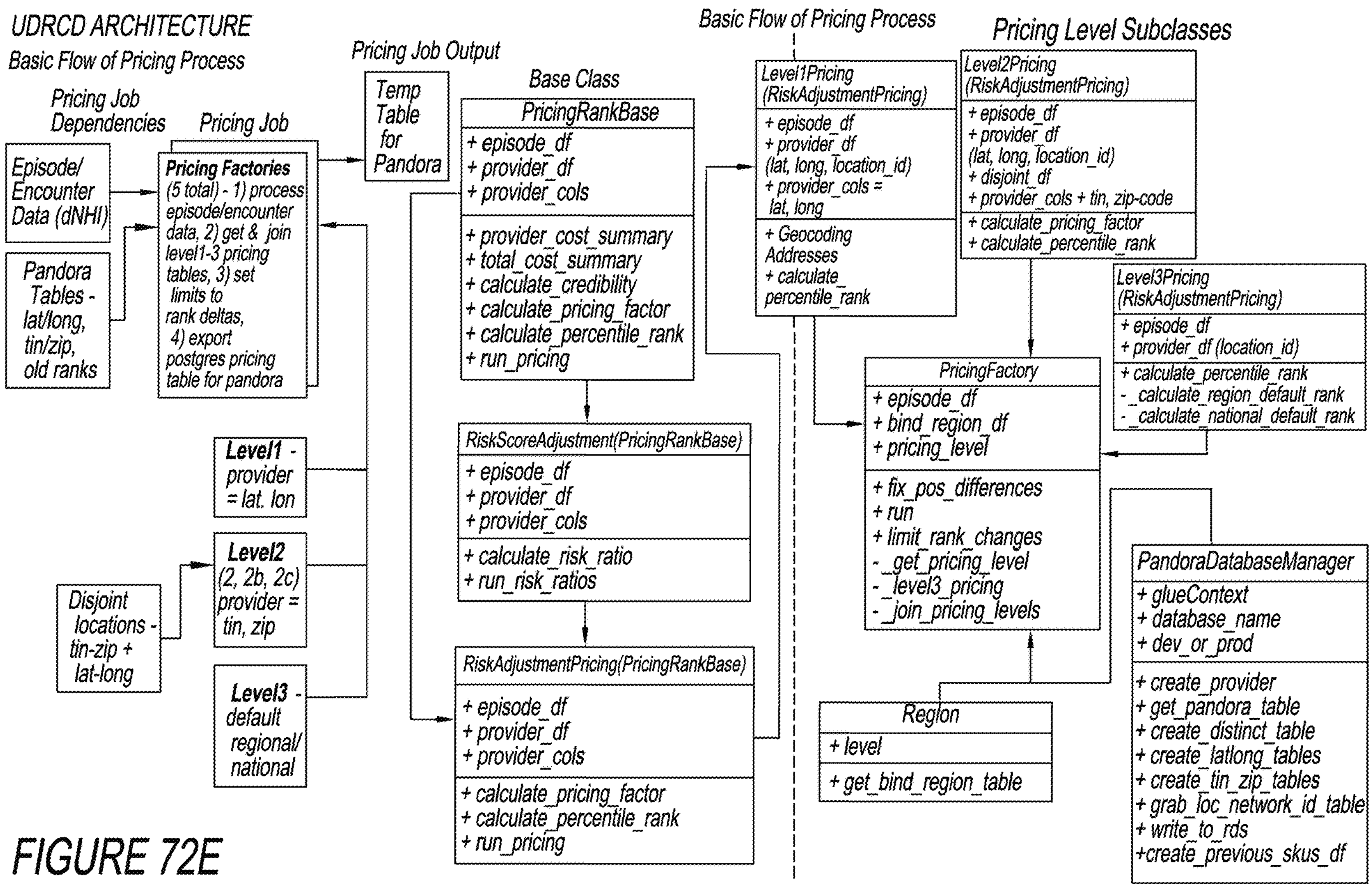

FIGS. 72A-E show an architecture for the UDRCD. In FIGS. 72A-E, embodiments of how various UDRCD components may be utilized to generate episode datastructures and/or to determine price ranks for provider locations are illustrated. FIG. 72A shows a view of how ontology datastructures, props ratios datastructures and pricing episode archetypes may be used with dNHI claims data to generate episode datastructures. The episode datastructures may be adjusted (e.g., for case-mix), and location-based and/or practitioner-based pricing/ranking processes may be used to generate location-based and/or practitioner-based episode datastructures. FIG. 72B shows a view of how dNHI claims data may be processed to generate episode datastructures. The episode datastructures may be used to price SKU's (e.g., an SKU may be a combination of a unique provider location, coverage family, and place of service (e.g., complex imaging at Abbott Northwestern Hospital in an outpatient setting) that identifies a service available at a provider location and is assigned a member cost). FIG. 72C shows a view of how episode datastructures may be adjusted (e.g., for case-mix), and location-based pricing/ranking processes may be used to generate location-based pricing tables. FIG. 72D shows a view of how dNHI claims data may be used to generate and/or price SKUs. FIG. 72E shows a view of a pricing process and associated class structure that may be used to generate location-based pricing tables.

FIGS. 73A-D show an architecture for the UDRCD. In FIG. 73A, an embodiment of ontology datastructures that may be utilized to define coverage families and encounter types is illustrated. In one implementation, a coverage family my comprise one or more encounter types. In FIG. 73B, exemplary ontology datastructures that may be utilized for thyroid surgery are illustrated. In one implementation, the thyroid surgery coverage family may include the thyroid surgery encounter type. The thyroid surgery encounter type may be associated with the thyroid surgery procedure (e.g., an anchor procedure) and the anesthesia procedure (e.g., an accessory procedure). A procedure may be associated with a set of claim codes that indicate that the procedure was performed. In one implementation, claim codes associated with an anchor procedure may be trigger codes for the corresponding encounter type (e.g., claim codes for the thyroid surgery procedure may be trigger codes for the thyroid surgery encounter type). In FIG. 73C, exemplary code types that may be associated with various datastructures are illustrated. In FIG. 73D, exemplary search and navigation use cases for which ontology datastructures may be utilized are illustrated.

FIGS. 74A-B show an architecture for the UDRCD. In FIGS. 74A-B, an embodiment of how rules may be utilized to determine claims associated with an encounter type is illustrated. FIG. 74A shows an exemplary encounter type definition rule and a corresponding GUI widget that specifies claims that should be associated with the thyroid surgery encounter type. FIG. 74B shows an exemplary encounter type definition ruleset, which comprises a set of encounter type definition rules, that specifies claims that should be associated with the thyroid surgery encounter type.

FIG. 75 shows a datagraph illustrating data flow(s) for the UDRCD. In FIG. 75, a client 7502 (e.g., of a user) may send a props ratios calculation request 7521 to a props ratios calculating server 7506 to facilitate generating props ratios datastructures. For example, the client may be a desktop, a laptop, a tablet, a smartphone, a smartwatch, and/or the like that is executing a client application. In one implementation, the props ratios calculation request may include data such as a request identifier, an episode archetype identifier, a coverage family identifier, and/or the like. In one embodiment, the client may provide the following example props ratios calculation request, substantially in the form of a (Secure) Hypertext Transfer Protocol ("HTTP(S)") POST message including extensible Markup Language ("X.MI.") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name> JohnDaDoeDoeDoooe@gmail. com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail. com/mycertifcate.dc</digital_cert_link>
            //OPTIONAL <digital_certificate>_DATA _< /digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type> iPhone6, 1</client_product_type>
        <client_serial_number>DNXXX1X1XXXX</client_serial_number>
        <client_UDID>3XXXXXXXXXXXXXXXXXXXXXXXXXXD</client_UDID>
        <client_OS>10S</client_0S>
        <client_OS_version>7.1.1</client_OS_version>
        <client_app_type>app with webkit</client_app_type>
        <app_installed_flag>true</app_installed_flag>
        <app_name>UDRCD. app</app_name>
        <app_version>1.0 </app_version>
        <app_webkit_name>Mobile Safari</client_webkit_name>
        <client_version>537.51. 2</client_version>
    </client_details>
    <client_details> //iOS Client with Webbrowser
        <client_IP>10.0.0.123</client_IP>
        <user_agent_string>Mozilla/5.0 (iPhone; CPU iphone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6, 1</client_product_type>
        <client_serial_number>DNXXX1X1XXXX</client_serial_number>
        <client_UDID>3XXXXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
```

-continued

```
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0. 123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5, 1</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Mac OS X</client_OS>
        <client_OS_version>10.9. 3</client_OS_version>
        <client_app_type>web browser</client_app_type>
        <client_name>Mobile Safari</client_name>
        <client_version>537.75.14</client_version>
    </client_details>
    <props_ratios_calculation_request>
        <request_identifier>ID_request_31</request_identifier>
        <archetype_identifier>ID_episode_archetype_multiday</archetype_identifier>
        <coverage_family_identifier>ID_hip_replacement</coverage_family_identifier>
    </props_ratios_calculation_request>
</auth_request>
```

The props ratios calculating server 7506 may send a claims data retrieve request 7525 to a repository 7510 to obtain claims data utilized to calculate props ratios. In one implementation, the claims data retrieve request may include data such as a request identifier, requested data specification, and/or the like. In one embodiment, the props ratios calculating server may provide the following example claims data retrieve request, substantially in the form of a HTTP(S) POST message including XML-formatted data, as provided below:

```
POST/claims_data_retrieve_request.php HTTP/1.1
Host: www.server.com
Content-Type: Application/XML
Content-Length: 667
<? XML version="1.0" encoding="UTF-8"?>
<claims_data_retrieve_request>
    <request_identifier>ID_request_32</request_identifier>
    <requested_data>claims data</requested_data>
</claims_data_retrieve_request>
```

The repository 7510 may send a claims data retrieve response 7529 to the props ratios calculating server 7506 with the requested claims data. In one implementation, the claims data retrieve response may include data such as a response identifier, the requested claims data, and/or the like. In one embodiment, the repository may provide the following example claims data retrieve response, substantially in the form of a HTTP(S) POST message including XML-formatted data, as provided below:

```
POST /claims_data_retrieve_response.php HTTP/1.1
Host: www.server.com
Content-Type: Application/XML
Content-Length: 667
<?XML version = "1.0" encoding = "UTF-8"?>
<claims_data_retrieve_response>
    <response_identifier>ID_response_32</response_identifier>
    <claims_data>
        <claim>
            <claim_code>12345</claim_code>
            <description>Professional Claim - Hip Replacement</description>
            <enrollee_identifier>ID_enrollee_1</enrollee_identifier>
            <date>2/1/20</date>
            <provider_location>Abbott Northwestern Hospital</provider_location>
            <cost>$20K</cost>
        </claim>
        <claim>
            <claim_code>12346</claim_code>
            <description>Facility Claim - Hip Replacement</description>
```

-continued

```
        <enrollee_identifier>ID_enrollee_1</enrollee_identifier>
        <date>2/1/20</date>
        <provider_location>Abbott Northwestern Hospital</provider_location>
        <cost>$10K</cost>
      </claim>
      <claim>
        <claim_code>12355</claim_code>
        <description>Professional Claim - Cardiology Office Visit</description>
        <enrollee_identifier>ID_enrollee_1</enrollee_identifier>
        <date>2/20/20</date>
        <provider_location>Joe's Cardiology Office</provider_location>
        <cost>$1K</cost>
      </claim>
      <claim>
        <claim_code>12347</claim_code>
        <description>Professional Claim - Hip Physical Therapy</description>
        <enrollee_identifier>ID_enrollee_1</enrollee_identifier>
        <date>2/25/20</date>
        <provider_location>Abbott Northwestern Hospital</provider_location>
        <cost>$4K</cost>
      </claim>
      ...
    </claims_data>
  </claims_data_retrieve_response>
```

A props ratios calculating (PRC) component 7533 may utilize the claims data to calculate props ratios and to generate props ratios datastructures. See FIG. 76 for additional details regarding the PRC component.

The props ratios calculating server 7506 may send a props ratios data store request 7537 to the repository 7510 to store the generated props ratios datastructures. In one implementation, the props ratios data store request may include data such as a request identifier, a props ratios data identifier, props ratios datastructures, and/or the like. In one embodiment, the props ratios calculating server may provide the following example props ratios data store request, substantially in the form of a HTTP(S) POST message including XML-formatted data, as provided below:

```
POST /props_ratios_data_store_request.php HTTP/1.1
Host: www.server.com
Content-Type: Application/XML
Content-Length: 667
<?XML version = "1.0" encoding = "UTF-8"?>
<props_ratios_data_store_request>
  <request_identifier>ID_request_33</request_identifier>
  <props_ratios_data_identifier>ID_props_ratios_data_1</props_ratios_data_identifier>
  <props_ratios_data>
    <encounter_type>HIP_REPLACEMENT</encounter_type>
    <props_ratio_data>
      <claim_code>12347</claim_code>
      <props_ratio>4</props_ratio>
    </props_ratio_data>
    <props_ratio_data>
      <claim_code>12355</claim_code>
      <props_ratio>0.2</props_ratio>
    </props_ratio_data>
    ...
  </props_ratios_data>
  <props_ratios_data>
    <encounter_type>VALVE_REPLACEMENT</encounter_type>
    <props_ratio_data>
      <claim_code>12347</claim_code>
      <props_ratio>0.1</props_ratio>
    </props_ratio_data>
    <props_ratio_data>
      <claim_code>12355</claim_code>
      <props_ratio>3</props_ratio>
    </props_ratio_data>
    ...
  </props_ratios_data>
  ...
</props_ratios_data_store_request>
```

The repository 7510 may send a props ratios data store response 7541 to the props ratios calculating server 7506 to confirm that the props ratios datastructures were stored. In one implementation, the props ratios data store response may include data such as a response identifier, a status, and/or the like. In one embodiment, the repository may provide the following example props ratios data store response, substantially in the form of a HTTP(S) POST message including XML-formatted data, as provided below:

POST/props_ratios_data_store_response.php HTTP/1.1
Host: www.server.com
Content-Type: Application/XML
Content-Length: 667
<? XML version="1.0" encoding="UTF-8"?>
<props_ratios_data_store_response>
<response_identifier>ID_response_33
</response_identifier>
status>OK</status>
</props_ratios_data_store_response>

The props ratios calculating server 7506 may send a props ratios calculation response 7545 to the client 7502 to inform the user that the props ratios datastructures were generated successfully. In one implementation, the props ratios calculation response may include data such as a response identifier, a status, and/or the like. In one embodiment, the props ratios calculating server may provide the following example props ratios calculation response, substantially in the form of a HTTP(S) POST message including XML-formatted data, as provided below:

POST/props_ratios_calculation_response.php HTTP/1.1
Host: www.server.com
Content-Type: Application/XML
Content-Length: 667
<? XML version="1.0" encoding="UTF-8"?>
<props_ratios_calculation_response>
<response_identifier>ID_response_31
</response_identifier>
<status>OK</status>
</props_ratios_calculation_response>

FIG. 76 shows a logic flow illustrating embodiments of a props ratios calculating (PRC) component for the UDRCD. In FIG. 76, a props ratios calculation request may be obtained at 7601. For example, the props ratios calculation request may be obtained as a result of a user requesting generation of props ratios datastructures.

Episode archetypes to analyze may be determined at 7605. In one embodiment, an episode archetype may specify how claims data for various coverage families should be processed. For example, an episode archetype may specify analysis window (e.g., 90 days post-trigger, same day), how to calculate anchor spend (e.g., anchor spend may be allowed amounts included in an anchor encounter), how to calculate accessory spend (e.g., accessory spend may be allowed amounts included in an accessory encounter), how to adjust episode costs (e.g., for case-mix), and/or the like. See FIG. 80 for additional details regarding episode archetypes. In one implementation, the props ratios calculation request may be parsed (e.g., using PHP commands) to determine the episode archetype to analyze (e.g., based on the value of the archetype_identifier field). In another implementation, each of the available episode archetypes may be analyzed.

A determination may be made at 7609 whether there remain episode archetypes to analyze. In one implementation, each of the determined episode archetypes may be analyzed. If there remain episode archetypes to analyze, the next episode archetype may be selected for analysis at 7613.

Coverage families to analyze for the selected episode archetype may be determined at 7617. In one implementation, the props ratios calculation request may be parsed (e.g., using PHP commands) to determine the coverage families to analyze for the selected episode archetype (e.g., based on the value of the coverage_family_identifier field). In another implementation, each of the coverage families associated with the selected episode archetype may be analyzed.

A determination may be made at 7621 whether there remain coverage families to analyze. In one implementation, each of the determined coverage families may be analyzed. If there remain coverage families to analyze, the next coverage family may be selected for analysis at 7625.

Encounter types to analyze for the selected coverage family may be determined at 7629. In one implementation, a coverage family may comprise one or more encounter types, and a data field (e.g., stored in a database) of the selected coverage family may be checked to determine the associated encounter types.

A determination may be made at 7633 whether there remain encounter types to analyze. In one implementation, each of the determined encounter types may be analyzed. If there remain encounter types to analyze, the next encounter type may be selected for analysis at 7637.

Trigger codes for the selected encounter type may be determined at 7641. For example, a trigger code may be a medical code, a diagnosis (dx) code, an expanded code, and/or the like. See FIGS. 77A-B for examples of trigger codes. In one embodiment, a trigger code may indicate that a claim is an anchor claim for an encounter type. In one implementation, a set of trigger codes may be associated with each encounter type, and a data field (e.g., stored in a database) of the selected encounter type may be checked to determine the associated set of trigger codes.

Reversion codes for the selected encounter type may be determined at 7645. For example, a reversion code may be a medical code, a diagnosis code, an expanded code, and/or the like. See FIG. 77A for examples of reversion codes. In one embodiment, a reversion code may indicate that a claim is not an anchor claim for an encounter type even though a trigger code for the encounter type is associated with the claim. In one implementation, a set of reversion codes may be associated with each encounter type, and a data field (e.g., stored in a database) of the selected encounter type may be checked to determine the associated set of reversion codes.

Anchor claims corresponding to the selected encounter type may be found based on analysis of claims data at 7649. For example, the claims data may be dNHI claims data. See FIGS. 83A-C for examples of dNHI claims data. In one implementation, the claims data may be analyzed (e.g., based on the values of the service_procedure_code, service_diagnosis_1_code, service_diagnosis_2_code, and/or the like fields) to find claims with claim codes matching any of the trigger codes in the set of trigger codes associated with the encounter type while also not matching any of the reversion codes in the set of reversion codes associated with the encounter type.

An analysis window for the selected encounter type may be determined at 7653. For example, the analysis window may be a time window (e.g., pre-trigger and/or post-trigger) during which other claims may be considered to be relevant to the anchor claim. In one embodiment, an episode archetype may specify the analysis window for associated coverage families and/or for their encounter types. In one implementation, a data field (e.g., stored in a database) of the episode archetype associated with the selected encounter type may be checked to determine the analysis window.

A determination may be made at 7657 whether there remain anchor claims to analyze. In one implementation, each of the found anchor claims may be analyzed. If there remain anchor claims to analyze, the next anchor claim may be selected for analysis at 7661.

An enrollee identifier associated with the selected anchor claim may be determined at 7665. For example, an enrollee identifier may identify (e.g., in a manner that does not reveal personally identifiable information) a patient associated with the selected anchor claim. In one implementation, a data field (e.g., stored in a database) of the selected anchor claim may be checked to determine (e.g., based on the values of the nhi_individual_id, nhi_member_system_id, and/or the like fields) the associated enrollee identifier.

Other claims associated with the enrollee identifier during the analysis window associated with the anchor claim may be determined at 7669. In one embodiment, the analysis window associated with the anchor claim may be determined based on the service date(s) (e.g., based on the values of the earliest_service_from_date, header_earliest_date, header_latest_date, latest_service_thru_date, service_from_date, service_post_date, service_thru_date, and/or the like fields) associated with the anchor claim by adding pre-window and/or post-window time periods as specified by the analysis window for the selected encounter type. For example, a knee arthroscopy may get an analysis window of 90 days post-surgery. In another embodiment, the analysis window associated with the anchor claim may be further extended based on repeat events (e.g., combining overlapping windows into a single analysis window). For example, a knee arthroscopy, followed 40 days later by another knee arthroscopy, may get an analysis window 40+90=130 days long (e.g., the window renews if there is a repeat surgery during the first 90 days). In one implementation, the claims data may be analyzed to find claims, other than the anchor claim, associated with the enrollee identifier (e.g., based on the values of the nhi_individual_id, nhi_member_system_id, and/or the like fields) during the analysis window associated with the anchor claim (e.g., based on the values of the earliest_service_from_date, header_earliest_date, header_latest_date, latest_service_thru_date, service_from_date, service_post_date, service_thru_date, and/or the like fields).

An occurrence count for the selected encounter type for each claim code associated with the determined other claims may be updated at 7673. In one embodiment, if a claim code occurs multiple (e.g., 3) times in the other claims, the occurrence count for the claim code for the selected encounter type may be increased by 1 (e.g., to indicate that the claim code occurred during the analysis window associated with the anchor claim). In another embodiment, if a claim code occurs multiple (e.g., 3) times in the other claims, the occurrence count for the claim code for the selected encounter type may be increased by that number (e.g., 3). In one implementation, claims data for the determined other claims may be analyzed to determine associated claim codes (e.g., based on the values of the service_procedure_code, service_diagnosis_1_code, service_diagnosis_2_code, and/or the like fields) and/or to update occurrence counters for the selected encounter type for the associated claim codes. In some embodiments (e.g., for the single-day archetype), instead of using an analysis window and other claims, claim codes from the anchor claim (e.g., other than the trigger code) may be counted using occurrence counters.

A determination may be made at 7677 whether there remain claim codes to analyze. In one implementation, each of the claim codes may be analyzed. In another implementation, each of the claim codes with a non-zero occurrence count for the selected encounter type may be analyzed. If there remain claim codes to analyze, the next claim code may be selected for analysis at 7681.

An occurrence probability for the selected claim code for the selected encounter type may be calculated at 7685. In one embodiment, the occurrence probability for the selected claim code for the selected encounter type E may indicate the probability pE that the selected claim code is found, given an analysis window for the selected encounter type. In one implementation, the occurrence probability for the selected claim code for the selected encounter type may be calculated by dividing the occurrence count for the selected claim code for the selected encounter type by the number of analysis windows for the selected encounter type (e.g., the number of analysis windows may be the same as the number of anchor claims found at 7649, or may be less in embodiments where anchor claims from overlapping windows may be combined into a single analysis window). For example, if a claim code for physical therapy occurred 2 times in 10 analysis windows for hip replacement, the occurrence probability pE for the claim code for physical therapy, given an analysis window for hip replacement, may be determined as 2/10=20%.

An occurrence probability for the selected claim code for complement encounter types may be calculated at 7689. For example, if the selected encounter type is hip replacement, complement encounter types may be "medical events that are not hip replacement". In one embodiment, the occurrence probability for the selected claim code for the complement encounter types C may indicate the probability pC that the selected claim code is found, given an analysis window for the complement encounter types. In one implementation, the occurrence probability for the selected claim code for the complement encounter types may be calculated by dividing the occurrence count for the selected claim code for the complement encounter types by the number of analysis windows for the complement encounter types. For example, if a claim code for physical therapy occurred 5 times in 100 analysis windows for complement encounter types of hip replacement, the occurrence probability pC for the claim code for physical therapy, given an analysis window for complement encounter types of hip replacement, may be determined as 5/100=5%. In one implementation, determining the occurrence count for the selected claim code for the complement encounter types and/or determining the number of analysis windows for the complement encounter types may be done in a similar manner as described with regard to 7637-7673, combining results for encounter types included in the complement encounter types. In some implementations, place-of-service matching may be performed while analyzing anchor claims (e.g., if during analysis for E it was determined that 15% of anchor claims were done in the inpatient hospital place of service, anchor lines for C may be discarded until the % inpatient for C matches the % inpatient for E; same for outpatient, office, etc., places of service).

A props ratio for the selected claim code for the selected encounter type may be calculated at 7693. In one implementation, the props ratio for the selected claim code for the selected encounter type may be calculated as pE/pC. For example, the props ratio for the claim code for physical therapy for hip replacement encounter type may be calculated as 0.2/0.05=4. In another example, the props ratio for the claim code for physical therapy for heart valve replacement encounter type may be calculated to be 0.1.

Props ratios datastructures (e.g., props ratios for each claim code for each encounter type) may be stored at 7697.

In one implementation, the props ratios datastructures may be stored via a MySQL database command similar to the following:

```
INSERT INTO PropsRatios (EncounterType, ClaimCode,
    PropsRatio)
VALUES (HIP_REPLACEMENT, 12347, 4),
    (HIP_REPLACEMENT, 12355, 0.2),
    . . .
(VALVE_REPLACEMENT, 12347, 0.1),
(VALVE_REPLACEMENT, 12355, 3);
```

FIGS. 77A-B shows data structure(s) for the UDRCD. Screen 7701 shows a mapping from encounter types to medical trigger codes. For example, the knee arthroscopy encounter type may be associated with medical trigger codes 27380, 27381, 27403, etc. as illustrated in the figure. Screen 7705 shows a mapping from an encounter type to reversion codes. For example, the knee arthroscopy encounter type may be associated with reversion codes corresponding to osteomyelitis, upper leg fracture, lower leg fracture, etc. reversion events (e.g., a reversion event may be a set of codes corresponding to a coverage family, encounter type, medical code, diagnosis code, expanded code, and/or the like) as illustrated in the figure. Screens 7710 and 7715 show mappings from encounter types to diagnosis trigger codes for Office Visit Condition archetype and PTOTST archetype, respectively. For example, the acupuncture encounter type may be associated with diagnostic trigger codes M546, M2555, M549, etc. as illustrated in the figure. In another example, the physical therapy visit encounter type may be associated with diagnosis trigger codes M545, N542, M2551, etc. as illustrated in the figure. In one embodiment (e.g., for the Office Visit Condition archetype), diagnosis trigger codes may be used instead of medical trigger codes. In another embodiment (e.g., for the PTOTST archetype), diagnosis trigger codes may be used in addition to the medical trigger codes. Screen 7720 shows that some trigger codes (e.g., the shortened primary dx (e.g., diagnosis ICD-10-CM) codes shown in column B of 7715) may be expanded into child codes that exist for each. For example, M2551 has child codes M25511, M25512, M25519 as illustrated in the figure.

FIGS. 78A-C show implementation case(s) for the UDRCD. In FIG. 78A, exemplary pseudocode to initiate generating props ratios datastructures is illustrated. The exemplary pseudocode of the execute_other_episode_run function is illustrated in FIG. 78B. The create function, called by the execute_other_episode_run function, may execute exemplary pseudocode illustrated in FIG. 78C.

Figure 79A:
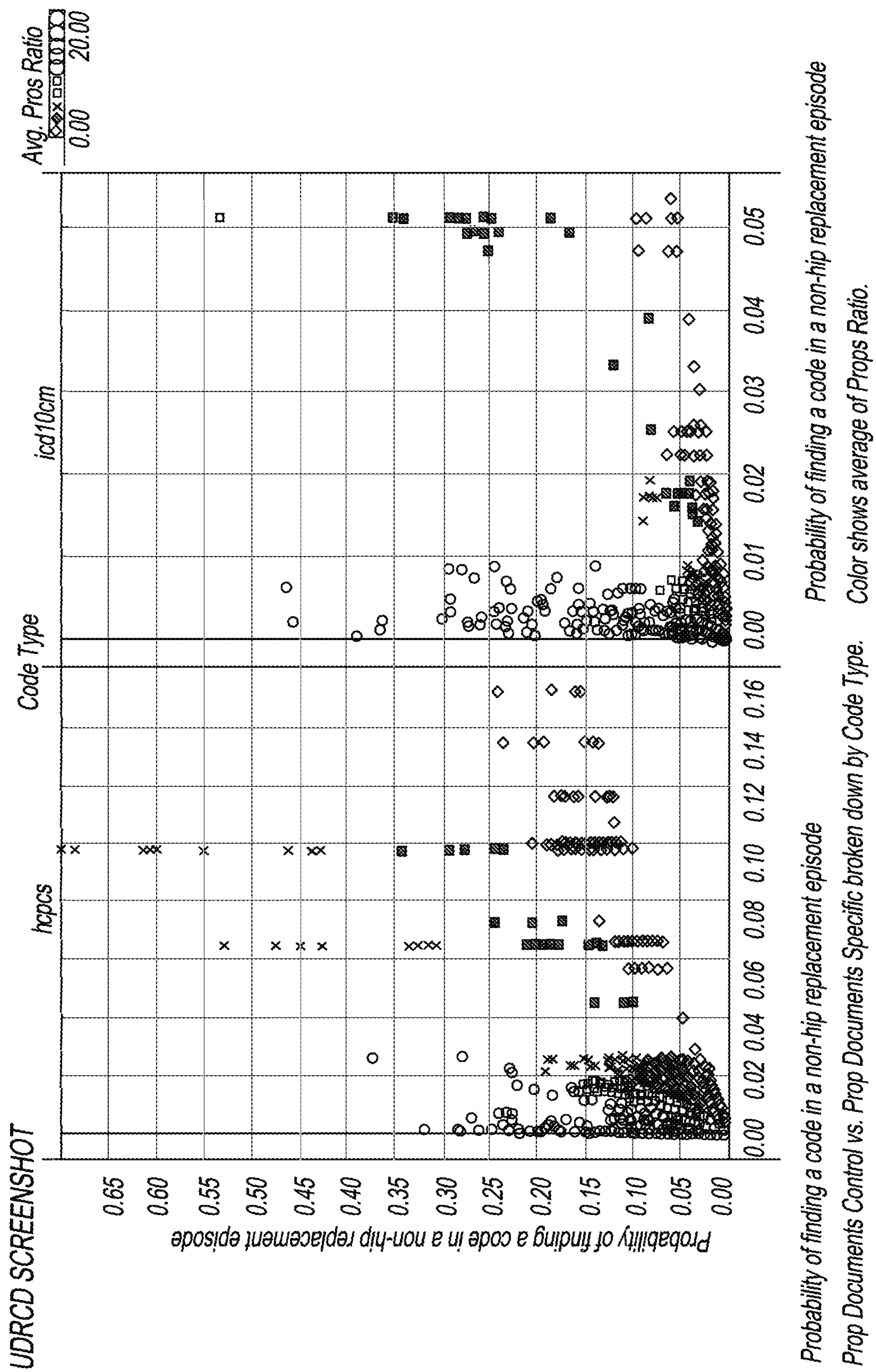

FIGS. 79A-C show screenshot diagram(s) illustrating embodiments of the UDRCD. In FIG. 79A, a diagram of exemplary props ratios for the hip replacement encounter type is illustrated. The diagram shows the probability of finding a code in a hip replacement episode window vs. the probability of finding a code in a non-hip replacement episode window for HCPCS and ICD-10-CM codes. In one embodiment, props ratios may indicate the statistical relevance of a given code to an anchor service, and, depending on the episode archetype, may be used on their own or in combination within an encounter to determine whether accessary spend within an episode window is relevant and should be included in the episode.

In FIG. 79B, a diagram of exemplary props ratios for various encounter types is illustrated. The diagram shows the predictions of a 2-variable logistic regression. Each point is a medical encounter (a "day-or-stay": a day including any care; or a hospital stay). Each encounter has codes on it, and each code has an associated props ratio. The maximum HCPCS (service codes: "this was done") props ratio, and the maximum ICD-10-CM (diagnosis code: "this is why it was done") are taken. The values of these maximums are the x and y axis, respectively. In one implementation, in order to know whether or not a code was actually relevant a subset of data is labeled (e.g., by a clinician), with relevant codes shown as blue points and irrelevant codes shown as red points. The cut line corresponds to a props ratios relevance function that best separates relevant and irrelevant codes. The props ratios and the props ratios relevance functions may be used to classify various encounters across various episodes as relevant or irrelevant.

In one embodiment, props ratios are determined based on statistical relevance to the service/condition being evaluated for each HCPCS and ICD-10-CM code. For the single-day episode archetype, those ratios are then applied to determine whether each claim line should be included in the episode. For multi-day episode archetypes, each encounter is evaluated based on the combination of props ratio scores for the codes occurring within the encounter to determine whether or not the entire encounter should be included in the episode for the trigger being evaluated. Claim lines within encounters (e.g., for single-day episodes) and overall encounters (e.g., for multi-day episodes) are analyzed and labeled as relevant to the trigger service/condition for a subset of encounter types. A cut line for each type of episode is then determined based on the best fit across episodes of that type (e.g., using the least squares method). It is to be understood that, in some implementations, a curve (e.g., a polynomial curve) may be used instead of a cut line.

In FIG. 79C, exemplary accuracy results for various encounter types are shown. Diagrams for multi-day episode results and diagrams for single-day episode results are illustrated.

FIG. 80 shows an architecture for the UDRCD. In FIG. 80, an embodiment of episode archetypes and their characteristics is illustrated. For example, the multi-day episode archetype may be used to evaluate providers based on the total healthcare spend for a major procedure and any related spend in a 90-day window. For example, the single-day episode archetype may be used to evaluate providers based on the total healthcare spend for a minor procedure. For example, the condition episode archetype may be used to evaluate providers based on the total healthcare spend for a given condition in a 12-month window. For example, the imaging episode archetype may be used to evaluate providers based on the total healthcare spend for an imaging procedure, including both technical and professional spend. For example, the maternity episode archetype may be used to evaluate providers based on the total healthcare spend for a delivery.

FIG. 81 shows a datagraph illustrating data flow(s) for the UDRCD. In FIG. 81, a client 8102 (e.g., of a user) may send an encounters build request 8121 to an encounters building server 8106 to facilitate generating encounter datastructures. For example, the client may be a desktop, a laptop, a tablet, a smartphone, a smartwatch, and/or the like that is executing a client application. In one implementation, the encounters build request may include data such as a request identifier, a claims data identifier, and/or the like. In one embodiment, the client may provide the following example encounters build request, substantially in the form of a HTTP(S) POST message including XML-formatted data, as provided below:

```
POST/encounters_build_request.php HTTP/1.1
Host: www.server.com
Content-Type: Application/XML
Content-Length: 667
<? XML version="1.0" encoding="UTF-8"?>
<encounters_build_request>
  <request_identifier>ID_request_41</request_identifier>
  <claims_data>ID_claims_data_1</claims_data>
</encounters_build_request>
```

The encounters building server 8106 may send a claims data retrieve request 8125 to a repository 8110 to obtain claims data utilized to generate encounter datastructures. In one implementation, the claims data retrieve request may include data such as a request identifier, requested data specification, and/or the like. In one embodiment, the encounters building server may provide the following example claims data retrieve request, substantially in the form of a HTTP(S) POST message including XML-formatted data, as provided below:

```
POST/claims_data_retrieve_request.php HTTP/1.1
Host: www.server.com
Content-Type: Application/XML
Content-Length: 667
<? XML version="1.0" encoding="UTF-8"?>
<claims_data_retrieve_request>
  <request_identifier>ID_request_42</request_identifier>
  <claims_data>ID_claims_data_1</claims_data>
</claims_data_retrieve_request>
```

The repository 8110 may send a claims data retrieve response 8129 to the encounters building server 8106 with the requested claims data. In one implementation, the claims data retrieve response may include data such as a response identifier, the requested claims data, and/or the like. In one embodiment, the repository may provide the following example claims data retrieve response, substantially in the form of a HTTP(S) POST message including XML-formatted data, as provided below:

```
POST /claims_data_retrieve_response.php HTTP/1.1
Host: www.server.com
Content-Type: Application/XML
Content-Length: 667
<?XML version = "1.0" encoding = "UTF-8"?>
<claims_data_retrieve_response>
  <response_identifier>ID_response_42</response_identifier>
  <claims_data>
    <claim>
      <claim_code>12345</claim_code>
      <description>Professional Claim - Hip Replacement</description>
      <enrollee_identifier>ID_enrollee_1</enrollee_identifier>
      <date>2/1/20</date>
      <provider_location>Abbott Northwestern Hospital</provider_location>
      <cost>$20K</cost>
    </claim>
    <claim>
      <claim_code>12346</claim_code>
      <description>Facility Claim - Hip Replacement</description>
      <enrollee_identifier>ID_enrollee_1</enrollee_identifier>
      <date>2/1/20</date>
      <provider_location>Abbott Northwestern Hospital</provider_location>
      <cost>$10K</cost>
    </claim>
    <claim>
      <claim_code>12355</claim_code>
      <description>Professional Claim - Cardiology Office Visit</description>
      <enrollee_identifier>ID_enrollee_1</enrollee_identifier>
      <date>2/20/20</date>
      <provider_location>Joe's Cardiology Office</provider_location>
      <cost>$1K</cost>
    </claim>
    <claim>
      <claim_code>12347</claim_code>
      <description>Professional Claim - Hip Physical Therapy</description>
      <enrollee_identifier>ID_enrollee_1</enrollee_identifier>
      <date>2/25/20</date>
      <provider_location>Abbott Northwestern Hospital</provider_location>
      <cost>$4K</cost>
    </claim>
    ...
  </claims_data>
</claims_data_retrieve_response>
```

An encounters building (ENB) component 8133 may utilize the claims data to generate encounter datastructures. See FIG. 82 for additional details regarding the ENB component.

The encounters building server 8106 may send an encounters data store request 8137 to the repository 8110 to store the generated encounter datastructures. In one implementation, the encounters data store request may include data such as a request identifier, an encounters data identifier, encounter datastructures, and/or the like. In one embodiment, the encounters building server may provide the following example encounters data store request, substantially in the form of a HTTP(S) POST message including XML-formatted data, as provided below:

```
POST/encounters_data_store_request.php HTTP/1.1
Host: www.server.com
Content-Type: Application/XML
Content-Length: 667
<? XML version="1.0" encoding="UTF-8"?>
<encounters_data_store_request>
  <request_identifier>ID_request_43</request_identifier>
  <encounters_data_identifier>ID_encounters_data_1</encounters_data_identifier>
  <encounter_data>
    <encounter_identifier>ID_encounter_1
      </encounter_identifier>
    <enrollee_identifier>ID_enrollee_1</enrollee_identifier>
    <date>Feb. 1, 2020</date>
    <place_of_service>OUTPATIENT</place_of_service>
    <provider_location>Abbott Northwestern Hospital</provider_location>
    <claim_code>12345</claim_code>
    <claim_code>12346</claim_code>
    <encounter_type>HIP_REPLACEMENT</encounter_type>
    <encounter_cost>$30K</encounter_cost>
  </encounter_data>
  <encounter_data>
    <encounter_identifier>ID_encounter_2
      </encounter_identifier>
    <enrollee_identifier>ID_enrollee_1</enrollee_identifier>
    <date>Feb. 20, 2020</date>
    <place_of_service>OUTPATIENT</place_of_service>
    <provider_location>Joe's Cardiology Office</provider_location>
    <claim_code>12355</claim_code>
    <encounter_type>CARDIOLOGY_OFFICE_VISIT</encounter_type>
    <encounter_cost>$1K</encounter_cost>
  </encounter_data>
  <encounter_data>
    <encounter_identifier>ID_encounter_3
      </encounter_identifier>
    <enrollee_identifier>ID_enrollee_1</enrollee_identifier>
    <date>Feb. 25, 2020</date>
    <place_of_service>OUTPATIENT</place_of_service>
    <provider_location>Abbott Northwestern Hospital</provider_location>
    <claim_code>12347</claim_code>
    <encounter_type>HIP_PHYSICAL_THERAPY</encounter_type>
    <encounter_cost>$4K</encounter_cost>
  </encounter_data>
  . . .
</encounters_data_store_request>
```

The repository 8110 may send an encounters data store response 8141 to the encounters building server 8106 to confirm that the encounter datastructures were stored. In one implementation, the encounters data store response may include data such as a response identifier, a status, and/or the like. In one embodiment, the repository may provide the following example encounters data store response, substantially in the form of a HTTP(S) POST message including XML-formatted data, as provided below:

```
POST/encounters_data_store_response.php HTTP/1.1
Host: www.server.com
Content-Type: Application/XML
Content-Length: 667
<? XML version="1.0" encoding="UTF-8"?>
<encounters_data_store_response>
  <response_identifier>ID_response_43
    </response_identifier>
  <status>OK</status>
</encounters_data_store_response>
```

The encounters building server 8106 may send an encounters build response 8145 to the client 8102 to inform the user that the encounter datastructures were generated successfully. In one implementation, the encounters build response may include data such as a response identifier, a status, and/or the like. In one embodiment, the encounters building server may provide the following example encounters build response, substantially in the form of a HTTP(S) POST message including XML-formatted data, as provided below:

```
POST/encounters_build_response.php HTTP/1.1
Host: www.server.com
Content-Type: Application/XML
Content-Length: 667
<? XML version="1.0" encoding="UTF-8"?>
<encounters_build_response>
  <response_identifier>ID_response_41
    </response_identifier>
  <status>OK</status>
</encounters_build_response>
```

FIG. 82 shows a logic flow illustrating embodiments of an encounters building (ENB) component for the UDRCD. In FIG. 82, an encounters build request may be obtained at 8201. For example, the encounters build request may be obtained as a result of a user requesting generation of encounter datastructures.

Claims data (e.g., identified by enrollee identifier and service dates) may be obtained at 8205. For example, the claims data may be dNHI claims data. See FIGS. 83A-C for examples of dNHI claims data. In one implementation, the claims data may be retrieved via a claims data retrieve request.

A determination may be made at 8209 whether there remain enrollee identifiers to analyze. For example, an enrollee identifier may identify (e.g., in a manner that does not reveal personally identifiable information) a patient associated with a claim. In one implementation, each of the enrollee identifiers in the claims data may be analyzed.

A determination may be made at 8217 whether there remain service dates associated with the selected enrollee identifier to analyze. In one implementation, each of the service dates associated with the selected enrollee identifier may be analyzed. If there remain service dates associated with the selected enrollee identifier to analyze, the next service date may be selected for analysis at 8221.

Claims corresponding to the selected enrollee identifier and the selected service date may be found at 8225. In one implementation, the claims data may be analyzed to find claims associated with the selected enrollee identifier (e.g., based on the values of the nhi_individual_id, nhi_member_system_id, and/or the like fields) and the selected service date (e.g., based on the values of the earliest_service_from_date, header_earliest_date, header_latest_date, latest_service_thru_date, service_from_date, service_post_date, service_thru_date, and/or the like fields).

A place of service (POS) associated with the found claims may be determined at 8229. For example, the POS may be inpatient, outpatient, and/or the like. In one implementation, the POS associated with the found claims may be determined based on the most acute POS (e.g., inpatient may be considered more acute than outpatient) associated with any of the found claims.

An encounter grouping type (e.g., by stay, by day) for the found claims may be determined at 8233. In one embodiment, the encounter grouping type may indicate how to group claims into encounters. For example, the encounter grouping type may be by stay (e.g., group claims related to an inpatient stay into an encounter), by day (e.g., group claims that occurred on the same day into an encounter), and/or the like. In one implementation, the encounter grouping type may be determined based on the POS (e.g., by stay for inpatient POS, by day for outpatient POS).

A determination may be made at 8237 whether the encounter grouping type for the found claims is by day or by stay. If the encounter grouping type for the found claims is by day, an encounter datastructure for the found claims may be generated at 8241. In one implementation, the encounter datastructure may be an object that includes data fields storing information such as an encounter identifier (e.g., a new unique identifier), the selected enrollee identifier, the selected service date(s), claim identifiers of the found claims (e.g., based on the values of the nhi_claim_nbr, nhi_orig_close_claim_nbr, original_close_claim_nbr, and/or the like fields), claim codes associated with the found claims, and/or the like.

If the encounter grouping type for the found claims is by stay, other claims corresponding to the range of stay dates of the inpatient stay associated with the selected service date for the selected enrollee identifier may be found at 8245. In one implementation, the claims data may be analyzed to find other claims associated with the selected enrollee identifier (e.g., based on the values of the nhi_individual_id, nhi_member_system_id, and/or the like fields) with a service date that falls within the range of stay dates of the inpatient stay (e.g., based on the values of the earliest_service_from_date, header_earliest_date, header_latest_date, latest_service_thru_date, service_from_date, service_post_date, service_thru_date, and/or the like fields). The other claims may be added to the found claims. It is to be understood that, in some implementations, the other claims may be skipped during subsequent service dates analysis iterations to avoid duplication. An encounter datastructure for the found claims may be generated as discussed with regard to 8241.

A determination may be made at 8249 whether there remain encounter datastructures to analyze. In one implementation, each of the generated encounter datastructures may be analyzed. If there remain encounter datastructures to analyze, the next encounter datastructure may be selected for analysis at 8253.

An encounter type for the selected encounter datastructure may be determined at 8257. In one implementation, the encounter type for the selected encounter datastructure may be determined by comparing claim codes of claims associated with the selected encounter datastructure with trigger codes and/or reversion codes associated with each encounter type to find a matching encounter type (e.g., matching any of an encounter type's trigger codes while also not matching any of the encounter type's reversion codes), and a corresponding data field of the selected encounter datastructure may be updated to store this information. In some implementations, claims that match an encounter type definition rule may be marked as anchor claims of the selected encounter datastructure. See FIGS. 77A-B for examples of trigger codes and reversion codes.

Encounter attributes for the selected encounter datastructure may be determined at 8261. In one implementation, claims associated with the selected encounter datastructure may be analyzed to determine encounter attributes (e.g., POS, provider location, practitioner) using encounter attribution rules, and corresponding data fields of the selected encounter datastructure may be updated to store this information. For example, encounter attribution rules similar to the following may be used:

POS attribution
Select the most acute POS on any claim line in the encounter via a POS hierarchy
Location attribution
Exemplary sort rules (~96% accuracy; N=350)
encounter_id
claim_type
trigger_code_present
amt_allowed (desc)
Practitioner attribution
Exemplary sort rules (~97% accuracy; N=355)
encounter_id
claim_type (desc)
trigger_code_present
npi_type
amt_allowed (desc)

An encounter cost for the selected encounter datastructure may be calculated at 8265. For example, the encounter cost may represent the sum of the total allowed costs of each claim associated with the selected encounter datastructure. In one implementation, claims associated with the selected encounter datastructure may be analyzed to determine a cost for each of the claims (e.g., based on the values of the amt_allowed, amt_submitted_charge, and/or the like fields), the determined costs may be summed to calculate the encounter cost, and a corresponding data field of the selected encounter datastructure may be updated to store this information.

The encounter datastructures may be stored at 8269. In one implementation, the encounter datastructures may be stored via a MySQL database command similar to the following:

```
INSERT INTO Encounters (encounterID, enrolleeID, dateStart, dateEnd, associatedClaimCodes, encounterType, encounterCost, encounterPOS, encounterProviderLocation)
VALUES (ID_encounter_1, ID_enrollee_1, "Feb. 1, 2020", "Feb. 1, 2020", "12345, 12346",
    HIP_REPLACEMENT, 30000, OUTPATIENT, "Abbott Northwestern Hospital"), (ID_encounter_2, ID_enrollee_1, "Feb. 20, 2020", "Feb. 20, 2020", "12355",
```

CARDIOLOGY_OFFICE_VISIT, 1000, OUTPATIENT, “Joe’s Cardiology Office”), (ID_encounter_3, ID_enrollee_1, “Feb. 25, 2020”, “Feb. 25, 2020”, “12347”, HIP_PHYSICAL_THERAPY, 4000, OUTPATIENT, “Abbott Northwestern Hospital”), . . . ;

FIGS. 83A-C show data structure(s) for the UDRCD. In FIGS. 83A-C examples of dNHI claims data are illustrated. In one embodiment, dNHI claims data identifies patients in a manner that does not reveal personally identifiable information. FIG. 83A shows an example of a practitioner (e.g., physician) claim. FIG. 83B shows an example of a facility (e.g., hospital) claim. FIG. 83C shows an example of a claim comprising practitioner and facility claims merged into a unified claim identified by enrollee identifier and service date(s).

FIG. 84 shows a datagraph illustrating data flow(s) for the UDRCD. In FIG. 84, a client 8402 (e.g., of a user) may send an episodes build request 8421 to an episodes building server 8406 to facilitate generating episode datastructures. For example, the client may be a desktop, a laptop, a tablet, a smartphone, a smartwatch, and/or the like that is executing a client application. In one implementation, the episodes build request may include data such as a request identifier, an encounters data identifier, a props ratios data identifier, a coverage family identifier, and/or the like. In one embodiment, the client may provide the following example episodes build request, substantially in the form of a HTTP(S) POST message including XML-formatted data, as provided below:

```
POST/episodes_build_request.php HTTP/1.1
Host: www.server.com
Content-Type: Application/XML
Content-Length: 667
<? XML version="1.0" encoding="UTF-8"?>
<episodes_build_request>
  <request_identifier>ID_request_51</request_identifier>
  <encounters_data_identifier>ID_encounters_data_1</encounters_data_identifier>
  <props_ratios_data_identifier>ID_props_ratios_data_1</props_ratios_data_identifier>
  <coverage_family_identifier>ID_hip_replacement</coverage_family_identifier>
</episodes_build_request>
```

The episodes building server 8406 may send an encounters data retrieve request 8425 to a repository 8410 to obtain encounter datastructures utilized to generate episode datastructures. In one implementation, the encounters data retrieve request may include data such as a request identifier, requested data specification, and/or the like. In one embodiment, the episodes building server may provide the following example encounters data retrieve request, substantially in the form of a HTTP(S) POST message including XML-formatted data, as provided below:

```
POST/encounters_data_retrieve_request.php HTTP/1.1
Host: www.server.com
Content-Type: Application/XML
Content-Length: 667
<? XML version="1.0" encoding="UTF-8"?>
<encounters_data_retrieve_request>
  <request_identifier>ID_request_52</request_identifier>
  encounters_data_identifier>ID_encounters_data_1</encounters_data_identifier>
</encounters_data_retrieve_request>
```

The repository 8410 may send an encounters data retrieve response 8429 to the episodes building server 8406 with the requested encounters data. In one implementation, the encounters data retrieve response may include data such as a response identifier, the requested encounters data, and/or the like. In one embodiment, the repository may provide the following example encounters data retrieve response, substantially in the form of a HTTP(S) POST message including XML-formatted data, as provided below:

```
POST /encounters_data_retrieve_response. php HTTP/1.1
Host: www.server. com
Content-Type: Application/XML
Content-Length: 667
<?XML version = "1.0" encoding = "UTF-8"?>
<encounters_data_retrieve_response>
  <response_identifier>ID_response_52</response_identifier>
  <encounter_data>
    <encounter_identifier>ID_encounter_1</encounter_identifier>
    <enrollee_identifier>ID_enrollee_1</enrollee_identifier>
    <date>2/1/20</date>
    <place_of_service>OUTPATIENT</place_of_service>
    <provider_location>Abbott Northwestern
    Hospital</provider_location>
    <claim_code>12345</claim_code>
    <claim_code>12346</claim_code>
    <encounter_type>HIP_REPLACEMENT</encounter_type>
    <encounter_cost>$30K</encounter_cost>
  </encounter_data>
  <encounter_data>
    <encounter_identifier>ID_encounter_2</encounter_identifier>
    <enrollee_identifier>ID_enrollee_1</enrollee_identifier>
    <date>2/20/20</date>
    <place_of_service>OUTPATIENT</place_of_service>
    <provider_location> Joe's Cardiology Office</provider_location>
    <claim_code>12355</claim_code>
    <encounter_type>CARDIOLOGY_OFFICE_VISIT</encounter_type>
    <encounter_cost>$1K</encounter_cost>
  </encounter_data>
  <encounter_data>
    <encounter_identifier>ID_encounter_3</encounter_identifier>
    <enrollee_identifier>ID_enrollee_1</enrollee_identifier>
    <date>2/25/20</date>
    <place_of_service>OUTPATIENT</place_of_service>
    <provider_location>Abbott Northwestern
    Hospital</provider_location>
    <claim_code>12347</claim_code>
    <encounter_type>HIP_PHYSICAL_THERAPY</encounter_type>
    <encounter_cost>$4K</encounter_cost>
  </encounter_data>
  ...
</encounters_data_retrieve_response>
```

The episodes building server 8406 may send a props ratios data retrieve request 8433 to the repository 8410 to obtain props ratios datastructures utilized to generate episode datastructures. In one implementation, the props ratios data retrieve request may include data such as a request identifier, requested data specification, and/or the like. In one embodiment, the episodes building server may provide the following example props ratios data retrieve request, substantially in the form of a HTTP(S) POST message including XML-formatted data, as provided below:

```
POST/props_ratios_data_retrieve_request.php HTTP/1.1
Host: www.server.com
Content-Type: Application/XML
Content-Length: 667
<? XML version="1.0" encoding="UTF-8"?>
<props_ratios_data_retrieve_request>
  <request_identifier>ID_request_53</request_identifier>
  <props_ratios_data_identifier>ID_props_ratios_data_1</props_ratios_data_identifier>
</props_ratios_data_retrieve_request>
```

The repository 8410 may send a props ratios data retrieve response 8437 to the episodes building server 8406 with the requested props ratios data. In one implementation, the props ratios data retrieve response may include data such as a response identifier, the requested props ratios data, and/or the like. In one embodiment, the repository may provide the following example props ratios data retrieve response, substantially in the form of a HTTP(S) POST message including XML-formatted data, as provided below:

```
POST /props_ratios_data_retrieve_response.php HTTP/1. 1
Host: www.server. com
Content-Type: Application/XML
Content-Length: 667
<?XML version = "1.0" encoding = "UTF-8"?>
<props_ratios_data_retrieve_response>
  <response_identifier>ID_response_53</response_identifier>
  <props_ratios_data>
    <encounter_type>HIP_REPLACEMENT</encounter_type>
    <props_ratio_data>
      <claim_code>12347</claim_code>
      <props_ratio>4</props_ratio>
    </props_ratio_data>
    <props_ratio_data>
      <claim_code>12355</claim_code>
      <props_ratio>0.2</props_ratio>
    </props_ratio_data>
    ...
  </props_ratios_data>
  <props_ratios_data>
    <encounter_type>VALVE_REPLACEMENT</encounter_type>
    <props_ratio_data>
      <claim_code>12347</claim_code>
      <props_ratio>0.1</props_ratio>
    </props_ratio_data>
    <props_ratio_data>
      <claim_code>12355</claim_code>
      <props_ratio>3</props_ratio>
    </props_ratio_data>
    ...
  </props_ratios_data>
  ...
</props_ratios_data_retrieve_response>
```

An episodes building (EPB) component 8441 may utilize encounter datastructures and props ratios datastructures to generate episode datastructures. See FIG. 85 for additional details regarding the EPB component.

The episodes building server 8406 may send an episodes data store request 8445 to the repository 8410 to store the generated episode datastructures. In one implementation, the episodes data store request may include data such as a request identifier, an episodes data identifier, episode datastructures, and/or the like. In one embodiment, the episodes building server may provide the following example episodes data store request, substantially in the form of a HTTP(S) POST message including XML-formatted data, as provided below:

```
POST /episodes_data_store_request. php HTTP/1.1
Host: www.server. com
Content-Type: Application/XML
Content-Length: 667
<?XML version = "1.0" encoding = "UTF-8"?>
<episodes_data_store_request>
  <request_identifier>ID_request_54</request_identifier>
  <episodes_data_identifier>ID_episodes_data_1</episodes_data_identifier>
  <episode_data>
    <episode_identifier>ID_episode_1</episode_identifier>
    <encounter_type>HIP_REPLACEMENT</encounter_type>
    <enrollee_identifier>ID_enrollee_1</enrollee_identifier>
    <episode_window_start_date>2/1/20</episode_window_start_date>
    <episode_window_end_date>3/10/20</episode_window_end_date>
    <anchor_encounter_identifier>ID_encounter_1</anchor_encounter_identifier>
    <accessory_encounter_identifiers>
      ID_encounter_3, ...
    </accessory_encounter_identifiers>
    <place_of_service>OUTPATIENT</place_of_service>
    <provider_location>Abbott Northwestern Hospital</provider_location>
    <episode_cost>$40K</episode_cost>
  </episode_data>
  ...
</episodes_data_store_request>
```

The repository 8410 may send an episodes data store response 8449 to the episodes building server 8406 to confirm that the episode datastructures were stored. In one implementation, the episodes data store response may include data such as a response identifier, a status, and/or the like. In one embodiment, the repository may provide the following example episodes data store response, substantially in the form of a HTTP(S) POST message including XML-formatted data, as provided below:

```
POST/episodes_data_store_response.php HTTP/1.1
Host: www.server.com
Content-Type: Application/XML
Content-Length: 667
<? XML version="1.0" encoding="UTF-8"?>
<episodes_data_store_response>
  <response_identifier>ID_response_
    54</response_identifier>
  <status>OK</status>
</episodes_data_store_response>
```

The episodes building server 8406 may send an episodes build response 8453 to the client 8402 to inform the user that the episode datastructures were generated successfully. In one implementation, the episodes build response may include data such as a response identifier, a status, and/or the like. In one embodiment, the episodes building server may provide the following example episodes build response, substantially in the form of a HTTP(S) POST message including XML-formatted data, as provided below:

```
POST/episodes_build_response.php HTTP/1.1
Host: www.server.com
Content-Type: Application/XML
Content-Length: 667
<? XML version="1.0" encoding="UTF-8"?>
<episodes_build_response>
```

<response_identifier>ID_response_51
</response_identifier>
<status>OK</status>
</episodes_build_response>

FIG. 85 shows a logic flow illustrating embodiments of an episodes building (EPB) component for the UDRCD. In FIG. 85, an episodes build request for a coverage family may be obtained at 8501. For example, the episodes build request may be obtained as a result of a user requesting generation of episode datastructures.

Encounter types to analyze for the coverage family may be determined at 8505. In one implementation, a coverage family may comprise one or more encounter types (e.g., with a coverage family definition specifying encounter types corresponding to anchor encounters for the coverage family), and a data field (e.g., stored in a database) of the selected coverage family may be checked to determine the associated encounter types.

A determination may be made at 8509 whether there remain encounter types to analyze. In one implementation, each of the determined encounter types for the coverage family may be analyzed. If there remain encounter types to analyze, the next encounter type may be selected for analysis at 8513.

Anchor encounters for the selected encounter type may be found at 8517. In one embodiment, encounters of the selected encounter type may be considered anchor encounters for the coverage family. In one implementation, the anchor encounters for the selected encounter type may be found by comparing the selected encounter type with a corresponding data field of encounter datastructures to determine matching encounter datastructures. For example, the anchor encounters for the selected encounter type may be found via a MySQL database command similar to the following:

```
SELECT encounterID
FROM Encounters
WHERE encounterType=HIP_REPLACEMENT;
```

In another implementation, encounter datastructures may be analyzed in a similar manner as discussed at 8257 to find encounter datastructures that match the specifications of the coverage family definition.

An analysis window for the selected encounter type may be determined at 8525. For example, the analysis window may be a time window (e.g., pre-trigger and/or post-trigger) during which accessory encounters may be considered to be relevant to the anchor encounter. In one embodiment, an episode archetype may specify the analysis window for the coverage family and/or for the selected encounter type. In one implementation, a data field (e.g., stored in a database) of the episode archetype associated with the selected encounter type may be checked to determine the analysis window.

A props ratios relevance function for the selected encounter type may be determined at 8533. In one embodiment, a props ratios relevance function best separates relevant and irrelevant claim codes (e.g., for an encounter type, for a coverage family). For example, claim codes above a cut line corresponding to the props ratios relevance function may be classified as relevant, while claim codes below the cut line corresponding to the props ratios relevance function may be classified as irrelevant. In one implementation, a data field (e.g., stored in a database) of the selected encounter type may be checked to determine the associated props ratios relevance function.

A determination may be made at 8537 whether there remain anchor encounters to analyze. In one implementation, each of the found anchor encounters for the selected encounter type may be analyzed. If there remain anchor encounters to analyze, the next anchor encounter datastructure may be selected for analysis at 8541.

An episode datastructure for the selected anchor encounter may be generated at 8545. In one implementation, the episode datastructure may be an object that includes data fields storing information such as an episode identifier (e.g., a new unique identifier), an anchor encounter identifier (e.g., the encounter identifier of the selected anchor encounter datastructure), an encounter type (e.g., the selected encounter type), an episode window (e.g., determined based on analysis of the selected anchor encounter datastructure in a similar manner as discussed with regard to 7669), and/or the like.

An enrollee identifier associated with the selected anchor encounter may be determined at 8549. For example, an enrollee identifier may identify (e.g., in a manner that does not reveal personally identifiable information) a patient associated with the selected anchor encounter. In one implementation, the enrollee identifier associated with the selected anchor encounter may be determined via a MySQL database command similar to the following:

```
SELECT enrolleeID
FROM Encounters
WHERE encounterID=ID_encounter_1;
```

A determination may be made at 8553 whether the selected anchor encounter is associated with an episode archetype that utilizes accessory encounters. See FIG. 80 for examples of episode archetypes. If the selected anchor encounter is associated with an episode archetype that does not utilize accessory encounters (e.g., single-day episode archetype), a determination may be made at 8557 whether there remain claims to analyze (e.g., non-anchor claims of the selected anchor encounter). In one implementation, each of the non-anchor claims may be analyzed. If there remain claims to analyze, the next claim may be selected for analysis at 8561.

A claim code associated with the selected claim may be evaluated using the props ratios relevance function for the selected encounter type at 8563. In one implementation, the props ratio of the claim code for the selected encounter type may be determined. For example, the props ratio of a claim code for the selected encounter type may be retrieved via a MySQL database command similar to the following:

```
SELECT propsRatio
FROM PropsRatios
WHERE encounterType=BIOPSY AND
  claimCode=12366;
```

The determined props ratio may be evaluated using the props ratios relevance function for the selected encounter type to determine a relevance classification (e.g., relevant or irrelevant).

A determination may be made at 8565 whether the selected claim is classified as relevant. If so, the selected claim may be added to the episode datastructure for the selected anchor encounter at 8569. In one implementation, the claim identifier of the selected claim may be marked as relevant in a data field.

If the selected anchor encounter is associated with an episode archetype that utilizes accessory encounters (e.g., multi-day episode archetype), other encounters in the analysis window for the enrollee identifier may be determined at 8571. In one embodiment, the analysis window associated with the anchor encounter may be determined based on the service date(s) associated with the anchor encounter by adding pre-window and/or post-window time periods as specified by the analysis window for the selected encounter type. For example, a knee arthroscopy may get an analysis window of 90 days post-surgery. In another embodiment, the analysis window associated with the anchor encounter may be further extended based on repeat events (e.g., combining overlapping windows into a single analysis window). For example, a knee arthroscopy, followed 40 days later by another knee arthroscopy, may get an analysis window 40+90=130 days long (e.g., the window renews if there is a repeat surgery during the first 90 days). In one implementation, encounter datastructures may be analyzed to find encounters, other than the anchor encounter, associated with the enrollee identifier during the analysis window associated with the anchor encounter.

A determination may be made at 8573 whether there remain other encounters in the analysis window for the enrollee identifier to analyze. In one implementation, each of the determined other encounters may be analyzed. If there remain other encounters to analyze, the next determined other encounter may be selected for analysis at 8575.

Claim codes associated with the selected other encounter may be evaluated using the props ratios relevance function for the selected encounter type at 8577. In one implementation, the props ratios of the claim codes for the selected encounter type may be determined. For example, the props ratio of a claim code for the selected encounter type may be retrieved via a MySQL database command similar to the following:

```
SELECT propsRatio
FROM PropsRatios
WHERE encounterType=HIP_PHYSICAL_THERAPY
  AND claimCode=12347;
```

The determined props ratios may be evaluated (e.g., on their own or in combination) using the props ratios relevance function for the selected encounter type to determine a relevance classification (e.g., relevant or irrelevant). In one implementation, the props ratios relevance function may be used to evaluate each associated claim code individually. In another implementation, the props ratios relevance function may be used to evaluate associated claim codes in combination (e.g., to evaluate a weighted average of the props ratios associated with the selected other encounter).

An encounter relevance classification for the selected other encounter may be determined at 8579. In one implementation, the encounter relevance classification may be determined based on relevance classifications of the claim codes associated with the selected other encounter. For example, the selected other encounter may be classified as relevant if a specified portion (e.g., at least 50%) of the associated claim codes are classified as relevant. In another implementation, the encounter relevance classification may be determined based on the relevance classification of the claim codes associated with the selected other encounter in combination. For example, the selected other encounter may be classified as relevant if the weighted average of the props ratios associated with the selected other encounter is classified as relevant.

A determination may be made at 8581 whether the selected other encounter is classified as relevant. If so, the selected other encounter may be added to the episode datastructure for the selected anchor encounter as an accessory encounter at 8583. In one implementation, the encounter identifier of the selected other encounter may added to a data field storing information regarding accessory encounters.

Episode attributes (e.g., POS, provider location, practitioner) for the episode datastructure may be determined at 8589. In one implementation, the episode attributes may be set to be the same as encounter attributes of the selected anchor encounter, and corresponding data fields of the episode datastructure may be updated to store this information.

An episode cost for the episode datastructure may be calculated at 8593. For example, the episode cost may represent the sum of the total allowed costs of each relevant encounter and/or claim associated with the episode datastructure. In one implementation, encounter datastructures associated with the episode datastructure (e.g., the selected anchor encounter and the associated accessory encounters) may be analyzed to determine an encounter cost for each of the encounters, the determined encounter costs may be summed to calculate the episode cost, and a corresponding data field of the episode datastructure may be updated to store this information. In another implementation, the encounter datastructure associated with the episode datastructure (e.g., the selected anchor encounter) may be analyzed to determine a cost for each of the relevant claims of the selected anchor encounter, the determined costs may be summed to calculate the episode cost, and a corresponding data field of the episode datastructure may be updated to store this information.

The episode datastructures may be stored at 8597. In one implementation, the episode datastructures may be stored via a MySQL database command similar to the following:

```
INSERT INTO Episodes (episodeID, encounterType,
  enrolleeID, episodeWindowStartDate, episodeWindowEndDate, anchorEncounterID, accessoryEncounterIDs, episodePOS, episodeProviderLocation, episodeCost)
VALUES (ID_episode_1, HIP_REPLACEMENT, ID_enrollee_1, "Feb. 1, 2020", "Mar. 10, 2020", ID_encounter_1, ID_encounter_3, OUTPATIENT, "Abbott Northwestern Hospital", 40000), . . . ;
```

FIG. 86 shows a data structure for the UDRCD. In FIG. 86, an example of an episode datastructure is illustrated. FIG. 86 shows data fields of the episode datastructure and descriptions of the data fields.

FIG. 87 shows a datagraph illustrating data flow(s) for the UDRCD. In FIG. 87, a client 8702 (e.g., of a user) may send a price calculation request 8721 to a price calculating server 8706 to facilitate generating price datastructures. For example, the client may be a desktop, a laptop, a tablet, a smartphone, a smartwatch, and/or the like that is executing a client application. In one implementation, the price calculation request may include data such as a request identifier, an episodes data identifier, a location data identifier, a coverage family identifier, a region identifier, and/or the like. In one embodiment, the client may provide the following example price calculation request, substantially in the form of a HTTP(S) POST message including XML-formatted data, as provided below:

```
POST/price_calculation_request.php HTTP/1.1
Host: www.server.com
Content-Type: Application/XML
Content-Length: 667
<? XML version="1.0" encoding="UTF-8"?>
<price_calculation_request>
  <request_identifier>ID_request_61</request_identifier>
  <episodes_data_identifier>ID_episodes_data_1</episodes_data_identifier>
  <location_data_identifier>ID_location_data_1</location_data_identifier>
```

```
    <coverage_family_identifier>ID_hip_replacement</coverage_family_identifier>
    <region_identifier>ID_region_1</region_identifier>
</price_calculation_request>
```

The price calculating server 8706 may send an episodes data retrieve request 8725 to a repository 8710 to obtain episode datastructures utilized to generate price datastructures. In one implementation, the episodes data retrieve request may include data such as a request identifier, requested data specification, and/or the like. In one embodiment, the price calculating server may provide the following example episodes data retrieve request, substantially in the form of a HTTP(S) POST message including XML-formatted data, as provided below:

```
POST/episodes_data_retrieve_request.php HTTP/1.1
Host: www.server.com
Content-Type: Application/XML
Content-Length: 667
<? XML version="1.0" encoding="UTF-8"?>
<episodes_data_retrieve_request>
    <request_identifier>ID_request_62</request_identifier>
    <episodes_data_identifier>ID_episodes_data_1</episodes_data_identifier>
</episodes_data_retrieve_request>
```

The repository 8710 may send an episodes data retrieve response 8729 to the price calculating server 8706 with the requested episodes data. In one implementation, the episodes data retrieve response may include data such as a response identifier, the requested episodes data, and/or the like. In one embodiment, the repository may provide the following example episodes data retrieve response, substantially in the form of a HTTP(S) POST message including XML-formatted data, as provided below:

```
POST/episodes_data_retrieve_response.php HTTP/1.1
Host: www.server.com
Content-Type: Application/XML
Content-Length: 667
<? XML version="1.0" encoding="UTF-8"?>
<episodes_data_retrieve_response>
    <response_identifier>ID_response_62
    </response_identifier>
    <episode_data>
        <episode_identifier>ID_episode_1</episode_identifier>
        <encounter_type>HIP_REPLACEMENT</encounter_type>
        <enrollee_identifier>ID_enrollee_1</enrollee_identifier>
        <episode_window_start_date>Feb. 1, 2020</episode_window_start_date>
        <episode_window_end_date>Mar. 10, 2020</episode_window_end_date>
        <anchor_encounter_identifier>ID_encounter_1</anchor_encounter_identifier>
        <accessory_encounter_identifiers>
            ID_encounter_3,
            . . .
        </accessory_encounter_identifiers>
        <place_of_service>OUTPATIENT</place_of_service>
        <provider_location>Abbott Northwestern Hospital</provider_location>
        <episode_cost>$40K</episode_cost>
    </episode_data>
    . . .
</episodes_data_retrieve_response>
```

The price calculating server 8706 may send a location data retrieve request 8733 to the repository 8710 to obtain location datastructures (e.g., with information regarding provider locations) utilized to generate price datastructures. In one implementation, the location data retrieve request may include data such as a request identifier, requested data specification, and/or the like. In one embodiment, the price calculating server may provide the following example location data retrieve request, substantially in the form of a HTTP(S) POST message including XML-formatted data, as provided below:

```
POST/location_data_retrieve_request.php HTTP/1.1
Host: www.server.com
Content-Type: Application/XML
Content-Length: 667
<?XML version="1.0" encoding="UTF-8"?>
<location_data_retrieve_request>
    <request_identifier>ID_request_63</request_identifier>
    <location_data_identifier>ID_location_data_1</location_data_identifier>
    <region_identifier>ID_region_1</region_identifier>
</location_data_retrieve_request>
```

The repository 8710 may send a location data retrieve response 8737 to the price calculating server 8706 with the requested location data. In one implementation, the location data retrieve response may include data such as a response identifier, the requested location data, and/or the like. In one embodiment, the repository may provide the following example location data retrieve response, substantially in the form of a HTTP(S) POST message including XML-formatted data, as provided below:

```
POST /location_data_retrieve_response.php HTTP/1.1
Host: www.server.com
Content-Type: Application/XML
Content-Length: 667
<?XML version = "1.0" encoding = "UTF-8"?>
<location_data_retrieve_response>
  <response_identifier>ID_response_63</response_identifier>
  <location_data>
    <provider_location_data>
      <provider_location>Abbott Northwestern Hospital</provider_location>
      <provider_TIN>ID_TIN_1</provider_TIN>
      <provider_geo_location>Latitude/Longitude</provider_geo_location>
      <provider_zip_code>55407</provider_zip_code>
      <provider_region>ID_region_1</provider_region>
    </provider_location_data>
    <provider_location_data>
```

-continued

```
        <provider_location>Fairview St. John's Hospital</provider_location>
        <provider_TIN>ID_TIN_2</provider_TIN>
        <provider_geo_location>Latitude/Longitude</provider_geo_location>
        <provider_zip_code>55109</provider_zip_code>
        <provider_region>ID_region_1</provider_region>
      </provider_location_data>
      ...
   </location_data>
</location_data_retrieve_response>
```

A price calculating (PC) component 8741 may utilize episode datastructures and location datastructures to generate price datastructures. See FIG. 88 for additional details regarding the PC component.

The price calculating server 8706 may send a price data store request 8745 to the repository 8710 to store the generated price datastructures. In one implementation, the price data store request may include data such as a request identifier, price datastructures, and/or the like. In one embodiment, the price calculating server may provide the following example price data store request, substantially in the form of a HTTP(S) POST message including XML-formatted data, as provided below:

```
POST /price_data_store_request.php HTTP/1.1
Host: www.server.com
Content-Type: Application/XML
Content-Length: 667
<?XML version = "1.0" encoding = "UTF-8"?>
<price_data_store_request>
   <request_identifier>ID_request_64</request_identifier>
   <price_data_identifier>ID_prices_data_1</price_data_identifier>
   <price_data>
      <provider_location>Abbott Northwestern Hospital</provider_location>
      <encounter_type>HIP_REPLACEMENT</encounter_type>
      <price_factor>1.05</price_factor>
      <price_rank>100</price_rank>
   </price_data>
   <price_data>
      <provider_location>Fairview St. John's Hospital</provider_location>
      <encounter_type>HIP_REPLACEMENT</encounter_type>
      <price_factor>1.04</price_factor>
      <price_rank>75</price_rank>
   </price_data>
   ...
</price_data_store_request>
```

The repository 8710 may send a price data store response 8749 to the price calculating server 8706 to confirm that the price datastructures were stored. In one implementation, the price data store response may include data such as a response identifier, a status, and/or the like. In one embodiment, the repository may provide the following example price data store response, substantially in the form of a HTTP(S) POST message including XML-formatted data, as provided below:

```
POST/price_data_store_response.php HTTP/1.1
Host: www.server.com
Content-Type: Application/XML
Content-Length: 667
<? XML version="1.0" encoding="UTF-8"?>
<price_data_store_response>
   <response_identifier>ID_response_64
      </response_identifier>
   <status>OK</status>
</price_data_store_response>
```

The price calculating server 8706 may send a price calculation response 8753 to the client 8702 to inform the user that the price datastructures were generated successfully. In one implementation, the price calculation response may include data such as a response identifier, a status, and/or the like. In one embodiment, the price calculating server may provide the following example price calculation response, substantially in the form of a HTTP(S) POST message including XML-formatted data, as provided below:

```
POST/price_calculation_response.php HTTP/1.1
Host: www.server.com
Content-Type: Application/XML
Content-Length: 667
<? XML version="1.0" encoding="UTF-8"?>
<price_calculation_response>
   <response_identifier>ID_response_61
      </response_identifier>
   <status>OK</status>
</price_calculation_response>
```

FIG. 88 shows a logic flow illustrating embodiments of a price calculating (PC) component for the UDRCD. In FIG. 88, a price calculation request for a coverage family for a region may be obtained at 8801. For example, the price calculation request may be obtained as a result of a user requesting generation of price datastructures.

Encounter types for the coverage family may be determined at 8805. In one implementation, a coverage family may comprise one or more encounter types, and a data field (e.g., stored in a database) of the coverage family may be checked to determine the associated encounter types.

Provider locations within the region may be determined at 8807. In one embodiment, a geographic area (e.g., a country) may be divided into regions (e.g., to reflect cost variations and/or the frequency with which services are used). In some implementations, multiple region levels may be utilized (e.g., to reflect the willingness of a consumer to travel for a given type of service). See FIG. 89B for additional details regarding regions. In one implementation, provider locations within the region may be determined via a location data retrieve request.

A determination may be made at 8809 whether there remain provider locations to analyze. In one implementation, each of the provider locations within the region may be analyzed. If there remain provider locations to analyze, the next provider location may be selected for analysis at 8813.

Episodes associated with the determined encounter types for the coverage family for the selected provider location may be determined at 8817. In one implementation, episode datastructures associated with the determined encounter types and the selected provider location may be determined. For example, the episode datastructures associated with the determined encounter types for the coverage family for the selected provider location may be retrieved via a MySQL database command similar to the following:

```
SELECT episodeID
FROM Episodes
WHERE encounterType=HIP_REPLACEMENT AND
  episodeProviderLocation="Abbott Northwestern Hospital";
```

Episode costs for the associated episodes may be determined at 8821. In one embodiment, episode costs may be adjusted to facilitate a fair comparison of costs across provider locations. For example, episode costs may be adjusted for case-mix (e.g., to adjust for patient characteristics that impact episode costs (e.g., age, comorbidities), winsorization (e.g., to cap episode costs at a certain dollar value so as to not skew the results), truncation (e.g., to remove episodes that have costs below a threshold value), payer type (e.g., to remove episodes associated with non-commercial payer types), inflation (e.g., to adjust episode costs for inflation (e.g., 6% per year)), and/or the like. In one implementation, an episode cost associated with an episode datastructure may be determined and adjusted. For example, an episode cost associated with an episode datastructure may be determined via a MySQL database command similar to the following:

```
SELECT episodeCost
FROM Episodes
WHERE episodeID=ID_episode_1;
```

For example, the determined episode cost may be adjusted as follows:

Episode Cost+Adjustments(e.g., for inflation)=Adjusted Episode Cost 40000+1000=41000

An average episode cost for the selected provider location for the coverage family may be calculated at 8825. In one implementation, an average of adjusted episode costs for the selected provider location for the coverage family may be calculated. For example, the average episode cost for the selected provider location for the coverage family may be calculated as follows:

Episode 1 adjusted cost=40000+1000=41000

Episode 2 adjusted cost=45000−1000=44000

Episode 3 adjusted cost=30000+8000=38000

Average provider episode cost=(41000+44000+38000)/3=41000

An average episode cost for the coverage family for the region may be calculated at 8829. In one implementation, a weighted average (e.g., weighted based on the number of episodes for a provider location) of adjusted episode costs for provider locations within the region for the coverage family may be calculated. For example, the average episode cost for the coverage family for the region may be calculated as follows:

Average region episode cost=((41000*3)+(46000*1)+(36000*1)+(30000*2)+(38000*1))/(3+1+1+2+1)=37875

A determination may be made at 8833 whether there remain provider locations to analyze. In one implementation, each of the provider locations within the region may be analyzed. If there remain provider locations to analyze, the next provider location may be selected for analysis at 8837.

A cost credibility factor for the selected provider location may be determined at 8841. For example, the cost credibility factor may be a measure to account for confidence in the data for the selected provider location. In one embodiment, the cost credibility factor increases as the number of episodes attributed to a provider location increases. In one implementation, the cost credibility factor for the selected provider location may be determined based on the number of episodes attributed to the selected provider location. For example, the cost credibility factor for selected provider location may be determined as follows:

Cost credibility factor=Min(0.2*# of episodes,1)

Cost credibility factor for Abbott Northwestern Hospital=Min(0.2*3,1)=0.6

A credibility-adjusted episode cost for the coverage family for the selected provider location may be calculated at 8845. In one embodiment, when the cost credibility factor for a provider location is low, the provider location's average episode cost may be adjusted toward the mean for provider locations within the region. In one implementation, the credibility-adjusted episode cost for the selected provider location may be calculated based on the cost credibility factor for the selected provider location and the average episode cost for the coverage family for the region. For example, the credibility-adjusted episode cost for the selected provider location may be calculated as follows:

Credibility-adjusted episode cost=(cost credibility factor*average provider episode cost)+((1−cost credibility factor)*average region episode cost)

Credibility-adjusted episode cost for Abbott Northwestern Hospital=(0.6*41000)+((1−0.6)*37875)=39750

Credibility-adjusted episode costs for the coverage family for provider locations with no episode data may be imputed at 8849. In one embodiment, when there are no episodes attributed to a provider location, but the provider location does perform the service associated with the coverage family, a credibility-adjusted episode cost for the provider location may be imputed using episode data from similar provider locations. In one implementation, similar provider locations may be those that have the same Taxpayer Identification Number (TIN) and zip code, TIN and region, TIN, and/or the like. If there are no available similar locations with the above criteria, the place of service (POS) average episode cost for the coverage family for the location's region may be used. See FIG. 89A for an exemplary implementation of determining similar provider locations. In one implementation, a credibility-adjusted episode cost for a provider location may be imputed in a similar way as discussed with regard to 8841-8845 but using episode data from similar provider locations. For example, a credibility-adjusted episode cost for a provider location may be imputed as follows:

Imputed credibility-adjusted episode cost=(cost credibility factor from episodes of similar provider locations*average provider episode cost from episodes of similar provider locations)+((1−cost credibility factor from episodes of similar provider locations)*average region episode cost)

Credibility-adjusted episode cost for Fairview Ridges Hospital=(0.4*42000)+((1−0.4)*37875)=39525

A determination may be made at 8853 whether there remain provider locations to analyze. In one implementation, each of the provider locations within the region may be analyzed. If there remain provider locations to analyze, the next provider location may be selected for analysis at 8857.

A price factor for the coverage family for the selected provider location may be calculated at 8861. In one implementation, the selected provider location's price factor may be calculated as the selected provider location's credibility-adjusted episode cost for the coverage family divided by the region's average episode cost for the coverage family. For example, the price factor for the coverage family for the selected provider location may be calculated as follows:

Price factor=credibility-adjusted episode cost/average region episode cost Price factor for Abbott Northwestern Hospital=39750/37875=1.05

Price ranks for the coverage family for the provider locations within the region may be calculated at 8865. In one embodiment, provider locations within the region may be ranked against each other based on price factors for the coverage family and the ranks within the region may be spread from 0 to 100. In one implementation, a normalization function (e.g., min-max normalization) may be utilized to calculate price ranks. For example, the price rank for the Abbott Northwestern Hospital provider location may be determined to be 100 (e.g., indicating that the provider location has the highest credibility-adjusted episode cost for the hip replacement coverage family among provider locations within the region).

A determination may be made at 8869 whether there remain insurance plans to price. In one implementation, each of the available ODHI plans may be priced. If there remain insurance plans to price, the next insurance plan may be selected at 8873.

A member price range for the coverage family for the selected insurance plan may be determined at 8877. In one embodiment, the member price range may indicate the minimum member price and the maximum member price for the coverage family that a member of the selected insurance plan may have to pay (e.g., including copays and premiums) to access/purchase services associated with the coverage family. In one implementation, the selected ODHI plan may specify the member price range for the coverage family, and a data field (e.g., stored in a database) of the selected ODHI plan may be checked to determine the associated member price range for the coverage family. For example, the member price range for the hip replacement coverage family for the selected ODHI plan may be determined to be between $3.5K and $7.5K. See FIGS. 93-104 for additional details regarding determining a member price range for a coverage family.

Pricing formula specifications, such as slope and beta, for the coverage family may be determined at 8881. In one implementation, the selected ODHI plan may specify the pricing formula specifications for the coverage family, and a data field (e.g., stored in a database) of the selected ODHI plan may be checked to determine the associated pricing formula specifications for the coverage family.

A member price for the coverage family for each provider location within the region may be calculated at 8885. In one implementation, the calculated price ranks for the coverage family for the provider locations within the region and the determined pricing formula specifications for the selected insurance plan may be used to calculate the member price for the coverage family for each provider location within the region. See FIGS. 45A-B for additional details regarding calculating a member price. For example, the member price for the hip replacement coverage family for the Abbott Northwestern Hospital provider location for the selected ODHI plan may be calculated to be $7.5K.

Price datastructures may be stored at 8889. For example, the price datastructures may include datastructures with information regarding price factors and/or price ranks. In another example, the price datastructures may include datastructures with information regarding member prices. See FIG. 90 for examples of price datastructures. In one implementation, the price datastructures may be stored via a MySQL database command similar to the following:

```
INSERT INTO Prices (providerID, encounterType, priceFactor, priceRank) VALUES
    ("Abbott Northwestern Hospital", HIP_REPLACEMENT, 1.05, 100),
    ("Fairview St. John's Hospital", HIP_REPLACEMENT, 1.04, 75),
    . . . ;
```

FIG. 89A shows implementation case(s) for the UDRCD. In FIG. 89A, an exemplary implementation of determining similar provider locations is illustrated. In one embodiment, similar provider locations may be determined separately for inpatient and outpatient POS locations. In one implementation, similar provider locations may be determined based on the following preference order: locations with same TIN and zip, locations with same TIN and region, locations with same TIN, locations with same POS.

FIG. 89B shows implementation case(s) for the UDRCD. In FIG. 89B, an exemplary division of a the US geographic area into regions is illustrated. In one embodiment, the US geographic area may be divided into a plurality of levels (e.g., 3 levels) with each level having different regions. For example, level 1 may comprise 2052 smaller regions for services that are regular and for which people will not travel long distances, level 2 may comprise 408 moderate regions for services that are not frequently used or have less available options, and for which significant travel time is unwarranted, and level 3 may comprise 83 larger regions for services that are not frequently used, are plannable in nature, and have high cost variation. In one implementation, when generating price datastructures for a coverage family (e.g., via the PC component), the region level associated with the coverage family may be determined (e.g., by checking a data field (e.g., stored in a database) of the coverage family), and one of the regions corresponding to the specified region level may be selected (e.g., when calling the PC component). For example, one of the 83 larger regions may be selected when calling the PC component to generate price datastructures for the hip replacement coverage family.

FIG. 90 shows data structure(s) for the UDRCD. In FIG. 90, a price datastructure for a provider location (e.g., for a facility) and a price datastructure for a practitioner are illustrated.

FIGS. 91A-C show screenshot(s) illustrating user interface(s) of the UDRCD. In FIGS. 91A-C, exemplary user interface(s) (e.g., for a mobile device) for viewing add-in coverage details are illustrated. FIG. 91A shows that the distribution of allowed costs for the knee replacement coverage family for the Des Moines region is between $26K and $65K. The allowed costs are split between member costs and employer costs. For example, the allowed costs for the Broadlawns Medical Center outpatient hospital are split as follows: $3.5K member costs and $31K employer costs. In another example, the allowed costs for the Mary Greeley Medical Center inpatient hospital are split as follows: $7.5K member costs and $42K employer costs. FIG. 91A shows that a plan member may view information regarding providers and costs (e.g., payroll deduction, copay) associated with the add-in.

FIG. 91B shows that the distribution of allowed costs for the delivery coverage family for the Des Moines region is between $13K and $25K. The allowed costs are split between member costs and employer costs. For example, the allowed costs for Broadlawns Medical Center are split as follows: $280 member costs and $16K employer costs. In another example, the allowed costs for Iowa Lutheran Hospital are split as follows: $500 member costs and $19K employer costs. FIG. 91B shows that a plan member may view information regarding providers and costs associated with the add-in. The plan member may also view whether allowed costs are going to change in the future (e.g., in the next 60 days). For example, member costs for the Broadlawns Medical Center are going to decrease from $280 to $200.

FIG. 91C shows that the distribution of allowed costs for the non-preventative colonoscopy coverage family for the Des Moines region is between $2.5K and $6K. The allowed costs are split between member costs and employer costs. For example, the allowed costs for Iowa Lutheran Hospital are split as follows: $50 member costs and $2.5K employer costs. In another example, the allowed costs for Dallas County Hospital are split as follows: $190 member costs and $4.2K employer costs. FIG. 91C shows that a plan member may view information regarding providers and costs associated with the add-in.

FIGS. 92A-C show screenshot(s) illustrating user interface(s) of the UDRCD. In FIGS. 92A-C, exemplary user interface(s) (e.g., for a mobile device, for a website) for viewing add-in coverage details and/or purchasing an add-in are illustrated. Screen 9201 shows that a plan member may view coverage information for the knee arthroscopy coverage family. For example, the plan member may not currently have coverage for the knee arthroscopy coverage family, but may purchase an add-in for this treatment or for other treatment options for the condition. Screen 9205 shows that the plan member may view available treatment options. For example, clicking on the Knee Replacement and Revision widget allows the plan member to see the provider options available for this procedure, while clicking on the Other treatment options in your Bind plan widget allows the plan member to see other treatments that are related to the condition(s) for which this procedure is typically performed. Screen 9210 shows that the plan member may view information regarding providers and costs (e.g., payroll deduction, copay) associated with the add-in. In one implementation, the plan member may sort and/or filter provider locations (e.g., in ascending and/or descending order) based on cost, provider name, distance, service availability, and/or the like. In some implementations, sorting based on "SKU Confidence Scores", which are an evaluation of the probability that this service is actually performed at the location listed, may be utilized. Provider locations that meet the minimum confidence score threshold (e.g., marked with service available and/or a checkmark) may be default sorted to the top first, and then the sort by price may be used as the next level sort default. Selecting one of the other sort options may removes the "SKU Confidence Score" as the primary field results are sorted on, allowing members to find more potential results if they are not seeing what they are looking for. Screen 9215 shows that the plan member may view coverage information for the thyroidectomy coverage family. For example, the plan member may currently have coverage for the thyroidectomy coverage family, and may view available providers for this treatment (e.g., sorting and/or filtering provider locations as desired). Screen 9220 shows that the plan member may search for urgent care clinics. For example, the plan member may be shown provider locations that exceed the minimum confidence score threshold (e.g., marked with service available and/or a checkmark) before other provider locations (e.g., marked with service may be available and/or a question mark), while provider locations with very low confidence scores (e.g., confidence scores that are below the very low confidence score threshold) may not be shown.

FIG. 93 shows a datagraph illustrating data flow(s) for the UDRCD. In FIG. 93, dashed lines indicate data flow elements that may be more likely to be optional. In FIG. 93, a client 9302 (e.g., of a user) may send a price range generation request 9321 to a price range generating server 9306 to facilitate generating price range datastructures. For example, the client may be a desktop, a laptop, a tablet, a smartphone, a smartwatch, and/or the like that is executing a client application. In one implementation, the price range generation request may include data such as a request identifier, a pricing personalization type, a condition identifier, a coverage family identifier, a group identifier, categorical groups definition, and/or the like. In one embodiment, the client may provide the following example price range generation request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
    <user_account_credentials>
```

-continued

```
            <user_name>JohnDaDoeDoeDoooe@gmail.com</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
      </user_account_credentials>
   </user_accounts_details>
   <client_details> //iOS Client with App and Webkit
            //it should be noted that although several client details
            //sections are provided to show example variants of client
            //sources, further messages will include only on to save
            //space
       <client_IP>10.0.0.123</client_IP>
       <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
       <client_product_type> iPhone6,1</client_product_type>
       <client_serial_number>DNXXX1X1XXXX</client_serial_number>
       <client_UDID>3XXXXXXXXXXXXXXXXXXXXXXXXD</client_UDID>
       <client_OS>iOS</client_OS>
       <client_OS_version>7.1.1</client_OS_version>
       <client_app_type>app with webkit</client_app_type>
       <app_installed_flag>true</app_installed_flag>
       <app_name>UDRCD.app</app_name>
       <app_version>1.0 </app_version>
       <app_webkit_name>Mobile Safari</client_webkit_name>
       <client_version>537.51.2</client_version>
   </client_details>
   <client_details> //iOS Client with Webbrowser
       <client_IP>10.0.0.123</client_IP>
       <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
       <client_product_type> iPhone6,1</client_product_type>
       <client_serial_number>DNXXX1X1XXXX</client_serial_number>
       <client_UDID>3XXXXXXXXXXXXXXXXXXXXXXXXXD</client_UDID>
       <client_OS>iOS</client_OS>
       <client_OS_version>7.1.1</client_OS_version>
       <client_app_type>web browser</client_app_type>
       <client_name>Mobile Safari</client_name>
       <client_version>9537.53</client_version>
    </client_details>
    <client_details> //Android Client with Webbrowser
       <client_IP>10.0.0.123</client_IP>
       <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
       <client_product_type>Nexus S</client_product_type>
       <client_serial_number>YXXXXXXXXZ</client_serial_number>
       <client_UDID>FXXXXXXXXX-XXXX-XXXX-XXXX-XXXXXXXXXXXXX</client_UDID>
       <client_OS>Android</client_OS>
       <client_OS_version>4.0.4</client_OS_version>
       <client_app_type>web browser</client_app_type>
       <client_name>Mobile Safari</client_name>
       <client_version>534.30</client_version>
    </client_details>
    <client_details> //Mac Desktop with Webbrowser
       <client_IP>10.0.0.123</client_IP>
       <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
       <client_product_type>MacPro5,1</client_product_type>
       <client_serial_number>YXXXXXXXXZ</client_serial_number>
       <client_UDID>FXXXXXXXXX-XXXX-XXXX-XXXX-XXXXXXXXXXXXX</client_UDID>
       <client_OS>Mac OS X</client_OS>
       <client_OS_version>10.9.3</client_OS_version>
       <client_app_type>web browser</client_app_type>
       <client_name>Mobile Safari</client_name>
       <client_version>537.75.14</client_version>
    </client_details>
    <price_range_generation_request>
       <request_identifier>ID_request_71</request_identifier>
       <pricing_personalization_type>Categorical</pricing_personalization_type>
       <condition_identifier>ID_condition_lower_back_pain</condition_identifier>
       <coverage_family_identifier>ID_spine_surgery</coverage_family_identifier>
    </price_range_generation_request>
</auth_request>
```

The price range generating server 9306 may send a treatment paths data retrieve request 9325 to a repository 9310 to obtain treatment paths data utilized to calculate price ranges for a coverage family. In one implementation, the treatment paths data retrieve request may include data such as a request identifier, a coverage family identifier, a condition identifier, a group identifier, and/or the like. In one embodiment, the price range generating server may provide the following example treatment paths data retrieve request, substantially in the form of a HTTP(S) POST message including XML-formatted data, as provided below:

POST/treatment_paths_data_retrieve_request.php HTTP/1.1
Host: www.server.com
Content-Type: Application/XML
Content-Length: 667
<? XML version="1.0" encoding="UTF-8"?>
<treatment_paths_data_retrieve_request>
request_identifier>ID_request_72</request_identifier>
<condition_identifier>ID_condition_lower_back_pain</condition_identifier>
</treatment_paths_data_retrieve_request>

The repository 9310 may send a treatment paths data retrieve response 9329 to the price range generating server 9306 with the requested treatment paths data. In one implementation, the treatment paths data retrieve response may include data such as a response identifier, the requested treatment paths data, and/or the like. In one embodiment, the repository may provide the following example treatment paths data retrieve response, substantially in the form of a HTTP(S) POST message including XML-formatted data, as provided below:

POST /treatment_paths_data_retrieve_response.php HTTP/1.1
Host: www.server.com
Content-Type: Application/XML
Content-Length: 667
<?XML version = "1.0" encoding = "UTF-8"?>
<treatment_paths_data_retrieve_response>
<response_identifier>ID_response_72</response_identifier>
<treatment_paths_data>
<treatment_path>
<coverage_family_identifier>ID_spine_surgery</coverage_family_identifier>
<cost>$98,000</cost>
<fraction_early>0.2</fraction_early>
<fraction_unnecessary>0.3</fraction_unnecessary>
</treatment_path>
<alternative_treatment_path>
<coverage_family_identifier>ID_physical_therapy</coverage_family_identifier>
<cost>$1,000</cost>
<fraction_best>0.4</fraction_best>
</alternative_treatment_path>
<alternative_treatment_path>
<coverage_family_identifier>ID_epidural</coverage_family_identifier>
<cost>$2,000</cost>
<fraction_best>0.3</fraction_best>
</alternative_treatment_path>
</treatment_paths_data>
</treatment_paths_data_retrieve_response>

The price range generating server 9306 may send a health impact data retrieve request 9333 to the repository 9310 to obtain health impact data utilized to calculate price ranges for the coverage family. In one implementation, the health impact data retrieve request may include data such as a request identifier, a coverage family identifier, a condition identifier, a group identifier, and/or the like. In one embodiment, the price range generating server may provide the following example health impact data retrieve request, substantially in the form of a HTTP(S) POST message including XML-formatted data, as provided below:

POST/health_impact_data_retrieve_request.php HTTP/1.1
Host: www.server.com
Content-Type: Application/XML
Content-Length: 667
<? XML version="1.0" encoding="UTF-8"?>
<health_impact_data_retrieve_request>
<request_identifier>ID_request_73</request_identifier>
<coverage_family_identifier>ID_spine_surgery</coverage_family_identifier>
</health_impact_data_retrieve_request>

The repository 9310 may send a health impact data retrieve response 9337 to the price range generating server 9306 with the requested health impact data. In one implementation, the health impact data retrieve response may include data such as a response identifier, the requested health impact data, and/or the like. In one embodiment, the repository may provide the following example health impact data retrieve response, substantially in the form of a HTTP(S) POST message including XML-formatted data, as provided below:

POST/health_impact_data_retrieve_response.php HTTP/1.1
Host: www.server.com
Content-Type: Application/XML
Content-Length: 667
<? XML version="1.0" encoding="UTF-8"?>
<health_impact_data_retrieve_response>
<response_identifier>ID_response_73
</response_identifier>
<health_impact_data>
<quality_of_life_impact>1.5 QALYs</quality_of_life_impact>
<mortality_impact>-0.1 QALYs</mortality_impact>
</health_impact_data>
</health_impact_data_retrieve_response>

A price range generating (PRAG) component 9341 may utilize treatment paths data and/or health impact data to generate price range datastructures. See FIG. 94 for additional details regarding the PRAG component.

The price range generating server 9306 may send a price range data store request 9345 to the repository 9310 to store the generated price range datastructures. In one implementation, the price range data store request may include data such as a request identifier, price range datastructures, and/or the like. In one embodiment, the price range generating server may provide the following example price range data store request, substantially in the form of a HTTP(S) POST message including XML-formatted data, as provided below:

```
POST/price_range_data_store_request.php HTTP/1.1
Host: www.server.com
Content-Type: Application/XML
Content-Length: 667
<? XML version="1.0" encoding="UTF-8"?>
<price_range_data_store_request>
  <request_identifier>ID_request_74</request_identifier>
  <price_range_data>
    <plan_identifier>ID_ODHI_plan_1</plan_identifier>
    <coverage_family_identifier>ID_spine_surgery</coverage_family_identifier>
    <price_range_minimum>$4, 150</price_range_minimum>
    <price_range_maximum>$8, 300</price_range_maximum>
  </price_range_data>
</price_range_data_store_request>
```

The repository 9310 may send a price range data store response 9349 to the price range generating server 9306 to confirm that the price range datastructures were stored. In one implementation, the price range data store response may include data such as a response identifier, a status, and/or the like. In one embodiment, the repository may provide the following example price range data store response, substantially in the form of a HTTP(S) POST message including XML-formatted data, as provided below:

```
POST/price_range_data_store_response.php HTTP/1.1
Host: www.server.com
Content-Type: Application/XML
Content-Length: 667
<? XML version="1.0" encoding="UTF-8"?>
<price_range_data_store_response>
  <response_identifier>ID_response_74
    </response_identifier>
  <status>OK</status>
</price_range_data_store_response>
```

The price range generating server 9306 may send a price range generation response 9353 to the client 9302 to inform the user that the price range datastructures were generated successfully. In one implementation, the price range generation response may include data such as a response identifier, a status, and/or the like. In one embodiment, the price range generating server may provide the following example price range generation response, substantially in the form of a HTTP(S) POST message including XML-formatted data, as provided below:

```
POST/price_range_generation_response.php HTTP/1.1
Host: www.server.com
Content-Type: Application/XML
Content-Length: 667
<? XML version="1.0" encoding="UTF-8"?>
<price_range_generation_response>
  <response_identifier>ID_response_71
    </response_identifier>
  <status>OK</status>
</price_range_generation_response>
```

FIG. 94 shows a logic flow illustrating embodiments of a price range generating (PRAG) component for the UDRCD. In FIG. 94, a price range datastructure generation request for an ODHI plan may be obtained at 9401. For example, the price range datastructure generation request for the ODHI plan may be obtained as a result of a user requesting generation of price range datastructures.

Pricing personalization settings of the ODHI plan may be determined at 9405. For example, price ranges for the ODHI plan may be calculated based on a plan design (e.g., for a population), categorically (e.g., for different groups, for different individuals), continuously (e.g., for different individuals), and/or the like. In one implementation, the price range datastructure generation request may be parsed (e.g., using PHP commands) to determine the pricing personalization settings (e.g., based on the value of the pricing_personalization_type field). In another implementation, the ODHI plan may have a configuration setting that specifies the pricing personalization settings to utilize. In another implementation, a coverage family may have a configuration setting that specifies the pricing personalization settings to utilize (e.g., based on available health impact data for the coverage family).

A determination may be made at 9409 whether there remain coverage families to process. In one implementation, each of the coverage families (e.g., core, add-ins) of the ODHI plan may be processed. If there remain coverage families to process, the next coverage family may be selected for processing at 9413.

A determination may be made at 9417 regarding the pricing personalization type to utilize for the selected coverage family. If the plan design pricing personalization type should be utilized, a health impact context for a population (e.g., country, state, region, etc. population associated with the ODHI plan) may be determined at 9421. For example, the health impact context (e.g., head CT scan with gadolinium to rule out brain bleed after an emergency admission for trauma) may be a datastructure that specifies a combination of the associated condition, purpose, facility, etc. and the average member state (e.g., diagnosis, disease stage, symptom severity, tried alternative treatments, etc.) associated with the population. In one implementation, the health impact context for the population may be determined (e.g., retrieved, calculated) via a MySQL database command.

Treatment paths data (e.g., optimal path, available paths) for the population for the associated condition may be determined at 9425. In one embodiment, the treatment paths data may identify various (e.g., high frequency) pathways that are utilized to treat the associated condition, costs associated with different pathways, clinical outcomes associated with different pathways, and/or the like that are available to the population. In one implementation, the treatment paths data for the population for the associated condition may be determined via a MySQL database command similar to the following:

```
SELECT conditionTreatmentPaths
FROM ACGS
WHERE ACG_ID=ID_ACG_1 AND
  ConditionID=ID_condition_lower_back_pain;
```

A price range for the selected coverage family for the population may be calculated at 9429. In one implementation, health impact data associated with the health impact context for the population may be determined and used along with the treatment paths data for the population to calculate the price range for the selected coverage family for the population based on the combination of a value price component and a waste price component. In one embodiment, the price range for the selected coverage family for the population may be calculated using the PRAC component. See FIG. 97 for additional details regarding the PRAC component.

The calculated price range may be added to a price range lookup datastructure at 9433. For example, the price range lookup datastructure may be a lookup table. In one embodiment, a set of price ranges for the different atomized coverages (e.g., coverage families) may be utilized as part of the ODHI plan design (e.g., a list or table of price ranges for each lookup). In one implementation, a database table (e.g., Table A) may store price ranges for different coverage families, and each record may specify a coverage family identifier and the associated price range. Accordingly, the identifier of the selected coverage family and the calculated price range may be inserted into the database table.

If the categorical pricing personalization type should be utilized, a categorical groups definition for the selected coverage family may be obtained at 9441. For example, the categorical groups definition may comprise decision rules (e.g., with regard to member state data) that discern different groups (e.g., having different estimated health benefits from using the selected coverage family). In another example, the categorical groups definition may comprise a set of groups (e.g., with each group comprising a set of members having specified member state characteristics). In one implementation, the price range datastructure generation request may be parsed (e.g., using PHP commands) to determine the categorical groups definition. In another implementation, the ODHI plan may have a configuration setting that specifies the categorical groups definition to utilize. In another implementation, the selected coverage family may have a configuration setting that specifies the categorical groups definition to utilize (e.g., based on available health impact data for the selected coverage family).

A determination may be made at 9445 whether there remain groups to process. In one implementation, each of the groups specified by the categorical groups definition may be processed. If there remain groups to process, the next group may be selected for processing at 9449.

A health impact context for the selected group (e.g., people who previously had hernia, diabetics) may be determined at 9453. For example, the health impact context may be a datastructure that specifies a combination of the associated condition, purpose, facility, etc. and the average member state (e.g., diagnosis, disease stage, symptom severity, tried alternative treatments, etc.) associated with the selected group. In one implementation, the health impact context for the selected group may be determined (e.g., retrieved, calculated) via a MySQL database command.

Treatment paths data (e.g., optimal path, available paths) for the selected group for the associated condition may be determined at 9457. In one embodiment, the treatment paths data may identify various (e.g., high frequency) pathways that are utilized to treat the associated condition, costs associated with different pathways, clinical outcomes associated with different pathways, and/or the like that are available to the selected group. For example, if a group comprises people with persistent back pain, the physical therapy treatment path may be unavailable to the group because people in this group previously tried physical therapy and it failed to alleviate the pain. In one implementation, the treatment paths data for the associated condition may be determined and treatment paths unavailable to the selected group (e.g., determined based on the average member state of the selected group) may be removed.

A price range for the selected coverage family for the selected group may be calculated at 9461. In one implementation, health impact data associated with the health impact context for the selected group may be determined and used along with the treatment paths data for the selected group to calculate the price range for the selected coverage family for the selected group based on the combination of a value price component and a waste price component. In one embodiment, the price range for the selected coverage family for the selected group may be calculated using the PRAC component. See FIG. 97 for additional details regarding the PRAC component.

The calculated price range may be added as a price range node to a price range tree datastructure at 9465. For example, the price range tree datastructure may be a tree datastructure associated with a coverage family, with price ranges and decision rules defining the branches. In one implementation, a database table (e.g., Table B) may store records such that each record in Table B is either a decision node (e.g., that helps locate the leaf node associated with a group) or a leaf node (e.g., with a price range associated with a group). If it is a decision node, it may contain an expression which may be evaluated (e.g., based on the average member state of a group) and pointers to two other nodes in Table B that may be followed depending on the whether the expression is true or false. For example, a price range node with the calculated price range for the selected group may be inserted into the price range tree datastructure for the selected coverage family.

The price range tree datastructure for the selected coverage family (e.g., with price range nodes for different groups) may be added to a price range lookup datastructure at 9469. For example, the price range lookup datastructure may be a lookup table. In one implementation, a database table (e.g., Table A) may store pointers to price range tree datastructures for different coverage families, and each record may specify a coverage family identifier and the associated price range tree datastructure identifier. Accordingly, the identifier of the selected coverage family and the identifier of the associated price range tree datastructure may be inserted into the database table.

If the continuous pricing personalization type should be utilized, a price range calculating code module for the selected coverage family may be determined at 9481. In one embodiment, pricing may vary continuously according to a personalized predicted benefit and/or cost calculation. In one implementation, a price range calculating code module may be a function that takes a group of inputs and outputs a price range. In another implementation (e.g., if there is a standard format for the modules (e.g., logistic regression)), a price range calculating code module may store model parameters (e.g., as a vector) and/or the order of terms (e.g., which may alternatively be stored elsewhere). For example, if cataract surgery is a coverage family that is variably priced, a price range calculating code module Cataract_Price may be utilized, which accepts the following inputs for each eye: cataract grade, number, and date from the last three visits if available, corrected visual acuity, Charlson morbidity score, frailty score, and a patient reported visual outcome measure. The Cataract_Price price range calculating code module may use a formula of the inputs to calculate expected impact of cataract surgery in QALY's (quality-adjusted life years) and a price range (e.g., the price range may be used to determine the price of a provider based on the provider's price rank) as discussed with regard to the PRAC component. See FIG. 97 for additional details regarding the PRAC component. In one implementation, a function pointer to the price range calculating code module for the selected coverage family may be determined.

A code module link for the price range calculating code module may be added to a price range lookup datastructure at 9485. For example, the code module link may be the function pointer to the price range calculating code module for the selected coverage family that may be used to make a function call. In one implementation, a database table (e.g., Table A) may store code module links for different coverage families, and each record may specify a coverage family identifier and the associated code module link. Accordingly, the identifier of the selected coverage family and the code module link for the price range calculating code module may be inserted into the database table.

Generated price range datastructures may be stored at 9493. In one embodiment, the generated price range datastructures may include price range lookup datastructure(s) and/or other associated datastructures (e.g., price range tree datastructures). It is to be understood that, in some embodiments, a price range lookup datastructure may store a combination of price range lookup data for different pricing personalization types. For example, a price range lookup datastructure may comprise a record that specifies a coverage family identifier and the associated price range for a first coverage family, a record that specifies a coverage family identifier and the associated price range tree datastructure for a second coverage family, and a record that specifies a coverage family identifier and the associated code module link for a third coverage family. In one implementation, the generated price range datastructures may be stored via a price range data store request.

FIG. 95 shows a datagraph illustrating data flow(s) for the UDRCD. In FIG. 95, dashed lines indicate data flow elements that may be more likely to be optional. In FIG. 95, a client 9502 (e.g., of a user) may send a price range lookup request 9521 to a price range lookup server 9506 to facilitate a lookup of a price range for a coverage family. For example, the client may be a desktop, a laptop, a tablet, a smartphone, a smartwatch, and/or the like that is executing a client application. In one implementation, the price range lookup request may include data such as a request identifier, an ODHI plan identifier, a coverage family identifier, a group identifier, a group definition, a plan member identifier, a plan member's health impact context, and/or the like. In one embodiment, the client may provide the following example price range lookup request, substantially in the form of a HTTP(S) POST message including XML-formatted data, as provided below:

POST/price_range_lookup_request.php HTTP/1.1
Host: www.server.com
Content-Type: Application/XML
Content-Length: 667
<? XML version="1.0" encoding="UTF-8"?>
<price_range_lookup_request>
<request_identifier>ID_request_81</request_identifier>
<plan_identifier>ID_ODHI_plan_1</plan_identifier>
<coverage_family_identifier>ID_spine_surgery</coverage_family_identifier>
</price_range_lookup_request>

The price range lookup server 9506 may send a price range data retrieve request 9525 to a repository 9510 to obtain price range datastructures utilized to look up the price range for the coverage family. In one implementation, the price range data retrieve request may include data such as a request identifier, an ODHI plan identifier, a coverage family identifier, a group identifier, a group definition, a plan member identifier, and/or the like. In one embodiment, the price range lookup server may provide the following example price range data retrieve request, substantially in the form of a HTTP(S) POST message including XML-formatted data, as provided below:

POST/price_range_data_retrieve_request.php HTTP/1.1
Host: www.server.com
Content-Type: Application/XML
Content-Length: 667
<? XML version="1.0" encoding="UTF-8"?>
<price_range_data_retrieve_request>
<request_identifier>ID_request_82</request_identifier>
<plan_identifier>ID_ODHI_plan_1</plan_identifier>
<coverage_family_identifier>ID_spine_surgery</coverage_family_identifier>
</price_range_data_retrieve_request>

The repository 9510 may send a price range data retrieve response 9529 to the price range lookup server 9506 with the requested price range datastructures. In one implementation, the price range data retrieve response may include data such as a response identifier, the requested price range datastructures, and/or the like. In one embodiment, the repository may provide the following example price range data retrieve response, substantially in the form of a HTTP(S) POST message including XML-formatted data, as provided below:

POST/price_range_data_retrieve_response.php HTTP/1.1
Host: www.server.com
Content-Type: Application/XML
Content-Length: 667
<? XML version="1.0" encoding="UTF-8"?>
<price_range_data_retrieve_response>
<response_identifier>ID_response_82
</response_identifier>
<price_range_minimum>$4, 150</price_range_minimum>
<price_range_maximum>$8, 300</price_range_maximum>
</price_range_data_retrieve_response>

The price range lookup server 9506 may send a treatment paths data retrieve request 9533 to the repository 9510 to obtain treatment paths data utilized to calculate the price range for the coverage family (e.g., for a plan member using the continuous pricing personalization type). In one implementation, the treatment paths data retrieve request may include data such as a request identifier, a coverage family identifier, a condition identifier, a group identifier, a plan member identifier, and/or the like. In one embodiment, the price range lookup server may provide the following example treatment paths data retrieve request, substantially in the form of a HTTP(S) POST message including XML-formatted data, as provided below:

POST/treatment_paths_data_retrieve_request.php HTTP/1.1
Host: www.server.com
Content-Type: Application/XML
Content-Length: 667
<? XML version="1.0" encoding="UTF-8"?>
<treatment_paths_data_retrieve_request>
<request_identifier>ID_request_83</request_identifier>
<condition_identifier>ID_condition_lower_back_pain</condition_identifier>

<plan_member_identifier>ID_member_1 </plan_member_identifier>
</treatment_paths_data_retrieve_request>

The repository 9510 may send a treatment paths data retrieve response 9537 to the price range lookup server 9506 with the requested treatment paths data. In one implementation, the treatment paths data retrieve response may include data such as a response identifier, the requested treatment paths data, and/or the like. In one embodiment, the repository may provide the following example treatment paths data retrieve response, substantially in the form of a HTTP(S) POST message including XML-formatted data, as provided below:

```
POST /treatment_paths_data_retrieve_response.php HTTP/1.1
Host: www.server.com
Content-Type: Application/XML
Content-Length: 667
<?XML version = "1.0" encoding = "UTF-8"?>
<treatment_paths_data_retrieve_response>
  <response_identifier>ID_response_83</response_identifier>
  <treatment_paths_data>
    <treatment_path>
      <coverage_family_identifier>ID_spine_surgery</coverage_family_identifier>
      <cost>$98,000</cost>
      <fraction_early>0.2</fraction_early>
      <fraction_unnecessary>0.3</fraction_unnecessary>
    </treatment_path>
    <alternative_treatment_path>
      <coverage_family_identifier>ID_epidural</coverage_family_identifier>
      <cost>$2,000</cost>
      <fraction_best>0.3</fraction_best>
    </alternative_treatment_path>
  </treatment_paths_data>
</treatment_paths_data_retrieve_response>
```

The price range lookup server 9506 may send a health impact data retrieve request 9541 to the repository 9510 to obtain health impact data utilized to calculate the price range for the coverage family (e.g., for the plan member using the continuous pricing personalization type). In one implementation, the health impact data retrieve request may include data such as a request identifier, a coverage family identifier, a condition identifier, a group identifier, a plan member identifier, and/or the like. In one embodiment, the price range lookup server may provide the following example health impact data retrieve request, substantially in the form of a HTTP(S) POST message including XML-formatted data, as provided below:

```
POST/health_impact_data_retrieve_request.php HTTP/1.1
Host: www.server.com
Content-Type: Application/XML
Content-Length: 667
<? XML version="1.0" encoding="UTF-8"?>
<health_impact_data_retrieve_request>
  <request_identifier>ID_request_84</request_identifier>
  <coverage_family_identifier>ID_spine_surgery</coverage_family_identifier>
  <plan_member_identifier>ID_member_1
    </plan_member_identifier>
</health_impact_data_retrieve_request>
```

The repository 9510 may send a health impact data retrieve response 9545 to the price range lookup server 9506 with the requested health impact data. In one implementation, the health impact data retrieve response may include data such as a response identifier, the requested health impact data, and/or the like. In one embodiment, the repository may provide the following example health impact data retrieve response, substantially in the form of a HTTP(S) POST message including XML-formatted data, as provided below:

```
POST/health_impact_data_retrieve_response.php HTTP/1.1
Host: www.server.com
Content-Type: Application/XML
Content-Length: 667
<? XML version="1.0" encoding="UTF-8"?>
<health_impact_data_retrieve_response>
  <response_identifier>ID_response_84
    </response_identifier>
  <health_impact_data>
    <quality_of_life_impact>3 QALYs</quality_of_life_impact>
    <mortality_impact>-0.1 QALYs</mortality_impact>
  </health_impact_data>
</health_impact_data_retrieve_response>
```

A price range lookup (PRAL) component 9549 may utilize the determined price range datastructures and/or treatment paths data and/or health impact data to provide the price range for the coverage family. See FIG. 96 for additional details regarding the PRAL component.

The price range lookup server 9506 may send a price range lookup response 9553 to the client 9502 to provide the user with the requested price range for the coverage family. In one implementation, the price range lookup response may include data such as a response identifier, the requested price range for the coverage family, and/or the like. In one embodiment, the price range lookup server may provide the following example price range lookup response, substantially in the form of a HTTP(S) POST message including XML-formatted data, as provided below:

```
POST/price_range_lookup_response.php HTTP/1.1
Host: www.server.com
Content-Type: Application/XML
Content-Length: 667
<? XML version="1.0" encoding="UTF-8"?>
<price_range_lookup_response>
  <response_identifier>ID_response_81
    </response_identifier>
  <price_range_minimum>$4, 150</price_range_minimum>
```

<price_range_maximum>$8, 300</price_range_maximum>
</price_range_lookup_response>

FIG. 96 shows a logic flow illustrating embodiments of a price range lookup (PRAL) component for the UDRCD. In FIG. 96, a price range lookup request for a coverage family for an ODHI plan may be obtained at 9601. For example, the price range lookup request may be obtained as a result of a user requesting a lookup of a price range for the coverage family.

Pricing personalization settings of the ODHI plan may be determined at 9605. For example, price ranges for the ODHI plan may be calculated based on a plan design (e.g., for a population), categorically (e.g., for different groups, for different individuals), continuously (e.g., for different individuals), and/or the like. In one implementation, the ODHI plan may have a configuration setting that specifies the pricing personalization settings to utilize. In another implementation, the coverage family may have a configuration setting that specifies the pricing personalization settings to utilize. In another implementation, the pricing personalization settings to utilize may vary dynamically (e.g., the pricing personalization type to utilize may be determined based on the lookup value stored in a price range lookup datastructure).

A determination may be made at 9609 regarding the pricing personalization type to utilize for the coverage family. If the plan design pricing personalization type should be utilized, the price range lookup datastructure may be queried for the price range at 9613. In one implementation, the price range for the coverage family may be retrieved from the price range lookup datastructure based on the identifier of the coverage family. For example, a minimum price and a maximum price may be determined.

If the categorical pricing personalization type should be utilized, a price range tree datastructure for the coverage family may be determined at 9621. For example, the price range tree datastructure may be a tree datastructure with price ranges and decision rules defining the branches. In one implementation, the price range tree datastructure may be determined by querying the price range lookup datastructure based on the identifier of the coverage family.

A price range node of the price range tree datastructure corresponding to a categorical group associated with the price range lookup request may be determined at 9625. For example, the categorical group may be specified using decision rules data values (e.g., member state data values). In another example, the categorical group may be specified using a group identifier. In one implementation, the price range node corresponding to the group may be determined by traversing decision nodes of the price range tree datastructure in accordance with specified decision rules (e.g., using average member state data values) until a leaf node (e.g., with a price range associated with the group) is found.

The price range specified in the determined price range node may be determined at 9629. In one implementation, data fields of the price range node may be parsed (e.g., using PHP commands) to determine the price range for the coverage family for the group. For example, a minimum price and a maximum price may be determined.

If the continuous pricing personalization type should be utilized, a health impact context for a member associated with the price range lookup request may be determined at 9641. For example, the health impact context may be a datastructure that specifies a combination of the associated condition, purpose, facility, etc. and the member state (e.g., diagnosis, disease stage, symptom severity, tried alternative treatments, etc.) associated with the member. In one implementation, the health impact context for the member may be specified in the price range lookup request. In another implementation, the health impact context for the member may be retrieved via a MySQL database command (e.g., based on the member's plan member identifier).

Treatment paths data (e.g., optimal path, available paths) for the member may be determined at 9645. In one embodiment, the treatment paths data may identify various (e.g., high frequency) pathways that are utilized to treat the associated condition, costs associated with different pathways, clinical outcomes associated with different pathways, and/or the like that are available to the member. For example, if the member has persistent back pain, previously tried using physical therapy, and using physical therapy failed to alleviate the pain, the physical therapy treatment path may be unavailable to the member. In one implementation, the treatment paths data for the associated condition may be determined and treatment paths unavailable to the member (e.g., determined based on the member state of the member) may be removed.

The price range lookup datastructure may be queried for a price range calculating code module link for the coverage family at 9649. For example, the price range calculating code module link may be a function pointer to a price range calculating code module for the coverage family that may be used to make a function call. In one implementation, the price range calculating code module link may be determined by querying the price range lookup datastructure based on the identifier of the coverage family.

The price range calculating code module may be called to determine a price range for the coverage family for the member at 9653. In one implementation, the price range calculating code module may utilize health impact data associated with the health impact context for the member and the treatment paths data for the member to calculate the price range for the coverage family for the member based on the combination of a value price component and a waste price component. In one embodiment, the price range for the coverage family for the member may be calculated using the PRAC component. See FIG. 97 for additional details regarding the PRAC component.

The price range for the coverage family may be provided to the requestor at 9661. For example, a minimum price and a maximum price may be provided. In one implementation, the price range for the coverage family may be provided via a price range lookup response. In various embodiments, the requestor may utilize the price range for the coverage family (e.g., along with price ranks of providers) for a variety of uses such as: quoting a price for a treatment to a person who is not a member of the ODHI plan, quoting a price for someone who is a member (and for whom we already have data) when he/she is gathering information to make a decision, calculating actual claims payments and/or member payments, estimating plan costs for a population based on previous claims by pricing a large group of claims (e.g., actuarial prediction), and/or the like.

FIG. 97 shows a logic flow illustrating embodiments of a price range calculating (PRAC) component for the UDRCD. In FIG. 97, a price range calculation request for a coverage family may be obtained at 9701. For example, the price range calculation request for the coverage family may be obtained as a result of a request from the PRAG component, the PRAL component, and/or the like requestor to calculate the price range for the coverage family.

An associated health impact context may be determined at 9705. For example, the associated health impact context may be for a population, a group, a member, and/or the like. In one implementation, the associated health impact context may be provided as an input by the requestor. For example, a function call to the PRAC component may specify the associated health impact context as an argument.

A determination may be made at 9709 regarding the health impact type utilized for the coverage family. In one embodiment, a database of estimated health impacts of different medical treatments in different contexts may be used. The information about any particular health impact may comprise of an average value (e.g., for a population) or a set of values for individuals in different categories or "health states" (e.g., for a group, for a member). Health impact information may include the average impacts on (a) quality of life (possibly by different types of impact) and (b) mortality or (c) combined average QALY's (quality-adjusted life years). These impacts may be stored as average lifetime values, or stored with information about their time-dependence so that benefits can be calculated according to different time horizons. This information may be stored as pre-computed data (e.g., static health impact type), or as mathematical models such as regression models for calculating the values pertaining to particular individuals based on their personal information (e.g., dynamic health impact type). This information may also contain estimates of the distributional spread of outcomes (e.g., obtained from studies in the literature) which may be a factor utilized in pricing methods. To the extent that different contexts cannot be separated, these values may reflect the average or distribution of outcomes of the treatment as it is used in the population for whom the benefit is being designed (e.g., if different contexts for GI endoscopy are not separated and the coverage is being designed for France, these values may reflect the values corresponding to real-world usage in France). In one implementation, the health impact type may be determined by querying the database of estimated health impacts based on the identifier of the coverage family.

If the static health impact type is utilized for the coverage family, a health impact value for the coverage family for the associated health impact context may be retrieved at 9713. For example, the health impact value may be specified in QALYs. In one implementation, the health impact value may be retrieved by querying the database of estimated health impacts based on the identifier of the coverage family and/or member state values specified in the associated health impact context. For example, the health impact value for the coverage family for the associated health impact context may be retrieved via a MySQL database command similar to the following:

```
SELECT healthImpactValue
FROM HealthImpacts
WHERE coverageFamilyID=identifier of the coverage
    family AND context=the associated health impact context AND timeHorizon=3 years;
```

If the dynamic health impact type is utilized for the coverage family, a health impact function for the coverage family for the associated health impact context may be retrieved at 9717. For example, the health impact function may be a regression model for calculating a health impact value based on member state values. In one implementation, the health impact function may be retrieved by querying the database of estimated health impacts based on the identifier of the coverage family and/or member state values specified in the associated health impact context. For example, the health impact function for the coverage family for the associated health impact context may be retrieved via a MySQL database command similar to the following:

```
SELECT healthImpactFunction
FROM HealthImpacts
WHERE coverageFamilyID=identifier of the coverage
    family;
```

A health impact value for the coverage family for the associated health impact context may be calculated by evaluating the retrieved health impact function at 9721. In one implementation, the health impact value may be calculated by evaluating the retrieved health impact function based on the member state values specified in the associated health impact context. For example, the health impact value may be calculated in QALYs.

Value pricing function inputs (e.g., health impact value, coverage family cost) may be determined at 9725. For example, the value pricing function inputs may include the following:

| NAME | DESCRIPTION | UNITS | RANGE |
|---|---|---|---|
| COST EFFECTIVENESS | | | |
| QOL_Impact | Lifetime QALYs from QOL changes | QALYs | −50, +50 |
| Mortality_Impact | Lifetime QALYs from short-term mortality | QALYs | −50, +50 |
| Cost | Average net cost attributable to treatment | $ | −1M, +1M |

In one implementation, the value pricing function inputs may be provided as an input by the requestor. In another implementation, the value pricing function inputs may be retrieved, calculated, and/or the like based on inputs provided by the requestor.

Value pricing function parameters may be determined at 9729. For example, the value pricing function parameters may include the following:

| Name | Default Value | Description |
|---|---|---|
| CE-Floor | $35,000/QALY | Cost effectiveness threshold at which cost share begins to increase |
| CE-Ceiling | $105,000/QALY | Cost effectiveness threshold at which cost share begins to increase |
| Price_Min | $0 | Price cannot be less than this amount |
| CS_Min | 0 | Price cannot be less than this percent of cost |
| CS_Inef | Varies with plan | Inefficiency cost share (applied above (CE-ceiling) |
| Harm_Mulitplier | 3 | Used to calculate price of harmful interventions |

-continued

| Name | Default Value | Description |
|---|---|---|
| Mortality_Weight | 3 | Increases weight of near-term mortality in QALY calculation |

In one implementation, the value pricing function parameters may be default value pricing function parameters. In another implementation, the value pricing function parameters may be provided as an input by the requestor.

A value price component may be calculated at 9733. In one embodiment, the value price is a price component that depends on the cost and/or the health impact, but is independent of other treatments for the same condition. It may be determined by integrating the subsidy rate over the net cost of the treatment. For example, if the subsidy function is 100% for cost effectiveness up to C, and 90% thereafter, for a treatment with health impact h the first C/h of the cost would be fully covered and the member would pay 10% of the cost that exceeds this amount. In one implementation, the value price component may be calculated as follows: them and use average treatment episode costs from claims databases. In some implementations, the inefficiency cost share calculation has a cost share function that ramps up from zero to the maximum inefficiency cost share between the prices corresponding to a cost efficiency of CE_Min and CE_Max. In some implementations, the inefficiency cost share calculation may have a cost share function that has a constant slope while allowing CE_Max to change (e.g., higher CE_Max and a higher CS_Inef for leaner plans). In some implementations, a variable maximum on the value price may be utilized by using a variable function of cost effectiveness to keep the maximum price for the most cost effective care very attainable even when it is very expensive so that it does not create a barrier to care that is clearly reasonable and necessary. In some implementations, when the QALY's associated with a treatment can be divided into ones that relate to near-term mortality (e.g., surgical mortality or death related to a preventable event) vs. incremental quality of life impacts, the mortality-related QALY's may be multiplied by a factor w, where w is a parameter that can be set to values greater than one, to better align decisions with decisions that people would normally make.

```
Calculate Benefit
Benefit = QOL_Impact + Mort_Impact * Mortality_Weight //Weigh mortality QALYs higher
// if harmful and skip the normal calculation of the waste and inefficiency price
If Benefit<0 Raw_Waste_Inef_Price = Harm_Mulitplier * Cost // set raw waste = 3*cost
// If not harmful
// initializations
Else {
Raw_Inef_Price = Raw_Waste = 0        // initialize to zero
Benefit = Max(Benefit, 0.0001)        // make sure benefit is non-zero
CE = Cost/Benefit }                   // CE is cost per QALY
// Calculate raw inefficiency price
// Calculate inefficiency price by integrating cost-share(x) from x=0 to x=Cost
// From x=0 to x=CE_Min*Benefit cost_share is 0, so the integral is zero
// integrate the triangular region of the cost-share function from CE_Min*Benefit to
CE_Max*Benefit
Height = CS_Inef
Length = Benefit * (CE_Max-CE_Min))
Area = Height * Length / 2
// If CE< CE_Max modify to integrate only the tip of the triangle up to CE (square the
linear ratio)
Raw_inef_Price += Power(Max(0,Min(CE, CE_Max − CE_Min)/(CE_Max − CE_Min),2))*Area
// Add in the integral of the region from CE_Max to CE, with cost_share CS_inef
Raw_Inef_Price += CS_Inef * Benefit * Max(0, CE − CE_Max)
```

In some implementations, the cost of a coverage used may be defined as the estimated average lifetime cost of subsequent reimbursable medical care for a typical real-world populations who have the treatment now minus the corresponding cost for a matched population that doesn't have the treatment now (but may have the treatment later). In some implementations, the cost of a coverage may be estimated by identifying similar cost effectiveness calculations in the literature and adapting them to the current US commercial setting by substituting relevant prices and the likelihoods of different downstream outcomes, and if the additional costs specific to the no treatment pathway are believed to be quite small relative to treatment costs, we can choose to ignore Waste pricing function inputs (e.g., treatment paths data) may be determined at 9737. For example, the waste pricing function inputs may include the following:

| NAME OPTIMAL PATHWAY | DESCRIPTION | UNITS | RANGE |
|---|---|---|---|
| Early | Fraction of real-world procedures that were needed but were done over a year earlier than optimal. | | 0-1 |
| Unnecessary | Fraction of real-world procedures for which no treatment would have been the optimal choice | | 0-1 |

-continued

| NAME OPTIMAL PATHWAY | DESCRIPTION | UNITS | RANGE |
|---|---|---|---|
| Fraction_Alt_1 | Fraction of real-world procedures for which alternative treatment path #1 would have been the best choice and been sufficient (e.g., the fraction patients taking the optimal pathway who would stop after alternative 1) | | 0-1 |
| Cost_Alt_1 | Cost of alternative #1 | | −1M, +1M |
| Fraction_Alt_2 | Fraction of real-world procedures for which alternative treatment path #2 would have been the best choice and would have been sufficient (e.g., the fraction patients taking the optimal pathway who would stop after alternative 2) | | 0-1 |
| Cost_Alt_2 | Cost of alternative #2 | | −1M, +1M |
| ETC | Additional alternatives as needed | | |

In one implementation, the waste pricing function inputs may be provided as an input by the requestor. In another implementation, the waste pricing function inputs may be retrieved, calculated, and/or the like based on inputs provided by the requestor.

Waste pricing function parameters may be determined at 9741. For example, the waste pricing function parameters may include the following:

| Name | Default Value | Description |
|---|---|---|
| CS_Waste | Varies with plan | Cost Share applied to Waste |
| Early_Multiplier | 0.5 | Reduces impact of early treatment on waste |
| Min_Overuse | 0.1 | Overuse calculation ramp starts |
| Max_Overuse | 0.9 | Overuse calculation ramp ends |

In one implementation, the waste pricing function parameters may be default waste pricing function parameters. In another implementation, the waste pricing function parameters may be provided as an input by the requestor.

A waste price component may be calculated at 9745. In one embodiment, the waste price is the amount by which the cost of a service or treatment exceeds the cost of more efficient available treatments for the same condition that have similar health impact based on the evidence. In one implementation, the waste price component may be calculated as follows:

```
Calculate Waste
//Waste is the amount by which the cost exceeds the average cost of following an
//optimal treatment algorithm which delivers the same average benefit. For simplicity
//we assume here that the optimal treatment algorithm has a small number of paths
//which lead to success at lower cost than the treatment being evaluated, and that
//each of those paths has a probability (fraction) and cost.
//No Treatment Needed
//The first element of waste is unnecessary treatment (e.g., no treatment is optimal)
//Ramp function adjusts (unnecessary) to treat very low or high amounts of overuse as
//0 or 1
    Unnecessary=(Unnecessary−Min_Overuse)/(Max_Overuse−Min_Overuse)Raw_Waste+=Unnecessary*Cost
//Early Treatment
//The next category of waste is treatments which were done earlier than necessary or
//optimal by at least a year (e.g., the treatment cost could have been deferred beyond
//this plan year with slight positive or neutral impact on patient health). We modify
//the impact of this waste by the parameter Early_Multiplier, a factor between zero
//and one.
    Raw_Waste+=Early*Early_Multiplier*Cost
//Calculate waste corresponding to patients who would have had as effective less
//expensive treatment following the optimal treatment algorithm. Consider each path
//under the optimal algorithm that does not lead to the treatment being evaluated.
    For(path=1to n){Waste+=Fraction_Alt_n*(Cost-Cost_Alt_n)
}
```

In some implementations, the waste may be defined as the cost in excess of the expected (e.g., probabilistic average) cost of treatment for the least expensive treatment or treatment algorithm that provides the same or greater average health benefit with respect to the specific condition in question subject to fairness limitations. The expected cost of a treatment algorithm for an individual may be calculated by enumerating available paths, their cost and frequency. In some implementations, the waste may be calculated by approximating the comparative treatment algorithm with a linear series of treatments in order of increasing cost and potential harm. For example, for back pain, self-care, followed by physical therapy, followed by epidural injections, followed by spine surgery. In some implementations, the existence of multiple treatments with unknown health impact (e.g., treatments that are medically accepted and covered but there is insufficient evidence of non-zero health impact) does not trigger a waste charge for the more expensive treatments-which may happen if one of the other treatments has evidence of positive health impact. In some implementations, waste relative to alternative treatments (e.g., predictable (e.g., it applies to most of the individuals for whom the penalty might be charged) and actionable (e.g., member has visibility into the more efficient options using the UDRCD)) may be penalized more than overuse/misuse waste (e.g., non-actionable). For example, if there is 20% overuse, we may average in the "no benefit" waste with the weight 0.2w, where w is a factor (0<=w<=1) that accounts for the fact that the overuse waste is non-actionable. In some implementations, the overuse/misuse waste may be addressed on a personalized basis through the mechanism of contextual coverage. Contextual coverage personalizes treatment pricing by assigning lower prices for groups of people who can be expected to receive greater health benefit because of their different situations. For example, different diagnoses, disease stage, symptom severity or whether they have tried alternative treatments could be bases for contextual coverage. Thus, a high baseline price may be set (e.g., corresponding to the no benefit situation) and then individuals for whom the treatment is not overuse/misuse may be identified and offered a lower price. In some implementations, the treatment cost of a treatment that has been shown to be on average harmful for an entire group that includes the member may be considered waste, and a waste pricing function may be applied that equals or exceeds the standard waste function.

A price range minimum for the coverage family for the associated health impact context may be calculated at 9749. In one embodiment, the price range minimum may be a combination of the value price component and of the waste price component. For example, the price range minimum may be calculated using the following parameters:

| Name | Default Value | Description |
|---|---|---|
| Max_Total_Price | $12,000 | Maximum total price (e.g., premium plus copay) |
| Max_Min_Price | $6,000 | Minimum (base) price may not exceed this (e.g., half of Max_Total_Price) |
| Bounding_Scale | =Max_Price | Raw_Price at which price/Max_Price = 63% (1 − 1/e). The derivative of price at this point is 1/e times the derivative of the raw price. |
| Bounding_Power | 1 | In one implementation, 1 so that for low prices Price approximates the Raw_Price. Said another way we set this to one because we want the actual cost shares for treatments that are small compared to the Bounding_Scale to be approximately equal to the cost share parameters we have set. |
| Copay_to_Cost | 0.4 | Determines ratio of price range to cost or the raw smart copay range depending on the implementation |
| Max_Price_Range | $6,000 | Maximum smart copay range (e.g., half of Max_Total_Price) |

In one implementation, the price range minimum may be calculated as follows:

//Combine Inefficiency and Waste

Raw_Inef_Waste_Price=Raw_Inef_Price+Raw_Waste

//Apply "bounding function" to ensure minimum price is less than Max_Min_Price

//Apply exponential function of the form 1-e(−a**b) to translate from (0, infinity)

//to (0,1)

Price=Max_Min_Price*(1−exp(−(Raw_inef_Waste_Price/Bound_Scale)**Bound_Power)

//Apply other minimum requirements to the provisional price

Price=Max(Price,Min_Price,Cost*CS_Min)

//Reprice according to customer specific requirements, if any

//Use input matrix of customer min and max prices for each coverage.

//Or may be limits on percent changes from previous year

In some implementations, the Max_Treatment_Price (e.g., the maximum price for the most efficient or lowest price rank provider) may be set to be a percentage (e.g., half) of the Maximum Total Price (e.g., price maximum for the least efficient or highest price rank provider). This is not to say that the minimum price is half the maximum price, but that we may leave as much room for pricing variation related to providers as we do for variation between treatments. In some implementations, the price range minimum may be determined by adding the value price component and the waste price component. In some implementations, the price range minimum may be determined by computing unbounded component prices, combining them into bins of like things which are added together, applying an asymptotic bounding function to each bin, and adding the bin prices.

A price range maximum for the coverage family for the associated health impact context may be calculated at 9753. In one embodiment, the price range maximum may be a combination of the price range minimum and a smart copay (e.g., that takes into account provider efficiency). In one implementation, the price range maximum may be calculated as follows:

//Calculate Max price

Max_Price=Price+"Smart Copay"

In some implementations, the activated coverages for any given plan may have a maximum price (Max_Total_Price). This maximum and the maximums that apply to non-activated coverages could be considered customer inputs to plan design based on their covered population. Since the "raw" cost sharing calculations for expensive coverages may exceed that maximum, a function may be applied to prevent the price from exceeding the maximum. In some implementations, separate maximums may be applied to the provider-related portion of price (e.g., smart copays) and to the treatment-related portion of price (e.g., treatment inefficiency and waste) to ensure that the pricing remains understandable as we personalize it with contextual coverage: it may be confusing to have the difference in price between providers depend on the efficacy of the treatment for the individual, as would happen if we combined these two components and applied a single bounding function to the sum (e.g., another possible implementation). In various implementations, many families of functions could be used to enforce a maximum output for the conversion of raw to final prices. In some implementations, they may be monotonically increasing and convex, have derivative 1 at zero (e.g., price for inexpensive inefficient treatments should follow the cost-share parameter CS_Inef), and approach the maximum asymptotically. For example, an exponential function may be utilized to easily pick a treatment cost for which we want the responsiveness of price to cost for inefficient treatments to be about a third of the responsiveness for inexpensive treatments. In another example, a ceiling function that truncates the price (e.g., price=Min (Raw_Price, Max_Price)) may be utilized to apply maximum pricing leverage to decisions between the less expensive options.

The price range for the coverage family may be provided to the requestor at 9757. For example, the price range minimum and the price range maximum may be provided. In one implementation, the price range for the coverage family may be provided as a return value of a function call.

FIG. 98 shows implementation case(s) for the UDRCD. In FIG. 98, exemplary embodiments of the value price component and of the waste price component of the price (e.g., the minimum price, the maximum price) are illustrated.

FIG. 99 shows implementation case(s) for the UDRCD. In FIG. 99, exemplary effects of modifying the maximum price by value are illustrated using a wide view and a close-up view. The isobars show cost for the value price component. In this implementation, harms may be penalized more than health benefits are subsidized.

FIG. 100 shows implementation case(s) for the UDRCD. In FIG. 100, an exemplary waste penalty calculation to facilitate finding the efficiency threshold that may be used to define waste is illustrated. In this example, the length of the horizontal line associated with a wasteful treatment (e.g., treatment C, treatment \, treatment Y) leading to the efficiency threshold corresponds to the amount of waste associated with the wasteful treatment.

FIG. 101 shows implementation case(s) for the UDRCD. In FIG. 101, an exemplary waste determination is illustrated. When a new onset of lower back pain occurs, physical therapy may be the most efficient treatment, and the amount of waste associated with spine surgery may be large. However, if physical therapy fails, the efficiency threshold changes and the amount of waste associated with spine surgery may become small, resulting in a large contextual coverage credit that lowers the price range (e.g., the minimum price, the maximum price) associated with spine surgery for the member.

FIG. 102 shows implementation case(s) for the UDRCD. In FIG. 102, exemplary contextual coverage credits for spine surgery are illustrated. For an average patient, before trying physical therapy, the average patient may have to pay $5800 for spine surgery, but if physical therapy fails, the average patient may have to pay $4150 for spine surgery, reflecting the $1650 contextual coverage credit. For Ted, who has a higher risk of mortality from surgery than the average patient, before trying physical therapy, Ted may have to pay $6472 for spine surgery, but if physical therapy fails, Ted may have to pay $4443 for spine surgery, reflecting the $2029 contextual coverage credit. For Jane, who has a lower risk of mortality from surgery than the average patient, before trying physical therapy, Jane may have to pay $5170 for spine surgery, but if physical therapy fails, Jane may have to pay $3816 for spine surgery, reflecting the $1354 contextual coverage credit.

FIG. 103 shows implementation case(s) for the UDRCD. In FIG. 103, exemplary contextual coverage credits for two types of hernias are illustrated. For femoral hernia, watchful waiting results in a 50% chance of having to have emergency surgery. Thus, performing an elective surgery now saves both lives and money, and results in a large contextual coverage credit for the elective surgery. For inguinal hernia, watchful waiting results in a 5% chance of having to have emergency surgery. Thus, watchful waiting may be the better option given the $410K per QALY cost of performing an elective surgery now, and results in a small or no contextual coverage credit for the elective surgery.

FIG. 104 shows implementation case(s) for the UDRCD. In FIG. 104, exemplary parameters and associated default values that may be used, in one implementation, during price range calculation are illustrated.

Appendices 1-4 show various exemplary implementations of calculating price ranges for different coverage families. In some implementations, the following parameters may be used:

- Background Info: The first two parameters are used to calculate the impact of price changes on cost and health outcomes. The third is just a comment noting that health impact modifications to pricing were based on lifetime QALY's not a fixed horizon.
  - Bind current usage reduction vs Truven for Condit Coverage
  - Elasticity
  - QALY Horizon.
- Maximum Price and Component Maximums: The maximum price parameter may be used to distinguish between rich and lean plans. The fractional breakout into components can be varied if it is desired to focus more heavily on either reducing waste rather or increasing health impact
  - Overall Max: Top conditional coverage price total
  - Value Max: Fraction and amount allocated to value price
  - Smart Max: Fraction and amount allocated to additional smart copays
  - Waste Max: Fraction and amount allocated to alternative treatment, overuse, and harm waste.
- Value Price and Smart Copay: These parameters govern the way the upper and lower bound of price increases with cost as well as the range of cost per QALY within which treatments are considered highly cost effective and priced minimally
  - Min Patient Fraction: This is the price rate charged on costs below the cost effectiveness threshold.
  - Subsidy Decrease at Cost Effectiveness: This is the cost effectiveness threshold below which treatments are considered highly cost effective and charged only the minimum patient fraction of cost above.
  - Price Maxes out at Cost: This is the cost above which the price does not increase
  - Value Alpha: The alpha coefficient for the beta function governing the price function
  - Value Beta: The beta coefficient for the beta function governing the price function.
- Maximum Value Price: These are the parameters governing the way the overall maximum price is reduced for very cost effective treatments
  - Min Patient fraction
  - Subsidy decreases at
  - Price maxes out at cost
  - ValueMax Alpha
  - ValueMax Beta.
- Waste Based on Overuse: This section has parameters that manage how overuse rates are reflected in price. In particular, the parameter "w" turns the impact up and down.
- Minimum pricing: In one implementation, a minimal rate may be applied to cost-effective treatments. In other implementations, a minimum price or a certain fraction of the core coverage price may be applied as a minimum.

Additional Alternative Embodiment Examples

The following alternative example embodiments provide a number of variations of some of the already discussed principles for expanded color on the abilities of the UDRCD.

Members

Members starts with a core (or Personal Protection Plan (PPP)) (which in one non-limiting embodiment is a data structure including: coverage amounts, pointers to usage, estimated usage, goals, entities of coverage, persons of coverage, etc.) and a Health Reimbursement Account (HRA) (e.g., which also is a data structure with novel coverage, demand, reimbursement, and other data, structures, and links, etc.). The core provides coverage for unplanned accidents and illness and encourages the use of preventive services. 'The core was not designed to provide rich coverage for everyday medical expenses. Those expenses can be funded by the member's HRA or from their other personal financial accounts. Additionally, the core deliberately does not cover discretionary procedures and diagnostics. Coverage for those services are available through upgrades (or add-ins), which can be purchased at any point in the coverage cycle. The plan also includes automatic upgrades for those members with chronic conditions. The automatic upgrades reduce cost sharing for valuable preventive services designed to prevent hospitalizations.

Core

The core has no deductible and relies on co-pays to encourage effective health behaviors. As part of the core, members have unlimited access to free virtual care visits. Additionally, each member has access to 24×7 concierge support with a dedicated care advisor. When medical needs require more complex care, the core also provides a free virtual second opinion service. The core fully covers several preventive services, such as immunizations, well-child visits and mammograms, with no member co-pays. As such the UDRCD helps to decrease future costs by preventing more serious health issues from occurring or getting worse.

Default co-pay amounts are built into the services covered by the core, however, members have the opportunity to adjust their co-pays for each distinct service.

If members choose higher co-pays their premiums are reduced and the incremental savings created are deposited into their HRA. The reverse happens if they choose co-pay amounts below the default.

The default co-pay amounts under the core follow: (Illustrative prices/Not Actual)

| BENEFIT HIGHLIGHTS | In Network Co-Pay | Out Of Network Co-Pay |
|---|---|---|
| Preventive Health and Wellness Services | | |
| Periodic health exams; well-baby care | $0 | $75 |
| Routine immunizations/shots | $0 | $75 |
| Hearing screenings | $0 | $75 |
| Colorectal cancer screening: sigmoidoscopy, colonoscopy | $0 | $75 |
| Prostate screening exam (calendar year) | $0 | $75 |
| Nutritional counseling (limited to two visits per calendar year) | $0 | $75 |
| Physician/Provider Services | | |
| Office visits to Personal Physician/Provider | $25 | $75 |
| Office visits to Specialist | $100 | $300 |
| E-visits, telephone, video visits to a participating provider | $0 | Not Covered |
| Allergy shots, serums, infusions, and injectable medications | $25 | $75 |
| Surgery and anesthesia (in office) | $100 | $300 |
| Inpatient hospital visits for unplanned hospitalizations (including surgery and anesthesia) | $25 | $75 |
| Women's Health Services | | |
| Gynecological exams (calendar year); Pap tests | $0 | $75 |
| Mammograms | $0 | $200 |
| Mental Health/Chemical Dependency | | |
| Inpatient, residential services | $250 per day/Up To $2000 per admission | $500 per day/Up To $5000 per admission |
| Day treatment, intensive outpatient, and partial hospitalization services | $25 | $75 |
| Applied behavior analysis | $25 | $75 |
| Outpatient provider visits | $25 | $75 |
| Unplanned Hospital Services | | |
| Inpatient care | $250 per day/Up To $2000 per admission | $500 per day/Up To $5000 per admission |
| Observation care | $250 per day/Up To $2000 per admission | $500 per day/Up To $5000 per admission |
| Rehabilitative care (30 days per calendar year; 60 days head or spinal cord injuries) | $250 per day/Up To $2000 per admission | $500 per day/Up To $5000 per admission |
| Skilled nursing facility (180 days per calendar year) | $250 per day/Up To $2000 per admission | $500 per day/Up To $5000 per admission |
| Durable medical equipment and supplies | | |
| Durable medical equipment and supplies | 15% of cost | 30% of cost |
| Urgent Care/Emergency/Emergency Medical Transportation | | |
| Urgent care visits (for non-life threatening illness/minor injury) | $100 | $100 |
| Emergency services (for emergency medical conditions only. If admitted to hospital, copayment is not applied; all services subject to inpatient benefits.) | $300 | $300 |
| Emergency medical transportation | $150 | $150 |

-continued

| BENEFIT HIGHLIGHTS | In Network Co-Pay | Out Of Network Co-Pay |
|---|---|---|
| Other Covered Services | | |
| X-ray; lab services | $50 | $100 |
| Outpatient rehabilitative services (60 visits per calendar year) | $25 | $25 |
| Outpatient surgery, dialysis, infusion, chemotherapy, radiation therapy | $25 | $50 |
| Cardiac rehabilitation | $25 | $50 |
| Home health care (up to 180 visits per calendar year) | $25 | $50 |
| Hospice care | $25 | $50 |
| Hearing exam (limited to one per calendar year) | $25 | $50 |
| Hearing aids (one per ear every four calendar years) | 10% of cost | 10% of cost |
| Self-administered chemotherapy (Up to a 30-day supply from a designated participating pharmacy) | | |
| Generic Drugs | $25 | Not Covered |
| Formulary brand-name drugs | $25 | Not Covered |
| Non-formulary brand-name drugs | $25 | Not Covered |

The premiums and co-pays for the personal protection plan are designed to fund the initial coverage level as well as the portion of additional coverage upgrades within the same coverage period that are not funded by upgrade premium and co-pay amounts.

Coverage Upgrades

Coverage Upgrades may include three different types:

Chronic Condition Coverage Upgrades

Discretionary Procedure Coverage Upgrades

Service Category Coverage Upgrades

Chronic Condition Coverage Upgrades

The goal of chronic condition care is to keep members out of the hospital by removing barriers to preventive care including visits with their clinical team (primary care plus specialists), tests and medications. To remove these barriers the chronic condition upgrades remove co-pay amounts for preventive care as specified by the protocols developed by each of the specialty societies that are primarily responsible for managing each respective chronic condition. Our benefit makes preventive care free for those with chronic conditions, after they self identify as having that condition. By asking the member to enroll in the upgrade, our plan overcomes the challenge of identifying members with chronic conditions. Our plan identifies these members either during open enrollment or at the onset/diagnosis of the chronic condition because with our plan a member can upgrade on demand. This allows us to engage the member early and immediately put support programs in place for them.

The chronic conditions available for upgrade may include:

| |
|---|
| Asthma |
| Bipolar mood disease |
| Brochiectasis |
| Cardiac failure |
| Cardiomyopathy |
| Chronic obstructive pulmonary disease |
| Chronic kidney disease |
| Coronary artery disease |
| Crohn's disease |
| Diabetes insipidus |
| Diabetes mellitus type 1 |
| Diabetes mellitus type 2 |
| Arrythmia (irregular heartbeat) |
| Epilepsy |
| Glaucoma |
| Haemophilia |
| HIV |

-continued

| |
|---|
| Hyperlipidemia (high cholesterol) |
| Hypertension (high blood pressure) |
| Hypothyroidism (inactive thyroid gland) |
| Multiple sclerosis |
| Parkinson's disease |
| Rheumatoid arthritis |
| Schizophrenia |
| Systemic lupus erythematosis |
| Ulcerative colitis |
| Clinical depression |

Discretionary Procedure Coverage Upgrades

In addition to our strategy to better support preventive services, another aspect of our cost reduction strategy is to decrease the use of services that do not return substantial value to members. Leveraging the benefit designs put in place in South Africa and for the State of Oregon employees, we identified several services that are not supported by evidence. Those services are not covered by the core. However, coverage upgrades can be purchased for those services at any point in time. By not covering these services and making them available through a deliberate enrollment step that requires a significant financial commitment from the member, our plan encourages members to talk with their providers about treatment options and outcomes, rather than immediately settle on the most expensive treatment available. The savings created by lowering the use of these non-valuable services help to fund the increased investment the plan makes in preventive services for members with chronic conditions.

The following is an exemplary list of the procedure upgrades:

| |
|---|
| Infertility services |
| Temporomandibular joint (TMJ) |
| Maternity care |
| Routine newborn nursery care |
| Bariatric surgery |
| Sleep studies |
| Conservative back and neck treatment |
| Myringotomy (grommets) |
| Tonsillectomy |
| Adenoidectomy |
| Colonoscopy (other than colo rectal cancer screen where evidence based) |
| Sigmoidoscopy |
| Proctoscopy |
| Gastroscopy |

-continued

| |
|---|
| Cystoscopy |
| Knee Arthroscopy |
| Shoulder Arthroscopy |
| Functional Nasal Procedure/Sinus surgery |
| Hysterectomy (except for pre-operatively diagnosed cancer) |
| Laparoscopy |
| Hysteroscopy |
| Endometrial Ablation |
| Nissan Fundoplication (reflux surgery) |
| Spinal surgery (back & neck) |
| Knee Resurfacing |
| Knee Replacement |
| Hip Resurfacing |
| Hip Replacement |
| Bariatric Surgery |
| Bunionectomy |
| Hammertoe surgery |
| Knee viscosupplementation |
| Morton's neuroma |
| Spinal injections for pain |
| Upper GI endoscopy |
| Surgery For Benign Prostatic Hyperplasia |
| Warts |
| Varicose vein surgery |
| Varicose vein stripping |
| Ganglion surgery |
| Breast reduction |
| Radio frequency ablation |

The upgrades options vary in their premium and co-pay amounts, based on who and where the member chooses to receive the upgrade from. This variable pricing encourages the use of high quality and low cost providers.

Service Category Coverage Upgrades

Similar to discretionary procedures, there exist other categories of medical care that do not provide substantial value to members. These service categories are not covered as part of the core but can be purchased as an upgrade at any time by members.

The following is an exemplary list of the service category upgrades:

| |
|---|
| Sleep studies |
| High tech diagnostic imaging = PET, CT, MRI |
| ED visits without an inpatient stay |
| Acupuncture |
| Chiropractic |
| Naturopath |

Additional embodiments may include:

1. A coverage enrollment facilitating apparatus, comprising:
  a memory;
  a component collection in the memory, including:
    an enrollment facilitating component;
  a processor disposed in communication with the memory, and configured to issue a plurality of processing instructions from the component collection stored in the memory,
    wherein the processor issues instructions from the enrollment facilitating component, stored in the memory, to:
      obtain, via at least one processor, a coverage enrollment request from a user;
      determine, via at least one processor, a plan sponsor associated with the user;
      retrieve, via at least one processor, plan sponsor settings associated with the plan sponsor and the user, wherein the plan sponsor settings include atomized condition classification settings, atomized procedure classification settings, and subsidization settings;
      configure, via at least one processor, available options for an enrollment user interface based on the plan sponsor settings;
      obtain, via the enrollment user interface, copay setting selections for individual core coverage services, from the available options, of the user;
      obtain, via the enrollment user interface, atomized condition add-in selections, from the available options, of the user;
      obtain, via the enrollment user interface, atomized procedure add-in selections, from the available options, of the user;
      determine, via at least one processor, associated modeling data based on the plan sponsor settings and the obtained copay setting selections, atomized condition add-in selections, and atomized procedure add-in selections;
      calculate, via at least one processor, a core coverage cost using the associated modeling data;
      calculate, via at least one processor, add-in coverage costs, for each of the selected atomized condition add-in and each of the selected atomized procedure add-in, using the associated modeling data;
      calculate, via at least one processor, a user cost for the user based on the core coverage cost, the subsidization settings for the core coverage cost, the add-in coverage costs, and the subsidization settings for the add-in coverage costs; and
      configure, via at least one processor, the enrollment user interface to display the calculated user cost for the user.

2. The apparatus of embodiment 1, further comprising:
  the processor issues instructions from the enrollment facilitating component, stored in the memory, to:
    facilitate, via at least one processor, enrollment of the user into a plan that includes the core coverage, and add-ins coverage for the selected atomized condition add-ins and the selected atomized procedure add-ins.

3. The apparatus of embodiment 2, further comprising:
  the processor issues instructions from the enrollment facilitating component, stored in the memory, to:
    facilitate, via at least one processor, enrollment of the user into additional add-ins at any time during a plan term associated with the plan.

4. The apparatus of embodiment 1, wherein the plan sponsor settings include available plan terms.

5. The apparatus of embodiment 4, wherein a plan term is any of: days, weeks, months, yearly, multi-yearly.

6. The apparatus of embodiment 4, wherein the associated modeling data is determined based on a plan term selected by the user from the available plan terms.

7. The apparatus of embodiment 1, wherein the plan sponsor settings include available provider networks.

8. The apparatus of embodiment 7, wherein the associated modeling data is determined based on a set of provider networks selected by the user from the available provider networks.

9. The apparatus of embodiment 1, wherein the subsidization settings specify a first subsidization amount or percentage for the core coverage and a second subsidization amount or percentage for add-ins coverage.

10. The apparatus of embodiment 1, wherein the subsidization settings specify an individual subsidization amount or percentage for each add-in.

11. The apparatus of embodiment 1, wherein the available options associated with an atomized condition add-in include a plurality of available procedure options.

12. The apparatus of embodiment 1, wherein the available options associated with an atomized procedure add-in include a plurality of available provider options.

13. The apparatus of embodiment 12, wherein the available provider options are determined based on proximity of providers to the user's location.

14. The apparatus of embodiment 1, wherein a coverage cost associated with an atomized condition add-in is calculated based on disease progression probabilities associated with a corresponding atomized condition.

15. The apparatus of embodiment 1, wherein the user cost is a pay period deduction.

16. A processor-readable coverage enrollment facilitating non-transient physical medium storing processor-executable components, the components, comprising:

a component collection stored in the medium, including:

an enrollment facilitating component;

wherein the enrollment facilitating component, stored in the medium, includes processor-issuable instructions to:

obtain, via at least one processor, a coverage enrollment request from a user;

determine, via at least one processor, a plan sponsor associated with the user;

retrieve, via at least one processor, plan sponsor settings associated with the plan sponsor and the user, wherein the plan sponsor settings include atomized condition classification settings, atomized procedure classification settings, and subsidization settings;

configure, via at least one processor, available options for an enrollment user interface based on the plan sponsor settings;

obtain, via the enrollment user interface, copay setting selections for individual core coverage services, from the available options, of the user;

obtain, via the enrollment user interface, atomized condition add-in selections, from the available options, of the user;

obtain, via the enrollment user interface, atomized procedure add-in selections, from the available options, of the user;

determine, via at least one processor, associated modeling data based on the plan sponsor settings and the obtained copay setting selections, atomized condition add-in selections, and atomized procedure add-in selections;

calculate, via at least one processor, a core coverage cost using the associated modeling data;

calculate, via at least one processor, add-in coverage costs, for each of the selected atomized condition add-in and each of the selected atomized procedure add-in, using the associated modeling data;

calculate, via at least one processor, a user cost for the user based on the core coverage cost, the subsidization settings for the core coverage cost, the add-in coverage costs, and the subsidization settings for the add-in coverage costs; and configure, via at least one processor, the enrollment user interface to display the calculated user cost for the user.

17. The medium of embodiment 16, further comprising: the enrollment facilitating component, stored in the medium, includes processor-issuable instructions to:

facilitate, via at least one processor, enrollment of the user into a plan that includes the core coverage, and add-ins coverage for the selected atomized condition add-ins and the selected atomized procedure add-ins.

18. The medium of embodiment 17, further comprising: the enrollment facilitating component, stored in the medium, includes processor-issuable instructions to:

facilitate, via at least one processor, enrollment of the user into additional add-ins at any time during a plan term associated with the plan.

19. The medium of embodiment 16, wherein the plan sponsor settings include available plan terms.

20. The medium of embodiment 19, wherein a plan term is any of: days, weeks, months, yearly, multi-yearly.

21. The medium of embodiment 19, wherein the associated modeling data is determined based on a plan term selected by the user from the available plan terms.

22. The medium of embodiment 16, wherein the plan sponsor settings include available provider networks.

23. The medium of embodiment 22, wherein the associated modeling data is determined based on a set of provider networks selected by the user from the available provider networks.

24. The medium of embodiment 16, wherein the subsidization settings specify a first subsidization amount or percentage for the core coverage and a second subsidization amount or percentage for add-ins coverage.

25. The medium of embodiment 16, wherein the subsidization settings specify an individual subsidization amount or percentage for each add-in.

26. The medium of embodiment 16, wherein the available options associated with an atomized condition add-in include a plurality of available procedure options.

27. The medium of embodiment 16, wherein the available options associated with an atomized procedure add-in include a plurality of available provider options.

28. The medium of embodiment 27, wherein the available provider options are determined based on proximity of providers to the user's location.

29. The medium of embodiment 16, wherein a coverage cost associated with an atomized condition add-in is calculated based on disease progression probabilities associated with a corresponding atomized condition.

30. The medium of embodiment 16, wherein the user cost is a pay period deduction.

31. A processor-implemented coverage enrollment facilitating system, comprising:

an enrollment facilitating component means, to:

obtain, via at least one processor, a coverage enrollment request from a user;

determine, via at least one processor, a plan sponsor associated with the user;

retrieve, via at least one processor, plan sponsor settings associated with the plan sponsor and the user, wherein the plan sponsor settings include atomized condition classification settings, atomized procedure classification settings, and subsidization settings;

configure, via at least one processor, available options for an enrollment user interface based on the plan sponsor settings;

obtain, via the enrollment user interface, copay setting selections for individual core coverage services, from the available options, of the user;

obtain, via the enrollment user interface, atomized condition add-in selections, from the available options, of the user;

obtain, via the enrollment user interface, atomized procedure add-in selections, from the available options, of the user;

determine, via at least one processor, associated modeling data based on the plan sponsor settings and the obtained copay setting selections, atomized condition add-in selections, and atomized procedure add-in selections;

calculate, via at least one processor, a core coverage cost using the associated modeling data;

calculate, via at least one processor, add-in coverage costs, for each of the selected atomized condition add-in and each of the selected atomized procedure add-in, using the associated modeling data;

calculate, via at least one processor, a user cost for the user based on the core coverage cost, the subsidization settings for the core coverage cost, the add-in coverage costs, and the subsidization settings for the add-in coverage costs; and configure, via at least one processor, the enrollment user interface to display the calculated user cost for the user.

32. The system of embodiment 31, further comprising:

the enrollment facilitating component means, to:

facilitate, via at least one processor, enrollment of the user into a plan that includes the core coverage, and add-ins coverage for the selected atomized condition add-ins and the selected atomized procedure add-ins.

33. The system of embodiment 32, further comprising:

the enrollment facilitating component means, to:

facilitate, via at least one processor, enrollment of the user into additional add-ins at any time during a plan term associated with the plan.

34. The system of embodiment 31, wherein the plan sponsor settings include available plan terms.

35. The system of embodiment 34, wherein a plan term is any of: days, weeks, months, yearly, multi-yearly.

36. The system of embodiment 34, wherein the associated modeling data is determined based on a plan term selected by the user from the available plan terms.

37. The system of embodiment 31, wherein the plan sponsor settings include available provider networks.

38. The system of embodiment 37, wherein the associated modeling data is determined based on a set of provider networks selected by the user from the available provider networks.

39. The system of embodiment 31, wherein the subsidization settings specify a first subsidization amount or percentage for the core coverage and a second subsidization amount or percentage for add-ins coverage.

40. The system of embodiment 31, wherein the subsidization settings specify an individual subsidization amount or percentage for each add-in.

41. The system of embodiment 31, wherein the available options associated with an atomized condition add-in include a plurality of available procedure options.

42. The system of embodiment 31, wherein the available options associated with an atomized procedure add-in include a plurality of available provider options.

43. The system of embodiment 42, wherein the available provider options are determined based on proximity of providers to the user's location.

44. The system of embodiment 31, wherein a coverage cost associated with an atomized condition add-in is calculated based on disease progression probabilities associated with a corresponding atomized condition.

45. The system of embodiment 31, wherein the user cost is a pay period deduction.

46. A processor-implemented coverage enrollment facilitating method, comprising:

executing processor-implemented enrollment facilitating component instructions to:

obtain, via at least one processor, a coverage enrollment request from a user;

determine, via at least one processor, a plan sponsor associated with the user;

retrieve, via at least one processor, plan sponsor settings associated with the plan sponsor and the user, wherein the plan sponsor settings include atomized condition classification settings, atomized procedure classification settings, and subsidization settings;

configure, via at least one processor, available options for an enrollment user interface based on the plan sponsor settings;

obtain, via the enrollment user interface, copay setting selections for individual core coverage services, from the available options, of the user;

obtain, via the enrollment user interface, atomized condition add-in selections, from the available options, of the user;

obtain, via the enrollment user interface, atomized procedure add-in selections, from the available options, of the user;

determine, via at least one processor, associated modeling data based on the plan sponsor settings and the obtained copay setting selections, atomized condition add-in selections, and atomized procedure add-in selections;

calculate, via at least one processor, a core coverage cost using the associated modeling data;

calculate, via at least one processor, add-in coverage costs, for each of the selected atomized condition add-in and each of the selected atomized procedure add-in, using the associated modeling data;

calculate, via at least one processor, a user cost for the user based on the core coverage cost, the subsidization settings for the core coverage cost, the add-in coverage costs, and the subsidization settings for the add-in coverage costs; and configure, via at least one processor, the enrollment user interface to display the calculated user cost for the user.

47. The method of embodiment 46, further comprising:

executing processor-implemented enrollment facilitating component instructions to:

facilitate, via at least one processor, enrollment of the user into a plan that includes the core coverage, and add-ins coverage for the selected atomized condition add-ins and the selected atomized procedure add-ins.

48. The method of embodiment 47, further comprising:

executing processor-implemented enrollment facilitating component instructions to:

facilitate, via at least one processor, enrollment of the user into additional add-ins at any time during a plan term associated with the plan.

49. The method of embodiment 46, wherein the plan sponsor settings include available plan terms.

50. The method of embodiment 49, wherein a plan term is any of: days, weeks, months, yearly, multi-yearly.

51. The method of embodiment 49, wherein the associated modeling data is determined based on a plan term selected by the user from the available plan terms.

52. The method of embodiment 46, wherein the plan sponsor settings include available provider networks.

53. The method of embodiment 52, wherein the associated modeling data is determined based on a set of provider networks selected by the user from the available provider networks.

54. The method of embodiment 46, wherein the subsidization settings specify a first subsidization amount or percentage for the core coverage and a second subsidization amount or percentage for add-ins coverage.

55. The method of embodiment 46, wherein the subsidization settings specify an individual subsidization amount or percentage for each add-in.

56. The method of embodiment 46, wherein the available options associated with an atomized condition add-in include a plurality of available procedure options.

57. The method of embodiment 46, wherein the available options associated with an atomized procedure add-in include a plurality of available provider options.

58. The method of embodiment 57, wherein the available provider options are determined based on proximity of providers to the user's location.

59. The method of embodiment 46, wherein a coverage cost associated with an atomized condition add-in is calculated based on disease progression probabilities associated with a corresponding atomized condition.

60. The method of embodiment 46, wherein the user cost is a pay period deduction.

101. An add-in upgrade enrollment facilitating apparatus, comprising:

a memory;

a component collection in the memory, including:

an upgrade facilitating component;

a processor disposed in communication with the memory, and configured to issue a plurality of processing instructions from the component collection stored in the memory, wherein the processor issues instructions from the upgrade facilitating component, stored in the memory, to:

obtain, via at least one processor, an event signal associated with a plan member enrolled into a plan that includes a core coverage component and an add-ins coverage component;

retrieve, via at least one processor, plan member data associated with the plan member;

determine, via at least one processor, a condition or procedure associated with the event signal based on event signal data associated with the event signal;

determine, via at least one processor, that an atomized add-in upgrade that provides coverage for the determined condition or procedure is available to the plan member;

determine, via at least one processor, an atomized add-in recommendation for the plan member, wherein the atomized add-in recommendation includes a set of atomized add-in options;

provide, via an enrollment user interface, the atomized add-in recommendation to the plan member;

obtain, via the enrollment user interface, a selection of an atomized add-in from the plan member; and facilitate, via at least one processor, addition of the selected atomized add-in to the add-ins coverage component of the plan.

102. The apparatus of embodiment 101, further comprising:

the processor issues instructions from the upgrade facilitating component, stored in the memory, to:

determine, via at least one processor, that here is an outstanding claim associated with the plan member that benefits from the addition of the selected atomized add-in to the add-ins coverage component; and facilitate, via at least one processor, processing the outstanding claim based on coverage provided by the selected atomized add-in.

103. The apparatus of embodiment 101, wherein the event signal is one of: a coverage search by the plan member, a health care electronic data interchange transaction associated with the plan member, an electronic health information message associated with the plan member.

104. The apparatus of embodiment 101, wherein the event signal comprises a plurality of event signals, and wherein the condition or procedure associated with the event signal is determined based on a combination of event signal data from the plurality of event signals.

105. The apparatus of embodiment 101, wherein the plan member data includes at least one of: profile data associated with the plan member, clinical data associated with the plan member, plan configuration of the plan.

106. The apparatus of embodiment 105, wherein the condition or procedure associated with the event signal is determined also based on the clinical data associated with the plan member.

107. The apparatus of embodiment 105, wherein the atomized add-in recommendation is determined also based on the plan configuration of the plan.

108. The apparatus of embodiment 105, wherein the determination that the atomized add-in upgrade is available is determined also based on the profile data associated with the plan member.

109. The apparatus of embodiment 101, wherein the determination that the atomized add-in upgrade is available is made based on the determination that the core coverage component does not provide coverage for the determined condition or procedure, and that the add-ins coverage component does not provide coverage for the determined condition or procedure.

110. The apparatus of embodiment 101, wherein the determination that the atomized add-in upgrade is available is made based on the determination that a chronic condition add-in upgrade is beneficial for the plan member.

111. The apparatus of embodiment 101, wherein the set of atomized add-in options includes a plurality of available procedure add-in options.

112. The apparatus of embodiment 111, wherein the available procedure add-in options are determined based on care efficacy of procedures.

113. The apparatus of embodiment 101, wherein the set of atomized add-in options include a plurality of available provider add-in options.

114. The apparatus of embodiment 113, wherein the available provider add-in options are determined based on proximity of providers to the plan member's location.

115. The apparatus of embodiment 101, wherein the selected atomized add-in is associated with a payroll deduction cost and with a copay cost.

116. A processor-readable add-in upgrade enrollment facilitating non-transient physical medium storing processor-executable components, the components, comprising:
a component collection stored in the medium, including:
an upgrade facilitating component;
wherein the upgrade facilitating component, stored in the medium, includes processor-issuable instructions to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.

117. The medium of embodiment 116, further comprising:
the upgrade facilitating component, stored in the medium, includes processor-issuable instructions to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

118. The medium of embodiment 116, wherein the event signal is one of: a coverage search by the plan member, a health care electronic data interchange transaction associated with the plan member, an electronic health information message associated with the plan member.

119. The medium of embodiment 116, wherein the event signal comprises a plurality of event signals, and wherein the condition or procedure associated with the event signal is determined based on a combination of event signal data from the plurality of event signals.

120. The medium of embodiment 116, wherein the plan member data includes at least one of: profile data associated with the plan member, clinical data associated with the plan member, plan configuration of the plan.

121. The medium of embodiment 120, wherein the condition or procedure associated with the event signal is determined also based on the clinical data associated with the plan member.

122. The medium of embodiment 120, wherein the atomized add-in recommendation is determined also based on the plan configuration of the plan.

123. The medium of embodiment 120, wherein the determination that the atomized add-in upgrade is available is determined also based on the profile data associated with the plan member.

124. The medium of embodiment 116, wherein the determination that the atomized add-in upgrade is available is made based on the determination that the core coverage component does not provide coverage for the determined condition or procedure, and that the add-ins coverage component does not provide coverage for the determined condition or procedure.

125. The medium of embodiment 116, wherein the determination that the atomized add-in upgrade is available is made based on the determination that a chronic condition add-in upgrade is beneficial for the plan member.

126. The medium of embodiment 116, wherein the set of atomized add-in options includes a plurality of available procedure add-in options.

127. The medium of embodiment 126, wherein the available procedure add-in options are determined based on care efficacy of procedures.

128. The medium of embodiment 116, wherein the set of atomized add-in options include a plurality of available provider add-in options.

129. The medium of embodiment 128, wherein the available provider add-in options are determined based on proximity of providers to the plan member's location.

130. The medium of embodiment 116, wherein the selected atomized add-in is associated with a payroll deduction cost and with a copay cost.

131. A processor-implemented add-in upgrade enrollment facilitating system, comprising:
an upgrade facilitating component means, to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.

132. The system of embodiment 131, further comprising:
the upgrade facilitating component means, to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

133. The system of embodiment 131, wherein the event signal is one of: a coverage search by the plan member, a health care electronic data interchange transaction associated with the plan member, an electronic health information message associated with the plan member.

134. The system of embodiment 131, wherein the event signal comprises a plurality of event signals, and wherein the condition or procedure associated with the event signal is determined based on a combination of event signal data from the plurality of event signals.

135. The system of embodiment 131, wherein the plan member data includes at least one of: profile data associated with the plan member, clinical data associated with the plan member, plan configuration of the plan.

136. The system of embodiment 135, wherein the condition or procedure associated with the event signal is determined also based on the clinical data associated with the plan member.

137. The system of embodiment 135, wherein the atomized add-in recommendation is determined also based on the plan configuration of the plan.

138. The system of embodiment 135, wherein the determination that the atomized add-in upgrade is available is determined also based on the profile data associated with the plan member.

139. The system of embodiment 131, wherein the determination that the atomized add-in upgrade is available is made based on the determination that the core coverage component does not provide coverage for the determined condition or procedure, and that the add-ins coverage component does not provide coverage for the determined condition or procedure.

140. The system of embodiment 131, wherein the determination that the atomized add-in upgrade is available is made based on the determination that a chronic condition add-in upgrade is beneficial for the plan member.

141. The system of embodiment 131, wherein the set of atomized add-in options includes a plurality of available procedure add-in options.

142. The system of embodiment 141, wherein the available procedure add-in options are determined based on care efficacy of procedures.

143. The system of embodiment 131, wherein the set of atomized add-in options include a plurality of available provider add-in options.

144. The system of embodiment 143, wherein the available provider add-in options are determined based on proximity of providers to the plan member's location.

145. The system of embodiment 131, wherein the selected atomized add-in is associated with a payroll deduction cost and with a copay cost.

146. A processor-implemented add-in upgrade enrollment facilitating method, comprising:

executing processor-implemented upgrade facilitating component instructions to:

obtain, via at least one processor, an event signal associated with a plan member enrolled into a plan that includes a core coverage component and an add-ins coverage component;

retrieve, via at least one processor, plan member data associated with the plan member;

determine, via at least one processor, a condition or procedure associated with the event signal based on event signal data associated with the event signal;

determine, via at least one processor, that an atomized add-in upgrade that provides coverage for the determined condition or procedure is available to the plan member;

determine, via at least one processor, an atomized add-in recommendation for the plan member, wherein the atomized add-in recommendation includes a set of atomized add-in options;

provide, via an enrollment user interface, the atomized add-in recommendation to the plan member;

obtain, via the enrollment user interface, a selection of an atomized add-in from the plan member; and facilitate, via at least one processor, addition of the selected atomized add-in to the add-ins coverage component of the plan.

147. The method of embodiment 146, further comprising:

executing processor-implemented upgrade facilitating component instructions to:

determine, via at least one processor, that here is an outstanding claim associated with the plan member that benefits from the addition of the selected atomized add-in to the add-ins coverage component; and facilitate, via at least one processor, processing the outstanding claim based on coverage provided by the selected atomized add-in.

148. The method of embodiment 146, wherein the event signal is one of: a coverage search by the plan member, a health care electronic data interchange transaction associated with the plan member, an electronic health information message associated with the plan member.

149. The method of embodiment 146, wherein the event signal comprises a plurality of event signals, and wherein the condition or procedure associated with the event signal is determined based on a combination of event signal data from the plurality of event signals.

150. The method of embodiment 146, wherein the plan member data includes at least one of: profile data associated with the plan member, clinical data associated with the plan member, plan configuration of the plan.

151. The method of embodiment 150, wherein the condition or procedure associated with the event signal is determined also based on the clinical data associated with the plan member.

152. The method of embodiment 150, wherein the atomized add-in recommendation is determined also based on the plan configuration of the plan.

153. The method of embodiment 150, wherein the determination that the atomized add-in upgrade is available is determined also based on the profile data associated with the plan member.

154. The method of embodiment 146, wherein the determination that the atomized add-in upgrade is available is made based on the determination that the core coverage component does not provide coverage for the determined condition or procedure, and that the add-ins coverage component does not provide coverage for the determined condition or procedure.

155. The method of embodiment 146, wherein the determination that the atomized add-in upgrade is available is made based on the determination that a chronic condition add-in upgrade is beneficial for the plan member.

156. The method of embodiment 146, wherein the set of atomized add-in options includes a plurality of available procedure add-in options.

157. The method of embodiment 156, wherein the available procedure add-in options are determined based on care efficacy of procedures.

158. The method of embodiment 146, wherein the set of atomized add-in options include a plurality of available provider add-in options.

159. The method of embodiment 158, wherein the available provider add-in options are determined based on proximity of providers to the plan member's location.

160. The method of embodiment 146, wherein the selected atomized add-in is associated with a payroll deduction cost and with a copay cost.

201. An enhanced dynamic account structure apparatus, comprising:

a memory;

a component collection in the memory;

a processor disposed in communication with the memory, and configured to issue a plurality of processing instructions from the component collection stored in the memory, to:

obtain initial plan budget from a user, wherein the initial plan budget includes a temporal duration;

obtain plan option selections and values, via design user interface widgets, wherein the options include: individual co-pay options for individual events, and desired procedures, determine upgrade options based on initial plan budget value and plan option selections and values, wherein excess amounts left over from plan option selections and values from initial plan budget are used to search for upgrade options specific to the user;

provide determined upgrade options to the user;

obtain selected upgrade options from the user;

determine schedule options for the desired procedures and provide to the user for scheduling;

generate an enhanced dynamic account structure account, wherein the enhanced dynamic structure includes: an personalized health account structure, and wherein the personalized health account structure includes a core component includes catastrophic health coverage with preventative and primary care, wherein the personalized health account includes a pointer to callable options for additional services for the determined upgrade options and on demand coverage.

202. The enhanced dynamic account structure apparatus of embodiment 201, wherein the temporal duration is any of: days, weeks, months, yearly, and multi-yearly.

203. The enhanced dynamic account structure apparatus of embodiment 201, wherein the upgrade options include at least one of chronic condition coverage upgrades, discretionary procedure coverage upgrades and service category coverage upgrades.

204. The enhanced dynamic account structure apparatus of embodiment 201, wherein the personalized health account is an HRA.

205. The enhanced dynamic account structure apparatus of embodiment 201, wherein the pointer to callable options is an unreferenced pointer.

206. The enhanced dynamic account structure apparatus of embodiment 201, wherein the pointer to callable options is an untyped pointer.

207. The enhanced dynamic account structure apparatus of embodiment 201, wherein the pointer to callable options is an void types pointer that may late bind to different data types on-demand.

301. An atomized coverage graph generating apparatus, comprising:

a memory;

a component collection in the memory, including:

an atomized coverage graph generating component;

a processor disposed in communication with the memory, and configured to issue a plurality of processing instructions from the component collection stored in the memory, wherein the processor issues instructions from the atomized coverage graph generating component, stored in the memory, to:

obtain, via at least one processor, an atomized coverage graph generating request;

determine, via at least one processor, a set of clinical conditions associated with the atomized coverage graph generating request;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

302. The apparatus of embodiment 301, wherein the set of clinical conditions associated with the atomized coverage graph generating request is determined by grouping diagnosis codes for related ailments into clinical conditions.

303. The apparatus of embodiment 301, wherein a set of treatments associated with a clinical condition is determined by analyzing historical claims data associated with the clinical condition.

304. The apparatus of embodiment 301, wherein treatment paths data is filtered to include only high frequency treatment paths.

305. The apparatus of embodiment 304, wherein a high frequency treatment path is a treatment path utilized by at least a minimum percentage of members.

306. The apparatus of embodiment 304, wherein a high frequency treatment path is one of a plurality of high frequency treatment paths that in aggregate are utilized by at least a minimum percentage of members.

307. The apparatus of embodiment 301, wherein treatment paths data further specifies a ranking for each treatment path.

308. The apparatus of embodiment 301, wherein treatment paths data further specifies key pathway nodes for each treatment path.

309. The apparatus of embodiment 301, wherein practice patterns data of a provider object further specifies the corresponding provider's treatment cost associated with each linked treatment object.

310. The apparatus of embodiment 301, wherein at least some of the objects in the atomized coverage graph data structure are dynamic nodes configured to be generated dynamically using associated engageable code.

311. The apparatus of embodiment 310, wherein the engageable code is a SQL query.

312. The apparatus of embodiment 310, further, comprising:

the processor issues instructions from the atomized coverage graph generating component, stored in the memory, to:

determine that frequency of utilization of a dynamic node exceeds a specified threshold; and convert the dynamic node in the atomized coverage graph data structure to a static node.

313. The apparatus of embodiment 312, wherein the frequency of utilization is measured based on one of: a counter of utilization, a percentage of utilization.

314. The apparatus of embodiment 301, further, comprising:

the processor issues instructions from the atomized coverage graph generating component, stored in the memory, to:

determine that an importance quotient of a subset of objects in the atomized coverage graph data structure exceeds a specified threshold; and split off the subset of objects into new nodes in the atomized coverage graph data structure.

315. The apparatus of embodiment 314, wherein the importance quotient is determined using one of: a frequency of utilization measure, a machine learning structure.

316. A processor-readable atomized coverage graph generating non-transient physical medium storing processor-executable components, the components, comprising:

a component collection stored in the medium, including:

an atomized coverage graph generating component;

wherein the atomized coverage graph generating component, stored in the medium, includes processor-issuable instructions to:

obtain, via at least one processor, an atomized coverage graph generating request;

determine, via at least one processor, a set of clinical conditions associated with the atomized coverage graph generating request;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

317. The medium of embodiment 316, wherein the set of clinical conditions associated with the atomized coverage graph generating request is determined by grouping diagnosis codes for related ailments into clinical conditions.

318. The medium of embodiment 316, wherein a set of treatments associated with a clinical condition is determined by analyzing historical claims data associated with the clinical condition.

319. The medium of embodiment 316, wherein treatment paths data is filtered to include only high frequency treatment paths.

320. The medium of embodiment 319, wherein a high frequency treatment path is a treatment path utilized by at least a minimum percentage of members.

321. The medium of embodiment 319, wherein a high frequency treatment path is one of a plurality of high frequency treatment paths that in aggregate are utilized by at least a minimum percentage of members.

322. The medium of embodiment 316, wherein treatment paths data further specifies a ranking for each treatment path.

323. The medium of embodiment 316, wherein treatment paths data further specifies key pathway nodes for each treatment path.

324. The medium of embodiment 316, wherein practice patterns data of a provider object further specifies the corresponding provider's treatment cost associated with each linked treatment object.

325. The medium of embodiment 316, wherein at least some of the objects in the atomized coverage graph data structure are dynamic nodes configured to be generated dynamically using associated engageable code.

326. The medium of embodiment 325, wherein the engageable code is a SQL query.

327. The medium of embodiment 325, further, comprising:

the atomized coverage graph generating component, stored in the medium, includes processor-issuable instructions to:

determine that frequency of utilization of a dynamic node exceeds a specified threshold; and convert the dynamic node in the atomized coverage graph data structure to a static node.

328. The medium of embodiment 327, wherein the frequency of utilization is measured based on one of: a counter of utilization, a percentage of utilization.

329. The medium of embodiment 316, further, comprising:

the atomized coverage graph generating component, stored in the medium, includes processor-issuable instructions to:

determine that an importance quotient of a subset of objects in the atomized coverage graph data structure exceeds a specified threshold; and split off the subset of objects into new nodes in the atomized coverage graph data structure.

330. The medium of embodiment 329, wherein the importance quotient is determined using one of: a frequency of utilization measure, a machine learning structure.

331. A processor-implemented atomized coverage graph generating system, comprising:

an atomized coverage graph generating component means, to:

obtain, via at least one processor, an atomized coverage graph generating request;

determine, via at least one processor, a set of clinical conditions associated with the atomized coverage graph generating request;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

332. The system of embodiment 331, wherein the set of clinical conditions associated with the atomized coverage graph generating request is determined by grouping diagnosis codes for related ailments into clinical conditions.

333. The system of embodiment 331, wherein a set of treatments associated with a clinical condition is determined by analyzing historical claims data associated with the clinical condition.

334. The system of embodiment 331, wherein treatment paths data is filtered to include only high frequency treatment paths.

335. The system of embodiment 334, wherein a high frequency treatment path is a treatment path utilized by at least a minimum percentage of members.

336. The system of embodiment 334, wherein a high frequency treatment path is one of a plurality of high frequency treatment paths that in aggregate are utilized by at least a minimum percentage of members.

337. The system of embodiment 331, wherein treatment paths data further specifies a ranking for each treatment path.

338. The system of embodiment 331, wherein treatment paths data further specifies key pathway nodes for each treatment path.

339. The system of embodiment 331, wherein practice patterns data of a provider object further specifies the corresponding provider's treatment cost associated with each linked treatment object.

340. The system of embodiment 331, wherein at least some of the objects in the atomized coverage graph data structure are dynamic nodes configured to be generated dynamically using associated engageable code.

341. The system of embodiment 340, wherein the engageable code is a SQL query.

342. The system of embodiment 340, further, comprising:

the atomized coverage graph generating component means, to:

determine that frequency of utilization of a dynamic node exceeds a specified threshold; and convert the dynamic node in the atomized coverage graph data structure to a static node.

343. The system of embodiment 342, wherein the frequency of utilization is measured based on one of: a counter of utilization, a percentage of utilization.

344. The system of embodiment 331, further, comprising:

the atomized coverage graph generating component means, to:

determine that an importance quotient of a subset of objects in the atomized coverage graph data structure exceeds a specified threshold; and split off the subset of objects into new nodes in the atomized coverage graph data structure.

345. The system of embodiment 344, wherein the importance quotient is determined using one of: a frequency of utilization measure, a machine learning structure.

346. A processor-implemented atomized coverage graph generating method, comprising:

executing processor-implemented atomized coverage graph generating component instructions to: obtain, via at least one processor, an atomized coverage graph generating request;

determine, via at least one processor, a set of clinical conditions associated with the atomized coverage graph generating request;

determine, via at least one processor, for each clinical condition in the set of clinical conditions, a set of treatments associated with the respective clinical condition;

determine, via at least one processor, for each clinical condition in the set of clinical conditions, treatment paths data that specifies a set of treatment paths associated with the respective clinical condition, wherein each treatment path comprises an ordered subset of treatments from the set of treatments associated with the respective clinical condition;

determine, via at least one processor, for each treatment, a set of providers associated with the respective treatment;

determine, via at least one processor, practice patterns data that specifies, for each clinical condition treated by each provider, how likely the respective provider is to utilize each of the treatment paths in the set of treatment paths associated with the respective clinical condition; and generate, via at least one processor, an atomized coverage graph data structure that includes a set of clinical condition objects corresponding to the set of clinical conditions, a set of treatment objects corresponding to the determined treatments, and a set of provider objects corresponding to the determined providers, wherein each clinical condition object includes treatment paths data associated with the respective clinical condition, wherein each treatment object is linked to an associated condition object, wherein each provider object is linked to an associated treatment object, and wherein each provider object includes practice patterns data associated with the respective provider.

347. The method of embodiment 346, wherein the set of clinical conditions associated with the atomized coverage graph generating request is determined by grouping diagnosis codes for related ailments into clinical conditions.

348. The method of embodiment 346, wherein a set of treatments associated with a clinical condition is determined by analyzing historical claims data associated with the clinical condition.

349. The method of embodiment 346, wherein treatment paths data is filtered to include only high frequency treatment paths.

350. The method of embodiment 349, wherein a high frequency treatment path is a treatment path utilized by at least a minimum percentage of members.

351. The method of embodiment 349, wherein a high frequency treatment path is one of a plurality of high frequency treatment paths that in aggregate are utilized by at least a minimum percentage of members.

352. The method of embodiment 346, wherein treatment paths data further specifies a ranking for each treatment path.

353. The method of embodiment 346, wherein treatment paths data further specifies key pathway nodes for each treatment path.

354. The method of embodiment 346, wherein practice patterns data of a provider object further specifies the corresponding provider's treatment cost associated with each linked treatment object.

355. The method of embodiment 346, wherein at least some of the objects in the atomized coverage graph data structure are dynamic nodes configured to be generated dynamically using associated engageable code.

356. The method of embodiment 355, wherein the engageable code is a SQL query.

357. The method of embodiment 355, further, comprising:

executing processor-implemented atomized coverage graph generating component instructions to:

determine that frequency of utilization of a dynamic node exceeds a specified threshold; and convert the dynamic node in the atomized coverage graph data structure to a static node.

358. The method of embodiment 357, wherein the frequency of utilization is measured based on one of: a counter of utilization, a percentage of utilization.

359. The method of embodiment 346, further, comprising:

executing processor-implemented atomized coverage graph generating component instructions to:

determine that an importance quotient of a subset of objects in the atomized coverage graph data structure exceeds a specified threshold; and split off the subset of objects into new nodes in the atomized coverage graph data structure.

360. The method of embodiment 359, wherein the importance quotient is determined using one of: a frequency of utilization measure, a machine learning structure.

401. An add-in upgrade recommendation apparatus, comprising:

a memory;

a component collection in the memory, including:

an add-in recommendation determining component;

a processor disposed in communication with the memory, and configured to issue a plurality of processing instructions from the component collection stored in the memory, wherein the processor issues instructions from the add-in recommendation determining component, stored in the memory, to:

obtain, via at least one processor, an add-in recommendation request generated based on an event signal associated with a plan member enrolled into a plan that includes a core coverage component and an add-ins coverage component;

determine, via at least one processor, a condition associated with the add-in recommendation request based on event signal data associated with the event signal;

determine, via at least one processor, a set of treatment paths associated with the condition, wherein each treatment path is associated with a clinical value, and wherein each treatment path comprises a set of treatment pathway nodes;

obtain, via at least one processor, a member state associated with the plan member, wherein the member state includes clinical data;

determine, via at least one processor, the plan member's treatment path location with regard to the set of treatment paths based on analysis of the clinical data associated with the plan member;

determine, via at least one processor, available treatment paths that the plan member can take from the plan member's treatment path location from the set of treatment paths;

select, via at least one processor, a treatment path with a high clinical value from the available treatment paths;

determine, via at least one processor, an atomized add-in that provides coverage for the selected treatment path;

determine, via at least one processor, a set of providers available for the atomized add-in;

calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

402. The apparatus of embodiment 401, wherein the event signal is one of: a coverage search by the plan member, a health care electronic data interchange transaction associated with the plan member, an electronic health information message associated with the plan member.

403. The apparatus of embodiment 401, wherein the condition associated with the add-in recommendation request is determined based on a coverage search query specified by the plan member.

404. The apparatus of embodiment 401, wherein the condition associated with the add-in recommendation request is determined also based on clinical data associated with the plan member.

405. The apparatus of embodiment 401, wherein the instructions to determine the set of treatment paths associated with the condition further comprise instructions to:

retrieve, via at least one processor, an atomized coverage graph data structure associated with the plan;

determine, via at least one processor, a clinical condition object in the atomized coverage graph data structure corresponding to the condition associated with the add-in recommendation request; and determine, via at least one processor, a treatment paths object in the atomized coverage graph data structure associated with the clinical condition object.

406. The apparatus of embodiment 401, wherein the plan member's treatment path location is determined also based on a treatment path move sequence associated with the plan member.

407. The apparatus of embodiment 401, wherein the treatment path with a high clinical value is determined based on a determination that the plan member is located at a key treatment pathway node.

408. The apparatus of embodiment 401, wherein the atomized add-in is determined as a treatment add-in that provides coverage for the next treatment that the plan member must utilize to follow the selected treatment path from the plan member's treatment path location.

409. The apparatus of embodiment 401, wherein the atomized add-in is determined as a condition add-in that provides coverage for the condition.

410. The apparatus of embodiment 401, wherein the instructions to calculate, for each provider in the set of providers, an expected longitudinal treatment value further comprise instructions to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

411. The apparatus of embodiment 401, wherein the instructions to calculate, for each provider in the set of providers, a copay for the atomized add-in further comprise instructions to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

412. The apparatus of embodiment 411, wherein providers in the set of providers are restricted to providers in the region associated with the plan member.

413. The apparatus of embodiment 401, wherein a copay for the atomized add-in is further adjusted based on a treatment path move sequence associated with the plan member.

414. The apparatus of embodiment 401, further, comprising:

the processor issues instructions from the add-in recommendation determining component, stored in the memory, to:

generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

415. The apparatus of embodiment 414, wherein the information regarding the set of providers available for the atomized add-in is provided via a map component that shows the location of each provider and the copay associated with each provider on a map.

416. A processor-readable add-in upgrade recommendation non-transient physical medium storing processor-executable components, the components, comprising:

a component collection stored in the medium, including:

an add-in recommendation determining component;

wherein the add-in recommendation determining component, stored in the medium, includes processor-issuable instructions to:

obtain, via at least one processor, an add-in recommendation request generated based on an event signal associated with a plan member enrolled into a plan that includes a core coverage component and an add-ins coverage component;

determine, via at least one processor, a condition associated with the add-in recommendation request based on event signal data associated with the event signal;

determine, via at least one processor, a set of treatment paths associated with the condition, wherein each treatment path is associated with a clinical value, and wherein each treatment path comprises a set of treatment pathway nodes;

obtain, via at least one processor, a member state associated with the plan member, wherein the member state includes clinical data;

determine, via at least one processor, the plan member's treatment path location with regard to the set of treatment paths based on analysis of the clinical data associated with the plan member;

determine, via at least one processor, available treatment paths that the plan member can take from the plan member's treatment path location from the set of treatment paths;

select, via at least one processor, a treatment path with a high clinical value from the available treatment paths;

determine, via at least one processor, an atomized add-in that provides coverage for the selected treatment path;

determine, via at least one processor, a set of providers available for the atomized add-in;

calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

417. The medium of embodiment 416, wherein the event signal is one of: a coverage search by the plan member, a health care electronic data interchange transaction associated with the plan member, an electronic health information message associated with the plan member.

418. The medium of embodiment 416, wherein the condition associated with the add-in recommendation request is determined based on a coverage search query specified by the plan member.

419. The medium of embodiment 416, wherein the condition associated with the add-in recommendation request is determined also based on clinical data associated with the plan member.

420. The medium of embodiment 416, wherein the instructions to determine the set of treatment paths associated with the condition further comprise instructions to:

retrieve, via at least one processor, an atomized coverage graph data structure associated with the plan;

determine, via at least one processor, a clinical condition object in the atomized coverage graph data structure corresponding to the condition associated with the add-in recommendation request; and determine, via at least one processor, a treatment paths object in the atomized coverage graph data structure associated with the clinical condition object.

421. The medium of embodiment 416, wherein the plan member's treatment path location is determined also based on a treatment path move sequence associated with the plan member.

422. The medium of embodiment 416, wherein the treatment path with a high clinical value is determined based on a determination that the plan member is located at a key treatment pathway node.

423. The medium of embodiment 416, wherein the atomized add-in is determined as a treatment add-in that provides coverage for the next treatment that the plan member must utilize to follow the selected treatment path from the plan member's treatment path location.

424. The medium of embodiment 416, wherein the atomized add-in is determined as a condition add-in that provides coverage for the condition.

425. The medium of embodiment 416, wherein the instructions to calculate, for each provider in the set of providers, an expected longitudinal treatment value further comprise instructions to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

426. The medium of embodiment 416, wherein the instructions to calculate, for each provider in the set of providers, a copay for the atomized add-in further comprise instructions to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

427. The medium of embodiment 426, wherein providers in the set of providers are restricted to providers in the region associated with the plan member.

428. The medium of embodiment 416, wherein a copay for the atomized add-in is further adjusted based on a treatment path move sequence associated with the plan member.

429. The medium of embodiment 416, further, comprising:

the add-in recommendation determining component, stored in the medium, includes processor-issuable instructions to:

generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

430. The medium of embodiment 429, wherein the information regarding the set of providers available for the atomized add-in is provided via a map component that shows the location of each provider and the copay associated with each provider on a map.

431. A processor-implemented add-in upgrade recommendation system, comprising:

an add-in recommendation determining component means, to:

obtain, via at least one processor, an add-in recommendation request generated based on an event signal associated with a plan member enrolled into a plan that includes a core coverage component and an add-ins coverage component;

determine, via at least one processor, a condition associated with the add-in recommendation request based on event signal data associated with the event signal;

determine, via at least one processor, a set of treatment paths associated with the condition, wherein each treatment path is associated with a clinical value, and wherein each treatment path comprises a set of treatment pathway nodes;

obtain, via at least one processor, a member state associated with the plan member, wherein the member state includes clinical data;

determine, via at least one processor, the plan member's treatment path location with regard to the set of treatment paths based on analysis of the clinical data associated with the plan member;

determine, via at least one processor, available treatment paths that the plan member can take from the plan member's treatment path location from the set of treatment paths;

select, via at least one processor, a treatment path with a high clinical value from the available treatment paths;

determine, via at least one processor, an atomized add-in that provides coverage for the selected treatment path;

determine, via at least one processor, a set of providers available for the atomized add-in;

calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

432. The system of embodiment 431, wherein the event signal is one of: a coverage search by the plan member, a health care electronic data interchange transaction associated with the plan member, an electronic health information message associated with the plan member.

433. The system of embodiment 431, wherein the condition associated with the add-in recommendation request is determined based on a coverage search query specified by the plan member.

434. The system of embodiment 431, wherein the condition associated with the add-in recommendation request is determined also based on clinical data associated with the plan member.

435. The system of embodiment 431, wherein the means to determine the set of treatment paths associated with the condition further comprise means to:

retrieve, via at least one processor, an atomized coverage graph data structure associated with the plan;

determine, via at least one processor, a clinical condition object in the atomized coverage graph data structure corresponding to the condition associated with the add-in recommendation request; and determine, via at least one processor, a treatment paths object in the atomized coverage graph data structure associated with the clinical condition object.

436. The system of embodiment 431, wherein the plan member's treatment path location is determined also based on a treatment path move sequence associated with the plan member.

437. The system of embodiment 431, wherein the treatment path with a high clinical value is determined based on a determination that the plan member is located at a key treatment pathway node.

438. The system of embodiment 431, wherein the atomized add-in is determined as a treatment add-in that provides coverage for the next treatment that the plan member must utilize to follow the selected treatment path from the plan member's treatment path location.

439. The system of embodiment 431, wherein the atomized add-in is determined as a condition add-in that provides coverage for the condition.

440. The system of embodiment 431, wherein the means to calculate, for each provider in the set of providers, an expected longitudinal treatment value further comprise means to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

441. The system of embodiment 431, wherein the means to calculate, for each provider in the set of providers, a copay for the atomized add-in further comprise means to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

442. The system of embodiment 441, wherein providers in the set of providers are restricted to providers in the region associated with the plan member.

443. The system of embodiment 431, wherein a copay for the atomized add-in is further adjusted based on a treatment path move sequence associated with the plan member.

444. The system of embodiment 431, further, comprising:

the add-in recommendation determining component means, to:

generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

445. The system of embodiment 444, wherein the information regarding the set of providers available for the atomized add-in is provided via a map component that shows the location of each provider and the copay associated with each provider on a map.

446. A processor-implemented add-in upgrade recommendation method, comprising:

executing processor-implemented add-in recommendation determining component instructions to:

obtain, via at least one processor, an add-in recommendation request generated based on an event signal associated with a plan member enrolled into a plan that includes a core coverage component and an add-ins coverage component;

determine, via at least one processor, a condition associated with the add-in recommendation request based on event signal data associated with the event signal;

determine, via at least one processor, a set of treatment paths associated with the condition, wherein each treatment path is associated with a clinical value, and wherein each treatment path comprises a set of treatment pathway nodes;

obtain, via at least one processor, a member state associated with the plan member, wherein the member state includes clinical data;

determine, via at least one processor, the plan member's treatment path location with regard to the set of treatment paths based on analysis of the clinical data associated with the plan member;

determine, via at least one processor, available treatment paths that the plan member can take from the plan member's treatment path location from the set of treatment paths;

select, via at least one processor, a treatment path with a high clinical value from the available treatment paths;

determine, via at least one processor, an atomized add-in that provides coverage for the selected treatment path;

determine, via at least one processor, a set of providers available for the atomized add-in;

calculate, via at least one processor, for each provider in the set of providers, (a) an expected longitudinal treatment value and (b) a copay for the atomized add-in;

determine, via at least one processor, a best provider from the set of providers, wherein the best provider is associated with the lowest expected longitudinal treatment value; and provide, via at least one processor, an atomized add-in recommendation for the plan member, wherein the atomized add-in recommendation is associated with the atomized add-in and with the best provider.

447. The method of embodiment 446, wherein the event signal is one of: a coverage search by the plan member, a health care electronic data interchange transaction associated with the plan member, an electronic health information message associated with the plan member.

448. The method of embodiment 446, wherein the condition associated with the add-in recommendation request is determined based on a coverage search query specified by the plan member.

449. The method of embodiment 446, wherein the condition associated with the add-in recommendation request is determined also based on clinical data associated with the plan member.

450. The method of embodiment 446, wherein the instructions to determine the set of treatment paths associated with the condition further comprise instructions to:

retrieve, via at least one processor, an atomized coverage graph data structure associated with the plan;

determine, via at least one processor, a clinical condition object in the atomized coverage graph data structure corresponding to the condition associated with the add-in recommendation request; and determine, via at least one processor, a treatment paths object in the atomized coverage graph data structure associated with the clinical condition object.

451. The method of embodiment 446, wherein the plan member's treatment path location is determined also based on a treatment path move sequence associated with the plan member.

452. The method of embodiment 446, wherein the treatment path with a high clinical value is determined based on a determination that the plan member is located at a key treatment pathway node.

453. The method of embodiment 446, wherein the atomized add-in is determined as a treatment add-in that provides coverage for the next treatment that the plan member must utilize to follow the selected treatment path from the plan member's treatment path location.

454. The method of embodiment 446, wherein the atomized add-in is determined as a condition add-in that provides coverage for the condition.

455. The method of embodiment 446, wherein the instructions to calculate, for each provider in the set of providers, an expected longitudinal treatment value further comprise instructions to:

retrieve, via at least one processor, an atomized coverage graph data structure associated with the plan;

determine, via at least one processor, a provider object in the atomized coverage graph data structure corresponding to the respective provider;

calculate, via at least one processor, a propensity ranking based on practice patterns data associated with the provider object;

determine, via at least one processor, a propensity weight based on the plan member's treatment path location;

calculate, via at least one processor, an expected episodic cost for a next expected treatment for the condition based on treatment cost data associated with the provider object;

determine, via at least one processor, an episodic cost weight based on the plan member's treatment path location; and calculate, via at least one processor, an expected longitudinal treatment value for the respective provider as a weighted average of the respective provider's propensity ranking and the expected episodic cost for the next expected treatment weighted by their respective weights.

456. The method of embodiment 446, wherein the instructions to calculate, for each provider in the set of providers, a copay for the atomized add-in further comprise instructions to:

determine, via at least one processor, a base copay for the atomized add-in based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the atomized add-in for the respective provider as the base copay for the respective provider adjusted by the price factor for the respective provider.

457. The method of embodiment 456, wherein providers in the set of providers are restricted to providers in the region associated with the plan member.

458. The method of embodiment 446, wherein a copay for the atomized add-in is further adjusted based on a treatment path move sequence associated with the plan member.

459. The method of embodiment 446, further, comprising:

executing processor-implemented add-in recommendation determining component instructions to:

generate, via an enrollment user interface, a notification with the atomized add-in recommendation for the plan member;

obtain, via the enrollment user interface, a selection of the atomized add-in from the plan member; and provide, via the enrollment user interface, information regarding the set of providers available for the atomized add-in, wherein the best provider is highlighted for the plan member.

460. The method of embodiment 459, wherein the information regarding the set of providers available for the atomized add-in is provided via a map component that shows the location of each provider and the copay associated with each provider on a map.

501. A coverage search processing apparatus, comprising:

a memory;

a component collection in the memory, including:

a search processing component;

a processor disposed in communication with the memory, and configured to issue a plurality of processing instructions from the component collection stored in the memory, wherein the processor issues instructions from the search processing component, stored in the memory, to:

obtain, via at least one processor, a coverage search request from a member enrolled into a plan, wherein the coverage search request includes a coverage search query specified by the member;

determine, via at least one processor, a condition associated with the coverage search request based on the coverage search query;

determine, via at least one processor, a set of treatment paths associated with the condition, wherein each treatment path is associated with a clinical value, and wherein each treatment path comprises a set of treatment pathway nodes;

obtain, via at least one processor, a member state associated with the member, wherein the member state includes clinical data;

determine, via at least one processor, the member's treatment path location with regard to the set of treatment paths based on analysis of the clinical data associated with the member;

determine, via at least one processor, a high value treatment path that the member can take from the member's treatment path location;

identify, via at least one processor, a next treatment on the high value treatment path;

determine, via at least one processor, a set of providers available for the next treatment;

calculate, via at least one processor, for each provider in the set of providers, (a) an expected longitudinal treatment value and (b) a copay for the next treatment;

determine, via at least one processor, a best provider from the set of providers, wherein the best provider is associated with the lowest expected longitudinal treatment value; and provide, via a least one processor, coverage information for the member, wherein the coverage information includes coverage information for the next treatment for the best provider.

502. The apparatus of embodiment 501, wherein the instructions to determine the condition associated with the coverage search request further comprise instructions to:

retrieve, via at least one processor, an atomized coverage graph data structure associated with the plan; and search, via at least one processor, through clinical condition objects in the atomized coverage graph data structure to determine a clinical condition object corresponding to the coverage search query.

503. The apparatus of embodiment 501, wherein the instructions to determine the condition associated with the coverage search request further comprise instructions to:

retrieve, via at least one processor, an atomized coverage graph data structure associated with the plan;

search, via at least one processor, through treatment objects in the atomized coverage graph data structure to determine a treatment object corresponding to the coverage search query; and determine, via at least one processor, a clinical condition object linked to the treatment object.

504. The apparatus of embodiment 501, wherein the condition associated with the coverage search request is determined also based on clinical data associated with the member.

505. The apparatus of embodiment 502, wherein the instructions to determine the set of treatment paths associated with the condition further comprise instructions to determine a treatment paths object in the atomized coverage graph data structure associated with the clinical condition object.

506. The apparatus of embodiment 503, wherein the instructions to determine the set of providers available for the next treatment further comprise instructions to:

determine, via at least one processor, provider objects in the atomized coverage graph data structure linked to the treatment object; and filter, via at least one processor, the determined provider objects to discard provider objects that are not in the region associated with the member.

507. The apparatus of embodiment 506, wherein the instructions to calculate, for each provider in the set of providers, an expected longitudinal treatment value further comprise instructions to:

determine, via at least one processor, a provider object in the set of providers available for the next treatment corresponding to the respective provider;

calculate, via at least one processor, a propensity ranking based on practice patterns data associated with the provider object;

determine, via at least one processor, a propensity weight based on the member's treatment path location;

calculate, via at least one processor, an expected episodic cost for the next treatment based on treatment cost data associated with the provider object;

determine, via at least one processor, an episodic cost weight based on the member's treatment path location; and calculate, via at least one processor, an expected longitudinal treatment value for the respective provider as a weighted average of the respective provider's propensity ranking and the expected episodic cost for the next treatment weighted by their respective weights.

508. The apparatus of embodiment 507, wherein the instructions to calculate, for each provider in the set of providers, a copay for the next treatment further comprise instructions to:

determine, via at least one processor, a base copay for the next treatment based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the next treatment for the respective provider as the base copay for the respective provider adjusted by the price factor for the respective provider.

509. The apparatus of embodiment 501, wherein a copay for the next treatment is further adjusted based on a treatment path move sequence associated with the member.

510. The apparatus of embodiment 501, wherein a copay for the next treatment is further adjusted based on a determination that the member state associated with the member indicates that the member has been diagnosed with the condition.

511. The apparatus of embodiment 501, further, comprising:

the processor issues instructions from the search processing component, stored in the memory, to:

determine, via at least one processor, that the best provider does not match a member requested provider in the coverage search query; and wherein the coverage information provided for the member also includes coverage information for the next treatment for the member requested provider.

512. The apparatus of embodiment 501, further, comprising:

the processor issues instructions from the search processing component, stored in the memory, to:

determine, via at least one processor, that the next treatment on the high value treatment path does not match a member specified treatment in the coverage search query;

determine, via at least one processor, a set of providers available for the member specified treatment;

calculate, via at least one processor, for each provider in the set of providers available for the member specified treatment, (a) an expected longitudinal treatment value assuming that the member utilizes the member specified treatment next and (b) a copay for the member specified treatment;

determine, via at least one processor, a best provider from the second set of providers, wherein the best provider from the second set of providers is associated with the lowest expected longitudinal treatment value assuming that the member utilizes the member specified treatment next; and wherein the coverage information provided for the member also includes coverage information for the member specified treatment for the best provider from the second set of providers.

513. The apparatus of embodiment 501, wherein the instructions to obtain the coverage search request further comprise instructions to:

generate, via a coverage search user interface, a GUI widget configured to obtain a member specified treatment; and generate, via the coverage search user interface, a GUI widget configured to obtain a member requested provider.

514. The apparatus of embodiment 513, wherein the instructions to provide the coverage information for the member further comprise instructions to:

generate, via the coverage search user interface, a GUI widget configured to provide coverage information for an atomized add-in that that provides coverage for the member specified treatment;

generate, via the coverage search user interface, a GUI widget configured to provide coverage information for an atomized add-in that that provides coverage for the next treatment;

obtain, via the coverage search user interface, an atomized add-in selection from the member; and generate, via the coverage search user interface, a GUI widget configured to provide coverage information regarding providers available for the member selected atomized add-in, wherein the best provider is highlighted for the member.

515. The apparatus of embodiment 514, wherein the member requested provider is highlighted for the plan member using at least one of: positioning, header, color, border, font.

516. A processor-readable coverage search processing non-transient physical medium storing processor-executable components, the components, comprising:

a component collection stored in the medium, including:
  a search processing component;
  wherein the search processing component, stored in the medium, includes processor-issuable instructions to:
    obtain, via at least one processor, a coverage search request from a member enrolled into a plan, wherein the coverage search request includes a coverage search query specified by the member;
    determine, via at least one processor, a condition associated with the coverage search request based on the coverage search query;
    determine, via at least one processor, a set of treatment paths associated with the condition, wherein each treatment path is associated with a clinical value, and wherein each treatment path comprises a set of treatment pathway nodes;
    obtain, via at least one processor, a member state associated with the member, wherein the member state includes clinical data;
    determine, via at least one processor, the member's treatment path location with regard to the set of treatment paths based on analysis of the clinical data associated with the member;
    determine, via at least one processor, a high value treatment path that the member can take from the member's treatment path location;
    identify, via at least one processor, a next treatment on the high value treatment path;
    determine, via at least one processor, a set of providers available for the next treatment;
    calculate, via at least one processor, for each provider in the set of providers, (a) an expected longitudinal treatment value and (b) a copay for the next treatment;
    determine, via at least one processor, a best provider from the set of providers, wherein the best provider is associated with the lowest expected longitudinal treatment value; and
    provide, via a least one processor, coverage information for the member, wherein the coverage information includes coverage information for the next treatment for the best provider.

517. The medium of embodiment 516, wherein the instructions to determine the condition associated with the coverage search request further comprise instructions to:

retrieve, via at least one processor, an atomized coverage graph data structure associated with the plan; and
search, via at least one processor, through clinical condition objects in the atomized coverage graph data structure to determine a clinical condition object corresponding to the coverage search query.

518. The medium of embodiment 516, wherein the instructions to determine the condition associated with the coverage search request further comprise instructions to:

retrieve, via at least one processor, an atomized coverage graph data structure associated with the plan;
search, via at least one processor, through treatment objects in the atomized coverage graph data structure to determine a treatment object corresponding to the coverage search query; and
determine, via at least one processor, a clinical condition object linked to the treatment object.

519. The medium of embodiment 516, wherein the condition associated with the coverage search request is determined also based on clinical data associated with the member.

520. The medium of embodiment 517, wherein the instructions to determine the set of treatment paths associated with the condition further comprise instructions to determine a treatment paths object in the atomized coverage graph data structure associated with the clinical condition object.

521. The medium of embodiment 518, wherein the instructions to determine the set of providers available for the next treatment further comprise instructions to:

determine, via at least one processor, provider objects in the atomized coverage graph data structure linked to the treatment object; and
filter, via at least one processor, the determined provider objects to discard provider objects that are not in the region associated with the member.

522. The medium of embodiment 521, wherein the instructions to calculate, for each provider in the set of providers, an expected longitudinal treatment value further comprise instructions to:

determine, via at least one processor, a provider object in the set of providers available for the next treatment corresponding to the respective provider;
calculate, via at least one processor, a propensity ranking based on practice patterns data associated with the provider object;
determine, via at least one processor, a propensity weight based on the member's treatment path location;
calculate, via at least one processor, an expected episodic cost for the next treatment based on treatment cost data associated with the provider object;
determine, via at least one processor, an episodic cost weight based on the member's treatment path location; and
calculate, via at least one processor, an expected longitudinal treatment value for the respective provider as a weighted average of the respective provider's propensity ranking and the expected episodic cost for the next treatment weighted by their respective weights.

523. The medium of embodiment 522, wherein the instructions to calculate, for each provider in the set of providers, a copay for the next treatment further comprise instructions to:

determine, via at least one processor, a base copay for the next treatment based on an average longitudinal treatment value for providers in the set of providers;
calculate, via at least one processor, a price factor for the respective provider, wherein the price factor indicates relative expense of the expected longitudinal treatment value for the respective provider as compared with the average longitudinal treatment value for providers in the set of providers; and
calculate, via at least one processor, a copay for the next treatment for the respective provider as the base copay for the respective provider adjusted by the price factor for the respective provider.

524. The medium of embodiment 516, wherein a copay for the next treatment is further adjusted based on a treatment path move sequence associated with the member.

525. The medium of embodiment 516, wherein a copay for the next treatment is further adjusted based on a determination that the member state associated with the member indicates that the member has been diagnosed with the condition.

526. The medium of embodiment 516, further, comprising:

the search processing component, stored in the medium, includes processor-issuable instructions to:

determine, via at least one processor, that the best provider does not match a member requested provider in the coverage search query; and wherein the coverage information provided for the member also includes coverage information for the next treatment for the member requested provider.

527. The medium of embodiment 516, further, comprising:

the search processing component, stored in the medium, includes processor-issuable instructions to:

determine, via at least one processor, that the next treatment on the high value treatment path does not match a member specified treatment in the coverage search query;

determine, via at least one processor, a set of providers available for the member specified treatment;

calculate, via at least one processor, for each provider in the set of providers available for the member specified treatment, (a) an expected longitudinal treatment value assuming that the member utilizes the member specified treatment next and (b) a copay for the member specified treatment;

determine, via at least one processor, a best provider from the second set of providers, wherein the best provider from the second set of providers is associated with the lowest expected longitudinal treatment value assuming that the member utilizes the member specified treatment next; and wherein the coverage information provided for the member also includes coverage information for the member specified treatment for the best provider from the second set of providers.

528. The medium of embodiment 516, wherein the instructions to obtain the coverage search request further comprise instructions to:

generate, via a coverage search user interface, a GUI widget configured to obtain a member specified treatment; and generate, via the coverage search user interface, a GUI widget configured to obtain a member requested provider.

529. The medium of embodiment 528, wherein the instructions to provide the coverage information for the member further comprise instructions to:

generate, via the coverage search user interface, a GUI widget configured to provide coverage information for an atomized add-in that that provides coverage for the member specified treatment;

generate, via the coverage search user interface, a GUI widget configured to provide coverage information for an atomized add-in that that provides coverage for the next treatment;

obtain, via the coverage search user interface, an atomized add-in selection from the member; and generate, via the coverage search user interface, a GUI widget configured to provide coverage information regarding providers available for the member selected atomized add-in, wherein the best provider is highlighted for the member.

530. The medium of embodiment 529, wherein the member requested provider is highlighted for the plan member using at least one of: positioning, header, color, border, font.

531. A processor-implemented coverage search processing system, comprising:

a search processing component means, to:

obtain, via at least one processor, a coverage search request from a member enrolled into a plan, wherein the coverage search request includes a coverage search query specified by the member;

determine, via at least one processor, a condition associated with the coverage search request based on the coverage search query;

determine, via at least one processor, a set of treatment paths associated with the condition, wherein each treatment path is associated with a clinical value, and wherein each treatment path comprises a set of treatment pathway nodes;

obtain, via at least one processor, a member state associated with the member, wherein the member state includes clinical data;

determine, via at least one processor, the member's treatment path location with regard to the set of treatment paths based on analysis of the clinical data associated with the member;

determine, via at least one processor, a high value treatment path that the member can take from the member's treatment path location;

identify, via at least one processor, a next treatment on the high value treatment path;

determine, via at least one processor, a set of providers available for the next treatment;

calculate, via at least one processor, for each provider in the set of providers, (a) an expected longitudinal treatment value and (b) a copay for the next treatment;

determine, via at least one processor, a best provider from the set of providers, wherein the best provider is associated with the lowest expected longitudinal treatment value; and provide, via a least one processor, coverage information for the member, wherein the coverage information includes coverage information for the next treatment for the best provider.

532. The system of embodiment 531, wherein the means to determine the condition associated with the coverage search request further comprise means to:

retrieve, via at least one processor, an atomized coverage graph data structure associated with the plan; and search, via at least one processor, through clinical condition objects in the atomized coverage graph data structure to determine a clinical condition object corresponding to the coverage search query.

533. The system of embodiment 531, wherein the means to determine the condition associated with the coverage search request further comprise means to:

retrieve, via at least one processor, an atomized coverage graph data structure associated with the plan;

search, via at least one processor, through treatment objects in the atomized coverage graph data structure to determine a treatment object corresponding to the coverage search query; and determine, via at least one processor, a clinical condition object linked to the treatment object.

534. The system of embodiment 531, wherein the condition associated with the coverage search request is determined also based on clinical data associated with the member.

535. The system of embodiment 532, wherein the means to determine the set of treatment paths associated with the condition further comprise means to determine a treatment paths object in the atomized coverage graph data structure associated with the clinical condition object.

536. The system of embodiment 533, wherein the means to determine the set of providers available for the next treatment further comprise means to:

determine, via at least one processor, provider objects in the atomized coverage graph data structure linked to the treatment object; and filter, via at least one processor, the determined provider objects to discard provider objects that are not in the region associated with the member.

537. The system of embodiment 536, wherein the means to calculate, for each provider in the set of providers, an expected longitudinal treatment value further comprise means to:

determine, via at least one processor, a provider object in the set of providers available for the next treatment corresponding to the respective provider;

calculate, via at least one processor, a propensity ranking based on practice patterns data associated with the provider object;

determine, via at least one processor, a propensity weight based on the member's treatment path location;

calculate, via at least one processor, an expected episodic cost for the next treatment based on treatment cost data associated with the provider object;

determine, via at least one processor, an episodic cost weight based on the member's treatment path location; and calculate, via at least one processor, an expected longitudinal treatment value for the respective provider as a weighted average of the respective provider's propensity ranking and the expected episodic cost for the next treatment weighted by their respective weights.

538. The system of embodiment 537, wherein the means to calculate, for each provider in the set of providers, a copay for the next treatment further comprise means to:

determine, via at least one processor, a base copay for the next treatment based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the next treatment for the respective provider as the base copay for the respective provider adjusted by the price factor for the respective provider.

539. The system of embodiment 531, wherein a copay for the next treatment is further adjusted based on a treatment path move sequence associated with the member.

540. The system of embodiment 531, wherein a copay for the next treatment is further adjusted based on a determination that the member state associated with the member indicates that the member has been diagnosed with the condition.

541. The system of embodiment 531, further, comprising: the search processing component means, to:

determine, via at least one processor, that the best provider does not match a member requested provider in the coverage search query; and wherein the coverage information provided for the member also includes coverage information for the next treatment for the member requested provider.

542. The system of embodiment 531, further, comprising: the search processing component means, to:

determine, via at least one processor, that the next treatment on the high value treatment path does not match a member specified treatment in the coverage search query;

determine, via at least one processor, a set of providers available for the member specified treatment;

calculate, via at least one processor, for each provider in the set of providers available for the member specified treatment, (a) an expected longitudinal treatment value assuming that the member utilizes the member specified treatment next and (b) a copay for the member specified treatment;

determine, via at least one processor, a best provider from the second set of providers, wherein the best provider from the second set of providers is associated with the lowest expected longitudinal treatment value assuming that the member utilizes the member specified treatment next; and wherein the coverage information provided for the member also includes coverage information for the member specified treatment for the best provider from the second set of providers.

543. The system of embodiment 531, wherein the means to obtain the coverage search request further comprise means to:

generate, via a coverage search user interface, a GUI widget configured to obtain a member specified treatment; and generate, via the coverage search user interface, a GUI widget configured to obtain a member requested provider.

544. The system of embodiment 543, wherein the means to provide the coverage information for the member further comprise means to:

generate, via the coverage search user interface, a GUI widget configured to provide coverage information for an atomized add-in that that provides coverage for the member specified treatment;

generate, via the coverage search user interface, a GUI widget configured to provide coverage information for an atomized add-in that that provides coverage for the next treatment;

obtain, via the coverage search user interface, an atomized add-in selection from the member; and generate, via the coverage search user interface, a GUI widget configured to provide coverage information regarding providers available for the member selected atomized add-in, wherein the best provider is highlighted for the member.

545. The system of embodiment 544, wherein the member requested provider is highlighted for the plan member using at least one of: positioning, header, color, border, font.

546. A processor-implemented coverage search processing method, comprising:

executing processor-implemented search processing component instructions to:

obtain, via at least one processor, a coverage search request from a member enrolled into a plan, wherein the coverage search request includes a coverage search query specified by the member;

determine, via at least one processor, a condition associated with the coverage search request based on the coverage search query;

determine, via at least one processor, a set of treatment paths associated with the condition, wherein each treatment path is associated with a clinical value, and wherein each treatment path comprises a set of treatment pathway nodes;

obtain, via at least one processor, a member state associated with the member, wherein the member state includes clinical data;

determine, via at least one processor, the member's treatment path location with regard to the set of treatment paths based on analysis of the clinical data associated with the member;

determine, via at least one processor, a high value treatment path that the member can take from the member's treatment path location;

identify, via at least one processor, a next treatment on the high value treatment path;

determine, via at least one processor, a set of providers available for the next treatment;

calculate, via at least one processor, for each provider in the set of providers, (a) an expected longitudinal treatment value and (b) a copay for the next treatment;

determine, via at least one processor, a best provider from the set of providers, wherein the best provider is associated with the lowest expected longitudinal treatment value; and provide, via a least one processor, coverage information for the member, wherein the coverage information includes coverage information for the next treatment for the best provider.

547. The method of embodiment 546, wherein the instructions to determine the condition associated with the coverage search request further comprise instructions to:

retrieve, via at least one processor, an atomized coverage graph data structure associated with the plan; and search, via at least one processor, through clinical condition objects in the atomized coverage graph data structure to determine a clinical condition object corresponding to the coverage search query.

548. The method of embodiment 546, wherein the instructions to determine the condition associated with the coverage search request further comprise instructions to:

retrieve, via at least one processor, an atomized coverage graph data structure associated with the plan;

search, via at least one processor, through treatment objects in the atomized coverage graph data structure to determine a treatment object corresponding to the coverage search query; and determine, via at least one processor, a clinical condition object linked to the treatment object.

549. The method of embodiment 546, wherein the condition associated with the coverage search request is determined also based on clinical data associated with the member.

550. The method of embodiment 547, wherein the instructions to determine the set of treatment paths associated with the condition further comprise instructions to determine a treatment paths object in the atomized coverage graph data structure associated with the clinical condition object.

551. The method of embodiment 548, wherein the instructions to determine the set of providers available for the next treatment further comprise instructions to:

determine, via at least one processor, provider objects in the atomized coverage graph data structure linked to the treatment object; and filter, via at least one processor, the determined provider objects to discard provider objects that are not in the region associated with the member.

552. The method of embodiment 551, wherein the instructions to calculate, for each provider in the set of providers, an expected longitudinal treatment value further comprise instructions to:

determine, via at least one processor, a provider object in the set of providers available for the next treatment corresponding to the respective provider;

calculate, via at least one processor, a propensity ranking based on practice patterns data associated with the provider object;

determine, via at least one processor, a propensity weight based on the member's treatment path location;

calculate, via at least one processor, an expected episodic cost for the next treatment based on treatment cost data associated with the provider object;

determine, via at least one processor, an episodic cost weight based on the member's treatment path location; and calculate, via at least one processor, an expected longitudinal treatment value for the respective provider as a weighted average of the respective provider's propensity ranking and the expected episodic cost for the next treatment weighted by their respective weights.

553. The method of embodiment 552, wherein the instructions to calculate, for each provider in the set of providers, a copay for the next treatment further comprise instructions to:

determine, via at least one processor, a base copay for the next treatment based on an average longitudinal treatment value for providers in the set of providers;

calculate, via at least one processor, a price factor for the respective provider, wherein the price factor indicates relative expense of the expected longitudinal treatment value for the respective provider as compared with the average longitudinal treatment value for providers in the set of providers; and calculate, via at least one processor, a copay for the next treatment for the respective provider as the base copay for the respective provider adjusted by the price factor for the respective provider.

554. The method of embodiment 546, wherein a copay for the next treatment is further adjusted based on a treatment path move sequence associated with the member.

555. The method of embodiment 546, wherein a copay for the next treatment is further adjusted based on a determination that the member state associated with the member indicates that the member has been diagnosed with the condition.

556. The method of embodiment 546, further, comprising:

executing processor-implemented search processing component instructions to:

determine, via at least one processor, that the best provider does not match a member requested provider in the coverage search query; and wherein the coverage information provided for the member also includes coverage information for the next treatment for the member requested provider.

557. The method of embodiment 546, further, comprising: executing processor-implemented search processing component instructions to:

determine, via at least one processor, that the next treatment on the high value treatment path does not match a member specified treatment in the coverage search query;

determine, via at least one processor, a set of providers available for the member specified treatment;

calculate, via at least one processor, for each provider in the set of providers available for the member specified treatment, (a) an expected longitudinal treatment value assuming that the member utilizes the member specified treatment next and (b) a copay for the member specified treatment;

determine, via at least one processor, a best provider from the second set of providers, wherein the best provider from the second set of providers is associated with the lowest expected longitudinal treatment value assuming that the member utilizes the member specified treatment next; and wherein the coverage information provided for the member also includes coverage information for the member specified treatment for the best provider from the second set of providers.

558. The method of embodiment 546, wherein the instructions to obtain the coverage search request further comprise instructions to:

generate, via a coverage search user interface, a GUI widget configured to obtain a member specified treatment; and generate, via the coverage search user interface, a GUI widget configured to obtain a member requested provider.

559. The method of embodiment 558, wherein the instructions to provide the coverage information for the member further comprise instructions to:

generate, via the coverage search user interface, a GUI widget configured to provide coverage information for an atomized add-in that that provides coverage for the member specified treatment;

generate, via the coverage search user interface, a GUI widget configured to provide coverage information for an atomized add-in that that provides coverage for the next treatment;

obtain, via the coverage search user interface, an atomized add-in selection from the member; and generate, via the coverage search user interface, a GUI widget configured to provide coverage information regarding providers available for the member selected atomized add-in, wherein the best provider is highlighted for the member.

560. The method of embodiment 559, wherein the member requested provider is highlighted for the plan member using at least one of: positioning, header, color, border, font.

601. An episode datastructure generating apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, an episodes build request datastructure, the episodes build request datastructure structured to include a data field for identifying an encounter type;

compare, via the at least one processor, the encounter type with a value specified in a corresponding data field of a set of available encounter datastructures to select an anchor encounter datastructure, in which the value specified in the corresponding data field of the anchor encounter datastructure matches the encounter type;

determine, via the at least one processor, analysis window rules associated with the encounter type, the analysis window rules specifying at least one of: a pre-window time period, a post-window time period, a time period length;

determine, via the at least one processor, an analysis window for the anchor encounter datastructure using the analysis window rules and a service date value specified in a corresponding data field of the anchor encounter datastructure;

determine, via the at least one processor, an enrollee identifier value specified in a corresponding data field of the anchor encounter datastructure;

determine, via the at least one processor, a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determine, via the at least one processor, a props ratio relevance function associated with the encounter type, the props ratio relevance function structured to classify claim codes as either relevant or irrelevant to the encounter type;

determine, via the at least one processor, an encounter relevance classification for each other encounter datastructure in the set of other encounter datastructures using the props ratio relevance function;

determine, via the at least one processor, a set of accessory encounter datastructures for the anchor encounter datastructure, the set of accessory encounter datastructures corresponding to other encounter datastructures for the anchor encounter datastructure classified as relevant based on the encounter relevance classification; and generate, via the at least one processor, an episode datastructure structured to include a set of data fields for identifying: the anchor encounter datastructure, the set of accessory encounter datastructures, and the encounter type.

602. The apparatus of embodiment 601, in which the data field for identifying the encounter type is structured to identify a coverage family.

603. The apparatus of embodiment 601, in which the data field for identifying the encounter type is structured to identify an encounter type.

604. The apparatus of embodiment 601, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

605. The apparatus of embodiment 601, in which the instructions to determine the analysis window for the anchor encounter datastructure are structured as:

add the pre-window time period associated with the encounter type to the service date value associated with the anchor encounter datastructure.

606. The apparatus of embodiment 601, in which the instructions to determine the analysis window for the anchor encounter datastructure are structured as:

add the post-window time period associated with the encounter type to the service date value associated with the anchor encounter datastructure.

607. The apparatus of embodiment 601, in which the instructions to determine the analysis window for the anchor encounter datastructure are structured as:

determine a first analysis window based on an event corresponding to the service date value associated with the anchor encounter datastructure;

determine a second analysis window based on a repeat event corresponding to a later service date value associated with the anchor encounter datastructure; and combine the first analysis window and the second analysis window into the analysis window for the anchor encounter datastructure, in which the first analysis window and the second analysis window are overlapping analysis windows.

608. The apparatus of embodiment 601, in which the props ratio relevance function associated with the encounter type is structured as a best fit cut line, in which claim codes above the best fit cut line are classified as relevant and claim codes below the best fit cut line are classified as irrelevant.

609. The apparatus of embodiment 601, in which the instructions to determine an encounter relevance classification for each other encounter datastructure are structured as:

determine a claim code associated with a selected other encounter datastructure;

determine a props ratio associated with the determined claim code;

determine a claim code relevance classification for the determined claim code by evaluating the determined props ratio using the props ratio relevance function, in which the determined claim code is classified as either relevant or irrelevant to the encounter type; and set the encounter relevance classification for the selected other encounter datastructure to the claim code relevance classification for the determined claim code.

610. The apparatus of embodiment 601, in which the instructions to determine an encounter relevance classification for each other encounter datastructure are structured as:

determine claim codes associated with a selected other encounter datastructure;

determine a props ratio associated with each of the determined claim codes;

classify each of the determined claim codes as either relevant or irrelevant to the encounter type by evaluating the determined props ratio for a respective determined claim code using the props ratio relevance function; and determine the encounter relevance classification for the selected other encounter datastructure based on the proportion of the determined claim codes classified as relevant.

611. The apparatus of embodiment 601, in which the instructions to determine an encounter relevance classification for each other encounter datastructure are structured as:

determine claim codes associated with a selected other encounter datastructure;

determine a props ratio associated with each of the determined claim codes;

determine an average of the determined props ratios; and determine the encounter relevance classification for the selected other encounter datastructure by evaluating the determined average of the determined props ratios using the props ratio relevance function.

612. The apparatus of embodiment 601, in which the component collection storage is further structured with processor-executable instructions, comprising:

determine the value of an encounter attribute of the anchor encounter datastructure, in which the encounter attribute is one of: a provider location, a practitioner, a place of service; and set the value of a corresponding episode attribute of the episode datastructure to the determined value of the encounter attribute.

613. The apparatus of embodiment 601, in which the component collection storage is further structured with processor-executable instructions, comprising:

calculate an episode cost associated with the episode datastructure; and set the value of a corresponding data field of the episode datastructure to the calculated episode cost.

614. The apparatus of embodiment 613, in which the instructions to calculate the episode cost are structured as:

determine an encounter cost specified in a corresponding data field of the anchor encounter datastructure;

determine an encounter cost specified in a corresponding data field of each accessory encounter datastructure in the set of accessory encounter datastructures; and calculate the episode cost as the sum of the determined encounter costs.

615. The apparatus of embodiment 613, in which the instructions to calculate the episode cost are structured as:

determine an episode archetype datastructure associated with the encounter type, in which the episode archetype datastructure is associated with a plurality of encounter types;

retrieve episode cost calculation rules from a corresponding data field of the episode archetype datastructure; and calculate the episode cost in accordance with the retrieved episode cost calculation rules.

616. An episode datastructure generating processor-readable, non-transient medium, the medium storing a component collection, the component collection storage structured with processor-executable instructions comprising:

obtain, via the at least one processor, an episodes build request datastructure, the episodes build request datastructure structured to include a data field for identifying an encounter type;

compare, via the at least one processor, the encounter type with a value specified in a corresponding data field of a set of available encounter datastructures to select an anchor encounter datastructure, in which the value specified in the corresponding data field of the anchor encounter datastructure matches the encounter type;

determine, via the at least one processor, analysis window rules associated with the encounter type, the analysis window rules specifying at least one of: a pre-window time period, a post-window time period, a time period length;

determine, via the at least one processor, an analysis window for the anchor encounter datastructure using the analysis window rules and a service date value specified in a corresponding data field of the anchor encounter datastructure;

determine, via the at least one processor, an enrollee identifier value specified in a corresponding data field of the anchor encounter datastructure;

determine, via the at least one processor, a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determine, via the at least one processor, a props ratio relevance function associated with the encounter type, the props ratio relevance function structured to classify claim codes as either relevant or irrelevant to the encounter type;

determine, via the at least one processor, an encounter relevance classification for each other encounter datastructure in the set of other encounter datastructures using the props ratio relevance function;

determine, via the at least one processor, a set of accessory encounter datastructures for the anchor encounter datastructure, the set of accessory encounter datastructures corresponding to other encounter datastructures for the anchor encounter datastructure classified as relevant based on the encounter relevance classification; and generate, via the at least one processor, an episode datastructure structured to include a set of data fields for identifying: the anchor encounter datastructure, the set of accessory encounter datastructures, and the encounter type.

617. The medium of embodiment 616, in which the data field for identifying the encounter type is structured to identify a coverage family.

618. The medium of embodiment 616, in which the data field for identifying the encounter type is structured to identify an encounter type.

619. The medium of embodiment 616, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

620. The medium of embodiment 616, in which the instructions to determine the analysis window for the anchor encounter datastructure are structured as:

add the pre-window time period associated with the encounter type to the service date value associated with the anchor encounter datastructure.

621. The medium of embodiment 616, in which the instructions to determine the analysis window for the anchor encounter datastructure are structured as:

add the post-window time period associated with the encounter type to the service date value associated with the anchor encounter datastructure.

622. The medium of embodiment 616, in which the instructions to determine the analysis window for the anchor encounter datastructure are structured as:

determine a first analysis window based on an event corresponding to the service date value associated with the anchor encounter datastructure;

determine a second analysis window based on a repeat event corresponding to a later service date value associated with the anchor encounter datastructure; and combine the first analysis window and the second analysis window into the analysis window for the anchor encounter datastructure, in which the first analysis window and the second analysis window are overlapping analysis windows.

623. The medium of embodiment 616, in which the props ratio relevance function associated with the encounter type is structured as a best fit cut line, in which claim codes above the best fit cut line are classified as relevant and claim codes below the best fit cut line are classified as irrelevant.

624. The medium of embodiment 616, in which the instructions to determine an encounter relevance classification for each other encounter datastructure are structured as:

determine a claim code associated with a selected other encounter datastructure;

determine a props ratio associated with the determined claim code;

determine a claim code relevance classification for the determined claim code by evaluating the determined props ratio using the props ratio relevance function, in which the determined claim code is classified as either relevant or irrelevant to the encounter type; and set the encounter relevance classification for the selected other encounter datastructure to the claim code relevance classification for the determined claim code.

625. The medium of embodiment 616, in which the instructions to determine an encounter relevance classification for each other encounter datastructure are structured as:

determine claim codes associated with a selected other encounter datastructure;

determine a props ratio associated with each of the determined claim codes;

classify each of the determined claim codes as either relevant or irrelevant to the encounter type by evaluating the determined props ratio for a respective determined claim code using the props ratio relevance function; and determine the encounter relevance classification for the selected other encounter datastructure based on the proportion of the determined claim codes classified as relevant.

626. The medium of embodiment 616, in which the instructions to determine an encounter relevance classification for each other encounter datastructure are structured as:

determine claim codes associated with a selected other encounter datastructure;

determine a props ratio associated with each of the determined claim codes;

determine an average of the determined props ratios; and determine the encounter relevance classification for the selected other encounter datastructure by evaluating the determined average of the determined props ratios using the props ratio relevance function.

627. The medium of embodiment 616, in which the component collection storage is further structured with processor-executable instructions, comprising:

determine the value of an encounter attribute of the anchor encounter datastructure, in which the encounter attribute is one of: a provider location, a practitioner, a place of service; and set the value of a corresponding episode attribute of the episode datastructure to the determined value of the encounter attribute.

628. The medium of embodiment 616, in which the component collection storage is further structured with processor-executable instructions, comprising:

calculate an episode cost associated with the episode datastructure; and set the value of a corresponding data field of the episode datastructure to the calculated episode cost.

629. The medium of embodiment 628, in which the instructions to calculate the episode cost are structured as:

determine an encounter cost specified in a corresponding data field of the anchor encounter datastructure;

determine an encounter cost specified in a corresponding data field of each accessory encounter datastructure in the set of accessory encounter datastructures; and calculate the episode cost as the sum of the determined encounter costs.

630. The medium of embodiment 628, in which the instructions to calculate the episode cost are structured as:

determine an episode archetype datastructure associated with the encounter type, in which the episode archetype datastructure is associated with a plurality of encounter types;

retrieve episode cost calculation rules from a corresponding data field of the episode archetype datastructure; and calculate the episode cost in accordance with the retrieved episode cost calculation rules.

631. An episode datastructure generating processor-implemented system, comprising:

means to store a component collection;

means to process processor-executable instructions from the component collection, the component collection storage structured with processor-executable instructions including:

obtain, via the at least one processor, an episodes build request datastructure, the episodes build request datastructure structured to include a data field for identifying an encounter type;

compare, via the at least one processor, the encounter type with a value specified in a corresponding data field of a set of available encounter datastructures to select an anchor encounter datastructure, in which the value specified in the corresponding data field of the anchor encounter datastructure matches the encounter type;

determine, via the at least one processor, analysis window rules associated with the encounter type, the analysis window rules specifying at least one of: a pre-window time period, a post-window time period, a time period length;

determine, via the at least one processor, an analysis window for the anchor encounter datastructure using the analysis window rules and a service date value specified in a corresponding data field of the anchor encounter datastructure;

determine, via the at least one processor, an enrollee identifier value specified in a corresponding data field of the anchor encounter datastructure;

determine, via the at least one processor, a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determine, via the at least one processor, a props ratio relevance function associated with the encounter type, the props ratio relevance function structured to classify claim codes as either relevant or irrelevant to the encounter type;

determine, via the at least one processor, an encounter relevance classification for each other encounter datastructure in the set of other encounter datastructures using the props ratio relevance function;

determine, via the at least one processor, a set of accessory encounter datastructures for the anchor encounter datastructure, the set of accessory encounter datastructures corresponding to other encounter datastructures for the anchor encounter datastructure classified as relevant based on the encounter relevance classification; and generate, via the at least one processor, an episode datastructure structured to include a set of data fields for identifying: the anchor encounter datastructure, the set of accessory encounter datastructures, and the encounter type.

632. The system of embodiment 631, in which the data field for identifying the encounter type is structured to identify a coverage family.

633. The system of embodiment 631, in which the data field for identifying the encounter type is structured to identify an encounter type.

634. The system of embodiment 631, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

635. The system of embodiment 631, in which the instructions to determine the analysis window for the anchor encounter datastructure are structured as:

add the pre-window time period associated with the encounter type to the service date value associated with the anchor encounter datastructure.

636. The system of embodiment 631, in which the instructions to determine the analysis window for the anchor encounter datastructure are structured as:

add the post-window time period associated with the encounter type to the service date value associated with the anchor encounter datastructure.

637. The system of embodiment 631, in which the instructions to determine the analysis window for the anchor encounter datastructure are structured as:

determine a first analysis window based on an event corresponding to the service date value associated with the anchor encounter datastructure;

determine a second analysis window based on a repeat event corresponding to a later service date value associated with the anchor encounter datastructure; and combine the first analysis window and the second analysis window into the analysis window for the anchor encounter datastructure, in which the first analysis window and the second analysis window are overlapping analysis windows.

638. The system of embodiment 631, in which the props ratio relevance function associated with the encounter type is structured as a best fit cut line, in which claim codes above the best fit cut line are classified as relevant and claim codes below the best fit cut line are classified as irrelevant.

639. The system of embodiment 631, in which the instructions to determine an encounter relevance classification for each other encounter datastructure are structured as:

determine a claim code associated with a selected other encounter datastructure;

determine a props ratio associated with the determined claim code;

determine a claim code relevance classification for the determined claim code by evaluating the determined props ratio using the props ratio relevance function, in which the determined claim code is classified as either relevant or irrelevant to the encounter type; and set the encounter relevance classification for the selected other encounter datastructure to the claim code relevance classification for the determined claim code.

640. The system of embodiment 631, in which the instructions to determine an encounter relevance classification for each other encounter datastructure are structured as:

determine claim codes associated with a selected other encounter datastructure;

determine a props ratio associated with each of the determined claim codes;

classify each of the determined claim codes as either relevant or irrelevant to the encounter type by evaluating the determined props ratio for a respective determined claim code using the props ratio relevance function; and determine the encounter relevance classification for the selected other encounter datastructure based on the proportion of the determined claim codes classified as relevant.

641. The system of embodiment 631, in which the instructions to determine an encounter relevance classification for each other encounter datastructure are structured as:

determine claim codes associated with a selected other encounter datastructure;

determine a props ratio associated with each of the determined claim codes;

determine an average of the determined props ratios; and determine the encounter relevance classification for the selected other encounter datastructure by evaluating the determined average of the determined props ratios using the props ratio relevance function.

642. The system of embodiment 631, in which the component collection storage is further structured with processor-executable instructions, comprising:

determine the value of an encounter attribute of the anchor encounter datastructure, in which the encounter attribute is one of: a provider location, a practitioner, a place of service; and set the value of a corresponding episode attribute of the episode datastructure to the determined value of the encounter attribute.

643. The system of embodiment 631, in which the component collection storage is further structured with processor-executable instructions, comprising:

calculate an episode cost associated with the episode datastructure; and set the value of a corresponding data field of the episode datastructure to the calculated episode cost.

644. The system of embodiment 643, in which the instructions to calculate the episode cost are structured as:

determine an encounter cost specified in a corresponding data field of the anchor encounter datastructure;

determine an encounter cost specified in a corresponding data field of each accessory encounter datastructure in the set of accessory encounter datastructures; and calculate the episode cost as the sum of the determined encounter costs.

645. The system of embodiment 643, in which the instructions to calculate the episode cost are structured as:

determine an episode archetype datastructure associated with the encounter type, in which the episode archetype datastructure is associated with a plurality of encounter types;

retrieve episode cost calculation rules from a corresponding data field of the episode archetype datastructure; and calculate the episode cost in accordance with the retrieved episode cost calculation rules.

646. An episode datastructure generating processor-implemented process, including processing processor-executable instructions via at least one processor from a component collection stored in at least one memory, the component collection storage structured with processor-executable instructions comprising:

obtain, via the at least one processor, an episodes build request datastructure, the episodes build request datastructure structured to include a data field for identifying an encounter type;

compare, via the at least one processor, the encounter type with a value specified in a corresponding data field of a set of available encounter datastructures to select an anchor encounter datastructure, in which the value specified in the corresponding data field of the anchor encounter datastructure matches the encounter type;

determine, via the at least one processor, analysis window rules associated with the encounter type, the analysis window rules specifying at least one of: a pre-window time period, a post-window time period, a time period length;

determine, via the at least one processor, an analysis window for the anchor encounter datastructure using the analysis window rules and a service date value specified in a corresponding data field of the anchor encounter datastructure;

determine, via the at least one processor, an enrollee identifier value specified in a corresponding data field of the anchor encounter datastructure;

determine, via the at least one processor, a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determine, via the at least one processor, a props ratio relevance function associated with the encounter type, the props ratio relevance function structured to classify claim codes as either relevant or irrelevant to the encounter type;

determine, via the at least one processor, an encounter relevance classification for each other encounter datastructure in the set of other encounter datastructures using the props ratio relevance function;

determine, via the at least one processor, a set of accessory encounter datastructures for the anchor encounter datastructure, the set of accessory encounter datastructures corresponding to other encounter datastructures for the anchor encounter datastructure classified as relevant based on the encounter relevance classification; and generate, via the at least one processor, an episode datastructure structured to include a set of data fields for identifying: the anchor encounter datastructure, the set of accessory encounter datastructures, and the encounter type.

647. The process of embodiment 646, in which the data field for identifying the encounter type is structured to identify a coverage family.

648. The process of embodiment 646, in which the data field for identifying the encounter type is structured to identify an encounter type.

649. The process of embodiment 646, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

650. The process of embodiment 646, in which the instructions to determine the analysis window for the anchor encounter datastructure are structured as:

add the pre-window time period associated with the encounter type to the service date value associated with the anchor encounter datastructure.

651. The process of embodiment 646, in which the instructions to determine the analysis window for the anchor encounter datastructure are structured as:

add the post-window time period associated with the encounter type to the service date value associated with the anchor encounter datastructure.

652. The process of embodiment 646, in which the instructions to determine the analysis window for the anchor encounter datastructure are structured as:

determine a first analysis window based on an event corresponding to the service date value associated with the anchor encounter datastructure;

determine a second analysis window based on a repeat event corresponding to a later service date value associated with the anchor encounter datastructure; and combine the first analysis window and the second analysis window into the analysis window for the anchor encounter datastructure, in which the first analysis window and the second analysis window are overlapping analysis windows.

653. The process of embodiment 646, in which the props ratio relevance function associated with the encounter type is structured as a best fit cut line, in which claim codes above the best fit cut line are classified as relevant and claim codes below the best fit cut line are classified as irrelevant.

654. The process of embodiment 646, in which the instructions to determine an encounter relevance classification for each other encounter datastructure are structured as:

determine a claim code associated with a selected other encounter datastructure;

determine a props ratio associated with the determined claim code;

determine a claim code relevance classification for the determined claim code by evaluating the determined props ratio using the props ratio relevance function, in which the determined claim code is classified as either relevant or irrelevant to the encounter type; and set the encounter relevance classification for the selected other encounter datastructure to the claim code relevance classification for the determined claim code.

655. The process of embodiment 646, in which the instructions to determine an encounter relevance classification for each other encounter datastructure are structured as:

determine claim codes associated with a selected other encounter datastructure;

determine a props ratio associated with each of the determined claim codes;

classify each of the determined claim codes as either relevant or irrelevant to the encounter type by evaluating the determined props ratio for a respective determined claim code using the props ratio relevance function; and determine the encounter relevance classification for the selected other encounter datastructure based on the proportion of the determined claim codes classified as relevant.

656. The process of embodiment 646, in which the instructions to determine an encounter relevance classification for each other encounter datastructure are structured as:

determine claim codes associated with a selected other encounter datastructure;

determine a props ratio associated with each of the determined claim codes;

determine an average of the determined props ratios; and determine the encounter relevance classification for the selected other encounter datastructure by evaluating the determined average of the determined props ratios using the props ratio relevance function.

657. The process of embodiment 646, in which the component collection storage is further structured with processor-executable instructions, comprising:

determine the value of an encounter attribute of the anchor encounter datastructure, in which the encounter attribute is one of: a provider location, a practitioner, a place of service; and set the value of a corresponding episode attribute of the episode datastructure to the determined value of the encounter attribute.

658. The process of embodiment 646, in which the component collection storage is further structured with processor-executable instructions, comprising:

calculate an episode cost associated with the episode datastructure; and set the value of a corresponding data field of the episode datastructure to the calculated episode cost.

659. The process of embodiment 658, in which the instructions to calculate the episode cost are structured as:

determine an encounter cost specified in a corresponding data field of the anchor encounter datastructure;

determine an encounter cost specified in a corresponding data field of each accessory encounter datastructure in the set of accessory encounter datastructures; and calculate the episode cost as the sum of the determined encounter costs.

660. The process of embodiment 658, in which the instructions to calculate the episode cost are structured as:

determine an episode archetype datastructure associated with the encounter type, in which the episode archetype datastructure is associated with a plurality of encounter types;

retrieve episode cost calculation rules from a corresponding data field of the episode archetype datastructure; and calculate the episode cost in accordance with the retrieved episode cost calculation rules.

701. A price datastructure generating apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a price calculation request datastructure, the price calculation request datastructure structured to include data fields for identifying a coverage family and a geographic region;

determine, via the at least one processor, an encounter type associated with the coverage family;

determine, via the at least one processor, a set of provider locations within the geographic region;

determine, via the at least one processor, a set of relevant episode datastructures for each provider location in the set of provider locations, in which an encounter type value specified in a corresponding data field of each episode datastructure in the set of relevant episode datastructures for a respective provider location corresponds to the encounter type, and in which a provider location value specified in a corresponding data field of each episode datastructure in the set of relevant episode datastructures for the respective provider location corresponds to the respective provider location;

calculate, via the at least one processor, an average episode cost for the coverage family for each provider location in the set of provider locations, in which the average episode cost for a respective provider location is calculated based on episode costs associated with the set of relevant episode datastructures for the respective provider location;

calculate, via the at least one processor, an average episode cost for the coverage family for the geographic region, in which the average episode cost for the geographic region is calculated based on the calculated average episode costs;

location in the set of provider locations, in which the price factor for a respective provider location is calculated based on the calculated average episode cost for the respective provider location and the calculated average episode cost for the geographic region; and generate, via the at least one processor, a price datastructure for the coverage family for each provider location in the set of provider locations, in which the price datastructure for a respective provider location is structured to include a set of data fields for identifying: the respective provider location, the coverage family, and the price factor for the coverage family for the respective provider location.

702. The apparatus of embodiment 701, in which the geographic region is structured as associated with a region level from a plurality of region levels, in which the region level is associated with the coverage family.

703. The apparatus of embodiment 701, in which an episode datastructure in the set of relevant episode datastructures is structured to include a set of data fields for identifying: an anchor encounter datastructure, a set of accessory encounter datastructures, and the encounter type.

704. The apparatus of embodiment 703, in which an encounter type value specified in a corresponding data field of the anchor encounter datastructure matches the encounter type.

705. The apparatus of embodiment 703, in which each accessory encounter datastructure in the set of accessory encounter datastructures is classified as relevant to the encounter type using a props ratio relevance function associated with the encounter type.

706. The apparatus of embodiment 701, in which the instructions to calculate an average episode cost for the coverage family for a provider location are structured as:

determine an episode cost value specified in a corresponding data field of each relevant episode datastructure in the set of relevant episode datastructures for the provider location;

calculate an adjusted episode cost for each relevant episode datastructure by applying an adjustment to the determined episode cost value for each relevant episode datastructure; and calculate the average episode cost for the coverage family for the provider location as an average of the adjusted episode costs.

707. The apparatus of embodiment 706, in which the adjustment is structured as one or more of: a case-mix adjustment, a winsorization adjustment, a truncation adjustment, a payer type adjustment, an inflation adjustment.

708. The apparatus of embodiment 706, in which the average episode cost for the coverage family for the geographic region is structured as a weighted average of the calculated average episode costs for each provider location in the set of provider locations, in which the calculated average episode cost for a respective provider location is weighted based on the number of relevant episode datastructures for the respective provider location.

709. The apparatus of embodiment 708, in which the instructions to calculate an average episode cost for the coverage family for a provider location are structured as:

determine a cost credibility factor for the provider location;

calculate a credibility-adjusted average episode cost for the coverage family for the provider location based on the determined cost credibility factor for the provider location, the calculated average episode cost for the provider location, and the average episode cost for the geographic region; and set the average episode cost for the coverage family for the provider location as the calculated credibility-adjusted average episode cost.

710. The apparatus of embodiment 709, in which the cost credibility factor for the provider location is determined based on the number of episode datastructures in the set of relevant episode datastructures associated with the provider location.

711. The apparatus of embodiment 701, in which the component collection storage is further structured with processor-executable instructions, comprising:

determine a dataless provider location from the set of provider locations, in which the dataless provider location has no associated relevant episode datastructures;

determine similar provider locations for the dataless provider location from the set of provider locations; and calculate an average episode cost for the coverage family for the dataless provider location by imputing the average episode cost using episode datastructures associated with the similar provider locations.

712. The apparatus of embodiment 701, in which the instructions to determine similar provider locations for the dataless provider location are structured as:

determine provider locations from the set of provider locations that have the same Taxpayer Identification Number (TIN) and zip code, TIN and region, or TIN, in order, as the dataless provider location.

713. The apparatus of embodiment 701, in which the instructions to determine similar provider locations for the dataless provider location are structured as:

determine provider locations from the set of provider locations that have the same place of service as the dataless provider location.

714. The apparatus of embodiment 701, in which the component collection storage is further structured with processor-executable instructions, comprising:

calculate a price rank for the coverage family for each provider location in the set of provider locations, in which the price rank for a respective provider location is calculated based on a comparison of the price factor for the respective provider location against price factors for other provider location in the set of provider locations; and set the value of a corresponding data field of a price datastructure for each respective provider location in the set of provider locations to the calculated price rank for the respective provider location.

715. The apparatus of embodiment 714, in which price ranks are structured to be spread from 0 to 100 using a normalization function.

716. A price datastructure generating processor-readable, non-transient medium, the medium storing a component collection, the component collection storage structured with processor-executable instructions comprising:

obtain, via the at least one processor, a price calculation request datastructure, the price calculation request datastructure structured to include data fields for identifying a coverage family and a geographic region;

determine, via the at least one processor, an encounter type associated with the coverage family;

determine, via the at least one processor, a set of provider locations within the geographic region;

determine, via the at least one processor, a set of relevant episode datastructures for each provider location in the set of provider locations, in which an encounter type value specified in a corresponding data field of each episode datastructure in the set of relevant episode datastructures for a respective provider location corresponds to the encounter type, and in which a provider location value specified in a corresponding data field of each episode datastructure in the set of relevant episode datastructures for the respective provider location corresponds to the respective provider location;

calculate, via the at least one processor, an average episode cost for the coverage family for each provider location in the set of provider locations, in which the average episode cost for a respective provider location is calculated based on episode costs associated with the set of relevant episode datastructures for the respective provider location;

calculate, via the at least one processor, an average episode cost for the coverage family for the geographic region, in which the average episode cost for the geographic region is calculated based on the calculated average episode costs;

calculate, via the at least one processor, a price factor for the coverage family for each provider location in the set of provider locations, in which the price factor for a respective provider location is calculated based on the calculated average episode cost for the respective provider location and the calculated average episode cost for the geographic region; and generate, via the at least one processor, a price datastructure for the coverage family for each provider location in the set of provider locations, in which the price datastructure for a respective provider location is structured to include a set of data fields for identifying: the respective provider location, the coverage family, and the price factor for the coverage family for the respective provider location.

717. The medium of embodiment 716, in which the geographic region is structured as associated with a region level from a plurality of region levels, in which the region level is associated with the coverage family.

718. The medium of embodiment 716, in which an episode datastructure in the set of relevant episode datastructures is structured to include a set of data fields for identifying: an anchor encounter datastructure, a set of accessory encounter datastructures, and the encounter type.

719. The medium of embodiment 718, in which an encounter type value specified in a corresponding data field of the anchor encounter datastructure matches the encounter type.

720. The medium of embodiment 718, in which each accessory encounter datastructure in the set of accessory encounter datastructures is classified as relevant to the encounter type using a props ratio relevance function associated with the encounter type.

721. The medium of embodiment 716, in which the instructions to calculate an average episode cost for the coverage family for a provider location are structured as:

determine an episode cost value specified in a corresponding data field of each relevant episode datastructure in the set of relevant episode datastructures for the provider location;

calculate an adjusted episode cost for each relevant episode datastructure by applying an adjustment to the determined episode cost value for each relevant episode datastructure; and calculate the average episode cost for the coverage family for the provider location as an average of the adjusted episode costs.

722. The medium of embodiment 721, in which the adjustment is structured as one or more of: a case-mix adjustment, a winsorization adjustment, a truncation adjustment, a payer type adjustment, an inflation adjustment.

723. The medium of embodiment 721, in which the average episode cost for the coverage family for the geographic region is structured as a weighted average of the calculated average episode costs for each provider location in the set of provider locations, in which the calculated average episode cost for a respective provider location is weighted based on the number of relevant episode datastructures for the respective provider location.

724. The medium of embodiment 723, in which the instructions to calculate an average episode cost for the coverage family for a provider location are structured as:

determine a cost credibility factor for the provider location;

calculate a credibility-adjusted average episode cost for the coverage family for the provider location based on the determined cost credibility factor for the provider location, the calculated average episode cost for the provider location, and the average episode cost for the geographic region; and set the average episode cost for the coverage family for the provider location as the calculated credibility-adjusted average episode cost.

725. The medium of embodiment 724, in which the cost credibility factor for the provider location is determined based on the number of episode datastructures in the set of relevant episode datastructures associated with the provider location.

726. The medium of embodiment 716, in which the component collection storage is further structured with processor-executable instructions, comprising:

determine a dataless provider location from the set of provider locations, in which the dataless provider location has no associated relevant episode datastructures;

determine similar provider locations for the dataless provider location from the set of provider locations; and calculate an average episode cost for the coverage family for the dataless provider location by imputing the average episode cost using episode datastructures associated with the similar provider locations.

727. The medium of embodiment 716, in which the instructions to determine similar provider locations for the dataless provider location are structured as:

determine provider locations from the set of provider locations that have the same Taxpayer Identification Number (TIN) and zip code, TIN and region, or TIN, in order, as the dataless provider location.

728. The medium of embodiment 716, in which the instructions to determine similar provider locations for the dataless provider location are structured as:

determine provider locations from the set of provider locations that have the same place of service as the dataless provider location.

729. The medium of embodiment 716, in which the component collection storage is further structured with processor-executable instructions, comprising:

calculate a price rank for the coverage family for each provider location in the set of provider locations, in which the price rank for a respective provider location is calculated based on a comparison of the price factor for the respective provider location against price factors for other provider location in the set of provider locations; and set the value of a corresponding data field of a price datastructure for each respective provider location in the set of provider locations to the calculated price rank for the respective provider location.

730. The medium of embodiment 729, in which price ranks are structured to be spread from 0 to 100 using a normalization function.

731. A price datastructure generating processor-implemented system, comprising:

means to store a component collection;

means to process processor-executable instructions from the component collection, the component collection storage structured with processor-executable instructions including:

obtain, via the at least one processor, a price calculation request datastructure, the price calculation request datastructure structured to include data fields for identifying a coverage family and a geographic region;

determine, via the at least one processor, an encounter type associated with the coverage family;

determine, via the at least one processor, a set of provider locations within the geographic region;

determine, via the at least one processor, a set of relevant episode datastructures for each provider location in the set of provider locations, in which an encounter type value specified in a corresponding data field of each episode datastructure in the set of relevant episode datastructures for a respective provider location corresponds to the encounter type, and in which a provider location value specified in a corresponding data field of each episode datastructure in the set of relevant episode datastructures for the respective provider location corresponds to the respective provider location;

calculate, via the at least one processor, an average episode cost for the coverage family for each provider location in the set of provider locations, in which the average episode cost for a respective provider location is calculated based on episode costs associated with the set of relevant episode datastructures for the respective provider location;

calculate, via the at least one processor, an average episode cost for the coverage family for the geographic region, in which the average episode cost for the geographic region is calculated based on the calculated average episode costs;

location in the set of provider locations, in which the price factor for a respective provider location is calculated based on the calculated average episode cost for the respective provider location and the calculated average episode cost for the geographic region; and generate, via the at least one processor, a price datastructure for the coverage family for each provider location in the set of provider locations, in which the price datastructure for a respective provider location is structured to include a set of data fields for identifying: the respective provider location, the coverage family, and the price factor for the coverage family for the respective provider location.

732. The system of embodiment 731, in which the geographic region is structured as associated with a region level from a plurality of region levels, in which the region level is associated with the coverage family.

733. The system of embodiment 731, in which an episode datastructure in the set of relevant episode datastructures is structured to include a set of data fields for identifying: an anchor encounter datastructure, a set of accessory encounter datastructures, and the encounter type.

734. The system of embodiment 733, in which an encounter type value specified in a corresponding data field of the anchor encounter datastructure matches the encounter type.

735. The system of embodiment 733, in which each accessory encounter datastructure in the set of accessory encounter datastructures is classified as relevant to the encounter type using a props ratio relevance function associated with the encounter type.

736. The system of embodiment 731, in which the instructions to calculate an average episode cost for the coverage family for a provider location are structured as:

determine an episode cost value specified in a corresponding data field of each relevant episode datastructure in the set of relevant episode datastructures for the provider location;

calculate an adjusted episode cost for each relevant episode datastructure by applying an adjustment to the determined episode cost value for each relevant episode datastructure; and calculate the average episode cost for the coverage family for the provider location as an average of the adjusted episode costs.

737. The system of embodiment 736, in which the adjustment is structured as one or more of: a case-mix adjustment, a winsorization adjustment, a truncation adjustment, a payer type adjustment, an inflation adjustment.

738. The system of embodiment 736, in which the average episode cost for the coverage family for the geographic region is structured as a weighted average of the calculated average episode costs for each provider location in the set of provider locations, in which the calculated average episode cost for a respective provider location is weighted based on the number of relevant episode datastructures for the respective provider location.

739. The system of embodiment 738, in which the instructions to calculate an average episode cost for the coverage family for a provider location are structured as:

determine a cost credibility factor for the provider location;

calculate a credibility-adjusted average episode cost for the coverage family for the provider location based on the determined cost credibility factor for the provider location, the calculated average episode cost for the provider location, and the average episode cost for the geographic region; and set the average episode cost for the coverage family for the provider location as the calculated credibility-adjusted average episode cost.

740. The system of embodiment 739, in which the cost credibility factor for the provider location is determined based on the number of episode datastructures in the set of relevant episode datastructures associated with the provider location.

741. The system of embodiment 731, in which the component collection storage is further structured with processor-executable instructions, comprising:

determine a dataless provider location from the set of provider locations, in which the dataless provider location has no associated relevant episode datastructures;

determine similar provider locations for the dataless provider location from the set of provider locations; and calculate an average episode cost for the coverage family for the dataless provider location by imputing the average episode cost using episode datastructures associated with the similar provider locations.

742. The system of embodiment 731, in which the instructions to determine similar provider locations for the dataless provider location are structured as:

determine provider locations from the set of provider locations that have the same Taxpayer Identification Number (TIN) and zip code, TIN and region, or TIN, in order, as the dataless provider location.

743. The system of embodiment 731, in which the instructions to determine similar provider locations for the dataless provider location are structured as:

determine provider locations from the set of provider locations that have the same place of service as the dataless provider location.

744. The system of embodiment 731, in which the component collection storage is further structured with processor-executable instructions, comprising:

calculate a price rank for the coverage family for each provider location in the set of provider locations, in which the price rank for a respective provider location is calculated based on a comparison of the price factor for the respective provider location against price factors for other provider location in the set of provider locations; and set the value of a corresponding data field of a price datastructure for each respective provider location in the set of provider locations to the calculated price rank for the respective provider location.

745. The system of embodiment 744, in which price ranks are structured to be spread from 0 to 100 using a normalization function.

746. A price datastructure generating processor-implemented process, including processing processor-executable instructions via at least one processor from a component collection stored in at least one memory, the component collection storage structured with processor-executable instructions comprising:

obtain, via the at least one processor, a price calculation request datastructure, the price calculation request datastructure structured to include data fields for identifying a coverage family and a geographic region;

determine, via the at least one processor, an encounter type associated with the coverage family;

determine, via the at least one processor, a set of provider locations within the geographic region;

determine, via the at least one processor, a set of relevant episode datastructures for each provider location in the set of provider locations, in which an encounter type value specified in a corresponding data field of each episode datastructure in the set of relevant episode datastructures for a respective provider location corresponds to the encounter type, and in which a provider location value specified in a corresponding data field of each episode datastructure in the set of relevant episode datastructures for the respective provider location corresponds to the respective provider location;

calculate, via the at least one processor, an average episode cost for the coverage family for each provider location in the set of provider locations, in which the average episode cost for a respective provider location is calculated based on episode costs associated with the set of relevant episode datastructures for the respective provider location;

calculate, via the at least one processor, an average episode cost for the coverage family for the geographic region, in which the average episode cost for the geographic region is calculated based on the calculated average episode costs;

calculate, via the at least one processor, a price factor for the coverage family for each provider location in the set of provider locations, in which the price factor for a respective provider location is calculated based on the calculated average episode cost for the respective provider location and the calculated average episode cost for the geographic region; and generate, via the at least one processor, a price datastructure for the coverage family for each provider location in the set of provider locations, in which the price datastructure for a respective provider location is structured to include a set of data fields for identifying: the respective provider location, the coverage family, and the price factor for the coverage family for the respective provider location.

747. The process of embodiment 746, in which the geographic region is structured as associated with a region level from a plurality of region levels, in which the region level is associated with the coverage family.

748. The process of embodiment 746, in which an episode datastructure in the set of relevant episode datastructures is structured to include a set of data fields for identifying: an anchor encounter datastructure, a set of accessory encounter datastructures, and the encounter type.

749. The process of embodiment 748, in which an encounter type value specified in a corresponding data field of the anchor encounter datastructure matches the encounter type.

750. The process of embodiment 748, in which each accessory encounter datastructure in the set of accessory encounter datastructures is classified as relevant to the encounter type using a props ratio relevance function associated with the encounter type.

751. The process of embodiment 746, in which the instructions to calculate an average episode cost for the coverage family for a provider location are structured as:

determine an episode cost value specified in a corresponding data field of each relevant episode datastructure in the set of relevant episode datastructures for the provider location;

calculate an adjusted episode cost for each relevant episode datastructure by applying an adjustment to the determined episode cost value for each relevant episode datastructure; and calculate the average episode cost for the coverage family for the provider location as an average of the adjusted episode costs.

752. The process of embodiment 751, in which the adjustment is structured as one or more of: a case-mix adjustment, a winsorization adjustment, a truncation adjustment, a payer type adjustment, an inflation adjustment.

753. The process of embodiment 751, in which the average episode cost for the coverage family for the geographic region is structured as a weighted average of the calculated average episode costs for each provider location in the set of provider locations, in which the calculated average episode cost for a respective provider location is weighted based on the number of relevant episode datastructures for the respective provider location.

754. The process of embodiment 753, in which the instructions to calculate an average episode cost for the coverage family for a provider location are structured as:

determine a cost credibility factor for the provider location;

calculate a credibility-adjusted average episode cost for the coverage family for the provider location based on the determined cost credibility factor for the provider location, the calculated average episode cost for the provider location, and the average episode cost for the geographic region; and set the average episode cost for the coverage family for the provider location as the calculated credibility-adjusted average episode cost.

755. The process of embodiment 754, in which the cost credibility factor for the provider location is determined based on the number of episode datastructures in the set of relevant episode datastructures associated with the provider location.

756. The process of embodiment 746, in which the component collection storage is further structured with processor-executable instructions, comprising:

determine a dataless provider location from the set of provider locations, in which the dataless provider location has no associated relevant episode datastructures;

determine similar provider locations for the dataless provider location from the set of provider locations; and calculate an average episode cost for the coverage family for the dataless provider location by imputing the average episode cost using episode datastructures associated with the similar provider locations.

757. The process of embodiment 746, in which the instructions to determine similar provider locations for the dataless provider location are structured as:

determine provider locations from the set of provider locations that have the same Taxpayer Identification Number (TIN) and zip code, TIN and region, or TIN, in order, as the dataless provider location.

758. The process of embodiment 746, in which the instructions to determine similar provider locations for the dataless provider location are structured as:

determine provider locations from the set of provider locations that have the same place of service as the dataless provider location.

759. The process of embodiment 746, in which the component collection storage is further structured with processor-executable instructions, comprising:

calculate a price rank for the coverage family for each provider location in the set of provider locations, in which the price rank for a respective provider location is calculated based on a comparison of the price factor for the respective provider location against price factors for other provider location in the set of provider locations; and set the value of a corresponding data field of a price datastructure for each respective provider location in the set of provider locations to the calculated price rank for the respective provider location.

760. The process of embodiment 759, in which price ranks are structured to be spread from 0 to 100 using a normalization function.

801. A props ratios datastructure generating apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a props ratios calculation request datastructure, the props ratios calculation request datastructure structured to include a data field for identifying an encounter type;

determine, via the at least one processor, a set of trigger codes associated with the encounter type, in which a trigger code is one of: a medical code, a diagnostic code, an expanded code;

determine, via the at least one processor, from a set of claim datastructures, a set of anchor claim datastructures corresponding to the encounter type, in which an anchor claim datastructure includes a claim code value specified in a corresponding data field that matches any trigger code from the set of trigger codes associated with the encounter type;

determine, via the at least one processor, analysis window rules associated with the encounter type, the analysis window rules specifying at least one of: a pre-window time period, a post-window time period, a time period length;

determine, via the at least one processor, for each anchor claim datastructure in the set of anchor claim datastructures, an analysis window for a respective anchor claim datastructure using the analysis window rules and a service date value specified in a corresponding data field of the respective anchor claim datastructure;

determine, via the at least one processor, for each anchor claim datastructure in the set of anchor claim datastructures, an enrollee identifier value specified in a corresponding data field of a respective anchor claim datastructure;

determine, via the at least one processor, for each anchor claim datastructure in the set of anchor claim datastructures, a set of other claim datastructures for a respective anchor claim datastructure, in which a service date value specified in a corresponding data field of each other claim datastructure for the respective anchor claim datastructure is in the analysis window for the respective anchor claim datastructure, and in which the determined enrollee identifier value for the respective anchor claim datastructure matches an enrollee identifier value specified in a corresponding data field of each other claim datastructure for the respective anchor claim datastructure;

update, via the at least one processor, for each anchor claim datastructure in the set of anchor claim datastructures, an occurrence count for the encounter type for each claim code associated with the determined other claim datastructures for a respective anchor claim datastructure;

calculate, via the at least one processor, for each claim code with a non-zero occurrence count for the encounter type, an occurrence probability pE for a respective claim code for the encounter type;

calculate, via the at least one processor, for each claim code with a non-zero occurrence count for the selected encounter type, an occurrence probability pC for a respective claim code for complement encounter types;

calculate, via the at least one processor, for each claim code with a non-zero occurrence count for the encounter type, a props ratio calculated as pE/pC; and generate, via the at least one processor, a props ratios datastructure for the encounter type, in which the props ratios datastructure is structured to include a set of data fields for identifying: the encounter type, and, for each claim code with a non-zero occurrence count for the encounter type, the calculated props ratio for a respective claim code for the encounter type.

802. The apparatus of embodiment 801, in which the data field for identifying the encounter type is structured to identify a coverage family.

803. The apparatus of embodiment 801, in which the data field for identifying the encounter type is structured to identify an encounter type.

804. The apparatus of embodiment 801, in which the component collection storage is further structured with processor-executable instructions, comprising:

determine a set of reversion codes associated with the encounter type, in which a reversion code is one of: a medical code, a diagnostic code, an expanded code; and in which an anchor claim datastructure does not match any reversion code from the set of reversion codes associated with the encounter type.

805. The apparatus of embodiment 801, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

806. The apparatus of embodiment 801, in which the instructions to determine the analysis window for a respective anchor claim datastructure are structured as:

add the pre-window time period associated with the encounter type to the service date value associated with the respective anchor claim datastructure.

807. The apparatus of embodiment 801, in which the instructions to determine the analysis window for a respective anchor claim datastructure are structured as:

add the post-window time period associated with the encounter type to the service date value associated with the respective anchor claim datastructure.

808. The apparatus of embodiment 801, in which the instructions to determine the analysis window for a respective anchor claim datastructure are structured as:

determine a first analysis window based on an event corresponding to the service date value associated with the respective anchor claim datastructure;

determine a second analysis window based on a repeat event corresponding to a later service date value; and combine the first analysis window and the second analysis window into the analysis window for the respective anchor claim datastructure, in which the first analysis window and the second analysis window are overlapping analysis windows.

809. The apparatus of embodiment 801, in which multiple occurrences of a respective claim code in the determined other claim datastructures for the respective anchor claim datastructure are treated as a single occurrence with regard to increasing the occurrence count for the encounter type for the respective claim code.

810. The apparatus of embodiment 801, in which the occurrence probability for the respective claim code for the encounter type is calculated by dividing the occurrence count for the respective claim code for the selected encounter type by the number of analysis windows for the encounter type.

811. A props ratios datastructure generating processor-readable, non-transient medium, the medium storing a component collection, the component collection storage structured with processor-executable instructions comprising:

obtain, via the at least one processor, a props ratios calculation request datastructure, the props ratios calculation request datastructure structured to include a data field for identifying an encounter type;

determine, via the at least one processor, a set of trigger codes associated with the encounter type, in which a trigger code is one of: a medical code, a diagnostic code, an expanded code;

determine, via the at least one processor, from a set of claim datastructures, a set of anchor claim datastructures corresponding to the encounter type, in which an anchor claim datastructure includes a claim code value specified in a corresponding data field that matches any trigger code from the set of trigger codes associated with the encounter type;

determine, via the at least one processor, analysis window rules associated with the encounter type, the analysis window rules specifying at least one of: a pre-window time period, a post-window time period, a time period length;

determine, via the at least one processor, for each anchor claim datastructure in the set of anchor claim datastructures, an analysis window for a respective anchor claim datastructure using the analysis window rules and a service date value specified in a corresponding data field of the respective anchor claim datastructure;

determine, via the at least one processor, for each anchor claim datastructure in the set of anchor claim datastructures, an enrollee identifier value specified in a corresponding data field of a respective anchor claim datastructure;

determine, via the at least one processor, for each anchor claim datastructure in the set of anchor claim datastructures, a set of other claim datastructures for a respective anchor claim datastructure, in which a service date value specified in a corresponding data field of each other claim datastructure for the respective anchor claim datastructure is in the analysis window for the respective anchor claim datastructure, and in which the determined enrollee identifier value for the respective anchor claim datastructure matches an enrollee identifier value specified in a corresponding data field of each other claim datastructure for the respective anchor claim datastructure;

update, via the at least one processor, for each anchor claim datastructure in the set of anchor claim datastructures, an occurrence count for the encounter type for each claim code associated with the determined other claim datastructures for a respective anchor claim datastructure;

calculate, via the at least one processor, for each claim code with a non-zero occurrence count for the encounter type, an occurrence probability pE for a respective claim code for the encounter type;

calculate, via the at least one processor, for each claim code with a non-zero occurrence count for the selected encounter type, an occurrence probability pC for a respective claim code for complement encounter types;

calculate, via the at least one processor, for each claim code with a non-zero occurrence count for the encounter type, a props ratio calculated as pE/pC; and generate, via the at least one processor, a props ratios datastructure for the encounter type, in which the props ratios datastructure is structured to include a set of data fields for identifying: the encounter type, and, for each claim code with a non-zero occurrence count for the encounter type, the calculated props ratio for a respective claim code for the encounter type.

812. The medium of embodiment 811, in which the data field for identifying the encounter type is structured to identify a coverage family.

813. The medium of embodiment 811, in which the data field for identifying the encounter type is structured to identify an encounter type.

814. The medium of embodiment 811, in which the component collection storage is further structured with processor-executable instructions, comprising:

determine a set of reversion codes associated with the encounter type, in which a reversion code is one of: a medical code, a diagnostic code, an expanded code; and in which an anchor claim datastructure does not match any reversion code from the set of reversion codes associated with the encounter type.

815. The medium of embodiment 811, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

816. The medium of embodiment 811, in which the instructions to determine the analysis window for a respective anchor claim datastructure are structured as:

add the pre-window time period associated with the encounter type to the service date value associated with the respective anchor claim datastructure.

817. The medium of embodiment 811, in which the instructions to determine the analysis window for a respective anchor claim datastructure are structured as:

add the post-window time period associated with the encounter type to the service date value associated with the respective anchor claim datastructure.

818. The medium of embodiment 811, in which the instructions to determine the analysis window for a respective anchor claim datastructure are structured as:

determine a first analysis window based on an event corresponding to the service date value associated with the respective anchor claim datastructure;

determine a second analysis window based on a repeat event corresponding to a later service date value; and combine the first analysis window and the second analysis window into the analysis window for the respective anchor claim datastructure, in which the first analysis window and the second analysis window are overlapping analysis windows.

819. The medium of embodiment 811, in which multiple occurrences of a respective claim code in the determined other claim datastructures for the respective anchor claim datastructure are treated as a single occurrence with regard to increasing the occurrence count for the encounter type for the respective claim code.

820. The medium of embodiment 811, in which the occurrence probability for the respective claim code for the encounter type is calculated by dividing the occurrence count for the respective claim code for the selected encounter type by the number of analysis windows for the encounter type.

821. A props ratios datastructure generating processor-implemented system, comprising: means to store a component collection;

means to process processor-executable instructions from the component collection, the component collection storage structured with processor-executable instructions including:

obtain, via the at least one processor, a props ratios calculation request datastructure, the props ratios calculation request datastructure structured to include a data field for identifying an encounter type;

determine, via the at least one processor, a set of trigger codes associated with the encounter type, in which a trigger code is one of: a medical code, a diagnostic code, an expanded code;

determine, via the at least one processor, from a set of claim datastructures, a set of anchor claim datastructures corresponding to the encounter type, in which an anchor claim datastructure includes a claim code value specified in a corresponding data field that matches any trigger code from the set of trigger codes associated with the encounter type;

determine, via the at least one processor, analysis window rules associated with the encounter type, the analysis window rules specifying at least one of: a pre-window time period, a post-window time period, a time period length;

determine, via the at least one processor, for each anchor claim datastructure in the set of anchor claim datastructures, an analysis window for a respective anchor claim datastructure using the analysis window rules and a service date value specified in a corresponding data field of the respective anchor claim datastructure;

determine, via the at least one processor, for each anchor claim datastructure in the set of anchor claim datastructures, an enrollee identifier value specified in a corresponding data field of a respective anchor claim datastructure;

determine, via the at least one processor, for each anchor claim datastructure in the set of anchor claim datastructures, a set of other claim datastructures for a respective anchor claim datastructure, in which a service date value specified in a corresponding data field of each other claim datastructure for the respective anchor claim datastructure is in the analysis window for the respective anchor claim datastructure, and in which the determined enrollee identifier value for the respective anchor claim datastructure matches an enrollee identifier value specified in a corresponding data field of each other claim datastructure for the respective anchor claim datastructure;

update, via the at least one processor, for each anchor claim datastructure in the set of anchor claim datastructures, an occurrence count for the encounter type for each claim code associated with the determined other claim datastructures for a respective anchor claim datastructure;

calculate, via the at least one processor, for each claim code with a non-zero occurrence count for the encounter type, an occurrence probability pE for a respective claim code for the encounter type;

calculate, via the at least one processor, for each claim code with a non-zero occurrence count for the selected encounter type, an occurrence probability pC for a respective claim code for complement encounter types;

calculate, via the at least one processor, for each claim code with a non-zero occurrence count for the encounter type, a props ratio calculated as pE/pC; and generate, via the at least one processor, a props ratios datastructure for the encounter type, in which the props ratios datastructure is structured to include a set of data fields for identifying: the encounter type, and, for each claim code with a non-zero occurrence count for the encounter type, the calculated props ratio for a respective claim code for the encounter type.

822. The system of embodiment 821, in which the data field for identifying the encounter type is structured to identify a coverage family.

823. The system of embodiment 821, in which the data field for identifying the encounter type is structured to identify an encounter type.

824. The system of embodiment 821, in which the component collection storage is further structured with processor-executable instructions, comprising:

determine a set of reversion codes associated with the encounter type, in which a reversion code is one of: a medical code, a diagnostic code, an expanded code; and in which an anchor claim datastructure does not match any reversion code from the set of reversion codes associated with the encounter type.

825. The system of embodiment 821, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

826. The system of embodiment 821, in which the instructions to determine the analysis window for a respective anchor claim datastructure are structured as:

add the pre-window time period associated with the encounter type to the service date value associated with the respective anchor claim datastructure.

827. The system of embodiment 821, in which the instructions to determine the analysis window for a respective anchor claim datastructure are structured as:

add the post-window time period associated with the encounter type to the service date value associated with the respective anchor claim datastructure.

828. The system of embodiment 821, in which the instructions to determine the analysis window for a respective anchor claim datastructure are structured as:

determine a first analysis window based on an event corresponding to the service date value associated with the respective anchor claim datastructure;

determine a second analysis window based on a repeat event corresponding to a later service date value; and combine the first analysis window and the second analysis window into the analysis window for the respective anchor claim datastructure, in which the first analysis window and the second analysis window are overlapping analysis windows.

829. The system of embodiment 821, in which multiple occurrences of a respective claim code in the determined other claim datastructures for the respective anchor claim datastructure are treated as a single occurrence with regard to increasing the occurrence count for the encounter type for the respective claim code.

830. The system of embodiment 821, in which the occurrence probability for the respective claim code for the encounter type is calculated by dividing the occurrence count for the respective claim code for the selected encounter type by the number of analysis windows for the encounter type.

831. A props ratios datastructure generating processor-implemented process, including processing processor-executable instructions via at least one processor from a component collection stored in at least one memory, the component collection storage structured with processor-executable instructions comprising:

obtain, via the at least one processor, a props ratios calculation request datastructure, the props ratios calculation request datastructure structured to include a data field for identifying an encounter type;

determine, via the at least one processor, a set of trigger codes associated with the encounter type, in which a trigger code is one of: a medical code, a diagnostic code, an expanded code;

determine, via the at least one processor, from a set of claim datastructures, a set of anchor claim datastructures corresponding to the encounter type, in which an anchor claim datastructure includes a claim code value specified in a corresponding data field that matches any trigger code from the set of trigger codes associated with the encounter type;

determine, via the at least one processor, analysis window rules associated with the encounter type, the analysis window rules specifying at least one of: a pre-window time period, a post-window time period, a time period length;

determine, via the at least one processor, for each anchor claim datastructure in the set of anchor claim datastructures, an analysis window for a respective anchor claim datastructure using the analysis window rules and a service date value specified in a corresponding data field of the respective anchor claim datastructure;

determine, via the at least one processor, for each anchor claim datastructure in the set of anchor claim datastructures, an enrollee identifier value specified in a corresponding data field of a respective anchor claim datastructure;

determine, via the at least one processor, for each anchor claim datastructure in the set of anchor claim datastructures, a set of other claim datastructures for a respective anchor claim datastructure, in which a service date value specified in a corresponding data field of each other claim datastructure for the respective anchor claim datastructure is in the analysis window for the respective anchor claim datastructure, and in which the determined enrollee identifier value for the respective anchor claim datastructure matches an enrollee identifier value specified in a corresponding data field of each other claim datastructure for the respective anchor claim datastructure;

update, via the at least one processor, for each anchor claim datastructure in the set of anchor claim datastructures, an occurrence count for the encounter type for each claim code associated with the determined other claim datastructures for a respective anchor claim datastructure;

calculate, via the at least one processor, for each claim code with a non-zero occurrence count for the encounter type, an occurrence probability pE for a respective claim code for the encounter type;

calculate, via the at least one processor, for each claim code with a non-zero occurrence count for the selected encounter type, an occurrence probability pC for a respective claim code for complement encounter types;

calculate, via the at least one processor, for each claim code with a non-zero occurrence count for the encounter type, a props ratio calculated as pE/pC; and generate, via the at least one processor, a props ratios datastructure for the encounter type, in which the props ratios datastructure is structured to include a set of data fields for identifying: the encounter type, and, for each claim code with a non-zero occurrence count for the encounter type, the calculated props ratio for a respective claim code for the encounter type.

832. The process of embodiment 831, in which the data field for identifying the encounter type is structured to identify a coverage family.

833. The process of embodiment 831, in which the data field for identifying the encounter type is structured to identify an encounter type.

834. The process of embodiment 831, in which the component collection storage is further structured with processor-executable instructions, comprising:

determine a set of reversion codes associated with the encounter type, in which a reversion code is one of: a medical code, a diagnostic code, an expanded code; and in which an anchor claim datastructure does not match any reversion code from the set of reversion codes associated with the encounter type.

835. The process of embodiment 831, in which the instructions to determine the analysis window rules are structured as:

determine an episode archetype datastructure associated with the encounter type, in which the episode archetype datastructure is associated with a plurality of encounter types; and retrieve the analysis window rules from a corresponding data field of the episode archetype datastructure.

836. The process of embodiment 831, in which the instructions to determine the analysis window for a respective anchor claim datastructure are structured as:

add the pre-window time period associated with the encounter type to the service date value associated with the respective anchor claim datastructure.

837. The process of embodiment 831, in which the instructions to determine the analysis window for a respective anchor claim datastructure are structured as:

add the post-window time period associated with the encounter type to the service date value associated with the respective anchor claim datastructure.

838. The process of embodiment 831, in which the instructions to determine the analysis window for a respective anchor claim datastructure are structured as:

determine a first analysis window based on an event corresponding to the service date value associated with the respective anchor claim datastructure;

determine a second analysis window based on a repeat event corresponding to a later service date value; and combine the first analysis window and the second analysis window into the analysis window for the respective anchor claim datastructure, in which the first analysis window and the second analysis window are overlapping analysis windows.

839. The process of embodiment 831, in which multiple occurrences of a respective claim code in the determined other claim datastructures for the respective anchor claim datastructure are treated as a single occurrence with regard to increasing the occurrence count for the encounter type for the respective claim code.

840. The process of embodiment 831, in which the occurrence probability for the respective claim code for the encounter type is calculated by dividing the occurrence count for the respective claim code for the selected encounter type by the number of analysis windows for the encounter type.

901. A utility range datastructure generating apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a utility range datastructure generation request datastructure, the utility range datastructure generation request datastructure structured to include data fields for identifying a coverage family and a group;

determine, via the at least one processor, a health impact context datastructure associated with the group, the health impact context datastructure comprising a condition identifier of an associated condition and member state values associated with the group;

determine, via the at least one processor, a set of available treatment paths utilized to treat the associated condition and a cost associated with each available treatment path;

determine, via the at least one processor, a health impact value for the coverage family;

calculate, via the at least one processor, a value component for the coverage family for the group based on the cost associated with the available treatment path corresponding to the coverage family and the health impact value associated with the coverage family;

calculate, via the at least one processor, a waste component for the coverage family for the group based on the amount by which the cost associated with the available treatment path corresponding to the coverage family exceeds the cost of following an optimal available treatment path;

calculate, via the at least one processor, a utility range for the coverage family for the group as a combination of the value component and of the waste component, in which the utility range includes a minimum utility and a maximum utility for the coverage family for the group; and add, via the at least one processor, the utility range for the coverage family for the group to a utility range lookup datastructure.

902. The apparatus of embodiment 901, in which the member state values are structured to include previously tried treatments for the medical condition.

903. The apparatus of embodiment 901, in which the set of available treatment paths is structured to include treatment paths used with high frequency.

904. The apparatus of embodiment 901, in which the instructions to determine the health impact value for the coverage family are structured as:

retrieve, via the at least one processor, the health impact value from a database of estimated health impacts based on the identifier of the coverage family and member state values specified in the health impact context datastructure.

905. The apparatus of embodiment 904, in which the health impact value is specified in QALYs.

906. The apparatus of embodiment 901, in which the instructions to determine the health impact value for the coverage family are structured as:

retrieve, via the at least one processor, a health impact function from a database of estimated health impacts based on the identifier of the coverage family; and calculate, via the at least one processor, the health impact value for the coverage family by evaluating the retrieved health impact function using member state values specified in the health impact context datastructure.

907. The apparatus of embodiment 901, in which the value component is calculated independently of other available treatment paths in the set of available treatment paths for the associated condition.

908. The apparatus of embodiment 901, in which the optimal available treatment path provides the same or greater average health benefit with respect to the associated condition than the available treatment path corresponding to the coverage family.

909. The apparatus of embodiment 901, in which the utility range lookup datastructure is structured as a lookup table.

910. The apparatus of embodiment 901, in which the group comprises an entire population.

911. The apparatus of embodiment 910, in which the instructions to add the utility range for the coverage family for the group to the utility range lookup datastructure are structured as:

insert, via the at least one processor, a record that maps an identifier of the coverage family to the utility range for the coverage family into the utility range lookup datastructure.

912. The apparatus of embodiment 901, in which the group comprises one of a plurality of categorical groups.

913. The apparatus of embodiment 912, in which the instructions to add the utility range for the coverage family for the group to the utility range lookup datastructure are structured as:

insert, via the at least one processor, a utility range node with the calculated utility range for the group into a utility range tree datastructure for the coverage family; and insert, via the at least one processor, a record that maps an identifier of the coverage family to the utility range tree datastructure for the coverage family into the utility range lookup datastructure.

914. The apparatus of embodiment 913, in which the utility range tree datastructure is structured to include a set of decision nodes that help locate a leaf node associated with a group, and a set of leaf nodes, each leaf node structured to store a utility range associated with a group.

915. The apparatus of embodiment 901, in which the group comprises a single individual.

916. The apparatus of embodiment 901, in which the utility may include at least one of: an asset, a price, a value.

917. A utility range datastructure generating processor-readable, non-transient medium, the medium storing a component collection, the component collection storage structured with processor-executable instructions comprising:

obtain, via the at least one processor, a utility range datastructure generation request datastructure, the utility range datastructure generation request datastructure structured to include data fields for identifying a coverage family and a group;

determine, via the at least one processor, a health impact context datastructure associated with the group, the health impact context datastructure comprising a condition identifier of an associated condition and member state values associated with the group;

determine, via the at least one processor, a set of available treatment paths utilized to treat the associated condition and a cost associated with each available treatment path;

determine, via the at least one processor, a health impact value for the coverage family;

calculate, via the at least one processor, a value component for the coverage family for the group based on the cost associated with the available treatment path corresponding to the coverage family and the health impact value associated with the coverage family;

calculate, via the at least one processor, a waste component for the coverage family for the group based on the amount by which the cost associated with the available treatment path corresponding to the coverage family exceeds the cost of following an optimal available treatment path;

calculate, via the at least one processor, a utility range for the coverage family for the group as a combination of the value component and of the waste component, in which the utility range includes a minimum utility and a maximum utility for the coverage family for the group; and add, via the at least one processor, the utility range for the coverage family for the group to a utility range lookup datastructure.

918. The medium of embodiment 917, in which the member state values are structured to include previously tried treatments for the medical condition.

919. The medium of embodiment 917, in which the set of available treatment paths is structured to include treatment paths used with high frequency.

920. The medium of embodiment 917, in which the instructions to determine the health impact value for the coverage family are structured as:

retrieve, via the at least one processor, the health impact value from a database of estimated health impacts based on the identifier of the coverage family and member state values specified in the health impact context datastructure.

921. The medium of embodiment 920, in which the health impact value is specified in QALYs.

922. The medium of embodiment 917, in which the instructions to determine the health impact value for the coverage family are structured as:

retrieve, via the at least one processor, a health impact function from a database of estimated health impacts based on the identifier of the coverage family; and calculate, via the at least one processor, the health impact value for the coverage family by evaluating the retrieved health impact function using member state values specified in the health impact context datastructure.

923. The medium of embodiment 917, in which the value component is calculated independently of other available treatment paths in the set of available treatment paths for the associated condition.

924. The medium of embodiment 917, in which the optimal available treatment path provides the same or greater average health benefit with respect to the associated condition than the available treatment path corresponding to the coverage family.

925. The medium of embodiment 917, in which the utility range lookup datastructure is structured as a lookup table.

926. The medium of embodiment 917, in which the group comprises an entire population.

927. The medium of embodiment 926, in which the instructions to add the utility range for the coverage family for the group to the utility range lookup datastructure are structured as:

insert, via the at least one processor, a record that maps an identifier of the coverage family to the utility range for the coverage family into the utility range lookup datastructure.

928. The medium of embodiment 917, in which the group comprises one of a plurality of categorical groups.

929. The medium of embodiment 928, in which the instructions to add the utility range for the coverage family for the group to the utility range lookup datastructure are structured as:

insert, via the at least one processor, a utility range node with the calculated utility range for the group into a utility range tree datastructure for the coverage family; and insert, via the at least one processor, a record that maps an identifier of the coverage family to the utility range tree datastructure for the coverage family into the utility range lookup datastructure.

930. The medium of embodiment 929, in which the utility range tree datastructure is structured to include a set of decision nodes that help locate a leaf node associated with a group, and a set of leaf nodes, each leaf node structured to store a utility range associated with a group.

931. The medium of embodiment 917, in which the group comprises a single individual.

932. The medium of embodiment 917, in which the utility may include at least one of: an asset, a price, a value.

933. A utility range datastructure generating processor-implemented system, comprising:

means to store a component collection;

means to process processor-executable instructions from the component collection, the component collection storage structured with processor-executable instructions including:

obtain, via the at least one processor, a utility range datastructure generation request datastructure, the utility range datastructure generation request datastructure structured to include data fields for identifying a coverage family and a group;

determine, via the at least one processor, a health impact context datastructure associated with the group, the health impact context datastructure comprising a condition identifier of an associated condition and member state values associated with the group;

determine, via the at least one processor, a set of available treatment paths utilized to treat the associated condition and a cost associated with each available treatment path;

determine, via the at least one processor, a health impact value for the coverage family;

calculate, via the at least one processor, a value component for the coverage family for the group based on the cost associated with the available treatment path corresponding to the coverage family and the health impact value associated with the coverage family;

calculate, via the at least one processor, a waste component for the coverage family for the group based on the amount by which the cost associated with the available treatment path corresponding to the coverage family exceeds the cost of following an optimal available treatment path;

calculate, via the at least one processor, a utility range for the coverage family for the group as a combination of the value component and of the waste component, in which the utility range includes a minimum utility and a maximum utility for the coverage family for the group; and add, via the at least one processor, the utility range for the coverage family for the group to a utility range lookup datastructure.

934. The system of embodiment 933, in which the member state values are structured to include previously tried treatments for the medical condition.

935. The system of embodiment 933, in which the set of available treatment paths is structured to include treatment paths used with high frequency.

936. The system of embodiment 933, in which the instructions to determine the health impact value for the coverage family are structured as:

retrieve, via the at least one processor, the health impact value from a database of estimated health impacts based on the identifier of the coverage family and member state values specified in the health impact context datastructure.

937. The system of embodiment 936, in which the health impact value is specified in QALYs.

938. The system of embodiment 933, in which the instructions to determine the health impact value for the coverage family are structured as:

retrieve, via the at least one processor, a health impact function from a database of estimated health impacts based on the identifier of the coverage family; and calculate, via the at least one processor, the health impact value for the coverage family by evaluating the retrieved health impact function using member state values specified in the health impact context datastructure.

939. The system of embodiment 933, in which the value component is calculated independently of other available treatment paths in the set of available treatment paths for the associated condition.

940. The system of embodiment 933, in which the optimal available treatment path provides the same or greater average health benefit with respect to the associated condition than the available treatment path corresponding to the coverage family.

941. The system of embodiment 933, in which the utility range lookup datastructure is structured as a lookup table.

942. The system of embodiment 933, in which the group comprises an entire population.

943. The system of embodiment 942, in which the instructions to add the utility range for the coverage family for the group to the utility range lookup datastructure are structured as:

insert, via the at least one processor, a record that maps an identifier of the coverage family to the utility range for the coverage family into the utility range lookup datastructure.

944. The system of embodiment 933, in which the group comprises one of a plurality of categorical groups.

945. The system of embodiment 944, in which the instructions to add the utility range for the coverage family for the group to the utility range lookup datastructure are structured as:

insert, via the at least one processor, a utility range node with the calculated utility range for the group into a utility range tree datastructure for the coverage family; and insert, via the at least one processor, a record that maps an identifier of the coverage family to the utility range tree datastructure for the coverage family into the utility range lookup datastructure.

946. The system of embodiment 945, in which the utility range tree datastructure is structured to include a set of decision nodes that help locate a leaf node associated with a group, and a set of leaf nodes, each leaf node structured to store a utility range associated with a group.

947. The system of embodiment 933, in which the group comprises a single individual. 948. The system of embodiment 933, in which the utility may include at least one of: an asset, a price, a value.

949. A utility range datastructure generating processor-implemented process, including processing processor-executable instructions via at least one processor from a component collection stored in at least one memory, the component collection storage structured with processor-executable instructions comprising:

obtain, via the at least one processor, a utility range datastructure generation request datastructure, the utility range datastructure generation request datastructure structured to include data fields for identifying a coverage family and a group;

determine, via the at least one processor, a health impact context datastructure associated with the group, the health impact context datastructure comprising a condition identifier of an associated condition and member state values associated with the group;

determine, via the at least one processor, a set of available treatment paths utilized to treat the associated condition and a cost associated with each available treatment path;

determine, via the at least one processor, a health impact value for the coverage family;

calculate, via the at least one processor, a value component for the coverage family for the group based on the cost associated with the available treatment path corresponding to the coverage family and the health impact value associated with the coverage family;

calculate, via the at least one processor, a waste component for the coverage family for the group based on the amount by which the cost associated with the available treatment path corresponding to the coverage family exceeds the cost of following an optimal available treatment path;

calculate, via the at least one processor, a utility range for the coverage family for the group as a combination of the value component and of the waste component, in which the utility range includes a minimum utility and a maximum utility for the coverage family for the group; and add, via the at least one processor, the utility range for the coverage family for the group to a utility range lookup datastructure.

950. The process of embodiment 949, in which the member state values are structured to include previously tried treatments for the medical condition.

951. The process of embodiment 949, in which the set of available treatment paths is structured to include treatment paths used with high frequency.

952. The process of embodiment 949, in which the instructions to determine the health impact value for the coverage family are structured as:

retrieve, via the at least one processor, the health impact value from a database of estimated health impacts based on the identifier of the coverage family and member state values specified in the health impact context datastructure.

953. The process of embodiment 952, in which the health impact value is specified in QALYs.

954. The process of embodiment 949, in which the instructions to determine the health impact value for the coverage family are structured as:

retrieve, via the at least one processor, a health impact function from a database of estimated health impacts based on the identifier of the coverage family; and calculate, via the at least one processor, the health impact value for the coverage family by evaluating the retrieved health impact function using member state values specified in the health impact context datastructure.

955. The process of embodiment 949, in which the value component is calculated independently of other available treatment paths in the set of available treatment paths for the associated condition.

956. The process of embodiment 949, in which the optimal available treatment path provides the same or greater average health benefit with respect to the associated condition than the available treatment path corresponding to the coverage family.

957. The process of embodiment 949, in which the utility range lookup datastructure is structured as a lookup table.

958. The process of embodiment 949, in which the group comprises an entire population.

959. The process of embodiment 958, in which the instructions to add the utility range for the coverage family for the group to the utility range lookup datastructure are structured as:

insert, via the at least one processor, a record that maps an identifier of the coverage family to the utility range for the coverage family into the utility range lookup datastructure.

960. The process of embodiment 949, in which the group comprises one of a plurality of categorical groups.

961. The process of embodiment 960, in which the instructions to add the utility range for the coverage family for the group to the utility range lookup datastructure are structured as:

insert, via the at least one processor, a utility range node with the calculated utility range for the group into a utility range tree datastructure for the coverage family; and insert, via the at least one processor, a record that maps an identifier of the coverage family to the utility range tree datastructure for the coverage family into the utility range lookup datastructure.

962. The process of embodiment 961, in which the utility range tree datastructure is structured to include a set of decision nodes that help locate a leaf node associated with a group, and a set of leaf nodes, each leaf node structured to store a utility range associated with a group.

963. The process of embodiment 949, in which the group comprises a single individual.

964. The process of embodiment 949, in which the utility may include at least one of: an asset, a price, a value.

1001. A utility range datastructure lookup apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a utility range datastructure lookup request datastructure, the utility range datastructure lookup request datastructure structured to include data fields for identifying a coverage family and a member;

determine, via the at least one processor, a health impact context datastructure associated with the member, the health impact context datastructure including a member state datastructure associated with the member, the member state datastructure structured to include data fields for identifying previously tried alternative treatments;

query, via the at least one processor, a utility range lookup datastructure for a utility range calculating code module link for the coverage family;

determine, via the at least one processor, a utility range for the coverage family for the member using the utility range calculating code module link and the health impact context datastructure, in which the utility range is determined as a combination of a value utility component and of a waste utility component; and provide, via the at least one processor, a utility range datastructure for the coverage family for the member, the utility range datastructure structured to include data fields for identifying a minimum utility range and a maximum utility range of the determined utility range.

1002. The apparatus of embodiment 1001, in which the health impact context datastructure is structured to include a diagnosis code for an associated condition.

1003. The apparatus of embodiment 1001, in which the utility range calculating code module link is a function pointer to a utility range calculating code module for the coverage family.

1004. The apparatus of embodiment 1003, in which the utility range calculating code module for the coverage family is a function that takes data specified in a health impact context datastructure as inputs and outputs a utility range.

1005. The apparatus of embodiment 1003, in which the utility range calculating code module for the coverage family comprises a vector of model parameters.

1006. The apparatus of embodiment 1001, in which the value utility component is calculated based on the cost associated with a treatment path corresponding to the coverage family and a health impact value associated with the coverage family.

1007. The apparatus of embodiment 1006, in which the health impact value is calculated based on data specified in the health impact context datastructure associated with the member.

1008. The apparatus of embodiment 1007, in which the health impact value is calculated in QALYs.

1009. The apparatus of embodiment 1001, in which the waste utility component is calculated based on the amount by which the cost associated with a treatment path corresponding to the coverage family exceeds the cost of following an optimal treatment path.

1010. The apparatus of embodiment 1001, in which the utility may include at least one of: an asset, a price, a value.

1011. A utility range datastructure lookup processor-readable, non-transient medium, the medium storing a component collection, the component collection storage structured with processor-executable instructions comprising:

obtain, via the at least one processor, a utility range datastructure lookup request datastructure, the utility range datastructure lookup request datastructure structured to include data fields for identifying a coverage family and a member;

determine, via the at least one processor, a health impact context datastructure associated with the member, the health impact context datastructure including a member state datastructure associated with the member, the member state datastructure structured to include data fields for identifying previously tried alternative treatments;

query, via the at least one processor, a utility range lookup datastructure for a utility range calculating code module link for the coverage family;

determine, via the at least one processor, a utility range for the coverage family for the member using the utility range calculating code module link and the health impact context datastructure, in which the utility range is determined as a combination of a value utility component and of a waste utility component; and provide, via the at least one processor, a utility range datastructure for the coverage family for the member, the utility range datastructure structured to include data fields for identifying a minimum utility range and a maximum utility range of the determined utility range.

1012. The medium of embodiment 1011, in which the health impact context datastructure is structured to include a diagnosis code for an associated condition.

1013. The medium of embodiment 1011, in which the utility range calculating code module link is a function pointer to a utility range calculating code module for the coverage family.

1014. The medium of embodiment 1013, in which the utility range calculating code module for the coverage family is a function that takes data specified in a health impact context datastructure as inputs and outputs a utility range.

1015. The medium of embodiment 1013, in which the utility range calculating code module for the coverage family comprises a vector of model parameters.

1016. The medium of embodiment 1011, in which the value utility component is calculated based on the cost associated with a treatment path corresponding to the coverage family and a health impact value associated with the coverage family.

1017. The medium of embodiment 1016, in which the health impact value is calculated based on data specified in the health impact context datastructure associated with the member.

1018. The medium of embodiment 1017, in which the health impact value is calculated in QALYs.

1019. The medium of embodiment 1011, in which the waste utility component is calculated based on the amount by which the cost associated with a treatment path corresponding to the coverage family exceeds the cost of following an optimal treatment path.

1020. The medium of embodiment 1011, in which the utility may include at least one of: an asset, a price, a value.

1021. A utility range datastructure lookup processor-implemented system, comprising:

means to store a component collection;

means to process processor-executable instructions from the component collection, the component collection storage structured with processor-executable instructions including:

obtain, via the at least one processor, a utility range datastructure lookup request datastructure, the utility range datastructure lookup request datastructure structured to include data fields for identifying a coverage family and a member;

determine, via the at least one processor, a health impact context datastructure associated with the member, the health impact context datastructure including a member state datastructure associated with the member, the member state datastructure structured to include data fields for identifying previously tried alternative treatments;

query, via the at least one processor, a utility range lookup datastructure for a utility range calculating code module link for the coverage family;

determine, via the at least one processor, a utility range for the coverage family for the member using the utility range calculating code module link and the health impact context datastructure, in which the utility range is determined as a combination of a value utility component and of a waste utility component; and provide, via the at least one processor, a utility range datastructure for the coverage family for the member, the utility range datastructure structured to include data fields for identifying a minimum utility range and a maximum utility range of the determined utility range.

1022. The system of embodiment 1021, in which the health impact context datastructure is structured to include a diagnosis code for an associated condition.

1023. The system of embodiment 1021, in which the utility range calculating code module link is a function pointer to a utility range calculating code module for the coverage family.

1024. The system of embodiment 1023, in which the utility range calculating code module for the coverage family is a function that takes data specified in a health impact context datastructure as inputs and outputs a utility range.

1025. The system of embodiment 1023, in which the utility range calculating code module for the coverage family comprises a vector of model parameters.

1026. The system of embodiment 1021, in which the value utility component is calculated based on the cost associated with a treatment path corresponding to the coverage family and a health impact value associated with the coverage family.

1027. The system of embodiment 1026, in which the health impact value is calculated based on data specified in the health impact context datastructure associated with the member.

1028. The system of embodiment 1027, in which the health impact value is calculated in QALYs.

1029. The system of embodiment 1021, in which the waste utility component is calculated based on the amount by which the cost associated with a treatment path corresponding to the coverage family exceeds the cost of following an optimal treatment path.

1030. The system of embodiment 1021, in which the utility may include at least one of: an asset, a price, a value.

1031. A utility range datastructure lookup processor-implemented process, including processing processor-executable instructions via at least one processor from a component collection stored in at least one memory, the component collection storage structured with processor-executable instructions comprising:

obtain, via the at least one processor, a utility range datastructure lookup request datastructure, the utility range datastructure lookup request datastructure structured to include data fields for identifying a coverage family and a member;

determine, via the at least one processor, a health impact context datastructure associated with the member, the health impact context datastructure including a member state datastructure associated with the member, the member state datastructure structured to include data fields for identifying previously tried alternative treatments;

query, via the at least one processor, a utility range lookup datastructure for a utility range calculating code module link for the coverage family;

determine, via the at least one processor, a utility range for the coverage family for the member using the utility range calculating code module link and the health impact context datastructure, in which the utility range is determined as a combination of a value utility component and of a waste utility component; and provide, via the at least one processor, a utility range datastructure for the coverage family for the member, the utility range datastructure structured to include data fields for identifying a minimum utility range and a maximum utility range of the determined utility range.

1032. The process of embodiment 1031, in which the health impact context datastructure is structured to include a diagnosis code for an associated condition.

1033. The process of embodiment 1031, in which the utility range calculating code module link is a function pointer to a utility range calculating code module for the coverage family.

1034. The process of embodiment 1033, in which the utility range calculating code module for the coverage family is a function that takes data specified in a health impact context datastructure as inputs and outputs a utility range.

1035. The process of embodiment 1033, in which the utility range calculating code module for the coverage family comprises a vector of model parameters.

1036. The process of embodiment 1031, in which the value utility component is calculated based on the cost associated with a treatment path corresponding to the coverage family and a health impact value associated with the coverage family.

1037. The process of embodiment 1036, in which the health impact value is calculated based on data specified in the health impact context datastructure associated with the member.

1038. The process of embodiment 1037, in which the health impact value is calculated in QALYs.

1039. The process of embodiment 1031, in which the waste utility component is calculated based on the amount by which the cost associated with a treatment path corresponding to the coverage family exceeds the cost of following an optimal treatment path.

1040. The process of embodiment 1031, in which the utility may include at least one of: an asset, a price, a value.

UDRCD Controller

FIG. 105 shows a block diagram illustrating embodiments of a UDRCD controller. In this embodiment, the UDRCD controller 10501 may serve to aggregate, process, store, search, serve, identify, instruct, generate, match, and/or facilitate interactions with a computer through information technology analytics and processing for risk coverage technologies, and/or other related data.

Users, which may be people and/or other systems, may engage information technology systems (e.g., computers) to facilitate information processing. In turn, computers employ processors to process information; such processors 10503 may be referred to as central processing units (CPU). One form of processor is referred to as a microprocessor. CPU's use communicative circuits to pass binary encoded signals acting as instructions to allow various operations. These instructions may be operational and/or data instructions containing and/or referencing other instructions and data in various processor accessible and operable areas of memory 10529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the UDRCD controller 10501 may be connected to and/or communicate with entities such as, but not limited to: one or more users from peripheral devices 10512 (e.g., user input devices 10511); an optional cryptographic processor device 10528; and/or a communications network 10513.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The UDRCD controller 10501 may be based on computer systems that may comprise, but are not limited to, components such as: a computer systemization 10502 connected to memory 10529.

Computer Systemization

A computer systemization 10502 may comprise a clock 10530, central processing unit ("CPU(s)" and/or "processor (s)" (these terms are used interchangeably throughout the disclosure unless noted to the contrary)) 10503, a memory 10529 (e.g., a read only memory (ROM) 10506, a random access memory (RAM) 10505, etc.), and/or an interface bus 10507, and most frequently, although not necessarily, are all interconnected and/or communicating through a system bus 10504 on one or more (mother) board(s) 10502 having conductive and/or otherwise transportive circuit pathways through which instructions (e.g., binary encoded signals) may travel to effectuate communications, operations, storage, etc. The computer systemization may be connected to a power source 10586; e.g., optionally the power source may be internal. Optionally, a cryptographic processor 10526 may be connected to the system bus. In another embodiment, the cryptographic processor, transceivers (e.g., ICs) 10574, and/or sensor array (e.g., accelerometer, altimeter, ambient light, barometer, global positioning system (GPS) (thereby allowing UDRCD controller to determine its location), gyroscope, magnetometer, pedometer, proximity, ultra-violet sensor, etc.) 10573 may be connected as either internal and/or external peripheral devices 10512 via the interface bus I/O 10508 (not pictured) and/or directly via the interface bus 10507. In turn, the transceivers may be connected to antenna(s) 10575, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple Airpods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 10529 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, 17, 19, etc.), Itanium®, Xeon®, and/or XScale®; Motorola's® 680X0 series (e.g., 68020, 68030, 68040, etc.); and/or the like processor(s). The CPU' interacts with memory through instruction passing through conductive and/or transportive conduits (e.g., (printed) electronic and/or optic circuits) to execute stored instructions(i.e., program code), e.g., via load/read address commands; e.g., the CPU' may read processor issuable instructions from memory (e.g., reading it from a component collection (e.g., an interpreted and/or compiled program application/library including allowing the processor to execute instructions from the application/library) stored in the memory). Such instruction passing facilitates communication within the UDRCD controller and beyond through various interfaces. Should processing requirements dictate a greater amount speed and/or capacity, distributed processors (e.g., see Distributed UDRCD below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the UDRCD may be achieved by implementing a microcontroller such as CAST's® R8051XC2 microcontroller; Intel's® MCS 51 (i.e., 8051 microcontroller); and/or the like. Also, to implement certain features of the UDRCD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the UDRCD component collection (distributed or otherwise) and/or features may be implemented via the microprocessor and/or via embedded components; e.g., via ASIC, coprocessor, DSP, FPGA, and/or the like. Alternately, some implementations of the UDRCD may be implemented with embedded components that are configured and used to achieve a variety of features or signal processing.

Depending on the particular implementation, the embedded components may include software solutions, hardware solutions, and/or some combination of both hardware/software solutions. For example, UDRCD features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the UDRCD features. A hierarchy of programmable interconnects allow logic blocks to be interconnected as needed by the UDRCD system designer/administrator, somewhat like a one-chip programmable breadboard. An FPGA's logic blocks can be programmed to perform the operation of basic logic gates such as AND, and NOR, or more complex combinational operators such as decoders or mathematical operations. In most FPGAs, the logic blocks also include memory elements, which may be circuit flip-flops or more complete blocks of memory. In some circumstances, the UDRCD may be developed on FPGAs and then migrated into a fixed version that more resembles ASIC implementations. Alternate or coordinating implementations may migrate UDRCD controller features to a final ASIC instead of or in addition to FPGAs. Depending on the implementation all of the aforementioned embedded components and microprocessors may be considered the "CPU" and/or "processor" for the UDRCD.

Power Source

The power source 10586 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 10586 is connected to at least one of the interconnected subsequent components of the UDRCD thereby providing an electric current to all subsequent components. In one example, the power source 10586 is connected to the system bus component 10504. In an alternative embodiment, an outside power source 10586 is provided through a connection across the I/O 10508 interface. For example, Ethernet (with power on Ethernet), IEEE 1394, USB and/or the like connections carry both data and power across the connection and is therefore a suitable source of power.

Interface Adapters

Interface bus(ses) 10507 may accept, connect, and/or communicate to a number of interface adapters, variously although not necessarily in the form of adapter cards, such as but not limited to: input output interfaces (I/O) 10508, storage interfaces 10509, network interfaces 10510, and/or the like. Optionally, cryptographic processor interfaces 10527 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and/or the like.

Storage interfaces 10509 may accept, communicate, and/or connect to a number of storage devices such as, but not limited to: (removable) storage devices 10514, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E) IDE), Institute of Electrical and Electronics Engineers (IEEE) 1394, fiber channel, Non-Volatile Memory (NVMI) Express (NVMe), Small Computer Systems Interface (SCSI), Thunderbolt, Universal Serial Bus (USB), and/or the like.

Network interfaces 10510 may accept, communicate, and/or connect to a communications network 10513. Through a communications network 10513, the UDRCD controller is accessible through remote clients **10533*b* (e.g., computers with web browsers) by users 10533*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed UDRCD below), architectures may similarly be employed to pool, load balance, and/or otherwise decrease/increase the communicative bandwidth required by the UDRCD controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 10510 may be used to engage with various communications network types 10513**. For example, multiple network interfaces may be employed to allow for the communication over broadcast, multicast, and/or unicast networks.

Input Output interfaces (I/O) 10508 may accept, communicate, and/or connect to user, peripheral devices 10512 (e.g., input devices 10511), cryptographic processor devices 10528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 10512 may be connected and/or communicate to I/O and/or other facilities of the like such as network interfaces, storage interfaces, directly to the interface bus, system bus, the CPU, and/or the like. Peripheral devices may be external, internal and/or part of the UDRCD controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 10511 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the UDRCD controller may be embodied as an embedded, dedicated, and/or monitor-less(i.e., headless) device, and access may be provided over a network interface connection.

Cryptographic units such as, but not limited to, microcontrollers, processors 10526, interfaces 10527, and/or devices 10528 may be attached, and/or communicate with the UDRCD controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® Crypto NetX and other Security Processors; nCipher's® nShield; Safe Net's® Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 10529. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the UDRCD controller and/or a computer systemization may employ various forms of memory 10529. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 10529 will include ROM 10506, RAM 10505, and a storage device 10514. A storage device 10514 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD)), etc.); other processor-readable storage mediums; and/or other devices of the like. Thus, a computer systemization generally employs and makes use of memory.

Component Collection

The memory 10529 may contain a collection of application/library/program and/or database components and/or data such as, but not limited to: operating system component(s) 10515 (operating system); information server component(s) 10516 (information server); user interface component(s) 10517 (user interface); Web browser component(s) 10518 (Web browser); database(s) 10519; mail server component(s) 10521; mail client component(s) 10522; cryptographic server component(s) 10520 (cryptographic server); the UDRCD component(s) 10535 (e.g., which may include ACM, EF, UF, ACGG, ARD, SP, AP, PRC, ENB, EPB, PC, PRAG, PRAL, PRAC 10541-10554, and/or the like components); and/or the like (i.e., collectively a component collection). These components may be stored and accessed from the storage devices and/or from storage devices accessible through an interface bus.

Although unconventional program components such as those in the component collection may be stored in a local storage device 10514, they may also be loaded and/or stored in memory such as: cache, peripheral devices, processor registers, RAM, remote storage facilities through a communications network, ROM, various forms of memory, and/or the like.

Operating System

The operating system component 10515 is an executable program component facilitating the operation of the UDRCD controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® Jul. 8, 2010; Unix and Unix-like system distributions (such as AT&T's UNIN®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the UDRCD controller to communicate with other entities through a communications network 10513. Various communication protocols may be used by the UDRCD controller as a subcarrier transport mechanism for interaction, such as, but not limited to: multicast, TCP/IP, UDP, unicast, and/or the like.

Information Server

An information server component 10516 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or. NET, Common Gateway Interface (CGI) scripts, dynamic (D) hypertext markup language (HTML), FLASH, Java, JavaScript, Practical Extraction Report Language (PERL.), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); Hyper Text Transfer Protocol (HTTP); Secure Hypertext Transfer Protocol (HTTPS), Secure Socket Layer (SSL) Transport Layer Security (ILS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the UDRCD controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the UDRCD database 10519, operating systems, other program components, user interfaces, Web browsers, and/or the like.

Access to the UDRCD) database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the UDRCD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the UDRCD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D) HTML, FLASH, Java, JavaScript, etc. interface libraries such as, but not limited to, Dojo, jQuery (UI), MooTools, Prototype, script.aculo.us, SWFObject, Yahoo! User Interface®, and/or the like, any of which may be used and) provide a baseline and mechanism of accessing and displaying information graphically to users.

A user interface component 10517 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 10518 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D) HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the UDRCD enabled nodes. The combined application may be nugatory on systems employing Web browsers.

Mail Server

A mail server component 10521 is a stored program component that is executed by a CPU 10503. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or. NET, CGI scripts, Java, JavaScript, PERL, PHP, pipes, Python, WebObjects®, and/or the like. The mail server may support communications protocols such as, but not limited to: Internet message access protocol (INAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the UDRCD. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the UDRCD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 10522 is a stored program component that is executed by a CPU 10503. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 10520 is a stored program component that is executed by a CPU 10503, cryptographic processor 10526, cryptographic processor interface 10527, cryptographic processor device 10528, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (ILS), and/or the like. Employing such encryption security protocols, the UDRCD may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the UDRCD component to engage in secure transactions if so desired. The cryptographic component facilitates the secure accessing of resources on the UDRCD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The UDRCD Database

The UDRCD database component 10519 may be embodied in a database and its stored data. The database is a stored program component, which is executed by the CPU; the stored program component portion configuring the CPU to process the stored data. The database may be a fault tolerant, relational, scalable, secure database such as Claris File Maker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the UDRCD database may be implemented using various other data-structures, such as an array, hash, (linked) list, struct, structured text file (e.g., N.MI.), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UDRCD database is implemented as a data-structure, the use of the UDRCD database 10519 may be integrated into another component such as the UDRCD component 10535. Also, the database may be implemented as a mix of data structures, objects, programs, relational structures, scripts, and/or the like. Databases may be consolidated and/or distributed in countless variations (e.g., see Distributed UDRCD below). Portions of databases, e.g., tables, may be exported and/or imported and thus decentralized and/or integrated.

In one embodiment, the database component 10519 includes several tables representative of the schema, tables, structures, keys, entities and relationships of the described database 10519*a-r:*

An accounts table 10519*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, link WalletsID, accountPrioritAccaountRatio, accountAddress, accountState, accountZIPcode, accountCountry, accountEmail, accountAuthKey, accountIPaddress, accountURLAccessCode, accountPortNo, accountAuthorizationCode, accountAccessPrivileges, accountPreferences, accountRestrictions, and/or the like;

A users table 10519*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, user AuthorizationCode, userAccessPrivilges, userPreferences, userRestrictions, and/or the like (the user table may support and/or track multiple entity accounts on a UDRCD);

An devices table 10519*c* includes fields such as, but not limited to: deviceID, sensorIDs, accountID, assetIDs, paymentIDs, deviceType, deviceName, deviceManufacturer, deviceModel, device Version, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, device AccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table **10519*d*** includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, app Access Privileges, appPreferences, appRestrictions, portNum, access_API_call, linked_wallets_list, and/or the like;

An assets table **10519*e*** includes fields such as, but not limited to: assetID, accountID, userID, distributorAccountID, distributorPaymentID, distributorOnwerID, assetOwnerID, assetType, assetSourceDeviceID, assetSourceDevice Type, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeries Name, assetSeriesSeason, assetSeriesEpisode, assetCode, assetQuantity, asset Cost, asset Price, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwner AccountID, subscriptionIDs, assetAuthroizationCode, assetAccessPrivileges, assetPreferences, assetRestrictions, assetAPI, assetAPIconnection Address, and/or the like;

A payments table **10519*f*** includes fields such as, but not limited to: paymentID, accountID, userID, couponID, coupon Value, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table **10519*g*** includes fields such as, but not limited to: transactionID, accountID, assetIDs, deviceIDs, paymentIDs, transactionIDs, userID, merchantID, transaction Type, transactionDate, transaction Time, transaction Amount, transactionQuantity, transactionDetails, products List, product Type, product Title, productsSummary, productParamsList, transactionNo, transaction AccessPrivileges, transactionPreferences, transactionRestrictions, merchantAuthKey, merchantAuthCode, and/or the like;

An merchants table **10519*h*** includes fields such as, but not limited to: merchantID, merchant TaxID, merchante Name, merchantContactUserID, accountID, issuerID, acquirerID, merchantEmail, merchantAddress, merchantState, merchantZIPcode, merchantCountry, merchantAuthKey, merchantIPaddress, port.Num, merchantURLaccessCode, merchantPortNo, merchantAccessPrivileges, merchantPreferences, merchantRestrictions, and/or the like;

An ads table **10519*i*** includes fields such as, but not limited to: adID, advertiserID, adMerchantID, adNetworkID, adName, adTags, advertiser Name, adSponsor, adTime, adGeo, adAttributes, adFormat, adProduct, adText, ad.Media, ad.MediaID, adChannelID, adTagTime, adAudioSignature, adHash, adTemplateID, adTemplateData, adSourceID), adSource Name, adSourceServerIP, adSourceURI, adSourceSecurity Protocol, adSourceFTP, ad AuthKey, adAccessPrivileges, adPreferences, adRestrictions, adNetworkXchangeID, adNetworkXchange Name, adNetworkXchangeCost, adNetworkXchangeMetricType (e.g., CPA, CPC, CPM, CTR, etc.), adNetwork Xchange.Metric Value, adNetworkXchangeServer, adNetworkXchangePortNumber, publisherID, publisher Address, publisherURL, publisher Tag, publisher Industry, publisher Name, publisherDescription, siteDomain, siteURI, siteContent, siteTag, siteContext, siteImpression, siteVisits, sitel Headline, sitePage, site AdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impression Type, impressionPublisherID, impressionPublisherURL, and/or the like;

An models table **10519*j*** includes fields such as, but not limited to: modelID, modelAssociatedPlanSponsor, model AssociatedPlanID, modelAssociatedLocality, modelAssociatedProvider Network, modelAssociatedPlan Term, modelAssociatedPlan.MemberType, atomizedConditionsData, atomizedProceduresData, coreInsuranceCoverageData, coreInsuranceCosts, addins InsuranceCoverageData, addins InsuranceCosts, and/or the like;

An members table **10519*k*** includes fields such as, but not limited to: memberID, member AssociatedPlanSponsor, member AssociatedPlanID, memberProfile, memberClinicalData, memberPlanConfiguration, memberState, and/or the like;

An plans table 105191 includes fields such as, but not limited to: planID, plan AssociatedPlanSponsor, planCoreCoverageData, plan Available AddinsCoverageData, plan AvailableTerms, planAvailableLocalities, plan AvailableProviderNetworks, planCoverageFamilyPriceRangeData, and/or the like;

An ACGs table **10519*m*** includes fields such as, but not limited to: ACG_ID, ACG_ConditionsData, ACG_TreatmentsData, ACG_ProvidersData, condition TreatmentPaths, providerPracticePatterns, provider TreatmentCost, and/or the like;

A props ratios table **10519*n*** includes fields such as, but not limited to: encounterType, claimCode, propsRatio, and/or the like;

An encounters table 105190 includes fields such as, but not limited to: encounterID, enrolleeID, dateStart, dateEnd, associatedClaimIDs, associatedClaimCodes, encounterType, encounterCost, encounterPOS, encounterProviderLocation, and/or the like;

An episodes table 10519*p* includes fields such as, but not limited to: episodeID, encounter Type, enrolleeID, episodeWindowStartDate, episodeWindowEndDate, anchorEncounterID, accessoryEncounterIDs, episodePOS, episodeProviderLocation, episodeCost, and/or the like;

A prices table 10519*q* includes fields such as, but not limited to: providerID, encounterType, priceFactor, priceRank, and/or the like;

A health impacts table 10519*r* includes fields such as, but not limited to: coverageFamilyID, healthImpactType, context, timeHorizon, healthImpact Value, healthImpactFunction, and/or the like.

In one embodiment, the UDRCD database may interact with other database systems. For example, employing a distributed database system, queries and data access by search UDRCD component may treat the combination of the UDRCD database, an integrated data security layer database as a single database entity (e.g., see Distributed UDRCD below).

In one embodiment, user programs may contain various user interface primitives, which may serve to update the UDRCD. Also, various accounts may require custom database tables depending upon the environments and the types of clients the UDRCD may need to serve. It should be noted that any unique fields may be designated as a key field throughout. In an alternative embodiment, these tables have been decentralized into their own databases and their respective database controllers(i.e., individual database controllers for each of the above tables). The UDRCD may also be configured to distribute the databases over several computer systemizations and/or storage devices. Similarly, configurations of the decentralized database controllers may be varied by consolidating and/or distributing the various database components 10519*a-r*. The UDRCD may be configured to keep track of various settings, inputs, and parameters via database controllers.

The UDRCD database may communicate to and/or with other components in a component collection, including itself, and/or facilities of the like. Most frequently, the UDRCD database communicates with the UDRCD component, other program components, and/or the like. The database may contain, retain, and provide information regarding other nodes and data.

The UDRCDs

The UDRCD component 10535 is a stored program component that is executed by a CPU via stored instruction code configured to engage signals across conductive pathways of the CPU and ISICI controller components. In one embodiment, the UDRCD component incorporates any and/or all combinations of the aspects of the UDRCD that were discussed in the previous figures. As such, the UDRCD affects accessing, obtaining and the provision of information, services, transactions, and/or the like across various communications networks. The features and embodiments of the UDRCD discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the UDRCD's features and facilities, and in many cases reduce the costs, energy consumption/requirements, and extend the life of UDRCD's underlying infrastructure; this has the added benefit of making the UDRCD more reliable. Similarly, many of the features and mechanisms are designed to be easier for users to use and access, thereby broadening the audience that may enjoy/employ and exploit the feature sets of the UDRCD; such case of use also helps to increase the reliability of the UDRCD. In addition, the feature sets include heightened security as noted via the Cryptographic components 10520, 10526, 10528 and throughout, making access to the features and data more reliable and secure The UDRCD transforms coverage enrollment request, event signal, ACGG request, search request, props ratios calculation request, encounters build request, episodes build request, price calculation request, price range generation request, price range lookup request inputs, via UDRCD components (e.g., ACM, EF, UF, ACGG, ARD, SP, AP, PRC, ENB, EPB, PC, PRAG, PRAL, PRAC), into coverage enrollment response, add-in recommendation, ACGG response, search response, props ratios calculation response, encounters build response, episodes build response, price calculation response, price range generation resp., price range lookup resp. outputs.

The UDRCD component facilitates access of information between nodes may be developed by employing various development tools and languages such as, but not limited to: Apache® components, Assembly, ActiveX, binary executables, (ANSI) (Objective-) C (++), C# and/or.NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D) HTML; Dojo, Java; JavaScript; jQuery (UI); MooTools; Prototype; script.aculo.us; Simple Object Access Protocol (SOAP); SWFObject; Yahoo!® User Interface; and/or the like), WebObjects®, and/or the like. In one embodiment, the UDRCD server employs a cryptographic server to encrypt and decrypt communications. The UDRCD component may communicate to and/or with other components in a component collection, including itself, and/or facilities of the like. Most frequently, the UDRCD component communicates with the UDRCD database, operating systems, other program components, and/or the like. The UDRCD may contain, communicate, generate, obtain, and/or provide program component, system, user, and/or data communications, requests, and/or responses.

Distributed UDRCDs

The structure and/or operation of any of the UDRCD node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the UDRCD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for UDRCD controller and/or UDRCD component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, NAIL, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the UDRCD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<? PHP
header ('Content-Type: text/plain');
//set ip address and port to listen to for incoming data
$address='192.168.0.100';
$port=255;
//create a server-side SSL socket, listen for/accept incoming communication
$sock=socket_create (AF_INET, SOCK_STREAM, 0);
socket_bind ($sock, $address, $port) or die ('Could not bind to address');
socket_listen ($sock);
$client=socket_accept ($sock);
//read input data from client device in 1024 byte blocks until end of message
do {
  $input=" ";
  $input=socket_read ($client, 1024);
  $data.=$input;
} while ($input!=" ");
//parse data to extract variables
$obj=json_decode ($data, true);
//store input data in a database
mysql_connect ("201.408.185.132", $DBserver, $password);//access database server
mysql_select ("CLIENT_DB.SQL");//select database to append
mysql_query ("INSERT INTO UserTable (transmission)
VALUES ($data)");//add data to UserTable table in a CLIENT database
mysql_close ("CLIENT_DB.SQL");//close connection to database
?>
```

Also, the following resources may be used to provide example embodiments regarding SOAP parser implementation:

http://www.xav.com/perl/site/lib/SOAP/Parser.html http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Use Determination Risk Coverage Datastructure for On-Demand and Increased Efficiency Coverage Detection and Rebalancing Apparatuses, Processes and Systems(including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as “lower”, “upper”, “horizontal”, “vertical”, “above”, “below”, “up”, “down”, “top” and “bottom” as well as derivatives thereof (e.g., “horizontally”, “downwardly”, “upwardly”, etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as “attached”, “affixed”, “connected”, “coupled”, “interconnected”, etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a UDRCD) individual and/or enterprise user, database configuration and/or relational model, data type, data transmission and/or network framework, library, syntax structure, and/or the like, various embodiments of the UDRCD, may be implemented that allow a great deal of flexibility and customization. For example, aspects of the UDRCD may be adapted for service packages that are traditionally static and difficult to change. While various embodiments and discussions of the UDRCD have included information technology analytics and processing for risk coverage, however, it is to be understood that the embodiments described herein may be readily configured and/or customized for a wide variety of other applications and/or implementations.

What is claimed is:

1. A system comprising:

one or more processors and at least one memory storing processor-executable instructions, that, when executed by any one of the one or more processors, cause the one or more processors to perform operations comprising:

obtaining an episodes build request datastructure, the episodes build request datastructure structured including a data field for identifying an encounter type;

comparing the encounter type with a value specified in a corresponding data field of a set of available encounter datastructures;

selecting an anchor encounter datastructure, in which the value specified in the corresponding data field of the anchor encounter datastructure matches the encounter type;

determining analysis window rules associated with the encounter type, the analysis window rules specifying at least one of: a pre- window time period, a post-window time period, a time period length;

determining an analysis window for the anchor encounter datastructure using the analysis window rules and a service date value specified in a corresponding data field of the anchor encounter datastructure;

determining an enrollee identifier value specified in a corresponding data field of the anchor encounter datastructure;

determining a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determining a props ratio relevance function associated with the encounter type, the props ratio relevance function structured classifying claim codes as either relevant or irrelevant to the encounter type;

determining an encounter relevance classification for each other encounter datastructure in the set of other encounter datastructures using the props ratio relevance function;

determining a set of accessory encounter datastructures for the anchor encounter datastructure, the set of accessory encounter datastructures corresponding to other encounter datastructures for the anchor encounter datastructure classified as relevant based on the encounter relevance classification; and generating an episode datastructure structured including a set of data fields for identifying: the anchor encounter datastructure, the set of accessory encounter datastructures, and the encounter type.

2. The system of claim 1, in which the data field for identifying the encounter type is structured identifying a coverage family.

3. The system of claim 1, in which the data field for identifying the encounter type is structured identifying an encounter type.

4. The system of claim 1, in which the instructions for determining the analysis window rules cause the one or more processors to perform operations comprising:

determining an episode archetype datastructure associated with the encounter type, wherein the episode archetype datastructure is associated with a plurality of encounter types; and retrieving the analysis window rules from a corresponding data field of the episode archetype datastructure.

5. The system of claim 1, in which the instructions for determining the analysis window for the anchor encounter datastructure cause the one or more processors to perform operations comprising:

adding the pre-window time period associated with the encounter type to the service date value associated with the anchor encounter datastructure.

6. The system of claim 1, in which the instructions for determining the analysis window for the anchor encounter datastructure cause the one or more processors to perform operations comprising:

adding the post-window time period associated with the encounter type to the service date value associated with the anchor encounter datastructure.

7. The system of claim 1, in which the instructions for determining the analysis window for the anchor encounter datastructure cause the one or more processors to perform operations comprising:

determining a first analysis window based on an event corresponding to the service date value associated with the anchor encounter datastructure;

determining a second analysis window based on a repeat event corresponding to a later service date value associated with the anchor encounter datastructure; and combining the first analysis window and the second analysis window into the analysis window for the anchor encounter datastructure, in which the first analysis window and the second analysis window are overlapping analysis windows.

8. The system of claim 1, in which the props ratio relevance function associated with the encounter type is structured as a best fit cut line, in which claim codes above the best fit cut line are classified as relevant and claim codes below the best fit cut line are classified as irrelevant.

9. The system of claim 1, in which the instructions for determining an encounter relevance classification for each other encounter datastructures cause the one or more processors to perform operations comprising:

determining a claim code associated with a selected other encounter datastructure;

determining a props ratio associated with the determined claim code;

determining a claim code relevance classification for the claim code by evaluating the determined props ratio using the props ratio relevance function, in which the determined claim code is classified as either relevant or irrelevant to the encounter type; and setting the encounter relevance classification for the selected other encounter datastructure to the claim code relevance classification for the determined claim code.

10. The system of claim 1, in which the instructions for determining an encounter relevance classification for each other encounter datastructure cause the one or more processors to perform operations comprising :

determining claim codes associated with a selected other encounter datastructure;

determining a props ratio associated with each of the determined claim codes;

classifying each of the determined claim codes as either relevant or irrelevant to the encounter type by evaluating the determined props ratio for a respective determined claim code using the props ratio relevance function; and determining the encounter relevance classification for the selected other encounter datastructure based on a proportion of the determined claim codes classified as relevant.

11. The system of claim 1, in which the instructions for determining an encounter relevance classification for each other encounter datastructure cause the one or more processors to perform operations comprising:

determining claim codes associated with a selected other encounter datastructure;

determining a props ratio associated with each of the determined claim codes;

determining an average of the determined props ratios; and determining the encounter relevance classification for the selected other encounter datastructure by evaluating the determined average of the determined props ratios using the props ratio relevance function.

12. The system of claim 1, the operations further comprising:

determining the value of an encounter attribute of the anchor encounter datastructure, in which the encounter attribute is one of: a provider location, a practitioner, or a place of service; and setting the value of a corresponding episode attribute of the episode datastructure to the determined value of the encounter attribute.

13. The system of claim 1, the operations further comprising:

calculating an episode cost associated with the episode datastructure; and setting the value of a corresponding data field of the episode datastructure to the calculated episode cost.

14. The system of claim 13, in which the instructions for calculating the episode cost cause the one or more processors to perform operations comprising:

determining an encounter cost specified in a corresponding data field of the anchor encounter datastructure;

determining an encounter cost specified in a corresponding data field of each accessory encounter datastructure in the set of accessory encounter datastructures; and calculating the episode cost as a sum of the determined encounter costs.

15. The system of claim 13, in which the instructions for calculating the episode cost cause the one or more processors to perform operations comprising:

determining an episode archetype datastructure associated with the encounter type, in which the episode archetype datastructure is associated with a plurality of encounter types;

retrieving episode cost calculation rules from a corresponding data field of the episode archetype datastructure; and calculating the episode cost in accordance with the retrieved episode cost calculation rules.

16. One or more non-transitory computer-readable storage media storing processor- executable instructions that, when executed by one or more processors, cause the one or more processors to perform operations comprising:

obtaining an episodes build request datastructure the episodes build request datastructure structured including a data field for identifying an encounter type;

comparing the encounter type with a value specified in a corresponding data field of a set of available encounter datastructures;

selecting an anchor encounter datastructure, in which the value specified in the corresponding data field of the anchor encounter datastructure matches the encounter type;

determining analysis window rules associated with the encounter type, the analysis window rules specifying at least one of: a pre- window time period, a post-window time period, or a time period length;

determining an analysis window for the anchor encounter datastructure using the analysis window rules and a service date value specified in a corresponding data field of the anchor encounter datastructure;

determining an enrollee identifier value specified in a corresponding data field of the anchor encounter datastructure;

determining a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determining a props ratio relevance function associated with the encounter type, the props ratio relevance function structured classifying claim codes as either relevant or irrelevant to the encounter type;

determining an encounter relevance classification for each other encounter datastructure in the set of other encounter datastructures using the props ratio relevance function;

determining a set of accessory encounter datastructures for the anchor encounter datastructure, the set of accessory encounter datastructures corresponding to other encounter datastructures for the anchor encounter datastructure classified as relevant based on the encounter relevance classification; and generating an episode datastructure structured including a set of data fields for identifying: the anchor encounter datastructure, the set of accessory encounter datastructures, and the encounter type.

17. A system comprising:

means to store processor-executable instructions; and means to process processor-executable instructions, wherein the processor-executable instructions are configured to cause the means to process the processor-executable instructions to perform operations comprising:

obtaining an episodes build request datastructure, the episodes build request datastructure structured including a data field for identifying an encounter type;

comparing the encounter type with a value specified in a corresponding data field of a set of available encounter datastructures;

selecting an anchor encounter datastructure, in which the value specified in the corresponding data field of the anchor encounter datastructure matches the encounter type;

determining analysis window rules associated with the encounter type, the analysis window rules specifying at least one of: a pre- window time period, a post-window time period, or a time period length;

determining an analysis window for the anchor encounter datastructure using the analysis window rules and a service date value specified in a corresponding data field of the anchor encounter datastructure;

determining an enrollee identifier value specified in a corresponding data field of the anchor encounter datastructure;

determining a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determining a props ratio relevance function associated with the encounter type, the props ratio relevance function structured classifying claim codes as either relevant or irrelevant to the encounter type;

determining an encounter relevance classification for each other encounter datastructure in the set of other encounter datastructures using the props ratio relevance function;

determining a set of accessory encounter datastructures for the anchor encounter datastructure, the set of accessory encounter datastructures corresponding to other encounter datastructures for the anchor encounter datastructure classified as relevant based on the encounter relevance classification; and generating an episode datastructure structured including a set of data fields for identifying: the anchor encounter datastructure, the set of accessory encounter datastructures, and the encounter type.

18. A processor-executed method comprising:

obtaining, by one or more processors, an episodes build request datastructure, the episodes build request datastructure structured including a data field for identifying an encounter type;

compare, via the any of at least one processer, comparing, by the one or more processors, the encounter type with a value specified in a corresponding data field of a set of available encounter datastructures;

selecting, by the one or more processors, an anchor encounter datastructure, in which the value specified in the corresponding data field of the anchor encounter datastructure matches the encounter type;

determining, by the one or more processors, analysis window rules associated with the encounter type, the analysis window rules specifying at least one of: a pre-window time period, a post-window time period, a time period length;

determining, by the one or more processors, an analysis window for the anchor encounter datastructure using the analysis window rules and a service date value specified in a corresponding data field of the anchor encounter datastructure;

determining, by the one or more processors, an enrollee identifier value specified in a corresponding data field of the anchor encounter datastructure;

determining, by the one or more processors, a set of other encounter datastructures for the anchor encounter datastructure, in which a service date value specified in a corresponding data field of each other encounter datastructure is in the analysis window for the anchor encounter datastructure, and in which the determined enrollee identifier value matches an enrollee identifier value specified in a corresponding data field of each other encounter datastructure;

determining, by the one or more processors, a props ratio relevance function associated with the encounter type, the props ratio relevance function structured classifying claim codes as either relevant or irrelevant to the encounter type;

determining, by the one or more processors, an encounter relevance classification for each other encounter datastructure in the set of other encounter datastructures using the props ratio relevance function;

determining, by the one or more processors, a set of accessory encounter datastructures for the anchor encounter datastructure, the set of accessory encounter datastructures corresponding to other encounter datastructures for the anchor encounter datastructure classified as relevant based on the encounter relevance classification; and generating, by the one or more processors, an episode datastructure structured including a set of data fields for identifying: the anchor encounter datastructure, the set of accessory encounter datastructures, and the encounter type.

* * * * *